(12) United States Patent
Goel

(10) Patent No.: US 8,145,536 B1
(45) Date of Patent: Mar. 27, 2012

(54) SYSTEM FOR CONCURRENT OPTIMIZATION OF BUSINESS ECONOMICS AND CUSTOMER VALUE

(76) Inventor: Sachin Goel, Walpole, MA (US)

( * ) Notice: Subject to any disclaimer, the term of this patent is extended or adjusted under 35 U.S.C. 154(b) by 653 days.

(21) Appl. No.: 11/981,632

(22) Filed: Oct. 31, 2007

Related U.S. Application Data

(63) Continuation-in-part of application No. 11/893,914, filed on Aug. 17, 2007, which is a continuation-in-part of application No. 11/506,451, filed on Aug. 18, 2006, now Pat. No. 7,424,449, which is a continuation-in-part of application No. 11/474,115, filed on Jun. 23, 2006, now Pat. No. 7,742,080, which is a continuation-in-part of application No. 10/973,802, filed on Oct. 25, 2004, now Pat. No. 7,418,409, application No. 11/981,632, filed on Oct. 31, 2007, and a continuation-in-part of application No. PCT/US2007/018290, filed on Aug. 17, 2007, and a continuation-in-part of application No. PCT/US2007/014654, filed on Jun. 23, 2007, and a continuation-in-part of application No. PCT/US2007/014653, filed on Jun. 23, 2007.

(60) Provisional application No. 60/514,248, filed on Oct. 24, 2003.

(51) Int. Cl.
*G06Q 30/00* (2006.01)
*G06F 17/30* (2006.01)

(52) U.S. Cl. ............ 705/26.1; 705/5; 705/6; 705/26.41; 705/26.61

(58) Field of Classification Search .................. 705/5–6, 705/26–27.2
See application file for complete search history.

(56) References Cited

U.S. PATENT DOCUMENTS

| | | | |
|---|---|---|---|
| 4,775,936 A | 10/1988 | Jung | |
| 4,931,932 A | 6/1990 | Dalnekoff et al. | |
| 5,237,499 A | 8/1993 | Garback | |
| 5,627,973 A | 5/1997 | Armstrong et al. | |
| 5,765,142 A | 6/1998 | Allred et al. | |
| 5,797,127 A | 8/1998 | Walker et al. | |
| 5,890,133 A | 3/1999 | Ernst | |

(Continued)

FOREIGN PATENT DOCUMENTS

GB  2366403 A  3/2002

(Continued)

OTHER PUBLICATIONS

"US Airways: US Airways and United Airlines take next step in code-share agreement; Reciprocal airport lounge access and interline e-ticketing". M2 Presswire. Coventry: Oct. 15, 2002. p. 1.*

(Continued)

*Primary Examiner* — Will Allen
(74) *Attorney, Agent, or Firm* — Wolf, Greenfield & Sacks, P.C.

(57) ABSTRACT

A computer-implemented system and method for an airline to enhance customers' experience. A computer-implemented service is operated that delivers to a customer an option to upgrade on up to n of m selected products, where n is less than m. Information is recorded in a data store, pertaining to said option. In addition, a system is operated to define each of the n chosen products, whereby after each of the n chosen products is defined, the customer can be upgraded to said chosen product. The information pertaining to said defined products is recorded in a data store.

22 Claims, 110 Drawing Sheets

U.S. PATENT DOCUMENTS

| | | | |
|---|---|---|---|
| 5,897,620 A | 4/1999 | Walker et al. | |
| 5,962,829 A | 10/1999 | Yoshinaga | |
| 5,963,910 A | 10/1999 | Ulwick | |
| 6,014,647 A | 1/2000 | Nizzari et al. | |
| 6,041,308 A | 3/2000 | Walker et al. | |
| 6,107,932 A | 8/2000 | Walker et al. | |
| 6,112,185 A * | 8/2000 | Walker et al. | 705/5 |
| 6,115,691 A | 9/2000 | Ulwick | |
| 6,119,094 A | 9/2000 | Lynch et al. | |
| 6,119,933 A | 9/2000 | Wong et al. | |
| 6,161,051 A | 12/2000 | Hafemann et al. | |
| 6,236,977 B1 | 5/2001 | Verba et al. | |
| 6,263,315 B1 | 7/2001 | Talluri | |
| 6,295,521 B1 | 9/2001 | DeMarcken et al. | |
| 6,304,850 B1 | 10/2001 | Keller et al. | |
| 6,307,572 B1 | 10/2001 | DeMarcken et al. | |
| 6,314,361 B1 | 11/2001 | Yu et al. | |
| 6,377,932 B1 | 4/2002 | DeMarcken | |
| 6,442,537 B1 | 8/2002 | Karch | |
| 6,477,520 B1 | 11/2002 | Malaviya et al. | |
| 6,496,568 B1 | 12/2002 | Nelson | |
| 6,567,786 B1 | 5/2003 | Bibelnieks et al. | |
| 6,658,390 B1 * | 12/2003 | Walker et al. | 705/5 |
| 6,721,714 B1 | 4/2004 | Baiada et al. | |
| 6,757,689 B2 | 6/2004 | Battas | |
| 6,760,632 B1 | 7/2004 | Heching et al. | |
| 6,778,660 B2 | 8/2004 | Fromm | |
| 6,850,901 B1 | 2/2005 | Hunter et al. | |
| 6,895,381 B1 | 5/2005 | Selby | |
| 6,974,079 B1 | 12/2005 | Strothmann et al. | |
| 7,050,987 B2 | 5/2006 | Lettovsky et al. | |
| 7,069,309 B1 | 6/2006 | Dodrill et al. | |
| 7,249,062 B2 | 7/2007 | Norins et al. | |
| 7,340,403 B1 | 3/2008 | DeMarcken | |
| 7,418,409 B1 * | 8/2008 | Goel | 705/26 |
| 7,424,449 B2 * | 9/2008 | Goel | 705/26 |
| 7,472,080 B2 * | 12/2008 | Goel | 705/26 |
| 7,769,612 B1 * | 8/2010 | Walker et al. | 705/7 |
| 2001/0034686 A1 | 10/2001 | Eder | |
| 2001/0037243 A1 | 11/2001 | Rouston et al. | |
| 2001/0051885 A1 | 12/2001 | Nardulli et al. | |
| 2002/0059283 A1 | 5/2002 | Shapiro et al. | |
| 2002/0065696 A1 | 5/2002 | Hack et al. | |
| 2002/0065699 A1 | 5/2002 | Talluri | |
| 2002/0095328 A1 | 7/2002 | Swart et al. | |
| 2002/0128922 A1 * | 9/2002 | Joao | 705/26 |
| 2002/0194117 A1 | 12/2002 | Nabe et al. | |
| 2002/0198775 A1 | 12/2002 | Ryan | |
| 2003/0033155 A1 | 2/2003 | Peerson et al. | |
| 2003/0036928 A1 * | 2/2003 | Kenigsberg et al. | 705/5 |
| 2003/0046130 A1 | 3/2003 | Golightly et al. | |
| 2003/0050846 A1 | 3/2003 | Rodon | |
| 2003/0055689 A1 | 3/2003 | Block et al. | |
| 2003/0065581 A1 | 4/2003 | Takada | |
| 2003/0069780 A1 | 4/2003 | Hailwood et al. | |
| 2003/0074239 A1 | 4/2003 | Hoffman et al. | |
| 2003/0074247 A1 | 4/2003 | Dick et al. | |
| 2003/0074249 A1 | 4/2003 | Hoffman et al. | |
| 2003/0074250 A1 | 4/2003 | Burk | |
| 2003/0074262 A1 | 4/2003 | Hoffman et al. | |
| 2003/0074263 A1 | 4/2003 | Hoffman et al. | |
| 2003/0074264 A1 | 4/2003 | Hoffman | |
| 2003/0074281 A1 | 4/2003 | Hoffman et al. | |
| 2003/0074285 A1 | 4/2003 | Hoffman et al. | |
| 2003/0074355 A1 | 4/2003 | Menninger et al. | |
| 2003/0074360 A1 | 4/2003 | Chen et al. | |
| 2003/0078787 A1 | 4/2003 | Hoffman et al. | |
| 2003/0078818 A1 | 4/2003 | Hoffman et al. | |
| 2003/0078827 A1 | 4/2003 | Hoffman | |
| 2003/0078845 A1 | 4/2003 | Hoffman et al. | |
| 2003/0078846 A1 | 4/2003 | Burk et al. | |
| 2003/0078860 A1 | 4/2003 | Hoffman et al. | |
| 2003/0078861 A1 | 4/2003 | Hoffman et al. | |
| 2003/0144867 A1 | 7/2003 | Campbell et al. | |
| 2003/0158771 A1 | 8/2003 | Shen et al. | |
| 2003/0163787 A1 * | 8/2003 | Hay et al. | 715/522 |
| 2003/0183694 A1 * | 10/2003 | Sayers et al. | 235/487 |
| 2003/0187685 A1 | 10/2003 | Bakker | |
| 2004/0015386 A1 | 1/2004 | Abe et al. | |
| 2004/0039613 A1 | 2/2004 | Maycotte et al. | |
| 2004/0039614 A1 | 2/2004 | Maycotte et al. | |
| 2004/0073496 A1 | 4/2004 | Cohen | |
| 2004/0083113 A1 | 4/2004 | Cao et al. | |
| 2004/0158536 A1 | 8/2004 | Kowal et al. | |
| 2004/0172319 A1 | 9/2004 | Eder | |
| 2004/0230451 A1 | 11/2004 | Figa | |
| 2004/0267580 A1 | 12/2004 | Becker | |
| 2005/0004820 A1 * | 1/2005 | LeMieux | 705/5 |
| 2005/0033616 A1 | 2/2005 | Vavul et al. | |
| 2005/0071245 A1 | 3/2005 | Norins et al. | |
| 2005/0097000 A1 | 5/2005 | Freishtat et al. | |
| 2005/0216317 A1 | 9/2005 | Medellin et al. | |
| 2006/0106655 A1 | 5/2006 | Lettovsky et al. | |

FOREIGN PATENT DOCUMENTS

| | | |
|---|---|---|
| WO | WO 0073930 A2 | 12/2000 |
| WO | WO 0073957 A2 | 12/2000 |
| WO | WO 0073958 A2 | 12/2000 |
| WO | WO 01/18722 A1 | 3/2001 |
| WO | WO 0133473 A2 | 5/2001 |
| WO | WO 0157771 A1 | 8/2001 |
| WO | WO 02079901 A2 | 10/2002 |
| WO | WO 03019448 A2 | 3/2003 |
| WO | WO 03/029914 A2 | 4/2003 |
| WO | WO 03/054760 A2 | 7/2003 |
| WO | WO 03102867 A1 | 12/2003 |
| WO | WO 2004/036364 A2 | 4/2004 |

OTHER PUBLICATIONS www.Expedia.com. Jun. 5, 2001. {recovered from www.Archive.org].*

Chatwin, "Multiperiod Airline Overbooking With a Single Fare Class," *Operations Research*, 46:6, 805-819p (1998).

Chatwin, "Optimal dynamic pricing of perishable products with stochastic demand and a finite set of prices," *Elsevir Science B.V.—European Journal of Operational Research*; 125, 149-174 (2000).

Compton, "Many Possibilities, One Price," *Customer Relationship Management*,8:8, 16-17 (2004).

Elmaghraby, "Dynamic Pricing in the Presence of Inventory Considerations: Research Overview, Current Practices and Future Directions," *Management Science*, 49:10, 1287-1309 (2003).

Grant, E., "A New Twist in Airline Travel: Surcharges Debut for Certain Ticket Types," *Travel Agent*, 293(11):135(1) Jan. 25, 1999 (recovered from Dialog on Dec. 6, 2008).

Ha et al., "Problem-Focused Incremental Elicitation of Multi-Attribute Utility Models," http://www.cs.uwm.edu/~vu/papers/uai97.pdf, 1-8.

Margulius, "Priced to sell . . . to you," Infoworld San Mataeo, 24:7, 47-48 http://www.infoworld.com/archives/emailPrint.jsp (2002).

Rios-Insua et al., Sensitivity Analysis in an Additive Multi-Attribute Utility Decision Support System, http://www.ciemat.es/convocatorias/eventos/samo2001/esp-riosinsua.pdf, 1-1.

Roth, et al., "Multi-Attribute Utility Analysis" http://msll.mit.edu/maua_paper.pdf, 1-16.

"Booked on the 6.40, the 7.00, the 7.45 . . . " Financial Times (FT) Mar. 8, 1999 p. 15 (recovered from Dialog on Dec. 6, 2008).

www.expedia.com May 19, 2001. Obtained on Sep. 26, 2007 from www.Archive.org.

PCT/IB07/03761, International Search Report and Written Opinion, Feb. 4, 2009.

* cited by examiner

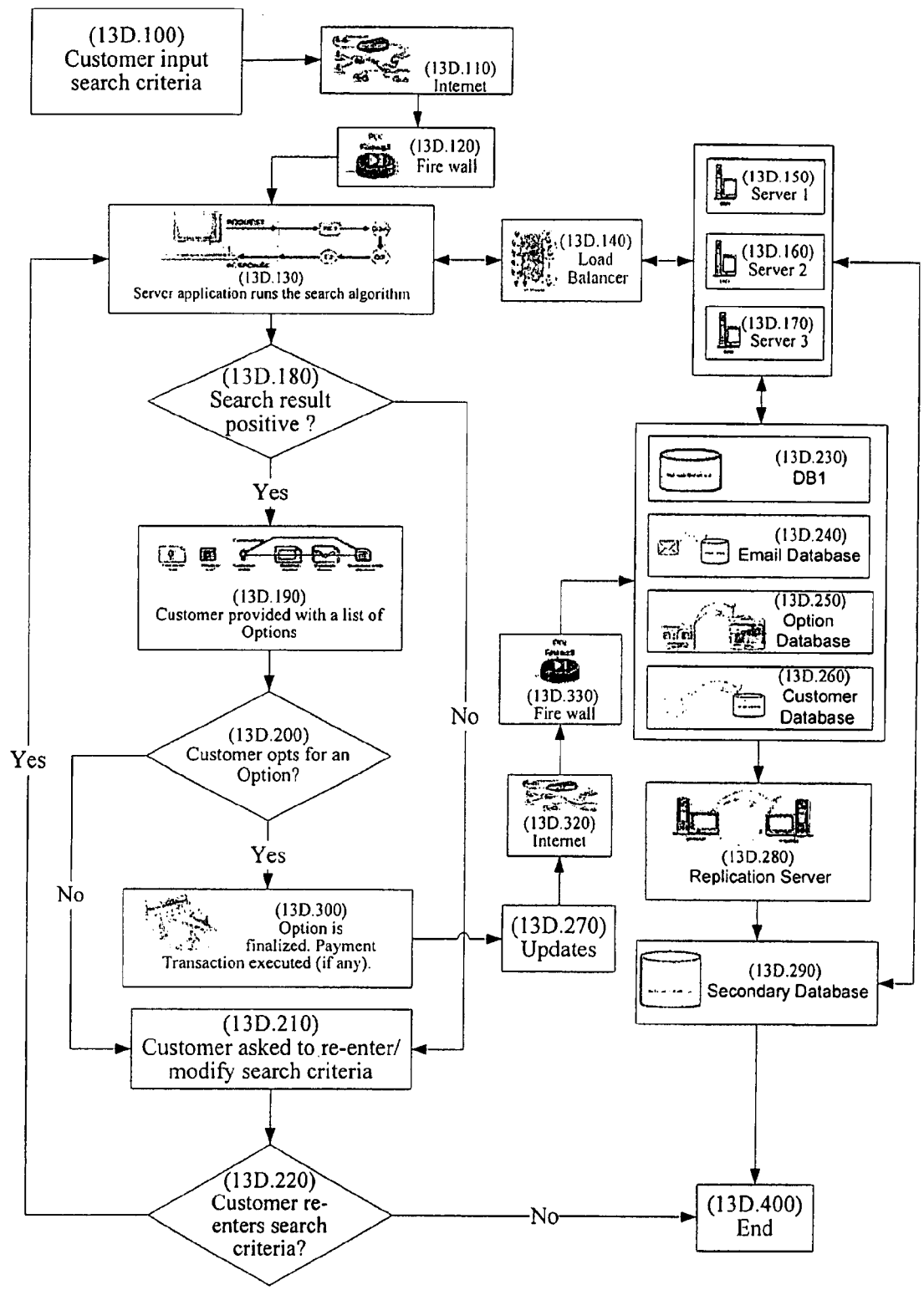

Assessment of Airline dynamics (35.100)

Fig. 37

| UFO | Description | Base-Flight | Up Flight |
|---|---|---|---|
| F3-F1 | Flight F3 to Flight F1 | Flight F3 | Flight F1 |
| F3-F2 | Flight F3 to Flight F2 | Flight F3 | Flight F2 |
| F3-F2-F1 | Flight F3 to Flight F2 or Flight F1 | Flight F3 | Flight F2, Flight F1 |
| F2-F1 | Flight F2 to Flight F1 | Flight F2 | Flight F1 |

Fig. 40

UFO Reservations

Alternate Flight Option  
<u>Know More</u>   Get AFO

Upgrade Flight Option  
<u>Know More</u>   Get UFO

Flexibility Reward Option  
<u>Know More</u>   Get FRO

Your Itinerary

Reservation Details

Onward Journey

|  | Flight | Departs | Arrives |
|---|---|---|---|
| Original Flight | Alpha 993 Coach(U) | BOS 7:15am May 2 | MCO 10:30am May 2 |
|  | Alpha 892 Coach(U) | MCO 2:30pm May 2 | ATL 4:04pm May 2 |
|  | Alpha 894 Coach(U) | ATL 8:00pm May 2 | SEA 10:34pm May 2 |

Return Journey

|  | Flight | Departs | Arrives |
|---|---|---|---|
| Original Flight | Alpha 964 Coach(U) | SEA 10:30am May 7 | BOS 6:37pm May 7 |

Fig. 41

UFO Reservations

Your Itinerary

Onward Journey

|  | Flight | Departs | | Arrives | | Enter inputs to Search for UFO Flights | |
| --- | --- | --- | --- | --- | --- | --- | --- |
| Original Flight | Alpha 993 Coach(U) | BOS | 7:15am May 2 | MCO | 10:30am May 2 | From<br>To | BOS<br>SEA |
|  | Alpha 892 Coach(U) | MCO | 2:30pm May 2 | ATL | 4:04pm May 2 | Departs on<br>Depart Time | May 2<br>5am-8am ▾ |
|  | Alpha 894 Coach(U) | ATL | 8:00pm May 2 | SEA | 10:34pm May 2 | Arrival Time<br>Stops | Select ▾<br>Any ▾ |

( Search UFO Flights )

Return Journey

|  | Flight | Departs | | Arrives | | |
| --- | --- | --- | --- | --- | --- | --- |
| Original Flight | Alpha 964 Coach(U) | SEA | 10:30am May 7 | BOS | 6:37pm May 7 | Get UFO Flights for Return Journey |

Fig. 42

UFO Reservations

Your Itinerary

Onward Journey

|  | Flight | Departs | Arrives | Enter inputs to Search for UFO Flights | |
|---|---|---|---|---|---|
| Original Flight | Alpha 993 Coach(U) | BOS 7:15am May 2 | MCO 10:30am May 2 | From | BOS |
| | | | | To | SEA |
| | Alpha 892 Coach(U) | MCO 2:30pm May 2 | ATL 4:04pm May 2 | Departs on | May 2 |
| | | | | Depart Time | Anytime |
| | Alpha 894 Coach(U) | ATL 8:00pm May 2 | SEA 10:34pm May 2 | Arrival Time | Select |
| | | | | Stops | Any |

( Search UFO Flights )

<u>Display Return Journey</u>

Select UFO Flight for Onward Journey

| UFO Flight | Departs | Arrives | Initial UFO Price | UFO Notify Deadline/UFO Price | | | |
|---|---|---|---|---|---|---|---|
| Flight Alpha 543<br>1 Stop<br>8 hrs 40 mins | 6:00am<br>Mon, May 2<br>BOS | 2:40pm<br>Mon, May 2<br>SEA | $5 | April 29<br>8:00am<br>$125<br>Select | April 30<br>8:00am<br>$100<br>Select | May2<br>7:15am<br>Original<br>Flight<br>Departs | May2<br>6:00am<br>UFO<br>Flight<br>Departs |
| Flight Alpha 567<br>1 Stop<br>10 hrs 30 mins | 5:30am<br>Mon, May 2<br>BOS | 4:00pm<br>Mon, May 2<br>SEA | $4 | | April 30<br>8:00am<br>$120<br>Select | May2<br>7:15am<br>Original<br>Flight<br>Departs | May2<br>5:30am<br>UFO<br>Flight<br>Departs |
| Flight Alpha 594<br>Non Stop<br>7 hrs 45 mins | 7:15am<br>Mon, May 2<br>BOS | 3:00pm<br>Mon, May 2<br>SEA | $10 | April 29<br>8:00pm<br>$200<br>Select | April 30<br>8:00pm<br>$180<br>Select | May2<br>7:15am<br>Original<br>Flight<br>Departs | May2<br>7:15am<br>UFO<br>Flight<br>Departs |

Fig. 43

UFO Reservations

Your Itinerary

Onward Journey

<u>Reservations Details</u>

|  | Flight | Departs | Arrives | UFO Summary |
|---|---|---|---|---|
| Original Flight | Alpha 993 Coach(U) | BOS 7:15am May 2 | MCO 10:30am May 2 | You will be notified about your Final Flight by Apr 29 8:00am<br><br>If you are upgraded to UFO Flight, you will be charged $200<br><br>[Edit UFO Deadline/UFO Exercise Price] |
|  | Alpha 892 Coach(U) | MCO 2:30pm May 2 | ATL 4:04pm May 2 | |
|  | Alpha 894 Coach(U) | ATL 8:00pm May 2 | SEA 10:34pm May 2 | |
|  |  |  |  | (Remove UFO Flight) (Change UFO Flight) |
| UFO Flight | Flight Alpha 594 | BOS 7:15am | SEA 3:00pm | |

Return Journey

|  | Flight | Departs | Arrives |  |
|---|---|---|---|---|
| Original Flight | Alpha 964 Coach(U) | SEA 10:30am May 7 | BOS 6:37pm May 7 | |

Fig. 57

| UTO | Description | Base-Cabin | Up Cabin |
|---|---|---|---|
| CF | Coach to First | Coach | First |
| CB | Coach to Business | Coach | Business |
| CBF | Coach to Business or First | Coach | Business, First |
| BF | Business to First | Business | First |

Fig. 60

Itinerary Summary

| Alternate Flight Option | Upgrade Ticket Option | Smooth Travel Service |
|---|---|---|
| Know more... GET AFO | Know more... GET UTO | Know more... GET STS |

Your Itinerary

Onward Journey

| | Flight | | Departs | | Arrives |
|---|---|---|---|---|---|
| Original Flight | Alpha 993 | Coach (U) | BOS | 8:55am May 2 | ORD | 11:57am May 2 |
| | Alpha 892 | Coach (U) | ORD | 1:00pm May 2 | ATL | 3:07pm May 2 |

Return Journey

| | Flight | | Departs | | Arrives |
|---|---|---|---|---|---|
| Original Flight | Alpha 964 | Coach (U) | ATL | 9:55am May 7 | ORD | 11:50am May 7 |
| | Alpha 857 | Coach (U) | ORD | 1:00pm May 7 | BOS | 4:07pm May 7 |

Fig. 61

UTO Reservation

Select UTO　　Payment　　Confirm

Your Itinerary

Onward Journey

| Depart | | Arrives | Flight # | Cabin & Class | GET UTO |
|---|---|---|---|---|---|
| BOS 8:55am May 2 | ORD | 11:57am May 2 | Alpha 993 | Coach (U) | ▶ GET UTO |
| ORD 1:00pm May 2 | ATL | 3:07pm May 2 | Alpha 892 | Coach (U) | ▶ GET UTO |

Return Journey

| Depart | | Arrives | Flight # | Cabin & Class | GET UTO |
|---|---|---|---|---|---|
| ATL 9:55am May 7 | ORD | 11:50am May 7 | Alpha 064 | Coach (U) | ▶ GET UTO |
| ORD 1:00pm May 7 | BOS | 4:07pm May 7 | Alpha 857 | Coach (U) | ▶ GET UTO |

Fig. 62

UTO Reservation

Select UTO    Payment    Confirm

Select UTO On

| Departs | Arrives | Flight # | Cabin & Class |
|---|---|---|---|
| BOS 8:55am May 2 | ORD 11:57am May 2 | Alpha 993 | Coach (U) |

Partial Group Upgrade ✓

| Upgrade On | Option Price | Price Payable if Upgraded | | Select |
|---|---|---|---|---|
| Business | $3.00(USD) | $30.00(USD) | | ○ |
| First | $5.00(USD) | $60.00(USD) | | ● |
| Business/First | $4.00(USD) | Business $30.00(USD) | First $60.00(USD) | ○ |
| | | No Option Selected | | ○ |

▶ Save and Go to Summary

Fig. 71

| | (1) | (2) | (3) | (4) | (5) | (6) | (7) |
|---|---|---|---|---|---|---|---|
| S. No. | First | Business | Coach | Value(F) | Value(B) | Value(C) | Total Value |
| 1 | BF1 | CBF1 | SC1 | $90 | $110 | $120 | $320 |
| 2 | BF1 | CB1 | SC1 | $90 | $70 | $120 | $280 |
| 3 | CBF1 | | SC1 | $127 | | $120 | $247 |
| 4 | CF1 | | SC1 | $110 | | $120 | $230 |
| 5 | | *CBF1* | *SC1* | | $110 | $120 | $230 |
| 6 | BF1 | | SC1 | $90 | | $120 | $210 |
| 7 | BF1 | CBF1 | | $90 | $110 | | $200 |
| 8 | | *CB1* | *SC1* | | $70 | $120 | $190 |
| 9 | BF1 | CB1 | | $90 | $70 | | $160 |
| 10 | CBF1 | | | $127 | | | $127 |
| 11 | | | SC1 | | | $120 | $120 |
| 12 | CF1 | | | $110 | | | $110 |
| 13 | | *CBF1* | | | $110 | | $110 |
| 14 | BF1 | | | $90 | | | $90 |
| 15 | | *CB1* | | | $70 | | $70 |

|  | First | Business | Coach |
|---|---|---|---|
| Availability | 1 | 1 | 0 |

72.200

| Row No | S. No. | First | Business | Coach | Total Value |
|---|---|---|---|---|---|
| 1 | 1 | BF1 | CBF1 | SC1 | $320 |
| 15 | 2 |  | CB1 |  | $70 |
|  |  |  | Total Upgrade Value |  | $390 |

Fig. 77

| URO | Description | base-room | up Room |
|---|---|---|---|
| GV | Guest to VIP | Guest | VIP |
| GB | Guest to Business | Guest | Business |
| GBV | Guest to Business or VIP | Guest | Business, VIP |
| BV | Business to VIP | Business | VIP |

Fig. 80

URO Reservations

- Alternate Room Option
  Know More...   Get ARO
- Upgrade Room Option
  Know More...   Get URO
- Flexibility Reward Option
  Know More...   Get FRO Reservation Details

Original Reservation

XYZ International
abc downtown street
New York

| | | |
|---|---|---|
| Check-in | Fri, Dec 8 | Special Preferences |
| Check-out | Mon, Dec 11 | Non-Smoking |
| Room Description | Guest Room | Saturday Night Show |

Fig. 81

URO Reservations

[ Select URO ] [ Payment ] [ Confirm ]

Your Reservation

| Original Reservation |
|---|

XYZ International
abc downtown street
New York

|  |  | Special Preferences |
|---|---|---|
| Check-in | Fri, Dec 8 | Non-Smoking |
| Check-out | Mon, Dec 11 | Saturday Night Show |
| Room type | Guest Room |  |

GET URO

Fig. 82

URO Reservations

[ Select URO ]　[ Payment ]　[ Confirm ]

Select URO on

| Original Reservation |||
|---|---|---|
| XYZ International<br>abc downtown street<br>New York | | Special Preferences |
| Check-in | Fri, Dec 8 | Non-Smoking |
| Check-out | Mon, Dec 11 | Saturday Night Show |
| Room type | Guest Room | |

| Upgrade on | Option price | price payable If Upgraded | | Select |
|---|---|---|---|---|
| Bussines | $10(USD) | $90(USD) | | 0 |
| VIP Suite | $15(USD) | $135(USD) | | 0 |
| Business/VIP Suite | $30(USD) | Business<br>$80(USD) | VIP Suite<br>$130(USD) | 0 |
| | | | No Option Selected | 0 |

• Save and go to Summary

Fig. 90

IMPORTANT

S<G<B<V

V = VIP room
B = Business room
G = Guest room
S = Standby room 90.100

| (1) | (2) | 3 | 4 | 5 | 6 | 7 | 8 |
|---|---|---|---|---|---|---|---|
| | | | | | Upgrade Value | | |
| URO Type | Customer Type | Customer | up room | Payment | Soft Value | Upgrade Cost | Total |
| BV | URO | BV1 | V | $95 | $10 | $10 | $95 |
| GV | URO | GV1 | V | $130 | $15 | $25 | $120 |
| GB | FRB | GB1 | B | $0 | $90 | $10 | $80 |
| GBV | URO | GBV1 | V | $150 | $12 | $25 | $137 |
| GBV | URO | GBV1 | B | $115 | $10 | $10 | $115 |
| SG | SBY | SG1 | G | $135 | $20 | $30 | $125 |

90.200

(210)
BV
GV
GBV (220)
GB-BV
SG-GV
SG-GBV
GBV-BV (230)
SG-GB-BV
SG-GBV-BV (240)
GB
GBV (250)
SG-GB
SG-GBV (260)
SG

Fig. 91

| | (1) | (2) | (3) | (4) | (5) | (6) | (7) |
|---|---|---|---|---|---|---|---|
| S. No. | VIP | Business | Guest | Value(V) | Value(B) | Value(G) | Total Value |
| 1 | BV1 | GBV1 | SG1 | $95 | $115 | $125 | $335 |
| 2 | BV1 | GB1 | SG1 | $95 | $80 | $125 | $300 |
| 3 | GBV1 | | SG1 | $137 | | $125 | $262 |
| 4 | GV1 | | SG1 | $120 | | $125 | $245 |
| 5 | | GBV1 | SG1 | | $115 | $125 | $240 |
| 6 | BV1 | | SG1 | $95 | | $125 | $220 |
| 7 | BV1 | GBV1 | | $95 | $115 | | $210 |
| 8 | | GB1 | SG1 | | $80 | $125 | $205 |
| 9 | BV1 | GB1 | | $95 | $80 | | $175 |
| 10 | GBV1 | | | $137 | | | $137 |
| 11 | | | SG1 | | | $125 | $125 |
| 12 | GV1 | | | $120 | | | $120 |
| 13 | | GBV1 | | | $115 | | $115 |
| 14 | BV1 | | | $95 | | | $95 |
| 15 | | GB1 | | | $80 | | $80 |

|  | VIP | Business | Guest |
|---|---|---|---|
| Availability | 1 | 1 | 0 |

(92.200)

| Row No | S. No. | VIP | Business | Guest | Total Value |
|---|---|---|---|---|---|
| 1 | 1 | BV1 | GBV1 | SG1 | $335 |
| 15 | 2 |  | GB1 |  | $80 |
|  |  |  | Total Upgrade Value |  | $415 |

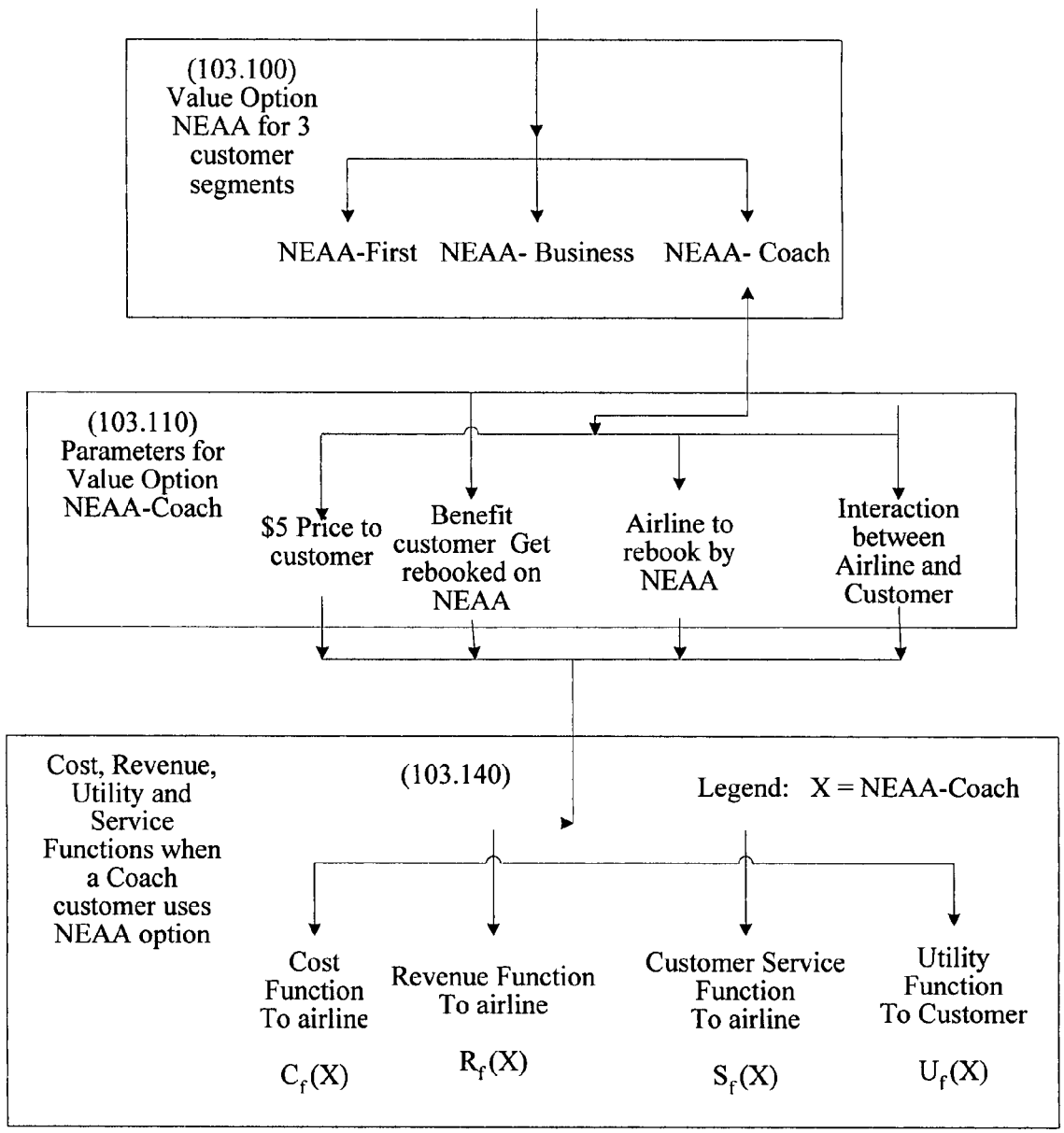

Fig. 104

Choose an STS Option

Smooth Travel Service Options

| Serial No. | Smooth Travel Service Options | Description | Option Costs | Select One |
|---|---|---|---|---|
| 1 | Platinum | Get automatic rebooking to the next earliest available flight that suits your itinerary<br>• Includes all cabins on Alpha Airline flights<br>• Includes Coach cabin on other airline flights | $5 | ⌄ |
| 2 | Gold | Get automatic rebooking to the next earliest available Alpha Airline flight<br>• Includes all cabins | $3 | ⌄ |
| 3 | Silver | Get automatic rebooking to the next best available Alpha Airline flight<br>• Includes Coach cabin | $0 | ⊙ |

<u>Optional Smooth Travel Preferences</u>

SYSTEM FOR CONCURRENT OPTIMIZATION OF BUSINESS ECONOMICS AND CUSTOMER VALUE

CROSS-REFERENCE TO RELATED APPLICATIONS AND PRIORITY CLAIM

This application is a continuation-in-part, and claims the benefit under 35 USC 120, of U.S. patent application Ser. No. 11/893,914, filed Aug. 17, 2007, which is a continuation-in-part of U.S. patent application Ser. No. 11/506,451, filed Aug. 18, 2006 now U.S. Pat. No. 7,424,449, which is a continuation-in-part of Ser. No. 11/474,115, filed Jun. 23, 2006 now U.S. Pat. No. 7,472,080, which is a continuation-in-part of U.S. patent application Ser. No. 10/973,802, filed Oct. 25, 2004 now U.S. Pat. No. 7,418,409, all titled "System For Concurrent Optimization Of Business Economics And Customer Value Satisfaction," the latter of which, in turn, claims the benefit, under 35 USC 119(e) of prior provisional patent application Ser. No. 60/514,248, filed Oct. 24, 2003, titled "Real-Time Optimization Across Integrated Customer Preferences and Company Economics Through Formulation of Value Options That Maximize Value of Both Customer and Company". This application is also a continuation-in-part and claims the benefit under 35 USC 120, of each of international applications PCT/US2007/018290, filed Aug. 17, 2007 and PCT/US2007/014654 and PCT/US2007/014653, both filed Jun. 23, 2007. Each of said applications is hereby incorporated by reference herein.

FIELD OF INVENTION

This invention relates to a system and method for matching customer preferences with vendor products and services, and then dynamically managing the on-demand and optimally customized delivery of such business services or products. More particularly, it relates to methods and systems for customizing and optimizing a company's products and services to individual customers in a way that concurrently enhances customer value and overall business performance.

BACKGROUND

Historically, "companies" (a term defined below) and their customers often have done business across a gap, so to speak. Product or service offerings by a company and the customers' desired product or service do not fully match. In part, this gap is a manifestation of the facts that (1) companies have an incomplete grasp of customer needs, their relative preferences and the pricing utilities customers attach to those preferences (which utilities, equating to the customer's willingness to pay, are dynamic) and (2) a company's costs, profits and inventory (which may control what it can offer on a timely basis) are also dynamic. However, it is also in major part a manifestation of the lack of information technology tools, which can close the gap. To collect dynamic customer and company data and then employ those dynamic data to close the gap is a complex technical problem.

Generally, the customer is treated as an individual and sales terms are customized only when the cost of negotiation is justified—for very large transactions. Many products and services, though, represent complex, multi-faceted offerings and customers weigh their preferences for product features differently at different times. A customer might care more about cost one day and more about availability or delivery time or warranty if queried a few days or weeks later, to use some basic trade-offs as examples. Generally, a company's product comprises many value elements, (explained later) all of which are bundled together to be sold as a single product. But, not every customer values all the aspects of a product equally or needs all. Every customer places a different value (which may be a function of time and situation) on each aspect of a product. With features bundled together in a product, companies end up either incurring costs to sell something to a customer that he does want or lose a customer because the extra undesired value elements forced the product price too high for the customer.

The underlying problem is both that customer demands are incompletely understood and that such demands can change quickly, whereas a company's productive capacity or service often does not have the same dynamic time frame and is supported by a relatively fixed (in the short term) capacity and supply chain.

As explained above, customers have varied needs and preferences and they evaluate products accordingly. In a customer's frame of mind, products with higher perceived satisfaction (utility) values generally are ranked higher than those with lower perceived utilities. Generally, products that (most customers would) rank higher are also higher priced. Therefore, customers would want to buy a higher ranked product only to the extent that the additional value and incremental price satisfies their individual utility dynamics. Many times customers cannot buy their desired product and have to content themselves with a lower-ranked product because of high price or unavailability. The price component may involve budget constraints or a perception that the higher rated product is over priced. Consider a company that sells two products A and B, where most people rank product A higher than product B and consequently or otherwise, A is also priced higher than B. What happens, when company face an excess supply of A? The situation becomes trickier when products in question are perishable in nature and of high monetary value. The company faces the dilemma of either to lower the price and face future revenue dilution, or to write off its unused capacity/excess supply for A. Advertisements and marketing campaigns can help to stimulate demand but not in the short term. In these situations, when it is difficult or not feasible to generate more demand, or even otherwise, a good solution is to upgrade the mix, or in other words, to upgrade the current customers to products rated higher than those bought currently. In the above example, there might be several customers who have bought B but would be willing to buy (or, rather switch to) A if A were offered to them at price and on terms that suit them. However, there is currently no mechanism for implementing this method in a mass market situation. In other words, there are no systems or methods available to do this optimally in a mass market situation, let alone while concurrently maximizing the benefit to the company. If the company were to have some knowledge of its customers' intentions, the company could be more exacting in its ordering, staffing and delivery. Inefficiencies thus would be reduced, revenue and profitability would be increased and the company would then be able to reduce its price to the customer while simultaneously improving profits.

The airline industry is an excellent example of one in which customer utilities vary considerably, and wherein it is appreciated that customers will pay for different levels of service. However, current ticketing and other support systems are inadequate to offer customization of service offerings commensurate with a customer's preferences and utilities.

An airline flight typically offers several levels of service through different cabins like coach (or economy), business and first. Most domestic flights in the United States have only two cabins, coach and first. There are some domestic flights that have either one cabin (by definition, all coach) or three cabins (coach, business and first). Airlines may use different names to refer to these cabins. The idea behind creating different cabins in an airplane is to provide different levels of service to its passengers, ranging from regular (economic) service in the coach cabin to most luxurious (and most expensive) level of service in the first cabin. The services differ in areas including, but not limited to, seating space and comfort, in-flight amenities and food service, priority-check-ins and luggage handling, reservation services and frequent flyer benefits. In a flight with three cabins, the first class cabin is usually the most expensive and luxurious, followed by the business class cabin and the coach class cabin. For these reasons, most airline passengers value the first or business class travel experience more than the coach class travel experience. Some first cabin fares may be as high as 5-10 times a discounted coach fare for the same Itinerary.

For simplicity, let us consider the discussion for a flight with only two cabins, first and coach. High prices for the first class cabin often result in lower demand, leading to the existence of unsold seats in the first cabin. However, airlines seldom opt to reduce the Ticket Price for first class significantly to stimulate and increase demand. Rather, they try to use unsold seats to offer upgrades to selected passengers in coach. Airlines know that many passengers in coach would love to travel in the first cabin and, hence, they try to increase customer loyalty and offer first cabin upgrades to selected coach passengers, as an added benefit. Airlines have created several programs to offer these upgrades, such as frequent flyer award upgrades, elite traveler upgrades, corporate upgrades and staff upgrades.

All these mentioned upgrade programs try to enhance the customer mix, or in other words, try to utilize the unsold first and business cabin seats to generate monetary or non-monetary benefits for the airline. However, none of these programs provides a solution that can optimally utilize all of the unsold first cabin seats. Even today, after using all sorts of upgrade programs, there are flights that still fly with empty first and business cabin seats. This occurs even though, there are coach passengers willing to pay somewhat more than the coach fare to get the otherwise empty first cabin seat. This clearly indicates that the existing upgrade programs are not very effective in tackling the situation. There are several factors contributing to this circumstance, as follows.

Varying passenger value: The relative value for travel in first class over coach varies from passenger to passenger. Even for the same passenger, the relative value changes from one trip to another (and even from one flight to another on the same trip) depending on trip duration, travel needs, budget, logistical factors and other personal or business constraints or needs.

Revenue dilution: If an airline chose to lower prices for the first cabin, it could, as a practical matter, probably fill all or nearly all of its first cabin seats, but that may cause heavy revenue dilution. Increasing the number of seats sold due to a reduction in unit Ticket Price may not necessarily increase the total ticket sales revenue. Hence, it may not be economically viable for the airlines to reduce the price for the first cabin seats.

Uncertain seat availability: It is very uncertain and difficult to predict at the outset exactly how much demand exists for first cabin seats at the given travel prices. Consequently, it is difficult for an airline to know accurately the capacity sold and unsold until the last few minutes prior to departure. The problem becomes worse as several booked first cabin passengers do not finally turn up for the flight (so-called "no shows") or cancel their trips at the last minute.

Last-minute upgrade logistics: The exact availability of first cabin seats can be known only minutes before departure, once the airline stops taking any additional passengers for the first cabin. At that point, however, an airline doesn't have much time to find potential passengers and process upgrades to fill the unused first cabin seats. A short delay in the departure of one flight can reverberate throughout the system and delay several other flights, leading to huge costs and customer (probably much more than the additional revenue earned from additional passengers).

Similarly, one can point to examples in the airline as well as many other industries, such as hotels, car rental, cruise, special events, automobile rentals and so forth. In the airline industry, business travelers, generally, prefer morning or evening flights as compared to afternoon flights or non stop (direct) flights as compared to connecting flights. Generally, morning (or evening) flights and non stop flights may be costlier as compared to afternoon and connecting flights, respectively. These flights may depart with one or more empty seats due to inadequate demand at existing high prices.

In the hotel industry, for example, deluxe or royal suites (i.e., the higher-rated and more expensive rooms) often don't get booked as frequently as other rooms, because of inadequate demand at existing high prices. The hotels do not currently have an optimal way to deal with this situation.

SUMMARY

In response to recognition of this need, shown herein a system and method that allows businesses to determine their customers' preferences (implicitly or explicitly, in advance or in quasi-real-time) and to dynamically integrate these preferences with internal company economics to concurrently maximize value for both customers (i.e., their purchase utilities) and the company (i.e., its profitability).

A framework of systems and methods are shown that allows businesses to determine their customers' preferences (implicitly or explicitly, in advance or in quasi-real-time) for flexibility in purchasing products and to dynamically integrate these preferences with internal company operations to concurrently maximize value for both customers (individually or as a group, their purchase utilities) and the company (i.e., its profitability).

In general, it is an aspect of the system and method that a business determines a customer's preferences (flexibilities and associated relative utilities) in great detail and in real-time or quasi-real-time from direct inquiries (explicitly) and/or past interaction (implicitly), before or while engaging in a sales transaction. When a sales transaction is formed, those preferences are then integrated with internal company operations and economics (costs, capacities, constraints, inventories, etc.). Values are then determined for product or service options to be offered to the customer based on integrated (i.e., aggregated) customer preferences and company economics. On one hand, these value options allow companies to reward or charge customers for their flexibilities with respect to preferences. On the other hand, these value options enable companies to maximize their revenues and/or profitability by unbundling their products and services, and best matching the offerings with a customer's expressed preference/cost tradeoffs. Since the customer gets something matching more closely his or her preferences than a "one size fits all" or small, fixed choice approach, customer purchase utility is increased and the customer is pleased to receive a product or service tailored to the customer's preferences. A company may charge for the purchase of some product options. So, customers pay for options made available to them and the company does not have to invest in offering everyone features that only a minority of customers want.

Accordingly, there is shown a system and method for collecting such customer preference information and pricing corresponding options and presenting options to the customer, receiving customer choices, and completing a sale. The collection steps may be implemented over the global Internet and its World Wide Web. However, other communication media may be used, as well, for all or part of the system or steps. For example, customer information may be taken over the phone or in person or via any other means. And a sale can similarly be completed by telephone or in person.

The system and method may also provide after-sale follow-up and implement execution of option terms purchased by the customer. An engine may be provided for this purpose. The engine may be a processor(s) that is programmed to execute a suitable event response algorithm. Each procedure for event response (related to a purchased option) may be custom programmed to implement the desired operations of the company or there may be provided a library of procedures generally applicable to an industry. The library procedures may be used by the company with or without customization. The detection of the contingency triggering the procedure may in some instances be made automatic, as by interconnection with the company's information management systems, or it may be externally or manually supplied.

The UPO VOF can concurrently create benefits for at least two of the company, the customers and any other entity involved or any combination thereof. One aspect of the invention comprises a computer-implemented system and method for a company to provide options on products wherein a computer-implemented service is operated that allows a customer to receive a conditional option for an upgrade and recording the information pertaining to said option in a data store. A computer-implemented system may upgrade the customer if at least one condition on said option is satisfied and the company receives the payment. The customer's acceptance of said option may confer upon the company a right to enforce a payment obligation on the customer if said customer receives upgrade and information pertaining to said upgrade is recorded in a data store. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention. The system may contain one or more data processors and these data processors may or may not be the same.

Another aspect of the invention comprises a computer-implemented system and method for a company to provide options on products wherein a computer-implemented service is operated to allow a company to sell at least one product that allows a customer to receive a conditional upgrade and information pertaining to said conditional upgrade is recorded in a data store wherein not separately identifying a price for the inclusion of said conditional upgrade within the total product price and operating a system, whereby a processor processes the information in the data store, and allows the company to upgrade the customer if at least one condition on said conditional upgrade is satisfied, and the company receives the payment for said upgrade. The customer's acceptance of said product confers upon the company the right to enforce said payment on the customer. The information pertaining to said upgrade is recorded in a data store. The system may contain one or more data processors and these data processors may or may not be the same. The Product Price may also include a price for an upgrade, which may be not separately identified within the total Product Price. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises a computer-implemented system and method for a company to provide options on products wherein a computer implemented system allows a customer to receive a conditional option for an upgrade wherein the customer is required to relinquish at least one right. The information pertaining to said option and relinquishment is recorded in a data store. A processor may process the information in the data store, and may allow the company to upgrade the customer if at least one condition on the opportunity is satisfied. On customer's acceptance of the opportunity, the computer implemented system may confer upon the company the right to enforce said relinquishment on the customer and record the information pertaining to said upgrade in a data store. The system may contain one or more data processors and these data processors may or may not be the same. Said relinquishment may include relinquishment of one or more rights. The customer may relinquish right for one or more products. The products may or may not be related to the products of the company. The rights may or may not be related to the rights conferred by the product. There may be a payment condition apart from relinquishment of said right. The company may present various rights and require the customers to pick a specified number of rights, thereby relinquishing other rights and in lieu of the relinquished rights, the customer may receive a conditional option for an upgrade. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises a computer-implemented system and method for a company to provide options on products, where in data is stored in a data structure for a customer who may be awarded one or more upgrades. Data may include a value assigned to each potential upgrade the company may realize if the customer receives said upgrade. A processor may be operated to receive and process said data to determine from among all or substantially all possible combinations of customers, a set of customers which may be awarded upgrades. Operating a system that may award upgrades to said set of customers and information pertaining to said upgrade of customers may be recorded in a data store. The system may contain one or more data processors and these data processors may or may not be the same. In one of implementations, at least one of the set of customers, which is upgraded, is from the combination of customers determined by said system. However, in different implementations, at least one of the set of customers which is upgraded is other than the combination of customers determined by said system. On detecting the occurrence of at least one event associated with potential generation of upgrade availability, the company may execute at least one event response algorithm which may determine at least a number or type of upgrade or upgrades available for a product, or both number and type, a subset of customers possessing conditional options making them eligible to receive an available upgrade to one or more products and may allocate upgrade offers among at least one of said set of customers to create product availability and recording the information pertaining to said upgrade offers in a data store. Said event may be an increase in the demand and/or forecasted demand of at least one product. Said set of customers may include at least one customer. The upgrade award may involve awarding upgrades to at least a second customer to at least one of the second products after at least a first customer from at least one of the second products is upgraded to at least one of the first product and such cascading process may continue until the last customer in the set is upgraded. Said cascading process may involve at least two customers. The customer may be upgraded to at least one or more products belonging to the company and/or another entity providing said option. Awarding upgrades may involve one or more interactions between the company providing said options and said group of customers. The upgrade award may also involve one or more interactions between an entity other than the company providing said options and said group of customers. The upgrade may be awarded at the instance of at least the company providing said options. However, in different implementations, the upgrade may be awarded at the instance of at least an entity other than the company providing said options. The upgrade award may include notifying the customer about said award within the specified notification period. The value may include cost savings for the company providing said options and/or for an entity other than the company providing said options or any combination thereof. The value may also include a soft value. The decision to upgrade one or more set of customers may be taken to optimize value for at least one of the customer, the company providing said options and/or an entity other than the company providing said options. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises a computer-implemented system and method to provide options on products wherein providing a data store including relevant information regarding products, operating a computer-implemented system that defines customer preferences regarding at least one upgrade ranking and recording the information pertaining to said preferences in a data store. A computer-implemented system is operated that enables the use of said preferences to upgrade at least one customer and to optimize value for at least one of customers, company and an entity other than said company. Information pertaining to said upgrade is recorded in a data store. The system may contain one or more data processors and these data processors may or may not be the same. The preferences may be utilized in delivering at least one option to a customer to get upgrade on up to n of m selected products, where n is less than m and operating a system to define each of said n Chosen Products, whereby after each of said n Chosen Products is defined by the company, the customer can utilize said Chosen Product and recording the information pertaining to at least one of said option or said defined products in a data store. The selected n products may be from more than one company. Delivery of said option may occur in relation to a customer purchasing at least one product. The delivery of option may include an electronic delivery of said option. Said m products may be from more than one company. The n products may be defined in at least one transaction. The n Chosen Products may include at least one product other than said m products. At least one of said m products may be released for reuse by the company. The released product may be utilized to generate revenue without reusing said released product. Said preferences may be used for assigning ranking between two or more products. The preferences may be defined implicitly. The preferences may be also be defined explicitly by either of the customer or the company or both. The preferences may be taken at any time during the purchase of the product, prior to and/or after the product has been purchased. The optimization of value may be for at least one customer other than the customers whose preferences are received. The optimization may also include concurrent optimization of value for at least two of the customers, said company and at least one entity other than said company. The preferences may be used for assigning ranking between different products. The ranking may be explicit and/or implicit. The ranking may also be based on already established or well known ranking or as per industry norms. The company and/or the customer may explicitly and/or implicitly assign ranking. The company may establish, in advance of making the upgrade award, a ranking of attributes applicable to the product and defining upgrade possibilities. The company may also establish, in advance of delivering the option, a list of attributes applicable to the product and may associate therewith rankings, expressed expressly or implicitly by the customer. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention relates to a system and method for implementation of UPO VOF in conjunction with other VOFs. The grouping may enhance customers' experience, and may comprise of operating a system that delivers a first option to at least a first customer to utilize up to n of m selected products for said first customer, where n is less than or equal to m; operating a system that delivers a second option to at least a second customer to utilize up to k of p selected products, where k is less than or equal to p; recording the information pertaining to said options in a data store; operating a system to define each of the k Chosen Products, whereby after each of the k Chosen Products is defined, said second customer can utilize said Chosen Product; operating a system wherein a company defines t Chosen Product(s) for said first customer after each of said k Chosen Product is defined, wherein after each of said t products is defined, said first customer can be upgraded to said defined product, where t is less than or equal to n. The information pertaining to said defined products as well as upgrade is recorded in a data store. The system may contain one or more data processors and these data processors may or may not be the same. In one implementation of the invention said company may include more than one entity. It is another aspect of the invention that the company may not be the seller of any of said products. In another implementation, the company may not be the seller of any of said options. In yet another implementation, the company may offer at least one of said options. In above invention, the company may operate at least one of said systems.

However, it is possible that at least one entity other than said company operates at least one of said systems. The systems for first and second options may operate independently. The systems for first and second options may also operate in conjunction with each other. The above mentioned acts may be performed for a multiplicity of at least one of said first or second customers and further includes combining together at least one of each of said first and second customers to formulate at least one group with at least one complementary set of options. After delivery of any of said first or second options, at least one of said m or p products may be available for use by the company. At least one of said m or p products may also be available for use by an entity other than said company. The company or an entity other than said company may define, at one or more times, at least one of said k Chosen Products. The second customer may also define, at one or more times, at least one of said k Chosen Products. The company or an entity other than said company may select, at one or more times, at least one of said m or p products. However, the first customer may select, one or more times, at least one of said m products and/or the second customer may select, one or more times, at least one of said p products. At least one of the company or an entity other than said company delivers to at least one of said first or second customers, at one or more times, one or more terms and conditions associated with the first or second options, respectively. In one of the implementations, the company may receive from at least one of the first or second customers, at one or more times, an indication of one or more terms and conditions associated with said first or second options, respectively. In another implementation, said first or second customers may be same. In yet another implementation, none of the options may include a notification deadline condition. However, in another implementation, at least one of said options may include at least one notification deadline condition. The notification deadline condition may be different for said first and second options. The company may allocate at least one product to at least one entity other than said company, and said entity delivers at least one of said first or second options on at least one of said allocated products. It is another aspect of the invention that at least one of said n or k Chosen Products may include at least one product other than said m or p products, respectively. No payment transaction may be executed between the company and any of said first or second customer in connection with the option and the selected products. In another implementation of the invention, however, at least one payment transaction may be executed between the company and at least one of said first or second customer and said payment transaction may include a soft value. In some implementations of the invention, at least one of said m or k products may be released for reuse by the company. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises a computer-implemented system and method for a company to provide a data store containing data representing, with respect to at least one product, at least one option offered by a company, and to operate a computer-implemented system that delivers to a customer an option to upgrade on up to n of m selected products, where n is less than m. A computer-implemented system is operated to define each of the n chosen products, whereby after each of the n chosen products is defined, the customer can be upgraded to said chosen product. The information pertaining to said defined products is recorded in a data store.

Yet another aspect of the invention comprises a computer-implemented system and method for a company to provide options on products, where in a computer-implemented service allows a customer to receive an option to utilize each of the m selected products, where m is greater than or equal to 2, including at least one practically constrained product, wherein said m products are selected in the course of related transaction(s) and it will not be possible for the customer to utilize all said m products due to said practical constraints. The information pertaining to said option is recorded in a data store. The practical constraints may include the timing constraints and/or the location constraints. The system may contain one or more data processors and these data processors may or may not be the same. The related transaction may be at least one transaction. The customer may not be able to utilize at least one product due to practical constraints. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another aspect of the invention comprises a computer-implemented system and method for a company to provide options on products where in a computer-implemented service allows a customer to receive an option to upgrade on up to n of m selected products, where m is greater than or equal to 2 and n is less than m and recording the information pertaining to said option in a data store. A computer-implemented system is operated, whereby the company may allow the customer to utilize all the m products provided specified conditions are satisfied which may include that the products are received in the course of related transaction(s), and there is at least one payment transaction between the company and the customer related to said products wherein such payment is made after said option has been granted. The information pertaining to said option and m products is recorded in a data store. The system may contain one or more data processors and these data processors may or may not be the same. The customer may select said m products together. The customer may also select the products prior to utilizing the penultimate product. The company may reserve the right to limit the customer to n products on a stated notification date. The customer may select said m products together. The payment transaction may comprise one or more transactions apart from the initial interaction if said customer utilizes all the awarded products. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

In the above mentioned different aspects of the invention and in other aspects of the invention not mentioned above, company may be a seller of at least said product. In another implementation of the UPO VOF, the company may not be a seller of said product. The system may contain one or more data processors and these data processors may or may not be the same. Delivering said option may occur in relation to a customer purchasing at least one product. In another aspect of the invention, the product purchase may be for a product other than a product for which an option is delivered. Delivering a said option may occur in relation to a customer purchasing at least one product other than the product for which an option is delivered. Said delivery of option may be an electronic delivery of option. After delivery of said option, at least one of said m products may be available for use by the company. At least one of said m products may be available for use by an entity other than said company. Said m products may be selected in at least one transaction. The company mentioned above may include more than one entity. The company may select at least one of said m products for the customer. In another aspect of the invention, at least one of said m products may be from more than one company. The n products (mentioned above) may be defined in at least one transaction and said n products may be defined after the option is delivered to the customer. The n Chosen Products may include at least one product other than said m products. Said m and/or n products may be redefined by the company, the customer, an entity other than the company and/or any combination thereof. Similarly, value of m and/or n may be redefined by the company, the customer, an entity other than the company and/or any combination thereof. In another implementation of the invention, at least one of said m products is released for reuse by the company. The Released Product may be utilized to generate revenue or other value without reusing said Released Product. The customer may purchase a set of conditional options which may be utilized for future needs. Said set may be a time based set and/or a value based set.

It is another aspect of the invention that in the system and method of this invention, at least one of the company or an entity other than said company may deliver to the customer, at one or more times, one or more terms and conditions associated with the option. Another aspect of the invention may include that the company may receive from the customer, at one or more times, an indication of one or more terms and conditions associated with the option. The company may define, at one or more times, one or more of the n Chosen Products. The customer may also define, at one or more times, one or more of the n Chosen Products. The company may identify to the customer at least one eligible product for the option and allows the customer to select at least one of said m products from the eligible products. The option may confer on the customer the right to enforce the upgrade, provided at least one condition on the option has been satisfied. The option may also confer on an entity other than said company the right to enforce the upgrade, provided at least one condition on the option has been satisfied. The customer may be given a choice of conditional options to choose, prior to the company delivering at least one conditional option to the customer. The company may present to a customer said option requiring the customer to indicate the price the customer will pay for the upgrade if offered.

It is another aspect of the invention, that the option may require the customer to accept the upgrade offer. In some implementations of the invention, at least one condition on option may be the availability of an upgrade. There may be at least one condition in addition to the availability of an upgrade. The upgrade may be an upgrade of at least one product. The upgrade may upgrade the customer upon availability to at least one Up Product. The upgrade may upgrade the customer, upon availability, to any of more than one Up Products. The customer may be upgraded at any time before or during the utilization of the product. One available Up Product may lead to more than one upgrade. At least one upgrade may re-assign a customer to a different product from an original product assignment to the customer. A standby customer may be assigned to a standby product as a Base-Product from which an upgrade is possible to a product having availability. A non-paying customer may be assigned to a non-revenue product as a Base-Product from which an upgrade is possible to another product having availability. The company may perform optimization for at least one category of freebie. However, in other implementations of the invention, the company may not perform optimization for any category of freebie.

At least one payment transaction may be executed between the company and the customer and said payment transaction may include a soft value. The payment may also include cost savings or other benefits to the company. The customer may also commit to pay the company for upgrade when the company awards an upgrade to the customer and such commitment may include pre-authorizing the company for said payment. The payment may include a payment at the time company delivers said option. The company may or may not exercise its right of enforcing the payment obligation upon the customer. The customer may become entitled to the option to get an upgrade by making a payment, at least in part, when purchasing said product. In one of the implementations, the option may not include a notification deadline condition. However, in different implementations of the UPO VOF, the option may include at least one notification deadline condition. If the customer, company, an entity other than said company and/or any combination thereof, fails to satisfy a stated notification deadline condition, at least one of said m products may be defined as the Chosen Product. The company may upgrade the customer without any subsequent interaction after delivering the option. However, in different implementations, the company may upgrade the customer after at least one subsequent interaction.

In one or more implementations of the UPO VOF, above said systems may be same and at least one company may operate at least one of said systems. The company may operate at least one of said systems. The customer may interact with the system via at least one web site and/or the customer may interact with the system assisted by at least one operator. The customer may also interact with another entity operating the system other than the company. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

It is another aspect of the invention that in the system and method of this invention, the company may allocate at least one product to at least one entity other than said company, and said entity delivers said option on at least one of said allocated products. In another case, the company may have allocated one or more products to another entity apart from said company, said entity may sell back at least one allocated product to said company or to at least one entity other than the company or both. The entity other than said company may deliver the option on at least one of said allocated products. The allocation of products may include at least one condition requiring return of one or more products.

A UPO VOF may be implemented in any industry, for example, let's consider an airline industry. In one of the implementations of the UPO VOF in the airline industry comprises a computer-implemented system and method for an airline to provide options on flights where in a computer-implemented service is operated that provides a data store containing data representing, with respect to at least one flight, at least one option offered by an airline and operating a computer-implemented system that delivers to a customer an option to get upgrade on up to n of m selected flights, where n is less than m. Information is recorded in a data store, pertaining to said option. In addition, a system is operated to define each of the n Chosen Flights, whereby after each of the n Chosen Flights is defined, the customer can get upgrade to said Chosen Flight. The information pertaining to said defined flights is recorded in a data store. The system may contain one or more data processors and these data processors may or may not be the same. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another example of the UPO VOF in the airline industry comprises a computer-implemented system and method for an airline to provide options on flights where in a computer-implemented service allows a customer to receive a conditional option for an upgrade and recording the information pertaining to said option in a data store. A computer-implemented service is operated that allows the airline to upgrade the customer if at least one condition on said option is satisfied and the airline receives payment for said upgrade. The customer's acceptance of said option may confer upon the airline a right to enforce said payment obligation on the customer if said customer receives upgrade and the information pertaining to said upgrade is recorded in a data store. The system may contain one or more data processors and these data processors may or may not be the same. The customers may be upgraded in one or more cabins and/or in one or more flights and both. There may be cross flight upgrades. The upgrade may include upgrade to a cabin in a different flight. The upgrade may include an upgrade to a non-stop flight. The upgrade may also be for a portion of the duration of a flight. Said upgrade may confer upon the customer a right to utilize additional services while remaining in the same flight cabin which were originally not included in the rights conferred to the customer. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Yet another example of the UPO VOF in the airline industry comprises a computer-implemented system and method for an airline to sell tickets where in a computer-implemented service may allow the airline to sell at least one designated fare class that allows a customer to receive a conditional upgrade and the information pertaining to said conditional upgrade is recorded in a data store wherein not separately identifying a price for the inclusion of said conditional upgrade within the total ticket price. A computer-implemented system is operated whereby a processor may process the information in the data store, and allows the airline to upgrade the customer if at least one condition on said conditional upgrade is satisfied and the airline receives the payment for said upgrade. The customer's acceptance of the ticket of said fare class may confer upon the airline the right to enforce said payment on the customer. The information pertaining to said upgrade is recorded in a data store. The system may contain one or more data processors and these data processors may or may not be the same. The designated fare class may be an existing fare class and/or may be a fare class newly created for this or other purposes. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

Another example of the implementation of UPO VOF in the airline industry is presented. This system and method may comprise of operating a system that delivers a first option to at least a "first customer" to utilize up to n of m selected flights for said first customer, where n is less than or equal to m; operating a system that delivers a second option to at least a "second customer" to utilize up to k of p selected flights, where k is less than or equal to p; recording the information pertaining to said options in a data store; operating a system to define each of the k Chosen Flights, whereby after each of the k Chosen Flights is defined, said "second customer" can utilize said Chosen Flight; operating a system wherein an airline defines t Chosen Flight(s) for said "first customer" after each of said k Chosen Flights is defined, wherein after each of said t flights is defined, said first customer can be upgraded to said defined flight, where t is less than or equal to n and recording the information pertaining to said defined flights and upgraded flights in a data store. The system may contain one or more data processors and these data processors may or may not be the same. While an aspect of the invention may only be discussed in the context of a method or of a system, it should be understood that for any method aspect, it is intended the reader will appreciate that a corresponding system implementation will exist and is implied. Likewise, if an aspect of the invention is discussed in the context of a system implementation, it should be clear that the system is carrying out a method which also constitutes a corresponding aspect of the invention.

One aspect of the invention consists of a computer-implemented system to provide options on products, that comprises of a data store containing data representing, with respect to at least one product, at least one option offered by a company, a server with which a customer may interact for at least said option, a server that is being adapted to receive inputs for at least said option and to search the data store for eligibility of products for at least said option, at least one output device to output from the server the search results, a server that is being adapted to receive at least one decision of the customer about the acceptance of at least one of said search results and an event optimizer system receiving data at least pertaining to said acceptance, and in response to the occurrence of at least one disruption event selected from a set of at least one potential events, executing a corresponding event response algorithm, wherein at least one of the servers or the event optimizer system concurrently optimizes a value for at least two entities.

Another aspect of the invention consists of a computer-implemented method to provide options on products that comprises of providing a data store containing data representing, with respect to at least one product, at least one option offered by a company, operating a server with which a customer may interact for at least said option, operating a server to receive inputs for at least said option and to search the data store for eligibility of products for at least said option, displaying the search results, receiving at least one decision of the customer about the acceptance of at least one of said search results and operating an event optimizer system to receive data at least pertaining to said acceptance, and in response to the occurrence of at least one disruption event selected from a set of at least one potential events, execute a corresponding event response algorithm, wherein at least one of the servers or the event optimizer system concurrently optimizes a value for at least two entities. It is another aspect of the invention that the company mentioned above may include more than one entity. The company may be a seller of at least said product. However, in another implementation of the invention, the company may not be a seller of said product. The company may operate at least one of said servers or the system. In yet another implementation, an entity other than company may also operate at least one of said servers or the system. It is an aspect of the invention wherein said optimization may be performed for at least said company and customer. In an implementation of the invention said optimization may be performed for at least one of said company and customer involved in said transaction and another entity. The said interaction may include a transaction with respect to at least one product. The said data pertaining to at least one of demand, preferences and associated relative utilities of the customer may be defined, implicitly or explicitly, at least during said interaction. In yet another implementation, said data pertaining to at least said company and customer may be integrated by at least one of the servers or the system to concurrently optimize value for at least two entities. It is another aspect of the invention that said search may include searching for at least one product or option based on said inputs. However, in another implementation, said search identifies results at least after taking into account business economics of at least the company offering said product or option. In yet another implementation, said search results may include at least one option or product. In another implementation said search results may include a product which includes an option and for which a price for the inclusion of said option is not separately identifiable within the total product price. It is an aspect of the invention that in said method no payment transaction is executed. However, in another implementation, in said method at least one payment transaction may be executed during said transaction. In one implementation, said payment transaction may include a soft value. In another implementation, said option may be related to a product other than the product obtained by the customer. It is an aspect of the invention that said transaction may include more than one transaction.

It is another aspect of the invention that includes a computer-implemented method to provide options on products that may comprise of delivering at least one option relating to one or more optional services the customer may purchase and providing one or more conditions and benefits to the airline and to the customer upon the occurrence of one or more predetermined option-related contingent events, the airline interacting with the customer to offer at least said option and obtain customer purchase decisions for said offered option, and monitoring for post-sale occurrence of said option-related events and upon noting the occurrence of such an event, automatically fulfilling the conditions of any related option purchased by the customer. In another aspect of the invention, in said method at least one value option framework may be created by collecting data on customer preferences and then assigning prices based on airline business factors. In another implementation, the price of an option may be assigned when the option is offered to the customer.

In yet another implementation, offering the value options may include selectively offering value options after taking into account airline business conditions. Another aspect may include wherein said option may offer a customer multiple options from which to select for personalized in the event of a disruption.

It is another aspect of the invention that includes a computer-implemented method to provide options on products that may comprise of a data store containing data representing, with respect to a product offering by a company, at least one option for said product offering, each said option including a listing of one or more optional components of said product offering and a price for each said component, operating a system enabling interaction with the customer to selectively present each of said options to the customer and to receive decisions of the customer about said components of presented options, operating a system whereby an event optimizer module receiving operational data pertaining to the operation of said company, and having access to a plurality of event response algorithms, and operating a processor which, in response to the occurrence of at least one event selected from a group of predetermined potential events, executes a corresponding event response algorithm in accordance with the customer's selection of optional components and operational data of company, to optimize together values of both entities. In another implementation, one may only select those options that satisfy preferences expressed by the customer and further includes, selecting only those options that satisfy utilities expressed by the customer.

In all the cases and aspects of the invention mentioned herein, the company may be, for example, an airline, a hotel, a car rental company, travel company and the product may, for example, correspond to a flight (and/or cabin), a room, a Car and a Travel Package, respectively. The UPO VOF may be implemented in any industry including, but not limited to, the airline, hotel, car rental, travel, media entertainment, cruise, real estate, financial services, automobile sales, computer and other retail sales. Another aspect of the invention is that one or more aspects or elements or examples mentioned herein of the invention may be combined in one or more ways to utilize the invention.

Also shown are a number of novel systems generated by the disclosed methodology, and related algorithms which may be implemented on the disclosed platform or any other suitable platform, thus constituting new methods and systems. Only a few value option frameworks (VOFs) and their associated methods and systems for delivery of these VOFs are presented in detail, as those skilled in the art will readily appreciate how to implement other VOFs from these teachings. Other features and advantages of the invention will be apparent from the following description and the appended claims, and those skilled in the art will appreciate that the various elements and limitations shown herein may be combined in ways other than those shown in the specifically illustrated examples, which are not intended to be limiting. The disclosure is intended to convey that the inventors contemplate and intend to protect these various combinations and permutations of the elements which are shown, as though each of the arrangements of elements were specifically depicted.

BRIEF DESCRIPTION OF THE DRAWING

FIG. 13D is a diagrammatic illustration of implementation of one of the stages of a value option framework as a system;

FIG. 37 is a diagrammatic representation of different UFO instances that may be created in case of three flights;

FIGS. 40, 41, 42 and 43 are simulated screen shots of web screens illustrating how the Initial Transaction for UFO may take place between an airline and a customer;

FIG. 57 is a diagrammatic representation of different UTO instances that may be created for a flight with three cabins;

FIGS. 60, 61 and 62 are simulated screen shots of web screens illustrating how the Initial Transaction for UTO may take place between an airline and a customer;

FIGS. 70, 71 and 72 are diagrammatic illustrations of a practical example of the UTO Exercise process in UTO VOF implementation, displaying the inputs to the process and types of upgrade combinations in FIG. 70, the generated Upgrade List in FIG. 71 and list of Upgrade Awards in FIG. 72;

FIG. 77 is a diagrammatic representation of different URO instances that may be created for with three different rooms;

FIGS. 80, 81 and 82 are simulated screen shots of web screens illustrating how the Initial Transaction for URO may take place between a hotel and a customer;

FIGS. 90, 91 and 92 are diagrammatic illustrations of a practical example of the URO Exercise process in URO VOF implementation, displaying the inputs to the process and types of upgrade combinations in FIG. 90, the generated Upgrade List in FIG. 91 and list of Upgrade Awards in FIG. 92;

FIG. 103 is a diagrammatic illustration showing creation of a value option framework indicating cost, revenue, utility and service functions relating to the STS VOF;

FIG. 104 is a simulated screen shot of web screen illustrating how the Initial Transaction for STS VOF may take place between an airline and a customer.

DETAILED DESCRIPTION

Figure 1:
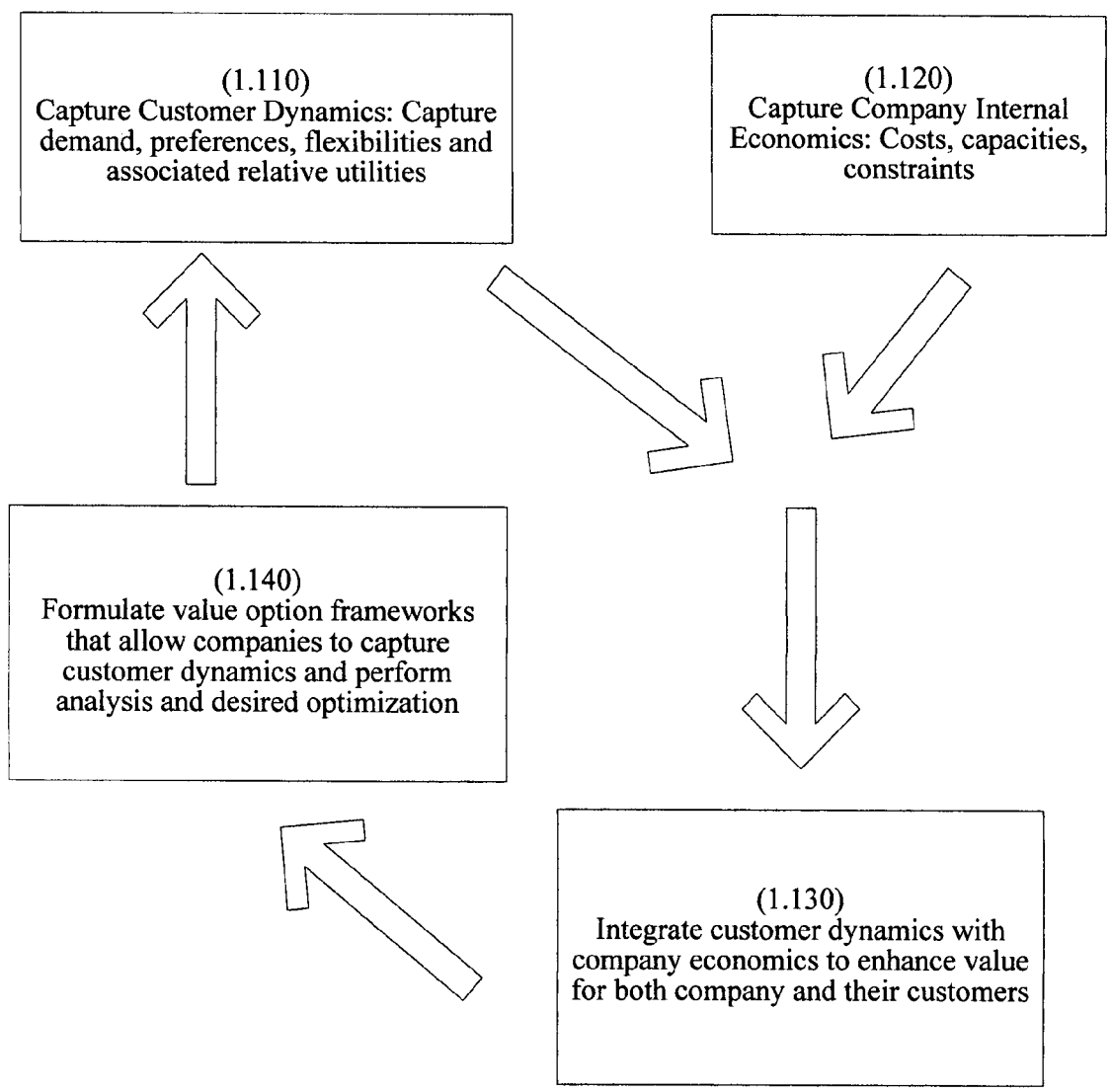
FIG. 1 is a diagrammatic illustration, in a high-level flow chart, of a method of achieving the optionally customized sale of goods or services as taught herein.

Selected illustrative embodiments according to the invention will now be described in detail, as the inventive concepts are further amplified and explicated. These embodiments are presented by way of example only. In the following description, numerous specific details are set forth in order to provide enough context to convey a thorough understanding of the invention and of these embodiments. It will be apparent, however, to one skilled in the art, that the invention may be practiced without some or all of these specific details. In other instances, well-known features and/or process steps have not been described in detail in order to not unnecessarily obscure the invention. One should not confuse the invention with the examples used to illustrate and explain the invention. The features and advantages of the invention may be better understood with reference to the drawings and discussions that follow.

The terms and definitions given below are needed to understand the following sections. Some of the key terms used in the description have been put in italics to enhance the readability.

The method and system taught herein connect customers directly to a manufacturer or service provider and the rest of the supply chain, herein referred to as "channel partners." The term "manufacturer" is intended to include vendors of services as well as vendor of goods. Hereafter, the manufacturer and channel partners will be collectively referred to as a "company" or "companies" and all of those terms will be appreciated to include sole proprietorships, partnerships, corporations, option aggregators or any other legal entity or combination thereof. The term company may include more than one entity. The term "entity" includes the singular and plural and will include individual(s), group of individuals, company, companies, sole proprietorships, partnerships, corporations or any other legal entity or combination or consortium thereof.

The term "Option Aggregator" or "Option Aggregators" or "OA" may include, but is not limited to, a company, a group and/or consortium of companies, more than one entity, any entity formed by company(s) (whether or not solely for this purpose), any other entity or any combination thereof that offers options on its own products and/or other company products.

The term "airline" or "airlines" includes, but is not limited to, an airline, an airline's business partner, an entity which deals with an airline or an airline's business partner, a travel agent, an Option Aggregator and any entity forming a part of the chain of commerce related to airline and/or travel industry, or any combination of any two or more of the above.

The term "hotel" or "hotels" includes, but is not limited to, hotel, apartment hotel, bed and breakfast, capsule hotel, caravanserai, casa particular, flophouse, choultry, garden hotels, condo-hotel, holiday cottage, hostel, ice hotel, trailer home, roadhouse, ryokan, turbaza, boarding house, bungalow, condominium, dharamshalas, dormitory, inn, resorts, a group or chain of hotels, a hotel's business partner, an entity which deals with a hotel or a hotel's business partner, a travel agent, an Option Aggregator, any entity forming a part of the chain of commerce related to hotel and/or travel industry, or any combination of any two or more of the above. A hotel may be referred to as an entity that provides space for hire.

The term "car rental company" or "car rental companies" includes, but is not limited to, a car rental company, a group of car rental companies, a car rental company's business partner, an entity which deals with a car rental company or a car rental company's business partner, a travel agent, an Option Aggregator, any entity forming a part of the chain of commerce related to car rental industry and/or travel industry, or any combination of any two or more of the above.

The term "travel company" or "travel companies" includes, but is not limited to, any entity forming a part of the chain of commerce related to the travel industry, a company, a group of companies, a travel company's business partner, an entity which deals with a travel company or a travel company's business partner, a travel agent, an Option Aggregator, or any combination of any two or more of the above.

The term "Product" refers to a product or service provided by a manufacturer or an entity. The term "Products" or "Product" may also refer to "Product Set" or "Product Sets" or "Product Order" or "Product Orders" or any combination thereof, as and when the context requires and are used interchangeably. The term "customer" here implies an entity buying or entering into a contract to buy a company's product or service. The term "optimize" is not intended to require achievement of a mathematical minimum or maximum, but to refer to improvement and/or enhancement.

The term "flight" refers to a single flight, a group of flights, flights with zero or more stops or any combination of the above. The term "Flights" or "Flight" may also sometime refer to one or more seats on said flight(s), when the context requires. The terms "flight" and "seat" are interchangeable as the context requires. The term "Flight" or "Flights" may also refer to a Flight Leg, a Flight Segment, an Itinerary, any combination of two or more flights or any combination of the above, when the context requires. The term "cabin" refers to a compartment or a section in an airplane (or similar travel medium, such as a train) with its specific seating arrangement and/or in-flight amenities that are offered to customers while traveling in that cabin.

The term "Room" or "Rooms" in context of the hotel industry refers to a single room, a room with zero or more facilities and/or services, only facilities or services offered by the hotel. A room may be referred to as a given space for a given duration of time and for a given set of one or more associated services or characteristics or any combination thereof. In the context of the hotel industry, the term "Room" and "seat" are interchangeable, as and when the context requires. For example, one may refer to a reserved seat for a show in a hotel as a reserved room.

The term "Car" or "Cars" refers to any means of transportation including, but not limited to, cars, vans, mini-vans, buses, trucks, trailers, pick-up trucks, scooters, motor cycles, bikes, trains, trams, boats, ships, steamers, jets, helicopters and so on, any variation or model of said means of transportation and/or services, equipments associated with it or any combination(s) thereof, for a given time unit.

The term "Travel Package" or "Travel Packages" or "Package" or "Packages" refers to combination of one or more services related to travel including, but not limited to, transportation, accommodation, various facilities and so forth. Transportation may include, but is not limited to, travel by flight, train, bus, car, cruise, boat, steamer and so forth. "Accommodation" may include, but is not limited to, stay in hotel or any location and services associated with it. Said "various facilities" may include, but are not limited to, sight seeing, city tours, river-rafting, mountaineering, para-gliding, food and so forth.

The term "Itinerary" refers to a list of flights included in a single travel trip of a customer. An Itinerary may comprise one or more "Segments" (defined below). An Itinerary can be a one-way trip (one Segment), a round-trip (two Segments) or a multi-city trip (two or more Segments). A round-trip Itinerary has two Segments back and forth between two places (e.g., a trip from A to B and then back from B to A). A One-Way Itinerary has only one Segment (such as travel from A to B). A Multi-City Itinerary refers to an Itinerary with two or more Segments across two or more places (e.g., a trip from A to B and then from B to C).

The term "Flight Segment" (or "Segment", in short) refers to a part of an Itinerary between a customer's intended origin and destination. A Segment may comprise one or more "Flight Legs". The term "Flight Leg" (or "Leg", in short) is the most fundamental unit of an Itinerary and is defined by a single takeoff and landing of a flight. In a round-trip Itinerary (A to B and B to A), there may be 2 Flight Legs from A to B (customer flies from A to C and then C to B, two connecting flights), and similarly two Flight Legs from B to A (customer flies from B to D and then D to A, two connecting flights). When a customer flies from A to B and the plane takes a stop in between at C, it is still considered to be two Flight Legs (A- to -C and C- to -B) even though the customer may/may not change planes between A and B and/or an airline may or may not use the same flight number to refer to the entire Segment from A to B.

The term "Product Price" of a Product (in reference to one or more VOFs) refers to the price a company would charge for a Product in the absence of implementation of said VOFs on said product. In the context of the airline industry, the term "Ticket Price" (in reference to one or more VOFs) refers to the price that an airline would charge in the absence of implementation of said VOFs on said flight. In the context of the hotel industry, the term "Room Price" of a room (in reference to one or more VOFs) refers to the price that a hotel would charge for a room in the absence of implementation of said VOFs on said room. In the context of the car rental industry, the term "Car Rental Price" of a car (in reference to one or more VOFs) refers to the price that a car rental company would charge for a car in the absence of implementation of said VOFs on said car. In the context of travel industry, term "Travel Package Price" of a Travel Package (in reference to one or more VOFs) refers to the price that a travel company would charge for a Travel Package in the absence of implementation of said VOFs on said Travel Package.

The term "transaction" here implies to do, to carry or to conduct an agreement or exchange. The exchange may or may not involve a price in terms of monetary or non-monetary value from customer side. The parties participating in the transaction may have obligation(s) from various terms and conditions. In other words, transaction may also imply an action or activity involving two or more parties that reciprocally affect or influence each other.

In the context of an airline industry, the term "schedule" refers to the characteristics of a flight including, but not limited to, airline related parameters, departure/arrival parameters, service and other miscellaneous parameters. The airline related parameters may include, but are not limited to, operating carrier entity (i.e, the airline that operates the flight), marketing carrier (an airline that sells the flight), any other carrier or intra/inter-carrier flight groups associated with the flight or any combination of the above. The departure/arrival parameters may include, but are not limited to, an airport and its location (city, state, country), date and time, seasonality, weather and other operational conditions, number of stops/connections, and so forth. The service and other miscellaneous parameters may include, but are not limited to, type of aircraft, flight duration, in-flight or other services such as number of cabins, types of seats, meal selection, check-in and luggage options, airport lounges and other facilities, and so forth.

The term "schedule", in the context of car rental industry, refers to the characteristics of a car including, but not limited to, car rental company related parameters, pick-up/drop-off times, service and other miscellaneous parameters. The car rental company related parameters may include, but are not limited to, operating car rental company entity (i.e. the car rental company that operates the car), owner of the car, marketing car rental company (a car rental company that rents out the car), any other car rental company or intra/inter-car rental company groups associated with the car rental or any combination of the above. The pick-up/drop-off parameters may include, but are not limited to, a pick-up/drop-off location (area or street, landmark, city, state, country), date and time, seasonality and other operational conditions, and so forth. The service and other miscellaneous parameters may include, but are not limited to, type of car, car rental duration, or other services, car rental company services such as insurance, additional driver, child seats, and other equipments, and so forth.

The term "schedule", in context of a travel package refers to the characteristics of a travel package including, but not limited to, travel company related parameters, start/end date time, service and other miscellaneous parameters including travel company related parameters. The travel company related parameters may include, but are not limited to, operating travel company (i.e. the travel company that operates the package), marketing travel company (a travel company that sells the travel package), any other travel company or intra/inter-travel company groups associated with the package or any combination of the above. The start/end parameters may include, but are not limited to, a destination location (area or street, landmark, city, state, country), date and time, seasonality, weather and other operational conditions, and so forth. The service and other miscellaneous parameters may include, but are not limited to, type of flight, car, room, cruise, or other services, travel company services such as insurance, flight services, car special equipments, hotel services, cruise services, other facilities, and so forth.

The term "related transactions" here refers to one or more transactions that are related to each other. In a VOF, the successful interaction between the participants may happen through a number of transactions in sequence, where each of the transactions in the sequence may (or may not) depend upon the outcome of the previous transaction, and this may create a chain of "related transactions". However, at least one transaction in a set of related transactions must be related to all the other transactions. The connection or reference between the transactions may be direct or indirect and/or implicit or explicit. The related transactions may be contingent to each other or rely or require the aid of the other to support. The transactions may be fully and/or partly related to each other to be construed as related transactions. For example, the price of a transaction may be modified if the customer has already bought a product in a previous transaction, which makes the two transaction related to each other. In another example, the customer is given availability in a flight since he or she has already purchased a ticket in another flight; which makes both the transactions related to each other. For the transactions to be called as related transactions, some dependency and/or nexus between the transactions has to be established. The transactions may become related transaction in one or more transactions. Related transaction may include, but is not limited to, a transaction with monetary value, a transaction without monetary value and so forth.

The term "default" here implies a situation or condition that turns up in the absence of active intervention from the users in a contract. In such situation, a particular setting or value (termed "Default Settings" or "Default Value") for one/ more exchange variables is/are assigned automatically. These Default Settings/Default Values remain in effect unless intervened.

The term "payment" here implies the act of paying or the state of being paid. The term "payment" here implies an amount of money or any other consideration paid at a given time or which has been received in the past but for which the benefit of the same is realized now, may be in part or in totality. "Payment" may also refer to a transfer of something of value to compensate for products or services that have been, or will be, received. Payment may be made in cash, on credit or any other consideration. The payment may have monetary or non-monetary (soft) value. The payment can be from company and/or any other entity to customer or from customer to company and/or any other entity or both.

The term "significant period of time" here implies a time period that is large enough with respect to the total utility time for the customer that it may affect the behavior of a transaction.

The term "anytime" or "any other time" here refers to any point of time that lies between a time period starting from the initial interaction of a customer with an airline (for any ticket purchase or any other event) for a particular journey and ending when said customer completes said journey and/or any other journey related to said journey.

The term "selected" or "select" or "selects" refers to, without limitation, selecting, selecting and purchasing, purchasing, defining, choosing, expressing a preference or any combination thereof. The term "receiving" or "receives" here refers to, without limitation, purchasing, utilizing, receiving for free, receiving without requirement of a physical delivery or any combination thereof. In some situations, said terms (related to "select") may also refer to, without limitation, receiving, purchasing or any combination thereof (including any grammatical forms of these terms such as noun, adjective, verb etc.). Said terms (related to "select") are used interchangeably as and when the context requires.

The phrase "selecting a Product" for option purposes includes selecting one or more products within the same or a different product level (or a section or compartment) within the same product category. In context of the hotel industry, the phrase "selecting a Room" for option purposes includes, but not limited to, selecting one or more rooms within the same or a different hotel or any combination thereof. In the context of a car rental company, the phrase "selecting a Car" or "renting a Car" or "purchasing a Car" for option purposes includes, but not limited to, selecting one or more cars or car types or equipments associated with the car from the same or a different car rental company or any combination thereof. In context of travel industry, the phrase "selecting a Travel Package" for option purposes includes, but not limited to, selecting one or more travel packages within the same or a different travel company or any combination thereof.

The terms "Set" and "Product Set" refers to a collection of Products and are used interchangeably. A Set may have one or more Products. In the airline industry context, a Flight Segment is equivalent to a Set and each Leg within a Segment is equivalent to a Product. A Segment may comprise one or more Flight Legs (Products). In the hotel industry context, a Room Set is equivalent to a Set and each Room Product within a Room Set is equivalent to a Product. A Room Set may comprise one or more Room Products. In context of car rental industry, a Car Set is equivalent to a Set and each Car Product within a Car Set is equivalent to a Car Product. A Car Set may comprise one or more Car Products. In context of travel industry, a Travel Package Set is equivalent to a Set and each Travel Package Product within a Travel Package Set is equivalent to a Product. A Travel Package Set may comprise one or more Travel Package Products. A company may (or may not) impose a restriction that all the Products of a Set must be used together unless a change is made to the Order (described later).

The term "Order" may comprise one or more Sets, where each Set may comprise one or more Products. In the context of the airline industry, an Itinerary is equivalent to an Order. In context of hotel industry, a Room Order is equivalent to an Order. In context of car rental industry, a Car Order is equivalent to an Order. In context of travel industry, a Travel Package Order is equivalent to an Order.

The term "Initial Product Set" (or IPS, in short) refers to a Set purchased by a customer. For example, in the airline industry context, the term Initial Flight Segment (defined below) is equivalent to IPS. The term "Initial Flight Segment" (or IFS, in short) refers to a flight Segment purchased by a customer. For example, consider an itinerary with two Segments, A to B and B to A. Each of the two segments is referred to as IFS. In context of hotel industry, "Initial Room Set" is equivalent to IPS. The term "Initial Room Set" (or IRS, in short) refers to a Room Set purchased by a customer. In context of car rental industry, "Initial Car Set" is equivalent to IPS. The term "Initial Car Set" (or ICS, in short) refers to a Car Set purchased by a customer. In context of travel industry, "Initial Travel Package Set" is equivalent to IPS. The term "Initial Travel Package Set" (or ITS, in short) refers to a Travel Package Set purchased by a customer.

The term "Option Product Set" (or OPS, in short) refers to a Set received by the customer as part of a UPO. In the airline industry context, OFS is equivalent to OPS. The term "Option Flight Segment" (or OFS, in short) refers to a flight Segment selected as part of a UFO (and/or UTO) option on a given IFS in the context of the airline industry. There can be one or more OFS for a specific IFS. The term "Option Room Set" (or ORS, in short) refers to a Room Set selected as part of a URO option on a given IRS in the context of the hotel industry. There can be one or more ORS for a specific IRS. The term "Option Car Set" (or OCS, in short) refers to a Car Set selected as part of a UCO option on a given ICS in the context of the car rental industry. There can be one or more OCS for a specific ICS. The term "Option Travel Package Set" (or OTS, in short) refers to a Travel Package Set selected as part of a UTPO option on a given ITS in the context of the travel industry. There can be one or more OTS for a specific ITS.

The term "U" refers to a type of customer who has received a UPO. In the context of UPO VOF, the term "N" refers to the type of customer who has not received a UPO. N also refers to those U customers for whom UPO has been exercised completely. The term "U Status" refers to the status of a U customer in a given IPS or OPSs. U status are of two types: Accounted (Ua) and Awaiting (Uw).

When a U customer is counted as holding (or using or blocking) a unit of capacity of a Product in a Set (IPS or OPS), his/her status is called Accounted with respect to each of the Products in that Set. The corresponding Set is termed 'Accounted_Set' for the U customer, who is having a status of Ua with respect to that Accounted_Set and Products included in this Set.

When a U customer is not counted as holding (or using or blocking) a unit of capacity of the Products in a Set (IPS or OPS), his/her status is called Awaiting with respect to that Set and each of the Products in the set. The corresponding Set is termed Awaiting_Set for the U customer and the customer is Uw with respect to that Awaiting_Set and Products included in this Set. At any given time, a customer may (or may not) be accounted to only one Set and is awaiting in the rest of the related Sets.

The term "AC" refers the available capacity of a Product and is defined as: AC=C−N, where N is defined as the sum of N type of customers.

The term "EAC" refers to the effective available capacity of a Product and is defined as: EAC=AC−UA, where UA is the number of customers who are of Ua status in that Product.

The term "Upgrade_U" refers to a recursive algorithm for which the necessary parameters are defined as follows: input parameters: Collection of ParentU (or COPU, in short), Collection of Parent Product (or COPP, in short), Caller_U, Initiator_Product, Initiator_U, Benefit; and output parameters: a U_Series collection. Definition of all the parameters are given below.

The term "Collection of ParentU" (or COPU, in short) refers to a collection of Ua customers for which the Upgrade_U algorithm has already been called within a cascade of Upgrade_U calls. The corresponding customer is referred to as ParentU.

The term "Collection of Parent Product" (or COPP, in short) refers to a collection of Products for which the Upgrade_U algorithm has already been called within a cascade of Upgrade_U calls to generate Capacity. The corresponding Product is called Parent Product.

The term "Caller_U" refers to the Ua customer, which is to be upgraded from its Accounted_Set to Awaiting_Set by calling the Upgrade_U algorithm.

The term "Initiator_Product" refers to the Product from which Caller_U is to be upgraded by using the Upgrade_U algorithm to generate capacity.

The term "Initiator_U" refers to a customer whose wants to capture a unit of capacity of the Initiator_Product, and thus, derives the need to create its capacity by using the Upgrade_U algorithm to upgrade the Caller_U from the Initiator_Product.

The term "Benefit" refers to a benefit that the company may realize by creating capacity in Initiator_Product.

The term "ChildU" refers to a U customer who was upgraded in the cascading route of Upgrade_U calls. A ChildU element comprises the following entities: Collection of Initiator, Initial_Accounted_Set, Final_Accounted_Set and Cost of ChildU.

The term "Collection of Initiator" (or COI, in short) refers to a collection of one or more members, where each member in the collection comprises the following: Initiator_Product and Initiator_U, where said Initiator_U derives a need to create capacity in said Initiator_Product.

The term "Initial_Accounted_Set" refers to the Set where the ChildU is accounted before he or she is upgraded in the Upgrade_U process.

The term "Final_Accounted_Set" refers to the Set where the ChildU is accounted after being upgraded by the Upgrade_U algorithm from the Initial_Accounted_Set.

The term "Cost of ChildU" (or CCU, in short) refers to the cost to upgrade the current ChildU from its Initial_Accounted_Set to the Final_Accounted_Set. The cost may be a cost to the company, customer, another entity and/or any combination thereof.

The term "Series_Element" refers to a feasible route generated when Upgrade_U is called to upgrade a Caller_U from its Accounted_Set to its Awaiting_Set. A Series_Element comprises the following entities: Collection of ChildU (COCU), Collection of End_Product (COEP); and Cost of the Series_Element (CSE).

The term "Qualify_Series_Element Rule" refers to a rule that helps to determine one or more valid and/or qualified Series_Elements from a given set of Series_Elements.

The term "Optimal_Series_Element Rule" refers to a rule that helps to determine one or more optimal (for e.g., most beneficial, or best/better suited) Series_Elements from a given set of Series_Elements.

The term "Collection of ChildU" (or COCU, in short) refers to a collection of all ChildU, which have been upgraded by Upgrade_U algorithm within a Series_Element.

The term "End_Product" refers to a Product with enough units of EAC to accommodate a Caller_U. The cascading route of Upgrade_U reaches one end when it approaches an End_Product. An End_Product comprises AC and Collection of Ua (or COUA, in short). COUA includes all the Ua that are accounted in the End_Product (includes existing Ua and ChildU that are upgraded to End_Product).

The term "Collection of End_Product" (or COEP, in short) refers to a collection of all the End_Products involved within a Series_Element The term "Cost of the Series_Element" (or CSE, in short) refers to the total of CCU of all the ChildU associated with a Series_Element.

The term "Series" refers to a collection of the Series_Elements. The term "U_Series" refers to a collection of the Series_Elements, which is returned as output by the Upgrade_U algorithm. The term "P_Series" refers to a collection of the Series_Elements at the Product level. A P_Series collection is obtained from the U_Series collections of all Ua in the Product. The term "S_Series" refers to a collection of the Series_Elements at the Set level.

As used herein, the term "processor" includes, without limitation, any one or more devices for processing information. Specifically, a processor may include a distributed processing mechanism. Without limitation, a processor may include hardware, software, or combinations thereof; general purpose digital computing elements and special purpose digital computing elements and likewise included. A single processor may perform numerous functions and may be considered a separate processor when implementing each function. The terms "database" and "data store" may have been used interchangeably as and when the context requires and both may refer to any form of storing the data, including but not limited to, storing the data in a structured form, storing the data in an unstructured form and so forth.

General Method Description: Kernel

Referring now to FIG. 1, there is shown a high-level flowchart style diagram of a method to achieve the optimally customized sale of products or services to "close the gap." It involves the following steps or acts: In Act 1.110, certain inputs are captured, including customer dynamics and important value segments, their demand, preferences, flexibilities and associated relative utilities. Company economics and important economic factors such as, for example, costs, capacities and constraints are captured in Act 1.120. The customer information from Act 1.110 and the company economics from Act 1.120 are then in Act 1.130, "integrated" in a way that will permit optimization of value for both the company (e.g., its profitability) and customers (e.g., their individual and collective purchase utilities). In Act 1.140, value options are formulated that permit the capturing of individual customer preferences in way that can be used in the optimal customization of the sale process illustrated. These same steps can be used in one or more permutations or combinations or iteratively.

At a high level, the system is operated and the method of FIG. 1 is executed to (1) to dynamically interact with the customers to determine detailed customer demand for the product and options, (2) receive a real-time assessment of company economics, i.e., capacities, constraints, and costs, (3) optimize across demands and preferences of all customers, and company economics, and (4) formulate value options for customers.

To take advantage of this system, a company has to obtain information about customer demand and preferences before (and/or during) a purchase, in a structured manner that can be easily understood and translated into satisfaction for customers and also can be used to optimize internal operations for companies. This data can then be integrated with the company's internal resources and capacities to enhance and improve its operations. A company can "optimally customize" its products and processes to enhance the value for customers, while simultaneously maximizing its business profitability. Customers also benefit from the fact that they spend less time researching products, can be assured that their priorities are known in case of change or contingency events occurring, can enhance their purchased products/services and get more perceived value for their purchase price.

Figure 2:
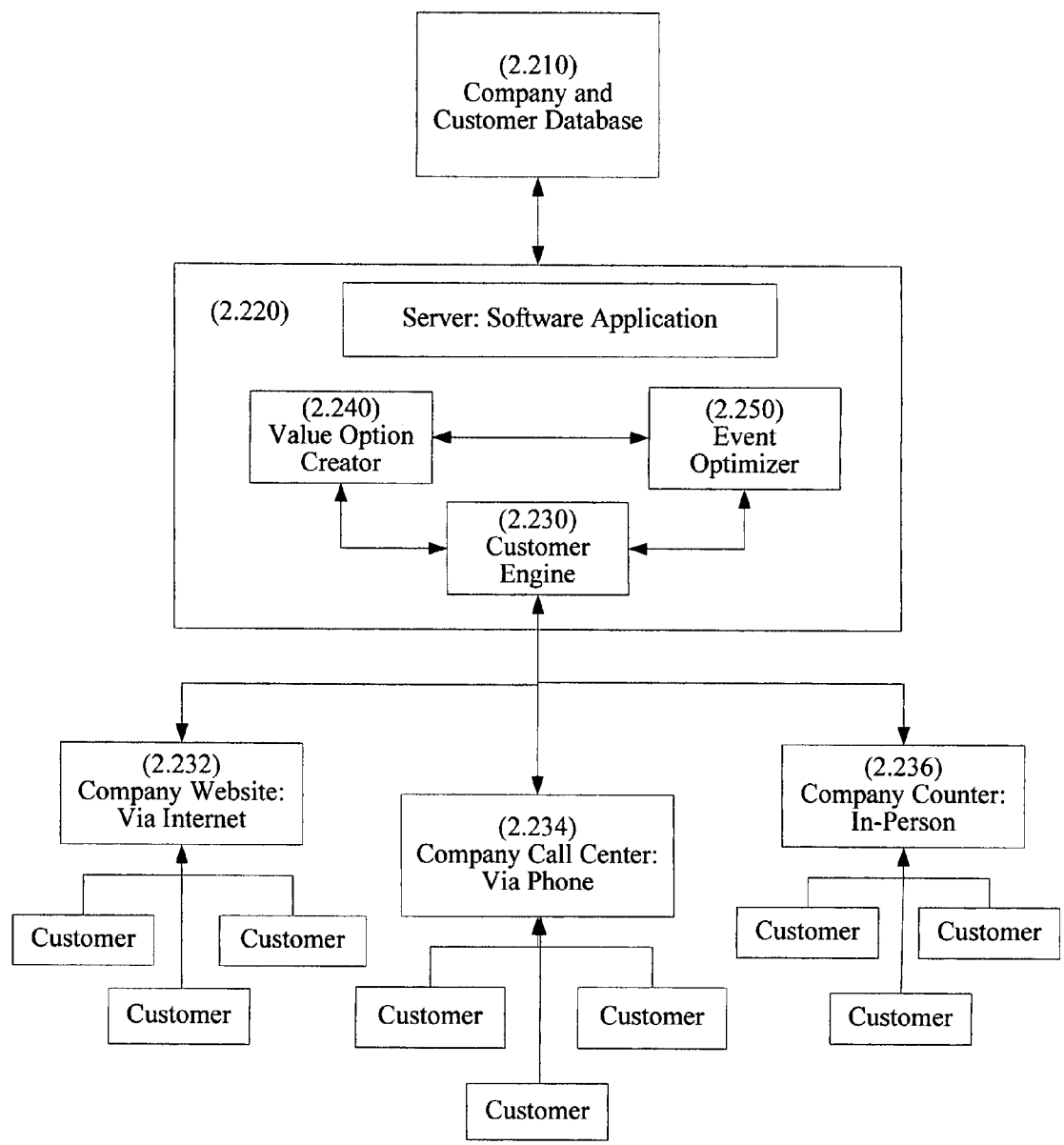
FIG. 2 is a block diagram of a system as taught herein for practicing the discussed method.

At a high level, a block diagram of a typical system for implementing this methodology is shown in FIG. 2. The data for driving the system, from both the customer side and the company side, is stored in a database shown in Box 2.210 (or multiple data stores or databases), which may be of any suitable database design and may be a commercially available database product configured for this application. The "heart" of the system is a platform, typically one or more servers, shown in Box 2.220, which provides the processing capability to implement three modules, shown in Boxes 2.230, 2.240 and 2.250. The Customer Engine module (shown in Box 2.230) controls the interfacing with the customer via whatever media are selected by the company. For example, the company may use one or more of a web site (shown in Box 2.232), a call center (shown in Box 2.234) and/or live customer service "counter" personnel (shown in Box 2.236) (e.g., at a point-of-sale location). The Value Option Creator module (shown in Box 2.240) is a software program(s) that performs the functions of allowing a company to design, create and configure different value option frameworks and corresponding value options that can be offered to customer to capture their needs and preferences in detail and in a way that can be used to optimize across company operations. The Event Optimizer module (shown in Box 2.250) comprises a program or programs that (a) monitor company business performance and provide information about business data (such as available capacities, costs, sales, inventory and so forth) as well as other relevant factors that may vary from installation to installation; and (b) monitor for the occurrence of events related to the value options which customers have bought, and which then execute pre-designed protocols when a related event occurs (e.g., a re-booking algorithm is activated when a flight cancellation event occurs).

Process to Use the New System and Method in an Industry

The following sections describe in detail how this system and method may be used in any particular industry. Industries and companies best suited to use and benefit from the invention are those with large number of customers and wherein those customers would have varied utilities for aspects of a product offering, especially if those aspects were unbundled and some made optional.

To get maximum benefit from the herein disclosed system and method requires the use of human judgment. It should be emphasized, therefore, that there is shown a "platform" technology and a variety of non-exhaustive ways of using the platform. Those who make use of this platform in their companies will make decisions and exercise their judgment so that each instantiation or practice is likely to be unique, at least to a degree. In addition to disclosing the platform, via the given examples we also disclose certain instantiations of the system and method which themselves are believed to have value but the system and method are not intended to be limited to these instantiations except as they may be expressly claimed.

Using the discussed system and method in any industry involves a two-staged approach. The selection of an industry is assumed. The industry provides a context. Starting in FIG. 3, in the first stage of the method, a set of value option frameworks (to be associated with a company's offerings) is created. It is immaterial, for the current discussion, how one obtains the information used to construct a value option framework. Implicitly or explicitly, a value option framework reflects some sort of analysis of customer dynamics and company economics. Thus, to construct a value option framework for a particular type of transaction, one needs to arrive (however one chooses) at a list of components the customer may select when buying a product, and their prices. For example, in a simple case there may be delivery options and warranty options and may be training options. Each option is assigned a price, whether statically, quasi-statically, or dynamically. Static pricing is assigned at very infrequent intervals. Dynamic pricing (determined by an algorithm invoked by the Event Optimizer is assigned either on an on-demand basis for a particular transaction or at frequent intervals so as to yield pricing based on near (i.e., quasi) real time company performance data. Quasi-static pricing would be somewhere between the former two situations, such as pricing done quarterly or monthly based on then-current information about the company. Pricing may involve running financial analysis based on known data to optimally set the conditions and pricing in value option framework associated with the company offerings.

Figure 11:
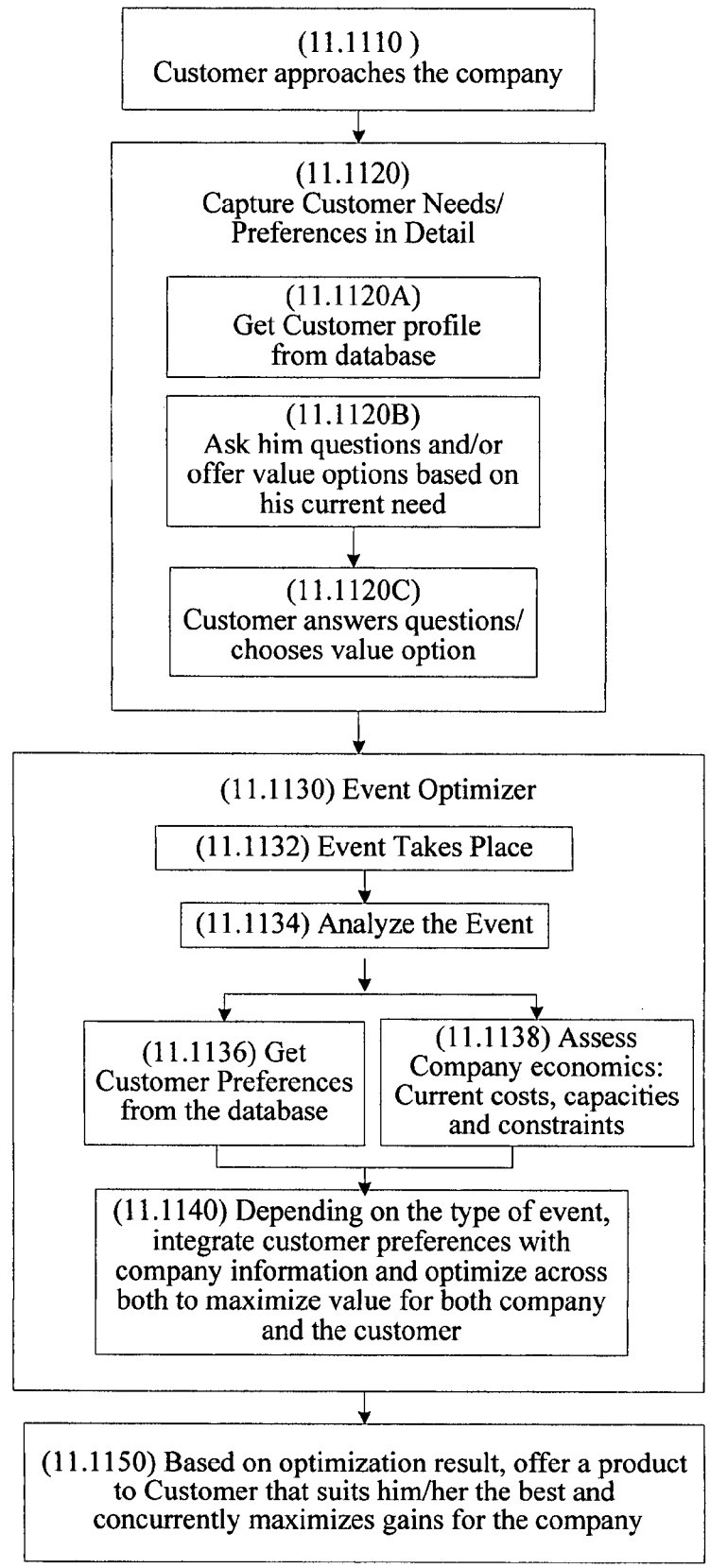
FIG. 11 is a flow chart of a process to implement value option framework.

The second stage, as depicted in FIG. 11, involves a detailed interaction with the customer who has approached the company (Act 11.1110). Approaching the company may involve accessing a web site or calling a call center or any other way of commencing a transaction. The interaction (Act 11.1120) occurs in a structured format to capture the customer's expressed needs, preferences, flexibilities and relative utilities.

As a preliminary matter, it is possible the customer may previously have registered a profile containing default selections of needs, preferences, etc. So, the data store or database 2.210 is interrogated to determine whether a profile exists and, if so, to retrieve it (Act 11.1120A). The customer is presented with questions and/or value options (Act 11.1120B) and in response he/she supplies answers and select options that suit him/her (Act 11.1120C).

The second Act in the second stage is executed by the Event Optimizer module 2.250. A summary of the algorithmic flow of the Event Optimizer presented in Box 11.1130. The Event Optimizer is alerted to, or detects, the occurrence of an event (shown in Box 11.1132 and 11.1134) for which an event-response procedure (program) has been pre-stored. Each event-response procedure is designed by the company to effect selected action(s) in response to detection of its corresponding event. Depending on the nature of the event, an event-response procedure may invoke an optimization algorithm (shown in Box 11.1140), assess the company operations (possibly in real time) and analyze, across company operations (shown in Box 11.1138) and customer information (shown in Box 11.1136), potential results to determine results that concurrently maximize the benefits for the company and the customer. The optimization may or may not modify the company product offerings to better suit the customer while simultaneously maximizing the company operations (shown in Box 11.1150). Both of the stages and the steps involved will now be discussed in detail.

First Stage: Formulation of Value Option Framework

Figure 3:
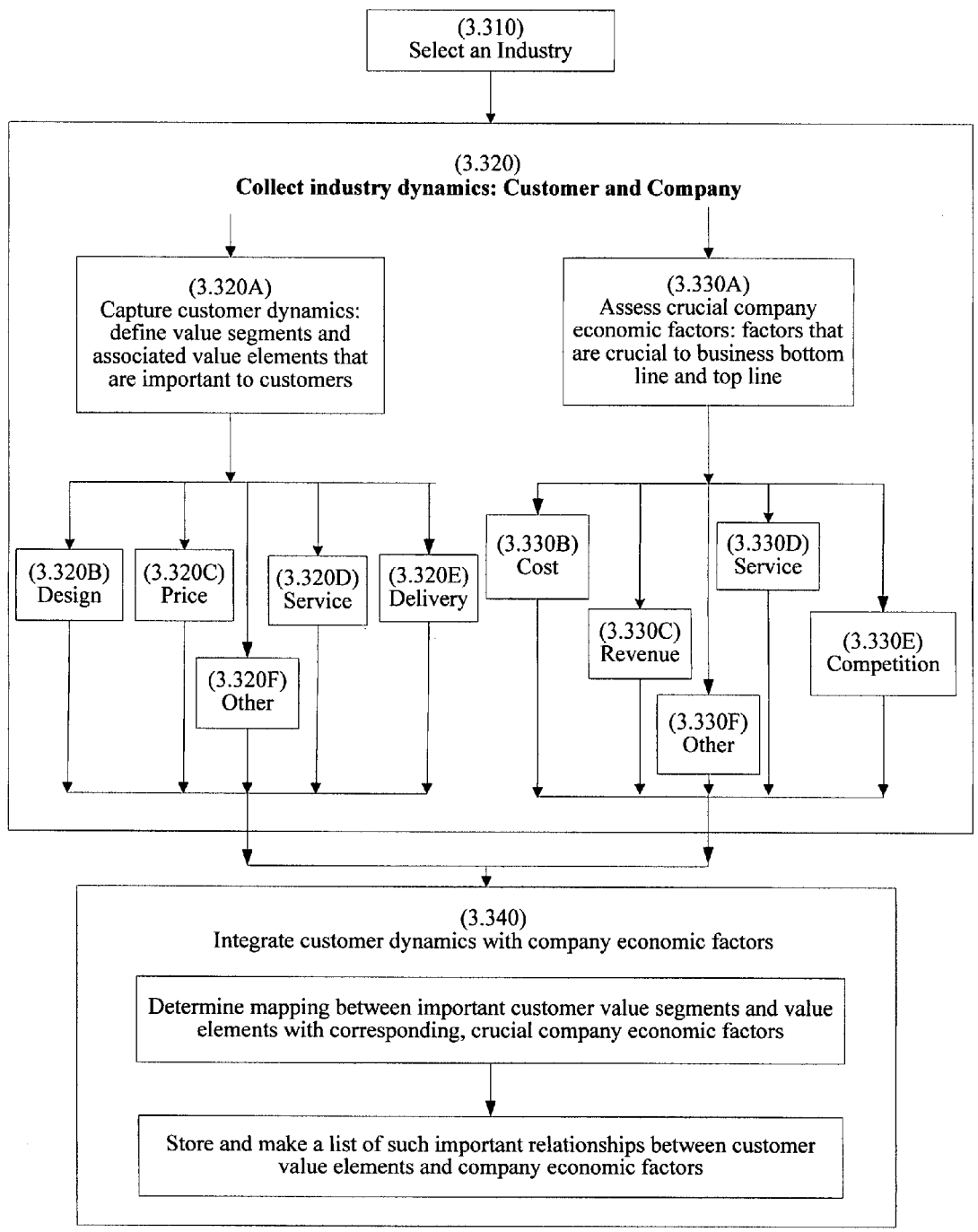
FIG. 3 is a flow chart of a method to create a value option framework showing collection of industry and customer dynamics.

Turning to FIG. 3, it will be assumed that the inventive method and system are to be adapted to a particular industry or company. One may develop a generic instance for an industry or particularize it to an individual company. Some considerations will inherently be generic to an industry. Thus, to formulate a value option framework, one begins by selecting the industry. Act 3.310. Next, the customer and company dynamics are captured. Act 3.320. To capture customer dynamics, one needs to understand the value segments and value elements that are important for the customer. To assess company dynamics, one needs to assess the economic factors that are crucial to the company's profitability and performance.

(1) Capturing Customer Dynamics—Act 3.320A

Figure 4:
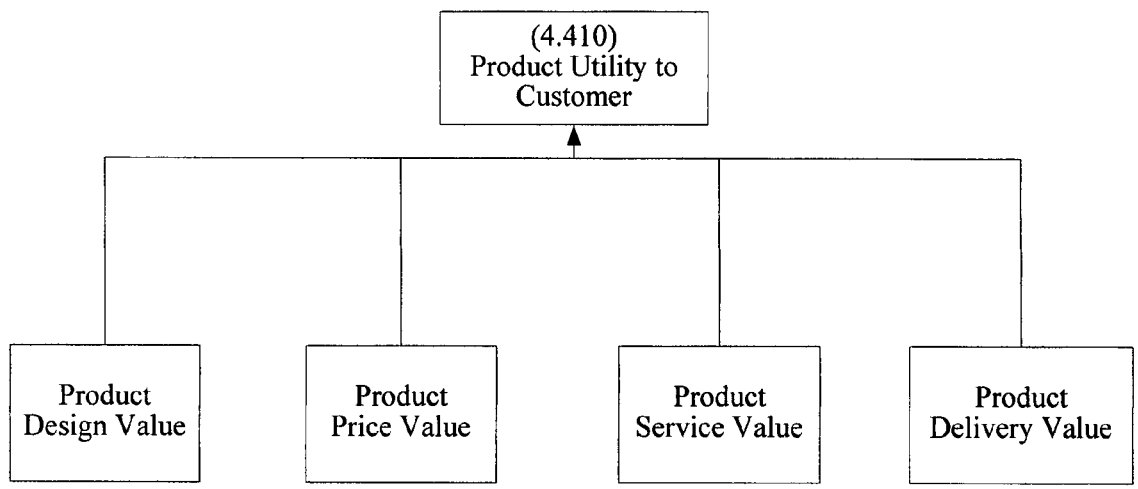
FIGS. 4 and 5 are diagrammatic illustrations of the relationship between overall product utility and contributions as perceived by a customer.
Figure 5:
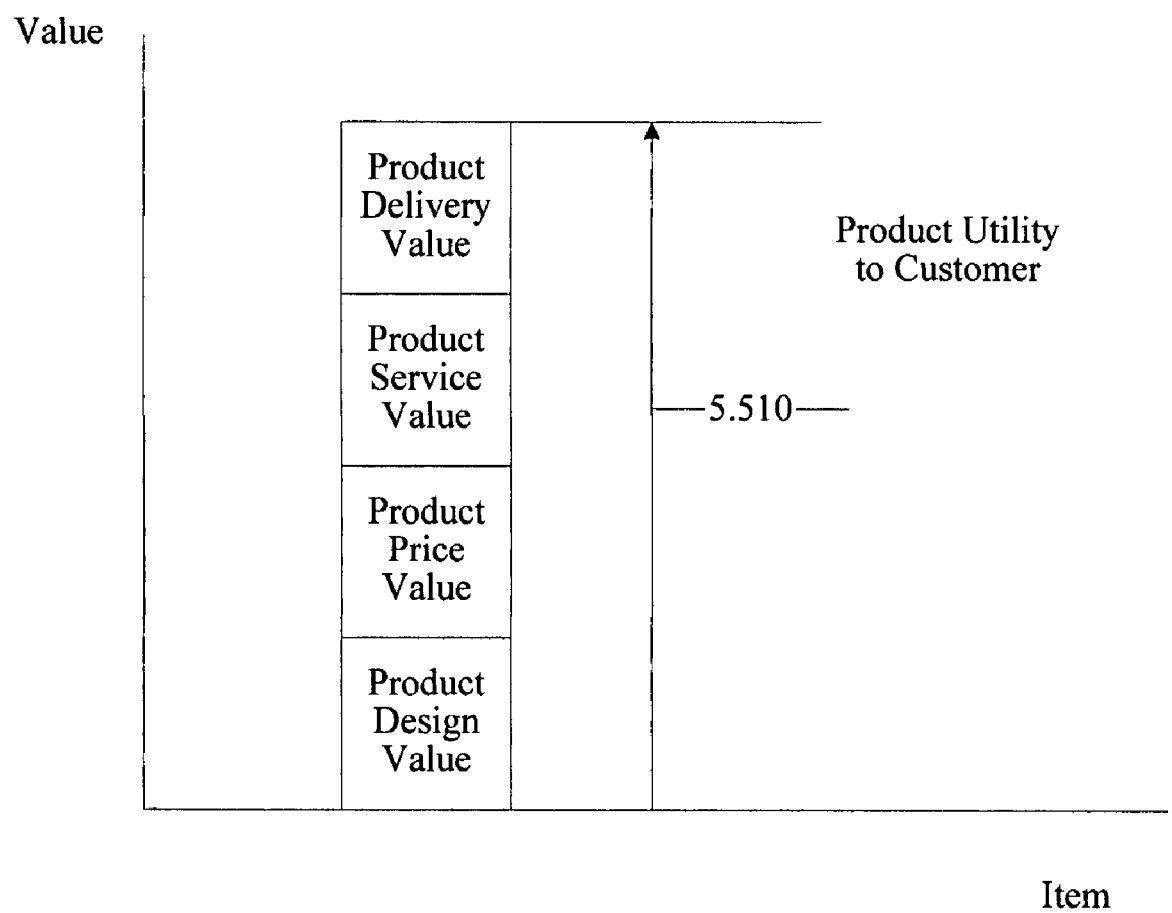

A customer derives certain utility by purchasing a particular product. The purchase utility value, typically, can be separated into many value segments. Customers value these segments (which include core qualities of the offering as well as options and contingent options i.e., options dependent on options) from the perspective of what is important to the customer through the whole buying and usage experience, starting from, searching for a product, placing a particular order and using the product throughout its lifecycle. To go further, it will be helpful to define two terms: value segment and value element. A "value element" is a distinct aspect/characteristic of a product's buying and usage experience that may affect the utility of the product to the customer. A "value segment" is a particular category of such value elements. While value segments may vary from industry to industry and will have to be selected by the individual or team that implements a particular instance of this system and method, for many industries, the four most important value segments are (a) product design value, (b) product delivery value, (c) product price value, and (d) service value. See boxes 3.320B to 3.320E. These value elements are shown in FIGS. 4 and 5, which are simply alternative views of the same information and will be discussed below. It should be noted, however, that these value segments are just provided for illustration purposes. Industries that can benefit from the system and method of the invention may have more or fewer than the listed value segments and/or a different list of value segments. Each value segment may have one or more value elements. Further, the actual number of value elements in each value segment may vary with the industry, the level of detail in the business model, and even the customers. The system implementer can choose the number of value elements in each value segment.

Total Value for Customers

A customer derives unique value from each value segment; the total utility value of the product to a customer (shown in FIGS. 4 and 5) is the combination of values derived from each of the value segments. A customer would benefit the most if the total expected value of his/her utility were maximized. Another important aspect to note is that every customer also has an acceptable range (e.g., equals, exceeds, or disappoints, minimum or maximum) for each individual parameter value. Even if a particular product has high overall value, a customer may not desire the product if it scores below the minimum level (i.e., low enough to reject the product) for any one or more of the value segments or value element. A company may use any method for calculating utility.

Concept of Tiered Value Perception

Figure 6:
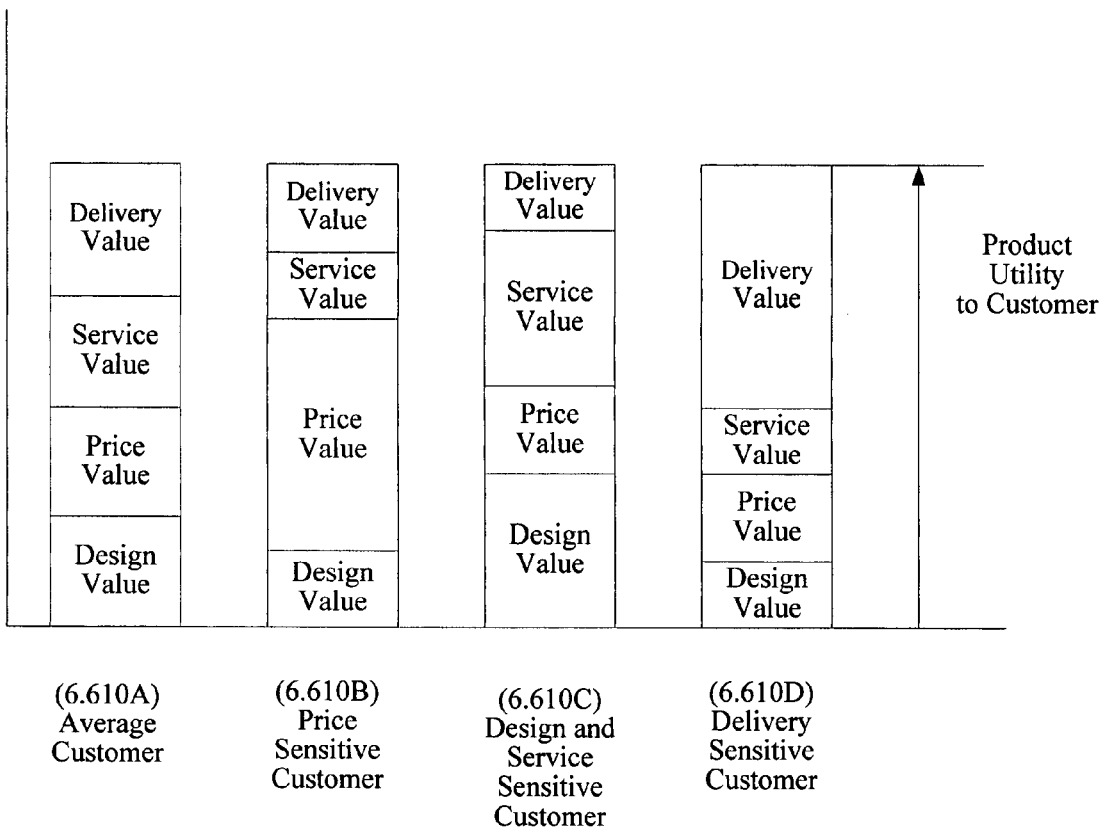
FIG. 6 is a diagrammatic illustration of the perceived utilities of a product by four customers.

Different customers may derive different utility from different aspects of the same product. As shown in FIG. 6, four different customers 610A-610D may compute to the same (total) overall utility even though they assign different utility values to each of the value segments. For example, a human resource manager, who has scheduled interviews with candidates, would value the timely ticket to his destination much more than a vacationer, who may be flexible. Consequently, the company needs, in some way, to define and learn about these value parameters for individual customers, along with relative preferences and utilities associated with each parameter. This will be illustrated below using the previously listed value segments. A web-based questionnaire is one excellent way to collect this information. The collected information is then stored in a customer profile or Itinerary in a data store or database, such as database 2.210.

(a) Product Design Value

The "product design" segment refers to the value elements relating to the design features and characteristics of a product that the customer actually buys. Each customer places his or her own values on these different design value elements.

(b) Product Delivery Value

The "product delivery" segment refers to the value elements relating delivery or time-frame related aspects like, for example, lead-time and delivery schedule from the time the customer places an order. Again, each customer may place his or her own values on each of these value elements. The company collects detailed information on the product delivery needs of the customers.

(c) Product Price Value

The "product price" segment refers to the groups of value elements related to the price a customer pays to buy/use a product. Value elements in this segment may include total product price, delivery costs, warranty or after-sales service costs, and any other relevant costs incurred by the customer in buying and using the product. Some times, addition of all these price elements is also termed total cost of ownership (TCO). A customer derives maximum price value by paying the most desired price for a product. Any price paid either lower or higher than the desired price may change the value the customer gets from the price of the product. The company collects information on the product price needs of the customers.

(d) Service Value

The "service value" segment refers to a group of value elements related to the service a customer receives from pre-sales and post-sales services offered by the company to facilitate the use of the products sold. Pre-sales services include services provided by a company to help its customers decide and choose products based on their requirements. Post-sales or after-sales service refers to the warranty, product support, maintenance support and other relevant activities that may help a customer to use the product effectively. A customer will derive maximum service value from a product if the services provided by the company completely match or exceed those desired by the customer. The company utilizing the invention collects information not only on the service needs of its customers, but also on customer preferences on different possible events that might occur during or after the purchase.

Summary of Capturing Customer Dynamics

Based on the method described above, the first Act for a company is to establish the value segments and value elements it will present to the customer for the customer's decision. It may establish these value segments and value elements in any way it chooses. A company may want to use market research or other mechanisms to analyze the value segments and value elements that are important to customers. An industry expert may choose to avoid such research and, instead to rely on experience.

(2) Assessment of Company Economics

The next Act in the first stage, as shown in FIG. 3, is to assess the crucial economic factors that affect the bottom-line and top-line of the company, Act 3.330A. For example, these factors may include but are not limited to revenues, fixed costs, inventory, available and scheduled capacity, constraints on product availability and total and marginal values for current direct and indirect product (and/or services) costs. For illustration purposes only, FIG. 3 shows the grouping of such factors into five major categories 3.330B-F, including costs, revenue, service, competition and other.

It might be beneficial if a company utilizing the inventive system and method were able to express cost elements in a real-time or quasi-real-time (i.e., up to date) dynamic fashion so that such information can then be used to assess the profitability or contribution of each product sale opportunity, and to facilitate the operation of the Event Optimizer (so that offers and actions can be based on real-time or near-real-time information). Certainly that is not always required and would not be required in an industry where there is little change in cost elements over a significant time interval.

(3) Integration of Customer Dynamics with Company Economic Factors

A third Act, shown in Box 340 of FIG. 3, is to take the information collected from the previous two steps, analyze this data and find important value segments and elements that directly affect the crucial economic factors for the company. This operation involves creating a mapping between company factors and customer value segments, to establish direct and indirect relationships between the two.

(4) Formation of Value Option Framework

Figure 8:
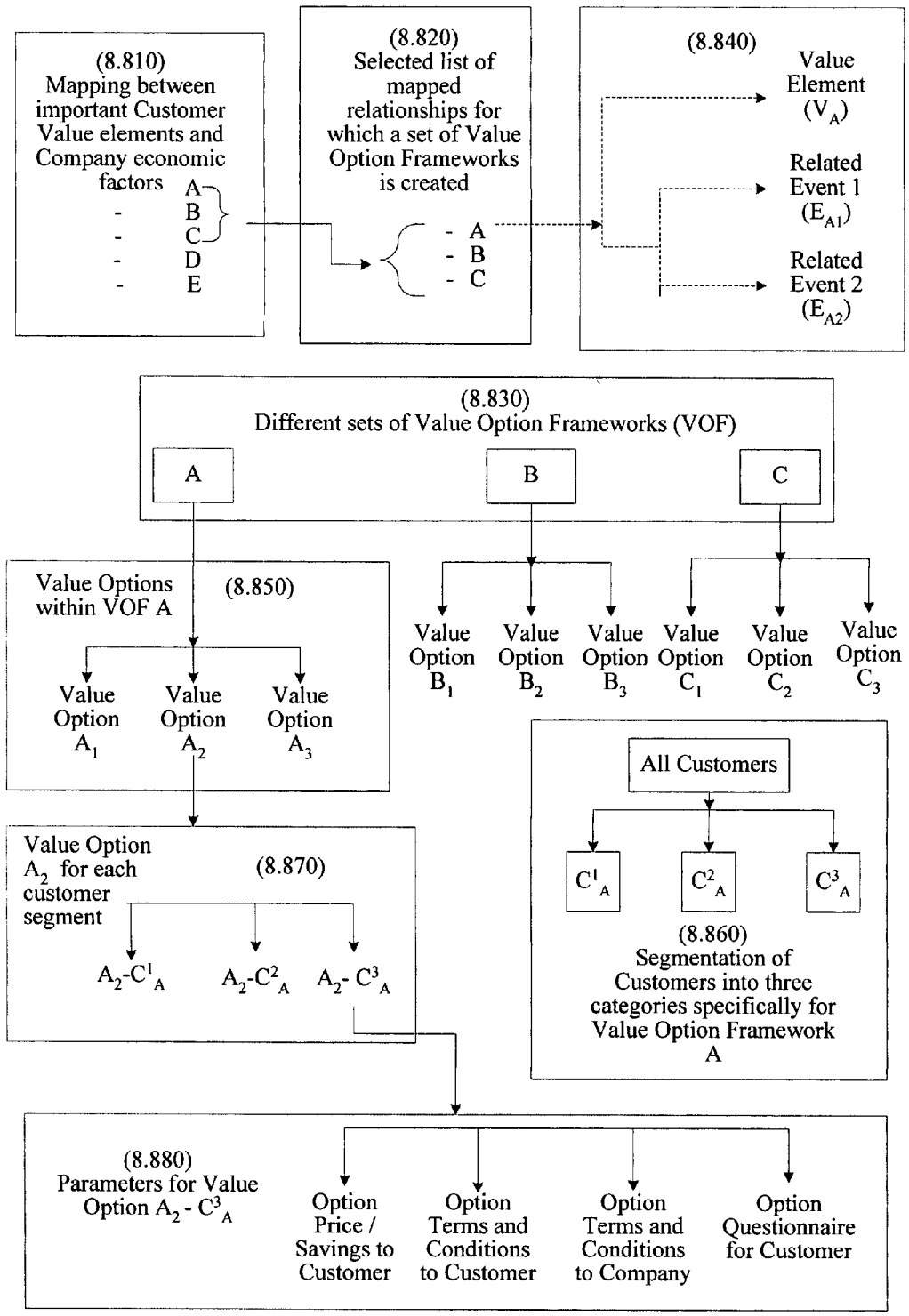
FIG. 8 is a partially-diagrammatic, partially-flow diagram representing the steps of a process for creating a value option framework.

The formation of a value option framework involves certain steps illustrated in FIG. 8. The value option framework is formed around important mapped value elements, allowing capture of detailed individual, customer-level data expressing needs, preferences, flexibilities and relative utilities so as to positively impact the company operations, while simultaneously enhancing the overall product utility for the customer. A value option framework (VOF) must allow the company to capture a customer's demand, preferences, flexibilities and relative utilities at an individual level in a format that can allow that information to be used to produce a cost savings or revenue enhancement for company operations while concurrently enhancing customer utility. The structure of a value option framework is defined in detail later.

The process to create a value option framework is shown in greater detail in FIG. 8. In Act 8.810, the process starts from that list. From this list, the company may select a list of mapped value elements which fulfill the criteria listed above, Act 8.820, and a value option framework is built around those value elements. One could build a value option framework around almost every mapped relationship, so the decision criteria to choose or reject any such relationship is simply pragmatics. It is probably to be desired to limit the number of relationships to keep the value option framework manageable, computationally and otherwise. In FIG. 8, there are three VOFs shown at 8.830, namely A, B and C. The number of value option frameworks shown is for illustration purposes only and could be fewer or more, depending on factors such as the industry selected and user discretion. As explained in detail later, each value option framework is related to a corresponding value element and one or more related event(s). For illustration purpose, in the Box 8.840, value option framework A is related to a value element $V_A$ and two related events, $E_{A1}$ and $E_{A2}$. In most situations, after the initial interaction between the customer and company related to a particular value element, one or more related events (or a series of events) would take place. The structure of a value option framework is defined below in detail.

Structure of a Value Option Framework

Figure 9:
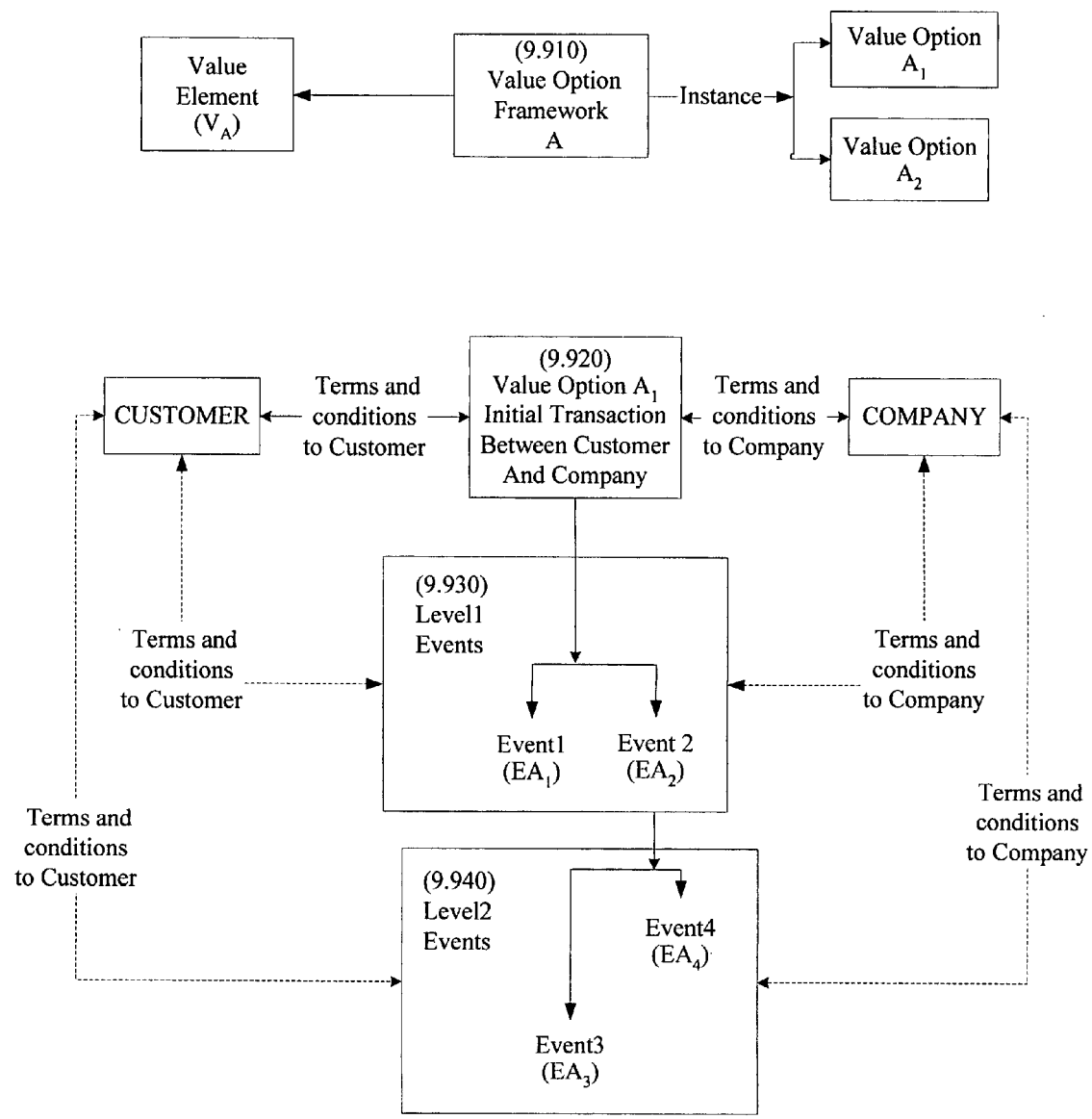
FIG. 9 is a diagrammatic representation of the generic structure of a VOF.

FIG. 9 defines the structure of a Value Option Framework. The Box 9.910 shows a value option framework A. Every value option framework may be related to one or more value elements. As shown in the Box 9.910, value option framework A is related to value element $V_A$. One can create one or more instances of a value option framework as shown by the two value options ($A_1$ and $A_2$). The Box 9.920 shows the initial interaction between the customer and company where the company offers the value option $A_1$ to the customer. Every value option has an initial costs/savings and other benefits and conditions to the customer; and revenue/costs and other benefits and conditions to the company or an entity other than said company. The Initial Transaction is successful if the customer selects the given value option. Every successful transaction may be succeeded by one or more related events (or a series of events as shown by the Boxes 9.930 (Level 1 events) and 9.940 (Level 2 events). Just like the Initial Transaction, each event may also have costs/savings and benefits and conditions to the customer, and revenue/costs and benefits and conditions to the company, as shown by the linked arrows from Event $E_{A3}$ to both the customer and company.

The Initial Transaction may comprise one or more acts. One or more products may be selected, at one or more times, before, after, during the Initial Transaction, or any combination thereof. The Initial Transaction or any of the following events may have terms and conditions applicable to the customer, the company, another entity or any combination thereof. These terms and conditions may be set, preferably, to concurrently benefit both parties.

Consider, again, the process of formulating a value option framework. For each value option framework, the company-user also preferably categorizes its population of customers into one or more segments based on one or more criteria. Customer segmentation is based on customer behavior and needs. Individual customers are not necessarily segmented or grouped; a particular customer may fall within different customer segments at different times. It is the customer behaviors and needs that are segmented. To provide an example, in the Box 860 in FIG. 8, all of the company customers are categorized into three customer segments, namely, $C^1_A, C^2_A, C^3_A$ for the value option framework A. The number of customer segments could vary depending on the industry and value option framework, and this method does not put a limit on the number of customer segments. The number of customer segments shown is for illustration purposes only and could be fewer than or more depending on industry selected, value option framework and user discretion. Further, a company may segment its customers differently for different value option frameworks or they may use the same customer segmentation for a few or all value option frameworks. The customer segmentation is done because the customer behavior can be subdivided into different groups and customer showing similar behavior could be dealt in a similar fashion.

After formulating one or more sets of value option framework(s) around the selected value elements, the user creates one or more value options for each set of value option frameworks. In FIG. 8, the value options $A_1, A_2$ and $A_3$ are created in box 8.850 for the value option framework A. The number of value options shown is for illustration purposes only and could be fewer or more depending on industry selected, value option framework and user discretion.

For each value option created, the user defines parameters for option pricing, benefits and conditions to the customer, as well as revenue, costs and option conditions to the company, under which the option would be used. If necessary, a user may also need to create a separate questionnaire to be completed by customers, pertaining to each value option.

There may or may not be any payment transaction related to the Initial Transaction and/or other event related to the Initial Transaction and/or Value Option Framework. A price may include, but is not limited to, a set of one or more Product Prices, a set of one or more option prices, any other price or any combination of the above. The price may comprise a monetary value or a soft value (e.g., benefits, coupons or exchange of another service) or other consideration. The price may be fixed or variable, with or without bounds. The company may set permissible range(s) or boundary limit(s) within which the price can vary, or it may offer the customer a set of prices to choose from. Since price conditions may depend upon various factors, which may or may not be variable, the same may be decided at anytime. The price conditions may be determined by the customer, the company, a third entity, or any combination thereof, at one or more times.

As shown in FIG. 8, the user creates value options for each particular customer segment (Act 8.870). In FIG. 8, the structure for value option conditions for Value Option $A_2$ tailored to customer segment $C^3_A$ is shown in the Box 8.880. Similarly, the user creates conditions and parameter values for each value option for each customer segment.

For one type of value option, one or more parameters for different customer segments may be the same. Across multiple value options (within the same value option framework), one or more parameter values may be the same for one or more different customer segments. It is possible that one or more value options may not be valid for a particular customer segment or a sub-segment within a customer segment.

Figure 10:
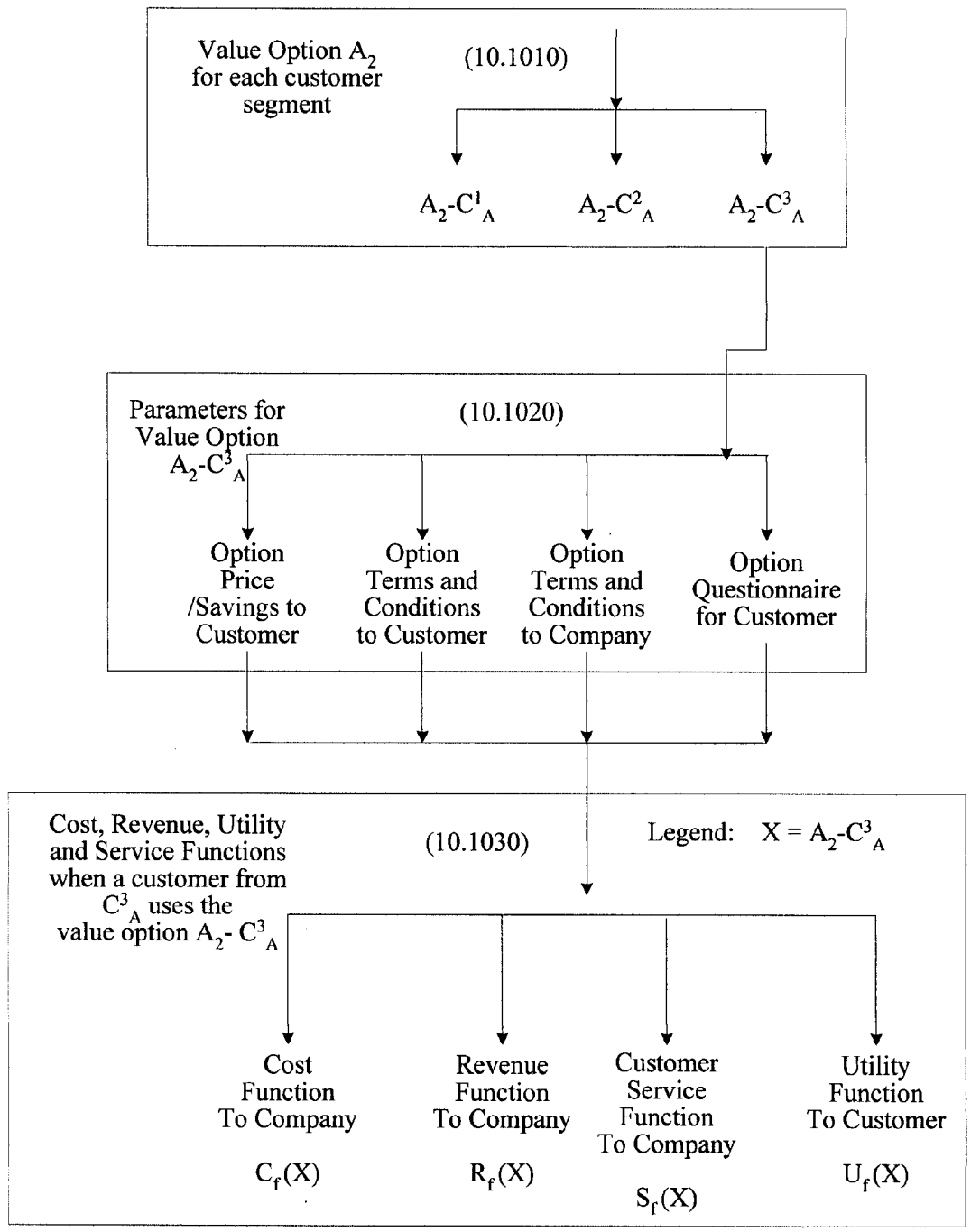
FIG. 10 is a diagrammatic illustration showing creation of a value option framework indicating how cost, revenue, utility and service functions.

Turning to FIG. 10, for each value option created for a specific customer segment, the user creates the following functions as shown in the Box 10.1030. (The number and type of functions shown is for illustration purposes only and could be fewer than or more depending on the industry selected, the value option framework and user discretion.) First, there is a Cost Function to the company, $C_f(X)$. This function expresses the cost elements to the company related to usage of a specific value option. For illustration purposes, FIG. 10 displays the cost function $[C_f(A_2-C^3_A)]$ to the company when a customer (within customer segment $C^3_A$) selects the value option $A_2$. This function expresses the costs to the company initially when the user selects the value option $A_2$, and also for each of the related events if and when those related events take place. Next, there is a Revenue Function to the company, $R_f(X)$. This function expresses the revenue elements to the company related to usage of a specific value option. For illustration purposes, FIG. 10 displays the revenue function $[R_f(A_2-C^3_A)]$ to the company when a customer (within customer segment $C^3_A$) uses the value option $A_2$. This function expresses the revenue to the company initially when the user selects the value option A2, and also for each of the related events if and when those related events take place. Then there is a Customer Service Function to the company. This function expresses the customer service function to the company related to usage of a specific value option. For illustration purposes, FIG. 10 displays the customer service function $[S_f(A_2-C^3_A)]$ to the company when a customer (within customer segment $C^3_A$) uses the value option $A_2$. This function expresses the customer service level a company provides initially when the user selects the value option $A_2$, and also for each of the related events, if and when those related event take place. Finally, there is a Utility function to the customer. This function expresses the utility to the customer from use of a specific value option. For illustration purposes, FIG. 10 displays the utility function $[U_f(A_2-C^3_A)]$ to a customer (within customer segment $C^3_A$) when he or she uses the value option $A_2$. This function expresses the utility to a customer initially when he/she selects the value option $A_2$, and also for each of the related events if and when those related events take place.

To obtain the overall costs, revenue and service benefit for a particular value option framework, all the individual functions for each value option-customer segment combination are combined to determine the total overall costs and revenue benefits to the company and the service and utility benefits to customers. Benefits from all the value option frameworks can be simply added together to calculate total overall benefit values to the company.

(5) Optimization of Value Options

Figure 7:
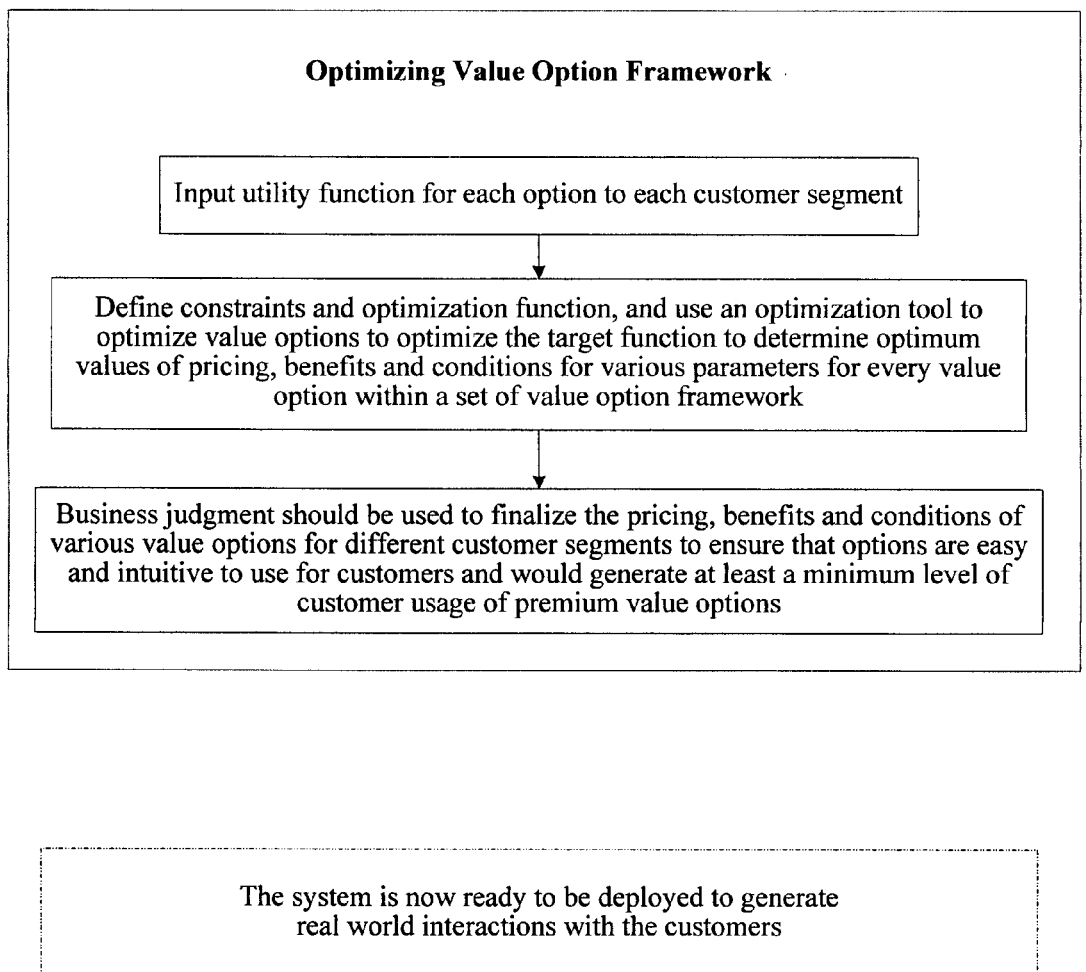
FIG. 7 is a flow chart illustrating optimization of a value option framework.

As an optional last Act in the first stage, as shown in FIG. 7, a financial analysis may be performed on the value option framework using the existing company and customer data to determine optimum pricing values and conditions of the value options. In other words, a company using the system and method can build utility functions based on cost and benefit equations of various options, and then can optimize across any one or combination of such functions. Any standard non-linear constrained optimization software tool can be used to run iterations to determine optimized pricing and benefit values for different value options. Using standard sensitivity and scenario analysis techniques, a user can run what-if scenarios to determine the robustness of the value option framework. It is not necessary to perform this optimization to generate benefit from the new method and system taught above. However, performing optimization at this level may tend to increase the benefit derived.

Second Stage: Using Value Option Framework

After completing the first stage of the method, the user has been able to create important value option frameworks and specific value options within those frameworks. The user has also segmented customers to be associated with each specific value option that may be applicable to each customer segment. The company is fully prepared now to use a structured format comprising value options and questionnaire to interact with its customers in real time to generate benefits for both customer and company.

The second stage of the new system and method, as depicted in FIG. 11, involves using the value option framework to interact with the customer to capture his or her requirements in detail. Once the customer selects a particular option, the system moves to the Event Optimizer stage, 11.1130, where the system reacts based on the event that may take place. The Event Optimizer, depending on the event, invokes an optimization algorithm, assesses the company operations in real time and optimizes across company operations and customer information to produce results that concurrently maximize the benefits for the company and the customer. The optimization may or may not modify the company product offerings to better suit the customer while simultaneously maximizing the company operations. Both of these steps will now be discussed in detail.

1. Dynamic Interaction to Determine Customer Demand in Detail (Act 11.1120)

In this Act, the company interacts with its customers in a structured format asking questions and/or offering value options. Preferably, this interaction occurs using a web-based data collection system. As stated above while an Internet based interaction is probably the most cost-effective approach to data collection, other methods may be employed, if preferred, or a combination of methods may be used.

On a browser, which accesses the seller's (i.e., company's) web site, a series of questions are presented to the customer and the customer supplies answers. These questions may also present value options and ask the customer to answer and select the options that suit them the best, enabling the company to determine detailed preferences and flexibilities in customer needs. The questions/value options are supplied from the database 2.210 based on the value option framework created in the first stage to deal with different customer segments.

2. Event Optimizer

Figure 12:
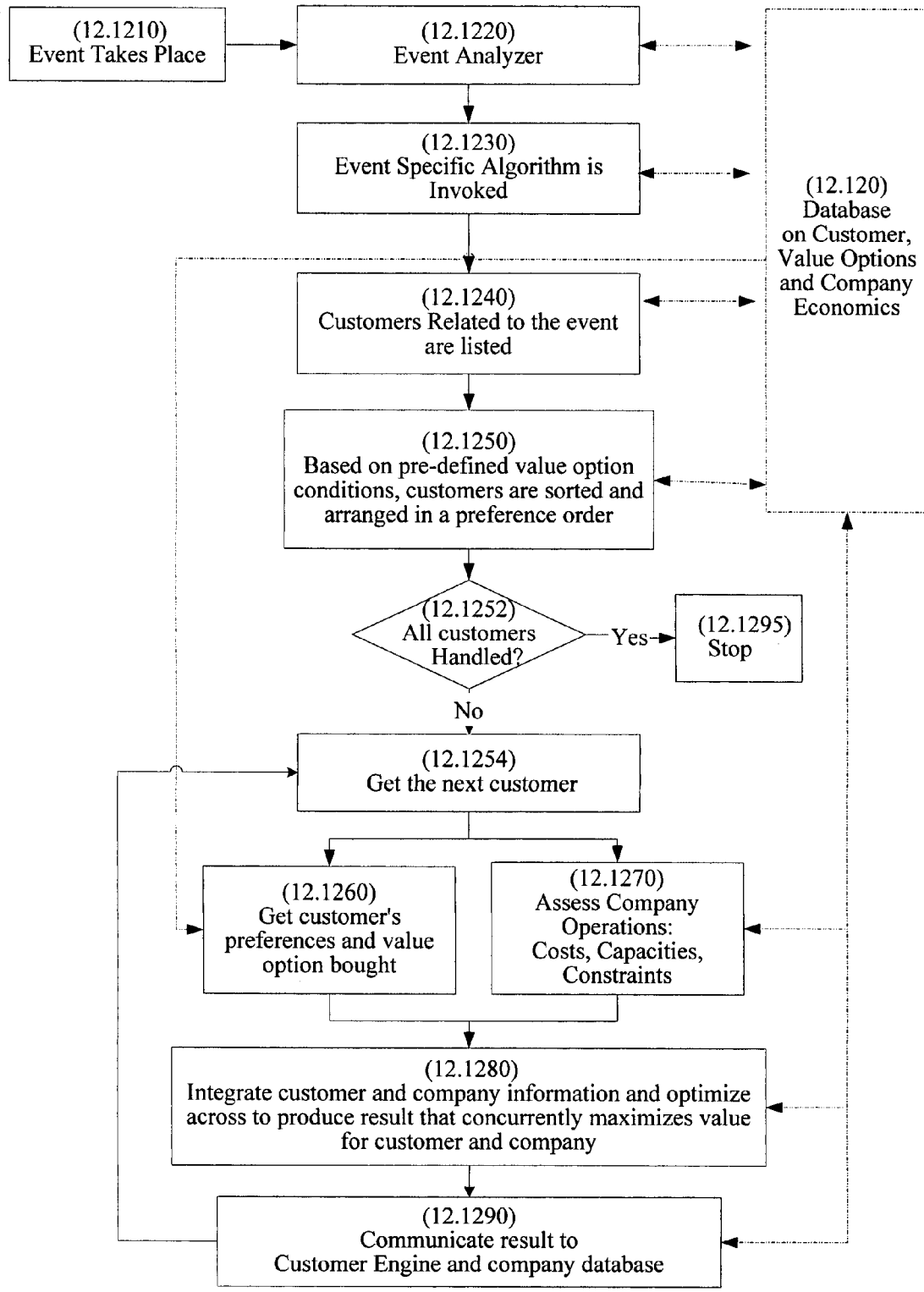
FIG. 12 is a diagrammatic illustration showing generally how an event is processed by the system and method shown, to fulfill a company's obligations to its customers as shown herein, delivering optimized results to the company and the customers.

Once the customer selects a value option, the system goes to the Event Optimizer phase where different steps are executed depending on the event that may occur. The event(s) is (are) related to the value option selected in the first Act. Turning to FIG. 12, the typical Event Optimizer architecture is shown. An Event Analyzer 12.1220 is a module that receives notifications of events and notes when a monitored event occurs. Event Optimizer analyzes 12.1210 the event and invokes an optimization algorithm specific to the event that is detected. Using that algorithm, the Event Optimizer collects the information on related customers and assesses the company operations in real time. A third Act takes the information collected from the previous two steps and uses predetermined criteria to optimize company operations along with customer demand. In this Act, the various scenarios are generated which optimize the total product value for the customer and profits and gains for the company. More details on the Event Optimizer are provided in the System Architecture section.

A user may create a value option framework, which includes a series of events. In this case, the Event Optimizer, after optimizing the result for the first event, may offer the results to the customer. The customer may or may not accept the results. If the customer does not accept the result, the Event Optimizer may move on to handle other subsequent related events, and may again come back to the customer with more results. This process could be repeated several times depending on industry selected, the configuration and type of value option framework, and customer behavior.

Summary of Second Stage

In the second stage of the new method and system, the company interacts with the customer in a structured format to capture customer needs, preferences, flexibilities and relative utilities in detail. The next stage involves an Event Optimizer as explained above. The customers associated with the event are enlisted and sorted by pre-defined criteria. The Event Optimizer collects customer information from the data store or database and also assesses company operations in real time before integrating this information to produce one or more optimized results that concurrently maximize the benefits for the customer and company.

System Architecture: to Use and Implement an Instance of the Method

The system architecture as shown in FIG. 2 may be used to implement the new system and method taught above. The Value Option Creator (Box 2.240) allows the user to create and configure different value options that can be offered to the customers to capture their needs and preferences in detail and in a way that can be used to optimize across company operations. The Event Optimizer (Box 2.250) allows the company to optimize across company operations and customer needs when an event is triggered to provide a product offering that maximizes both customer utility and company profitability. A company would use the Customer Engine (Box 2.230) to interact with its customers via different channels. Each of these three sections is defined below in detail.

Customer Engine

The Customer Engine provides different interfaces that a company maintains at different channels, which are utilized to interact with the customers. These channels may include, but are not limited to, the company's website via the Internet, the company's call center via phone, and the company's retail outlet via in-person. The Customer Engine enables the company to ask questions and/or offer value options to customers in a pre-configured structured format. The Customer Engine generates its interfaces based on the data stored in the data store or database and populated by the Value Option Creator. The customers provide their responses and select value options that suit them. The Customer Engine then communicates back and stores customer responses and selections in the data store or database. The Customer Engine also may communicate the optimized results to the customer as and when generated by the Event Optimizer.

Value Option Creator (VOC)

The Value Option Creator allows a company to design, create and configure different value option frameworks and corresponding value options that can be offered to a customer to capture his or her needs and preferences in detail and in a way that can be used to achieve optimization across company operations. A company would use the Value Option Creator module to perform some or all of the following:

- Develop various value option frameworks based on selected value elements and corresponding company economic factors.
- Segment customers by one or more criteria. A customer segment may include one or more customers.
- Develop costs, revenue and service functions based on a company's operations prior to using the herein-described system and method. The company may prefer to express cost elements in a real-time (i.e., up to date) dynamic fashion in order to be able to fully assess the profitability or contribution of each product sale opportunity.
- Develop various value options within each value option framework.
- Configure each value option differently (or keep it the same) for different customer segments. This involves choosing pricing, benefit conditions and the proper questionnaire for each value option for different customers.
- Develop costs, revenue and service functions after the user (company) has designed and configured various value option frameworks.
- To measure in real time or in quasi-real time the value benefit created for the passenger and/or company by implementing the new system and method in part or in full.
- Optimize each value option framework and associated value options to determine optimized pricing and benefit schemes for the value options, in order to maximize the benefit for both the company and customers. What-if scenarios may be run to test the robustness of the value option frameworks' models.

The Value Option Creator (VOC) intakes the cost functions (marginal and total), revenue functions, utility functions, customer segments, capacity (scheduled and available) functions and other economic factor functions of the company. The VOC can be configured to store various customer value segments on which a user may want to build value option framework and associated value options. A user can also enter the constraints and ranges to perform pricing optimization to determine optimum pricing and the benefits of various options.

Ideally, a user may be able to create a Value Option Creator that is industry and company-independent and can be used in several industries. Due to time and resource constraints, however, it is perfectly satisfactory for a user to build a less scalable and flexible industry-specific Value Option Creator.

Event Optimizer

The Event Optimizer allows the company to optimize its "bottom line" across company operations and customer needs, when an event is triggered. This is achieved by providing a product offering that maximizes both customer utility and company profitability. A suitable system architecture (i.e., overall flow) for the Event Optimizer in shown in FIG. 12. The following describes each Act in detail:

The Event Optimizer may start its functioning when a particular event is triggered (i.e., occurs and is detected at the time of purchase or later), Act 12.1210. The Event Analyzer (12.1220) analyzes the type and category of the triggered event by matching it with the list of events listed in data store or database 12.210. Once the event type is determined, the Event Analyzer searches the data store or database for an optimization algorithm that is associated with the triggered event, and executes that algorithm. (Such algorithms, naturally, have been developed and stored in the data store or database at an earlier time.) The algorithm collects from the database a list of the customers that are associated with the triggered event, Act 12.1240, and sorts them based on pre-defined criteria listed in the value option framework associated with the event, Act 12.1250. The first customer is taken from the sorted list and his or her preferences and value option selection are retrieved from the data store or database. Act 12.1260. The algorithm then makes a real-time assessment of the company operations to get up- to -date costs, capacities and constraints. Act 12.1270. The information collected in the above two steps is then integrated (Act 12.1280) and, based on a pre-defined criteria, the algorithm optimizes across the company information and customer preferences to produce one or more results that concurrently maximize the benefit for both the company and the customer. The results are preferably communicated to the Customer Engine and to data store or database 12.210, Act 12.1290. These steps are repeated until all the customers have been taken care of Steps 12.1252, 12.1254 and 12.1295.

Figure 13:
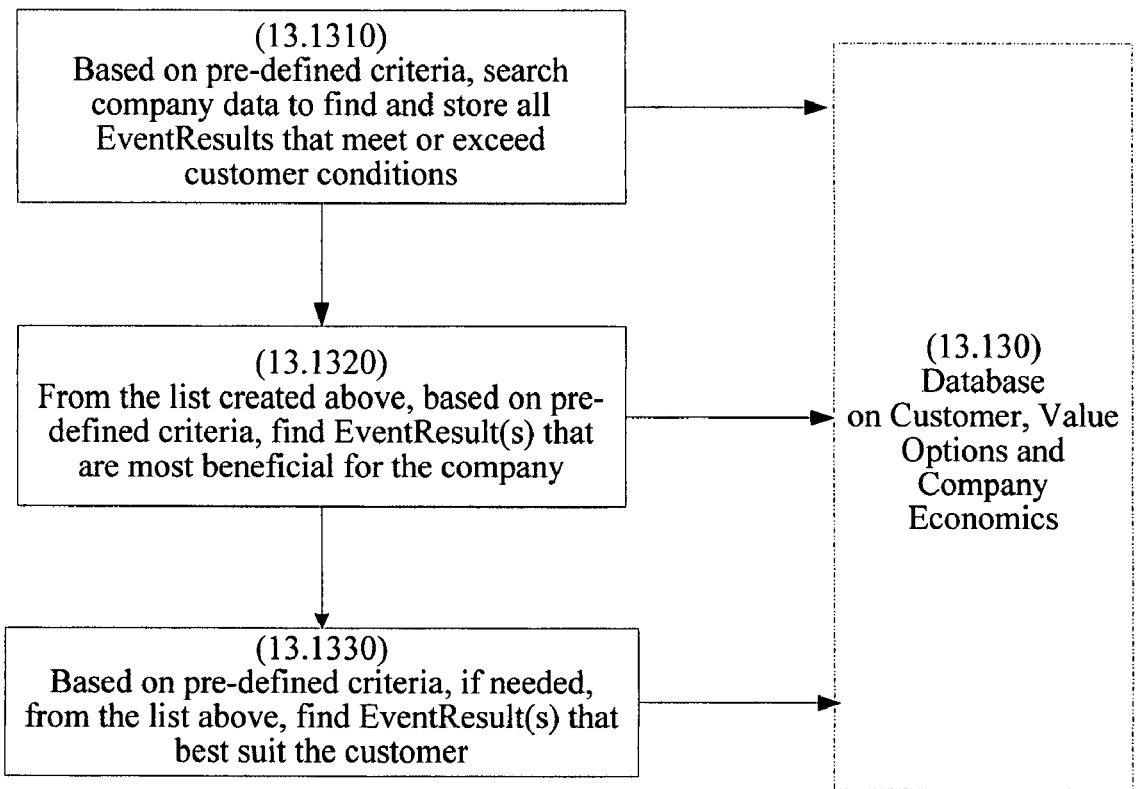
FIG. 13 is a flow chart expanding Act 1280 of FIG. 12.

FIG. 13 expands the Act 12.1280 to show the detailed sub-steps. The first Act (Act 13.1310) is to search the company data, based on pre-defined criteria, to determine and store all EventResults that meet or exceed the customer conditions (based on the value option selected and other preferences). An EventResult is a potential resultant output of an event to the customer and the company. The next Act 13.1320 is to determine from the stored list, those EventResults that are most beneficial to the company. If needed, another Act (13.1330) is performed to determine from the selected EventResults from the Act 13.1320, those results that best suit the customer.

Depending on the event type and related value option framework, the event-specific algorithm may communicate optimized results to the customer one or more times, depending on the algorithm and customer behavior.

Business Model to Implement Value Option Frameworks Related to the Invention

Different business models may be used to implement a value option framework as described in the current invention. The business models mentioned below, without limitation, may be used to implement any value option framework in any industry. As an example, a company may choose to implement a UPO VOF (explained later) individually or in conjunction with one or more partners and/or other companies.

The OA and the company may engage in a business agreement to implement one or more value option frameworks. The business agreement may divide the total benefit generated by said value option framework between the two parties using any mechanism or criteria as desired. The total benefit may be shared between the two parties. The company may allocate one or more products to the OA. One or more companies may allocate only a part of or their entire product inventory to the OA to offer those products to the customers by way of regular and/or as options. In return, the OA may offer some revenue or fee to the company for all or a portion of the products allocated. This fee may be given only for the products that the OA is able to utilize or for all the allocated products. The lending fee may be a lump sum amount, may depend upon the number of products allocated or may depend on one or more factors as desired. The agreement may include a provision where the OA may return the allocated products back to the company at a certain time and date. There may be one or more conditions associated with the return of unused options and/or regular products, including, but not limited to, returning the same product, returning a higher value product and so on. The company may allot OA at least one product and said OA may deliver option on at least one of said allocated products. The OA may or may not enter into an agreement with the company to provide such option on its products. The OA may sell back at least one allocated product to said company or to at least one entity other than the company or both.

An OA may formulate an agreement with one or more companies on one or more VOFs to offer a combination of VOFs to customers. Said VOF may include different terms and conditions. For example, a customer may receive option price only from the company even if he/she is receiving products and/or options from the OA. Similarly, the customer may receive option price only from the OA even if he or she selected the products and/or received the options from the companies. The condition may also be set for a customer to make one or more payments to the company for the products and receive one or more payments from the company for the options received from that company, and to make one or more payments to the OA for the products and receive one or more payments from the OA for the options received from that OA. The condition may allow the customer to receive partial payments from the company and the rest from the OA or vice versa, the basis of which distribution may depend upon various factors, including, but are not limited to, the factors of company's choosing, the arrangement between the OA and the company and so on. In another example, the customer may receive the option price from the third party or may receive the option price from any of the combination of the entities mentioned above.

A company may allocate some inventory of one or more products to another entity such as an OA or Option Aggregator. The term "allocation of product inventory" "allocation of product(s)" implies, without limitation, assigning one or more units of one or more products to an entity for any purpose or use by the entity either exclusively or non-exclusively. The allocation of product may be conditional. For example, one of the conditions may require a return of at least one allocated product within a specified time period and/or other consideration(s).

Figure 13A:
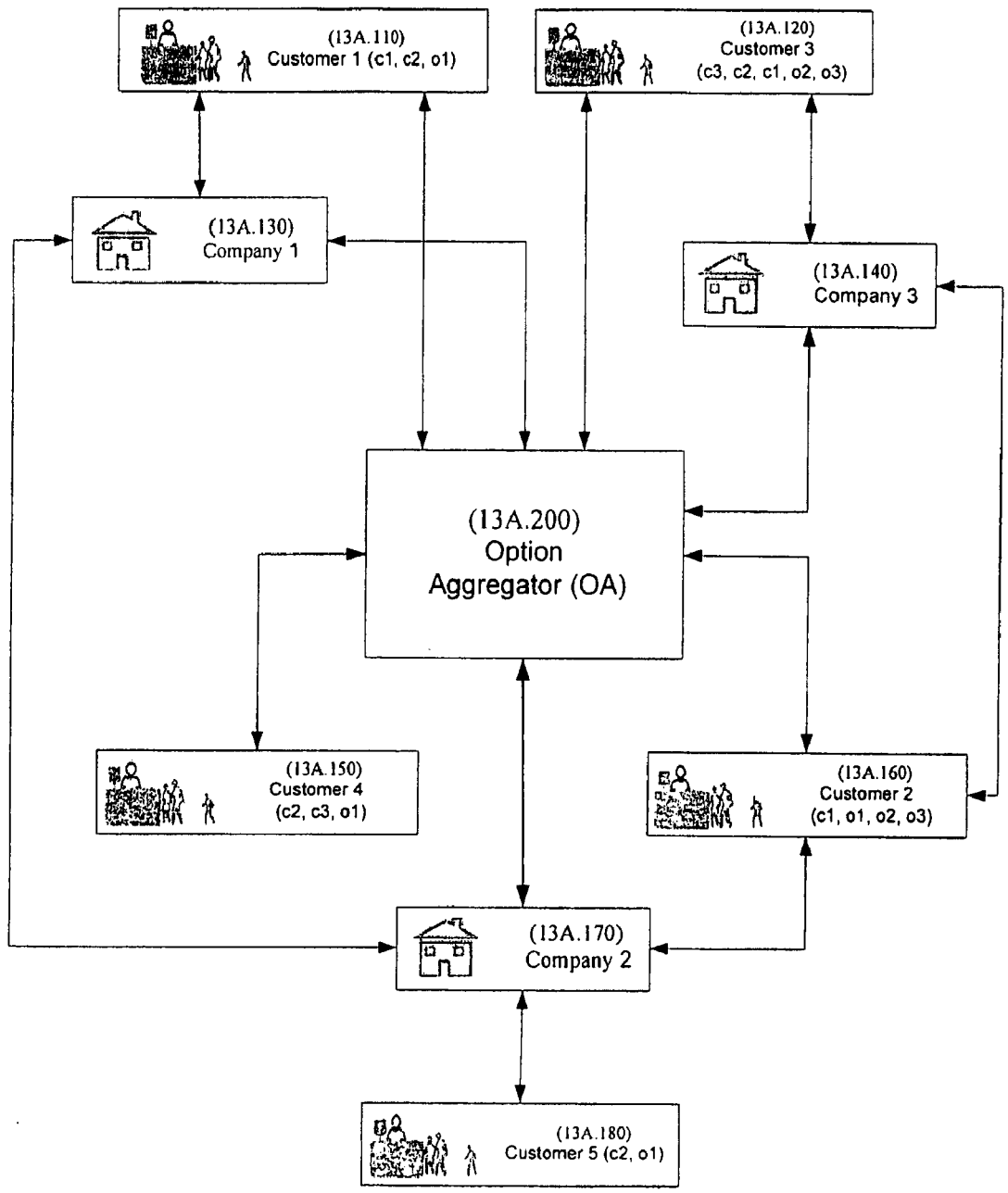
FIG. 13A is a diagrammatic illustration of various business models.

The customer may receive products and/or options from one or more of the company or OA or any combination thereof. For example, FIG. 13A displays one example where three different companies choose to allocate one or more products to another entity (i.e., OA in this example). The OA may use the allocated products to operate a service to satisfy different needs of the customers. In FIG. 13A, the companies and their products are designated as Company 1/Product c1, Company 2/Product c2 and Company 3/Product c3 as shown by the Boxes 13A.130, 13A.170, 13A.140, respectively. In another arrangement, Company 1 and Company 2 may act together to implement the value option framework and may allocate one or more products to the OA which may on its own or together with either one or both the companies and may operate the service to offer said value option framework to the customers. Box 13A.110 represents Customer 1 receiving product c1 and c2 from Company 1 and an option o1 from the OA. The Box 13A.120 represents Customer 3 receiving product c3 from Company 3 and products c1 and c2 from the OA and options o2 and o3 from Company 3. In Box 13A.160, Customer 2 receives product c1 from the OA and options o1, o2 and o3 from OA, Company 2 and Company 3 respectively. In Box 13A.150, Customer 4 receives products c2 and c3 and also option of from the OA. In Box 13A.180, customer receives both product c2 and option o1 from Company 2.

There may be more combinations and arrangements among one or more companies, the OA and/or the customers. The companies and the OA may, without limitation, work together as partners, joint ventures, all together separate entities, partnerships etc., to offer and implement the value option frameworks related to the novel invention. The business model may be used with all the value option frameworks of the current invention which may involve some customization for the specific value option framework.

Figure 13B:
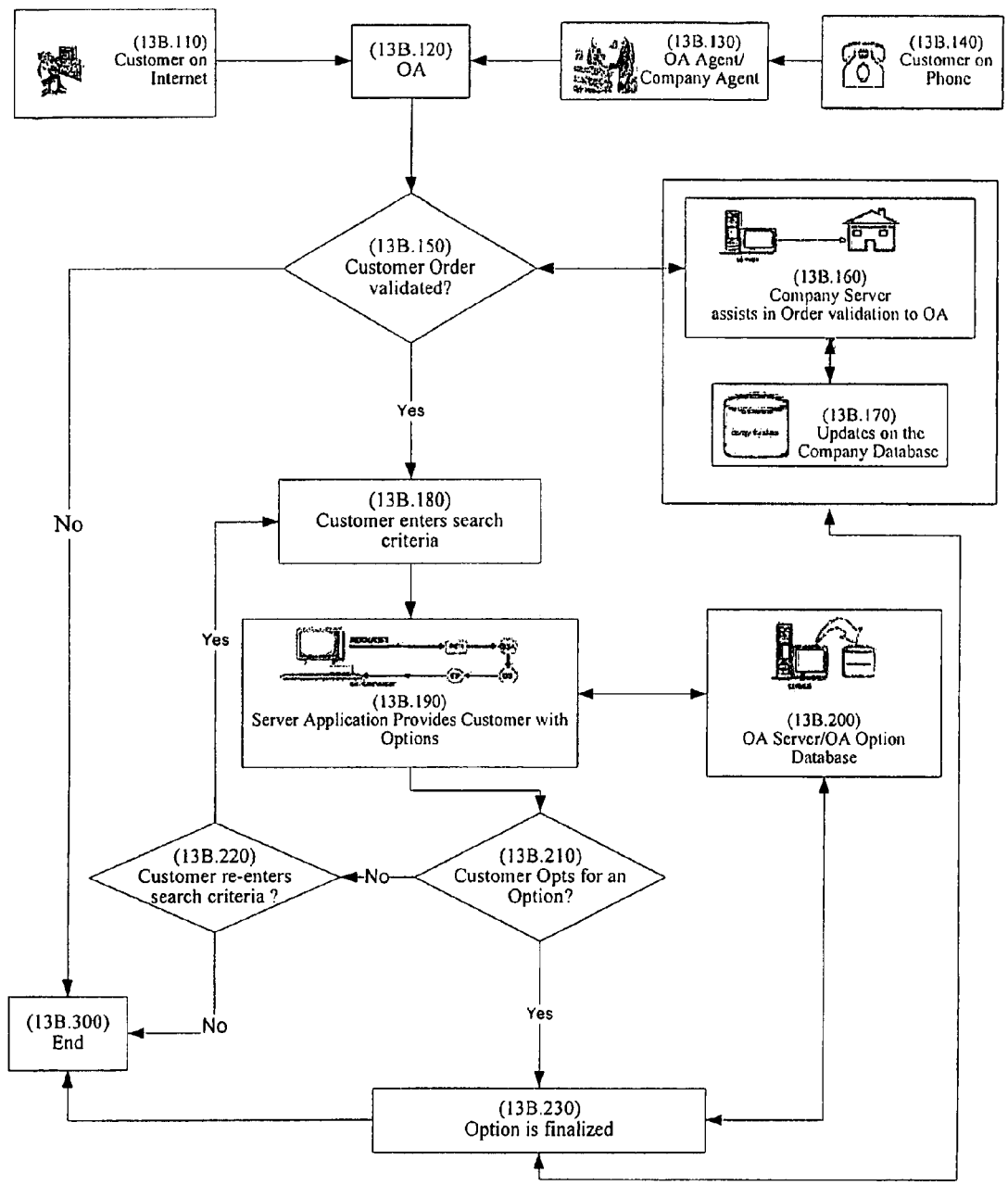
FIG. 13B is a diagrammatic illustration of one of ways of interaction between the customer and the OA and/or the company.

The customers may approach OA in many different ways and the same may depend on one or more factors including, but not limited to, way of implementation, type of implementation, one or more factors of choice of the company, OA, third entity and/or any combination thereof. In one of the ways customer may approach OA through phone as shown in Box 13B.140 and Box 13B.130 of FIG. 13B to avail services from the OA. In another instance as shown in Box 13B.110, the customer may approach OA through Internet. The customer may use other ways of approaching the OA, which may include, but not limited to, fax, telex, mail and personal contact. In one of the implementations of the OA Business model, the OA may validate the Order with which a customer wishes to avail an option and it may be validated in coordination with the company from whom the customer has received said Order as shown in Boxes 13B.150 and 13B.160. Order validation process runs to validate the Order from the company server and the data store or database may be updated accordingly as shown in the Boxes 13B.150, 13B.160 and 13B.170. The validation process may involve back and forth interaction between the data store or database and/or servers of the OA and/or the company and/or any third party. There may be updates in the data store or database even if the Order is not validated. The company server may also provide OA with the information of its inventory.

If the Order is validated, the process may request the customer to enter the search criteria. Search is made corresponding to the search criteria entered by the customer (Box 13B.180). The server application may be used to provide a given set of Options corresponding to the search criteria (Box 13B.190). To provide the set of options, the server application may interact back and forth with OA server and/or OA option data store or database.

Next, if the customer opts for one or more options (Box 13B.210) and finalizes the same (Box 13B.230), various databases relating to the company, OA and/or any third party may be updated and the relevant transaction along with other information may be stored and/or updated as per Boxes 13B.170 and 13B.200. Once the databases are updated on finalization of the option, the control goes to Box 13B.300, where the process ends.

If the customer does not opt for the options presented, another test is performed to determine whether the customer wants to re-enter, modify and/or repeat the search criteria (Box 13B.220). If so, the process loops back to Box 13B.180, where the customer may be required to re-enter, modify and/or repeat the search criteria. If the order is not validated or if the customer wishes not to re-enter/modify and/or repeat the search criteria, the control goes to Box 13B.300, where the process ends.

In one of the implementations of this business model and system, the servers and/or the data stores or databases may belong only to the company, OA, third entity and/or any combination thereof.

Information Technology System for the Value Option Framework

A client-server architecture may be used to implement the value option framework. However, a company may use a computer hardware and software infrastructure of its choosing to implement a particular value option framework for achieving concurrent optimization.

One or more servers may be used for the system and one or more medium of communications may be used between the customer and the company and/or the OA and vice versa including, but not limited to, a highly secured VPN and Internet. There may be a cluster of servers to implement the system. One or more of such servers may be located at the premises of the company, OA, third entity and/or any combination thereof. Such premises may also be an offshore location which may or may not be accessible remotely. One or more database may be involved and may be updated on a real time basis.

Figure 13C:
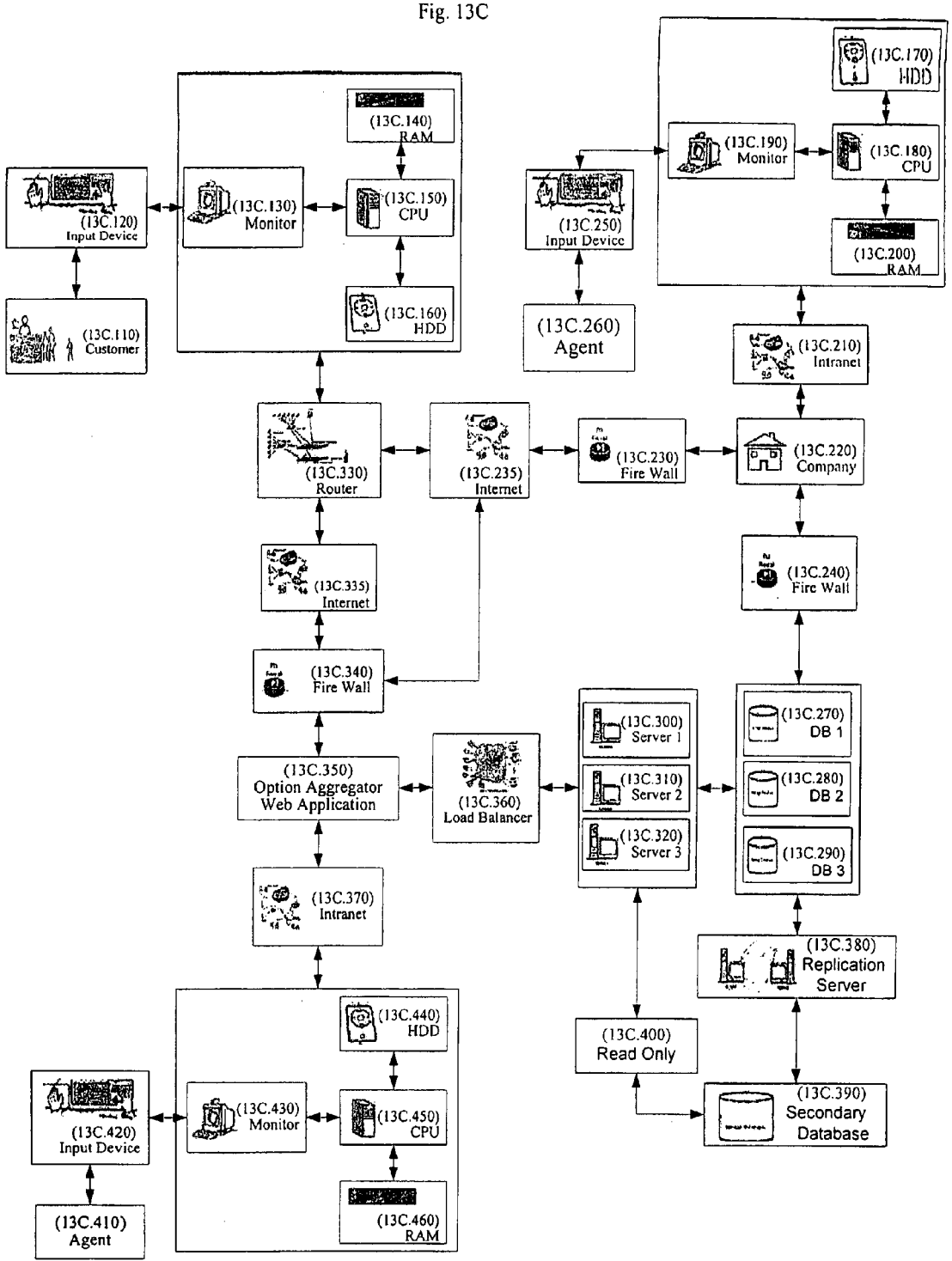
FIG. 13C is a diagrammatic illustration of one of the network system to implement the system.

FIG. 13C shows one of the ways by which the different entities involved and participating in the value option framework, interact and may participate in the value option framework. There may be other ways for implementing the value option framework which may depend upon including, but not limited to, the scale of the implementation, business requirements and number of entities involved. The entities may interact through a series of hardware products and services with the OA/company server(s). The OA may or may not be different than the company and the OA server may be the same as that of the company server. One of the entities shown in FIG. 13C is customer (Box 13C.110), who uses input device (Box 13C.120) to enter the requirements. The customer inputs are processed through the CPU (Box 13C.150) and one or more Hard Disk Drives (Box 13C.160). RAM (configuration of which may depend upon different factors) is used as memory device (Box 13C.140) while processing the customer input. The customer may approach the OA and/or the company through one or more series of Routers, Internet, Firewall and other hardware (Boxes 13C.330, 13C.335, 13C.340 respectively). The interactions between the company and/or the OA and the customer may pass through one or more load balancers (Box 13C.360) that distributes load across one or more servers as shown in Boxes 13C.300, 13C.310 and 13C.320. OA servers may update one or more primary database as shown in Boxes 13C.270, 13C.280, 13C.290. There may be one or more secondary databases (Box 13C.390) that may only be in the "Read Only" form (Box 13C.400) and may be updated through one or more replication servers (Box 13C.380). Alternatively, the company may have one or more separate temporary database structure wherein the entries are updated and stored until the final update is made in one or more main databases. One the final update is done, the entries in these temporary databases may be removed.

OA may interact with the application through Internet (Box 13C.350). OA application servers may also distribute load between one or more servers of OA and/or the company through one or more load balancers. Agent (Box 13C.260) may interact through input device as shown in the Box 13C.250. Input information may be processed by the CPU as shown in the Box 13C.180 with the use of one or more RAM, Hard Disk Drives (HDD) as shown in the Box 13C.200 and 13C.170 respectively. It may interact with the company through the Intranet (Boxes 13C.210 and 13C.220). The company and the OA may interact through a series of routers, firewalls and Internet (Boxes 13C.330, 13C.335 and 13C.340).

There may be another agent on behalf of the OA (Box 13C.410) which may input through one or more input devices (Box 13C.420). The information may be processed through the monitor, one or more hard disk drives, RAM and CPU as shown in Boxes 13C.430, 13C.440, 13C.460 and 13C.450 respectively). One of the ways in which said agent may interact with OA is through highly secured Intranet as shown in Box 13C.370.

The entire process may run at the premises of OA, company and/or any third entity or any combination thereof. It may also be possible to run a part of the system at one place and rest at one or more other places. The system may also be implemented even if one or more servers may be kept offshore locations and may be accessed remotely. The geographical locations of one or more hardware product and/or services may be different depending upon including, but not limited to, the factors of company's choice, ease of accessibility, infrastructure facilities. The structure or the interaction architecture of the system may vary depending on factors including, but not limited to, the set up of the company, changes in the technology and with the introduction of new and better technology enhancing the interaction process.

Information technology is a part and parcel of the novel invention. The value option framework as a system may require integration with various hardware and/or network services. This is illustrated in FIG. 13D where a detailed implementation of one of the stages of value option framework is described duly integrated with the hardware products and services.

The customer inputs search criteria as shown in the Box 13D.100. The web page and/or the application may be hosted on the company's server, OA's server, any third entity's server and/or any combination thereof. Such a server may be located at the premises of the company, OA, any third entity location and/or any combination thereof and such a location may include an offshore location. The customer may approach the web (server) application of the company through Internet and one or more Firewall etc. as shown in the Boxes 13D.110 and 13D.120. The medium by which a customer reaches (approaches) the company web (server) application may vary depending on different conditions which may include, but not limited to, the best available communication medium at a particular time, scale and type of implementation of the value option framework and factors of company's choice.

Server application runs the search algorithms (Box 13D.130) corresponding to the customer requirements in association with one or more servers of the company as shown in the Boxes 13D.150, 13D.160, 13D.170 respectively. The servers may include, but are not limited to, web servers, application servers, database servers and networking servers.

Said application may be hosted internally on one or more servers and databases either by the company and/or the OA or may be hosted on any third party's server. The servers may also be the servers of the OA or the servers may be run jointly by the company, OA and/or a third entity. Load balancer (Box 13D.140) may be utilized to distribute load across one or more company servers. The search algorithm may interact back and forth with one or more database including, but not limited to, email database, option database, inventory database, customer database, company database as shown in Boxes 13D.230, 13D.240, 13D.250 and 13D.260.

A test is performed to determine whether the outcome of the search algorithm is positive as shown in the Box 13D.180. If the outcome is negative, customer may be asked to re-enter/modify the search criteria (Box 13D.210). If the outcome of the search algorithm is positive, the customer is provided with a list of options as shown in the Box 13D.190. Once the customer is provided with a list of options to choose from, another test is performed to determine whether the customer has opted for one or more options (Box 13D.200). If customer has not opted for an option, then customer may be asked to re-enter/modify the search criteria (Box 13D.210). If the customer re-enters the search criteria, the control loops back to Box 13D.130 wherein the server application runs the search algorithm on the basis of the inputs received from the customer.

If the customer opts for an option and the option is finalized, at least one payment transaction is executed (if any) (Box 13D.300) and one or more databases may be updated (Box 13D.270) through interne, firewall as shown in Box 13D.320 and 13D.330. Said updates may also be done through one or more routers, highly secured VPN Network etc. Said primary databases including, but not limited to, email database, customer database, inventory database, option database may be updated correspondingly as shown by the Boxes 13D.230, 13D.240, 13D.250 and 13D.260. There may be corresponding updates in the secondary databases also (which are in "Read Only" format) as shown in Box 13D.290 through one or more replication servers (Box 13D.280). Alternatively, the company may have one or more separate temporary database structure wherein the entries are updated and stored until the final update is made in one or more main databases. One the final update is done, the entries in these temporary databases may be removed/deleted/discarded.

The algorithm ends after the needed updates are made in one or more databases and/or one or more severs or if the customer desires not to re-enter/modify the search criteria (Box 13D.400).

Figure 13E:
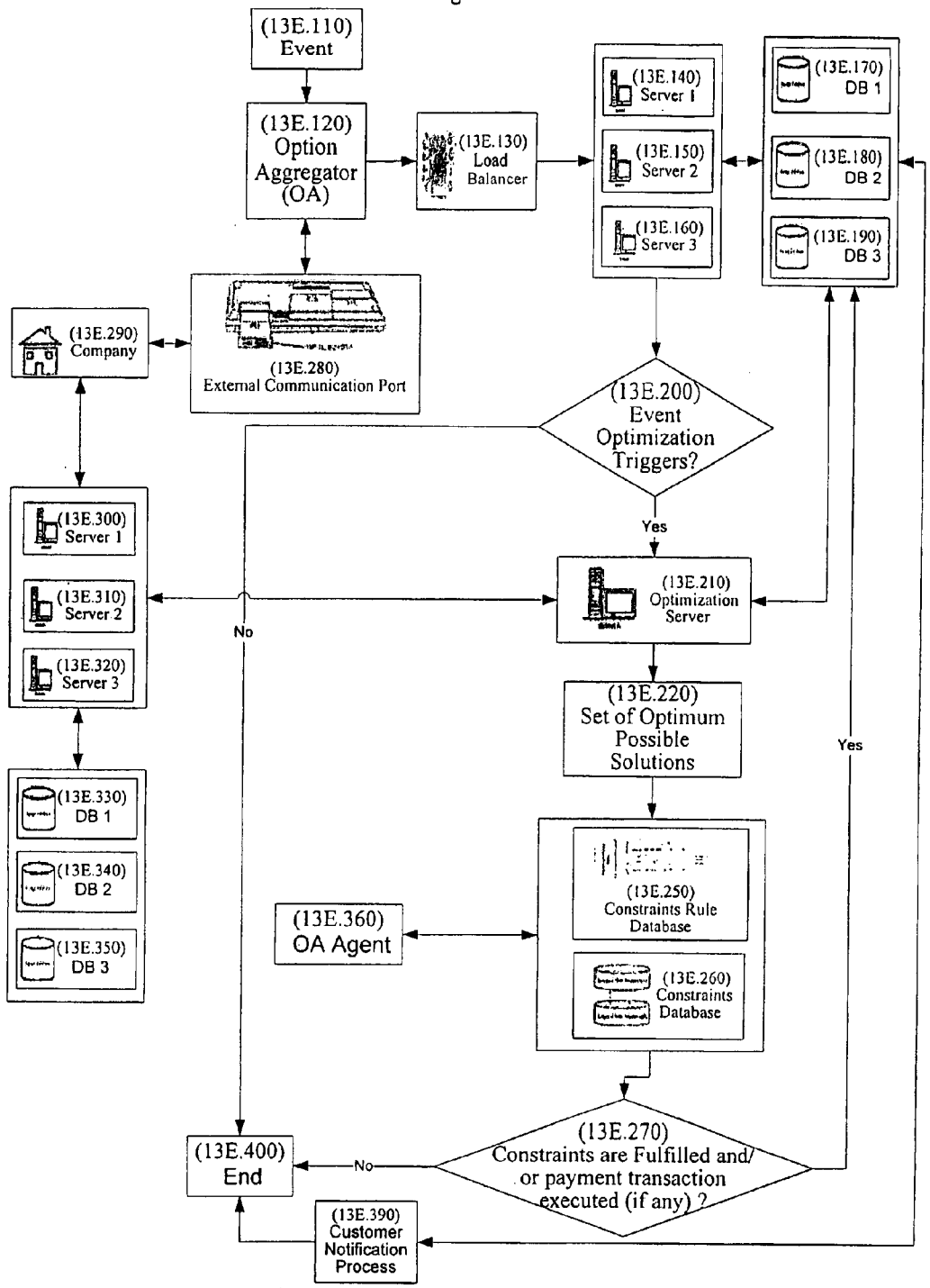
FIG. 13E is a diagrammatic illustration of implementation of event optimizer stage of a value option framework as a system.

Second stage in the value option framework is achieving concurrent optimization for at least two of the company, customer, OA, third entity or any combination thereof on occurrence of an event. FIG. 13E describes one of the ways of using the information network system in which interaction between OA, company and event (which may be triggered by the company, OA, customer, any third entity or any combination thereof) takes place.

FIG. 13E presents a diagrammatic representation of a chain of actions that takes place corresponding to occurrence of an event. There may be one or more different ways in which said action may take place and may depend upon the factors including, but not limited to, the arrangement between the OA and the company, factors of OA and/or company's choosing and one or more mediums of technology utilized in the system.

If an event is reported to an OA (Box 13E.110 and Box 13E.120), one or more load balancers (Box 13E.130) may be used to distribute the load across one or more servers (Boxes 13E.140, 13E.150 and 13E.160). One or more different databases (of OA, third entity, the company and/or any combination thereof) may also be updated as per the requirement and the nature of the event. Information is processed through the servers using one or more RAM, Hard Disk Drives and other hardware products and corresponding to the occurrence of the event, updates are made in one or more databases as shown by the Boxes 13E.170, 13E.180 and 13E.190. One or more company servers and databases (shown by Boxes 13E.300, 13E.310 and 13E.320 and Boxes 13E.330, 13E.340 and 13E.350 respectively) may also be updated using external communication medium/port (Box 13E.280). The servers may include, but not limited to web servers, application servers, database servers and networking servers. One or more said databases include, but are not limited to, email database, option database, customer database.

Next, a test is performed to determine whether the Event Optimization process has been triggered by the occurrence of the event as shown in the Box 13E.200. If the Event Optimization process has been triggered, the process goes to the Optimization server (Box 13E.210). If the Event Optimization process has not been triggered, the process ends at Box 13E.400.

The Optimization server interacts with one or more databases including, but not limited to, the optimization rule database and customer rule database as shown in the Boxes 13E.170, 13E.180 and 13E.190. One or more optimization algorithm may be run within the optimization server using one or more RAM, Hard Disk Drives. As a result of optimization algorithm, the Optimization server may give one or more possible optimum solutions depending on the factors and rules determined by the company, OA and/or any third entity or any combination thereof, as shown in the Box 13E.220. A set of possible optimum solutions, then, passes through one or more databases including, but not limited to, constraints rule database and constraints (or validation) database as shown by the Boxes 13E.250 and 13E.260 respectively. While interacting with said database, the OA agent may also be approached as shown in Box 13E.260.

Next, a test is performed to determine whether the constraints are fulfilled and/or payment transaction is executed (if any) (Box 13E.270). If the constraints are fulfilled and the payment transaction is also executed (if required), a series of database updates as shown by the Boxes 13E.170, 13E.180 and 13E.190 may be done. Once one or more database are updated, the Customer Notification Process (Box 13E.390) takes place, in which the customer is notified, and the algorithm then ends in Box 13E.400. If the constraints are not fulfilled and/or payment transaction (if needed) is not executed, the process ends at Box 13E.400.

One or more such kind of information technology system may be implemented for the specific value option framework. The system may be customized as per the specific requirements of the company, value option framework, OA, any third entity, customers and/or any combination thereof.

Benefit of Using the System and Method

Through this method, a new efficient approach is introduced for managing customer relationships, sales cycles, marketing, customer service, market research and customer feedback. It eliminates manual, time-consuming processes and replaces those with an efficient, automatic process.

By maximizing total value for its customers, a company can greatly improve its overall business prospects. The company can look to build very high customer retention rates and also increase the number of new customers gained per unit time. It can help to increase the overall sales and thus help increase the overall business value. The company may distribute a portion of additional value gained back to its customers to further strengthen its relationships with them, if it wishes.

A company may encourage customers to "opt in" to this system and provide the customer's preferences by giving rewards to customers to provide these preferences and commit early. The value options may be created and priced to motivate customers to make choices that both satisfy their needs and simultaneously allow the company to improve its operations.

This method further adds new dimensions to business parameters like inventory. Previously, for a company, inventory was either "Committed" or "Available." This method adds a new dimension of "flexibility". With the customer preferences and needs taken beforehand, we add the dimension of flexibility to the inventory. For example, a booked flight seat would conventionally be called committed inventory. But now within the new methodology, if the ticket-holding customer is flexible, his ticket may fall into a pool of flexible inventory availability, which may be sold to other customers, if necessary.

Another advantage is that the method creates a new type of inventory, called customer inventory. Once the method had been used for some period of time, a company, by using its powerful value option framework, would be able to capture its customers' and potential customers' future needs in advance. In other words, within the realm of company product offerings, the company would collect information on which customers want to purchase what products, when and with what specifications or parameters. Combining this individual customer data across thousands of customers would generate a customer needs and preference database with appropriate classification and parameters. The needs (and/or preferences) of this database could be classified as customer inventory wherein the items in inventory are the needs of several groups of customer with similar needs. Once the company has built such a database, they can use the customer inventory as and when needed in optimizing their internal operations to maximize value for both the company and the customers.

The method allows a company to move from a knowledge-based system to an expert system, which optimizes the decisions based on customer preferences and company economics. The method allows the companies to market a whole new paradigm of services and products surrounded around their original product offerings. This is achieved partly by unbundling formally bundled components of existing products, into components offered to the customer and partly by building new products and services. This allows the customers to choose product features they wish to purchase and saves the company from making investments and incurring costs in providing product components to those who don't want or desire those components.

In summary, it can be said this method accomplishes the following: (1) makes a business more attractive to customers by enabling customers to express their preferences; (2) makes a business more efficient and reduces costs; (3) allows a company to handle problems and disruptions in a quick, efficient manner to generate high customer satisfaction and keep their costs low; (4) helps a company to increase and strengthen its customer base, improve sales per customer, and customer retention, and (5) helps to increase the value customers gain from the purchased products.

The above method may be applied to several industries including, without limitation, airlines, hotels, automobiles, media, entertainment (television, radio, internet, etc.), furniture, insurance, computer hardware, travel (e.g., vacations, car rentals, cruises), events (such as theatre, movies, sports games etc.). There may be several other industries that may benefit by using the new system and method.

Some value option frameworks related to the invention were described in full detail in incorporated-by-reference patent application Ser. Nos. 11/506,451, 11/474,115 and 10/973,802 and in each of international applications PCT/US2007/018290, PCT/US2007/014654 and PCT/US2007/014653. Discussions of these VOFs may be omitted or abridged herein; however such aspects are nonetheless intended to be part of this application and reference to these other applications may prove helpful for a fuller appreciation of the invention. A few value option frameworks will now be described in detail.

Upgrade Product Option (UPO) Value Option Framework

The creation and utilization (in two stages or acts) of another value option framework will now be discussed. This is the Upgrade Product Option (UPO) VOF. A company may implement a UPO VOF in any industry. The customer preference for higher ranked products (defined below) is used as the targeted value element.

The first stage in the UPO VOF involves steps (or acts) of: capturing customer dynamics, assessing company operations and economic factors, integrating customer dynamics with company economic factors, formulating the VOF and optimizing the VOF. The second stage involves carrying out a dynamic interaction with the customer and then executing an Event Optimizer process. The specific detailed steps with respect to the UPO VOF will now be discussed.

The following terms are relevant to the UPO VOF. The terms "Up Product" or "Up Products" refer to one or more products that rank higher than the other products of the company. The ranking here is assumed to be based on past customer preference and may differ from one customer to another. In the same context, the lower ranked product is referred to as the "Base-Product". The term "Base-Product" also refers to the product, which a customer has currently booked (or selected or purchased). And in that context, an "Up Product" refers to any higher ranked product to which the customer can theoretically be upgraded to.

Figure 14:
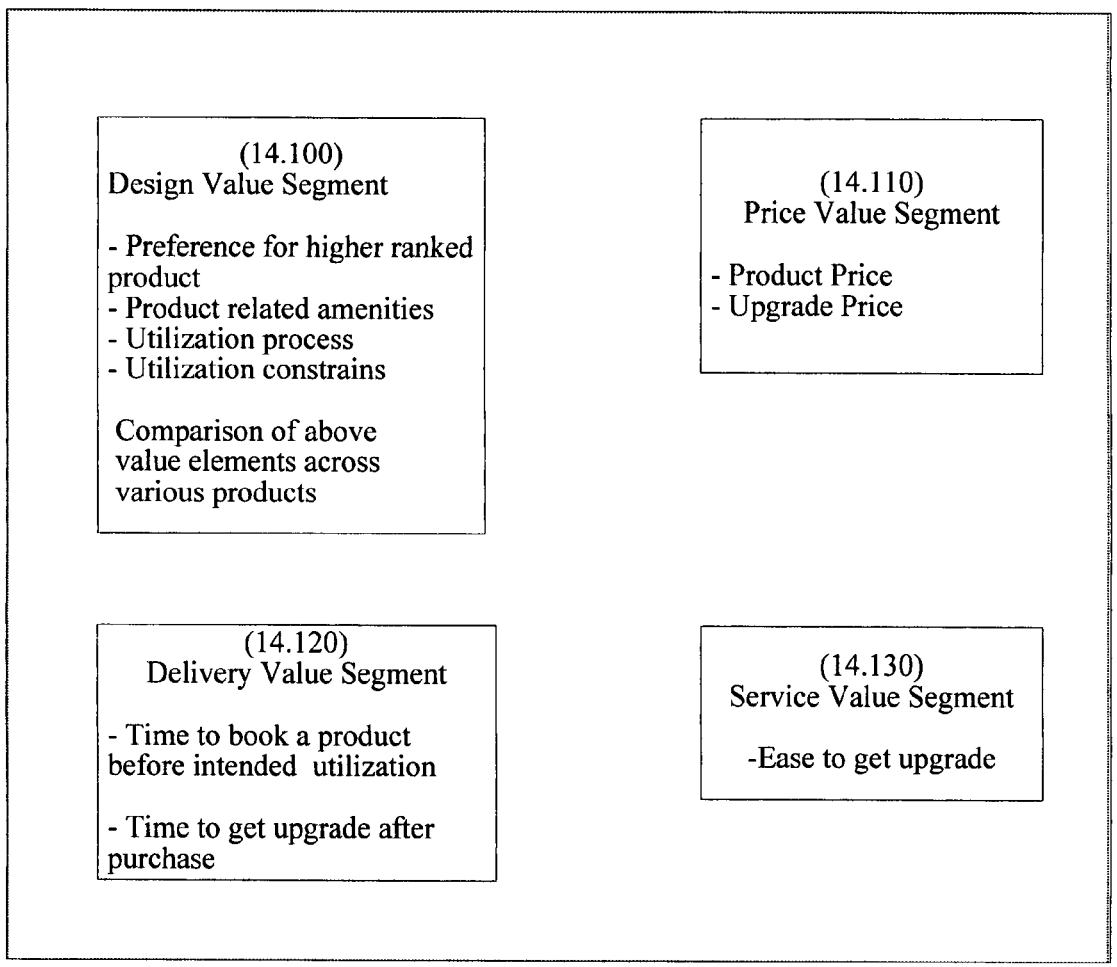
FIG. 14 is a diagrammatic illustration of an exemplary set of value segments and their value elements related to the UPO VOF.

First Stage: Formulation of "UPO" Value Option Framework (1) Capturing Customer Dynamics FIG. 14 shows an analysis of the value elements that are believed to matter the most to customers in relation to a product upgrade. In the design value segment (shown in Box 14.100), important value elements may include, but are not limited to, customers' preference for higher ranked products, utilization process, amenities and special characteristics and/or features, if any, associated with the products. In the price value segment (shown in Box 14.110), important value elements may include, but are not limited to, Product Price and upgrade price. In the delivery value segment (shown in Box 14.120), important value elements may include, but are not limited to, time to request and get upgrade award, and how long before utilization the product must be purchased for the customer to be entitled to an upgrade. In the service value segment (shown in Box 14.130) important value elements may include, but are not limited to, the ease of getting the upgrade. It may be important to estimate the relative preferences and utilities of these value elements to customers for various products.

As explained earlier, customers assign ranking to different product offerings. A customer may classify the product offerings into different groups (that may or may not be mutually exclusive) and assign a relative rank to each of them. For some product offerings, rankings may be implicit or well established or well known; for which a company may be able to assume/determine customer ranking that might satisfy the majority, based on an analysis of past customer behavior or other forms of market analysis. For some product offerings, the ranking may be very subjective; and may differ from one customer to another, and even for the same customer, may differ from time to time. For such products, a company may need to perform detailed interaction with customers to determine their ranking. In a customer's frame of mind, products with higher perceived utility (satisfaction) values are generally ranked higher than those with lower perceived utilities. Most customers would prefer to get a higher ranked product over a lower ranked product. When customers cannot get their desired product(s) due to unavailability, price or any other reasons or any combination of the above, they have to settle down with something below their desired value.

(2) Assessment of Company Economics

An assessment of the crucial economic factors of a company, as indicated in Box 15.100, may reveal these factors to include, but not be limited to, the fixed and variable costs, non-uniform distribution of demand across different Products under the same category (or products from various categories), higher price for higher ranked products, varying capacities of higher ranked products much more than the capacities in lower ranked products, possibility of revenue dilution, increasing competition from other companies, lost opportunity costs in offering free upgrades to customers through existing upgrade programs (if any) and so forth.

An assessment of the crucial economic factors, such as costs, constraints and capacities, may be performed, to determine the factors that affect the profitability, growth and goals of a company in any industry. It might be beneficial if the company utilizing the inventive system and method were able to express cost elements in a real-time or quasi-real-time (i.e., up to date) dynamic fashion so that such information may then be used to assess the profitability or contribution of each product sale opportunity, and to facilitate the operation of the Event Optimizer (so that offers and actions can be based on real-time or near-real-time information). Certainly that is not always required and might not be required in an industry where there is little change in cost elements over a significant time interval.

(3) Integration of Customer Dynamics with Company Economic Factors

Figure 15:
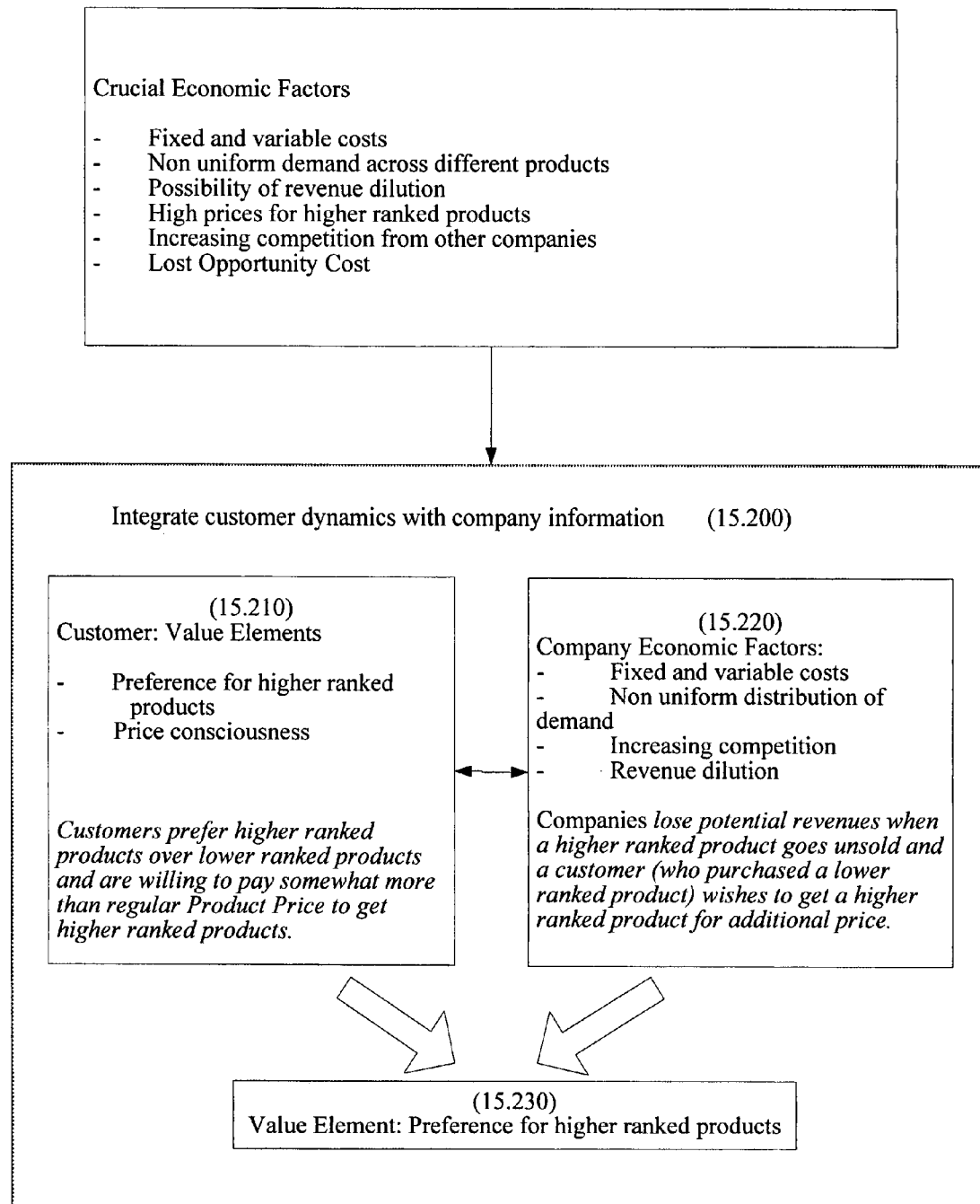
FIG. 15 is a diagrammatic illustration of company economic factors and mapping between customer dynamics and company economic factors in relation to UPO VOF.

FIG. 15 also illustrates an example of how a mapping may be done, between customer value elements and company profiles, for the UPO VOF in any industry. On one side, there are customers who prefer higher ranked products to lower ranked products. However, customers are also concerned about the price differences between the higher ranked and the lower ranked products. All customers cannot afford to buy confirmed higher ranked products at regular prices. However, many customers would be willing to pay more than their Base-Product Price to get higher ranked products. On the other side of the screen, if a company has surplus inventory or capacity or there is delay in selling of a higher ranked product, that condition probably represents the loss of potential revenue (and/or opportunity cost) for that company. This is true even if no other potential customers have been turned away, simply because there may be one or more customers, who have purchased other lower ranked products (Base-Products) of the same (or different) company, willing to switch to the unused higher ranked surplus products or capacity (i.e., Up Products) at appropriate price/terms, but they are not given an opportunity to do so. It would be certainly very helpful for a company to know the relative preferences of customers with respect to higher ranked products. However, today there is no framework that allows companies to do so in an optimal fashion such that both company and the customer benefit at the same time. An opportunity, thus exists to concurrently generate an incremental revenue benefit for the company from consumer surplus, and to maximize the purchase utilities for the customers as a group (includes those who have a preference for higher ranked products at appropriate prices). More specifically, as shown in the interaction between the Box 15.210 and Box 15.220, a mapping is performed between important customer value elements and the company economic factors. The value element "preference for higher ranked products" is extracted, as shown in Box 15.230, and a UPO framework is created.

Figure 16:
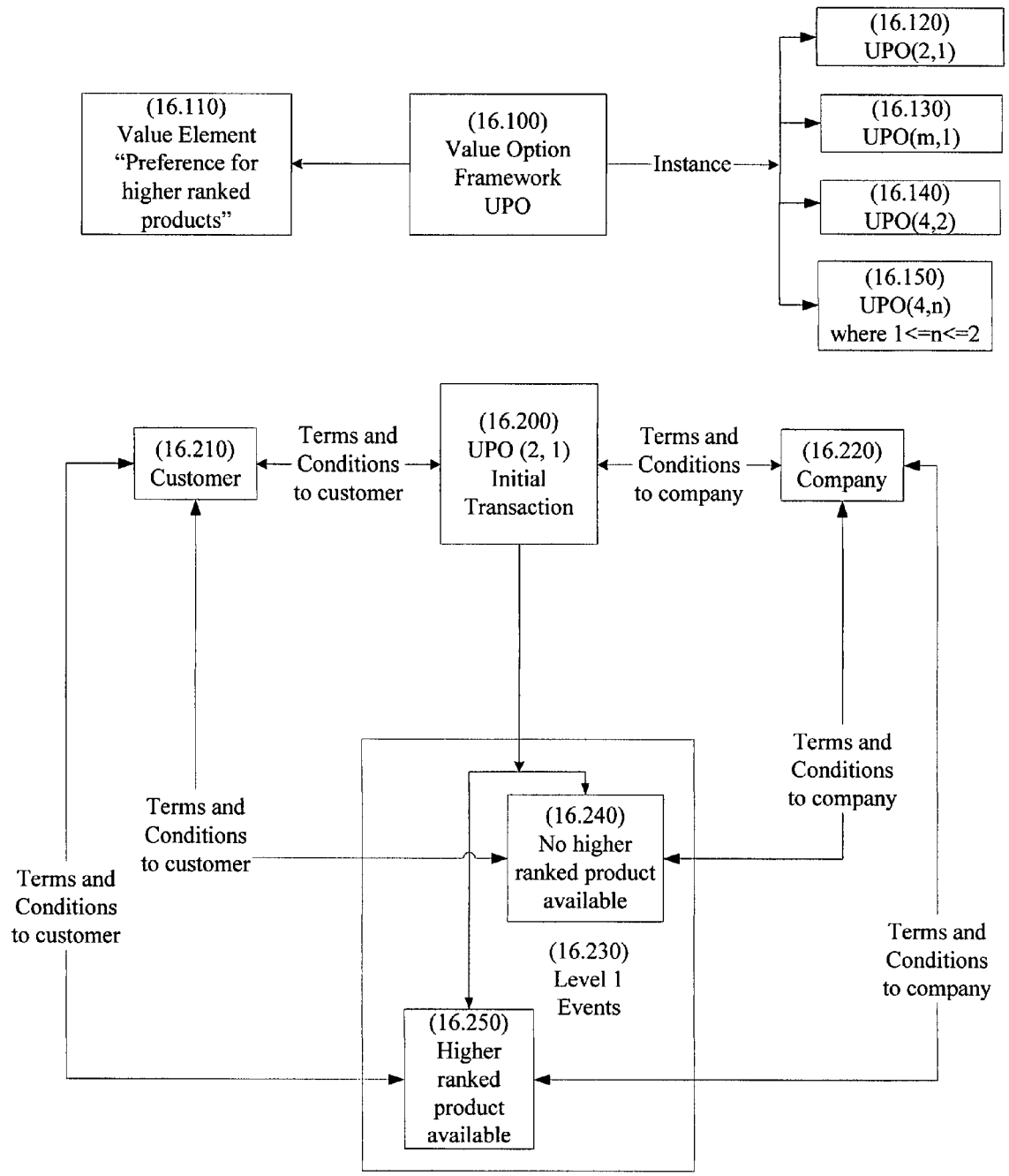
FIG. 16 is a partially-diagrammatic, partially-flow diagram representing the structure for creating a UPO Value Option Framework.

(4) Formulation of "UPO" Value Option Framework Structure of UPO Value Option Framework in any Industry FIG. 16 displays the structure of a UPO value option framework (shown in Box 16.100) in any industry. The UPO VOF is related to the value element "preference for higher ranked products", as shown in Box 16.110.

In the "Initial Transaction" for UPO, shown by Box 16.200, a customer (shown by Box 16.210) and a company (shown by Box 16.220) transact on the UPO value option. The first event in the UPO VOF is referred to as Initial Transaction, shown by Box 16.200, in which a customer (shown by Box 16.210) and a company (shown by Box 16.220) transact on a UPO value option. There may be one or more Events (shown by Box 16.230) that follow Initial Transaction.

In the successful Initial Transaction for a UPO VOF between the company and the customer, the customer may receive a conditional option for an upgrade and the company may award the upgrade to the customer provided at least one condition on the option is satisfied and the company receives the payment for said upgrade. The customer's acceptance of said option may confer upon the company a right to enforce a payment obligation or relinquishment of one or more rights or both, as the case may be, on the customer, if said customer receives upgrade. A customer may select (purchase) one or more Base-Products and then select UPO option on one or more Up Products. A company may award one or more Up Products from the selected UPO products or from other products or any combination thereof. The company may or may not be the seller of said product and/or said option.

In another implementation of the UPO VOF, during a successful Initial Transaction, a customer may receive an option to utilize up to 'n' out of 'm' selected products, where 'n' is less than or equal to 'm' (said 'm' products termed "UPO Products"). The 'n' products that are finally selected are termed "Chosen Products". After each of the n products is defined (or selected or chosen or received), the customer may have the right to utilize (or can utilize) said Chosen Product. Apart from the Chosen Products, the remaining products are termed "Released Products". The Released Products (if any, that were held or blocked for said customer) may be sold to other customers as normal products or UPO Products or used for other purposes. The Released Products in relation to said option may be reused by the company before, after, at or any combination thereof, the time the Released Products and/or Chosen Products are defined (or received or selected). The m UPO Products would contain all the selected Base-Products and Up Products, and the n Chosen Products would contain all the defined Base-Products and Up Products that the customer may utilize. Ideally, the customer may prefer to receive only Up Products in the defined n Chosen Products, since the customer would have higher utility for the Up Products, however, the Chosen Products may contain Up Products or Base-Products or both. Released Product may be utilized to generate revenue with or without reusing said released product.

Numerically, the value of 'm' is greater than or equal to 2 and the value of 'n' may vary from '0' to 'm' depending upon the specific implementation of the UPO framework. The value of 'm' and/or 'n' may be known (or defined and/or re-defined) before, during, after the Initial Transaction and/or any combination thereof. The value of n may be limited to less than the value of m, or $n<m$ (i.e., $n<=m-1$); however, in some situations, n may be equal to m. The value of 'n' may or may not be known (or defined and/or re-defined) at the time of the Initial Transaction. The value of 'm' and/or 'n' may be defined by the company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The delivery of an option may include, but not limited to, electronic delivery of the option, physical delivery of the option, any other mode of delivery or any combination thereof. Once said option is delivered, one or more of m products may be available for use by the company, an entity other than the company and/or any combination thereof. The value of 'n' may be defined before, after or any time, the option being delivered to the customer. The delivery of option may occur in relation to the customer purchasing one or more products. The delivery of option may also occur in relation to the customer purchasing a product other than the product on which the option may be delivered. The customer may purchase a product other than the product on which the option is delivered to the customer. Said n products may be defined in one or more transactions. The company or an entity other than said company or any combination thereof may upgrade the customer without any subsequent interaction after delivering the option. However, in different implementations, the company (or an entity other than said company or any combination thereof) may upgrade the customer after one or more subsequent interactions.

The company and/or an entity other than the company may provide a data store which may contain data representing, with respect to one or more products, one or more options offered by the company and/or an entity other than the company and may use a server to receive inputs for at least said option and may search the data store for eligibility of products for at least said option. The server may display the search results and may receive one or more decisions of the customer about the acceptance of one or more of said search results. The company and/or another entity may operate an event optimizer system to receive data at least pertaining to said acceptance, and in response to the occurrence of one or more selected events from a set of one or more potential events, may execute one or more corresponding event response algorithms, wherein one or more of the servers or the event optimizer system may concurrently optimize a value for at least two of the company, the customer and an entity other than the company. Said search may include searching for one or more products or options based on said inputs. Said search may also identify results at least after taking into account business economics of at least the company offering said product or option. The search results may or may not include one or more options or products. The search results may include a product which may include an option and for which a price for the inclusion of said option is not separately identifiable within the total product price. The product eligibility may be decided by the company and/or an entity other than said company. Data pertaining to at least one of demand, preferences and associated relative utilities of the customer may be defined, implicitly or explicitly, at least during the interaction, before the interaction or at any other time.

The UPO Products may be selected by the company, the customer, another entity or any combination thereof. The UPO VOF may enable a company and/or another entity to obtain preferences for Up Products from UPO customers (i.e., those who select UPO) and use said preferences to satisfy the product needs of other customers and/or to optimize the value for company, customers, another entity and/or any combination thereof. Therefore, the company would usually have the right to select (or define) the Chosen Products. However, in different implementations of UPO VOF, the company, the customer, another entity or any combination thereof may select one or more of the Chosen Products related to a UPO. The UPO Products and the Chosen Products may be selected by the same entity, different entities or any combination thereof. For example, the customer may select the UPO Products and the company may select the Chosen Products out of the UPO Products. The company may incorporate the customer information and the data related to the UPO into the sales, production, inventory, other database or information system or any combination of the above.

The option granted to the customer may be conditional. One such condition (to upgrade) may be availability of the Up Product associated with the option. It may be possible that the Up Product availability associated with the option is the only condition included in the UPO VOF. In one of the implementations of the UPO VOF, the condition for upgrade may include at least one condition in addition to the availability of an upgrade. If so, after receiving the UPO, a customer may receive a conditional right to be upgraded if the Up Product is available at a certain time and under certain conditions established as the terms and conditions of the option contract. The time when an Initial Transaction is completed (i.e., the customer receives a UPO) is referred to as the Initial Transaction Time (or ITT, in short). One or more Base-Products and Up Products may be selected, at one or more times, before, after, during, or any combination thereof, the Initial Transaction and/or the time said option is delivered to the customer (or the customer receives said option) or any combination thereof. All the UPO Products may be selected concurrently (i.e., all together in one transaction) or sequentially (i.e., in multiple transactions).

In the sequential case, a customer may select one or more Products in one or more transactions before the Initial Transaction. Said selected Product(s) (let's say X number of them), thus, may be considered as part of m UPO Products of the UPO (m, n) transaction, and the customer may select only the remaining (m−X) number of UPO Products during the Initial Transaction. All the transactions used to select (or receive) all the Base-Products of a UPO transaction may be related to each other, and hence, may be considered as "related transactions" (as defined earlier).

In a UPO VOF, the sequential process may comprise a number of "related transactions" when all the UPO Products are received one after another by paying/receiving a price in one or more transactions or acts. The price may include, but is not limited to, a monetary value, coupons, discount vouchers, other benefits such as loyalty program benefits, or any combination of the above. The transactions may be related due to a relationship during the Initial Transaction, one or more of the previously executed transactions, any other transaction or combination thereof. In another implementation, the company and/or an entity other than said company may not exercise its right of enforcing the payment obligation upon the customer.

The UPO VOF may also impose other conditions on the company and/or the customer. For instance, the option may impose a payment obligation on the customer if the company upgrades said customer. In another implementation, the option may impose a payment obligation on the customer to make a payment to the company and/or an entity other than said company at a time the company delivers said option. The option may confer a right upon the company and/or an entity other than said company to enforce payment obligation on the customer. The company may take a pre-authorization from the customer to charge the customer using any payment mechanism including, but not limited to, credit card, debit card, debit bank account, third party payment service provider, advance payment by the customer, any other means, or combination thereof. The company may award the upgrade to the customer only if the company receives a payment from the customer in relation to said upgrade. The customer may be required to pay one or more prices at one or more times to receive the option for the upgrade. The company may award the upgrade to a selected group of customers based on any criteria of company's choosing. For example, a company may choose to give preference to its frequent buying customers or high value customers over others. However, the company and/or an entity other than said company may or may not exercise its right of enforcing the payment obligation upon the customer. The customer may become entitled to the option to get an upgrade by making a payment, at least in part, when purchasing said product.

The UPO VOF may also confer a right on the customer to enforce said upgrade provided at least one condition on said option is satisfied. For instance, a company may offer UPOs with preference orders attached to it, i.e., if a customer purchases (or receives) a UPO with a preference order of 1, said customer shall have the right to be the first customer among others to be awarded the upgrade. In this fashion, a right is conferred upon the customer to enforce the company to award the upgrade to the customer if Up Product is available at a certain time as per the terms and conditions of the option contract. The UPO VOF may also impose a condition on the company to offer the Up Product to the customer and the customer may have the right to choose between the Base-Product and Up Product and subsequently notify the company about the Chosen Product. A customer may or may not be under a mandatory condition to accept the Chosen Product as selected by the company. The company or the customer may have the right to enforce the Chosen Product on the other party as per the terms and conditions of the option contract.

In another implementation of UPO VOF, the option may require the customer to accept the upgrade offer. The upgrade may be an upgrade of at least one product. The customer may be upgraded to one or more than one Up Products. The customer may be upgraded, upon availability, to any of more than one Up Products. One available Up Product may lead to more than one upgrades. The customer may be presented a choice of conditional options to choose, prior to the company and/or an entity other than the company or any combination thereof, delivering at least one conditional option to the customer. The company may present to a customer said option requiring the customer to indicate the price the customer will pay for the upgrade if offered.

An instance of the UPO VOF is illustrated in FIG. 16. The Box 16.200 illustrates an example of the Initial Transaction between the customer and a company, where the company offers the UPO value option to the customer. In a successful Initial Transaction for the UPO option, a customer may be required to pay a price ($X) to receive said option for an upgrade from the Base-Product to the Up Product, and to agree to pay another amount ($Y) to the company if the company (then or later) upgrades the customer to the Up Product. A company may choose to create one or more instances of the UPO VOF based on factors including, but not limited to, number of UPO Products, Up Products or Released Products, pre-determination of a number of Up Products or Released Products, other factors or any combination thereof. For example, a UPO based on a combination of the number of UPO Products (or m) and Chosen Products (or n) would be UPO (m, n). Some UPO instances are shown in Boxes 16.120, 16.130, 16.140 and 16.150. In the UPO (2, 1) instance, the customer selects two UPO Products and the company may select any 'one' of those two Products as the Chosen Product. If the number of Chosen Products is pre-determined, the UPO (4, 2) instance may imply that the customer receives 4 UPO Products, on the condition that the company may select any 2 out of 4 Products as Chosen Products. When the number of Chosen Products is not pre-determined, the UPO (4, 2) instance may imply that the customer receives 4 UPO Products, on the condition that the company may select none, one or 2 Chosen Products out of UPO Products. There may also be a minimum limit on n. For example, the UPO (4, n) (where 1<=n<=2) instance limits the company to select either 1 or 2 Chosen Products out of the 4 UPO Products. As mentioned below in detail, such UPO VOF implementations may also have price conditions to the customer. For example, in a UPO (4, 2) implementation, a customer receives a UPO to receive two out of any four selected UPO Products, comprising two Base-Products, B1 and B2, and two Up Products, U1 and U2. The customer has made an Initial Payment of $1000. The company may define any two products as Chosen Products out of the 4 products as per the terms and conditions of the option contract. In the event, U1 or U2 or both is (are) defined as the Chosen Product(s), the customer is required pay $50 or $100 or $200 as the UPO Exercise Price, respectively. If neither U1 or U2 (i.e. none of the Up Products) is defined as Chosen Product, i.e., both the Base-Products (B1 and B2) are defined as the Chosen Products, then the customer is not required to make any payment to the company. Under the terms and conditions of the option contract, if U1/U2 are available, then the company may define U1 and/or U2 as the Chosen Product and thus, the customer is able to utilize the Up Product once the corresponding payment is made.

The Initial Transaction may have terms and conditions applicable to the customer or the company or both. These terms and conditions may be set, preferably, to concurrently benefit both parties. The connections between Box 16.200 and 16.220, and Box 16.200 and 16.210 refer to the terms and conditions to the company and the customer, respectively.

The UPO VOF may or may not include any constraints on the UPO Products. For example, a company may restrict UPO applicability and availability on Products that satisfy specific criteria. The two UPO Products may or may not include practically constrained Products. Practical constraints may include one or more constraints that will prevent a customer to utilize a given Product or prevent the customer from utilizing all the UPO Products. Such constraints may include, but are not limited to, time constraints, location constraints and so forth. In other words, it may or may not be practically possible for a customer to utilize one or more of the selected Products due to at least one practical constraint.

A customer may select (or receive) UPO Products in several ways; through mutual agreement (e.g., during a direct interaction such as a Product purchase), or the company may grant the UPO Products to the customer without soliciting their interest or permission. For example, to enhance customer satisfaction or for any other purpose, a company may grant UPO Products to customers based on the past customer behavior, interaction and so on.

The Initial Transaction may impose one or more conditions on the company. A company may be required to explicitly notify the customer prior to or no later than a given date and time (referred to as the Notify Deadline) regarding the Chosen Product. If there is no such explicit notification condition, the Chosen Product may be decided as per the terms and conditions of the option contract. In either case, (explicit or implicit notification), the date and time when the selection of the Chosen Product is notified to the customer is referred to as the Customer Notification Time (or CNT, in short). In the current discussion, the explicit notification condition is assumed unless specifically mentioned otherwise. The Notify Deadline may be pre-determined or may be determined later (i.e., after the Initial Transaction) by the company, the customer, any other entity, or any combination thereof.

A company may determine one or more Notify Deadlines for a product at one or more times (e.g., before, during, after the Initial Transaction or any combination thereof) using factors including, but not limited to, customer needs, expected value of the product, company profitability goals, any other factors or any combination of the above. Customer factors should also be considered in determining the Notify Deadlines, such as the flexibility trade-in periods desired by customers, or any other factor that may affect the behavior of a customer.

The Notify Deadline may be pre-determined or may be determined later (i.e., after UPO grant) by the company, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be offered if the customer is notified anytime before the first Notify Deadline. The price associated to the second Notify Deadline (i.e., the second earliest among the Notify Deadlines) may be offered if the customer is notified after the first Notify Deadline and before the second Notify Deadline.

The terms and conditions of the UPO VOF may not allow the company to notify the customer after the last Notify Deadline (i.e., the latest among the Notify Deadlines). In another implementation of the UPO VOF, flexibility may also be provided to the customer to notify the company about the Chosen Product up to a stipulated Notify Deadline, once the company has offered the Up Product to the customer. As an operational measure, a rule may be set that if the company fails to notify the customer before the last Notify Deadline, the Base-Product becomes the Chosen Product and no upgrade is provided to the customer. Another approach may be set that if the customer fails to notify the company about the Chosen Product once the upgrade has been offered to him/her by the company, one or more of the Base-Products, Up Product and/or any combination thereof may be considered as the Chosen Product. The company may select Up Product as the Chosen Product and may charge Exercise Price and/or any other price to the customer. In another implementation, the company may select the Base-Product as the Chosen Product and a price may or may not be charged. Any entity (e.g., the company or the customer) may (or may not) be allowed to change the Default Product once it is selected. The UPO Exercise Price (if any) in the default case may or may not be equal to the UPO Exercise Price for the Default Product for the last Notify Deadline. In the current discussion, a single Notify Deadline is assumed.

The customer may be required to pay one or more prices during the Initial Transaction (and/or to receive a UPO, referred to as an Initial Price), at the CNT (and/or the time the customer is upgraded, referred to as an Exercise Price) and/or at any other time, which may or may not be pre-determined between the customer and the company. The UPO Price may be a pre-agreed fixed amount or it may be variable with or without bounds and set later or any combination of the above. There may or may not be any payment transaction related to the Initial Transaction. There may be one or more additional price conditions included in the UPO VOF. The initial price and/or the exercise price may or may not be uniform for all UPOs designed and/or offered to the customers; a company may choose any combination of uniform and/or non uniform prices for the initial and/or exercise price. The company may offer the customer a set of prices to choose from. Since price conditions may depend upon various factors, which may or may not be variable, the same may be decided at anytime. The price conditions may be determined by the customer, the company, another entity, or any combination thereof at one or more times. One or more prices (UPO Initial or UPO Exercise or any other price) may be a negative value, which reflects that instead of the customer paying the company, the company shall pay a price to the customer to get the desired Product as the Chosen Product.

One or more of the UPO prices may be embedded with the Product Price. A customer may be presumed to accept the UPO offer while displaying the embedded Product Price. These presumptions may (or may not) include soliciting prior interest of the customer regarding the UPO offer. In the case that the UPO price is merged with the Product Price, and where such price may or may not be separately identifiable, the customer may or may not receive a separate price for UPO. The UPO Price(s) may or may not be embedded within the Product Price. The Product Price may include a price for an upgrade, which may not be separately identified within the total Product Price. The customer may make the payment directly or indirectly (e.g., through a third party) to the company in relation to said upgrade. The price may comprise a monetary value or a soft/non-monetary value (e.g., coupons, discount vouchers, other benefits such as loyalty program benefits, exchange of another service) or other consideration or any combination of the above.

A price may include, but is not limited to, a set of one or more Product Prices, a set of one or more UPO Prices (initial and/or exercise) or any combination of the above. A company may choose to implement UPO Prices in many ways. A company may use the method of its choosing to decide on all the Product Prices. The UPO Price (Initial, Exercise, and/or any other price, or any combination thereof) may be a function of number of UPO Products and/or Chosen Products, specific products to be granted for UPO Products, Up Products and/or Chosen Products, Notify Deadline, one or more Product Prices, any other factors of company's choosing or any combination of the above. Various option pricing strategies may be employed. For example, in a fixed price strategy, a user may be shown only one fixed price for the option. If the user purchases the option at a price much lower than his/her maximum price, the potential benefit for the company is less than what could have been achieved.

The above said pricing strategy limitation may be removed when a bidding process is used. Bidding may help to determine the highest price a user is willing to spend for the upgrade. In bidding, while buying the UPO Option, the user may provide his/her highest offer for the final price. At the time of upgrade, if available, the company may charge the lowest price (less than the highest offer price selected by the user) that delivers the upgrade to the user. If even the highest offer price chosen by the user is lower than the minimum price needed to get the upgrade, then the user is not awarded the upgrade. The highest offer may be input free form or the company may provide a few choices from which the user may select one. The company may also ask, or determine empirically, how much customers will pay for the option. The assumption here is that customers make a logical decision to choose the Up Product and can afford to pay the sum of the initial and the exercise prices (if any).

The customer may or may not have to pay during the Initial Transaction. Initial Price may be subsequently returned to the customer, if the upgrade to the Up Product is not awarded to the customer. At the time of upgrade, Exercise Price may also be adjusted with the Initial Price paid by the customer. The company and/or another entity may issue a UPO Pass for the customers in order to facilitate another payment mechanism. The payment for the product and/or the option may be made using the UPO Pass. It may be possible while purchasing a set of one or more UPOs or a UPO Pass, there may be one or more conditions (e.g., such as time based or value based UPO Pass) that limit the applicability of the UPOs. A time based UPO Pass may allow a customer to only be upgraded on the products that may be purchased (received) or utilized within a specified time period. A value based UPO Pass may allow a customer to get upgrades until the sum of the total payment needed for all the upgrades is less than or equal to the value of the UPO Pass. The company and/or another entity may create various types of UPO Pass. Hence, a customer may purchase a set of conditional options which may be intended to be utilized for future needs.

The payment transaction may include, but not limited to, direct payment received by the company from the customer, in lieu of relinquishment of one or more rights by the customer, indirect revenue generation (e.g., the customer relinquishes his/her right for an associated product or service, thereby allowing the company to use said associated product or service for revenues or use for other purposes), costs savings obtained (e.g., the customer relinquishes his/her right to services which saves costs for the company), enhanced customer service and loyalty and so forth. The products may or may not be related to the products of the company. One or more rights which the customer may relinquish may or may not be related to the rights conferred by the product. Apart from relinquishment of one or more rights by the customer, the UPO VOF may have a condition to make additional payment to the company and/or an entity other than the company. The company may present various rights and may require the customers to pick a specified number of rights, thereby relinquishing other rights and in lieu of the relinquished rights, the customer may receive a conditional option for an upgrade.

Once the Initial Transaction is successful, there may be at least one related event. Each said event may be associated with various terms and conditions on the customer and/or the company. The company and/or the customers may have the right to enforce the Chosen Product(s) on the other party as per the terms and conditions of the option contract. The terms and conditions of the option contract may be binding on the company and the customer only if the customer successfully accepts the company's offer of the option for the upgrade. The customer may be given a choice of options to choose from and take a decision.

In one of implementations of the UPO VOF, the company may implement negative UPO, i.e., instead of upgrading the customer to an Up Product, the company may downgrade the customer to a lower ranked product. The company may implement such negative upgrade in one or more situations. In one of its implementations, the company may implement negative upgrade (downgrade) when there may be huge demand for Up Products at very high prices so that the company may downgrade the customer who may have already bought the Up Product at relatively lower prices and may be willing to accept the lower ranked product in lieu of some or more rewards. In yet another instance of implementation of the negative upgrade, the company may implement it in the event when there may be huge demand for lower ranked product. The company may offer the Up Product to the customer and may give an option to downgrade to lower ranked product in future in case one becomes available. The company may offer discounts on higher ranked products, may offer to return the difference between the lower ranked product and higher ranked product, may offer additional reward to the customer and so forth. Hence, the company may be able to retain the customer (and not to lose him/her to the competitor) even in the event that the customer desiring a lower ranked product and the capacity of which may be exhausted with the company. The company may also be successful in this case in creating a flexible pool of customer inventory.

In one of the implementations of the UPO VOF, the terms and conditions of the UPO VOF may require the customer to purchase (or pay price for reserving) both the lower ranked and higher ranked products with a condition to cancel/return either of the two products as per the terms and conditions of the option contract. For example, a customer reserves a higher ranked product for $1000 (when its actual price is $2200) and a lower ranked product for $705 (when the actual price is $720) with a condition to return at least one of the products. Hence, the customer has paid $1705 for reserving both the products with a condition to cancel the reservation for at least one of them. The terms and conditions of the option contract may provide different cancellation charges in different situations. Now, if the higher ranked product is not available, the terms and conditions of the option contract provides cancellation charges for higher ranked product as $18 where as the same for lower ranked product are $1000. So, logically the customer will cancel the higher ranked product and in this case he/she would be refunded $982 and hence the net amount paid by the customer for getting the lower product would be $723 ($1705 minus $982) which may be equal to the Product Price ($720) plus Initial UPO Price ($3). In this case, the customer has not received the upgrade. Now, consider another case when the higher ranked product is available. The terms and conditions of the option contract provide cancellation charges in this case for higher ranked product as $2000 where as there is no cancellation charges for cancelling the lower ranked product. So, logically the customer will cancel the lower ranked product and hence he/she would be refunded $705. So, the net amount paid by the customer for getting the upgrade (i.e., the higher ranked product) is $1000 ($1705 minus $705) instead of paying the full price (of $2200) for getting the higher ranked product. The assumption here is that customers make a logical decision to choose which product to cancel.

The costs, revenues, benefits and conditions shown here are for illustration purposes only and actual values could be different depending on specific values selected by the users for value options, customer behavior, any factors of company schedule, pricing, any other factor or any combination of the above.

A UPO VOF may include a right for a company to upgrade the customer to an Up Product before a stated Notify Deadline. The right may include the condition that the company may notify the customer before, at or after the stated Notify Deadline or any combination thereof. To provide flexibility to the customers, the company may offer (or allow) the customer to finally choose the Chosen Product once the company notifies the customer about the availability of the Up Product.

After the Initial Transaction, i.e., once the option has been granted (and/or sold) to a customer, there may be one or more potential events related to the associated UPO option. For example, as shown by the Box 16.230, there are two related events (named Level 1 Events) for the UPO option, namely, 1) Up Product is available at a certain time as per the terms and conditions of the option contract (shown in Box 16.250) and 2) Up Product is not available at a certain time as per the terms and conditions of the option contract, as shown in Box 16.240.

There may be Level 2 or higher level events associated with the UPO option. If one or more Up Products are not given to the customers due to unavailability of Up Products in Level 1 events, the customer may be given one or more Up Products if said Up Products are available in Level 2 or higher events related to the UPO option, later on. It may also be possible that even when one or more Up Products are available in Level 1 event which may or may not be given to the customer in Level 1 event, still later on, in Level 2 or higher events, if one or more Up Products are available, said one or more Up Products may be offered (given) to the customers. Said one or more Up Products may be given by the company, another entity and/or by both. The Up Products given in Level 2 or higher events may be given in exchange of one or more previously given Up Products or in addition to the earlier given Up Product(s).

If the event in the Box 16.250 happens, then as many customers as had selected the UPO option may automatically be upgraded to the Up Product, within the terms and conditions of the UPO option contract. There may, of course, have been more customers who had purchased upgrade options than the number of Up Products available to be used as upgrades. In this situation, the company may use any algorithm it desires in order to allocate the Up Products. For example, the customers may have been given the ability, while buying the option, to specify the maximum amount the customer is willing to pay to exercise the option. Then the company would probably choose to allocate all the available Up Products so as to maximize its revenue. If there are more sold options of equal value than Up Products that are available, the company may use any method it chooses to allocate the upgrades, such as assigning priority based on time of purchase, Product Price paid by the customer, random selection or any other customer priority factors like high buying customer and so forth.

A company may inform the customer of the decision related to the upgrade award via any communication channel including, but not limited to, an email, phone, in-person at company's office or sales counter, or may ask the customer to contact the company to know the decision and so forth.

Using UPO, a company gets to know the relative preferences and utilities of the higher ranked products over the lower ranked products as some customers purchase this option and others don't. This may lead to an enhanced revenue benefit for the company as well as higher product utility to the customer. There may be some increase in costs for the company, but generally, the additional revenue generated would be more than sufficient to account for the additional upgrade costs (if any). The company may better optimize its product capacity and may possibly be able to sell the lower ranked products to additional customers due to additional capacity generated for the lower ranked products (after a customer is upgraded to the Up Product). A company may estimate the total number of expected upgrades and using the same, may estimate the capacity generated in the lower ranked products (due to potential upgrades). Using this estimate, a company may be able to add back these lower ranked products to the company inventory to be used for potential sales and/or other purposes.

The company and/or an entity other than the company may define customer preferences regarding one or more product upgrades and may use said preferences to upgrade one or more customers and may optimize value for at least one of customers, company and an entity other than the company. Said preferences may be used to assign ranking between two or more products. The ranking may be explicit and/or implicit and may be expressed/determined by the customer, the company or an entity other than the company or any combination thereof. The ranking may already be established or well known. The company and/or an entity other than the company, may establish, in advance of making the upgrade award, a ranking of attributes applicable to the product and may define upgrade possibilities. In another implementation of the UPO VOF, the company may establish, in advance of delivering the option, a list of attributes applicable to the product and associate therewith rankings expressed by the customer.

A customer who receives a UPO is termed "U". In one implementation of UPO, a company may want to hold capacity for the customer in only one of the UPO Products, in which the status of said U customer is termed "Ua" (i.e., Accounted, which are one or more Base-Products or lower ranked products for the customer) and in the other UPO Product(s), the status is termed "Uw" (i.e., Awaiting, which are one or more Up Products or higher ranked products for the customer) (both Ua and Uw have been defined above). A "U" customer converts to an N customer after the CNT. Thus, at any given time, a company may have N, Ua and Uw type of customers for its products.

The UPO VOF may help a company in one or more ways. For example, it may help to accommodate product requests from potential customers. Any new potential customer who requests to obtain a product is assumed to be an N customer. If the available quantity for the desired product (desired by N customer) is insufficient to satisfy the request, then the company may use the quantity (if any, of desired product) that has been assigned to Ua customers, and reassign the same to said N customer. Consequently, the company may then upgrade (assign the Awaiting products, i.e., the products where said Ua customers have Awaiting status to) said Ua customers. By implementing such upgrading of Ua customers from their Accounted products to Awaiting products, a company may better serve incoming demand for products. An event where such request comes to the company for a product is termed "Buy_N". The act to upgrade a Ua customer from its Accounted product (Base-Product) to its Awaiting product (Up Product) is termed "Upgrade_U". Detailed algorithms are presented below that may be used to manage a system comprising N, Ua and Uw type of customers. An Upgrade_U algorithm may be run independently of the Buy_N Process and may be used only to upgrade the customers from one or more lower ranked products to one or more higher ranked products.

A company may choose any set of criteria to create different levels of its product offerings. A company may choose to subdivide a physically distinct product into two or more sub products, where each sub product may act as a separate product level.

The costs, revenues, benefits and conditions shown here are for illustration purposes only and actual values could be different depending on specific values selected by the users for value options, customer behavior, company schedule, pricing, any other factor or any combination of the above.

UPO Types Creator Algorithm (to Create UPO Types or Instances)

Figure 17:
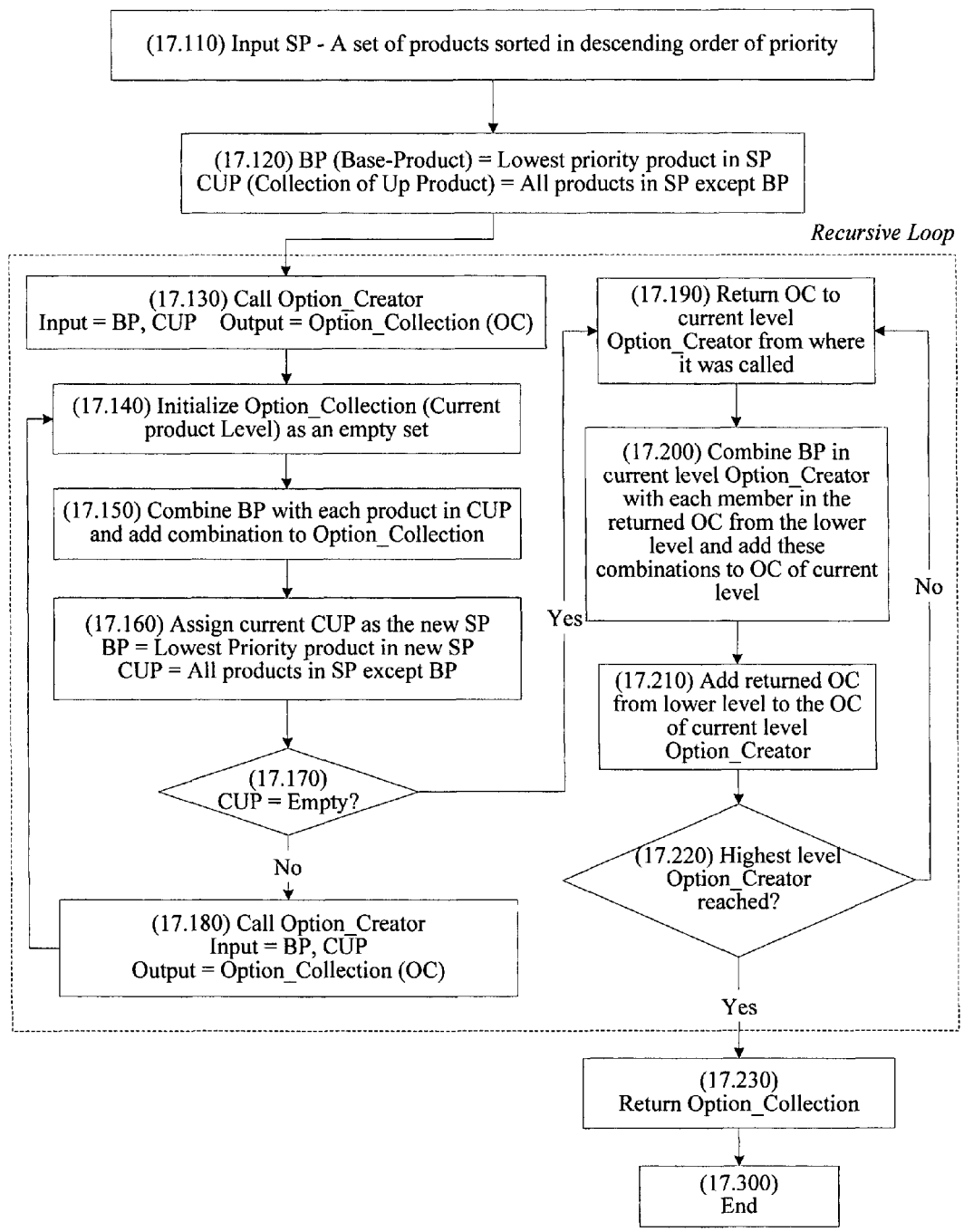
FIG. 17 is a flowchart of an algorithm to create UPO options for a given number of entities.

FIG. 17 presents an example of an algorithm that may be used to create UPO Types or instances (sometimes also referred to as upgrade options or upgrade product options or UPOs or UPO) for a given set of products. A starting point is to consider a list of products of a company, where each product can be ranked in terms of priority (or desirability) to customers. A high priority usually implies a higher utility to the customer and is usually accompanied by a higher product price. The following algorithm, as shown in FIG. 17, demonstrates one way to calculate all possible UPO instances for such a set of products. The algorithm uses a recursive loop mechanism.

In Act 17.110, a Set of products (SP) is taken as an input and sorted according to the descending order of priority. Priority may be determined in any way the company desires. It may be a subjective guess at customer desires or it may be based on empirical data, for example. In Act 17.120, the Base-Product (BP), a parameter, is assigned the lowest priority product in SP. Another parameter, Collection of Up Products (CUP), is assigned all the products in SP except the BP.

Next, in Act 17.130, a software routine is called, named herein, the "Option_Creator" routine. It receives the BP and CUP as input, and outputs a set of options, the Option_Collection (or OC, in short). Next, in Act 17.140, the OC is initialized (for the current product level) as an empty set. To create the set of UPOs for the current Base-Product (BP), the BP is combined with each product in the CUP and the combination is added to the Option_Collection (OC), in Act 17.150.

Next, the current CUP is assigned as the new SP, the BP becomes the lowest priority product in the new SP and the new CUP becomes the old CUP less the old BP, in Act 17.160. In Act 17.170, a test is performed to determine whether the CUP is an empty set. If so, control goes to Act 17.190. If not, to Act 17.180, in which the Option_Creator routine starting in Act 17.140 is called and new conditions are set (a new BP and a new CUP). When Act 17.190 is reached, the OC of the current level Option_Creator is returned to the next higher level of Option_Creator from where the current Option_Creator was called and control passes to Act 17.200.

Next, in Act 17.200, the BP of the current level Option_Creator is combined with each member in the returned OC from the lower level. These combinations are added to the OC of the current level. In Act 17.210, the returned OC from the lower level is added to the OC of the current level. Next in Act 17.220, a test is performed to determine if the current level of Option_Creator is the highest. If so, the Option_Collection of current level is returned as the final output, in Act 17.230, and then the algorithm ends in Box 17.300. If not, then control goes back to the Act 17.190, where the Acts 17.190 to 17.220 are repeated for the new level of Option_Creator. The computation may be performed using a processor that may calculate results in optimal time.

(5) Optimization of UPO VOF

As mentioned earlier (shown in FIG. 7), in the form of an optional last step in the first stage, a financial analysis may be performed using the existing company and customer data to determine the optimal terms and conditions of the UPO VOF. What-if scenarios may be executed to determine an optimal pricing strategy. The company may want to divide its customers using one or more criteria and design separate UPO VOFs for each customer segment.

Second Stage: Using the UPO Value Option Framework

After completing the first stage of the method, the company has created a UPO VOF and specific value options within that framework. The company has also segmented customers and designed options accordingly. The company is fully prepared to use a structured format comprising one or more UPO value options to interact with its customers in real time to generate benefits for both the company and its customers. The second stage of the UPO VOF is now presented.

Figure 18:
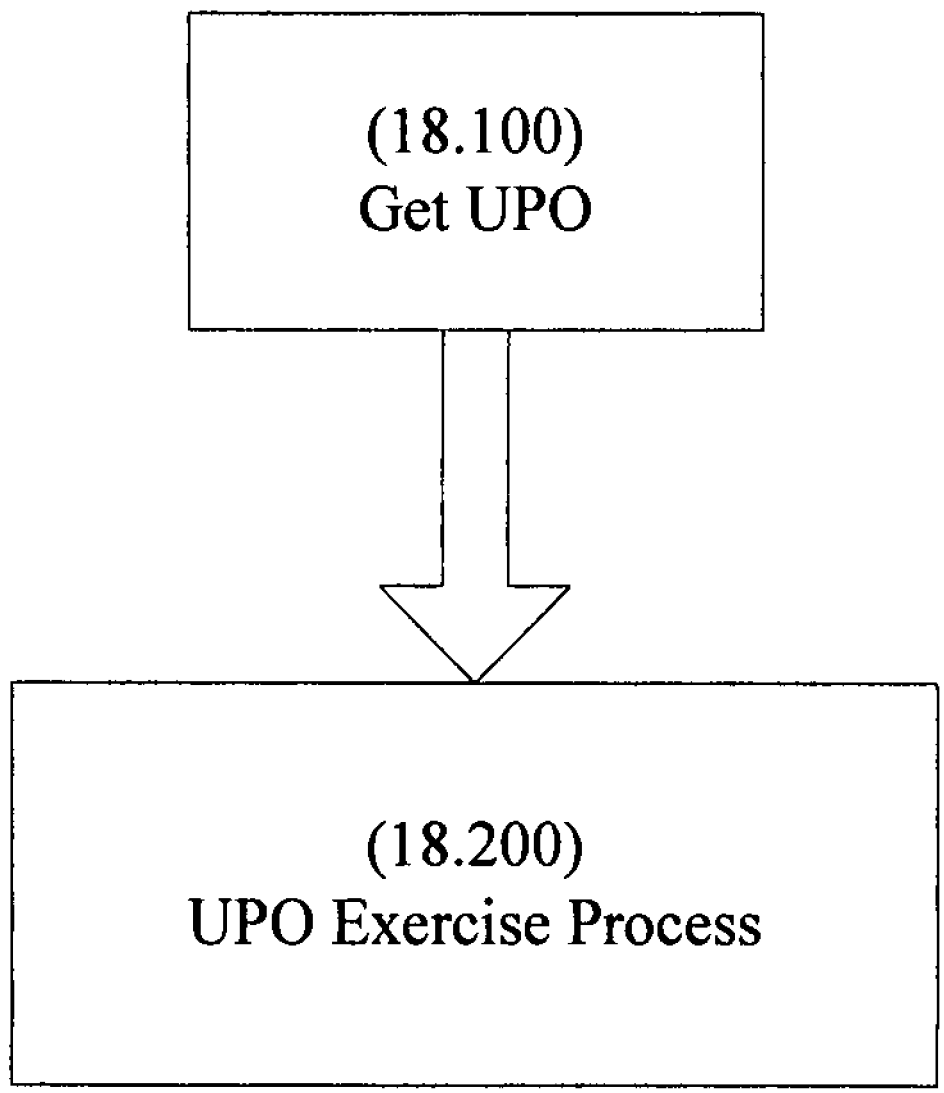
FIG. 18 is a diagrammatic illustration, in a high level flowchart, of a process for UPO VOF implementation.

The implementation of the UPO VOF between the company and its customer takes place through two high level acts, as shown in FIG. 18. In Act 18.100, the 'Get UPO' process, an interactive event between the customer and the company's web server, runs to carry out the Initial Transaction of the UPO VOF. In this Act, a number of algorithms may be executed (e.g. availability, UPO Price, Notify Deadline, Upgrade List and so on) on the company's server to optimally calculate the terms and conditions of the UPO VOF (e.g., availability, UPO Price(s) and other conditions) to concurrently benefit both the company and the customer. In Act 18.200, an event optimizer process called the UPO Exercise Process (explained later) is executed. In this process, the company may award the upgrade to the customer based on the terms and conditions of the option contract and the Chosen Product is notified to the customer. The process may also comprise one or more event optimizer algorithms that may help to optimally select the Chosen Product and/or to optimally use (or reuse) the Released Product.

Figure 22:
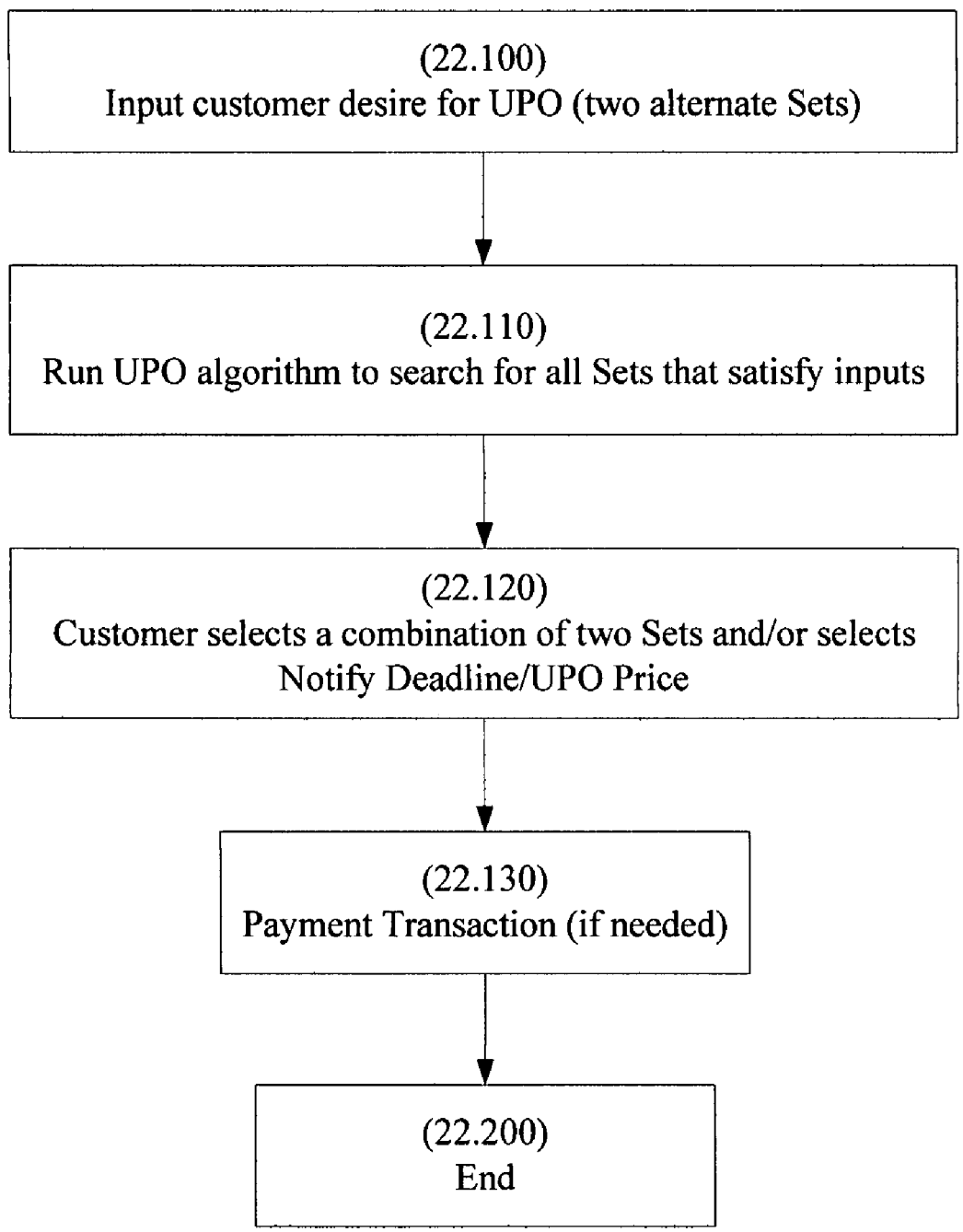
FIG. 22 is a flowchart of an algorithm for the "Concurrent Get UPO" process, an alternative process to FIG. 19.

As explained above, the Get UPO process may be implemented via the Sequential (shown in FIG. 19) or the Concurrent (shown in FIG. 22) process. There are many ways to do the Sequential process. As an example of the Sequential process, a customer may select (or purchase) a Product/Set/Order before the Initial Transaction begins. In such situations, said Product/Set/Order may be referred to as Initial Product/Initial Set/Initial Order or IP/IS/IO, in short, respectively. The Initial Set is also referred to as Initial Product Set (or IPS, in short). A customer may get a UPO, i.e., get one or more UPO Products/Sets/Orders on an OP/OPS/OO, respectively. A UPO Product/Set/Order is also referred to as Option Product/Option Set/Option Order, or OP/OS/OO, in short, respectively. An Option Set is also referred to as Option Product Set (or OPS, in short). The two events (one for the Initial Product and the other for the Initial Transaction) may be executed with a minimal (one just after another) or a significant time gap (e.g., few minutes, hours, days and so forth) in between them.

The UPO VOF may be implemented at different levels including, but not limited to, Product, Set and Order. A company may choose to implement the UPO at any level(s). In a specific UPO interaction between a customer and the company, the implementation level should be the same for all the UPO Products, Chosen Products and Released Products. For example, if UPO is implemented at the Order level, then all the UPO Products and Chosen Products would refer to UPO Orders and Chosen Orders, respectively.

1. 'Get UPO'—Dynamic Interaction To Capture Customer Demand

In the Get UPO process, a customer interacts with the company's server to receive a UPO. The interaction may take place (for example) via phone, in-person or on a website. The Sequential Get UPO Process is presented first along with its detailed algorithms, followed by a short summary of the Concurrent Get UPO Process.

Sequential Get UPO Process

There are several ways to implement the Sequential process. The following presents an example of the Sequential Get UPO Process when a UPO is implemented at the Set level. It is also assumed here that the customer first purchases an Initial Order with one or more IPS, and then opts to receive a UPO on any of the included IPS.

The following presents an example of the algorithmic illustration of the Sequential Get UPO process. Consider FIG. 19. In Act 19.100, a customer selects (and/or purchases) an Order (with one or more IPS). Next, in Act 19.110, the customer reaches an interactive interface of the company's web server to Get UPO, where the customer selects the IPS (referred to as Target_Set) on which UPO is desired. Next, the customer inputs the UPO search criteria for the current Target_Set in Act 19.115.

Next, on clicking the "Search UPO Products" button, control goes to Act 19.120, where the UPO search algorithm is executed to search for an OPS. The UPO search algorithm returns a list of valid UPOs along with a list of Comb_NDs (defined elsewhere) and associated UPO Prices and/or other conditions. The details of the OPS search algorithm are presented later. Next, the search results are displayed for the customer, who then selects the desired OPS and one or more associated Comb_ND(s)/UPO Price(s) and other conditions, as shown in Act 19.130.

Next, in Act 19.140, a test is performed to determine whether the customer wants to get more OPSs on the current Target_Set or on another IPS. If the customer wants to get an OPS on another IPS, control loops back to the Act 19.110, where the customer selects another IPS as the Target_Set, and then the process is repeated again for the new Target_Set. If the customer wants to get more OPSs on the current Target_Set, control loops back to Act 19.115, where the customer enters the OPS search criteria and then the process is repeated for the new OPS search criteria. If the customer does not want to get any more OPSs, control goes to Act 19.150, where a payment transaction (if needed) may be executed. For example, a customer may need to pay a price for the Product after taking into consideration the Initial UPO Price using a credit card, direct bank account debit or any other payment transaction mechanism. Next, the algorithm ends in Box 19.200. The computation may be performed using a processor that may calculate results in optimal time.

UPO Search

Figure 19:
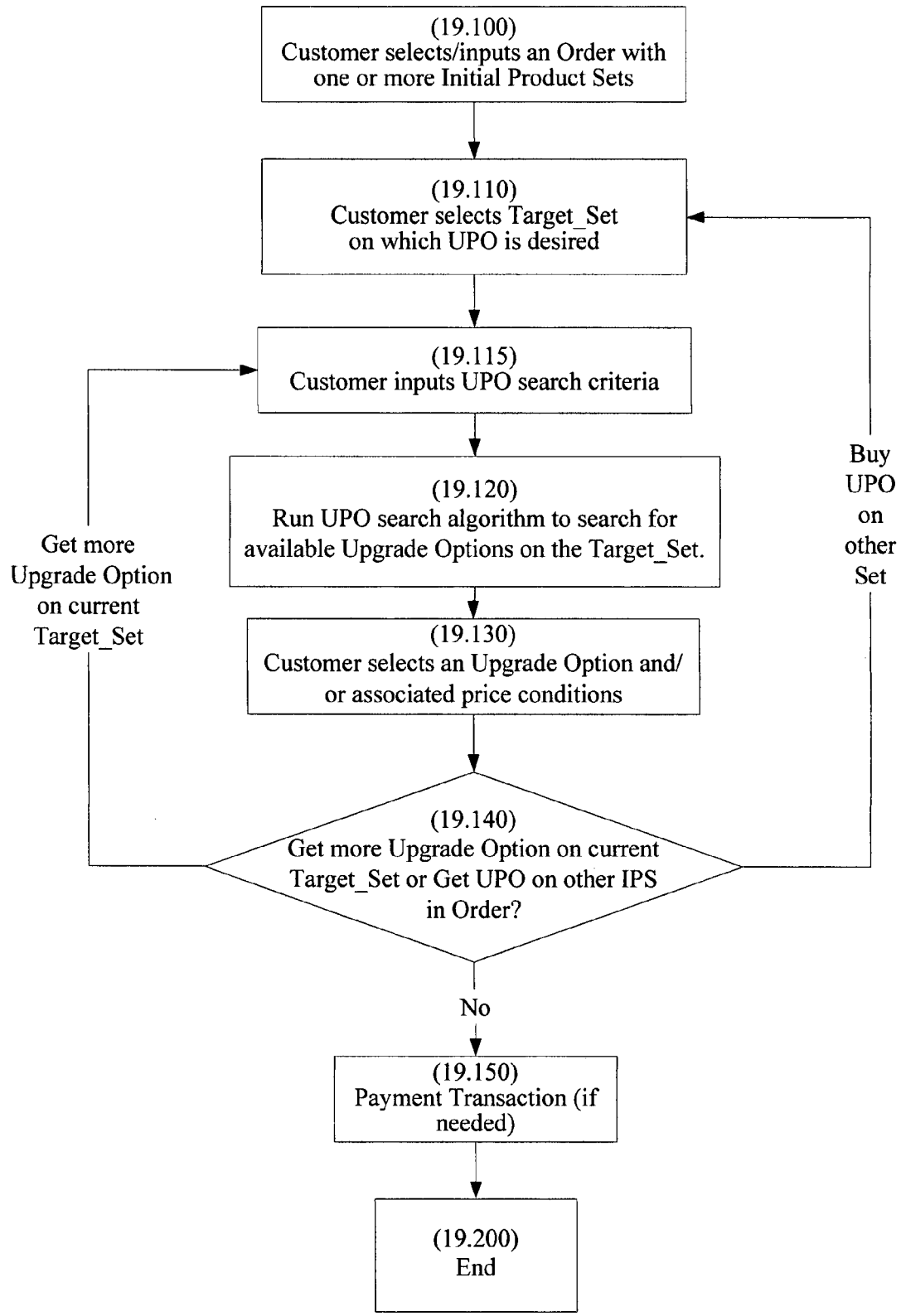
FIG. 19 is a flowchart that expands Act 100 of FIG. 18, illustrating a high level algorithm for the "Sequential Get UPO" process at the Set level.
Figure 20:
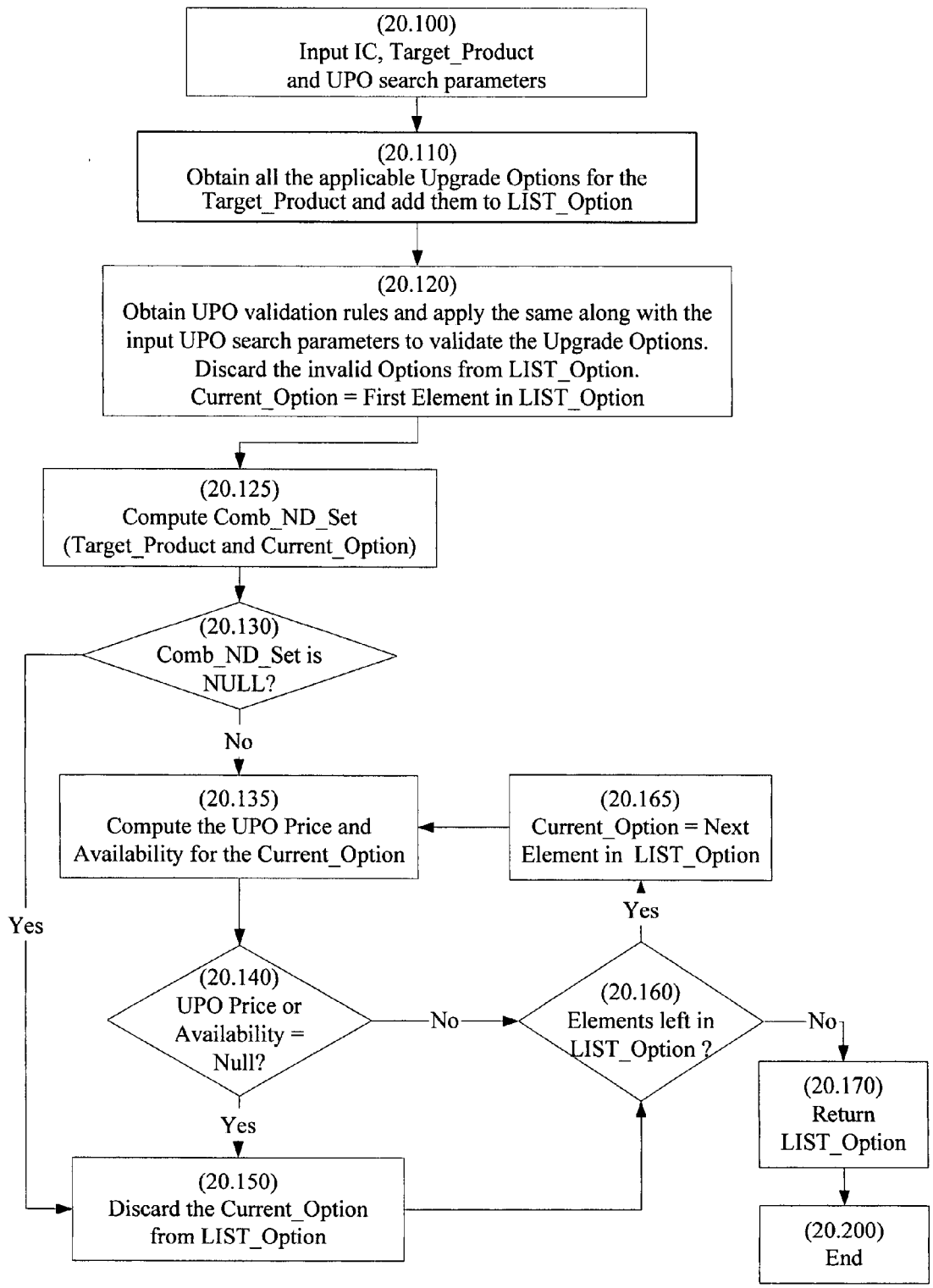
FIG. 20 is a flowchart that expands Act 120 of FIG. 19, illustrating an algorithm to search for UPO Products (algorithm at the Product level)

The UPO Search algorithm at the Product level is shown in FIG. 20, which expands the Act 120 of FIG. 19. In Act 20.100, a set of parameters including the number of customers (IC), the Target_Product and the UPO Search parameters are input to the system. The number of customers refers to those customers for whom this process is being executed. The UPO search parameters include, but are not limited to, Up Product, price of the Up Product, UPO Price and so forth. Next, control goes to Act 20.110, where a list of UPO Types (or upgrade options) for the given Target_Product is read from the company's database. All the upgrade options, thus obtained, are added to a list termed LIST_Option.

Next, in Act 20.120, a list of UPO validation rules is obtained from the company's UPO VOF database and applied to validate all the upgrade options in the LIST_Option list. The ones that do not satisfy the rules are discarded. Validation rules may include, but are not limited to, a Maximum Number of Products per Set Rule, a Maximum Product Price Rule, an Availability Rule and so forth. For example, a Maximum Product Price Rule may discard those upgrade options for which the Product Price of the Up Product related to the upgrade option is more than a specified value. A company may implement any of the validation rules to further qualify the options in the LIST_Option list. As a last step in Act 20.120, the first element in the updated LIST_Option list is set as the Current_Option.

Next, control goes to Act 20.125, where a group of Comb_NDs is computed for the combination of the Target_Product, all the existing options of the Target_Product and the Current_Option, and added to a set called Comb_ND_Set. Next, in Act 20.130, a test is performed to determine whether the Comb_ND_Set obtained in the previous Act is Null. If so, control goes to Act 20.150. If not, control goes to Act 20.135, where the UPO availability and UPO Price for the Comb_ND_Set are determined. Next, in Act 20.140, another test is performed to determine whether the UPO Availability or the UPO Price is Null. If so, control goes to Act 20.150. If not, control goes to Act 20.160.

In Act 20.150, the Current_OPS is discarded from the LIST_OPS list, and control goes to Act 20.160, where a test is performed to determine if more elements are left in the LIST_OPS list. If so, control goes to Act 20.165. If not, control goes to Act 20.170.

In Act 20.165, the next element in the LIST_Option list is set as the Current_Option and control loops back to Act 20.135 for further processing of the new Current_Option. In Act 20.170, the updated LIST_Option list along with UPO Prices and associated conditions for each option is returned as the search result, and then the algorithm ends (Box 20.200). The computation may be performed using a processor that may calculate results in optimal time.

OPS Search

Figure 21:
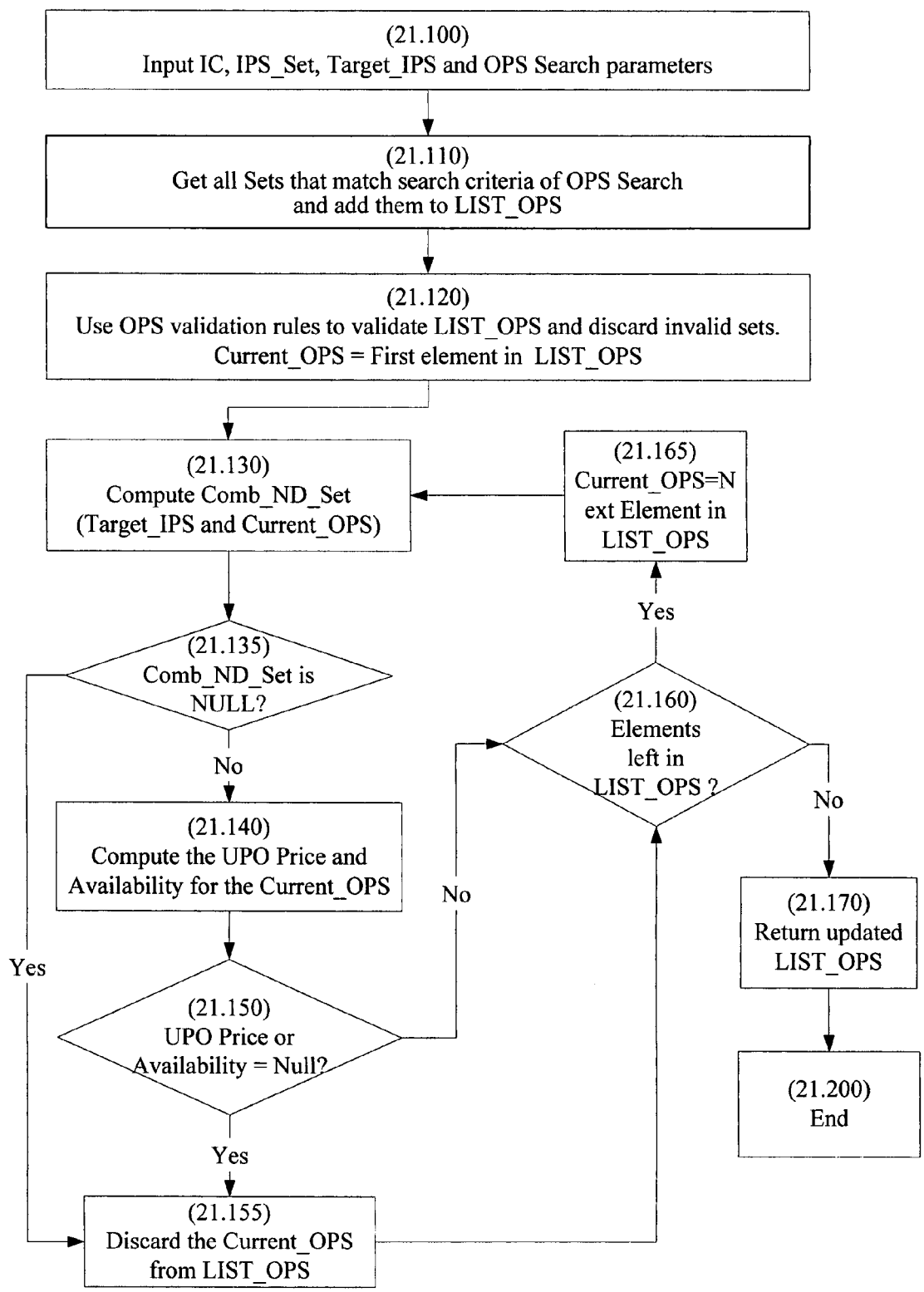
FIG. 21 is a flowchart that expands Act 120 of FIG. 19, illustrating an algorithm to search for UPO Product Sets (algorithm at the Set level)

One of the ways to implement the UPO Search algorithm at the Set level is discussed here. The following algorithm (shown in FIG. 21) determines and validates an OPS for a given set of conditions including, but not limited to, availability, Notify Deadline and UPO Price. One of the ways of its implementation of said algorithm has already been discussed above along with one along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 21.100, the number of customers (IC), IPS_Set (containing all IPS in the Initial Order, and all the OPSs, (if any) already selected/received along with Comb_ND_Set(s) and Comb_OP_Set(s), for each IPS), Target_IPS and the OPS Search parameters are input to the system. The definitions and details of Comb_ND_Set and Comb_OP_Set are provided later. The OPS search parameters include, but are not limited to, date, time and location, number of Products per Set, Notify Deadline, UPO Price (Initial and Exercise) and so forth. A customer may be allowed to input Notify Deadline and/or UPO Price on the basis of which valid OPSs (that satisfy the given criteria of Notify Deadline and/or UPO Price) may be searched for and displayed for the customer. For example, a customer may be asked to input the product related parameters, and then a set of Notify Deadlines and UPO Prices may be computed for the products that match the given criteria. In another example, a customer may input both product related parameters and Notify Deadline and/or UPO Price as inputs and then a search may be performed for valid OPSs. In yet another example, a customer may input to the system, one or more products, and/or inputs to search for one or more additional products (e.g., product properties, price etc.) to search for OPS that may be combined with one or more input products (by the customer) to constitute the total set of products for a UPO. In such situations, a company may also validate the products input by the customer to determine if said products are eligible to be the UPO Products.

Next, control goes to Act 21.110, where an OPS Search is performed for the given criteria. The search may be best performed using a processor that may calculate results in optimal time. The order in which search parameters are executed may be optimized to reduce the search time, however, it may or may not affect the final outcome. A company may select any order of its choosing.

In Act 21.110, Product Sets are determined that match the search criteria and the resulting Sets are added to a list termed LIST_OPS. Next, in Act 21.120, a list of OPS validation rules is obtained from the company's UPO VOF database and the rules are used to validate all the Sets in the LIST_OPS list. Sets that do not satisfy the rules are discarded. Validation rules may include, but are not limited to, a Maximum Number of Products per Set Rule, a Maximum Product Price Rule, an Availability Rule, and so forth. For example, a Maximum Product Price Rule may discard those upgrade options for which the Product Price of the option product related to the upgrade option is more than a specified value. A company may implement any validation rule of its choosing to further qualify the Sets in the LIST_OPS list. As a last Act in Act 21.120, the first element in the updated LIST_OPS list is designated as the Current_OPS.

Next, control goes to Act 21.130, where a group of Comb_NDs is computed for the combination of the Target_IPS, all the existing OPS of the Target_IPS and the Current_OPS, and added to a set called Comb_ND_Set. Next, in Act 21.135, a test is performed to determine whether the Comb_ND_Set obtained in the previous Act is Null. If so, control goes to Act 21.155. If not, control goes to Act 21.140, where the UPO availability and UPO Price for the Comb_ND_Set are determined. Next, in Act 21.150, another test is performed to determine whether the UPO Availability or the UPO Price is Null. If so, control goes to Act 21.155. If not, control goes to Act 21.160.

In Act 21.155, the Current_OPS is discarded from the LIST_OPS list, and control goes to Act 21.160, where a test is performed to determine if more elements are left in the LIST_OPS list. If so, control goes to Act 21.165. If not, control goes to. Act 21.170.

In Act 21.165, the next element in the LIST_OPS list is designated as the Current_OPS and control loops back to Act 21.130 to repeat the process for the new Current_OPS. In Act 21.170, the updated LIST_OPS list along with UPO Prices and associated conditions is returned as the search result, and the algorithm ends (Box 21.200). The computation may be performed using a processor that may calculate results in optimal time.

Computation of Notify Deadlines

A company may set one or more Notify Deadlines of its choosing for its Products. Once the Notify Deadlines have been set for each Product, the next Act is to create a framework to compute the Notify Deadlines for a group of Products (such as a Set, an Order or any other group). The following sections present an example of a framework that may be used to obtain a set of Notify Deadlines applicable to a group of Products. A company may use any framework and algorithm of its choosing to obtain the same.

A set of Notify Deadlines associated with a Product, a Set and a combination of two or more Sets is called Product_ND_Set, Set_ND_Set and Comb_ND_Set, respectively. Each element in the Product_ND_Set, Set_ND_Set and Comb_ND_Set is termed Product_ND, Set_ND and Comb_ND, respectively. The Comb_ND_Set may be computed by combining the Set_ND_Sets of all the given Sets. A Set_ND_Set may be computed by combining the Product_ND_Sets of all the Products under that Set. The Notify Deadlines can be computed based on various parameters and factors of the company's choosing. One example to compute a Comb_ND_Set is as follows. First compute Set_ND_Set for all Sets. A Set_ND_Set is computed by first selecting earliest of the Notify Deadlines of each Product within the concerned Set, and then picking the latest of those Deadlines, and noting that as the Target_Deadline. Next step is to pick all those Notify Deadlines that fall after the Target_Deadline. Notify Deadlines thus obtained may be validated using various validation rules based on company factors such as customer utility, product parameters and so forth. Similarly, the Comb_ND_Set may thus be computed by repeating the above process for Set_ND_Sets, thus obtained for each Set.

Available Capacity Check

The UPO capacity for an OPS may depend on one or more factors including, but not limited to, Notify Deadline, UPO Prices, expected Product value and so forth. A company may use any method of its choosing to determine UPO capacity of a product. For example, a company may choose to have a fixed UPO capacity for one or more of its products.

An instance to compute UPO capacity is discussed below. Consider the case, when UPO Capacity is dependent on Notify Deadline. In such situation, the objective is to determine those Comb_NDs within the Comb_ND_Set on which UPO is available for the given OPS. The UPO Capacity and the Used UPO Capacity (the total number of Products on which UPO has been sold but not exercised) may be calculated for each Comb_ND within the Comb_ND_Set. Available Capacity (AC) would then be the difference of UPO Capacity and Used UPO Capacity for the given Product. If the AC is greater than or equal to the number of incoming customers desiring a UPO, then the UPO capacity is available at a given Comb_ND for the given OPS. The process may be repeated for all Notify Deadlines within Comb_ND_Sets. UPO may be made available on a given OPS for a given Comb_ND, if UPO is available on all the Products of OPS for the given Comb_ND.

UPO Price Calculation

A company may set UPO Prices for a Product using any method of its choosing. Once the UPO Prices have been set for each Product, the next Act is to create a framework to compute UPO Price for a group of Products (such as a Set, an Order or any other group) by using UPO Prices for each Product in the group.

The parameter Product_OP refer to UPO Price (and may or may not be corresponding to a Notify Deadline) associated with a Product. Similarly, Set_OP and Comb_OP refer to UPO Price (may or may not be corresponding to a Notify Deadline) associated with a Set and a combination of two or more Sets, respectively. A set of Product_OPs, Set_OPs and Comb_OPs is termed Product_OP_Set, Set_OP_Set and Comb_OP_Set, respectively. The Comb_OP_Set is computed by combining the Set_OP_Sets of the IPS and all the OPSs (existing and new). A Set_OP_Set is computed by combining the Product_OP_Sets of all the Products under that Set. One or more Set_OP_Rules may be read from the company's database and applied to calculate Set_OP_Set for each input Set (IPS and all OPSs) using the Product_OP_Sets of all the Products of said Set. A company may use any Set_OP_Set Rule of its choosing. Set_OP_Rules may be defined to calculate Set_OP as the sum, average, highest, lowest or any other function of Product_OPs of all the Products at a given Comb_ND. Similarly, a Comb_OP_Set comprises one or more Comb_OPs, and is calculated using one of the pre-determined rules, termed Comb_OP_Rules, to combine the Set_OPs of all the Sets in the combination. A company may use a Comb_OP_Rule of its choosing. Comb_OP_Rules may be defined similar to the Set_OP_Rules.

Concurrent Buy UPO Process

As explained above, in the Concurrent Get UPO process, a customer receives all UPO Products concurrently in one transaction. An algorithmic illustration of the Concurrent Get UPO process is displayed in FIG. 22. The UPO (2, 1) instance is assumed here as an example. Consider a customer who desires an upgrade in lieu of a price for the desired upgrade. In Act 22.100, the customer desires for UPO are input, including, but not limited to, a search criteria for two Sets according to customer's utility (may be similar to the search criteria defined above for the Sequential Get UPO process).

Next, in Act 22.110, the UPO algorithm is run to determine the combinations of two Sets that satisfy inputs. A list of such search results is displayed for the customer along with the associated terms and conditions including, but not limited to, Notify Deadlines, Initial UPO Price, UPO Exercise Price and Product Price for each such combination. The UPO algorithm for the Sequential Get UPO process (defined above) may also be used for the Concurrent Get UPO process.

Next, in Act 22.120, the customer selects a desired combination of two Sets and the associated conditions such as UPO Exercise Price/Notify Deadline. Next, in Act 22.130, a payment transaction is executed, if needed. For example, the customer may pay the Product Price after taking into consideration the Initial UPO Price using a credit card, direct bank account debit or any other payment transaction mechanism. Next, the algorithm ends in Box 22.200. The computation may be performed using a processor that may calculate results in optimal time.

(2) Event Optimizer

Once the customer selects a UPO value option, the processing goes to the Event Optimizer phase where different acts are executed depending on the trigger event that may occur to make an option become exercisable. In this stage, the UPO Exercise Process (and customer notification (or CN, in short) process) as shown in Act 18.200 is executed. In this process, one or more decisions on the selection of Chosen Product(s) is notified to the customer. The event(s) is (are) related to the value option selected in the first act. In the UPO VOF, the company may use a software application built on the method defined above to optimally award the upgrades to customers who have bought a UPO. Few methods have been described below in detail for the UPO Exercise process. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E.

The UPO VOF helps to create a flexible customer inventory. In other words, by using the UPO VOF, a company may obtain rights to allocate any of the selected UPO Products to a UPO customer (i.e., award the upgrade to the customer), and thus, said UPO customer acts like a flexible customer inventory that the company may manage to generate revenues. A company may design one or more uses of such flexible customer inventory, where each such use may include one or more events that follow the Initial Transaction. An example (the Buy_N process) was explained earlier. In the Buy_N process, a company may use the UPO VOF to accommodate requests from potential customers for products. As an example, the Buy_N process may especially be used to satisfy requests for products that have already been sold or have low (or no) availability. The details for the Buy_N process are presented below.

Another example to use the UPO VOF would be to use the UPO VOF in conjunction with one or more other VOFs, for example, the APO (the Alternate Product Option) VOF (details are provided later). A company may form a group of one or more APO customers and one or more UPO customers, where the options (APO and UPO) obtained by the group members are complementary in nature. As an example, consider a customer (A) who bought an APO to choose either of P1 and P2 as Chosen Product, and consider a customer (B) who received a UPO and wants an upgrade from Initial Product (i.e., Base-Product) P1 to Option Product (i.e., Up Product) P2 as Chosen Product. Thus, if A decides to choose P1 as the Chosen Product, the company may upgrade B and assign P2 as the Chosen Product for B, and vice versa. The customers A and B have taken complementary options and may form a group. The company may need to hold only one unit of inventory in P1 and P2 to satisfy the needs of both A and B (assuming each A and B only need one unit of product). Such a combination of complementary options or VOFs may improve efficiency and concurrently enhance value for all the parties involved (in the given example, for A, B and the company). More details on combining VOFs are provided later.

In one of the implementations of the UPO VOF, the company may award complementary upgrades to two or more customers. Different customers may have different ranking for different products and thus, a higher ranked product for one customer may be a lower ranked product for some other customers. The company may optimize customer needs and award upgrade to such a complementary set of customers. For example, a customer U1 ranks product P2 higher than product P1, but may not be able to purchase product P2 because product P2 may have a higher cost than P1 (hence purchases product P1). Another customer, who ranks product P1 higher than P2, could not get P1 due to non-availability of P1. The company may provide a UPO VOF to both U1 and U2 and may provide upgrades to both of them, i.e., awarding product P2 to U1 and awarding product P1 to U2. Such an implementation of the UPO VOF may enable a company to generate direct and indirect benefits using differential customer dynamics and by implementing grouping within the same type of customers.

The UPO VOF may also be used to reduce operational costs, constraints or other goals that are impacted by the allocation of products among different customers. For example, the UPO VOF may be used to shave off production costs by reducing production capacity for one or more products that are low in demand. For example, if a company experiences a product with very low sales, it could offer UPO to customers on that product and thus, be able to economically and efficiently upgrade them to different products and thereby be able to cancel production of said product to save its production costs (such as operational costs, staffing costs, maintenance costs and so forth). If a company wants to do the same on a low demand product today (after few customers have ordered/confirmed said product) without using UPO, it may be more difficult, tedious and costly affair to contact all the customers who ordered/confirmed that product and/or to convince them to upgrade to other products.

UPO Exercise Process

The company may use UPO Exercise Process as one of the methods to create a system and computer-implemented process to optimally award the available products as upgrades. This method may help to find an optimal upgrade solution to create a win-win situation between the customers and the company. The method may have two or more Acts. In the current discussion, it has been assumed that the UPO Exercise Process has two Acts, the Upgrade List and the Upgrade Award. The Upgrade List process may use a set of rules to generate a list of upgrade enabled customers. The Upgrade Award process may award upgrades to one or more upgrade enabled customers based on the defined conditions. It may be noted, however, that technically, the UPO Exercise process may be performed using any rule/method as desired. The following process may help to optimize (increase) the benefits generated.

Figure 23:
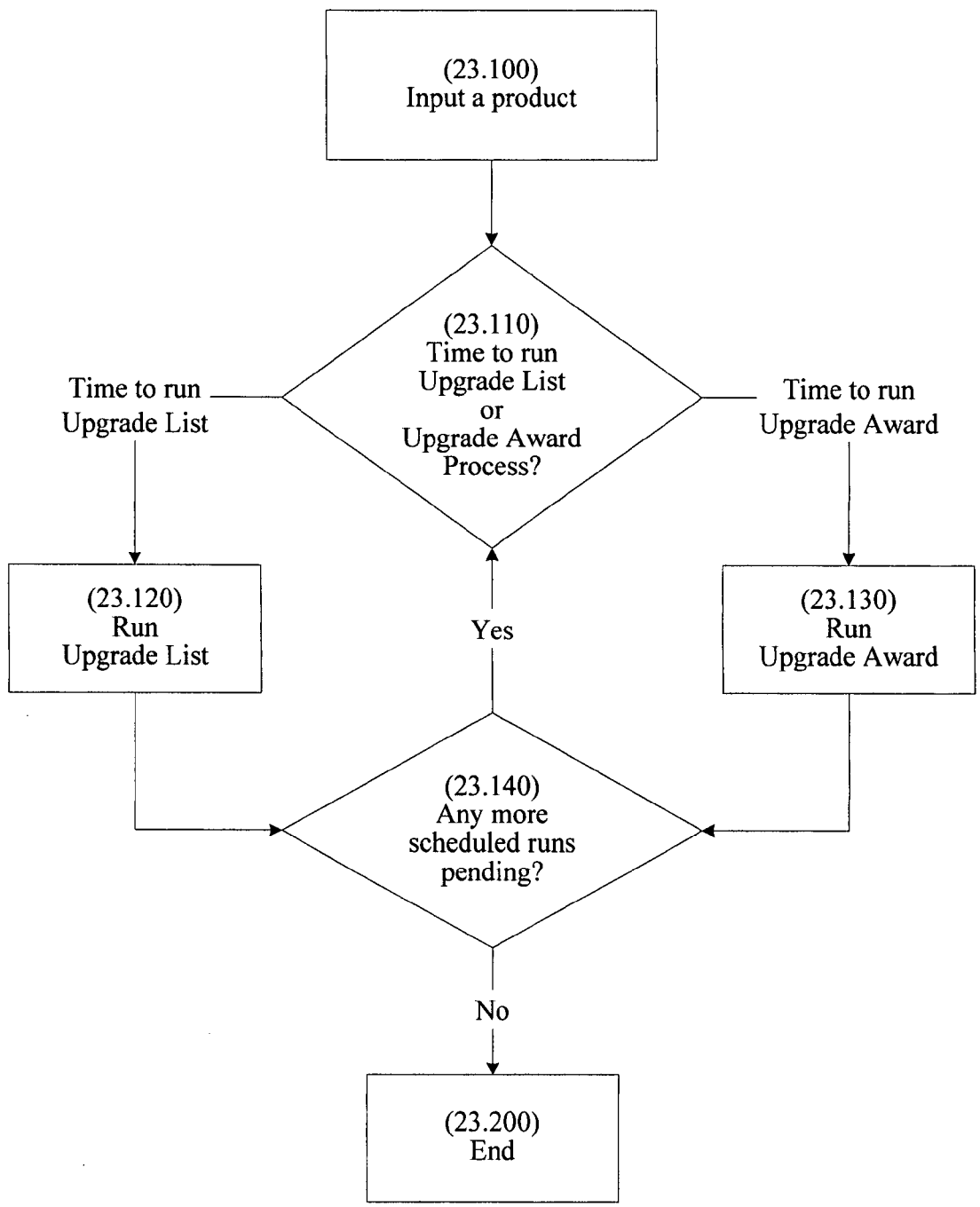
FIG. 23 is a diagrammatic illustration, in a high level flowchart, of an algorithm for the UPO Exercise process in UPO VOF implementation.

FIG. 23 describes one of the systems for the above mentioned method. The UPO Exercise process starts with an input of a product on which the UPO Exercise process is supposed to be executed, as shown in Act 23.100. Next, in Act 23.110, based on predefined times to run the Upgrade List and the Upgrade Award, a test may be performed to determine whether it is time to run the Upgrade List or the Upgrade Award process. If it is time to run the Upgrade List, the scheduler triggers the Upgrade List process, as shown in Act 23.120. If it is time to run the Upgrade Award, the scheduler triggers the Upgrade Award process, in Act 23.130. A company may set one or multiple times to execute the Upgrade List and/or the Upgrade Award processes to maximize the total returns for the company and to push the UPO Exercise process as close to the utilization as possible. The company may generate, at least one Upgrade List before the first Upgrade Award is executed, and at least one Upgrade Award process may follow every run of the Upgrade List process. The details on both Upgrade List and Upgrade Award processes are presented later in the document.

After the Act 23.120 or Act 23.130, control goes to Act 23.140, where a test is performed to determine if any future scheduled runs are pending for either the Upgrade List or the Upgrade Award. If so, control loops back to Act 23.110 for further processing as per that Act. If not, the algorithm ends at this point, in Box 23.200. The computation may be performed using a processor that may calculate results in optimal time.

Both Upgrade List and Upgrade Award processes may be run multiple times before the product utilization (anytime starting from the first interaction between the company and customer to the time the product is fully utilized). It may be beneficial for the company to run the UPO Exercise process as close to the utilization of the product as possible. This may help in two ways. First, it may help the company to prevent any form of potential revenue dilution from last minute walk-in customers who may potentially pay higher Product Price for the Option Products. Second, it may help to use all the unused products that may become available at the last minute because of cancellation.

Upgrade List

The following terms and definitions are needed to understand the algorithm to create an upgrade list: UPO Type, upgrade value and upgrade combination. These terms are presented first followed by the Upgrade List algorithm.

UPO Type

For each customer to be considered in the upgrade list, the company needs to determine his/her UPO Type and the upgrade value. It may be straightforward to determine the type of UPO for each UPO customer. UPO Type is simply the UPO bought by the customer. However, for customers who are in 'regular' (non-option) upgrade programs, there is a need to determine their UPO Types. To determine the UPO Type, one may need to determine all the Up Products to which a customer can be awarded an upgrade. The list of such Up Products may be compared with the list of Up Products associated with all UPOs. The UPO whose Up Products match, is the UPO Type for said customer. For example, if an elite customer in Base-Product (B) may be upgraded to Up Product (U1) or Up Product (U2), then his/her list of Up Products matches exactly with that of the UPO Type, BU1U2. Thus, BU1U2 is the UPO Type for said customer. The UPO Types for other customers may be determined in a similar fashion.

The company may define UPO Type for standby customers, in the industries wherever applicable. The following describes one of the methods to treat standby customers just like confirmed customers to maintain the uniformity in processing the UPO Exercise algorithm. A standby customer, here, may be defined as a customer who currently does not have a confirmed product, but is waiting to get confirmation for that or other products, whereas the confirmed customers have confirmed orders for said product.

In one or more upgrades, the customer may be re-assigned a different product from the original product assignment. A standby customer may be assigned to a standby product as a Base-Product from which an upgrade is possible to a product having availability. A non-paying customer may be assigned to a non-revenue product as a Base-Product from which an upgrade is possible to another product having availability.

A new dummy product, Standby (or S, in short), may be assumed and all the standby customers may be treated to have the confirmed dummy product (S), which may then be added to the list of products. In the current discussion, a Base-Product (B) and two Up Products (U1) and (U2) are considered. A Set with B, U1 and U2 products, would have a new list of products in descending priority, U2>U1>B>S. A customer may be on a standby list for one or more products of a Set or on one or more products of different Sets and/or any combination thereof. Here, the customers in the S product may be assigned the UPO Types, as follows; SC refers to the UPO Type for a standby for Base-Product (B) only, SU1 refers to the UPO Type for a standby for Up Product (U1) only, SU2 refers to the UPO Type for a standby for Up Product (U2) only, SU1U2 refers to the UPO Type for a standby for Up Product (U1) and Up Product (U2), SBU2 refers to the UPO Type for a standby for Base-Product (B) and Up Product (U2), SBU1 refers to the UPO Type for a standby for Base-Product (B) and Up Product (U1) and SBU1U2 refers to the UPO Type for a standby for Base-Product (B), Up Products (U1) and (U2). If a company wants to employ the above mechanism to create a dummy product for standby customers, it may be beneficial to include the virtual standby product in the list of products when calculating all types of upgrade options.

Upgrade Value

Upgrade Value may be defined as the total value a company may realize by upgrading a customer from a given Base-Product to a given Up Product. Upgrade Value may be expressed, as follows, Upgrade Value=Payment+Soft Value−Upgrade Cost, In the above formula, the term 'payment' refers to the price paid by the customer to the company when he/she is awarded an upgrade from the Base-Product to the Up Product. 'Soft Value' refers to a combination of any indirect and/or intangible value a company may generate when a customer is awarded an upgrade from the Base-Product to the Up Product. 'Upgrade Cost' refers to the marginal upgrade cost (if any) to a company to upgrade the customer from Base-Product to an Up Product. Said "Soft value" may be based on various factors and parameters including, but not limited to, company's past experiences with the customer, the number of times said customer has or has not received an upgrade in last 'n' number of attempts, customers who require special attention or care, customers belonging to a certain category, other privileged customers for one or more reasons and so forth.

For UPO customers, a company may use the final exercise price as the "payment" portion of the upgrade value. The soft value for the UPO customers may be calculated using one or more functions of the long term value of the customer to the company, trip parameters, upgrade path and so forth. A company may use any mechanism or methodology to calculate the upgrade value of the UPO customer.

Similarly, the upgrade value may be calculated for the customers in the 'regular' (non-option) upgrade programs and the standby customers. For the customers in the regular upgrade programs, the 'payment' portion of the upgrade value may be zero, however, their 'soft value' may be high. For the standby customers, the payment portion may be calculated as follows, Payment (standby)=Product Price*(1−Recapture probability)

In the above formula, the Product Price refers to the total Product Price the standby customer is expected to pay to the company if he/she is awarded the desired product. The term "Recapture Probability" refers to a probability that a standby customer may be assigned another product in another Set of the same (or different) company so that the company, in concern, does not lose the potential revenue from the standby customer if the customer is not awarded the desired product. A company may calculate recapture probability by any method of its choosing.

A company may choose to use any other mechanism to determine the upgrade value for one or more customers in the input list. The computerized system (built using the method defined here) may also allow manual overrides by the company user (e.g., an analyst or an agent) to allow the user to allocate special upgrade values to satisfy the customer relations objectives (for e.g. enhance chances for some elite customers to get upgrades over other customers) or for any other reasons, that may include enhancing or reducing the soft values of customers to modify their chances to get upgrades, however, while maintaining the conditions of the options contract executed with the UPO customers.

Upgrade Combination

An upgrade combination may comprise one or more members sorted in an order, and may need only one available product for its topmost member to generate an upgrade for all its members. The topmost member has the highest Up Product associated among all the members in the combination. The award of upgrades for an upgrade combination may work in a cascading style, where a new available product allotted to the combination may be awarded to its topmost member, the product vacated by the topmost member (after his/her upgrade) may be awarded to the second (next) topmost member and the chain goes on until the product vacated by the second lowest member is awarded to the lowest member. Such a cascading process may continue until the last customer which may have to be upgraded in the set is upgraded and it may lead to upgrade of more customers than the creation of number of units of product availability. This process may involve two or more customers. This process has also been explained in detail below in the Upgrade_U process.

Upgrade List Algorithm

Figure 24:
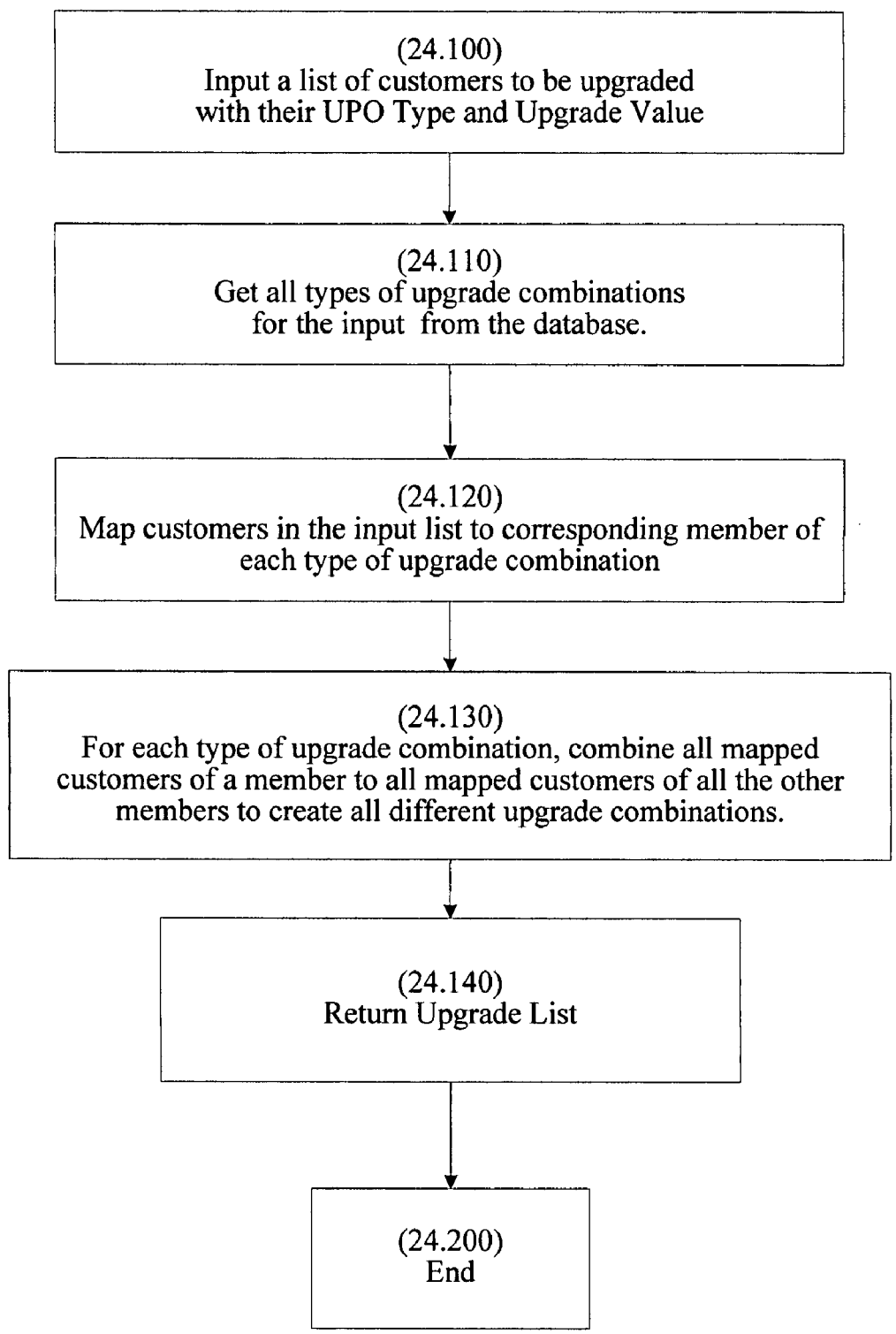
FIG. 24 is a flowchart that expands Act 120 of FIG. 23, illustrating an algorithm to create "Upgrade List" for a given set of entities and a list of upgrade-enabled customers.

The following algorithm as shown in FIG. 24, uses the terms defined above and demonstrates one of the ways to generate an Upgrade List for a set of products. In Act 24.100, a product and a list of customers to be upgraded is taken as an input along with the UPO Type and the upgrade value for each customer. The input list of customers may include all customers who have bought any type of UPOs. This list may also include the upgrade-enabled customers in the other regular upgrade programs (e.g., loyalty program, elite, staff or corporate program). A company may also want to include the standby customers in the Exercise UPO process to optimize a desired objective function across all customers. For example, a company may desire to optimize the total revenue by optimally allocating the available products among the UPO customers, the regular upgrade customers and the standby customers. The UPO Types and the upgrade values are taken as an input for each customer in the input list.

Next, in Act 24.110, a list of all types of upgrade combinations for the input product is read from the company's database. An algorithm to create different types of upgrade combinations for a list of products is presented later.

Next, in Act 24.120, the customers in the input list are mapped to the corresponding member of each type of upgrade combination. Next, in Act 24.130, for each type of upgrade combination, each mapped customer of a member is combined with all the mapped customers of all the other members of the combination to create all the different upgrade combinations. Next, the upgrade list is returned in Act 24.140, and then the algorithm ends at Box 24.200.

Algorithm to Create Types of Upgrade Combinations

Figure 25:
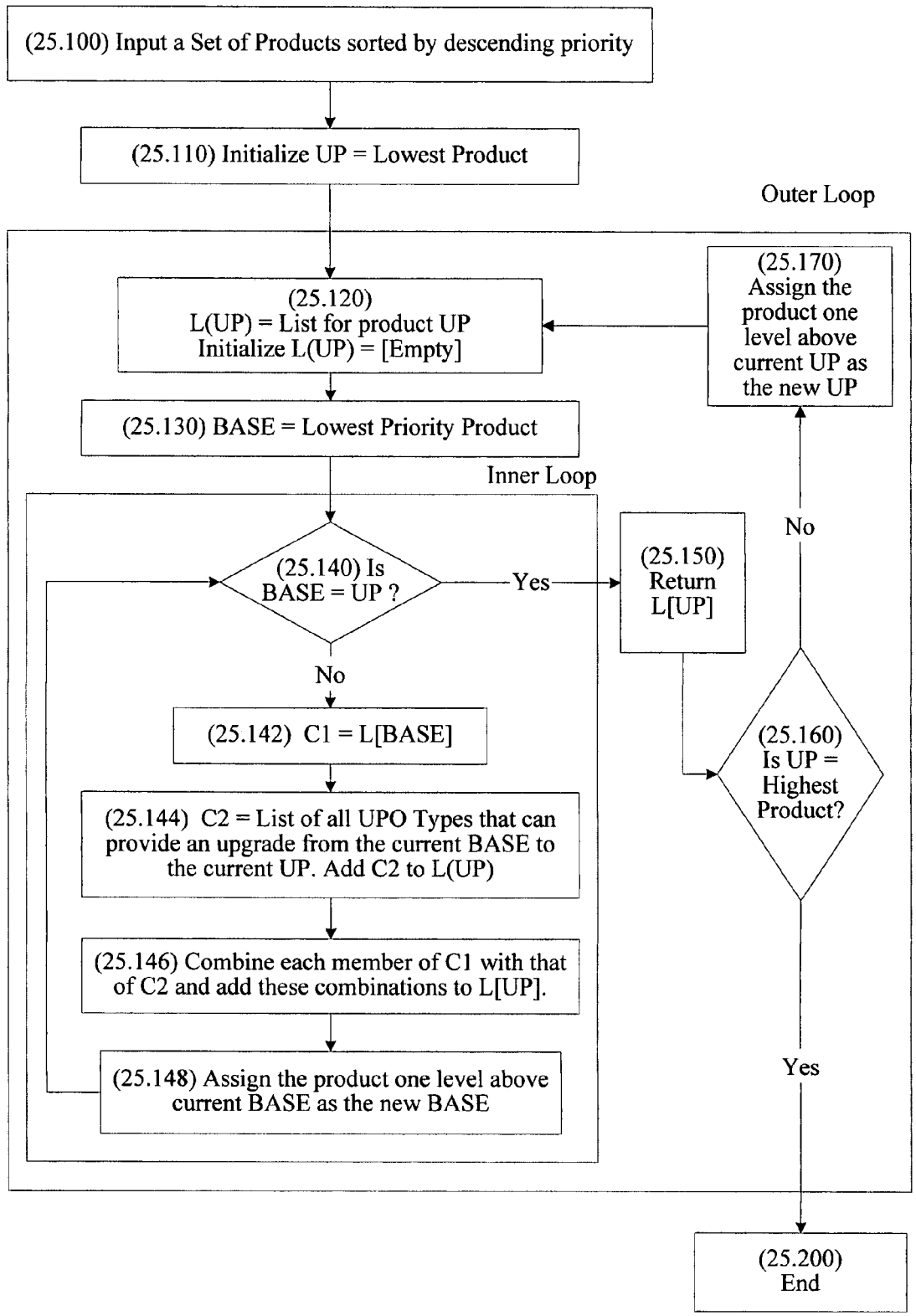
FIG. 25 is a flowchart that expands Act 110 of FIG. 23, illustrating an algorithm to create types of upgrade combinations for a given set of products.

The following algorithm, as shown in FIG. 25, demonstrates one of the ways to calculate all the types of upgrade combinations for a given set of products. The algorithm uses a recursive loop mechanism.

In Act 25.100, a Set of Products (SP) is input and sorted according to the descending order of priority. Priority may be determined in any way the company desires. It may be a subjective guess at customer desires or it may be based on empirical data, for example. In Act 25.110, UP, a parameter, is initialized and the product with the lowest priority is assigned as the UP. The control enters into a routine comprising two loops, an outer loop and an inner loop. Next, inside the outer loop in Act 25.120, a list of the types of upgrade combinations for UP, defined by the notation L(UP), is initialized as an empty set.

Next, in Act 25.130, Base-Product (or BASE, in short), a parameter, is assigned the lowest priority product and control, then enters the inner loop. Next, in Act 25.140, a test is performed to determine whether the current BASE is same as the current UP. If so, control brakes the inner loop and passes to Act 25.150, where the L(UP) for the current UP is returned. If not, control remains within the inner loop and passes to Act 25.142, where the list for the current BASE, L(BASE), is assigned to a collection C1.

Continuing within the inner loop, after the Act 25.142, a list of all upgrade options that may provide an upgrade from the current BASE to the current UP, is read from the company's database and is assigned to a collection called C2, and then C2 is added to L(UP), in Act 25.144. To create the types of upgrade combinations, each member in the collection C1 is combined with each member in the collection C2 and these combinations are then added to L(UP), in Act 25.146. Next, in Act 25.148, the product that is one level higher than the current BASE in the sorted SP list is assigned as the new BASE. Next, control loops back to the Act 25.140, where the test is performed again for the new BASE.

After the Act 25.150, control passes to Act 25.160, where a test is performed to determine whether the current UP is same as the highest priority product in the SP. If so, control exits the outer loop and the algorithm ends at this point (Box 25.200), since all types of upgrade combinations for all the products in the SP have been calculated. If not, control remains within the outer loop and the product that is one level higher than the current UP in the sorted SP list is assigned as the new UP, in Act 25.170, and then control loops back to the Act 25.120 to repeat processing for the new UP. The computation may be performed using a processor that may calculate results in optimal time.

A company may create a data structure (or a computer-readable medium) that may include an ability to store therein an indication of each customer of a company who may be eligible to receive an upgrade award and, for each said customer, an indication of each award for which the customer may be eligible and one or more values associated with the award. Such said values may include, without limitation, a total upgrade value, a payment value, a soft value and an upgrade cost related to said upgrade; a Base-Product value, and an Up Product value; and one or more values specifying traits or characteristics of the customer and so forth.

Upgrade Award

Figure 26:
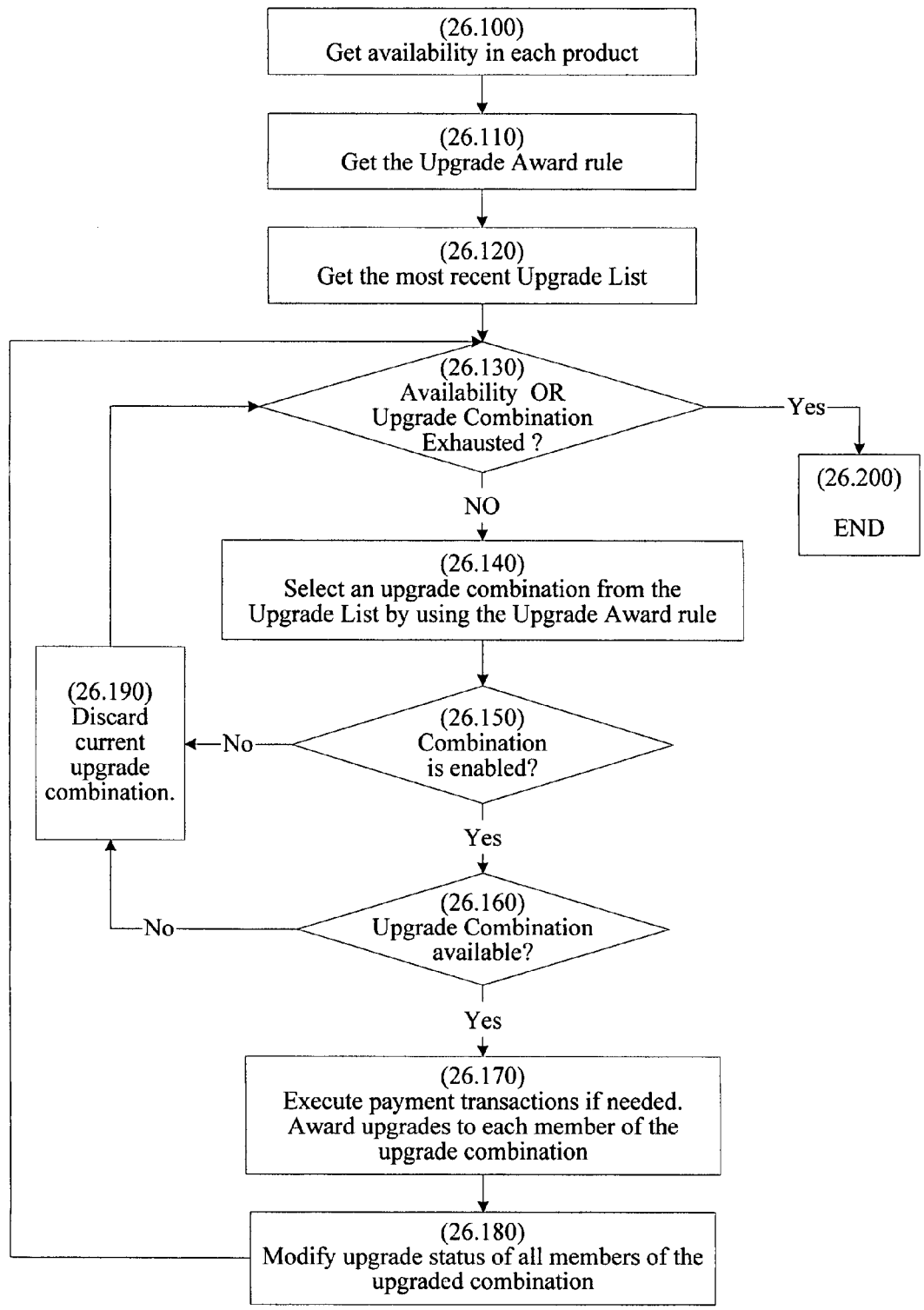
FIG. 26 is a flowchart that expands Act 130 of FIG. 23, illustrating an algorithm for the "Upgrade Award" process in UPO VOF implementation.

FIG. 26 presents an illustrative Upgrade Award process. The computation may be performed using a processor that may calculate results in optimal time. In Act 26.100, the product availability is obtained (e.g. from a company's product allocation database). In Act 26.110, an Upgrade Award rule is obtained (e.g. from the company's UPO system database). In Act 26.120, the most recent Upgrade List is obtained (from the company's UPO system database).

Next, in Act 26.130, a test is performed to determine whether the available products from all the Sets are exhausted (have been already awarded) or if the upgrade combinations in the Upgrade List have been exhausted. If so, this ends the Upgrade Award process in Box 26.200. If not, then the process moves forward to Act 26.140, where the Upgrade Award rule (thus obtained) is used to obtain a target upgrade combination from the Upgrade List.

Next, in Act 26.150, a test is performed to determine whether the selected upgrade combination is enabled to be upgraded or not. An upgrade combination is enabled if all of its members are enabled to be upgraded. A member of an upgrade combination may become disabled to be upgraded for one or more reasons, such as cancellation, failure to approve payment of charges for the final upgrade, the customer was already awarded an upgrade to a higher product and so forth. Once a customer is awarded or disabled from being upgraded, all the combinations that include this customer become disabled from the Upgrade Award process.

If the combination is enabled, control goes to the Act 26.160, where another test is performed to determine whether there is availability for the current selected upgrade combination. If so, the Upgrade Award process awards the newly available product to the topmost member of the upgrade combination, and the respective released products to the rest of the combination members in Act 26.170. In this Act, just before the award, the Upgrade Award process may charge the customers for a payment amount (if any) using any payment method such as a pre-stored charge card, a company credit account, a direct debit authorization for a bank account, etc. A company may take the authorization or set the payment terms when the customer is receiving the option or at any other time. The customer may pre-authorize the company to charge only on the condition when the customer is being awarded the upgrade. In case the payment fails, a company may set up different rules to handle it, such as to discard that member, and hence, the corresponding upgrade combination (and follow the Act 26.190), or to seek another form of payment at that point from the customer or to go ahead with the upgrade and then ask for payment from the customer at the time of customer purchasing or utilizing the product or at any other time.

Next, in Act 26.180, the status of the awarded customers is edited to indicate the fact that they have been awarded. The process loops back to Act 26.130, to continue until either the availability of products or the upgrade combinations to be upgraded are exhausted, at which the algorithm ends in Box 26.200.

If the upgrade is not enabled (in Act 26.150) or if there is no availability for the current upgrade combination (in Act 26.160), then the current upgrade combination is discarded (in Act 26.190) and control loops back to the Act 26.130 to continue processing for other upgrade combinations.

A company may use any Upgrade Award rule of its choosing including, but not limited to, to maximize the total upgrade value (monetary or soft value or a combination of both), the number of upgrades or the number of customers buying or purchasing the product, to balance demand across multiple products, to optimize customer service for all or a selected group of customers, to optimize operations and to accomplish any other objectives and/or any combination thereof.

When the Upgrade Award rule is set to maximize the total upgrade value, the upgrade value of each combination member preferably is added together to get the total upgrade value of the entire upgrade combination. Then, all the upgrade combinations from all the upgrade lists (one for each Up Product) are combined together to form one list sorted by descending value, and the topmost upgrade combination is selected as the target to be considered first for an upgrade award.

When the Upgrade Award rule is set to maximize the number of customers in the product, the number of upgrade awards given to standby customers may have to be optimized. Hence, an upgrade combination that includes a standby customer may be given preference over the one that does not include it.

A company may also choose to select the target upgrade combination randomly: to add all the upgrade combinations from all the upgrade lists of a product to one list and then to randomly select an upgrade combination as the target combination.

An upgrade award may be given at any time before and/or during the utilization of product. It may also be given at a pre-determined time. For one or more Upgrade Award rules, a company may need to iterate over possible solutions. Especially in the Act 26.140, the process to choose the target upgrade combination may involve one or more sub-acts (one or more of which may be iterative) that enable the company to accomplish the overall objective.

In situations, when there are more than one upgrade combination with the same optimal value, the company may use next level (one or more levels as needed) of Upgrade Award rule(s) to further prioritize the upgrade combinations. The next level of upgrade combination may include one or more of the rules defined above.

Both the company and the customer may have the right to enforce the upgrade award on each other as per the terms and conditions of the option contract. The company may have the right to charge the customer for the upgrade amount if the customer is upgraded. The company may inform/notify the customer and/or take approval from customer to charge the customer's account before awarding upgrade. The customer may also have the right to enforce upgrade on the company within the terms and conditions of the options contract.

The terms and conditions of the option contract may also specify fulfillment of one or more conditions before the company may award upgrade to the customers. Some of the conditions may be such as payment for upgrade, availability of highest product prior to company starting the upgrades and so forth.

A company may use the UPO VOF for any other purpose of its choosing. In all such uses, the company may use a system defined below that can help to optimally allocate product capacity among customers. The following system presents an example of a system (along with its methods and algorithms) that may be used to upgrade UPO customers within their selected UPO Products. However, a company may use any other process of its choosing to upgrade UPO customers within their selected UPO Products. The Buy_N process is used as an example to demonstrate the system and its set of methods and algorithms.

The process of upgrading U customers (i.e., UPO customers) within their selected UPO Products is termed "Upgrade_U" process. The Upgrade_U process may allow the company to optimally upgrade UPO customers from their Accounted Products (Base-Products) and to one of their Awaiting Products (Up Products) to satisfy a pre-defined goal. The cost in the Buy_N process and Upgrade_U algorithm may also refer to the price that the customer may pay to the company to receive an upgrade.

The company, an entity other than the company and/or any combination thereof may store the data in a data store which may include, but is not limited to, the value that may be realized if the customer receives an upgrade. The company, an entity other than the company and/or any combination thereof may receive and process data to determine from among all or substantially all possible combinations of customers, a set of customers which may be awarded upgrades. The company, an entity other than the company and/or any combination thereof may upgrade one or more set of customers that may be determined by processing the data. The company may also upgrade one or more set of customers other than the combination of customers that may be determined by processing said data. Set of customers which may be upgraded or the decision to initiate upgrade award process may depend upon number of factors including, but not limited to, the need to upgrade customers, factors of company's choosing, creation of number of units of product availability, availability of Up Products, optimizing revenues which may for at least one of the customer, company and/or an entity other than said company, cost savings and so forth.

The company may, on detection of occurrence of one or more events, execute one or more event response algorithms which may determine one or more set of customers possessing options making them eligible to be upgraded to one or more products and may upgrade one or more of said set of customers to create product availability. Said event may be an increase in the demand of one or more Base Products, increase in forecasted demand of one or more Base Products, availability of one or more Up Products, any combination thereof or any other event. The upgrade award process may be done at the instance of the company, an entity other than said company or any combination thereof. The set of customers, here, may include one or more customers. The upgrade process may involve upgrading one or more customers. Upgrade of one or more customers, as explained below in Upgrade_U, may involve one or more interactions between the company, an entity other than the company, the customers and/or any combination thereof. The company and/or an entity other than the company may upgrade one or more customers to one or more products belonging to said company, to one or more products belonging to an entity other than said company and/or any combination thereof.

Buy_N Process

Figure 27:
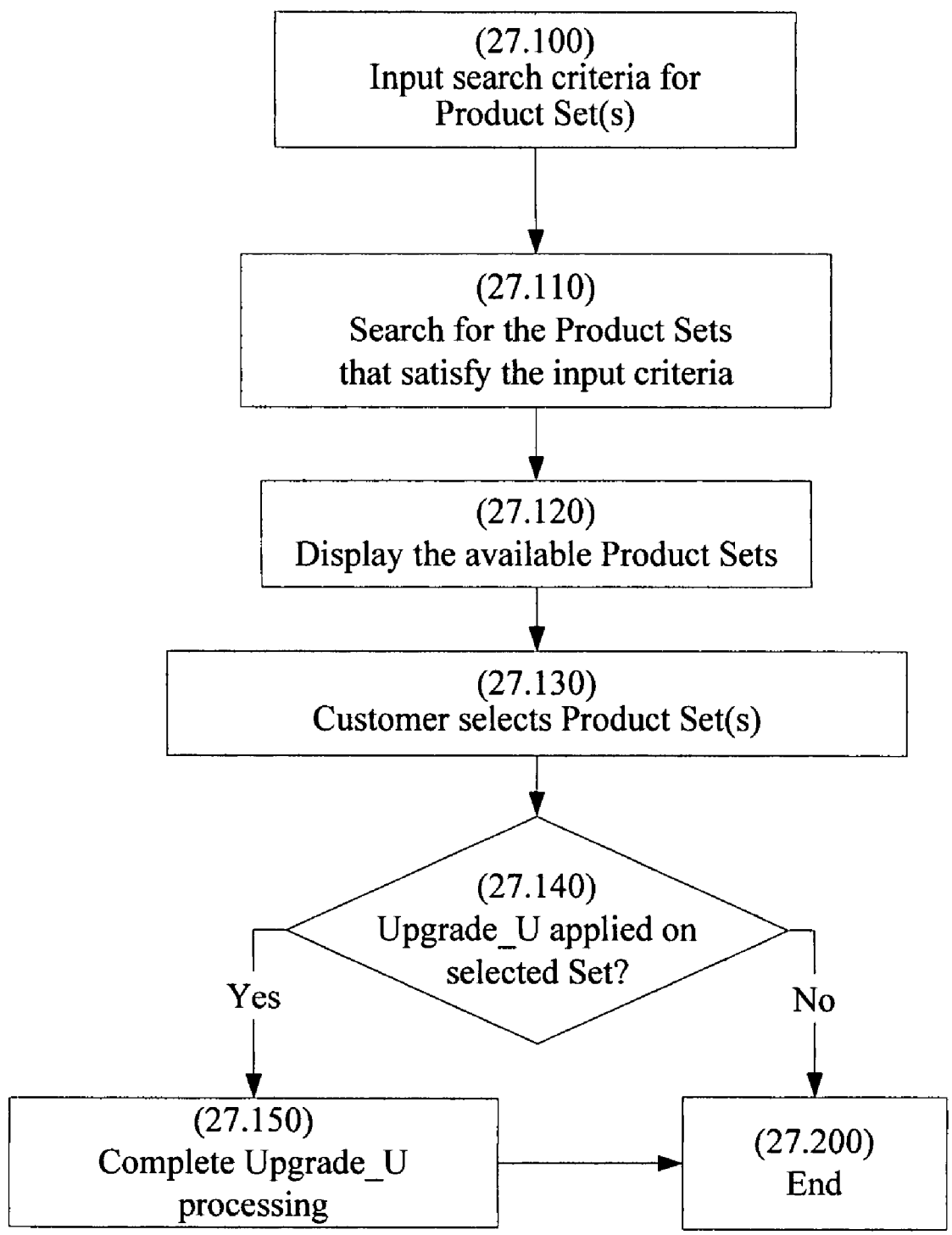
FIG. 27 is a flowchart illustrating the Buy_N process for a Product Set of a company that has implemented the UPO VOF.

FIG. 27 displays a flow chart of an example of a Buy_N algorithm, which is executed during a dynamic interaction between the customer and the company. As an example, an interaction may include a situation when a customer interacts with a company to obtain (or purchase) products, or when a company presents offerings to a customer (with or without a solicitation by the customer). A few parameters have been assumed to add context and enhance understanding. It is assumed that a customer is interacting with a company to purchase products, and that UPO VOF is implemented at the Set level. In Act 27.100, the search criteria are input. Various search parameters for a desired Product Set (as desired by the customer) are taken as the input to the system.

Next, in Act 27.110, a search process is executed to search for all Product Sets that satisfy inputs. The details of the search process are described later. Next, in Act 27.120, all the search results are displayed before the customer in an interface (such as in a web browser, a telephone operator stating the search results over the phone etc.). Control then goes to Act 27.130, where the customer selects a Set (or Product Set). The selection of the Set may be followed by a payment and/or purchase of the selected Set.

In Act 27.140, a test is performed to determine whether Upgrade_U process has been applied on the selected Set. If so, control goes to Act 27.150, where the Upgrade_U process is completed for the selected Set, and control then goes to Box 27.200. If not, control goes to Box 27.200, where the algorithm exits. The completion of the Upgrade_U process may include one or more Acts that may be executed to incorporate the fact that said Set was selected by the customer. For example, one of such acts may be to record the selection of said Set to a database and/or to change the Accounted Status for one or more UPO customers (who were affected in the Upgrade_U process).

Figure 28:
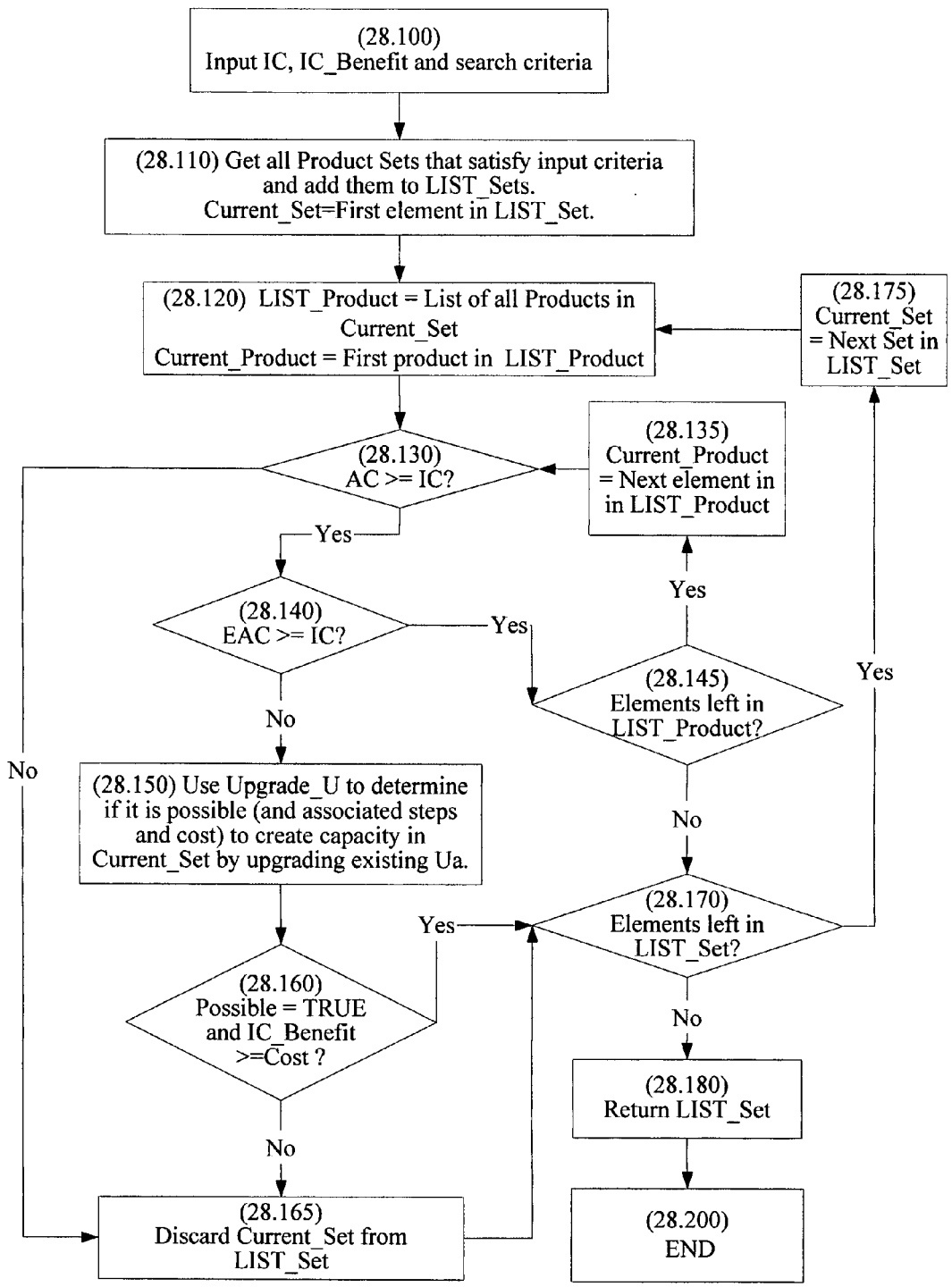
FIG. 28 is a flowchart that expands Act 110 of FIG. 27, illustrating an algorithm for the Buy_N search process.

FIG. 28 expands Act 110 of FIG. 27 and demonstrates an example of a search algorithm that may be used to determine Product Sets that satisfy the inputs. In Act 28.100, IC (number of incoming customers), IC_Benefit (i.e., the benefit that a company may receive if the incoming customers select and/or purchase one or more Sets) and the input search criteria are taken as the input parameters to the system. The term "Incoming Customers" refers to the customers who interact with the company in the current transaction (Buy_N). It is assumed that each customer desire one unit of capacity and thus, total units of capacity desired is equal to the total number of incoming customers. In some situations, IC_Benefit and/or IC may not be available as an input, and may be calculated during the search process. Next, in Act 28.110, all the Sets that satisfy the 'search criteria' are searched from the company database. The Sets, thus obtained, are added to a list termed LIST_Set. The first element in the LIST_Set list is designated as Current_Set.

Next, in Act 28.120, all the Products in the Current_Set are added to a list termed LIST_Product. The first element in the LIST_Product list is designated as Current_Product. Next, in Act 28.130, a test is performed to determine whether the Available Capacity (AC) of the Current_Product is greater than or equal to IC. If so, control goes to Act 28.140. If not, control goes to Act 28.165.

In Act 28.140, another test is performed to determine whether EAC (Effective Available capacity) of the Current_Product is greater than or equal to IC. If so, control goes to Act 28.145. If not, control goes to Act 28.150, where the Upgrade_U algorithm is executed to determine the possibility (and associated process steps and costs) to create capacity in the Current_Set.

Next, in Act 28.160, a test is performed to determine whether it is possible (by using Upgrade_U) to create capacity in the Current_Set and the IC_Benefit is greater than or equal to the cost to create that capacity as determined in the Act 28.150. If both conditions are true, control goes to Act 28.170. If either condition is false, control goes to Act 28.165. In Act 28.165, the Current_Set is discarded from the LIST_Set list, and control then goes to Act 28.170.

In Act 28.145, a test is performed to determine whether more elements are left in the LIST_Product list. If so, control goes to Act 28.135, where the next element in the LIST_Product list is designated as the Current_Product and control loops back to Act 28.130, to repeat the process for the new Current_Product. If not, control goes to Act 28.170.

In Act 28.170, another test is performed to determine whether more elements are left in the LIST_Set list. If so, control goes to Act 28.175, where the next element in the LIST_Set list is designated as the Current_Set and control loops back to Act 28.120, where the process for the new Current_Set is performed. If not, control goes to Act 28.180, where the LIST_Set list (the most recently updated version after discarding the invalid Sets, if any) is returned. Next, the algorithm ends at Box 28.200.

Figure 29:
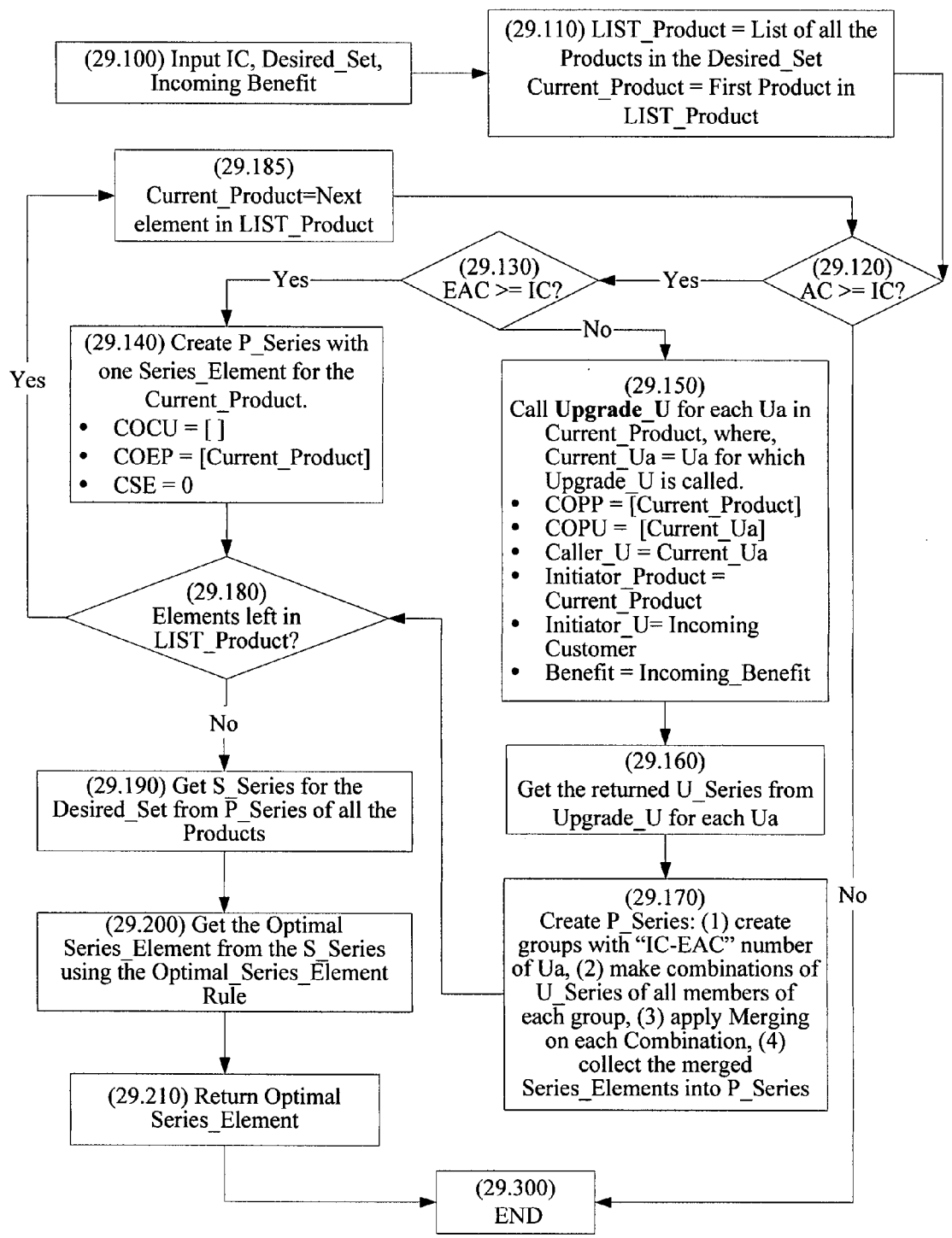
FIG. 29 is a flowchart that expands Act 150 of FIG. 28, illustrating an algorithm to create capacity using the Upgrade_U algorithm.

FIG. 29 expands Act 150 of FIG. 28 and demonstrates an example of an algorithm to apply the Upgrade_U algorithm to create one or more units of capacity in one or more Product(s) within a Desired_Set (the Set in which capacity needs to be created). In Act 29.100, various input parameters are taken in the system. Input parameters include IC, Desired_Set and Incoming_Benefit (i.e., benefit a company may realize if capacity is created in the Desired_Set)

Next, control goes to Act 29.110, in which all the Products in the Desired_Set are listed in the LIST_Product list. The first Product in the LIST_Product list is designated as Current_Product. Next, in Act 29.120, a test is performed to determine whether the Available Capacity (AC) of the Current_Product is greater than or equal to IC. If so, control goes to Act 29.130. If not, control goes to Box 29.300, where the algorithm ends. In Act 29.130, another test is performed to determine whether EAC (Effective Available capacity) of the Current_Product is greater than or equal to IC. If so, then control goes to Act 29.140. If not, control goes to Act 29.150.

In Act 29.140, a P_Series is created for the Current_Product. Since the Current_Product is an End_Product, there will be only one Series_Element in the P_Series collection. The Series_Element will comprise COEP with the Current_Product as the only element, COCU with no elements and CSE with zero value (since no Ua needs to be upgraded from Current_Product, and hence, no cost to create capacity). Next, control goes to Act 29.180.

In Act 29.150, the Upgrade_U algorithm is called for each Ua in the Current_Product and the algorithm follows a recursive loop. Each of the Ua becomes Current_Ua for the corresponding Upgrade_U call. The necessary input parameters for each of the Upgrade_U includes the Current_Product as 'COPP', Current_Ua as 'COPU', Current_Ua as 'Caller_U', Current_Product as 'Initiator_Product', one of the incoming customers as 'Initiator_U' and Incoming_Benefit as 'Benefit'. The Upgrade_U call returns a U_Series collection for each Ua in the Current_Product. The details of the Upgrade_U algorithm are discussed in the next section.

Next, control goes to Act 29.160, where all the U_Series collections are obtained as returned from the Act 29.150. Next, in Act 29.170, a P_Series collection for the Current_Product is calculated through the following operations: (1) create groups of Ua from all Ua of the Current_Product for which Upgrade_U was called, where the number of Ua in each group is equal to "IC-EAC" (EAC of the Current_Product), (2) make combinations of the U_Series collection of all members of each group (combine each Series_Element of each U_Series of each member with that of each of the rest of the members of that group), (3) merge all members within each combination to formulate a merged Series_Element, (4) collect all such merged Series_Elements, thus obtained, into P_Series collection of the Current_Product. Details on making combinations and merging are provided later.

Next, in Act 29.180, a test is performed to determine whether more elements are left in the LIST_Product list. If so, control goes to Act 29.185, where the next element in the LIST_Product list is designated as the Current_Product and control loops back to Act 29.120 to repeat the process for the new Current_Product. If not, control goes to Act 29.190.

In Act 29.190, a S_Series collection for the Desired_Set is calculated from the P_Series collections of all the Products using the combination and merging process (details provided later). Next, in Act 29.200, an optimal Series_Element from the S_Series collection is determined using Optimal_Series_Element Rule (which is read from a company database). A company may select any rule of its choosing. Next, control goes to Act 29.210, where the optimal Series_Element is returned and the algorithm exits at Box 29.300.

'Upgrade_U' Algorithm

Figure 30:
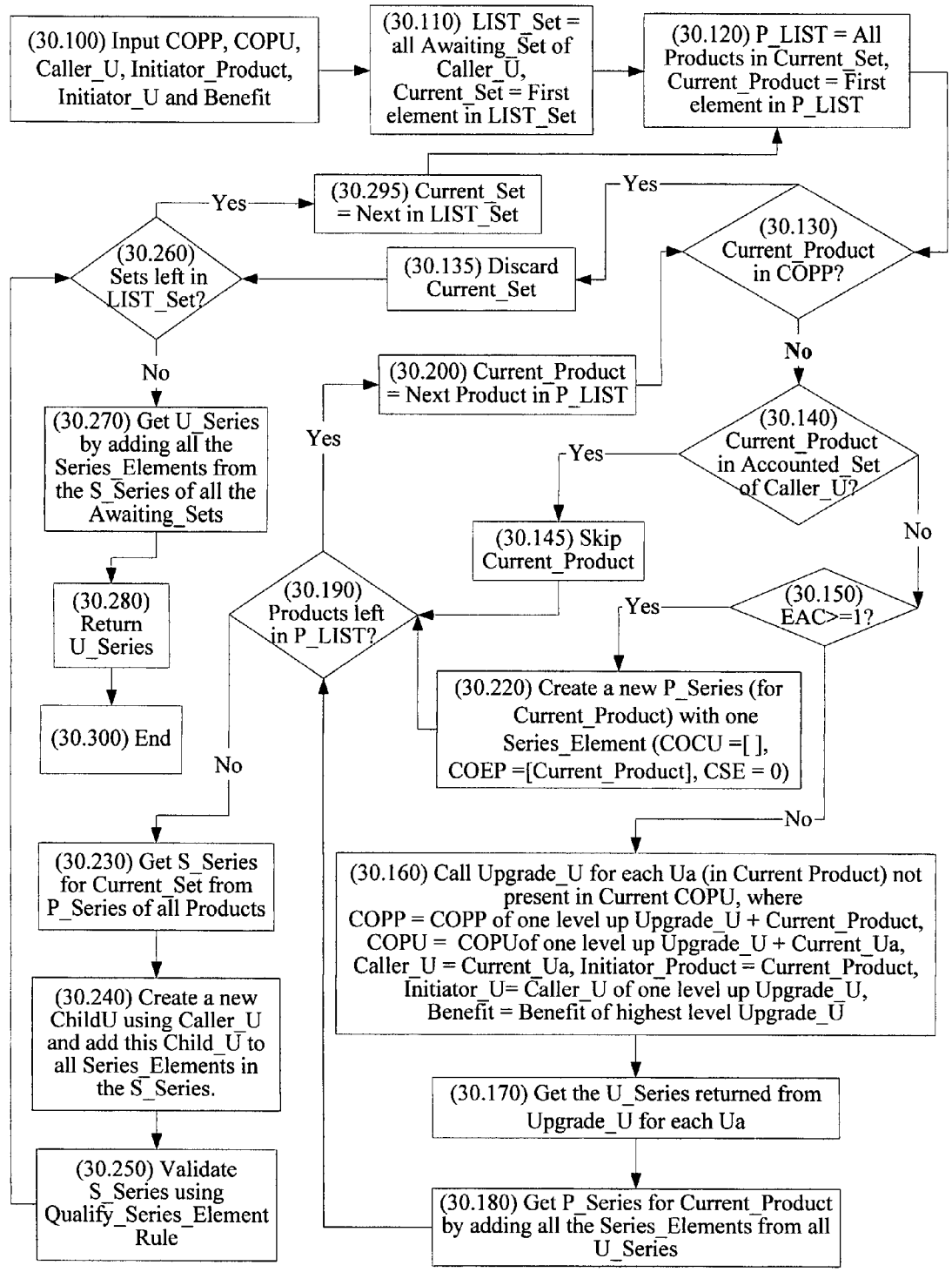
FIG. 30 is a flowchart that expands Act 150 of FIG. 29, provides an algorithmic illustration for the Upgrade_U algorithm.

The following algorithm presents an example of an algorithm that may be used to create one unit of capacity of a Product by upgrading a Ua Accounted in a Product to its Awaiting_Set. FIG. 30 represents an algorithmic illustration for Upgrade_U. The Upgrade_U is a recursive algorithm, which returns a collection of Series_Element termed "U_Series" collection for the Ua for which the algorithm has been called.

In Act 30.100, a set of parameters including COPU, COPP, Caller_U, Initiator_Product, Initiator_U and Benefit are input to the system. Next, in Act 30.110, all the Awaiting_Sets of the Caller_U are added to a list termed LIST_Set. The first element in the LIST_Set list is designated as Current_Set. Next, in Act 30.120, all the Products that belong to the Current_Set are added to another list termed P_LIST. The first element in the P_LIST list is designated as Current_Product.

Next, in Act 30.130, a test is performed to determine whether the Current_Product is present in the COPP. If so, the Current_Set is discarded in Act 30.135, and control goes to Act 30.260. If not, control goes to Act 30.140.

In Act 30.140, another test is performed to determine whether the Current_Product is present in the Accounted_Set of the Caller_U. If so, the Current_Product is skipped in Act 30.145, and control then goes to Act 30.190. If not, control goes to Act 30.150, where another test is performed to determine if the EAC of the Current_Product is greater than or equal to 1. If so, control goes to Act 30.220. If not, control goes to Act 30.160.

In Act 30.220, a new P_Series collection is created with only one Series_Element, since the Current_Product is an End_Product. The Series_Element will comprise COEP with the Current_Product as the only element, COCU with no elements and CSE with zero value. Next, control goes to Act 30.190.

In Act 30.160, the algorithm enters into a recursive loop where the Upgrade_U algorithm is called for each of the Ua in the Current_Product that is not present in the COPU. Each of the Ua becomes Current_Ua for the corresponding Upgrade_U call. The necessary input parameters for each of the Upgrade_U includes 'COPP' (includes the COPP of one level up Upgrade_U and the Current_Product), 'COPU' (includes the COPU of one level up Upgrade_U and the Current_Ua), the Current_Ua as 'Caller_U', the Current_Product as 'Initiator_Product', Caller_U of one level up Upgrade_U as 'Initiator_U' and benefit of the highest level Upgrade_U as 'Benefit'. Each of the Upgrade_U call returns a U_Series collection for every Ua for which Upgrade_U was called.

Next, in Act 30.170, the algorithm receives the returned U_Series collection from all the Upgrade_U algorithm calls in Act 30.160. Control then goes to Act 30.180, where a P_Series collection for the Current_Product is calculated by adding all the Series Elements from all the returned U_Series collection obtained in Act 30.170. Control then goes to Act 30.190.

In Act 30.190, a test is performed to determine whether more Products are left in the P_LIST list. If so, control branches out to Act 30.200, where the next Product in the P_LIST list is designated as the Current_Product, and control then goes to Act 30.130 where the process is repeated for the new Current_Product. If not, control goes to Act 30.230.

In Act 30.230, the S_Series collection is calculated for the Current_Set by combining and merging all the P_Series collection of all the Products (not taking the skipped Product(s) into consideration, if any). Next, in Act 30.240, a new ChildU is created using the Caller_U. The ChildU comprises COI (where the current Initiator_Product is designated as Initiator_Product and the current Initiator_U is designated as Initiator_U), Accounted_Set of the Caller_U designated as the Initial_Accounted_Set, current Awaiting_Set designated as the Final_Accounted_Set, and the cost to upgrade current Caller_U from the Initial_Accounted_Set to the Final_Accounted_Set designated as the CCU. The ChildU, thus created, is added to every Series_Element in the S_Series collection and the CCU of the same ChildU is added to the CSE (Cost of Series_Element) of every Series_Element. Control then goes to Act 30.250.

In Act 30.250, a Qualify_Series_Element rule is read from the company's database and is applied to validate all the Series_Elements in the S_Series collection. The invalid Series_Elements are discarded from the S_Series collection. A company may select any rule of its choosing. For example, a Qualify_Series_Element rule may only qualify those Series_Elements for which the CSE is greater than or equal to the 'Benefit'. Next, control goes to Act 30.260.

In Act 30.260, a test is performed to determine whether more Sets are left in the LIST_Set list. If so, control branches out to Act 30.295, where the next element in the LIST_Set list is designated as the Current_Set, and then control loops back to Act 30.120, where the process is repeated for the new Current_Set. If not, control goes to Act 30.270, where the U_Series collection is obtained by adding all the Series_Elements of all the S_Series collections for all the Awaiting_Sets of the Caller_U. Next, the U_Series collection is returned in Act 30.280, and the algorithm ends in Box 30.300.

Combinations of P_Series in order to formulate S_Series are calculated by cross multiplication of Series_Elements (of each P_Series). A company may choose to implement any method of its choosing to make combinations. One method is as follows. Consider n number of Series; say $S_1, S_2, S_3 \ldots S_n$, with k1, k2, k3 ... kn number of Series_Element respectively. Each Combination is a collection of the Series_Elements. For instance, C1={$S_1[1], S_2[1], S_3[1], \ldots S_n[1]$}, where, $S_p[1]$ denotes the first Series_Element of $p^{th}$ Series; C2={$S_1[2], S_2[1], S_3[1], \ldots S_n[1]$}, and so on. Here is an example of the above method. Consider 2 Series, A and B, where A=[A1, A2], i.e., with A1 and A2 as two Series_Elements; and where B=[B1, B2, B3], i.e., with B1, B2, B3 as three Series_Elements. If cross multiplication method is applied, then the total number of Combinations generated is 6 (=2*3) as follows, C1={A1, B1}, C2={A1, B2}, C3={A1, B3}, C4={A2, B1}, C5={A2, B2} and C6={A2, B3}. The above method of making combinations may also be used when making combinations of U_Series to formulate a P_Series.

Merging of a given number of Series_Elements is done in a sequential process, where two given Series_Elements are merged together in one Act to obtain a single merged Series_Element (let's say M), and then the merged element, M, is merged with the third given Series_Element to obtain a new merged element, and so on. The main objective of merging is to ensure that the Series_Elements created are valid and synchronized with each other with respect to capacity utilization of various products involved. A given unit of product capacity at any given point must only be accounted for one customer, otherwise, it may lead to a shortage situation, where one product is allocated to more than one customer leading to dissatisfaction for customers. A company may choose any method of its choosing to perform merging of Series_Elements, and specifically to perform merging of two Series_Elements. The method of merging chosen may affect the total value realized. One example of such a method is given. In one approach, a company may choose to discard all merged Series_Elements that have either one or more common ChildU or common End_Product. A common ChildU in two Series_Elements suggest that in both Series_Elements upgrading of one specific Ua is needed. If each Series_Element requires upgrading of Ua to two different Sets, it may present a contradictory situation. Similarly, a common End_Product in two or more Series_Elements (that are to be merged together) may require to upgrade more than one Ua customer to a specific Product, which may or may not be feasible depending on the AC (and EAC) of that product. Thus, a common End_Product may also represent one or more contradictory or invalid situations.

A company may use any set of rules to validate or invalidate one or more constituents of any of the merged components. For example, a merged Series_Element, M, obtained from merging of two Series Elements S1 and S2, may comprise the COEP (addition of COEP of S1 and S2), COCU (addition of COCU of S1 and S2) and CSE (addition of CSE of S1 and S2).

Upgrade_U and Buy_N processes may generate value for the company, an entity other than the company, customers and/or any combination thereof. The value may include, but is not limited to cost savings for the company, an entity other than said company, any combination thereof. The value generated may also include, but is not limited to, soft value, value attributable to customer goodwill, satisfaction and loyalty. The value so generated may optimize revenue of at least one entity other than said company.

Customer Notification Process

In the Customer Notification (CN) process, a decision for the Chosen Product is notified to the customer. As mentioned earlier, the Chosen Product may be defined by the company, the customer, another entity or any combination thereof. However, the company may want to keep the right to select (or define) the Chosen Product in the UPO VOF. A company may use any method of its choosing to define the Chosen Product. A company may use a software application built on the method defined above to optimally define the Chosen Product to UPO customer.

Figure 31:
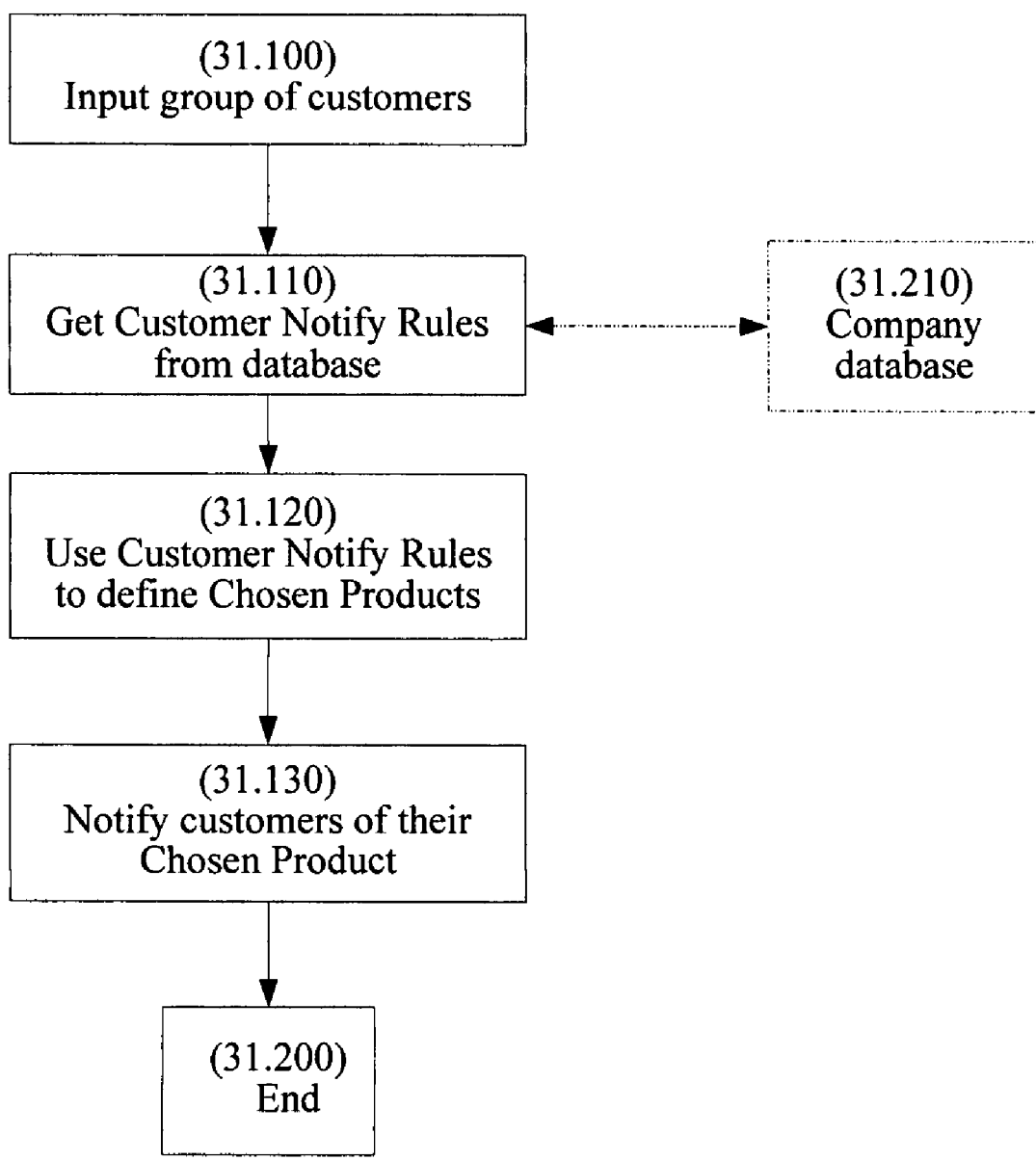
FIG. 31 is a flow chart illustrating an example of an algorithm of Customer Notification process.

FIG. 31 displays an example of an algorithm that may be used to execute the Customer Notification process. In Act 31.100, a group of (one or more) customers is taken as input. Next, in Act 31.110, a set of one or more Customer Notify Rules may be used to define the Chosen Product. A company may choose any Customer Notify Rule of its choosing. The Customer Notify Rules may depend upon expected value of the Product, expected sales volume and so forth. For example, a company may choose a Customer Notify Rule which selects the Product with the higher value as the Chosen Product. Alternatively, a rule may be chosen, which selects the Product with the lower value as the Chosen Product. While defining the Chosen Product, a company may also want to use the Upgrade_U algorithm (as used in the Buy_N process given above) to determine the optimal Chosen Product that satisfies a pre-determined goal. Thus, during the CN process, one or more Ua may be upgraded in the process of selecting the optimal Chosen Product. A Customer Notify Rule may also select the Product with the higher sales volume as the Chosen Product. A Customer Notify Rule may specify that if UPO VOF is used in conjunction with any other VOF (such as FRO VOF and so on), then the Grouping Rules (defined later) may govern the selection of the Chosen Product. Next, in Act 31.120, the Customer Notify Rules, thus obtained from the company's database, are used to define Chosen Product(s). Next, in Act 31.130, the customers are notified about their Chosen Product(s), and the algorithm then ends in Box 31.200.

Implementation of UPO VOF in Conjunction with Other VOFs

UPO VOF may be used in conjunction with one or more other VOFs, for example, the APO (the Alternate Product Option) VOF. A customer who receives an APO is termed "A" type of customer. A company and/or another entity may form a group of one or more APO customers and one or more UPO customers, where the options (APO and UPO) obtained by the group members are complimentary in nature. As an example, consider two customers A(P1, P2) and U[up(P2), base(P1)]. The notation A(P1, P2) implies a customer A who has received an APO and has the flexibility to choose either of P1 or P2 as the Chosen Product. The notation U[up(P2), base(P1)] implies a customer U who received a UPO and wishes to get an upgrade from P1 (i.e., the Base-Product) to P2 (i.e., the Up product). Thus, if A decides to choose P1 as the Chosen Product, the company may upgrade U to P2. If A decides to choose P2 as the Chosen Product, the company may not upgrade U and hence U gets P1. The customers A and U have taken complimentary options and may form a group. The company may need to hold only one unit of inventory in P1 and P2 to satisfy the needs of both A and U (assuming each A and U only need one unit of product). Such a combination of complimentary options or VOFs may improve efficiency and concurrently enhance value for all the parties involved (in the context of the current example, enhance value for U, A and the company).

The implementation of the grouping of U type and A type of customers may be done in one or more ways. One way to implement such grouping is to first offer and secure one or more U type of customers and based on such customer(s), the company may offer complimentary APOs to customers to make groups. In another implementation, the company may first offer and secure APO customers and based on such APO customer(s), company offers complimentary UPOs to customers to make groups. In yet another implementation, the company may offer UPO and APO separately and then define a process to make complimentary groups of A and U customers (such groups termed "AU_Groups").

A company and/or another entity may choose to create AU_Groups at various group levels such as implementation of grouping at Level 1, Level 2 and so on. In Level 1 grouping, an AU_Group involves one each of A and U type of customers. An example of Level 1 grouping has already been given above (the two customer, A and U, example).

In Level 2 grouping, the grouping involves making complimentary groups for more than 2 customers. As an example, consider three customers A(P1, P2, P3), U1[up(P2, P3), base (P1)] and U2[up(P1, P3), base(P2)]. The notation A(P1, P2, P3) implies a customer A who received an APO on P1, P2 and P3 (flexibility to choose any one of P1, P2 or P3 as the Chosen Product). The notation U1[up(P2, P3), base(P1)] implies a customer U1 who received a UPO and wishes to get an upgrade from P1 (Base-Product) to either P2 or P3 (any of the two Up products), and U2[up(P1, P3), base(P2)] implies a customer U2 who received a UPO and wishes to get an upgrade from P2 (Base-Product) to either P1 or P3 (any of the two Up products). A company may group these three customers together. If A decides to choose P1 as the Chosen Product, the company may upgrade U1 to P2 and U2 to P3. Alternatively, if A decides to choose P2 as the Chosen Product, the company may upgrade U1 to P3 and U2 to P1. In the third case, if A decides to choose P3 as the Chosen Product, the company may upgrade U1 to P2 and U2 to P1. Thus by grouping them together, the company needed to hold only one unit of inventory in each of the three products P1, P2 and P3 to satisfy needs for all three customers in all different situations.

It is assumed that a "unit" represents one unit of product (or product capacity) and each customer needs only one unit of a product. Continuing with the above example, if the company were to not consider the complimentary nature of options obtained by A, U1 and U2 customers, the company may need to hold (or block) a total of 5 units of capacity to ensure complete satisfaction of needs of A, U1 and U2, i.e., 3 units for A (1 unit each of P1, P2 and P3 as A could choose any product), 1 unit for U1 in P1 (Base-Product) and 1 unit for U2 in P2. Even by blocking (or holding) 5 units of space, there may be no guarantee that the company would be able to satisfy upgrade needs for U1 or U2 (in the event they are not grouped together). This implies, to satisfy a total need of 3 units of products, the company may need to hold (or block) 5 units of product capacity, creating a redundant capacity of 2 units that the company may not be able to use otherwise. By creating a complimentary group of A-U1-U2, the company needs to only hold (or block) 3 units of capacity (1 unit each in P1, P2 and P3), thus, freeing up 2 units of redundant capacity. Thus, an AU_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A-U1-U2-U3.

A company may choose to implement grouping at various product levels such as Product, Set and Order. A company may also change terms and conditions of one or more option contracts of one or more UPO and/or APO customers (for e.g., price, notify deadline and so on) to solicit customer participation in UPO/APO to create more AU_Groups. The company may also offer incentives to customers to choose complimentary UPO/APO offerings to enable the company to create more AU_Groups. The implementation methods mentioned above for grouping are for illustration purposes only and a company may choose to implement grouping in one or more other ways or by combining above said methods or by combining one or more other ways along with one or more above said methods.

Figure 32:
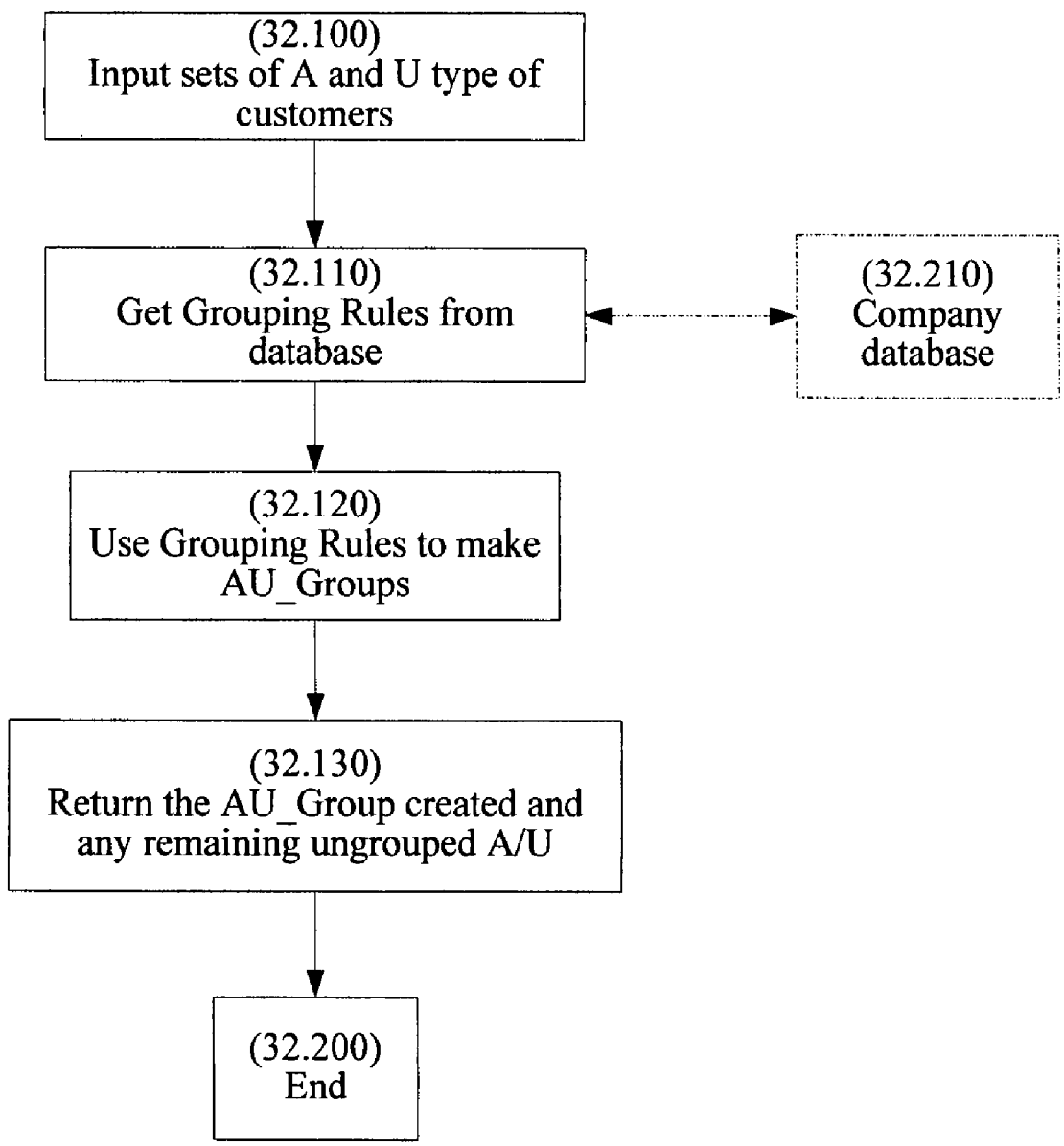
FIG. 32 is a flowchart illustrating an example of an algorithm to implement grouping of A and U type of customers.

FIG. 32 displays a flow chart that illustrates one way of implementing grouping of A and U type of customers. In Act 32.100, sets of A and U customers are taken as input. Next, in Act 32.110, a set of one or more Grouping Rules is read from the company's database (32.210). A grouping rule may depend upon the number of A and/or U type of customers, desired capacity redundancy in the system, the permissible time factor to create AU_Groups, any other rule of company choosing, any combination thereof and so on. For example, a company may choose a Grouping Rule whereby new groups are created by first ungrouping one or more of the AU_Groups (created earlier but unexercised, for example, groups for which the customer has not been notified, or if notified, the customer has not utilized the Product and the terms of option contract allows for a change in the Chosen Product). In another example, a Grouping Rule may create groups of only those A and U type of customers who are yet to be grouped and discarding all A/U customers, which have already been grouped. A company may implement any Grouping Rule to formulate AU_Groups. The choice to Grouping rules may enhance the overall value for the company (for example, reduce the total capacity required to satisfy product needs for all A and U customers). Theoretically, the number of units of the Product required (or blocked) should be equal to the number of units the customers shall be eventually utilizing. Thus, by implementing the grouping and with the help of appropriate Grouping Rules, the company may attempt to achieve such theoretical minima. Next, in Act 32.120, the Grouping Rules, so obtained from the company's database, are used to make AU_Groups. Next, in Act 32.130, the AU_Groups so created are returned along with ungrouped A/U, if any, and the process then ends in Box 32.200.

The grouping may enhance customers' experience, and may comprise operating a system that delivers a UPO to at least a "first customer" to utilize up to n of m selected products for said first customer, where n is less than or equal to m; operating a system that delivers an APO to at least a "second customer" to utilize up to k of p selected products, where k is less than or equal to p; operating a system to define each of the k Chosen Products, whereby after each of the k Chosen Products is defined, said "second customer" can utilize said Chosen Product; operating a system wherein a company defines t Chosen Product(s) for said "first customer" after each of said k Chosen Products is defined, wherein after each of said t products is defined, said first customer can utilize said defined product, where t is less than or equal to n. Said t products may be a subset of n products, m products or both. Said t products or n products or both may also include one or more products not included in said m selected products. Similarly, k products may be a subset of p products, or may include one or more products other than said p products. The grouping may be performed for a multiplicity of at least one of said first or second customers and may combine together at least one of each of said first and second customers to formulate at least one group with at least one complementary set of options. The grouping may enable a company, an entity other than said company and/or any combination thereof, to utilize at least one of said m or p products at least after delivery of any of said first or second options. The company and/or an entity other than said company may implement UPO VOF where in the first and/or second customer in said grouping may be same. The notification conditions may be different, same or any combination thereof for the first and second option.

Said first and/or second option may or may not include any notification deadline condition. The company, the second customer, an entity other than said company and/or any combination thereof may define, at one or more times, at least one of said k chosen products. The company, the first customer, an entity other than said company and/or any combination thereof may define, at one or more times, at least one of said p chosen products. The first customer may select, at one or more times, at least one of said m products. The second customer may select, at one or more times, at least one of said p products. The company and/or an entity other than the company may receive from at least one of said first or second customer, at one or more times, an indication of one or more terms and conditions associated with said first or second options, respectively. Similarly, at least one of said company and/or an entity other than said company may deliver to at least one of said first or second customers, at one or more times, one or more terms and conditions associated with said first or second option, respectively. There may or may not be any payment transaction between the company, an entity other than the company, and at least one of said first and/or second customer.

UPO VOF may be used in conjunction with one or more other VOFs, for example, the FRO (Flexibility Reward Option) VOF. A customer who receives a FRO is termed "Y" type of customer. A company may form a group of one or more FRO customers and one or more UPO customers, where the options (UPO and FRO) obtained by the group members are complimentary in nature.

The implementation of the grouping of U type and Y type of customers may be done in one or more ways. One way to implement such grouping is to first offer and secure one or more Y type of customers and based on such customer(s), the company and/or another entity may offer complimentary UPOs to other customers to make groups. In another implementation, the company may first offer and secure UPO and based on such UPO customer(s), company offers complimentary FROs to other customers to make groups. In yet another implementation, the company may offer UPO and FRO separately and then define a process to make complimentary groups of U and Y customers (such groups termed "UY_Groups").

A company and/or another entity may choose to create UY_Groups at various group levels such as implementation of grouping at Level 1, Level 2 and so on. In Level 1 grouping, a UY_Group involves one each of U and Y type of customers. As an example, Level 2 grouping is given below.

In Level 2 grouping, the grouping involves making complimentary groups for more than 2 customers. As an example, consider three customers Y(P1, P3), U1[up(P2), base(P3)] and U2[up(P1), base(P2)]. The notation Y(P1, P3) implies a customer Y who has received a FRO and is flexible to have either P1 or P2 as the Chosen Product. The notation U1[up(P2), base(P3)] implies a customer U1 who received a UPO and wishes to get an upgrade from P3 (i.e., the Base-Product) to P2 (i.e., the Up Product), and U2[up(P1), base(P2)] implies a customer U2 who received a UPO and wishes to get an upgrade from P2 (i.e., the Base-Product) to P1 (i.e., the Up Product). A notation Y-U1-U2 represents this example. Thus, there are three products P1, P2, and P3 and they are occupied by Y, U2, and U1 respectively. The three customers have different value needs. The customer Y is flexible on either P1 or P3 if he/she receives a desired reward for trading-in his/her flexibility. The customer U1 has a Base-Product P3 and wishes to get P2 as the Up Product. If a company is able to upgrade U1 to P2 from P3, it may generate incremental value for both the customer and the company. But in the existing framework (i.e., without using conjunction of more than one VOFs), the company may not be able to achieve this without an available capacity on product P2. Similarly, U2 has a Base-Product P2 and wishes to get P1 as the Up Product. A company may customize the desired values for the three customers by leveraging on Y's flexibility and upgrading U1 and U2. The company may assign P3 as Chosen Product to Y, upgrade U2 from P2 to P1, and upgrade U1 from P3 to P2. The company may be able to generate customer surpluses in the process of U1 and U2 upgrades, which would not have been possible normally. Thus, a company may be able to generate incremental value for all the parties involved and satisfy the desired needs to a level of customization. Such a combination of complimentary options or VOFs may improve efficiency and concurrently enhance value for all the parties involved (in the context of the current example, enhance value for Y, U1, U2 and the company).

It is assumed that a "unit" represents one unit of product (or product capacity) and each customer needs only one product. Continuing with the above example, if the company were to not consider the complimentary nature of options obtained by Y, U1 and U2 customers, the company may need to hold (or block) more than 3 units of capacity to ensure complete satisfaction of needs of Y, U1 and U2. This implies, to satisfy a total need of 3 products, the company may need to hold (or block) more than 3 products, creating a redundant capacity of at least one product that the company may not be able to use otherwise. By creating a complimentary group of Y-U1-U2, the company does not need to hold any capacity, thus, freeing up the redundant capacity. Thus, a UY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be Y-U1-U2-U3.

A company and/or another entity may choose to implement grouping at various levels. A company may also change terms and conditions of one or more option contracts of one or more UPO and/or FRO customers to create more UY_Groups. The company may also offer incentives to customers to choose complimentary UPO/FRO offerings to enable the company to create more UY_Groups. The implementation methods mentioned above for grouping are for illustration purposes only and a company may choose to implement grouping in one or more other ways or by combining above said methods or by combining one or more other ways along with one or more above said methods.

Figure 33:
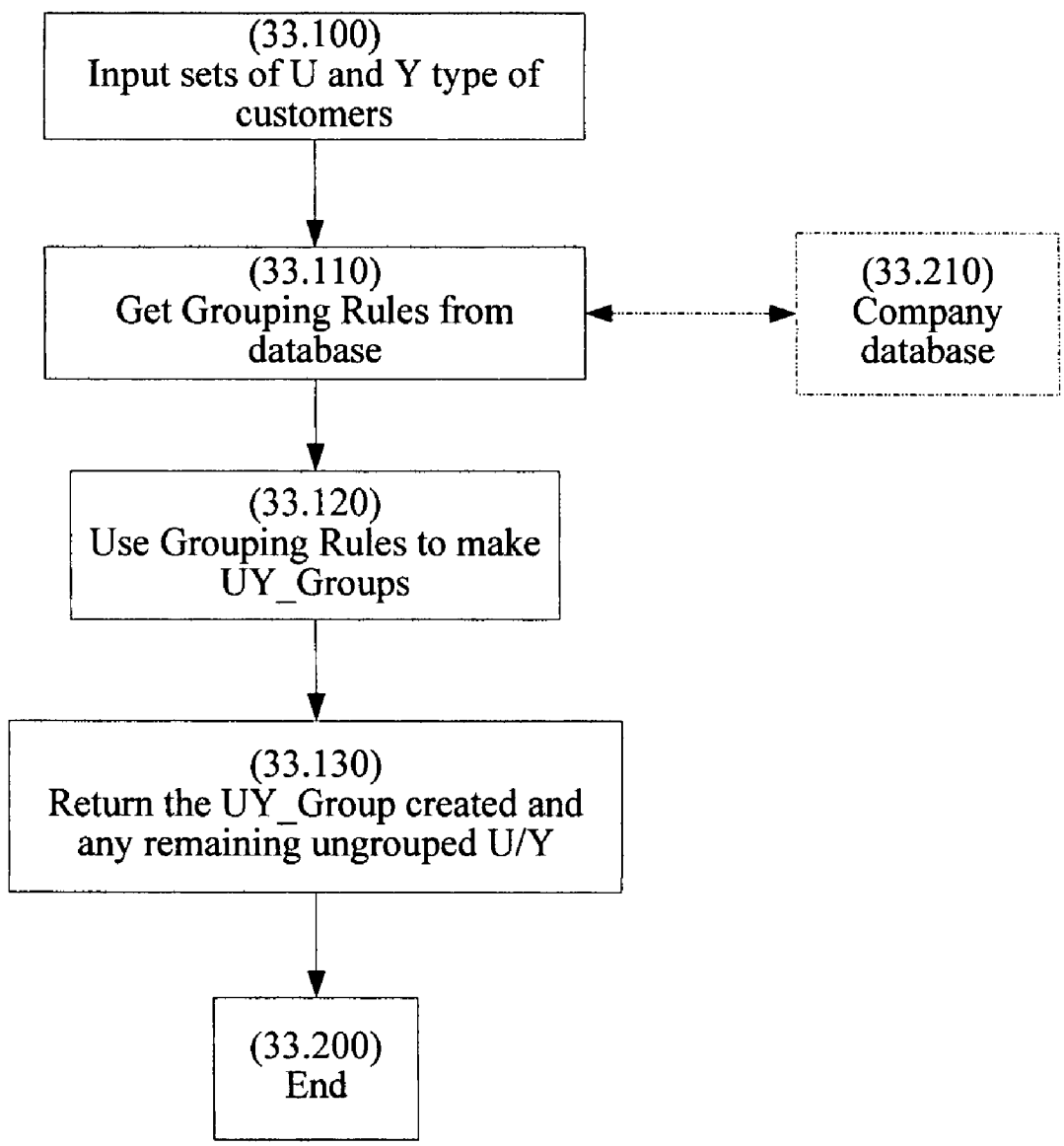
FIG. 33 is a flowchart illustrating an example of an algorithm to implement grouping of U and Y type of customers.

FIG. 33 displays a flow chart that illustrates one way of implementing grouping of U and Y type of customers. In Act 33.100, sets of U and Y customers are taken as input. Next, in Act 33.110, a set of one or more Grouping Rules is read from the company's database (33.210). A grouping rule may depend upon the number of U and/or Y type of customers, desired capacity redundancy in the system, the permissible time factor to create UY_Groups, any other rule of company choosing, any combination thereof and so on. For example, a company may choose a Grouping Rule whereby new groups are created by first ungrouping one or more of the UY_Groups (created earlier but unexercised, for example, groups for which the customer has not been notified, or if notified, the customer has not utilized the Product and the terms of option contract allows for a change in the Chosen Product). In another example, a Grouping Rule may create groups of only those U and Y type of customers who have yet to be grouped and discarding all U/Y customers which have already been grouped. A company may implement any Grouping Rule to formulate UY_Groups. The choice to Grouping rules may enhance the overall value for the company (for example, reduce the total capacity required to satisfy product needs for all U and Y customers). Theoretically, the number of units of the Product required (or blocked) should be equal to the number of customers shall be eventually utilizing. Thus, by implementing the grouping and with the help of appropriate Grouping Rules, the company may attempt to achieve such theoretical minima.

Next, in Act 33.120, the Grouping Rules, so obtained from the company's database, are used to make UY_Groups. Next, in Act 33.130, the UY_Groups so created are returned along with ungrouped U/Y, if any, and the process then ends in Box 33.200.

The grouping may enhance customers' experience, and may comprise operating a system that delivers a UPO to at least a "first customer" to utilize up to n of m selected products for said first customer, where n is less than or equal to m; operating a system that delivers a FRO to at least a "second customer" to utilize up to k of p selected products, where k is less than or equal to p; operating a system to define each of the k Chosen Products, whereby after each of the k Chosen Products is defined, said second customer can utilize said Chosen Product; operating a system wherein a company defines t Chosen Product(s) for said first customer after each of said k Chosen Products is defined, wherein after each of said t products is defined, said first customer can utilize said defined product, where t is less than or equal to n. Said t products may be a subset of n products, m products or both. Said t products or n products or both may also include one or more products not included in said m selected products. Similarly, k products may be a subset of p products, or may include one or more products other than said p products. The grouping may be performed for a multiplicity of at least one of said first or second customers and may combine together at least one of each of said first and second customers to formulate at least one group with at least one complementary set of options. The grouping may enable a company, an entity other than said company and/or any combination thereof to utilize at least one of said m or p products at least after delivery of any of said first or second options. The company and/or an entity other than said company may implement UPO VOF where in the first and/or second customer in said grouping may be same. The notification conditions may be different, same or any combination thereof for the first and second option.

Said first and/or second option may or may not include any notification deadline condition. The company, the second customer, an entity other than said company and/or any combination thereof may define, at one or more times, at least one of said k chosen products. The company, the first customer, an entity other than said company and/or any combination thereof may define, at one or more times, at least one of said p chosen products. The first customer may select, at one or more times, at least one of said m products. The second customer may select, at one or more times, at least one of said p products. The company and/or an entity other than the company may receive from at least one of said first or second customer, at one or more times, an indication of one or more terms and conditions associated with said first or second options, respectively. Similarly, at least one of said company and/or an entity other than said company may deliver to at least one of said first or second customers, at one or more times, one or more terms and conditions associated with said first or second option, respectively. There may or may not be any payment transaction between the company, an entity other than the company, and at least one of said first and/or second customer.

Using UPO to Optimize Various Factors

The UPO VOF enables a systematic approach to sell the unused Up Products as well as to satisfy the unmet needs of the customers. It may also allow a company to achieve other optimization objectives. The UPO VOF may enable the company to optimize one or more categories of freebie (defined above) customers and may earn additional revenue. In one of the implementations of the UPO VOF, one or more categories of freebie customers may not be optimized. It may also assist a company to reduce liability from off the balance sheet items such as pending loyalty program units of customers by accepting UPO payments in loyalty program units instead of cash.

The UPO VOF structure provides the company and/or an entity other than the company an opportunity to reuse/resell the released products after upgrades (after the customer holding the products are upgraded) for potential sales or any other purpose. A company may calculate expected number of upgrade awards based on expected UPO sales and expected demand to estimate the number of expected Released Products. These Released Products may be added back to the company inventory, where they may be sold as regular products or may be utilized for other non revenue purposes.

The UPO VOF structure may also enable the company to increase potential revenue and/or fulfill its revenue maximization goals, non-revenue goals, maximization of customer satisfaction, utility and loyalty and/or any combination of these. There may be many other instances of next level of optimization attained by the company there by generating additional revenue, greater customer satisfaction and loyalty or any combination of these.

Business Model to Implement UPO

Different business models may be used to implement a UPO VOF. The business models mentioned below, without limitation, may be used to implement the UPO VOF in any industry. As an example, a company may choose to implement a UPO VOF individually or in conjunction with one or more partners and/or other companies.

As mentioned in the above sections, for example, an entity may use the allocated products to offer UPO to customers and/or to sell the products as regular products. The allocation of product may be conditional. For example, one of the conditions may require a return of at least one allocated product within a specified time period and/or other consideration(s).

The customer may select or purchase one or more products from the company and/or said entity and then interact with said entity to receive one or more UPO Products in relation to said (already purchased) products. Said entity may also receive product allocation from more than one company, and thus, offer UPOs on products from multiple companies to a single customer during the Initial Transaction for UPO.

The OA may use those products and operate a service to offer UPOs to the customers. As explained above in FIG. 13A, a customer may receive one or more products from the OA, and then receive a UPO on those selected products from the OA. Another approach would be for a customer to select one or more products from the company and then receive the UPO option from the OA on one or more of those selected products. In another example, a customer may select (receive) one or more products from both the company and the OA, and then receive the UPO option on one or more of those selected products from the OA. It is also possible that the customer receives a UPO from the company or both from the company and the OA on a given set of selected products.

The OA and the company may simultaneously offer UPOs to the customers, i.e., a customer may either approach the company or the OA to receive a UPO on desired products. In another model, the OA may operate as the sole provider of the UPO to all the customers of a company. In a yet another model, the OA and the company may choose to work together and jointly offer UPOs to the customers. The OA or the company may offer UPO to customers using either or both of the Sequential or the Concurrent Get UPO processes.

As explained in FIG. 13A above, an OA may be able to offer UPO on products from one or multiple companies. An OA may receive allocation of products from two or more companies. A customer may purchase one or more products from one or more companies and/or from the OA, and then receive a UPO option on one or more of those selected products from the OA. Even if the OA may not be entitled to or does not receive product allocation from a company, it may still be able to formulate an agreement with one or more companies to offer UPOs on the products of said companies. Thus, a customer may be able to receive a UPO on products from multiple companies, giving the customer higher chances to get upgrade and more variety to choose from. For example, a customer may receive a UPO on two products from two different companies and may get upgrades to either of those products within the terms and conditions of the option contract and the OA and/or any one or all of the companies will then notify the customer about the Chosen Product within the terms and conditions of the option contract. This may provide a lot of value for the customers.

An OA may be able to thus create a multi-company UPO VOF Framework, which may tremendously enhance the value for the customers. All the participating companies that allocate products to and/or partner with the OA to offer UPO may also gain from an overall increase in the total spending by the consumers, enhanced overall customer satisfaction and/or other operational benefits. Either or both of the OA and the company may process the purchase of the selected products associated with a UPO received (or purchased) by the customer. A customer may receive products from the OA or the company for the products related to the UPO grant. Any entity (e.g., the OA and the company) may process products offered only by that entity or by either of the two entities.

The OA and the company may engage in a business agreement to implement a UPO program. The business agreement may divide the total benefit generated by the UPO program between the two parties using any mechanism or criteria as desired. The total UPO Revenue Benefit may be shared between the two parties. The company may allocate products to the OA. One or more companies may allocate only part of or their entire product inventory to the OA to offer those products to the customers by way of regular and/or UPO Products. The company may allocate one or more products to at one or more entities other than said company, and said one or more entities may deliver the option on one or more of the allocated products. In return, the OA may offer some revenue or fee to the company for all or a portion of the products allocated. This fee may be given only for the products that the OA is able to utilize or for all the allocated products. The lending fee may be a lump sum amount, may depend upon the number of products allocated or may depend on one or more factors as desired. The agreement may include a provision where the OA may return the allocated products back to the company at a certain time and date or the agreement may provide the OA to sell back one or more allocated products to one or more companies who may have allocated said products or to one or more entities other than said company or both. There may be one or more conditions associated with the return of unused UPO Products and/or products released from upgrades of customers, including, but not limited to, returning the same product, returning a higher value product and so on.

The company may allot OA at least one product and said OA may deliver UPO on at least one of said allocated products. The OA may or may not enter into an agreement with the company to provide such option on its products. The OA may sell back at least one allocated product to said company or to at least one entity other than the company or both. An OA may offer a company flexible customer inventory (generated from UPO) at one or more terms and conditions. The company may be able to use this flexibility to generate benefit from one or more ways, such as the Buy_N process, reducing operational costs and so forth. Some of these examples have been explained earlier.

An OA may formulate an agreement with one or more companies on one or more VOFs, such as on both UPO and APO VOFs, to offer a combination of VOFs to customers.

The UPO VOF may include different conditions regarding the payments of prices related to the UPO. For example, a customer may be asked to make (or receive) payments only to the company even if he/she is receiving products and/or options from the OA. Similarly, the customer may be required only to pay to (or receive from) the OA even if he or she received the products and/or options from the companies. The condition may also be set for a customer to make one or more payments to the company for the products and/or options received from that company, and to make one or more payments to the OA for the products and/or options received from that OA. The condition may allow the customer to make partial payments to the company and the rest to the OA or vice versa, the basis of which distribution may depend upon various factors, including, but are not limited to, the factors of company's choosing, the arrangement between the OA and the company and so on. In another example, the customer may be required to pay to a third party or may be required to pay to any of the combination of the entities mentioned above.

Information Technology System for UPO

A client-server architecture may be used to implement the UPO VOF. However, a company may use a computer hardware and software infrastructure of its choosing to implement a UPO VOF.

The UPO VOF may be best implemented using one or more computer-implemented methods to operate a computer-implemented service (and/or system) to offer UPOs to the customers that may include, but not limited to, recording the information pertaining to the offered and/or sold UPOs in a database. It may also include operating a computer-implemented service (and/or system) or other service (and/or system) to execute the UPO Exercise process and award upgrades to one or more customers, to define the Chosen Products, and recording the information pertaining to said upgrade awards, Chosen Products (or defined Products), and/ or other related information and for all the products related to a UPO in a database.

For the stage one (i.e., to formulate the UPO VOF), an application server may be used along with a database (e.g., a relational database) that stores all the information relevant to the company and the customer. The database may include all the relevant information sufficient to identify products the company chooses to make eligible for UPO. One or more users (e.g., a business analyst or manager) may have full access to this server through Intranet or highly secured VPN environment to design an optimal value option framework. The database shall also store all the information pertaining to all the acts (in stage one) used by a company while formulating the UPO VOF.

A similar or a different application server and/or a cluster of application servers (functioning concurrently) along with one or more web servers and a set of one or more database servers may be used for the Get UPO as explained in FIG. 13D above and UPO Exercise processes (including, but not limited to, Customer Notification processes) in the stage two of the UPO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get UPO process and the Event Optimizer processes (including, but not limited to, UPO Exercise process) may be computer-implemented as explained and discussed above in FIGS. 13D and 13E. All the customer interactions and the related information such as customer needs, inputs, payment transactions etc. are stored in this database, including information pertaining to the interactions even with those customers who may not purchase and/or receive UPO. The systems for stage two and stage one should be maintained in a synchronized environment so that each system has access to the most current information and can communicate with each other.

As discussed above, there may be other ways for implementing the UPO VOF which may depend upon including, but not limited to, the scale of the implementation, business requirements and number of entities involved. The entities may interact through a series of hardware products and services with the OA/company server(s). The OA may or may not be different than the company and the OA server may be the same as that of the company server. The customer may also interact with another entity operating the system other than the company. The information technology and network system to implement UPO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, the company may have one or more separate temporary database structure wherein the entries are updated and stored until the final update is made in one or more main databases. One the final update is done, the entries in these temporary databases may be removed.

The entire system may run at the premises of OA, company and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of company's choice, ease of accessibility, infrastructure facilities. The structure or the interaction architecture of the system may vary depending on factors including, but not limited to, the set up of the company, changes in the technology and with the introduction of new and better technology enhancing the interaction process.

A customer may interact with either one or more of the Get UPO, the UPO Exercise process, Buy_N, the CN processes either directly or indirectly using a local or a remote terminal (e.g., a computer with a browser and an access to the Internet) that is able to access the web server(s) that host the Get UPO and UPO Exercise and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one and/or stage two may be hosted and run by the company, an OA, a third party service provider or any combination of the above. In the model, where the OA receives product allocation from the company and offers UPO to the customers directly, the web server, application server and database for both stage one and stage two shall be managed by the OA. The OA may also have partial (or complete) access to the company database and systems through a highly secured environment (for example, a virtual private network). In the model, when an OA and a company tie-up together to provide UPO, all the computer hardware and software infrastructure for both stage one and stage two may be hosted by either or both (mutually) of the sides depending upon the business agreement between them.

Upgrade Flight Option (UFO) Value Option Framework

As explained above, the UPO VOF may be implemented in any industry. The implementation of the UPO VOF in the airline industry is discussed here in. Within the airline industry, the customer preference for higher ranked flights is used as the targeted value element. With respect to the selected value element (i.e., the customer need for higher ranked flights) in the airline industry, the UPO VOF may be appropriately termed Upgrade Flight Option (UFO) VOF. A detailed demonstration of UFO VOF is presented below.

The first stage in the UFO VOF involves steps (or acts) of: capturing customer dynamics, assessing airline operations and economic factors, integrating customer dynamics with airline economic factors, formulating the VOF and optimizing the VOF. The second stage involves carrying out a dynamic interaction with the customer and then executing an Event Optimizer process. The specific detailed steps with respect to the UFO VOF will now be discussed.

The terms "Up Flight" or "Up Flights" refer to one or more flights that rank higher than other flights of the same airline. The ranking here may depend on customer preference and may differ from one customer to another and may be based on past customer preference. In the same context, the lower ranked flight is referred to as the "Base-Flight". The term "Base-Flight" also refers to a flight, which a customer has currently booked (or selected or purchased). And in that context, an "Up Flight" refers to any higher ranked flight to which the customer may theoretically be upgraded to. For example, in general, most business travelers would rank morning and evening flights higher than the afternoon flights, non-stop flights higher than connecting flights (or those with stops). Thus, for a customer who is booked on an afternoon flight but who would prefer to take an evening flight, the afternoon booked flight and the preferred evening flight would be considered as the Base-Flight and the Up Flight, respectively. In another example, a customer who is booked on a specific morning flight (lets say the 8 am flight) may also prefer another morning flight (let's say the 9 am flight). In this case, the 8 am flight and the 9 am flight would be considered as the Base-Flight and the Up Flight, respectively for said customer.

First Stage: Formulation of "UFO" Value Option Framework (1) Capturing Customer Dynamics In the airline industry, the flight offering comprises a complex framework of value elements. For some flight features, rankings may be presumed (or are implicit). For example, ranking for flights (e.g., morning and evening flights are ranked higher than the afternoon and red eye flights), Ticket Price (e.g., lower prices are ranked higher than higher prices) and the number of connections (e.g., non-stop flights are ranked higher than connecting flights) may be presumed. There are other product features for which the ranking is subjective and may not be easy to presume such as seating type (aisle or window), meals (desired or not) and so forth. An airline may need to determine such rankings explicitly through interaction with various customers segments. As explained earlier, customers assign ranking to different flight offerings. A customer may classify the flight offerings into different groups (that may or may not be mutually exclusive) and assign a relative rank to each of them. For some flight offerings, rankings may be implicit or well established or well known; for which an airline may be able to assume/determine customer ranking that would satisfy the majority, based on an analysis of past customer behavior or other forms of market analysis. For some flight offerings, the ranking may be very subjective; and may differ from one customer to another, and even for the same customer, may differ from time to time. For such flights, an airline may need to perform detailed interaction with customers to determine their ranking. In a customer's frame of mind, flights with higher perceived utility (satisfaction) values are generally ranked higher than those with lower perceived utilities. Most customers would prefer to get a higher ranked flight over a lower ranked flight. When customers cannot get their desired flight(s) due to unavailability, price or any other reasons or any combination of the above, they have to settle down with something below their desired value.

Figure 34:
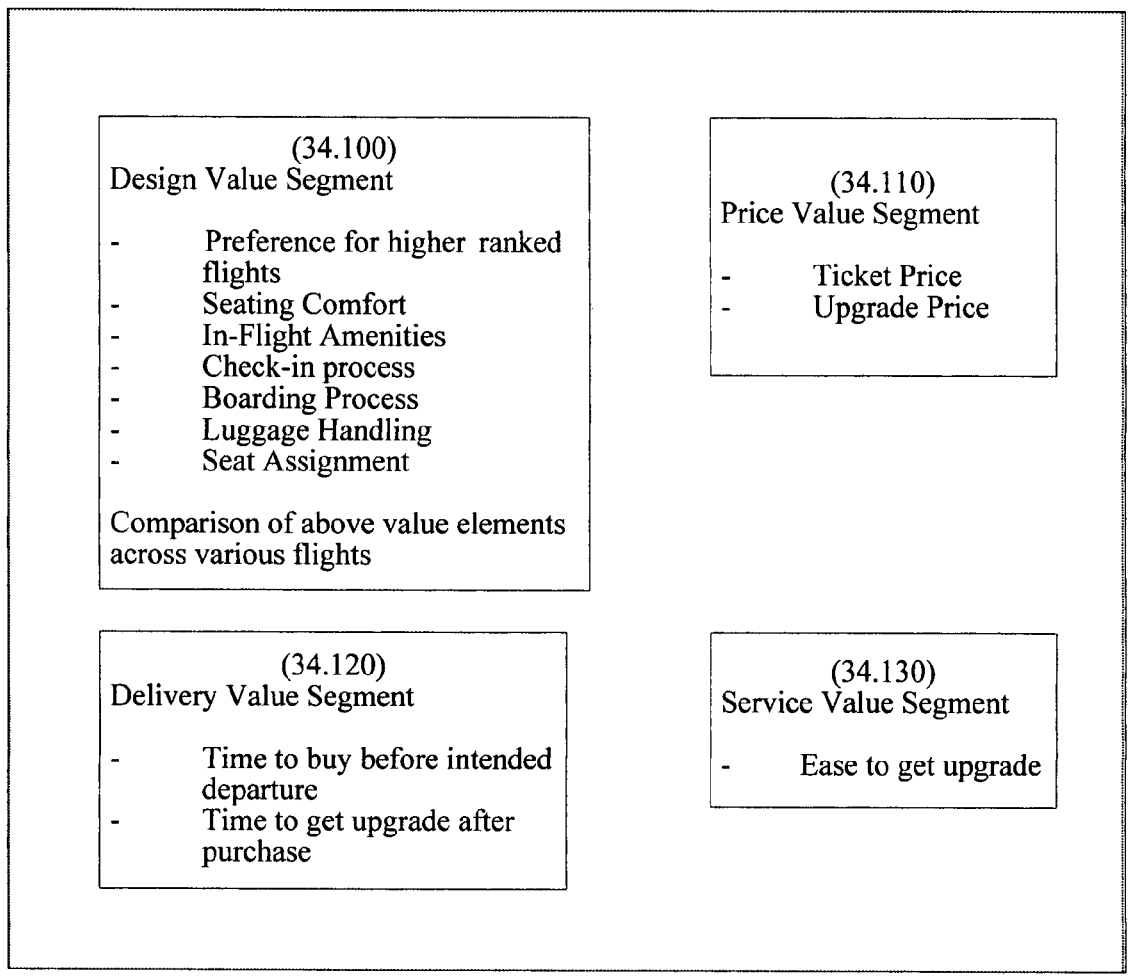
FIG. 34 is a diagrammatic illustration of an exemplary set of value segments and their value elements related to the UFO VOF in context of an airline industry.

FIG. 34 shows an analysis of the value elements that are believed to matter the most to customers in relation to a flight upgrade. In the design value segment (shown in Box 34.100), important value elements may include, but are not limited to, customers' preference for higher ranked flights, seat assignment, seating comfort and space, in-flight food and other amenities, special characteristics and/or features, if any, associated with the flights, priority check-in and boarding and special luggage handling. In the price value segment (shown in Box 34.110), important value elements may include, but are not limited to, Ticket Price and upgrade price. In the delivery value segment (shown in Box 34.120), important value elements may include, but are not limited to, time to request and get upgrade award, and how long before departure the ticket must be purchased for the customer to be entitled to an upgrade. In the service value segment (shown in Box 34.130) important value elements may include, but are not limited to, the ease of getting the upgrade. It may be important to estimate the relative preferences and utilities of these value elements to customers for various flights.

(2) Assessment of Airline Economics

An assessment of the crucial economic factors for an airline, as indicated in Box 35.100, may reveal these factors to include, but not be limited to, the fixed and variable costs across various flights, non-uniform distribution of demand across different flights, higher price for higher ranked flights, varying capacities of higher ranked flights much more than the capacities in lower ranked flights, possibility of revenue dilution, lost opportunity costs in offering free upgrades to customers through existing upgrade programs (if any), the marginal costs of carrying an additional customer in different flights, the number of unused seats after departure, increased competition from low cost carriers, the need to develop competitive advantages against low cost carriers, customer attrition rate, and commoditization of the airline industry. One may dig deeper into details for different flights such as load factors, spoilage, seat availability, costs per customer mile, marginal costs per customer mile, lost opportunity costs in offering free upgrades to customers through existing upgrade programs, and so forth.

An assessment of the crucial economic factors, such as costs, constraints and capacities, may be performed, to determine the factors that affect the profitability, growth and goals of the airline. It might be beneficial if the airline utilizing the inventive system and method were able to express cost elements in a real-time or quasi-real-time (i.e., up to date) dynamic fashion so that such information may then be used to assess the profitability or contribution of each sale opportunity (at the flight level), and to facilitate the operation of the Event Optimizer (so that offers and actions can be based on real-time or near-real-time information).

(3) Integration of Customer Dynamics with Airline Economic Factors

Figure 35:
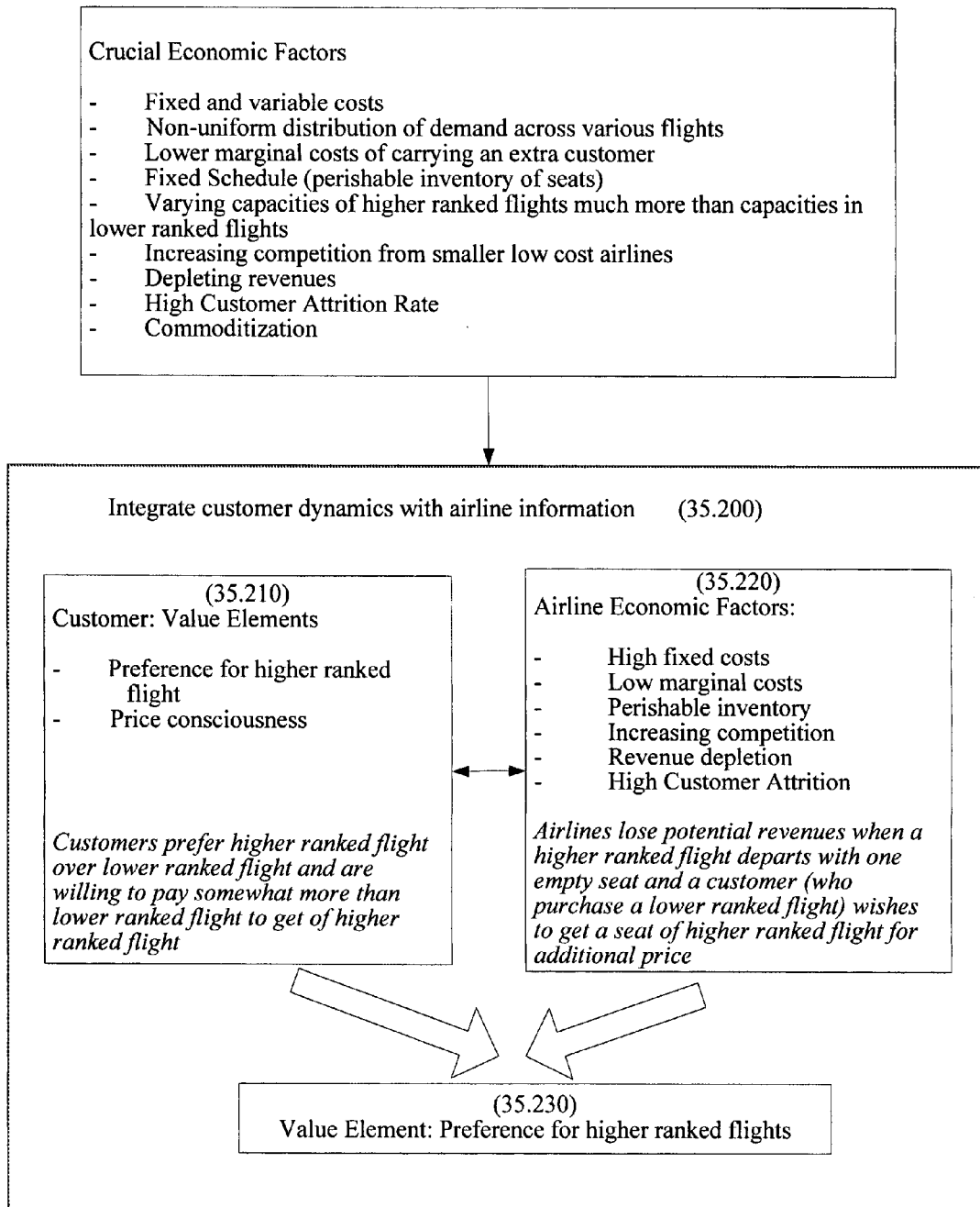
FIG. 35 is a diagrammatic illustration of airline economic factors and mapping between customer dynamics and airline economic factors in relation to UFO VOF.

FIG. 35 also illustrates an example of how a mapping may be done, between customer value elements and airline profiles, for the UFO VOF. On one side, there are customers who prefer higher ranked flights to lower ranked flights. However, customers are also concerned about the price differences between the higher ranked and the lower ranked flights. All customers cannot afford to buy confirmed higher ranked flights at regular prices. However, many customers would be willing to pay more than their Ticket Price to get higher ranked flights. On the other side of the screen, if a flight takes off with one or more empty seats, that condition probably represents the loss of potential revenue (and/or opportunity cost) for that airline. This is true even if no other potential customers have been turned away, simply because there may be one or more customers, who have purchased other lower ranked flights (Base-Flight) of the same (or different) airline, willing to switch to those unused higher ranked flights (i.e., Up Flights) at appropriate price/terms, but they are not given an opportunity to do so. It would be certainly very helpful for an airline to know the relative preferences of customers with respect to higher ranked flights. However, today there is no framework that allows companies to do so in an optimal fashion such that both airline and the customer benefit at the same time. An opportunity, thus, exists to concurrently generate an incremental revenue benefit for the airline from consumer surplus, and to maximize the purchase utilities for the customers as a group (including those who have a preference for higher ranked flights at appropriate prices). More specifically, as shown in the interaction between the Box 35.210 and Box 35.220, a mapping is performed between important customer value elements and airline economic factors. The value element "preference for higher ranked flights" is extracted, as shown in Box 35.230, and a UFO framework is created.

(4) Formulation of UFO Value Option Framework

Structure of UFO Value Option Framework in the Airline Industry

Figure 36:
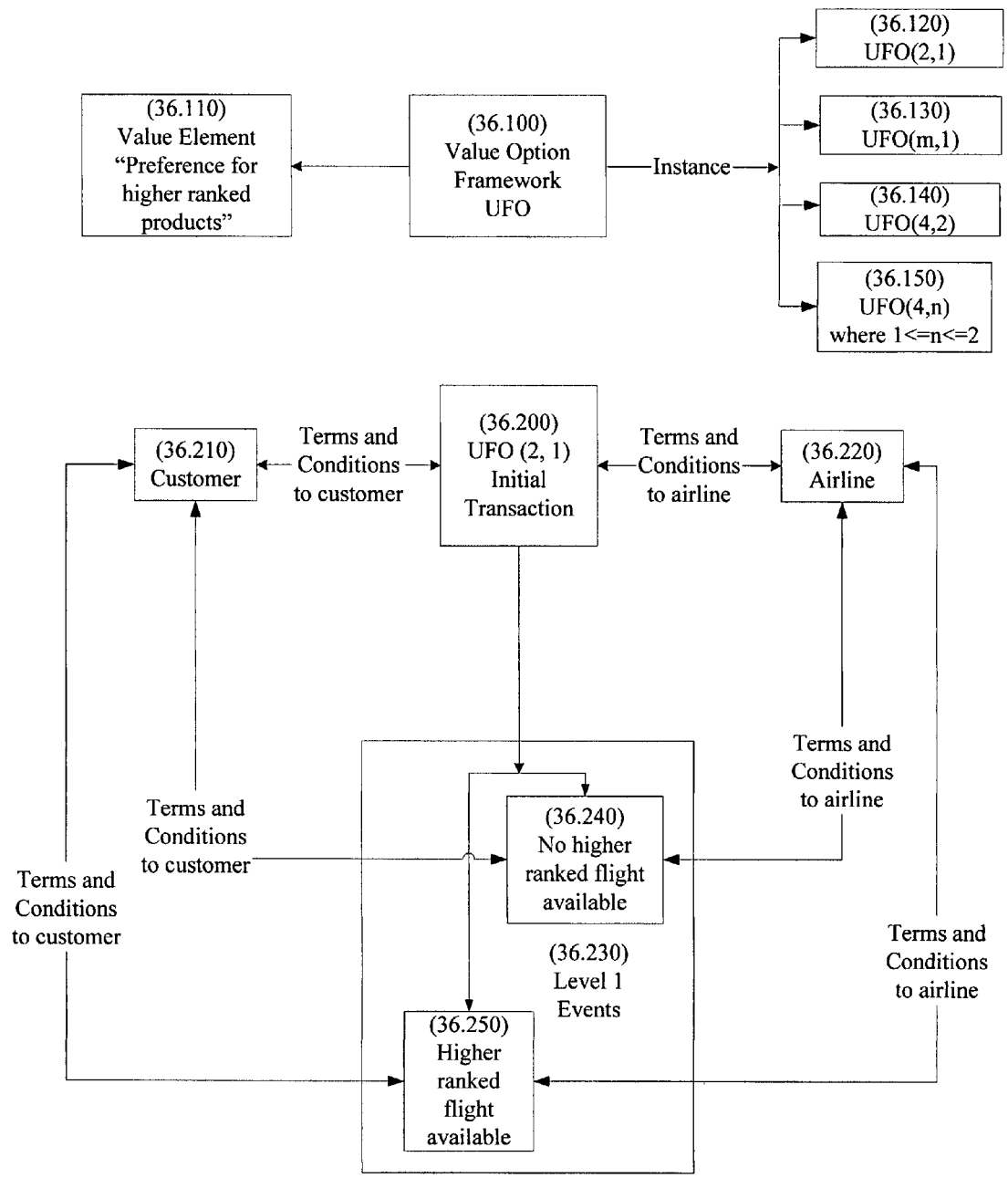
FIG. 36 is a partially-diagrammatic, partially-flow diagram representing the structure for creating a UFO Value Option Framework in context of an airline industry.

FIG. 36 displays the structure of UFO value option framework (shown in Box 36.100) in the airline industry. The UFO VOF is related to the value element "preference for higher ranked flights", as shown in Box 36.110.

In the "Initial Transaction" for UFO, shown by Box 36.200, a customer (shown by Box 36.210) and an airline (shown by Box 36.220) transact on the UFO value option. The first event in the UFO VOF is referred to as Initial Transaction, shown by Box 36.200, in which a customer (shown by Box 36.210) and an airline (shown by Box 36.220) transact on a UFO value option. There may be one or more Events (shown by Box 36.230) that follow Initial Transaction.

In the successful Initial Transaction for a UFO VOF between the airline and the customer, the customer may receive a conditional option for an upgrade and the airline may award the upgrade to the customer provided at least one condition on the option is satisfied and the airline receives the payment for said upgrade. The customer's acceptance of said option may confer upon the airline a right to enforce a payment obligation or relinquishment of one or more rights or both, as the case may be, on the customer, if said customer receives upgrade. A customer may select (purchase) one or more Base-Flights and then select UFO option on one or more Up Flights. An airline may award one or more Up Flights from the selected UFO Flights or from other flights or any combination thereof. The airline may or may not be the seller of said flight and/or said option. The total number of customers upgraded may be in one or more flights. Upgrade may also include an upgrade to a cabin in a different flight. Said upgrade may also be an upgrade to a non-stop flight or may confer upon the customer a right to utilize additional services while remaining in the same flight cabin which were originally not included in the rights conferred to the customer. Said upgrade may be a partial upgrade, wherein said upgrade may be for a portion of the duration of a flight. The partial upgrade may include flights from different airlines. The partial upgrade is discussed in detail in UTO VOF.

In another implementation of the UFO VOF, during a successful Initial Transaction, a customer may receive an option to utilize up to 'n' out of 'm' selected flights, where 'n' is less than or equal to 'm' (said 'm' flights termed "UFO Flights"). The 'n' flights that are finally selected are termed "Chosen Flights". After each of the n Flights is defined (or selected or chosen or received), the customer may have the right to utilize (or can utilize) said Chosen Flight. Apart from the Chosen Flights, the remaining flights are termed "Released Flights". The Released Flights (if any, that were held or blocked for said customer) may be sold to other customers as normal flights or UFO Flights or used for other purposes. The Released Flights in relation to said option may be reused by the airline before, after, at or any combination thereof, the time the Released Flights and/or Chosen Flights are defined (or received or selected). The m UFO Flights would contain all the selected Base-Flights and Up Flights, and the n Chosen Flights would contain all the defined Base-Flights and Up Flights that the customer may utilize. Ideally, the customer may prefer to receive only Up Flights in the defined n Chosen Flights, since the customer would have higher utility for the Up Flights, however, the Chosen Flights may contain Up Flights or Base-Flights or both. Released Flights may be utilized to generate revenue with or without reusing said Released Flight.

Numerically, the value of 'm' is greater than or equal to 2 and the value of 'n' may vary from '0' to 'm' depending upon the specific implementation of the UFO framework. The value of 'm' and/or 'n' may be known (or defined and/or re-defined) before, during, after the Initial Transaction and/or any combination thereof. The value of n may be limited to less than the value of m, or n<m (i.e., n<=m-1); however, in some situations, n may be equal to m. The value of 'n' may or may not be known (or defined and/or re-defined) at the time of the Initial Transaction. The value of 'm' and/or 'n' may be defined by the airline, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The delivery of an option may include, but not limited to, electronic delivery of the option, physical delivery of the option, any other mode of delivery or any combination thereof. Once said option is delivered, one or more of m flights may be available for use by the airline, another entity and/or any combination thereof. The value of 'n' may be defined before, after or any time, the option being delivered to the customer. The delivery of option may occur in relation to the customer purchasing ticket for one or more flights. The delivery of option may also occur in relation to the customer purchasing a ticket for one or more flights other than the flight on which the option may be delivered. The customer may purchase a ticket for one or more flights other than the flight on which the option is delivered to the customer. Said n flights may be defined in one or more transactions. The airline or another entity or any combination thereof may upgrade the customer without any subsequent interaction after delivering the option. However, in different implementations, the airline (or another entity or any combination thereof) may upgrade the customer after at least one subsequent interaction.

The airline and/or another entity may provide a data store which may contain data representing, with respect to one or more flights, one or more options offered by the airline and/or an entity other than the airline and may use a server to receive inputs for at least said option and may search the data store for eligibility of flights for at least said option. The server may display the search results and may receive one or more decisions of the customer about the acceptance of one or more of said search results. The airline and/or another entity may operate an event optimizer system to receive data at least pertaining to said acceptance, and in response to the occurrence of one or more selected events from a set of one or more potential events, may execute one or more corresponding event response algorithms, wherein one or more of the servers or the event optimizer system may concurrently optimize a value for at least two of the airline, the customer and an entity other than the airline. Said search may include searching for one or more flights or options based on said inputs. Said search may also identify results at least after taking into account business economics of at least the airline offering said flight or option. The search results may or may not include at least one option or flight. The search results may include a flight which may include an option and for which a price for the inclusion of said option is not separately identifiable within the total Ticket Price. The flight eligibility may be decided by the airline and/or an entity other than said airline. Data pertaining to at least one of demand, preferences and associated relative utilities of the customer may be defined, implicitly or explicitly, at least during the interaction, before the interaction or at any other time.

The UFO Flights may be selected by the airline, the customer, another entity or any combination thereof. The UFO VOF may enable an airline to obtain preferences for Up Flights from UFO customers (i.e., those who select UFO) and use said preferences to satisfy the travel needs of other customers and/or to optimize the value for airline, customers, another entity and/or any combination thereof. Therefore, the airline and/or another entity would usually have the right to select (or define) the Chosen Flights. However, in different implementations of UFO VOF, the airline, the customer, another entity or any combination thereof may select one or more of the Chosen Flights related to a UFO. The UFO Flights and the Chosen Flights may be selected by the same entity, different entities or any combination thereof. For example, the customer may select the UFO Flights and the airline may select the Chosen Flights out of the UFO Flights. The airline may incorporate the customer information and the data related to the UFO into the sales, production, inventory, other database or information system or any combination of the above.

The option granted to the customer may be conditional. One such condition (to upgrade) may be the seat availability in the Up Flight associated with the option. It may be possible that the seat availability in the Up Flight associated with the option is the only condition included in the UFO VOF. In one of the implementations of the UFO VOF, the condition for upgrade may include at least one condition in addition to the availability of an upgrade. If so, after receiving the UFO, a customer may receive a right to be upgraded if there is seat availability in the Up Flight at a certain time and under certain conditions established as the terms and conditions of the option contract. The time when an Initial Transaction is completed (i.e., the customer receives a UFO) is referred to as the Initial Transaction Time (or ITT, in short). One or more Base-Flights and Up Flights may be selected, at one or more times, before, after, during, or any combination thereof, the Initial Transaction and/or the time said option is delivered to the customer (or the customer receives said option) or any combination thereof. All the UFO Flights may be selected concurrently (i.e., all together in one transaction) or sequentially (i.e., in multiple transactions).

In the sequential case, a customer may select one or more flights in one or more transactions before the Initial Transaction. Said selected flight(s) (let's say X number of them), thus, may be considered as part of m UFO Flights of the UFO (m, n) transaction, and the customer may select only the remaining (m−X) number of UFO Flights during the Initial Transaction. All the transactions used to select (or receive) all the Base-Flights of a UFO transaction may be related to each other, and hence, may be considered as "related transactions".

In a UFO VOF, the sequential process may comprise a number of "related transactions" when all the UFO Flights are received one after another by paying/receiving a price in one or more transactions or acts. The price may include, but is not limited to, a monetary value, coupons, discount vouchers, other benefits such as loyalty program benefits, frequent flyer miles or any combination of the above. The transactions may be related due to a relationship during the Initial Transaction, one or more of the previously executed transactions, any other transaction or combination thereof. In another implementation, the airline and/or an entity other than said airline may not exercise its right of enforcing the payment obligation upon the customer.

The UFO VOF may also impose other conditions on the airline and/or the customer. For instance, the option may impose a payment obligation on the customer if the airline upgrades said customer. In another implementation, the option may impose a payment obligation on the customer to make a payment to the airline and/or an entity other than said airline at a time the airline delivers said option. The option may confer a right upon the airline and/or an entity other than said airline to enforce payment obligation on the customer. The airline may take a pre-authorization from the customer to charge the customer using any payment mechanism including, but not limited to, credit card, debit card, debit bank account, third party payment service provider, advance payment by the customer, any other means, or combination thereof. The airline may award the upgrade to the customer only if the airline receives a payment from the customer in relation to said upgrade. The customer may be required to pay one or more prices at one or more times to receive the option for the upgrade. The airline may award the upgrade to a selected group of customers based on any criteria of airline's choosing. For example, an airline may choose to give preference to its frequent flyer customers or high value customers over others. However, the airline and/or an entity other than said airline may or may not exercise its right of enforcing the payment obligation upon the customer. The customer may become entitled to the option to get an upgrade by making a payment, at least in part, when purchasing ticket for said flight.

The UFO VOF may also confer a right on the customer to enforce said upgrade provided at least one condition on said option is satisfied. For instance, an airline may offer UFOs with preference orders attached to it, i.e., if a customer purchases (or receives) a UFO with a preference order of 1, said customer shall have the right to be the first customer among others to be awarded the upgrade. In this fashion, a right is conferred upon the customer to enforce the airline to award the upgrade to the customer if a seat is available in the related Up Flight at a certain time as per the terms and conditions of the option contract. The UFO VOF may also impose a condition on the airline to offer the Up Flight to the customer and the customer may have the right to choose between the Base-Flight and Up Flight and subsequently notify the airline about the Chosen Flight. A customer may or may not be under a mandatory condition to accept the Chosen Flight as selected by the airline. The airline or the customer may have the right to enforce the Chosen Flight on the other party as per the terms and conditions of the option contract.

In another implementation of UFO VOF, the option may require the customer to accept the upgrade offer. The upgrade may be an upgrade of at least one flight. The customer may be upgraded to one or more than one Up Flights. The customer may be upgraded, upon availability, to any of more than one Up Flights. One available Up Flight may lead to more than one upgrades. The customer may be presented a choice of conditional options to choose, prior to the airline and/or an entity other than the airline or any combination thereof, delivering at least one conditional option to the customer. The airline may present to a customer said option requiring the customer to indicate the price the customer will pay for the upgrade if offered.

An instance of the UFO VOF is illustrated in FIG. 36. The Box 36.200 illustrates an example of the Initial Transaction between the customer and an airline, where the airline offers the UFO value option to the customer. In a successful Initial Transaction for the UFO option, a customer may be required to pay a price ($X) to receive said option for an upgrade from the afternoon flight (Base-Flight) to morning flight (Up Flight), and to agree to pay another amount ($Y) to the airline if the airline (then or later) upgrades the customer to the morning flight. An airline may choose to create one or more instances of the UFO VOF based on factors including, but not limited to, number of UFO Flights, Up Flights or Released Flights, pre-determination of a number of Up Flights or Released Flights, other factors or any combination thereof. For example, a UFO based on a combination of the number of UFO Flights (or m) and Chosen Flights (or n) would be UFO (m, n). Some UFO instances are shown in Boxes 36.120, 36.130, 36.140 and 36.150. In the UFO (2, 1) instance, the customer selects two UFO Flights and the airline may select any 'one' of those two flights as the Chosen Flight depending on whether upgrade is available or not. If the number of Chosen Flights is pre-determined, the UFO (4, 2) instance may imply that the customer receives 4 UFO Flights, on the condition that the airline may select any 2 out of 4 flights as Chosen Flights. When the number of Chosen Flights is not pre-determined, the UFO (4, 2) instance may imply that the customer receives 4 UFO Flights, on the condition that the airline may select none, one or 2 Chosen Flights out of UFO Flights. There may also be a minimum limit on n. For example, the UFO (4, n) (where $1<=n<=2$) instance limits the airline to select either 1 or 2 Chosen Flights out of the 4 UFO Flights. As mentioned below in detail, such UFO VOF implementations may also have price conditions to the customer. For example, in a UFO (4, 2) implementation, a customer receives a UFO to receive two out of any four selected UFO Flights, comprising two Base-Flights, B1 and B2, and two Up Flights, U1 and U2. The customer has made an Initial Payment of $1000. The airline may define any two flights as Chosen Flights out of the 4 flights as per the terms and conditions of the option contract. In the event, U1 or U2 or both is (are) defined as the Chosen Flight(s), the customer is required pay $50 or $100 or $200 as the UFO Exercise Price, respectively. If neither U1 or U2 (i.e. none of the Up Flights) is defined as Chosen Flight, i.e., both the Base-Flights (B1 and B2) are defined as the Chosen Flights, then the customer is not required to make any payment to the airline. Under the terms and conditions of the option contract, if U1/U2 are available, then the airline may define U1 and/or U2 as the Chosen Flight and thus, the customer is able to utilize the Up Flight since the corresponding payment is made.

The Initial Transaction may have terms and conditions applicable to the customer, the airline, any other entity or any combination thereof. These terms and conditions may be set, preferably, to concurrently benefit at least two of the above said parties. The connections between Box 36.200 and 36.220, and Box 36.200 and 36.210 refer to the terms and conditions to the airline and the customer, respectively.

The UFO VOF may or may not include any constraints on the UFO Flights. For example, an airline may restrict UFO applicability and availability on flights that satisfy specific criteria. The two UFO Flights may or may not include practically constrained flights. Practical constraints may include one or more constraints that will prevent a customer to utilize a given flight or prevent the customer from utilizing all the UFO Flights. Such constraints may include, but are not limited to, time constraints, location constraints and so forth. In other words, it may or may not be practically possible for a customer to utilize both the selected flights due to at least one practical constraint. For example, one flight may be scheduled to be airborne when the other flight is scheduled to depart, thus not allowing any customer on the former flight to take the latter flight, or the distance between the departure airports of the two flights may prevent customers from flying on one or more selected flights (that depart within hours of each other).

A customer may select (or receive) UFO Flights in several ways; through mutual agreement (e.g., during a direct interaction such as a purchase for ticket for a flight), or the airline may grant the UFO Flights to the customer without soliciting their interest or permission. For example, to enhance customer satisfaction or for any other purpose, an airline may grant UFO Flights to customers based on the past customer behavior, interaction and so on.

The Initial Transaction may impose one or more conditions on the airline. An airline may be required to explicitly notify the customer prior to or no later than a given date and time (referred to as the Notify Deadline) regarding the Chosen Flight. If there is no such explicit notification condition, the Chosen Flight may be decided as per the terms and conditions of the option contract. In either case, (explicit or implicit notification), the date and time when the selection of the Chosen Flight is notified to the customer is referred to as the Customer Notification Time (or CNT, in short). In the current discussion, the explicit notification condition is assumed unless specifically mentioned otherwise. The Notify Deadline may be pre-determined or may be determined later (i.e., after the Initial Transaction) by the airline, the customer, any other entity, or any combination thereof.

An airline may determine one or more Notify Deadlines for a flight at one or more times (e.g., before, during, after the Initial Transaction or any combination thereof) using factors including, but not limited to, customer needs, expected value of the seat, airline profitability goals, any other factors or any combination of the above. Customer factors should also be considered in determining the Notify Deadlines, such as the upgrade periods desired by customers, or any other factor that may affect the behavior of a customer.

The Notify Deadline may be pre-determined or may be determined later (i.e., after UFO grant) by the airline, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be offered if the customer is notified anytime before the first Notify Deadline. The price associated to the second Notify Deadline (i.e., the second earliest among the Notify Deadlines) may be offered if the customer is notified after the first Notify Deadline and before the second Notify Deadline.

The terms and conditions of the UFO VOF may not allow the airline to notify the customer after the last Notify Deadline (i.e., the latest among the Notify Deadlines). In another implementation of the UFO VOF, flexibility may also be provided to the customer to notify the airline about the Chosen Flight up to a stipulated Notify Deadline, once the airline has offered the Up Flight to the customer. As an operational measure, a rule may be set that if the airline fails to notify the customer before the last Notify Deadline, the Base-Flight becomes the Chosen Flight and no upgrade is provided to the customer. Another approach may be set that if the customer fails to notify the airline about the Chosen Flight once the upgrade has been offered to him/her by the airline, one or more of the Base-Flights, Up Flights and/or any combination thereof may be considered as the Chosen Flight. The airline may select Up Flight as the Chosen Flight and may charge Exercise Price and/or any other price to the customer. In another implementation, the airline may select the Base-Flight as the Chosen Flight and a price may or may not be charged. Any entity (e.g., the airline or the customer) may (or may not) be allowed to change the Default Flight once it is selected. The UFO Exercise Price (if any) in the default case may or may not be equal to the UFO Exercise Price for the Default Flight for the last Notify Deadline. In the current discussion, a single Notify Deadline is assumed.

The customer may be required to pay one or more prices during the Initial Transaction (and/or to receive a UFO, referred to as an Initial Price), at the CNT (and/or the time the customer is upgraded, referred to as an Exercise Price) and/or at any other time, which may or may not be pre-determined between the customer and the airline. The UFO Price may be a pre-agreed fixed amount or it may be variable with or without bounds and set later or any combination of the above. There may or may not be any payment transaction related to the Initial Transaction. There may be one or more additional price conditions included in the UFO VOF. The initial price and/or the exercise price may or may not be uniform for all UFOs designed and/or offered to the customers; an airline may choose any combination of uniform and/or non uniform prices for the initial and/or exercise price. The airline may offer the customer a set of prices to choose from. Since price conditions may depend upon various factors, which may or may not be variable, the same may be decided at anytime. The price conditions may be determined by the customer, the airline, another entity, or any combination thereof at one or more times. One or more prices (UFO Initial or UFO Exercise or any other price) may be a negative value, which reflects that instead of the customer paying the airline, the airline shall pay a price to the customer to get the desired flight as the Chosen Flight.

One or more of the UFO prices may be embedded with the Ticket Price. A customer may be presumed to accept the UFO offer while displaying the embedded Ticket Price. These presumptions may (or may not) include soliciting prior interest of the customer regarding the UFO offer. In the case that the UFO Price is merged with the Ticket Price, and where such price may or may not be separately identifiable, the customer may or may not receive a separate price for UFO. The UFO Price(s) may or may not be embedded within the Ticket Price. The Ticket Price may include a price for an upgrade, which may not be separately identified within the total Ticket Price. The customer may make the payment directly or indirectly (e.g., through a third party) to the airline in relation to said upgrade.

The price may comprise a monetary value or a soft/non-monetary value (e.g., coupons, discount vouchers, other benefits such as loyalty program benefits, frequent flyer miles, exchange of another service) or other consideration or any combination of the above.

A price may include, but is not limited to, a set of one or more Ticket Prices, a set of one or more UFO Prices (initial and/or exercise) or any combination of the above. An airline may choose to implement UFO Prices in many ways. An airline may use the method of its choosing to decide on the Ticket Prices of all the flights. The UFO Price (Initial, Exercise, and/or any other price, or any combination thereof) may be a function of number of UFO Flights and/or Chosen Flights, specific flights to be granted for UFO Flights, Up Flights and/or Chosen Flights, Notify Deadline, one or more Ticket Prices, any other factors of airline's choosing or any combination of the above. Various option pricing strategies may be employed. For example, in a fixed price strategy, a user may be shown only one fixed price for the option. If the user purchases the option at a price much lower than his/her maximum price, the potential benefit for the airline is less than what could have been achieved.

The above said pricing strategy limitation may be removed when a bidding process is used. Bidding may help to determine the highest price a user is willing to spend for the upgrade. In bidding, while buying the UFO Option, the user may provide his/her highest offer for the final price. At the time of upgrade, if available, the airline may charge the lowest price (less than the highest offer price selected by the user) that delivers the upgrade to the user. If even the highest offer price chosen by the user is lower than the minimum price needed to get the upgrade, then the user is not awarded the upgrade. The highest offer may be input free form or the airline may provide a few choices from which the user may select one. The airline may also ask, or determine empirically, how much customers will pay for the option. The assumption here is that customers make a logical decision to choose the Up Flight and can afford to pay the sum of the initial and the exercise prices (if any).

The customer may or may not have to pay during the Initial Transaction. Initial Price may be subsequently returned to the customer, if the upgrade to the Up Flight is not awarded to the customer. At the time of upgrade, Exercise Price may also be adjusted with the Initial Price paid by the customer. The airline and/or another entity may issue a UFO Pass for the customers in order to facilitate another payment mechanism. The payment for the ticket and/or the option may be made using the UFO Pass. It may be possible while purchasing a set of one or more UFOs or a UFO Pass, there may be one or more conditions (e.g., such as time based or value based UFO Pass) that limit the applicability of the UFOs. A time based UFO Pass may allow a customer to only be upgraded to the flights that fall within a specified time period. A value based UFO Pass may allow a customer to get upgrades until the sum of the total payment needed for all the upgrades is less than or equal to the value of the UFO Pass. The airline and/or another entity may create various types of UFO Pass. Hence, a customer may purchase a set of conditional options which may be intended to be utilized for future needs.

The payment transaction may include, but not limited to, direct payment received by the airline from the customer, in lieu of relinquishment of one or more rights by the customer, indirect revenue generation (e.g., the customer relinquishes his/her right or accepts a lower limit on the baggage to allow the airline to sell the preserved cargo capacity for other revenues or other purposes)), costs savings obtained (e.g., the customer relinquishes his/her right to meals which saves costs for the airline), enhanced customer service and loyalty and so forth. One or more rights which the customer may relinquish may or may not be related to the rights conferred by the flight. Apart from relinquishment of one or more rights by the customer, the UFO VOF may have a condition to make additional payment to the airline and/or an entity other than the airline. The airline may present various rights and may require the customers to pick a specified number of rights, thereby relinquishing other rights and in lieu of the relinquished rights, the customer may receive a conditional option for an upgrade.

Once the Initial Transaction is successful, there may be at least one related event. Each said event may be associated with various terms and conditions on the customer and/or the airline. The airline and/or the customers may have the right to enforce the Chosen Flight(s) on the other party as per the terms and conditions of the option contract. The terms and conditions of the option contract may be binding on the airline and the customer only if the customer successfully accepts the airline's offer of the option for the upgrade. The customer may be given a choice of options to choose from and take a decision.

In one of implementations of the UFO VOF, the airline may implement negative UFO, i.e., instead of upgrading the customer to an Up Flight, the airline may downgrade the customer to a lower ranked flight. The airline may implement such negative upgrade in one or more situations. In one of its implementations, the airline may implement negative upgrade (downgrade) when there may be huge demand for Up Flights at very high prices so that the airline may downgrade the customer who may have already bought the Up Flight at relatively lower prices and may be willing to accept the lower ranked flight in lieu of some or more rewards. In yet another instance of implementation of the negative upgrade, the airline may implement it in the event when there may be huge demand for lower ranked flight. The airline may offer the Up Flight to the customer and may give an option to downgrade to lower ranked flight in future in case one becomes available. The airline may offer discounts on higher ranked flights, may offer to return the difference between the lower ranked flight and higher ranked flight, may offer additional reward to the customer and so forth. Hence, the airline may be able to retain the customer (and not to lose him/her to the competitor) even in the event that the customer desiring a lower ranked flight and the capacity of which may be exhausted with the airline. The airline may also be successful in this case in creating a flexible pool of customer inventory.

In one of the implementations of the UFO VOF, the terms and conditions of the UFO VOF may require the customer to purchase (or pay price for reserving) both the lower ranked and higher ranked flights with a condition to cancel/return either of the two flights as per the terms and conditions of the option contract. For example, a customer reserves a higher ranked flight for $400 (when its actual price is $650) and a lower ranked flight for $305 (when the actual price is $310) with a condition to return at least one of the flights. Hence, the customer has paid $705 for reserving both the flights with a condition to cancel the reservation for at least one of them. The terms and conditions of the option contract may provide different cancellation charges in different situations. Now, if the higher ranked flight is not available, the terms and conditions of the option contract provides cancellation charges for higher ranked flight as $10 where as the same for lower ranked flight are $500. So, logically the customer will cancel the higher ranked flight and in this case he/she would be refunded $390 and hence the net amount paid by the customer for getting the lower flight would be $315 ($705 minus $390) which may be equal to the Ticket Price of the flight ($310) plus Initial UFO Price ($5). In this case, the customer has not received the upgrade. Now, consider another case when the higher ranked flight is available. The terms and conditions of the option contract provide cancellation charges in this case for higher ranked flight as $500 where as there is no cancellation charges for cancelling the lower ranked flight. So, logically the customer will cancel the lower ranked flight and hence he/she would be refunded $305. So, the net amount paid by the customer for getting the upgrade (i.e., the higher ranked flight) is $400 ($705 minus $305) instead of paying the full price (of $650) for getting the higher ranked flight. The assumption here is that customers make a logical decision to choose which flight to cancel.

The costs, revenues, benefits and conditions shown here are for illustration purposes only and actual values could be different depending on specific values selected by the users for value options, customer behavior, any factors of airline schedule, pricing, any other factor or any combination of the above.

A UFO VOF may include a right for an airline to upgrade the customer to an Up Flight before a stated Notify Deadline. The right may include the condition that the airline may notify the customer before, at or after the stated Notify Deadline or any combination thereof. To provide flexibility to the customers, the airline may offer (or allow) the customer to finally choose the Chosen Flight once the airline notifies the customer about the availability of the Up Flight.

After the Initial Transaction, i.e., once the option has been granted (and/or sold) to a customer, there may be one or more potential events related to the associated UFO option. For example, as shown by the Box 36.230, there are two related events for the UFO option, namely, 1) Up Flight is available at a certain time (shown in Box 36.250) and 2) Up Flight is not available at a certain time as per the terms and conditions of the option contract, as shown in Box 36.240.

There may be Level 2 or higher level events associated with the UFO option. If one or more Up Flights are not given to the customers due to unavailability of Up Flights in Level 1 events, the customer may be given one or more Up Flights if said Up Flights are available in Level 2 or higher events related to the UFO option, later on. It may also be possible that even when one or more Up Flights are available in Level 1 event which may or may not be given to the customer in Level 1 event, still later on, in Level 2 or higher events, if one or more Up Flights are available, said one or more Up Flights may be offered (given) to the customers. Said one or more Up Flights may be given by the airline, another entity and/or by both. The Up Flights given in Level 2 or higher events may be given in exchange of one or more previously given Up Flights or in addition to the earlier given Up Flight(s).

If the event in the Box 36.250 happens, then as many customers as had selected the UFO option are automatically upgraded to the Up Flight within the terms and conditions of the UFO option contract. There may, of course, have been more customers who had purchased upgrade options than the number of seats available in the Up flights to be used as upgrades. In this situation, the airline may use any algorithm it desires in order to allocate the seats in the Up Flights. For example, the customers may have been given the ability, while buying the option, to specify the maximum amount the customer is willing to pay to exercise the option. Then the airline would probably choose to allocate all the seats available in the Up Flights so as to maximize its revenue. If there are more sold options of equal value than the seats in the Up Flights that are available, the airline may use any method it chooses to allocate the upgrades, such as assigning priority based on time of purchase, Ticket Price paid by the customer, random selection or any other customer priority factors like frequent flyer miles and so forth. The airline may also award cabin upgrade (downgrade) to a customer to the customer in addition to awarding the Up Flight. The customer may be upgraded from the Base-Flight to the Up Flight and simultaneously, the airline may also award a cabin upgrade to said customer in the Up Flight. An airline may choose to bump one or more customers from one or more flights in order to create availability to award one or more upgrades to UFO customers.

The airline may inform the customer of the decision related to the upgrade award via any communication channel including, but not limited to, a re-issued ticket sent over email, an email, phone, in-person at an airline counter, or may ask the customer to contact the airline to know the decision.

Using UFO, an airline gets to know the relative preferences and utilities of the morning flights (higher ranked flights) over the afternoon flights (lower ranked flights) as some customers purchase this option and others don't. This may lead to an enhanced revenue benefit for the airline as well as higher travel utility to the customer. There may be some increase in costs for the airline, but generally, the additional revenue generated would be more than sufficient to account for the additional upgrade costs (if any). The airline may better optimize its seat availability and may possibly be able to sell the lower ranked flights to additional customers due to additional capacity generated for the lower ranked flights (after a customer is upgraded to the Up Flight from his/her Base-Flight). An airline may estimate the total number of expected upgrades and using the same, may estimate the number of vacated seats (due to potential upgrades) in the lower ranked flights. Using this estimate, an airline may be able to add back these seats to the airline inventory to be used for potential sales and/or other purposes.

The airline and/or an entity other than the airline may define customer preferences regarding one or more Flight upgrades and may use said preferences to upgrade one or more customers and may optimize value for at least one of customers, airline and an entity other than the airline. Said preferences may be used to assign ranking between two or more flights. The ranking may be explicit and/or implicit and may be expressed/determined by the customer, the airline or an entity other than the airline or any combination thereof. The ranking may already be established or well known. The airline and/or an entity other than the airline, may establish, in advance of making the upgrade award, a ranking of attributes applicable to the flight and may define upgrade possibilities. In another implementation of the UFO VOF, the airline may establish, in advance of delivering the option, a list of attributes applicable to the flight and associate therewith rankings expressed by the customer.

A customer who receives a UFO is termed "U". In one implementation of UFO, an airline may want to hold capacity for the customer in only one of the UFO Flights, in which the status of said U customer is termed "Ua" (i.e., Accounted, which are one or more Base-Flights or lower ranked flights for the customer) and in the other UFO Flight(s), the status is termed "Uw" (i.e., Awaiting, which are one or more Up Flights or higher ranked flights for the customer) (both Ua and Uw have been defined above). A "U" customer converts to an N customer after the CNT. Thus, at any given time, an airline may have N, Ua and Uw type of customers for its flights.

The UFO VOF may help an airline in one or more ways. For example, it may help to accommodate flight requests from potential customers. Any new potential customer who requests to obtain a flight is assumed to be an N customer. If the available seats in the desired flight (desired by N customer) is insufficient to satisfy the request, then the airline may use the seats (if any, of desired flight) that has been assigned to Ua customers, and reassign the same to said N customer. Consequently, the airline may then upgrade (assign the Awaiting flights, i.e., the flights where said Ua customers have Awaiting status to) said Ua customers. By implementing such upgrading of Ua customers from their Accounted flights to Awaiting flights, an airline may better serve incoming demand for flights. An event where such request comes to the airline for a flight is termed "Buy_N". The act to upgrade a Ua customer from its Accounted flight (Base-Flight) to its Awaiting flight (Up Flight) is termed "Upgrade_U". Detailed algorithms are presented below that may be used to manage a system comprising N, Ua and Uw type of customers. An Upgrade_U algorithm may be run independently of the Buy_N Process and may be used only to upgrade the customers from one or more lower ranked flights to one or more higher ranked flights.

FIG. 37 provides details on four typical instances of UFO. Consider three flights F1, F2 and F3 for a customer with F1 being the highest ranked flight, F2 being the second ranked flight and F3 being the least ranked flight. Thus, an airline may now create four instances of UFO, namely, F3-F2, F3-F1, F2-F1 and F3-F2-F1. A sold UFO may be defined by four parameters such as in the notation MN (I, F), where, M is the Base-Flight (the current flight of the customer when the option is purchased), N is the Up Flight to which the owner of the option can be upgraded, I is the initial price paid by the owner to buy the option, and F is the exercise price which will be paid by the owner if and when upgraded.

A customer booked in the F3 flight may purchase a F3-F1 or "F3 to F1" option to get an upgrade to the flight F1 if F1 becomes available. Similarly, a F3-F2 or "F3 to F2" option may be purchased by a customer booked on flight F3 to get a potential upgrade to flight F2 if F2 becomes available. Likewise, a F3-F2-F1 or a "F3 to F2 or F1" option may be made available to a customer who purchased ticket on flight F3 for a potential upgrade to either flight F2 or flight F1, depending on availability. A F2-F1 or "F2 to F1" UFO may be made available to a customer with a ticket on flight F2, for potential upgrade to flight F1 if F1 becomes available. Obviously, the number of Up Flights affect the total number of UFO instances. The number of UFO instances typically increases with an increase in the number of Up Flights available for a customer. The number of instances does not have to be equal to the number of Up Flights available, of course.

The costs, revenues, benefits and conditions shown here are for illustration purposes only and actual values could be different depending on specific values selected by the users for value options, customer behavior, airline schedule, pricing, any other factor or any combination of the above.

UFO Types Creator Algorithm (to Create UFO Types or Instances)

The UFO Types creator algorithm has been explained in detail in the UPO VOF. The implementation of UFO Types Creator Algorithm in the context of the airline industry has been explained through an example given below.

Figure 38:
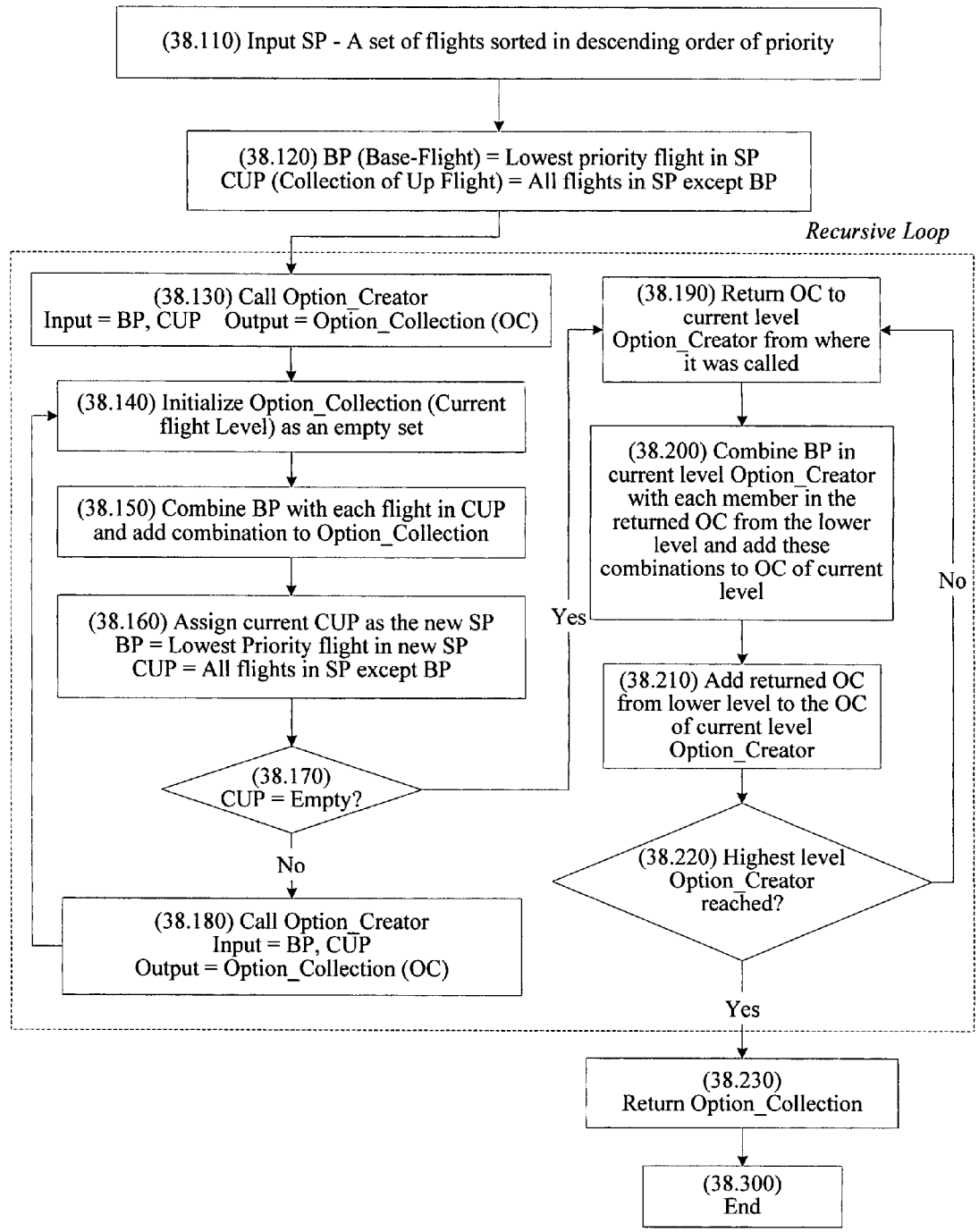
FIG. 38 is a flowchart of an algorithm to create UFO options for a given number of entities.

The algorithm of FIG. 38 may be used to create UFO instances in the airline industry, as follows. Consider an instance where there are 4 flights available for customer, namely, A, B, C and D. The priority order among the flights is A>B>C>D, where the flight A has the highest rank and the flight D has the lowest rank.

As in Act 38.110, a Set of Flights is input to form the SP, with flights sorted according to the descending order of priority, A>B>C>D. Per Act 38.120, the BP is set to D and the CUP is set to comprise flights C, B and A. Per Act 38.130, Option_Creator (D, [C, B, A]) is called, the notation (D, [C, B, A]) indicating D is input as the BP and the CUP is input as the set [C, B, A].

Next, per Act 38.140, the OC of the current level is initialized as an empty set. Then, a combination is formed of each Up Flight in the CUP set [C, B, A] with Base-Flight D and these combinations are added to the Option_Collection to form OC [DC, DB, DA], per Act 38.150. The current CUP set [C, B, A] is assigned as the new SP and the lowest flight in the new SP, i.e., C, is the new BP, per Act 38.160.

Per Act 38.170, a test is performed to determine if the CUP set is empty. It is not, so the process continues for a new (lower) level where Option_Creator (C, [B,A]) is called and executed. This is followed by another (lower) level where the Option_Creator (B, [A]) is called and executed. The Acts 38.140 to 38.180 are repeated in a loop until the CUP set is empty. In this case, that happens with A as the BP. Then the Option_Collection [BA] is returned at that point, per Act 38.190.

At this point, control is at Act 38.200, where C, the BP of the current level Option_Creator (C, [B, A]) is combined with each member of the returned OC[BA] from the lower level and the result [CBA] is added to the OC[CB, CA] of the current level.

OC=[CB, CA]+[CAB]=[CB, CA, CBA]

Control goes to Act 38.210, where the returned OC[BA] is added to the OC of the current level.

OC=[CB, CA, CBA]+[BA]=[BA, CB, CA, CBA]

Next, per Act 38.220, a test is performed to determine if the current level is the highest level for Option_Creator. It is not at this point, so control now goes back to Act 38.190, where the current OC is returned to the next higher level of Option_Creator (D, (C, B, A]). Next, the Acts 38.200 and 38.210 are repeated again for Option_Creator (D, (C, B, A]). Per Act 38.200, D (the current BP) is combined with each member of the returned OC[BA, CB, CA, CBA] from the lower level and these combinations [DCB, DCA, DBA, DCBA] are added to the OC of current level.

OC=[DC, DB, DA]+[DCB, DCA, DBA, DCBA]=
[DC, DB, DA, DCB, DCA, DBA, DCBA].

Per Act 38.210, the returned OC[BA, CB, CA, CBA] from lower level is added to the OC of current level.

OC=[DC, DB, DA, DCB, DCA, DBA, DCBA]+[BA,
CB, CA, CBA]=[DC, DB, DA, BA, CB, CA,
CBA, DCB, DCA, DBA, DCBA]

Next, per Act 38.220, a test is performed to determine if the current level is the highest level for Option_Creator. The current level is the highest level at this point, so at this point, control goes to Act 38.230, where the current OC is returned as the final output, and then the algorithm ends in Box 38.300.

(5) Optimization of UFO VOF

As mentioned earlier (shown in FIG. 7), in the form of an optional last step in the first stage, a financial analysis may be performed on the UFO VOF using the existing airline and customer data to determine the optimal terms and conditions of the UFO VOF. 'What-if' scenarios may be executed to determine the optimal pricing strategy. The airline may want to divide its customers into one or more customer segments, and design UFO VOFs separately for each customer segments.

Second Stage: Using the UFO Value Option Framework

After completing the first stage of the method, the airline has created a UFO VOF and specific value options within that framework. The airline has also segmented customers. The airline is fully prepared to use a structured format comprising UFO value options to interact with its customers in real time to generate benefits for both the airline and its customers. The second stage of the UFO VOF is now presented.

Figure 39:
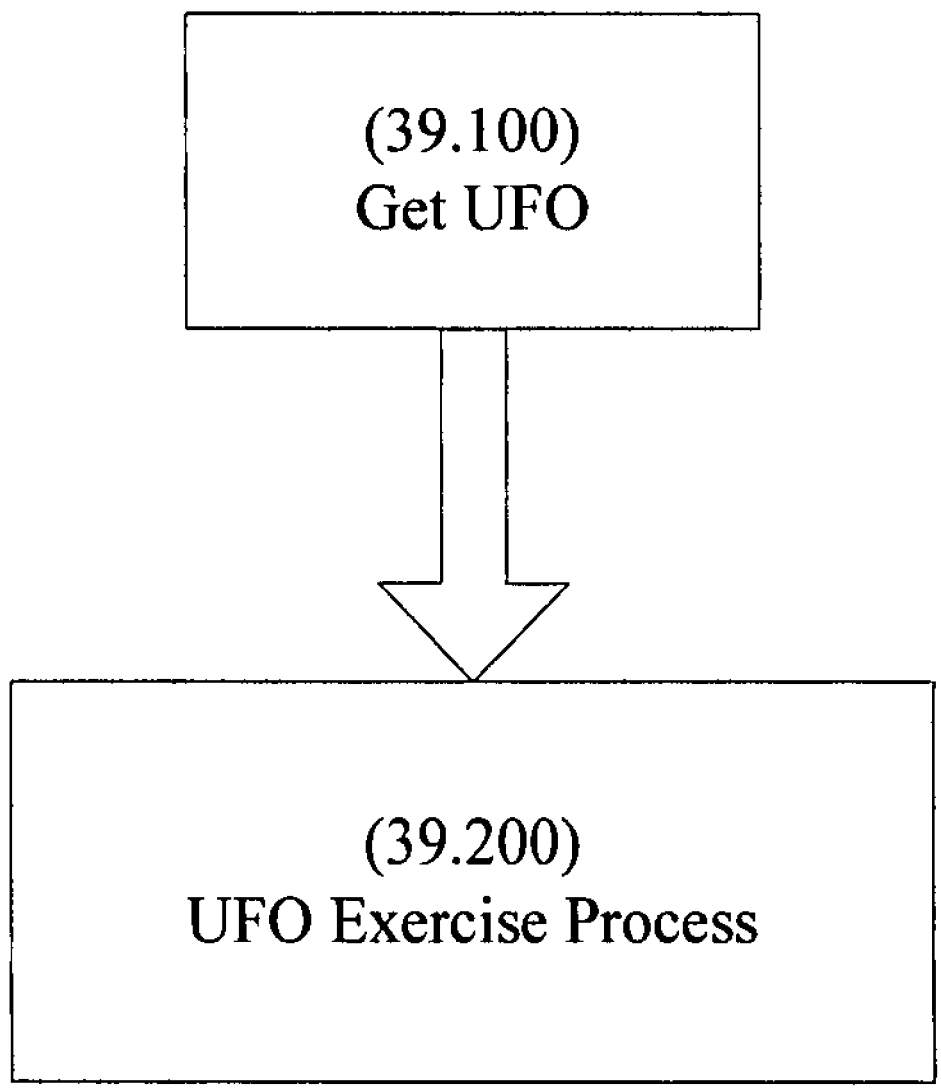
FIG. 39 is a diagrammatic illustration, in a high level flowchart, of a process for UFO VOF implementation in an airline industry.

The implementation of the UFO VOF between the airline and its customer takes place through two high level acts, as shown in FIG. 39. In Act 39.100, the 'Get UFO' process, an interactive event between the customer and the airline web server, runs to carry out the Initial Transaction of the UFO VOF. In this Act, a number of algorithms may be executed on the airline's server (e.g. availability, UFO Price, Notify Deadline, Upgrade List and so on) to optimally calculate the terms and conditions of the UFO VOF (e.g., availability, UFO Price(s) and other conditions) to concurrently benefit at least two of the airline, its customers, another entity or any combination thereof. In Act 39.200, an event optimizer process called the UFO Exercise Process is executed. In this process, the airline may award the upgrade to the customer based on the terms and conditions of the option contract and the Chosen Flight is notified to the customer. The process may also comprise one or more event optimizer algorithms that may help to optimally select the Chosen Flight and/or to optimally use (or reuse) the Released Flight. UFO Exercise Process is similar to UTO Exercise Process which is explained in the UTO VOF discussed below.

Figure 44:
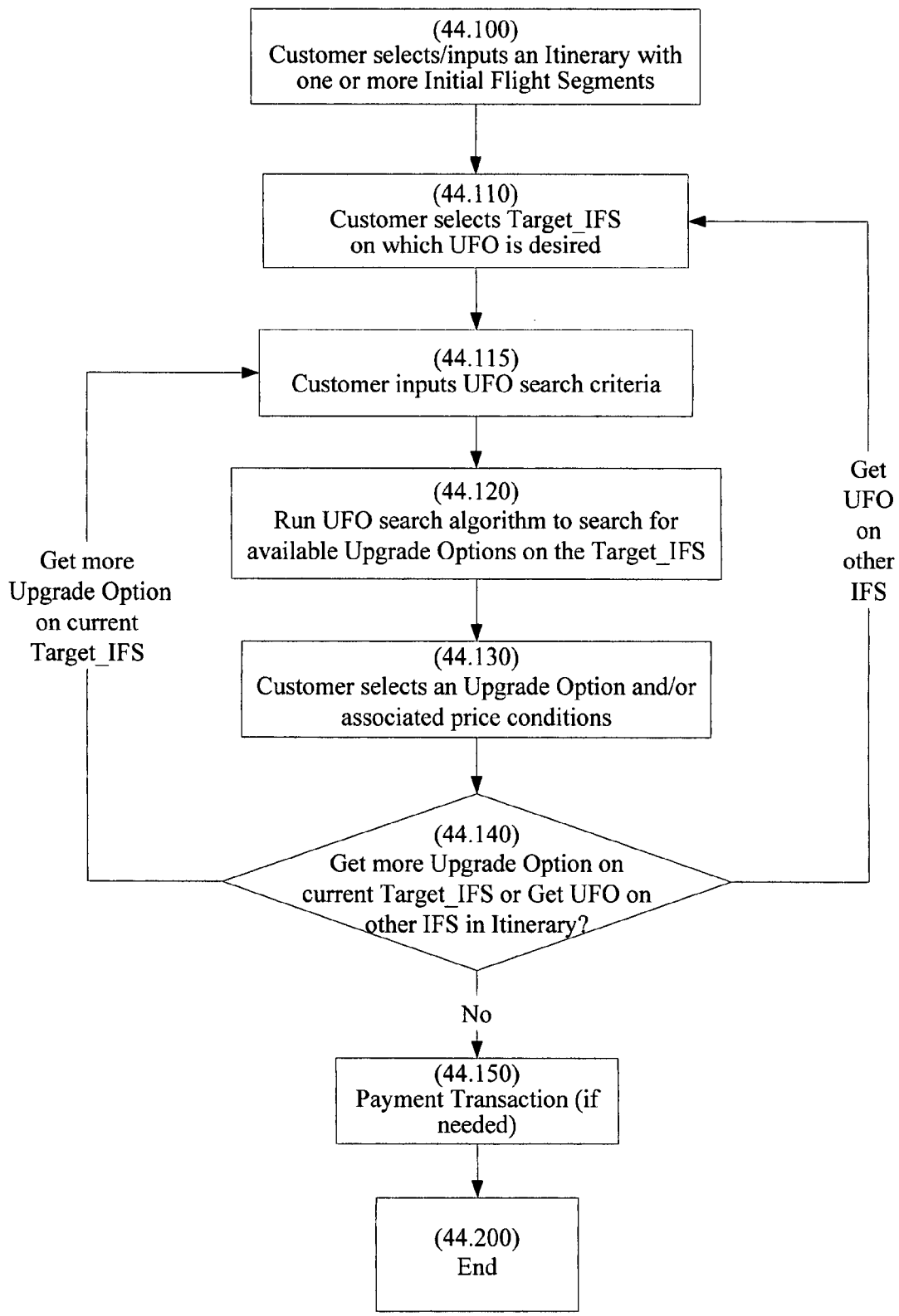
FIG. 44 is a flowchart that expands Act 100 of FIG. 39, illustrating a high level algorithm for the "Sequential Get UFO" process.
Figure 46:
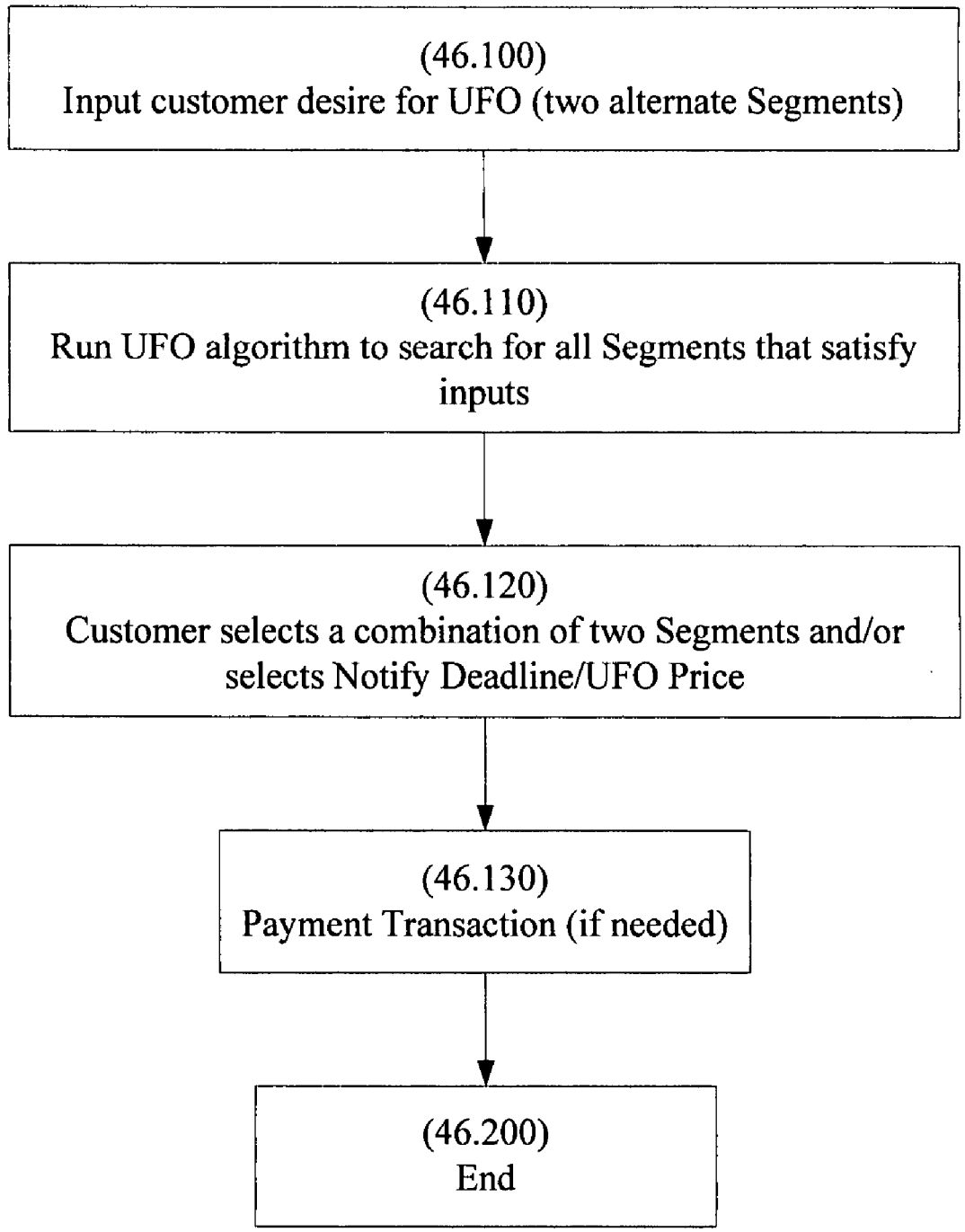
FIG. 46 is a flowchart of an algorithm for the "Concurrent Get UFO" process, an alternative process to FIG. 45.

As explained above, the Get UFO process may be implemented via the Sequential (shown in FIG. 44) or the Concurrent (shown in FIG. 46) process. There are many ways to do the Sequential process. As an example of the Sequential process, a customer may select (or purchase) a Leg/Segment/Itinerary before the Initial Transaction begins. In such situations, said Leg/Segment/Itinerary may be referred to as Initial Leg/Initial Segment/Initial Itinerary or IL/IS/II, in short, respectively. The Initial Segment is also referred to as Initial Flight Segment (or IFS, in short). A customer may get a UFO, i.e., get one or more UFO Legs/Segments/Itineraries on an IL/IS/II, respectively. A UFO Leg/Segment/Itinerary is also referred to as Option Leg/Option Segment/Option Itinerary, or OL/OS/OI, in short, respectively. An Option Segment is also referred to as Option Flight Segment (or OFS, in short). The two events (one for the Initial Flight and the other for the Initial Transaction) may be executed with a minimal (one just after another) or a significant time gap (e.g., few minutes, hours, days and so forth) in between them.

The UFO VOF may be implemented at different levels including, but not limited to, Itinerary, Segment and Leg. An airline may choose to implement the UFO at any level(s). In a specific UFO interaction between a customer and the airline, the implementation level should be the same for all the UFO Flights, Chosen Flights and Released Flights. For example, if UFO is implemented at the Itinerary level, then all the UFO Flights and Chosen Flights would refer to UFO Itineraries and Chosen Itineraries, respectively.

1. 'Buy UFO'—Dynamic Interaction to Capture Customer Demand

In the Get UFO process, a customer interacts with the airline's server to receive UFO. The interaction may take place (for example) via phone, in-person or on a website. The Sequential Get UFO Process is presented first along with its detailed algorithms, followed by a short summary of the Concurrent Get UFO Process.

Sequential Get UFO Process

There are several ways to implement the Sequential process. The following presents an example of the Sequential Get UFO Process when UFO is implemented at the Segment level. It is also assumed here that the customer first purchases an Initial Itinerary with one or more IFS, and then opts to receive a UFO on any of the included IFS.

As an instance of the Sequential Get UFO process in the airline industry, a customer has purchased an Itinerary and then gets a UFO through the interactive interface of the web pages as shown in FIGS. 40, 41, 42 and 43. FIG. 40 displays the summary of the purchased Itinerary, which is made of two Segments: BOS to SEA (onward journey) and SEA to BOS (return journey). Clicking on the marketing banner representing "Get UFO", the customer is linked to the Web page shown in FIG. 41 and a Get UFO interaction begins.

The series of web pages in FIGS. 41, 42 and 43 may (for example) be displayed in a customer's browser by an airline's web server, to facilitate the interaction between the customer and the airline when the customer comes to participate in Get UFO (during or after the Initial Itinerary is purchased). The Initial Itinerary is displayed in FIG. 41. The customer may choose to Get UFO on any IFS by clicking the "Click here to Get UFO Flights" link corresponding to that IFS. Once the link is clicked, the "Search UFO Flights" section appears (shown in FIG. 41), where the customer may enter the search criteria for OFS and then click on the "Search UFO Flights" button. After the click, the Get UFO algorithm running "behind the scenes" on a server of the airline qualifies the availability, applicability and price conditions on all the available OFSs (Option Flight Segments) and displays them in the screen as shown in FIG. 42. For each of the OFSs, Initial UFO Price, a set of one or more Notify Deadlines and the corresponding UFO Exercise Prices are shown in the form of "Select" buttons (shown in the "UFO Notify Deadline/UFO Exercise Price" section in FIG. 42). The customer may select any desired OFS (along with the Notify Deadline and UFO Exercise Price) by clicking on a "Select" button associated with any of the Notify Deadlines displayed in the corresponding row. Once the customer clicks the "Select" button, he/she is hyperlinked to the web page as shown in FIG. 43, where the summary of the IFS and the selected OFS is shown.

Next, the customer may choose to get more OFS on the same IFS, or to get UFO on another IFS in the Initial Itinerary. To receive another OFS on an IFS, the customer may repeat the OFS search process for that IFS. Once all the desired OFSs have been selected, the customer clicks the "Continue" button (shown in FIG. 43). A payment transaction is executed to complete the purchase of the UFO option.

The following presents an example of the algorithmic illustration of the Sequential Get UFO process on the Segment level. This algorithm may be used while implementing the Sequential Get UFO process at Leg and/or Itinerary level. Consider FIG. 44. In Act 44.100, a customer selects (and/or purchases) an Itinerary (with one or more Flight Segments). Next, in Act 44.110, the customer reaches an interactive interface of the airline's web server to Get UFO, where the customer selects a Flight Segment (referred to as Target_IFS) on which UFO is desired. Next, the customer inputs the UFO search criteria (such as desired price range, conditions, Up Flights and so forth) for the current Target_IFS in Act 44.115.

Next, on clicking the "Search UFO Flights" button, control goes to Act 44.120, where the UFO search algorithm is executed to search for an OFS. The OFS search algorithm returns a list of valid UFOs along with a list of Comb_NDs and associated UFO Prices and/or other conditions. The details of the OFS search algorithm is presented later. Next, the search results are displayed for the customer, who then selects the desired OFS and one or more associated Comb_ND(s)/UFO Price(s) and other conditions, as shown in Act 44.130.

Next, in Act 44.140, a test is performed to determine whether the customer wants to get more OFSs on the current Target_IFS or on another OFS. If the customer wants to get an OFS on another IFS, control loops back to the Act 44.110, where the customer selects another IFS as the Target_IFS, and then the process is repeated again for a new Target_IFS. If the customer wants to get more OFSs on the current Target_IFS, control loops back to Act 44.115, where the customer enters the OFS search criteria and then the process is repeated for the new OFS search criteria. If the customer does not want to get any more OFSs, control goes to Act 44.150, where a payment transaction (if needed) may be executed. If the UFO has a positive initial price, the customer may pay that price for UFO using a credit card, direct bank account debit or any other payment transaction mechanism. For example, a customer may need to pay a price for the OFS after taking into consideration the Initial UFO Price using a credit card, direct bank account debit or any other payment transaction mechanism. Next, the algorithm ends in Box 44.200. The computation may be performed using a processor that may calculate results in optimal time.

OFS Search

Figure 45:
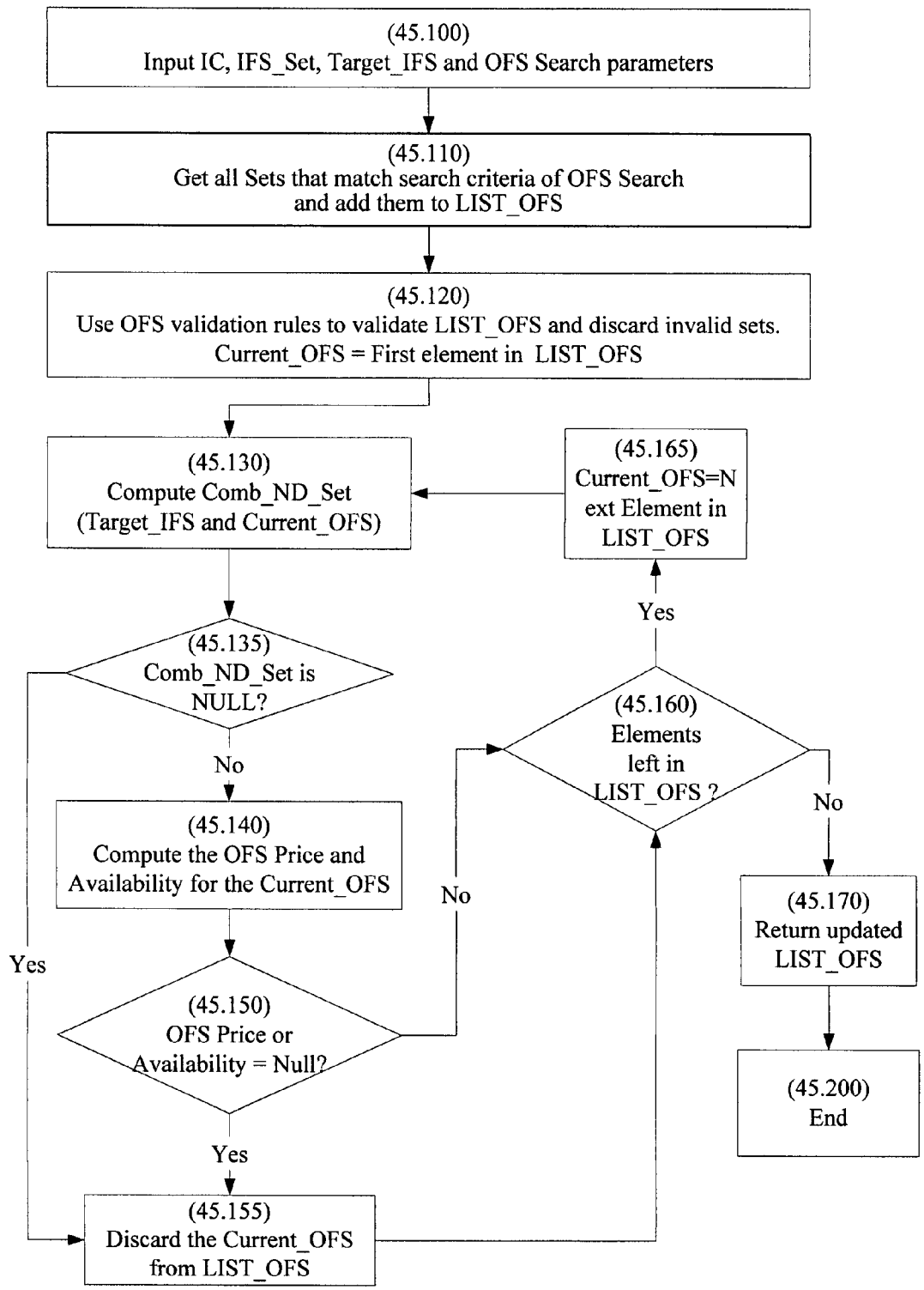
FIG. 45 is a flowchart that expands Act 120 of FIG. 44, illustrating an algorithm to search for UFO Flight Segments.

The following algorithm (shown in FIG. 45) determines and validates an OFS for a given set of conditions including, but not limited to, availability, Notify Deadline and UFO Price. One of the ways of its implementation of said algorithm has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 45.100, the number of customers (IC), IFS_Set (containing all IFS in the Initial Itinerary, and all the OFSs, (if any) already selected/received along with Comb_ND_Set(s) and Comb_OP_Set(s), for each IFS), Target_IFS and the OFS Search parameters are input to the system. The OFS search parameters may include, but are not limited to, departure date and time, origin, destination, number of Legs per Segment, Notify Deadline, UFO Price (Initial and Exercise) and so forth. A customer may be allowed to input Notify Deadline and/or UFO Price on the basis of which valid OFSs (that satisfy the given criteria of Notify Deadline and/or UFO Price) may be searched for and displayed for the customer. For example, a customer may be asked to input the origin and destination related parameters, and then a set of Notify Deadlines and UFO Prices may be computed for the flights that match the given criteria. In another example, a customer may input both the origin and destination and Notify Deadline and/or UFO Price as inputs and then a search may be performed for valid OFSs. In yet another example, a customer may input to the system, one or more flights, and/or inputs to search for one or more additional flights (e.g., origin and destination, price etc.) to search for OFS that may be combined with one or more input flights (by the customer) to constitute the total set of flights for a UFO. In such situations, an airline may also validate the flights input by the customer to determine if said flights are eligible to be the UFO Flights.

Next, control goes to Act 45.110, where an OFS Search is performed for the given criteria. The search may be best performed using a processor that may calculate results in optimal time. The order in which search parameters are executed may be optimized to reduce the search time, however, it may or may not affect the final outcome. An airline may select any order of its choosing.

In Act 45.110, Flight Segments are determined that match the search criteria and the resulting Segments are added to a list termed LIST_OFS. Next, in Act 45.120, a list of OFS validation rules is obtained from the airline's UFO VOF database and the rules are used to validate all the Segments in the LIST_OFS list. Segments that do not satisfy the rules are discarded. Validation rules may include, but are not limited to, a Maximum Number of Legs per Segment Rule, a Maximum Ticket Price Rule, an Availability Rule and so forth. For example, a Maximum Ticket Price Rule may discard those Segments for which the Ticket Price related to the upgrade option is more than a specified value. An airline may implement any rule of its choosing to further qualify the Segments in the LIST_OFS list. As a last step in Act 45.120, the first element in the updated LIST_OFS list is designated as the Current_OFS.

Next, control goes to Act 45.130, where a group of Comb_NDs is computed for the combination of the Target_IFS, all the existing OFS of the Target_IFS and the Current_OFS, and added to a set called Comb_ND_Set. Next, in Act 45.135, a test is performed to determine whether the Comb_ND_Set obtained in the previous Act is Null. If so, control goes to Act 45.155. If not, control goes to Act 45.140, where the UFO availability and UFO Price for the Comb_ND_Set are determined. Next, in Act 45.150, another test is performed to determine whether the UFO Availability or the UFO Price is Null. If so, control goes to Act 45.155. If not, control goes to Act 45.160.

In Act 45.155, the Current_OFS is discarded from the LIST_OFS list, and control goes to Act 45.160, where a test is performed to determine if more elements are left in the LIST_OFS list. If so, control goes to Act 45.165. If not, control goes to Act 45.170.

In Act 45.165, the next element in the LIST_OFS list is designated as the Current_OFS and control loops back to Act 45.130 to repeat the process for the new Current_OFS. In Act 45.170, the updated LIST_OFS list is returned as the search result, and then the algorithm ends (Box 45.200). The computation may be performed using a processor that may calculate results in optimal time. This algorithm may be used while implementing the search process at Leg and/or Itinerary level.

Computation of Notify Deadlines

An airline may set one or more Notify Deadlines of its choosing for its Flights. Once the Notify Deadlines have been set for each Flight, the next Act is to create a framework to compute the Notify Deadlines for a group of Flights (such as a Segment, an Itinerary or any other group). The following sections present an example of a framework that may be used to obtain a set of Notify Deadlines applicable to a group of Flights. An airline may use any framework and algorithm of its choosing to obtain the same.

A set of Notify Deadlines associated with a Leg, a Segment and a combination of two or more Segments is called Leg_ND_Set, Seg_ND_Set and Comb_ND_Set, respectively.

Each element in the Leg_ND_Set, Seg_ND_Set and Comb_ND_Set is termed Leg_ND, Seg_ND and Comb_ND, respectively. The Comb_ND_Set may be computed by combining the Seg_ND_Sets of all the given Segments. A Seg_ND_Set may be computed by combining the Leg_ND_Sets of all the Legs under that Segment. The Notify Deadlines may be computed based on various parameters and factors of the airline's choosing. One example to compute a Comb_ND_Set is as follows. First compute Seg_ND_Set for all Segments. A Seg_ND_Set is computed by first selecting earliest of the Notify Deadlines of each Leg within the concerned Segment, and then picking the latest of those Deadlines, and noting that as the Target_Deadline. Next step is to pick all those Notify Deadlines that fall after the Target_Deadline. Notify Deadlines thus obtained may be validated using various validation rules based on airline factors such as customer utility, flight parameters and so forth. Similarly, the Comb_ND_Set may thus be computed by repeating the above process for Seg_ND_Sets, thus obtained for each Segment.

Available Capacity Check

The UFO capacity for an OFS may depend on one or more factors including, but not limited to, Notify Deadline, UFO Prices, expected Seat value in a flight and so forth. An airline may use any method of its choosing to determine UFO capacity of a flight. For example, an airline may choose to have a fixed UFO capacity for one or more of its flights.

An instance to compute UFO capacity is discussed below. Consider the case, when UFO Capacity is dependent on Notify Deadline. In such situation, the objective is to determine those Comb_NDs within the Comb_ND_Set on which UFO is available for the given OFS. The UFO Capacity and the Used UFO Capacity (the total number of Flights on which UFO has been sold but not exercised) may be calculated for each Comb_ND within the Comb_ND_Set. Available Capacity (AC) would then be the difference of UFO Capacity and Used UFO Capacity for the given Flight. If the AC is greater than or equal to the number of incoming customers desiring a UFO, then the UFO capacity is available at a given Comb_ND for the given OFS. The process may be repeated for all Notify Deadlines within Comb_ND_Sets. UFO may be made available on a given OFS for a given Comb_ND, if UFO is available on all the Flights of OFS for the given Comb_ND.

Price Calculation

An airline may set UFO Prices for a Flight Leg using any method of airline's choosing. Once the UFO Prices have been set for each Flight Leg, the next Act is to create a framework to compute UFO Price for a group of Flight Legs (such as a Segment, an Itinerary or any other group) by using UFO Prices for each Flight Leg in the group.

The parameter Leg_OP refer to UFO Price (and may or may not be corresponding to a Notify Deadline) associated with a Flight Leg. Similarly, Seg_OP and Comb_OP refer to UFO Price (may or may not be corresponding to a Notify Deadline) associated with a Segment and a combination of two or more Segments, respectively. A set of Leg_OPs, Seg_OPs and Comb_OPs is termed Leg_OP_Set, Seg_OP_Set and Comb_OP_Set, respectively. The Comb_OP_Set is computed by combining the Seg_OP_Sets of the IFS and all the OFSs (existing and new). A Seg_OP_Set is computed by combining the Leg_OP_Sets of all the Flight Legs under that Segment. One or more Seg_OP_Rules may be read from the airline's database and applied to calculate Seg_OP_Set for each input Segment (IFS and all OFSs) using the Leg_OP_Sets of all the Flight Legs of said Segment. An airline may use any Seg_OP_Set Rule of its choosing. Seg_OP_Rules may be defined to calculate Seg_OP as the sum, average, highest, lowest or any other function of Leg_OPs of all the Flight Legs at a given Comb_ND. Similarly, a Comb_OP_Set comprises one or more Comb_OPs, and is calculated using one of the pre-determined rules, termed Comb_OP_Rules, to combine the Seg_OPs of all the Segments in the combination. An airline may use a Comb_OP_Rule of its choosing. Comb_OP_Rules may be defined similar to the Seg_OP_Rules.

Concurrent Get UFO Process

As explained above, in the Concurrent Get UFO process, a customer receives all UFO Flights concurrently in one transaction. An algorithmic illustration of an example of the Concurrent Get UFO process is displayed in FIG. 46. The UFO (2, 1) instance is assumed here as an example. Consider a customer who desires to get upgrade to an Up Flight on appropriate price and/or terms. In Act 46.100, the customer desires for UFO are input, including, but not limited to, a search criteria for Up Flights (may be similar to the search criteria defined above for the Sequential Get UFO process).

Next, in Act 46.110, the UFO algorithm is run to determine the combinations of two Segments that satisfy inputs. A list of such search results is displayed for the customer along with the associated terms and conditions including, but not limited to, Notify Deadlines, Initial UFO Price, UFO Exercise Price and Ticket Price for each such combination. The UFO algorithm for the Sequential Get UFO process (defined above) may also be used for the Concurrent Get UFO process.

Next, in Act 46.120, the customer selects a desired combination of two Segments and the associated conditions such as UFO Exercise Price/Notify Deadline. Next, in Act 46.130, a payment transaction is executed, if needed. For example, the customer may pay the Ticket Price after taking into consideration the Initial UFO Price using a credit card, direct bank account debit or any other payment transaction mechanism. Next, the algorithm ends in Box 46.200. The computation may be performed using a processor that may calculate results in optimal time.

(2) Event Optimizer

Once the customer selects a UFO value option, the processing goes to the Event Optimizer phase where different acts are executed depending on the trigger event that may occur to make an option become exercisable. In this stage, the UFO Exercise Process (and Customer Notification (or CN, in short) process) as shown in Act 39.200 is executed. In this process, one or more decisions on the selection of Chosen Flight(s) is (are) notified to the customer. The event(s) is (are) related to the value option selected in the first act. In the UFO VOF, the airline may use a software application built on the method defined above to optimally award the upgrades to customers who have bought a UFO. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E. One of the methods have been described later in the UTO Exercise Process. Another method is described below in detail for the UFO Exercise process.

The UFO VOF helps to create a flexible customer inventory. In other words, by using the UFO VOF, an airline may obtain rights to allocate any of the selected UFO Flights to a UFO customer (i.e., award the upgrade to the customer), and thus, said UFO customer acts like a flexible customer inventory that the airline may manage to generate revenues. An airline may design one or more uses of such flexible customer inventory, where each such use may include one or more events that follow the Initial Transaction. An example (the Buy_N process) was explained earlier. In the Buy_N process, an airline may use the UFO VOF to accommodate requests from potential customers for flights. As an example, the Buy_N process may especially be used to satisfy requests for flights that have already been sold or have low (or no) availability. The details for the Buy_N process are presented below.

Another example to use the UFO VOF would be to use the UFO VOF in conjunction with one or more other VOFs, for example, the AFO (the Alternate Flight Option) VOF (details are provided later). An airline may form a group of one or more AFO customers and one or more UFO customers, where the options (AFO and UFO) obtained by the group members are complementary in nature. As an example, consider a customer (A) who bought an AFO to choose either of F1 and F2 as Chosen Flight, and consider a customer (B) who received a UFO and wants an upgrade from Initial Flight (i.e., Base-Flight) F1 to Option Flight (i.e., Up Flight) F2. Thus, if A decides to choose F1 as the Chosen Flight, the airline may upgrade B and assign F2 as the Chosen Flight for B, and vice versa. The customers A and B have taken complementary options and may form a group. The airline may need to hold only one unit of inventory in F1 and F2 to satisfy the needs of both A and B (assuming each A and B only need one seat in a flight). Such a combination of complementary options or VOFs may improve efficiency and concurrently enhance value for all the parties involved (in the given example, for A, B and the airline). More details on combining VOFs are provided later.

In one of the implementations of the UFO VOF, the airline may award complementary upgrades to two or more customers. Different customers may have different ranking for different flights and thus, a higher ranked flight for one customer may be a lower ranked flight for some other customers. The airline may optimize customer needs and award upgrade to such a complementary set of customers. For example, a customer U1 ranks flight F2 higher than flight F1, but may not be able to purchase flight F2 because flight F2 may have a higher cost than F1 (hence purchases flight F1). Another customer, who ranks flight F1 higher than F2, could not get F1 due to non-availability of F1. The airline may provide a UFO VOF to both U1 and U2 and may provide upgrades to both of them, i.e., awarding flight F2 to U1 and awarding flight F1 to U2. Such an implementation of the UFO VOF may enable an airline to generate direct and indirect benefits using differential customer dynamics and by implementing grouping within the same type of customers.

The UFO VOF may also be used to reduce operational costs, constraints or other goals that are impacted by the allocation of flights among different customers. The UFO VOF may be used to shave off operational costs by reducing capacity for one or more flights and/or products that are low in demand. For example, if an airline experiences a flight with very low ticket sales, it could offer UFO to customers on that flight and thus, be able to economically and efficiently upgrade them to different flights and thereby be able to cancel said flight to save its flying costs (such as crew costs, staffing costs like gate agents, ground mechanics, maintenance costs and so forth) and even simultaneously generating revenue from said cancelled flight. If an airline wants to do the same on a low demand flight today (after booking few customers on it) without using UFO, it may be more difficult, tedious and costly affair to contact all the booked customers on that flight and/or to convince them to shift/upgrade to other flights. The cost in the Buy_N process and Upgrade_U algorithm may also refer to the price that the customer may pay to the airline to receive an upgrade.

An airline may use the UFO VOF for any other purpose of its choosing. In all such uses, the airline may use a system defined below that can help to optimally allocate seat capacity among customers. The following system presents an example of a system (along with its methods and algorithms) that may be used to upgrade UFO customers within their selected UFO Flights. However, an airline may use any other process of its choosing to upgrade UFO customers within their selected UFO Flights. The Buy_N process is used as an example to demonstrate the system and its set of methods and algorithms.

The process of upgrading U customers (i.e., UFO customers) within their selected UFO Flights is termed "Upgrade_U" process. The Upgrade_U process may allow the airline to optimally upgrade UFO customers from their Accounted Flights (Base-Flights) and to one of their Awaiting Flights (Up Flights) to satisfy a pre-defined goal. The cost in the Buy_N process and Upgrade_U algorithm may refer to the price that the customer may pay to the airline to receive an upgrade.

The airline, an entity other than the airline and/or any combination thereof may store the data in a data store which may include, but is not limited to, the value that may be realized if the customer receives an upgrade. The airline, an entity other than the airline and/or any combination thereof may receive and process data to determine from among all or substantially all possible combinations of customers, a set of customers which may be awarded upgrades. The airline, an entity other than the airline and/or any combination thereof may upgrade one or more set of customers that may be determined by processing the data. The airline may also upgrade one or more set of customers other than the combination of customers that may be determined by processing said data. Set of customers which may be upgraded or the decision to initiate upgrade award process may depend upon number of factors including, but not limited to, the need to upgrade customers, factors of airline's choosing, number of seats to be created in one or more flights, availability of Up Flights, optimizing revenues which may for at least one of the customer, airline and/or an entity other than said airline, cost savings and so forth.

The airline may, on detection of occurrence of one or more events, execute one or more event response algorithms which may determine one or more set of customers possessing options making them eligible to be upgraded to one or more flights and may upgrade one or more of said set of customers to create seats in one or more flights. Said event may be an increase in the demand of one or more Base-Flights, increase in forecasted demand of one or more Base-Flights, availability of one or more Up Flights, any combination thereof or any other event. The upgrade award process may be done at the instance of the airline, an entity other than said airline or any combination thereof. The set of customers, here, may include one or more customers. The upgrade process may involve upgrading one or more customers. Upgrade of one or more customers, as explained below in Upgrade_U, may involve one or more interactions between the airline, an entity other than the airline, the customers and/or any combination thereof. Upgrade award may involve awarding upgrades at least a second customer to at least one of the second flights after at least a first customer from at least one of the second flights is upgraded to at least one of the first flight and such cascading process continues until the last customer in the set is upgraded. Such a cascading process may continue until the last customer which may have to be upgraded in the set is upgraded and it may lead to upgrade of more customers than the creation of number of seat availability. This process may involve two or more customers. This process has been explained in detail below in the Upgrade_U process. The airline and/or an entity other than the airline may upgrade one or more customers to one or more flights belonging to said airline, to one or more flights belonging to an entity other than said airline and/or any combination thereof.

Buy_N Process

Figure 47:
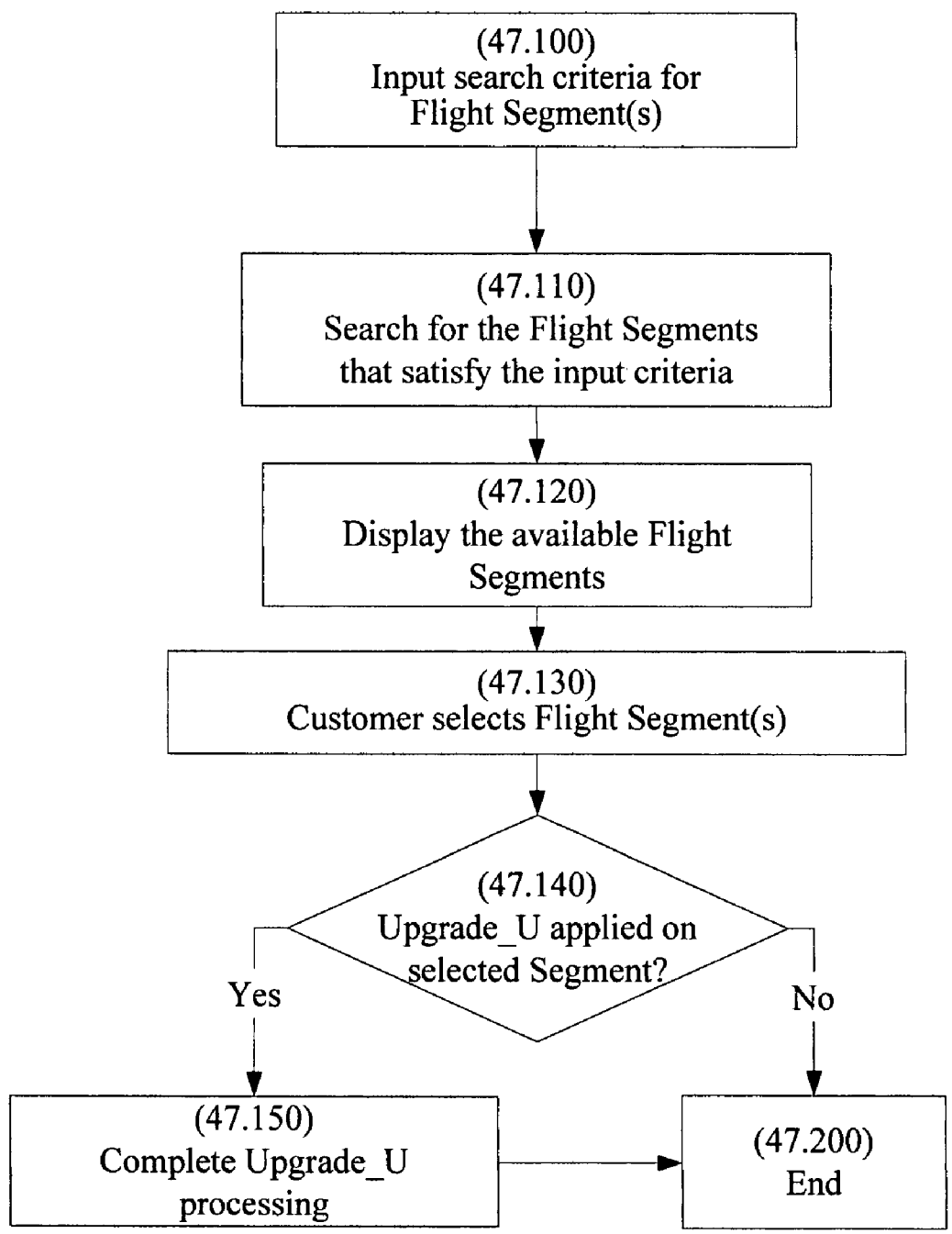
FIG. 47 is a flowchart illustrating the Buy_N process for a Flight Segment of an airline that has implemented the UFO VOF.

FIG. 47 displays a flow chart of an example of a Buy_N algorithm, which is executed during a dynamic interaction between the customer and the airline. As an example, an interaction may include a situation when a customer interacts with an airline to obtain (or purchase) tickets, or when an airline presents offerings to a customer (with or without a solicitation by the customer). A few parameters have been assumed to add context and enhance understanding. It is assumed that a customer is interacting with an airline to purchase tickets, and that UFO VOF is implemented at the Segment level. This process may be implemented at Leg level and/or Itinerary level. In Act 47.100, the search criteria are input. Various search parameters for a desired Flight Segment (as desired by the customer) are taken as the input to the system.

Next, in Act 47.110, a search process is executed to search for all Flight Segments that satisfy inputs. The details of the search process are described later. Next, in Act 47.120, all the search results are displayed before the customer in an interface (such as in a web browser, a telephone operator stating the search results over the phone etc.). Control then goes to Act 47.130, where the customer selects a Segment (or Flight Segment). The selection of the Segment may be followed by a payment and/or purchase of the selected Segment.

In Act 47.140, a test is performed to determine whether Upgrade_U process has been applied on the selected Segment. If so, control goes to Act 47.150, where the Upgrade_U process is completed for the selected Segment, and control then goes to Box 47.200. If not, control goes to Box 47.200, where the algorithm exits. The completion of the Upgrade_U process may include one or more Acts that may be executed to incorporate the fact that said Segment was selected by the customer. For example, one of such acts may be to record the selection of said Segment to a database and/or to change the Accounted Status for one or more UFO customers (who were affected in the Upgrade_U process).

Figure 48:
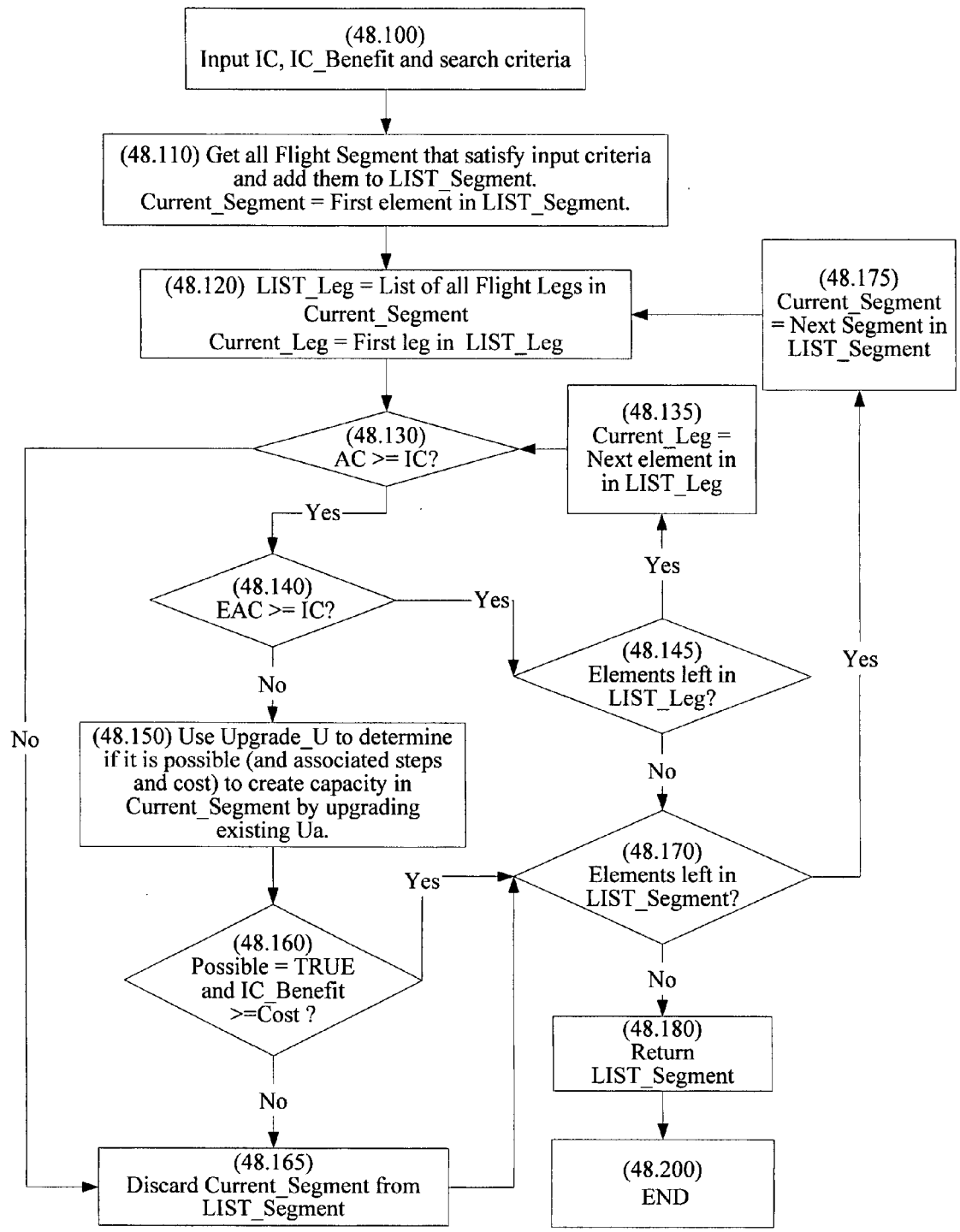
FIG. 48 is a flowchart that expands Act 110 of FIG. 47, illustrating an algorithm for the Buy_N search process.

FIG. 48 expands Act 110 of FIG. 47 and demonstrates an example of a search algorithm that may be used to determine Flight Segments that satisfy the inputs. In Act 48.100, IC (number of incoming customers), IC_Benefit (i.e., the benefit that an airline may receive if the incoming customers select and/or purchase one or more Segments) and the input search criteria are taken as the input parameters to the system. The term "Incoming Customers" refers to the customers who interact with the airline in the current transaction (Buy_N). It is assumed that each customer desire one unit of capacity (seat) and thus, total units of capacity (seats) desired is equal to the total number of incoming customers. In some situations, IC_Benefit and/or IC may not be available as an input, and may be calculated during the search process. Next, in Act 48.110, all the Segments that satisfy the 'search criteria' are searched from the airline database. The Segments, thus obtained, are added to a list termed LIST_Segment. The first element in the LIST_Segment list is designated as Current_Segment.

Next, in Act 48.120, all the Legs in the Current_Segment are added to a list termed LIST_Leg. The first element in the LIST_Leg list is designated as Current_Leg. Next, in Act 48.130, a test is performed to determine whether the Available Capacity (AC) of the Current_Leg is greater than or equal to IC. If so, control goes to Act 48.140. If not, control goes to Act 48.165.

In Act 48.140, another test is performed to determine whether EAC (Effective Available capacity) of the Current_Leg is greater than or equal to IC. If so, control goes to Act 48.145. If not, control goes to Act 48.150, where the Upgrade_U algorithm is executed to determine the possibility (and associated process steps and costs) to create capacity in the Current_Segment.

Next, in Act 48.160, a test is performed to determine whether it is possible (by using Upgrade_U) to create capacity in the Current_Segment and the IC_Benefit is greater than or equal to the cost to create that capacity as determined in the Act 48.150. If both conditions are true, control goes to Act 48.170. If either condition is false, control goes to Act 48.165. In Act 48.165, the Current_Segment is discarded from the LIST_Segment list, and control then goes to Act 48.170.

In Act 48.145, a test is performed to determine whether more elements are left in the LIST_Leg list. If so, control goes to Act 48.135, where the next element in the LIST_Leg list is designated as the Current_Leg and control loops back to Act 48.130, to repeat the process for the new Current_Leg. If not, control goes to Act 48.170.

In Act 48.170, another test is performed to determine whether more elements are left in the LIST_Segment list. If so, control goes to Act 48.175, where the next element in the LIST_Segment list is designated as the Current_Segment and control loops back to Act 48.120, where the process for the new Current_Segment is performed. If not, control goes to Act 48.180, where the LIST_Segment list (the most recently updated version after discarding the invalid Segments, if any) is returned. Next, the algorithm ends at Box 48.200.

Figure 49:
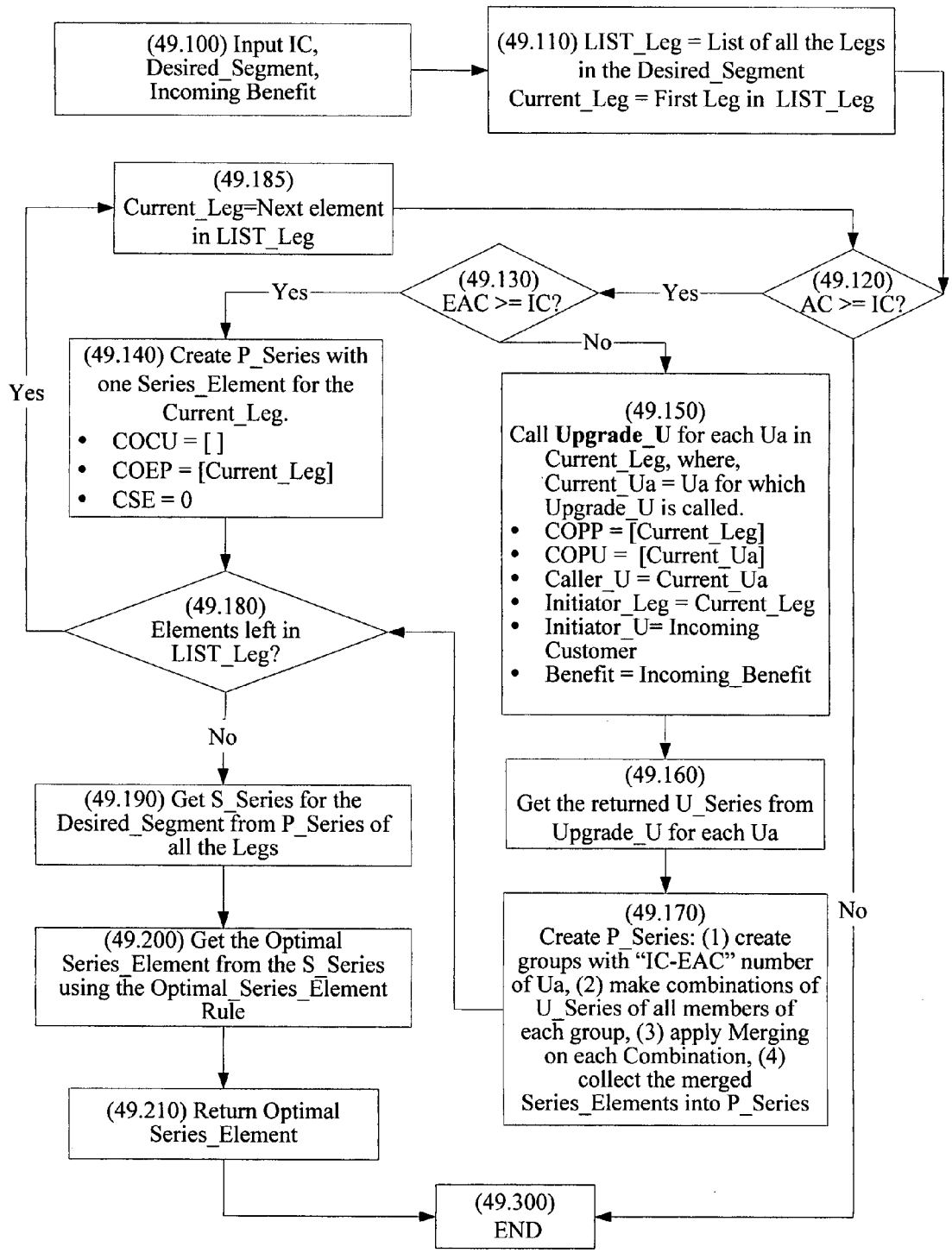
FIG. 49 is a flowchart that expands Act 150 of FIG. 48, illustrating an algorithm to create capacity using the Upgrade_U algorithm.

FIG. 49 expands Act 150 of FIG. 48 and demonstrates an example of an algorithm to apply the Upgrade_U algorithm to create one or more than one unit of capacity (seat) in one or more Leg(s) within a Desired_Segment (the Segment in which capacity needs to be created). In Act 49.100, various input parameters are taken in the system. Input parameters include IC, Desired_Segment and Incoming_Benefit (i.e., benefit an airline may realize if capacity is created in the Desired_Segment)

Next, control goes to Act 49.110, in which all the Legs in the Desired_Segment are listed in the LIST_Leg list. The first Leg in the LIST_Leg list is designated as Current_Leg. Next, in Act 49.120, a test is performed to determine whether the Available Capacity (AC) of the Current_Leg is greater than or equal to IC. If so, control goes to Act 49.130. If not, control goes to Box 49.300, where the algorithm ends. In Act 49.130, another test is performed to determine whether EAC (Effective Available capacity) of the Current_Leg is greater than or equal to IC. If so, then control goes to Act 49.140. If not, control goes to Act 49.150.

In Act 49.140, a P_Series is created for the Current_Leg. Since the Current_Leg is an End_Leg, there will be only one Series_Element in the P_Series collection. The Series_Element will comprise COEP with the Current_Leg as the only element, COCU with no elements and CSE with zero value (since no Ua needs to be upgraded from Current_Leg, and hence, no cost to create capacity). Next, control goes to Act 49.180.

In Act 49.150, the Upgrade_U algorithm is called for each Ua in the Current_Leg and the algorithm follows a recursive loop. Each of the Ua becomes Current_Ua for the corresponding Upgrade_U call. The necessary input parameters for each of the Upgrade_U includes the Current_Leg as 'COPP', Current_Ua as 'COPU', Current_Ua as 'Caller_U', Current_Leg as 'Initiator_Leg', one of the incoming customers as 'Initiator_U' and Incoming_Benefit as 'Benefit'. The Upgrade_U call returns a U_Series collection for each Ua in the Current_Leg. The details of the Upgrade_U algorithm are discussed in the next section.

Next, control goes to Act 49.160, where all the U_Series collections are obtained as returned from the Act 49.150. Next, in Act 49.170, a P_Series collection for the Current_Leg is calculated through the following operations: (1) create groups of Ua from all Ua of the Current_Leg for which Upgrade_U was called, where the number of Ua in each group is equal to "IC-EAC" (EAC of the Current_Leg), (2) make combinations of the U_Series collection of all members of each group (combine each Series_Element of each U_Series of each member with that of each of the rest of the members of that group), (3) merge all members within each combination to formulate a merged Series_Element, (4) collect all such merged Series_Elements, thus obtained, into P_Series collection of the Current_Leg. Details on making combinations and merging are provided later.

Next, in Act 49.180, a test is performed to determine whether more elements are left in the LIST_Leg list. If so, control goes to Act 49.185, where the next element in the LIST_Leg list is designated as the Current_Leg and control loops back to Act 49.120 to repeat the process for the new Current_Leg. If not, control goes to Act 49.190.

In Act 49.190, a S_Series collection for the Desired_Segment is calculated from the P_Series collections of all the Legs using the combination and merging process. Next, in Act 49.200, an optimal Series_Element from the S_Series collection is determined using Optimal_Series_Element Rule (which is read from an airline database). An airline may select any rule of its choosing. Next, control goes to Act 49.210, where the optimal Series_Element is returned and the algorithm exits at Box 49.300.

'Upgrade_U' Algorithm

Figure 50:
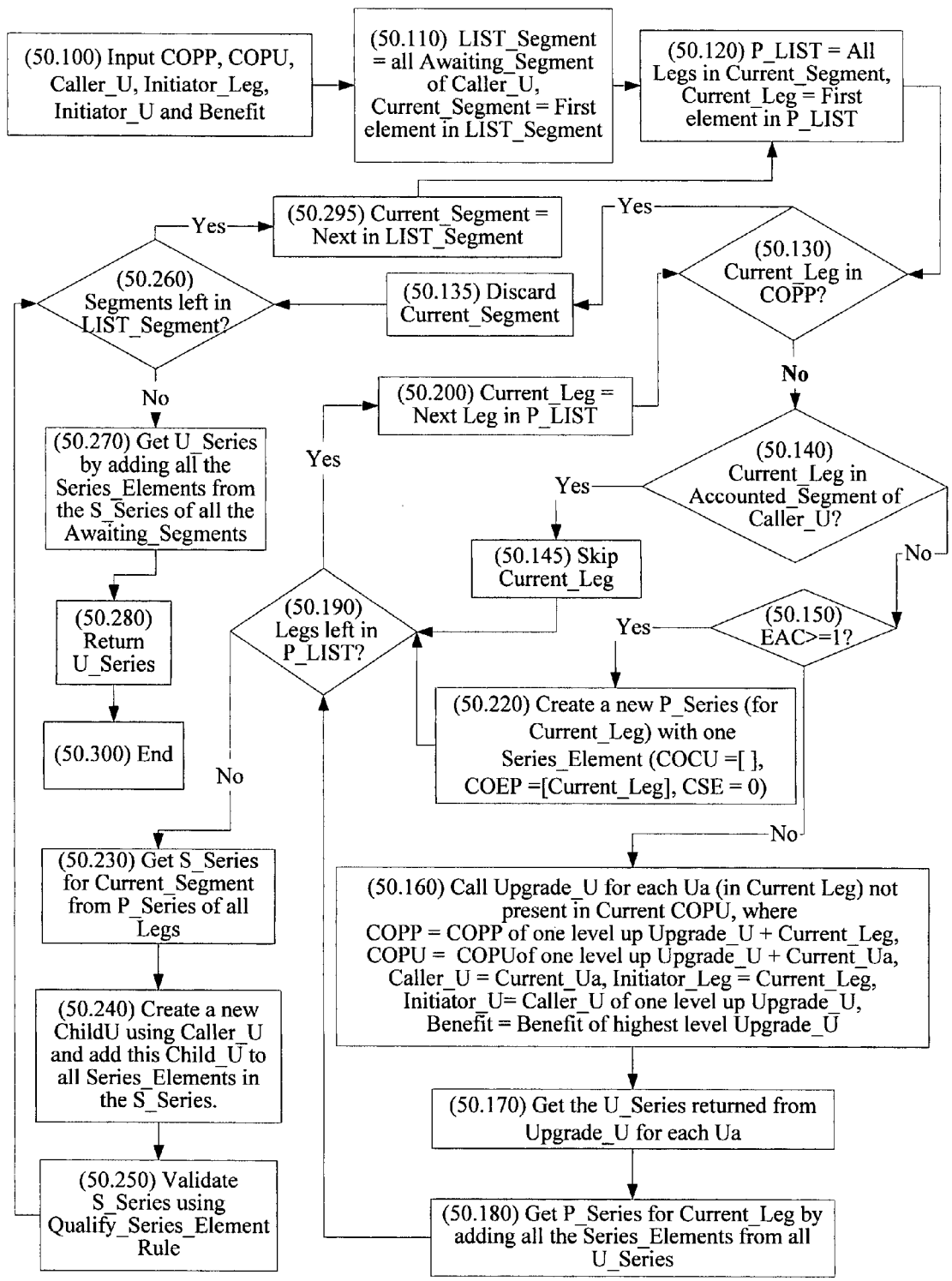
FIG. 50 is a flowchart that expands Act 150 of FIG. 49, provides an algorithmic illustration for the Upgrade_U algorithm.

The following algorithm presents an example of an algorithm that may be used to create one unit of capacity (seat) of a Flight by upgrading a Ua Accounted in a Flight to its Awaiting_Set. FIG. 50 represents an algorithmic illustration for Upgrade_U. The Upgrade_U is a recursive algorithm, which returns a collection of Series_Element termed "U_Series" collection for the Ua for which the algorithm has been called.

In Act 50.100, a set of parameters including COPU, COPP, Caller_U, Initiator_Leg, Initiator_U and Benefit are input to the system. Next, in Act 50.110, all the Awaiting_Segments of the Caller_U are added to a list termed LIST_Segment. The first element in the LIST_Segment list is designated as Current_Segment. Next, in Act 50.120, all the Legs that belong to the Current_Segment are added to another list termed P_LIST. The first element in the P_LIST list is designated as Current_Leg.

Next, in Act 50.130, a test is performed to determine whether the Current_Leg is present in the COPP. If so, the Current_Segment is discarded in Act 50.135, and control goes to Act 50.260. If not, control goes to Act 50.140.

In Act 50.140, another test is performed to determine whether the Current_Leg is present in the Accounted_Segment of the Caller_U. If so, the Current_Leg is skipped in Act 50.145, and control then goes to Act 50.190. If not, control goes to Act 50.150, where another test is performed to determine if the EAC of the Current_Leg is greater than or equal to 1. If so, control goes to Act 50.220. If not, control goes to Act 50.160.

In Act 50.220, a new P_Series collection is created with only one Series_Element, since the Current_Leg is an End_Leg. The Series_Element will comprise COEP with the Current_Leg as the only element, COCU with no elements and CSE with zero value. Next, control goes to Act 50.190.

In Act 50.160, the algorithm enters into a recursive loop where the Upgrade_U algorithm is called for each of the Ua in the Current_Leg that is not present in the COPU. Each of the Ua becomes Current_Ua for the corresponding Upgrade_U call. The necessary input parameters for each of the Upgrade_U includes 'COPP' (includes the COPP of one level up Upgrade_U and the Current_Leg), 'COPU' (includes the COPU of one level up Upgrade_U and the Current_Ua), the Current_Ua as 'Caller_U', the Current_Leg as 'Initiator_Leg', Caller_U of one level up Upgrade_U as 'Initiator_U' and benefit of the highest level Upgrade_U as 'Benefit'. Each of the Upgrade_U call returns a U_Series collection for every Ua for which Upgrade_U was called.

Next, in Act 50.170, the algorithm receives the returned U_Series collection from all the Upgrade_U algorithm calls in Act 50.160. Control then goes to Act 50.180, where a P_Series collection for the Current_Leg is calculated by adding all the Series_Elements from all the returned U_Series collection obtained in Act 50.170. Control then goes to Act 50.190.

In Act 50.190, a test is performed to determine whether more Legs are left in the P_LIST list. If so, control branches out to Act 50.200, where the next Leg in the P_LIST list is designated as the Current_Leg, and control then goes to Act 50.130 where the process is repeated for the new Current_Leg. If not, control goes to Act 50.230.

In Act 50.230, the S_Series collection is calculated for the Current_Segment by combining and merging all the P_Series collection of all the Legs (not taking the skipped Leg(s) into consideration, if any). Next, in Act 50.240, a new ChildU is created using the Caller_U. The ChildU comprises COI (where the current Initiator_Leg is designated as Initiator_Leg and the current Initiator_U is designated as Initiator_U), Accounted_Segment of the Caller_U designated as the Initial_Accounted_Segment, current Awaiting_Segment designated as the Final_Accounted_Segment, and the cost to upgrade current Caller_U from the Initial_Accounted_Segment to the Final_Accounted_Segment designated as the CCU. The ChildU, thus created, is added to every Series_Element in the S_Series collection and the CCU of the same ChildU is added to the CSE (Cost of Series_Element) of every Series_Element. Control then goes to Act 50.250.

In Act 50.250, a Qualify_Series_Element rule is read from the airline's database and is applied to validate all the Series_Elements in the S_Series collection. The invalid Series_Elements are discarded from the S_Series collection. An airline may select any rule of its choosing. For example, a Qualify_Series_Element rule may only qualify those Series_Elements for which the CSE is greater than or equal to the 'Benefit'. Next, control goes to Act 50.260.

In Act 50.260, a test is performed to determine whether more Segments are left in the LIST_Segment list. If so, control branches out to Act 50.295, where the next element in the LIST_Segment list is designated as the Current_Segment, and then control loops back to Act 50.120, where the process is repeated for the new Current_Segment. If not, control goes to Act 50.270, where the U_Series collection is obtained by adding all the Series_Elements of all the S_Series collections for all the Awaiting_Segments of the Caller_U. Next, the U_Series collection is returned in Act 50.280, and the algorithm ends in Box 50.300.

Combinations of P_Series in order to formulate S_Series are calculated by cross multiplication of Series_Elements (of each P_Series). An airline may choose to implement any method of its choosing to make combinations. One method is as follows. Consider n number of Series; say $S_1, S_2, S_3 \ldots S_n$, with k1, k2, k3 ... kn number of Series_Element respectively. Each Combination is a collection of the Series_Elements. For instance, $C1=\{S_1[1], S_2[1], S_3[1], \ldots S_n[1]\}$, where, $S_p[1]$ denotes the first Series_Element of $p^{th}$ Series; $C2=\{S_1[2], S_2[1], S_3[1], \ldots S_n[1]\}$, and so on. Here is an example of the above method. Consider 2 Series, A and B, where A=[A1, A2], i.e., with A1 and A2 as two Series_Elements; and where B=[B1, B2, B3], i.e., with B1, B2, B3 as three Series_Elements. If cross multiplication method is applied, then the total number of Combinations generated is 6 (=2*3) as follows, C1={A1, B1}, C2={A1, B2}, C3={A1, B3}, C4={A2, B1}, C5={A2, B2} and C6={A2, B3}. The above method of making combinations may also be used when making combinations of U_Series to formulate a P_Series.

Merging of a given number of Series_Elements is done in a sequential process, where two given Series_Elements are merged together in one Act to obtain a single merged Series_Element (let's say M), and then the merged element, M, is merged with the third given Series_Element to obtain a new merged element, and so on. The main objective of merging is to ensure that the Series_Elements created are valid and synchronized with each other with respect to capacity utilization of various legs involved. A given unit of flight capacity (seat) at any given point must only be accounted for one customer, otherwise, it may lead to a shortage situation, where one seat is allocated to more than one customer leading to dissatisfaction for customers. An airline may choose any method of its choosing to perform merging of Series_Elements, and specifically to perform merging of two Series_Elements. The method of merging chosen may affect the total value realized. One example of such a method is given. In one approach, an airline may choose to discard all merged Series_Elements that have either one or more common ChildU or common End_Leg. A common ChildU in two Series_Elements suggest that in both Series_Elements upgrading of one specific Ua is needed. If each Series_Element requires upgrading of Ua to two different Segments, it may present a contradictory situation. Similarly, a common End_Leg in two or more Series_Elements (that are to be merged together) may require to upgrade more than one Ua customer to a specific flight, which may or may not be feasible depending on the AC (and EAC) of that flight. Thus, a common End_Leg may also represent one or more contradictory or invalid situations.

An airline may use any set of rules to validate or invalidate one or more constituents of any of the merged components. For example, a merged Series_Element, M, obtained from merging of two Series_Elements S1 and S2, may comprise the COEP (addition of COEP of S1 and S2), COCU (addition of COCU of S1 and S2) and CSE (addition of CSE of S1 and S2).

Upgrade_U and Buy_N processes may generate value for the airline, an entity other than the airline, customers and/or any combination thereof. The value may include, but is not limited to cost savings for the airline, an entity other than said airline, any combination thereof. The value generated may also include, but is not limited to, soft value, value attributable to customer goodwill, satisfaction and loyalty. The value so generated may optimize revenue of at least one entity other than said airline.

Customer Notification Process

In the Customer Notification (CN) process, a decision for the Chosen Flight is notified to the customer. As mentioned earlier, the Chosen Flight may be defined by the airline, the customer, another entity or any combination thereof. However, the airline may want to keep the right to select (or define) the Chosen Flight in the UFO VOF. An airline may use any method of its choosing to define the Chosen Flight. An airline may use a software application built on the method defined above to optimally define the Chosen Flight to UFO customer.

Figure 51:
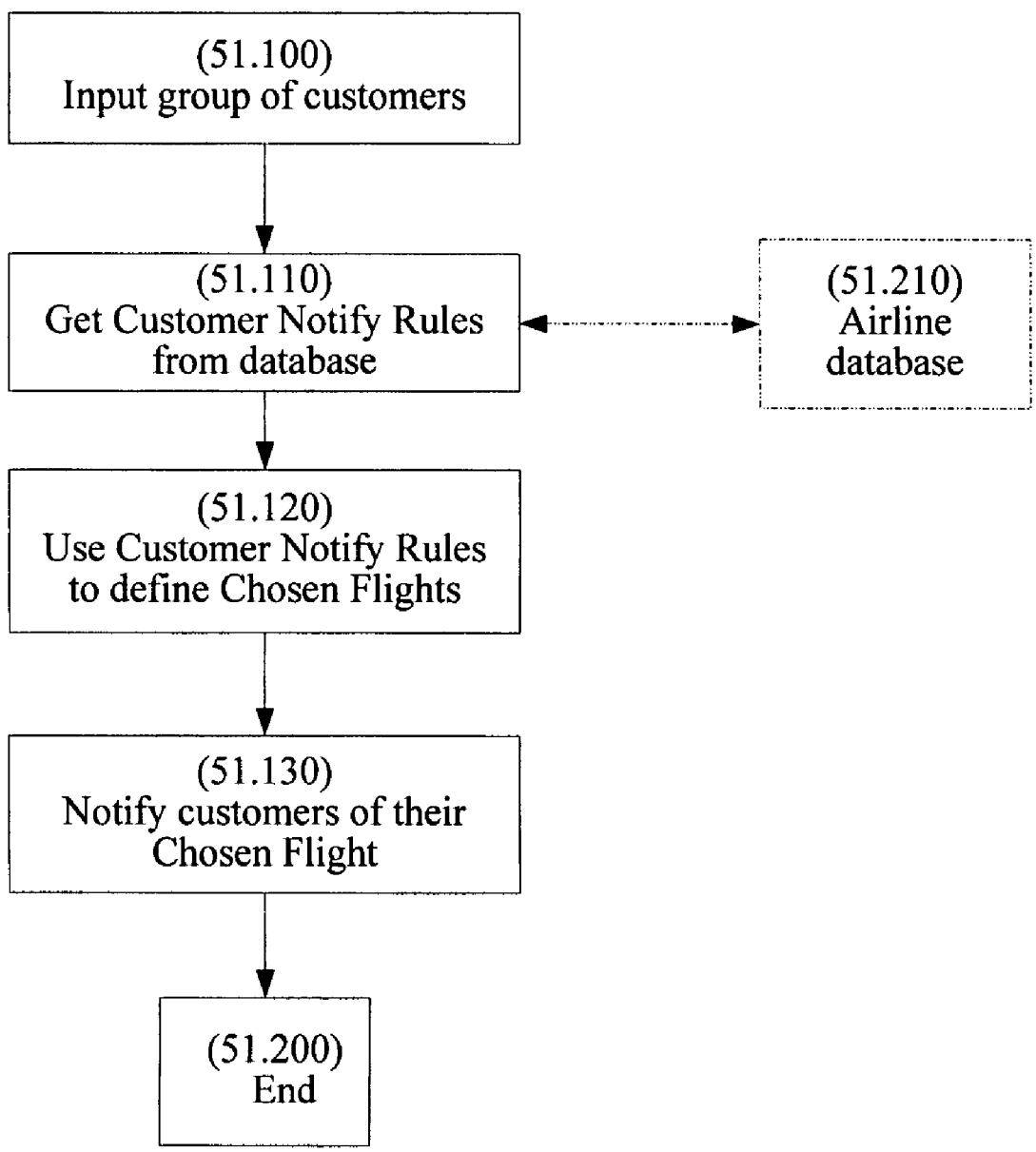
FIG. 51 is a flow chart illustrating an example of an algorithm of Customer Notification process in an airline industry.

FIG. 51 displays an example of an algorithm that may be used to execute the Customer Notification process. In Act 51.100, a group of (one or more) customers is taken as input. Next, in Act 51.110, a set of one or more Customer Notify Rules may be used to define the Chosen Flight. An airline may choose any Customer Notify Rule of its choosing. The Customer Notify Rules may depend upon expected value of the flight, expected sales volume and so forth. For example, the airline may choose a Customer Notify Rule which selects the flight with the higher value as the Chosen Flight. Alternatively, a rule may be chosen, which selects the flight with the lower value as the Chosen Flight. While defining the Chosen Flight, an airline may also want to use the Upgrade_U algorithm (as used in the Buy_N process given above) to determine the optimal Chosen Flight that satisfies a pre-determined goal. Thus, during the CN process, one or more Ua may be upgraded in the process of selecting the optimal Chosen Flight. A Customer Notify Rule may also select the flight with the higher sales volume as the Chosen Flight. A Customer Notify Rule may specify that if UFO VOF is used in conjunction with any other VOF (such as FRO VOF and so on), then the Grouping Rules (defined later) may govern the selection of the Chosen Flight.

Next, in Act 51.120, the Customer Notify Rules, thus obtained from the airline's database, are used to define Chosen Flight(s). Next, in Act 51.130, the customers are notified about their Chosen Flight(s), and the algorithm then ends in Box 51.200.

Non-Stop Flight Option (NFO) VOF in the Airline Industry

In one of the implementations of the UFO VOF structure discussed above in the airline industry, the customers may be upgraded from connecting flights (i.e., flights with one or more stoppages) to non-stop (i.e., zero connection or direct) flights and hence may be termed as Non-Stop Flight Option (NFO) VOF or Direct Flight Option (DFO) VOF.

Today, a customer may experience one or more hassles associated with the connecting flights including, but not limited to, layovers between the connecting flights (which may vary from few minutes to hours and in some cases even to days), increased probability for baggage loss and/or damage, baggage handling at connecting airports, increase in travel time due to connecting flights, hassle of check in with handbags at the stops before boarding each of the connecting flight, change of terminals, distance between the terminals of the two connecting flights, security check lines and so forth. For example, if the layover time is too short, it may lead to missing of connecting flight and if the layover time is too long, it may check passenger endurance limit to the extreme.

Aforesaid problems and hassles may many times lead to a preference for non-stop flights among the customers. But at times the price of non-stop flight may be quite high as compared to the Ticket Price of the segment with one or more connecting flights. All customers may not be able and/or willing to pay such high prices for the non-stop flights but there exists a customer segment, which may prefer non-stop flights and may be willing to pay somewhat extra for the non-stop flights. With the increase in the number of stops, there may be an increase in total travel time from few minutes to many hours. Generally, non-stop flights take less travel time than the flights with one or more stops. Hence, customers may prefer to avail the flight with less travel time. Non-stop flights may add value in terms of saving traveling time and/or one or more of the above mentioned hassles.

But the airlines cannot reduce the price of non-stop flights as it may lead to revenue dilution. However, today there is no framework that allows companies to do so in an optimal fashion such that both airline and the customer benefit at the same time. Hence, there exist a business opportunity for the airlines to capture and serve this market segment at appropriate price and/or terms. The marginal cost of upgrading a customer from connecting flight to non-stop flight may be far less than the revenue generated from that customer. It may be possible that in some cases, the marginal cost is negative, i.e., the airline saves on the cost of flying the additional customer on the non-stop flight as compared to connecting flight. It may be possible because the airline may be saving on marginal costs in more than one flight (since there may be more than one flight in connecting flights). Hence, NFO VOF structure may help an airline to generate revenues from the customer segment willing to pay more than the regular ticket price but is unwilling/cannot afford the high ticket price for non-stop flights.

Connecting flights may include, but not limited to, the flights with one or more connections, flights with one or more stoppages even though the flight number may or may not change and so forth.

During the Initial Transaction between the airline and the customer (who may or may not have purchased a flight segment with one or more connecting flights with a lower price than the non-stop flight), the customer may buy NFO to upgrade to the higher priced non-stop flight (with no connections). A payment transaction may or may not be executed at Initial Transaction. The airline may award the upgrade to the customer on or before the stated Notify Deadline as per the terms and conditions of the option contract and may charge the customer for the upgrade price.

NFO VOF structure may help an airline in optimizing across various airline parameters, including but not limited to, load factors, customer loyalty and satisfaction, baggage handling, dealing with over booking problem in the flights, airport congestion, airport security, staffing issues and so forth.

NFO VOF may be implemented in the similar fashion as UFO VOF described above. All the algorithms of the UFO VOF may be implemented in NFO VOF structure including, but not limited to, in segmenting the customers, generating award lists, combinations, in upgrading a customer and having a new customer in his/her place and so forth.

Consider an example with two flights F1 & F2 that vary in terms of number of connections. Customers may rank a flight higher if it has a lower number of connections (or no connections) in comparison to the other flight. Flight F1 may have two connections and Flight F2 has no connection. Ticket Price for F1 is $530 and that of Flight F2 is $900. There is a price difference of $370 between the F1 and F2. There may be a customer segment which may be willing to pay somewhat more than $530 (but not $900) for Flight F2, if given an option. The airline may optimize this opportunity and may sell Flight F2 as an NFO Flight to the desiring customers with a condition to notify the awarded customer by a stipulated Notify Deadline, if said customer is upgraded from F1 to F2. The airline may generate some revenue initially as well by charging some initial price to the customers. On or before the stipulated Notify Deadline, if the airline feels that it has surplus inventory of seats in Flight F2, it may upgrade some NFO Customers (who have purchased/selected/received the NFO option for Flight F2 and are booked in Flight F1) from F1 to F2. The airline may charge customers exercise price for such upgrade.

NFO VOF may also be considered as a part of the UFO VOF. The customers may assign higher preference to non-stop flights in comparison to connecting flights (with one or more stops). Said preferences may be used as value element "preference for higher ranked flights" as discussed in the UFO VOF.

Upgrade Ticket Option (UTO) Value Option Framework

As explained above, the UPO VOF may be implemented in any industry. The implementation of the UTO VOF in the airline industry is discussed here in. Within the airline industry, the customer preference for higher ranked cabins is used as the targeted value element. With respect to the selected value element (i.e., the customer need for higher ranked cabins) in the airline industry, the UPO VOF may be appropriately termed Upgrade Ticket Option (UTO) VOF. A detailed demonstration of UTO VOF is presented below.

The first stage in the UTO VOF involves steps (or acts) of: capturing customer dynamics, assessing airline operations and economic factors, integrating customer dynamics with airline economic factors, formulating the VOF and optimizing the VOF. The second stage involves carrying out a dynamic interaction with the customer and then executing an Event Optimizer process. The specific detailed steps with respect to the UTO VOF will now be discussed.

The terms "Up Cabin" or "Up Cabins" refer to one or more cabins that rank higher than the other cabins present in the same flight. The ranking here is assumed to be based on past customer preference. In the same context, the lower ranked cabin is referred to as the "Base-Cabin". The term "Base-Cabin" also refers to the cabin to which a customer is currently booked. And in that context, an "Up Cabin" refers to any higher ranked cabin to which the customer may theoretically be upgraded to. For example, in a flight with first, business and coach cabins, the first class and business cabins would be referred to as Up Cabins and coach as the Base-Cabin. The Base-Cabin for a coach customer is coach, and he/she may be upgraded to either of the two Up Cabins, first or business. The Base-Cabin for a business cabin customer is business and he/she may only be upgraded to one Up Cabin, the first cabin. For simplicity, the following sections assume a flight with only two cabins, first and coach, unless mentioned otherwise.

First Stage: Formulation of "UTO" Value Option Framework (1) Capturing Customer Dynamics In the airline industry, the flight offering comprises a complex framework of value elements. For some flight features, rankings may be presumed (or are implicit). For example, ranking for cabins (e.g., first or business cabin are ranked higher than the coach cabin), Ticket Price (e.g., lower prices are ranked higher than higher prices) and the number of connections (e.g., non-stop flights are ranked higher than connecting flights) may be presumed. There are other product features for which the ranking is subjective and may not be easy to presume such as seating type (aisle or window), meals (desired or not), flight selection (one flight versus another) and so forth. An airline may need to determine such rankings explicitly through interaction with various customers segments. As explained earlier, customers assign ranking to different cabin offerings. A customer may classify the cabin offerings into different groups (that may or may not be mutually exclusive) and assign a relative rank to each of them. For some cabin offerings, rankings may be implicit or well established or well known; for which an airline may be able to assume/determine customer ranking that would satisfy the majority, based on an analysis of past customer behavior or other forms of market analysis. For some cabin offerings, the ranking may be very subjective; and may differ from one customer to another, and even for the same customer, may differ from time to time. For such cabins, an airline may need to perform detailed interaction with customers to determine their ranking. In a customer's frame of mind, cabins with higher perceived utility (satisfaction) values are generally ranked higher than those with lower perceived utilities. Most customers would prefer to get a higher ranked cabin over a lower ranked cabin. When customers may not get their desired cabin(s) due to unavailability, price or any other reasons or any combination of the above, they have to settle down with something below their desired value.

Figure 54:
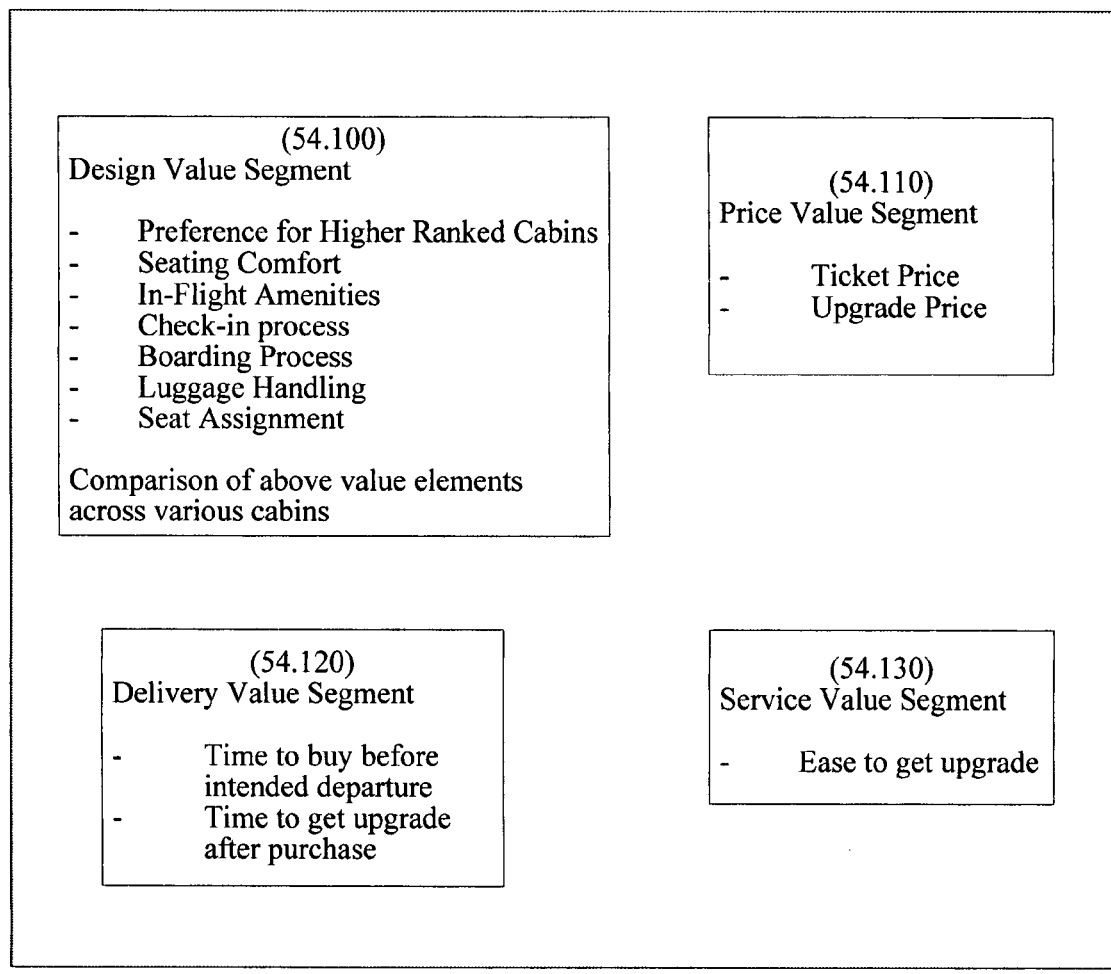
FIG. 54 is a diagrammatic illustration of an exemplary set of value segments and their value elements related to the UTO VOF in context of an airline industry.

FIG. 54 shows an analysis of the value elements that are believed to matter the most to customers in relation to a flight cabin upgrade. In the design value segment (shown in Box 54.100), important value elements may include, but are not limited to, customers' preference for higher ranked cabins, seat assignment, seating comfort and space, in-flight food and other amenities, special characteristics and/or features, if any, associated with the flights, priority check-in and boarding and special luggage handling. In the price value segment (shown in Box 54.110), important value elements may include, but are not limited to, Ticket Price and upgrade price. In the delivery value segment (shown in Box 54.120), important value elements may include, but are not limited to, time to request and get upgrade award, and how long before departure the ticket must be purchased for the customer to be entitled to an upgrade. In the service value segment (shown in Box 54.130) important value elements may include, but are not limited to, the ease of getting the upgrade. It may be important to estimate the relative preferences and utilities of these value elements to customers for various cabins.

(2) Assessment of Airline Economics

An assessment of the crucial economic factors for an airline, as indicated in Box 55.100, may reveal these factors to include, but not be limited to, the fixed and variable costs across various cabins, non-uniform distribution of demand across different cabins, higher price for higher ranked cabins, perishable inventory of seats, varying capacities of higher ranked cabins much more than the capacities in lower ranked cabins, possibility of revenue dilution, lost opportunity costs in offering free upgrades to customers through existing upgrade programs (if any) and so forth. The marginal costs of carrying an additional customer in different cabins, the number of unused seats after departure, increased competition from low cost carriers, the need to develop competitive advantages against low cost carriers, customer attrition rate, and commoditization of the airline industry. One may dig deeper into details for different cabins such as load factors, spoilage, seat availability, costs per customer mile, marginal costs per customer mile, lost opportunity costs in offering free upgrades to customers through existing upgrade programs, and so forth.

An assessment of the crucial economic factors, such as costs, constraints and capacities, may be performed, to determine the factors that affect the profitability, growth and goals of the airline. It might be beneficial if the airline utilizing the inventive system and method were able to express cost elements in a real-time or quasi-real-time (i.e., up to date) dynamic fashion so that such information may then be used to assess the profitability or contribution of each sale opportunity (at the cabin level), and to facilitate the operation of the Event Optimizer (so that offers and actions may be based on real-time or near-real-time information).

(3) Integration of Customer Dynamics with Airline Economic Factors

Figure 55:
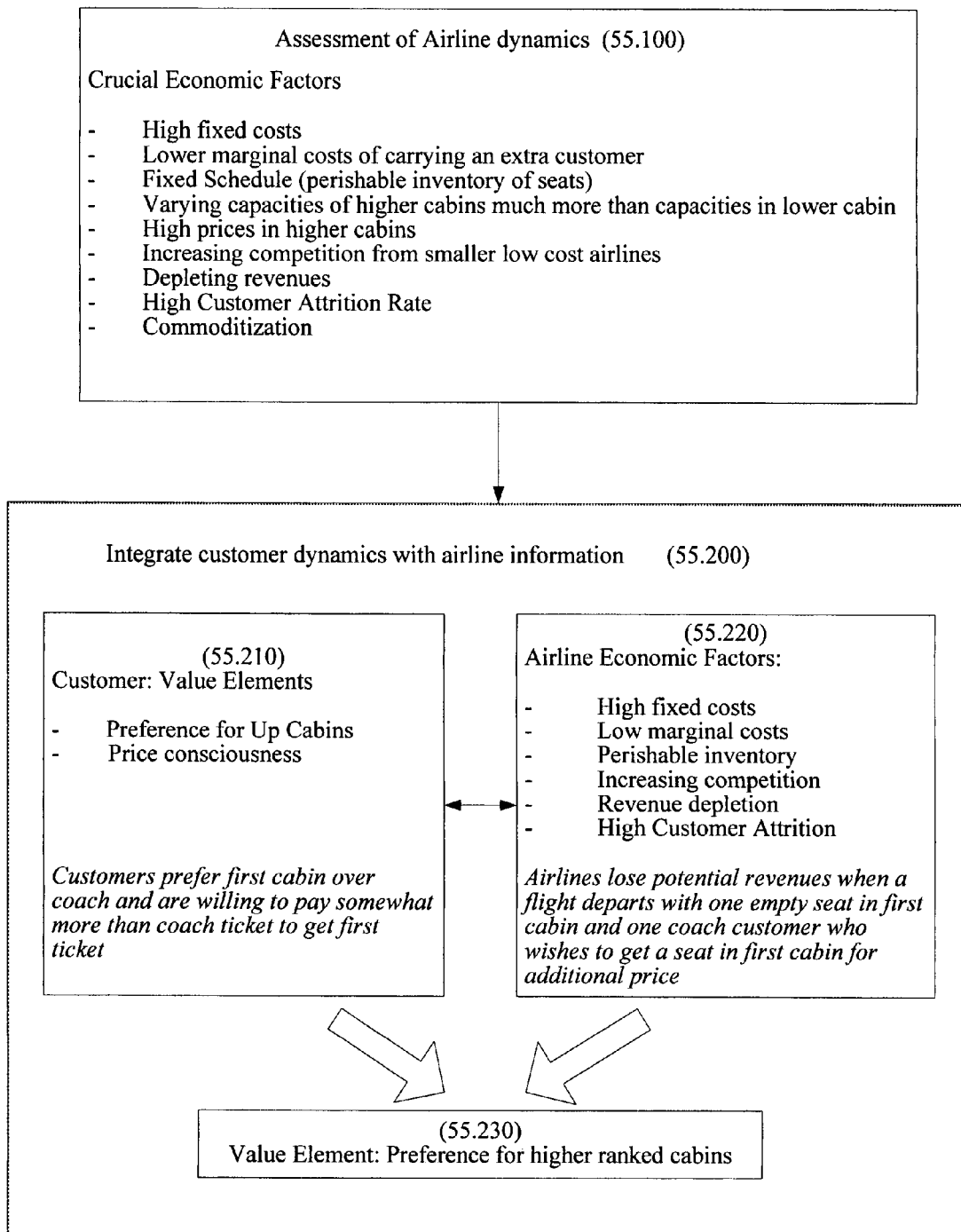
FIG. 55 is a diagrammatic illustration of airline economic factors and mapping between customer dynamics and airline economic factors in relation to UTO VOF.

FIG. 55 also illustrates an example of how a mapping may be done, between customer value elements and airline profiles, for the UTO VOF. On one side, there are customers who prefer first cabin to coach cabin or, in generic terms, there is a preference for a higher ranked cabin over a lower ranked cabin. However, customers are also concerned about the price differences between the higher ranked and the lower ranked cabins. All customers may not afford to buy confirmed higher ranked cabin seats at regular prices. However, many customers would be willing to pay more than their Ticket Price to get seats in the higher ranked cabins (such as first cabin). On the other side of the screen, if a flight takes off with one or more empty seats in the first cabin (or other higher ranked cabins), that condition probably represents the loss of potential revenue (and/or opportunity cost) for that airline. This is true even if no other potential customers have been turned away, simply because there may be one or more coach customers on the flight willing to take those unfilled first cabin seats at appropriate price/terms, but they are not given an opportunity to do so. It would be certainly very helpful for an airline to know the relative preferences of customers with respect to higher ranked cabins. However, today there is no framework that allows companies to do so in an optimal fashion such that both airline and the customer benefit at the same time. An opportunity, thus, exists to concurrently generate an incremental revenue benefit for the airline from consumer surplus, and to maximize the purchase utilities for the customers as a group (including those who have a preference for higher ranked cabins at appropriate prices). More specifically, as shown in the interaction between the Box 55.210 and Box 55.220, a mapping is performed between important customer value elements and airline economic factors. The value element "preference for higher ranked cabins" is extracted, as shown in Box 55.230, and the UTO framework is created.

(4) Formulation of UTO Value Option Framework in the Airline Industry

Structure of UTO VOF in the Airline Industry

Figure 56:
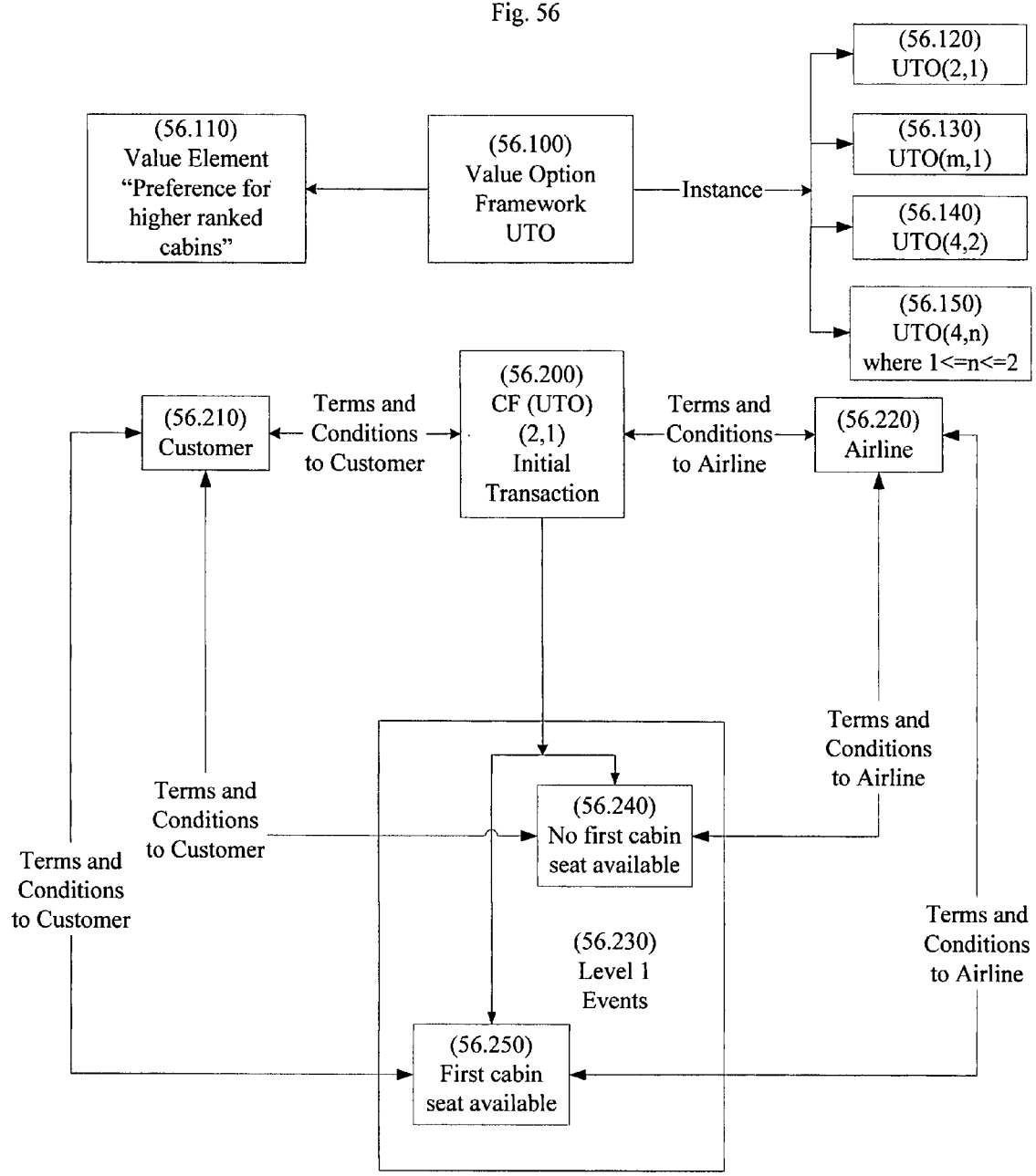
FIG. 56 is a partially-diagrammatic, partially-flow diagram representing the structure for creating a UTO Value Option Framework in context of an airline industry.

FIG. 56 displays the structure of UTO value option framework (shown in Box 56.100) in the airline industry. The UTO VOF is related to the value element "preference for higher ranked cabins", as shown in Box 56.110.

In the "Initial Transaction" UTO, shown by Box 56.200, a customer (shown by Box 56.210) and an airline (shown by Box 56.220) transact on the UTO value option. The first event in the UTO VOF is referred to as Initial Transaction, shown by Box 56.200, in which a customer (shown by Box 56.210) and an airline (shown by Box 56.220) transact on a UTO value option. There may be one or more Events (shown by Box 56.230) that follow Initial Transaction.

In the successful Initial Transaction for a UTO VOF between the airline and the customer, the customer may receive a conditional option for an upgrade and the airline may award the upgrade to the customer provided at least one condition on the option is satisfied and the airline receives the payment for said upgrade. The customer's acceptance of said option may confer upon the airline a right to enforce a payment obligation or relinquishment of one or more rights or both, as the case may be, on the customer, if said customer receives upgrade. A customer may select (purchase) one or more Base-Cabins and then select UTO option on one or more Up Cabins. An airline may award one or more Up Cabins from the selected UTO Cabins or from other cabins) or any combination thereof. The airline may or may not be the seller of said flight and/or said option. The total number of customers upgraded may be in one or more flights. Upgrade may also include an upgrade to a cabin in a different flight. Said upgrade may also be an upgrade to a non-stop flight or may confer upon the customer a right to utilize additional services while remaining in the same flight cabin which were originally not included in the rights conferred to the customer. Said upgrade may be a partial upgrade, wherein said upgrade may be for a portion of the duration of a flight. The partial upgrade may include flights from different airlines.

In another implementation of UTO VOF, during a successful Initial Transaction, a customer may receive an option to utilize up to 'n' out of 'm' selected cabins, where 'n' is less than or equal to 'm' (said 'm' cabins termed "UTO Cabins"). The 'n' cabins that are finally selected are termed "Chosen Cabins". After each of the n cabins is defined (or selected or chosen or received), the customer may have the right to utilize (or may utilize) said Chosen Cabin. Apart from the Chosen Cabins, the remaining cabins are termed "Released Cabins". The Released Cabins (if any, that were held or blocked for said customer) may be sold to other customers as normal flights or UTO Cabins or used for other purposes. The Released Cabins in relation to said option may be reused by the airline before, after, at or any combination thereof, the time the Released Cabins and/or Chosen Cabins are defined (or received or selected). The m UTO Cabins would contain all the selected Base-Cabins and Up Cabins, and the n Chosen Cabins would contain all the defined Base-Cabins and Up Cabins that the customer may utilize. Ideally, the customer may prefer to receive only Up Cabins in the defined n Chosen Cabins, since the customer would have higher utility for the Up Cabins, however, the Chosen Cabins may contain Up Cabins or Base Cabins or both. Released Cabins may be utilized to generate revenue with or without reusing said Released Cabin.

Numerically, the value of 'm' is greater than or equal to 2 and the value of 'n' may vary from '0' to 'm' depending upon the specific implementation of the UTO framework. The value of 'm' and/or 'n' may be known (or defined and/or re-defined) before, during, after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'm' and/or 'n' may be defined by the airline, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The delivery of an option may include, but not limited to, electronic delivery of the option, physical delivery of the option, any other mode of delivery or any combination thereof. Once said option is delivered, one or more of m cabins may be available for use by the airline, an entity other than the airline and/or any combination thereof. The value of 'n' may be defined before, after or any time, the option being delivered to the customer. The delivery of option may occur in relation to the customer purchasing one or more tickets for flights. The delivery of option may also occur in relation to the customer purchasing a ticket for a flight cabin other than the flight cabin on which the option may be delivered. Said n cabins may be defined in at least one transaction. The airline or an entity other than said airline or any combination thereof may upgrade the customer without any subsequent interaction after delivering the option. However, in different implementations, the airline (or an entity other than said airline or any combination thereof) may upgrade the customer after one or more subsequent interactions.

The airline and/or an entity other than the airline may provide a data store which may contain data representing, with respect to one or more flight cabins, one or more options offered by the airline and/or an entity other than the airline and may use a server to receive inputs for at least said option and may search the data store for eligibility of flight cabins for at least said option. The server may display the search results and may receive one or more decisions of the customer about the acceptance of one or more of said search results. The airline may operate an event optimizer system to receive data at least pertaining to said acceptance, and in response to the occurrence of one or more selected events from a set of one or more potential events, may execute one or more corresponding event response algorithms, wherein one or more of the servers or the event optimizer system may concurrently optimize a value for at least two of the airline, the customer and an entity other than the airline. Said search may include searching for one or more flight cabins or options based on said inputs. Said search may also identify results at least after taking into account business economics of at least the airline offering said flight or option. The search results may or may not include at least one option or flight. The search results may include a flight which may include an option and for which a price for the inclusion of said option is not separately identifiable within the total Ticket Price. The flight eligibility may be decided by the airline and/or an entity other than said airline. Data pertaining to at least one of demand, preferences and associated relative utilities of the customer may be defined, implicitly or explicitly, at least during the interaction, before the interaction or at any other time.

The UTO Cabins may be selected by the airline, the customer, another entity or any combination thereof. The UTO VOF may enable an airline to obtain preferences for Up Cabins from UTO customers (i.e., those who select UTO) and use said preferences to satisfy the travel needs of other customers and/or to optimize the value for airline, customers, another entity and/or any combination thereof. Therefore, the airline and/or another entity would usually have the right to select (or define) the Chosen Cabins. However, in different implementations of UTO VOF, the airline, the customer, another entity or any combination thereof may select one or more of the Chosen Cabins related to a UTO. The UTO Cabins and the Chosen Cabins may be selected by the same entity, different entities or any combination thereof. For example, the customer may select the UTO Cabins and the airline may select the Chosen Cabins out of the UTO Cabins. The airline may incorporate the customer information and the data related to the UTO into the sales, production, inventory, other database or information system or any combination of the above.

The option granted to the customer may conditional. One such condition (to upgrade) may be the seat availability in the Up Cabin associated with the option. It may be possible that the seat availability in the Up Cabin associated with the option is the only condition included in the UTO VOF. In one of the implementations of the UTO VOF, the condition for upgrade may include at least one condition in addition to the availability of an upgrade. If so, after receiving the UTO, a customer may receive a right to be upgraded if there is seat availability in the Up Cabin at a certain time and under certain conditions established as the terms and conditions of the option contract. The time when an Initial Transaction is completed (i.e., the customer receives a UTO) is referred to as the Initial Transaction Time (or ITT, in short). One or more Base-Cabins and Up Cabins may be selected, at one or more times, before, after, during, or any combination thereof, the Initial Transaction and/or the time said option is delivered to the customer (or the customer receives said option) or any combination thereof. All the UTO Cabins may be selected concurrently (i.e., all together in one transaction) or sequentially (i.e., in multiple transactions).

In the sequential case, a customer may select one or more cabins in one or more transactions before the Initial Transaction. Said selected cabin(s) (let's say X number of them), thus, may be considered as part of m UTO Cabins of the UTO (m, n) transaction, and the customer may select only the remaining (m−X) number of UTO Cabins during the Initial Transaction. All the transactions used to select (or receive) all the Base-Cabins of a UTO transaction may be related to each other, and hence, may be considered as "related transactions".

In a UTO VOF, the sequential process may comprise a number of "related transactions" when all the UTO Cabins are received one after another by paying/receiving a price in one or more transactions or acts. The price may include, but is not limited to, a monetary value, coupons, discount vouchers, other benefits such as loyalty program benefits, frequent flyer miles or any combination of the above. The transactions may be related due to a relationship during the Initial Transaction, one or more of the previously executed transactions, any other transaction or combination thereof. In another implementation, the airline and/or an entity other than said airline may not exercise its right of enforcing the payment obligation upon the customer.

The UTO VOF may also impose other conditions on the airline and/or the customer. For instance, the option may impose a payment obligation on the customer if the airline upgrades said customer. In another implementation, the option may impose a payment obligation on the customer to make a payment to the airline and/or an entity other than said airline at a time the airline delivers said option. The option may confer a right upon the airline and/or an entity other than said airline to enforce payment obligation on the customer. The airline may take a pre-authorization from the customer to charge the customer using any payment mechanism including, but not limited to, credit card, debit card, debit bank account, third party payment service provider, advance payment by the customer, any other means, or combination thereof. The airline may award the upgrade to the customer only if the airline receives a payment from the customer in relation to said upgrade. The customer may be required to pay one or more prices at one or more times to receive the option for the upgrade. The airline may award the upgrade to a selected group of customers based on any criteria of airline's choosing. For example, an airline may choose to give preference to its frequent flyer customers or high value customers over others. However, the airline and/or an entity other than said airline may or may not exercise its right of enforcing the payment obligation upon the customer. The customer may become entitled to the option to get an upgrade by making a payment, at least in part, when purchasing ticket for said flight.

The UTO VOF may also confer a right on the customer to enforce said upgrade provided at least one condition on said option is satisfied. For instance, an airline may offer UTOs with preference orders attached to it, i.e., if a customer purchases (or receives) a UTO with a preference order of 1, said customer shall have the right to be the first customer among others to be awarded the upgrade. In this fashion, a right is conferred upon the customer to enforce the airline to award the upgrade to the customer if a seat is available in the related Up Cabin at a certain time as per the terms and conditions of the option contract. The UTO VOF may also impose a condition on the airline to offer the Up Cabin to the customer and the customer may have the right to choose between the Base-Cabin and Up Cabin and subsequently notify the airline about the Chosen Cabin. A customer may or may not be under a mandatory condition to accept the Chosen Cabin as selected by the airline. The airline or the customer may have the right to enforce the Chosen Cabin on the other party as per the terms and conditions of the option contract.

In another implementation of UTO VOF, the option may require the customer to accept the upgrade offer. The upgrade may be an upgrade of at least one cabin. The customer may be upgraded to one or more than one Up Cabins. The customer may be upgraded, upon availability, to any of more than one Up Cabins. One available Up Cabin may lead to more than one upgrades. The customer may be presented a choice of conditional options to choose, prior to the airline and/or an entity other than the airline or any combination thereof, delivering at least one conditional option to the customer. The airline may present to a customer said option requiring the customer to indicate the price the customer will pay for the upgrade if offered.

An instance of the UTO VOF is illustrated in FIG. 56. The Box 56.200 illustrates an example of the Initial Transaction between the customer and an airline, where the airline offers the CF (UTO) value option to the customer. In a successful Initial Transaction for the CF option, a customer may be required to pay a price ($X) to receive said option for an upgrade from the cabin (Base-Cabin) to the first cabin (Up Cabin), and to agree to pay another amount ($Y) to the airline if the airline (then or later) upgrades the customer to the first cabin. An airline may choose to create one or more instances of the UTO VOF based on factors including, but not limited to, number of UTO Cabins, Up Cabins respectively or Released Cabins, pre-determination of a number of Up Cabins or Released Cabins, other factors or any combination thereof. For example, a UTO based on a combination of the number of UTO Cabins (or m) and Chosen Cabins (or n) would be UTO (m, n). Some or UTO instances are shown in Boxes 56.120, 56.130, 56.140 and 56.150. In the UTO (2, 1) instance, the customer selects two UTO Cabins and the airline may select any 'one' of those two cabins as the Chosen Cabin depending on whether upgrade is available or not. If the number of Chosen Cabins is pre-determined, the UTO (4, 2) instance may imply that the customer receives 4 UTO Cabins, on the condition that the airline may select any 2 out of 4 Cabins as Chosen Cabins. When the number of Chosen Cabins is not pre-determined, the UTO (4, 2) instance may imply that the customer receives 4 UTO Cabins, on the condition that the airline may select none, one or 2 Chosen Cabins out of UTO Cabins. There may also be a minimum limit on n. For example, the UTO (4, n) (where $1<=n<=2$) instance limits the airline to select either 1 or 2 Chosen Cabins out of the 4 UTO Cabins. As mentioned below in detail, such UTO VOF implementations may also have price conditions to the customer. For example, in a UTO (4, 2) implementation, a customer receives a UTO to receive two out of any four selected UTO Cabins, comprising two Base-Cabins, B1 and B2, and two Up Cabins, U1 and U2. The customer has made an Initial Payment of $1000. The airline may define any two cabins as Chosen Cabins out of the 4 cabins as per the terms and conditions of the option contract. In the event, U1 or U2 or both is (are) defined as the Chosen Cabin(s), the customer is required pay $50 or $100 or $200 as the UTO Exercise Price, respectively. If neither U1 or U2 (i.e. none of the Up Cabins)

is defined as Chosen Cabin, i.e., both the Base-Cabins (B1 and B2) are defined as the Chosen Cabins, then the customer is not required to make any payment to the airline. Under the terms and conditions of the option contract, if U1/U2 are available, then the airline may define U1 and/or U2 as the Chosen Cabin and thus, the customer is able to utilize the Up Cabin once the corresponding payment is made.

The Initial Transaction may have terms and conditions applicable to the customer, the airline, any other entity or any combination thereof. These terms and conditions may be set, preferably, to concurrently benefit at least two of the above said parties. The connections between Box 56.200 and 56.220, and Box 56.200 and 56.210 refer to the terms and conditions to the airline and the customer, respectively.

The UTO VOF may or may not include any constraints on the UTO Cabins. For example, an airline may restrict UTO applicability and availability on cabins that satisfy specific criteria. The two UTO Cabins may or may not include practically constrained cabins. Practical constraints may include one or more constraints that will prevent a customer to utilize a given cabin or prevent the customer from utilizing all the UTO Cabins and are applicable when the Up Cabin is in a flight other than the flight in which the customer has the Base-Cabin. Such constraints may include, but are not limited to, time constraints, location constraints and so forth. In other words, it may or may not be practically possible for a customer to utilize both the selected cabins due to at least one practical constraint. For example, one flight may be scheduled to be airborne when the other flight is scheduled to depart, thus not allowing any customer on the former flight to take upgrade on the latter flight, or the distance between the departure airports of the two flights may prevent customers from flying on one or more selected flights (that depart within hours of each other).

A customer may select (or receive) UTO Cabins in several ways; through mutual agreement (e.g., during a direct interaction such as a purchase for ticket for a flight), or the airline may grant the UTO Cabins to the customer without soliciting their interest or permission. For example, to enhance customer satisfaction or for any other purpose, an airline may grant UTO Cabins to customers based on the past customer behavior, interaction and so on.

The Initial Transaction may impose one or more conditions on the airline. An airline may be required to explicitly notify the customer prior to or no later than a given date and time (referred to as the Notify Deadline) regarding the Chosen Cabin. If there is no such explicit notification condition, the Chosen Cabin may be decided as per the terms and conditions of the option contract. In either case, (explicit or implicit notification), the date and time when the selection of the Chosen Cabin is notified to the customer is referred to as the Customer Notification Time (or CNT, in short). In the current discussion, the explicit notification condition is assumed unless specifically mentioned otherwise. The Notify Deadline may be pre-determined or may be determined later (i.e., after the Initial Transaction) by the airline, the customer, any other entity, or any combination thereof.

An airline may determine one or more Notify Deadlines for a cabin at one or more times (e.g., before, during, after the Initial Transaction or any combination thereof) using factors including, but not limited to, customer needs, expected value of the seat, airline profitability goals, any other factors or any combination of the above. Customer factors should also be considered in determining the Notify Deadlines, such as the upgrade periods desired by customers, or any other factor that may affect the behavior of a customer.

The Notify Deadline may be pre-determined or may be determined later (i.e., after UTO grant) by the airline, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be offered if the customer is notified anytime before the first Notify Deadline. The price associated to the second Notify Deadline (i.e., the second earliest among the Notify Deadlines) may be offered if the customer is notified after the first Notify Deadline and before the second Notify Deadline.

The terms and conditions of the UTO VOF may not allow the airline to notify the customer after the last Notify Deadline (i.e., the latest among the Notify Deadlines). In another implementation of the UTO VOF, flexibility may also be provided to the customer to notify the airline about the Chosen Cabin up to a stipulated Notify Deadline, once the airline has offered the Up Cabin to the customer. As an operational measure, a rule may be set that if the airline fails to notify the customer before the last Notify Deadline, the Base-Cabin becomes the Chosen Cabin and no upgrade is provided to the customer. Another approach may be set that if the customer fails to notify the airline about the Chosen Cabin once the upgrade has been offered to him/her by the airline, one or more of the Base-Cabins, Up Cabins and/or any combination thereof may be considered as the Chosen Cabin. The airline may select Up Cabin as the Chosen Cabin and may charge Exercise Price and/or any other price to the customer. In another implementation, the airline may select the Base-Cabin as the Chosen Cabin and a price may or may not be charged. Any entity (e.g., the airline or the customer) may (or may not) be allowed to change the Default Cabin once it is selected. The UTO Exercise Price (if any) in the default case may or may not be equal to the UTO Exercise Price for the Default Cabin for the last Notify Deadline. In the current discussion, a single Notify Deadline is assumed.

The customer may be required to pay one or more prices during the Initial Transaction (and/or to receive a UTO, referred to as an Initial Price), at the CNT (and/or the time the customer is upgraded, referred to as an Exercise Price) and/or at any other time, which may or may not be pre-determined between the customer and the airline. The UTO Price may be a pre-agreed fixed amount or it may be variable with or without bounds and set later or any combination of the above. There may or may not be any payment transaction related to the Initial Transaction. There may be one or more additional price conditions included in the UTO VOF. The initial price and/or the exercise price may or may not be uniform for all UTOs designed and/or offered to the customers; an airline may choose any combination of uniform and/or non uniform prices for the initial and/or exercise price. The airline may offer the customer a set of prices to choose from. Since price conditions may depend upon various factors, which may or may not be variable, the same may be decided at anytime. The price conditions may be determined by the customer, the airline, another entity, or any combination thereof at one or more times. One or more prices (UTO Initial or UTO Exercise or any other price) may be a negative value, which reflects that instead of the customer paying the airline, the airline shall pay a price to the customer to get the desired cabin as the Chosen Cabin.

One or more of the UTO prices may be embedded with the Ticket Price. A customer may be presumed to accept the UTO offer while displaying the embedded Ticket Price. These presumptions may (or may not) include soliciting prior interest of the customer regarding the UTO offer. In the case that the UTO Price is merged with the Ticket Price, and where such price may or may not be separately identifiable, the customer may or may not receive a separate price for UTO. The Ticket Price may include a price for an upgrade, which may not be separately identified within the total Ticket Price. The UTO Price(s) may or may not be embedded within the Ticket Price. The customer may make the payment directly or indirectly (e.g., through a third party) to the airline in relation to said upgrade.

The price may comprise a monetary value or a soft/non-monetary value (e.g., coupons, discount vouchers, other benefits such as loyalty program benefits, frequent flyer miles, exchange of another service) or other consideration or any combination of the above.

A price may include, but is not limited to, a set of one or more Ticket Prices, a set of one or more UTO Prices (initial and/or exercise) or any combination of the above. An airline may choose to implement UTO Prices in many ways. An airline may use the method of its choosing to decide on the Ticket Prices of all the flights. The UTO Price (Initial, Exercise, and/or any other price, or any combination thereof) may be a function of number of UTO Cabins and/or Chosen Cabins, specific cabins to be granted for UTO Cabins, Up Cabins and/or Chosen Cabins, Notify Deadline, one or more Ticket Prices, any other factors of airline's choosing or any combination of the above. Various option pricing strategies may be employed. For example, in a fixed price strategy, a user may be shown only one fixed price for the option. If the user purchases the option at a price much lower than his/her maximum price, the potential benefit for the airline is less than what could have been achieved.

The above said pricing strategy limitation may be removed when a bidding process is used. Bidding may help to determine the highest price a user is willing to spend for the upgrade. In bidding, while buying the UTO Option, the user may provide his/her highest offer for the final price. At the time of upgrade, if available, the airline may charge the lowest price (less than the highest offer price selected by the user) that delivers the upgrade to the user. If even the highest offer price chosen by the user is lower than the minimum price needed to get the upgrade, then the user is not awarded the upgrade. The highest offer may be input free form or the airline may provide a few choices from which the user may select one. The airline may also ask, or determine empirically, how much customers will pay for the option. The assumption here is that customers make a logical decision to choose the Up Cabin and may afford to pay the sum of the initial and the exercise prices (if any).

The customer may or may not have to pay during the Initial Transaction. Initial Price may be subsequently returned to the customer, if the upgrade to the Up Cabin is not awarded to the customer. At the time of upgrade, Exercise Price may also be adjusted with the Initial Price paid by the customer. The airline and/or another entity may issue a UTO Pass for the customers in order to facilitate another payment mechanism. The payment for the ticket and/or the option may be made using the UTO Pass. It may be possible while purchasing a set of one or more UTOs or a UTO Pass, there may be one or more conditions (e.g., such as time based or value based UTO Pass) that limit the applicability of the UTOs. A time based UTO Pass may allow a customer to only be upgraded to the flights that fall within a specified time period. A value based UTO Pass may allow a customer to get upgrades until the sum of the total payment needed for all the upgrades is less than or equal to the value of the UTO Pass. The airline and/or another entity may create various types of UTO Pass. Hence, a customer may purchase a set of conditional options which may be intended to be utilized for future needs.

The payment transaction may include, but not limited to, direct payment received by the airline from the customer, in lieu of relinquishment of one or more rights by the customer, indirect revenue generation (e.g., the customer relinquishes his/her right or accepts a lower limit on the baggage to allow the airline to sell the preserved cargo capacity for other revenues or other purposes)), costs savings obtained (e.g., the customer relinquishes his/her right to meals which saves costs for the airline), enhanced customer service and loyalty and so forth. One or more rights which the customer may relinquish may or may not be related to the rights conferred by the flight. Apart from relinquishment of one or more rights by the customer, the UTO VOF may have a condition to make additional payment to the airline and/or an entity other than the airline. The airline may present various rights and may require the customers to pick a specified number of rights, thereby relinquishing other rights and in lieu of the relinquished rights, the customer may receive a conditional option for an upgrade.

Once the Initial Transaction is successful, there may be at least one related event. Each said event may be associated with various terms and conditions on the customer and/or the airline. The airline and/or the customers may have the right to enforce the Chosen Cabin(s) on the other party as per the terms and conditions of the option contract.

The terms and conditions of the option contract may be binding on the airline and the customer only if the customer successfully accepts the airline's offer of the option for the upgrade. The customer may be given a choice of options to choose from and take a decision.

In one of implementations of the UTO VOF, the airline may implement negative UTO, i.e., instead of upgrading the customer to an Up Cabin, the airline may downgrade the customer to a lower ranked cabin. The airline may implement such negative upgrade in one or more situations. In one of its implementations, the airline may implement negative upgrade (downgrade) when there may be huge demand for Up Cabins at very high prices so that the airline may downgrade the customer who may have already bought the Up Cabin at relatively lower prices and may be willing to accept the lower ranked cabin in lieu of some or more rewards. In yet another instance of implementation of the negative upgrade, the airline may implement it in the event when there may be huge demand for lower ranked cabin. The airline may offer the Up Cabin to the customer and may give an option to downgrade to lower ranked cabin in future in case one becomes available. The airline may offer discounts on higher ranked cabins, may offer to return the difference between the lower ranked cabin and higher ranked cabin, may offer additional reward to the customer and so forth. Hence, the airline may be able to retain the customer (and not to lose him/her to the competitor) even in the event that the customer desiring a lower ranked cabin and the capacity of which may be exhausted with the airline. The airline may also be successful in this case in creating a flexible pool of customer inventory.

In one of the implementations of the UTO VOF, the terms and conditions of the UTO VOF may require the customer to purchase (or pay price for reserving) both the lower ranked and higher ranked cabins with a condition to cancel/return either of the two cabins as per the terms and conditions of the option contract. For example, a customer reserves a higher ranked cabin for $700 (when its actual price is $1500) and a lower ranked cabin for $550 (when the actual price is $555) with a condition to cancel reservation for at least one of the cabins. Hence, the customer has paid $1250 for reserving both the cabins with a condition to cancel the reservation for at least one of them. The terms and conditions of the option contract may provide different cancellation charges in different situations. Now, if the higher ranked cabin is not available, the terms and conditions of the option contract provides cancellation charges for higher ranked cabin as $10 where as the same for lower ranked cabin are $1000. So, logically the customer will cancel the higher ranked cabin and in this case he/she would be refunded $690 and hence the net amount paid by the customer for getting the lower cabin would be $560 ($1250 minus $690) which may be equal to the Ticket Price of the cabin ($555) plus Initial UTO Price ($5). In this case, the customer has not received the upgrade. Now, consider another case when the higher ranked cabin is available. The terms and conditions of the option contract provide cancellation charges in this case for higher ranked cabin as $1500 where as there is no cancellation charges for cancelling the lower ranked cabin. So, logically the customer will cancel the lower ranked cabin and hence he/she would be refunded $550. So, the net amount paid by the customer for getting the upgrade (i.e., the higher ranked cabin) is $700 ($1250 minus $550) instead of paying the full price (of $1500) for getting the higher ranked cabin. The assumption here is that customers make a logical decision to choose which cabin to cancel.

The costs, revenues, benefits and conditions shown here are for illustration purposes only and actual values could be different depending on specific values selected by the users for value options, customer behavior, any factors of airline schedule, pricing, any other factor or any combination of the above.

A UTO VOF may include a right for an airline to upgrade the customer to an Up Cabin before a stated Notify Deadline. The right may include the condition that the airline may notify the customer before, at or after the stated Notify Deadline or any combination thereof. To provide flexibility to the customers, the airline may offer (or allow) the customer to finally choose the Chosen Cabin once the airline notifies the customer about the availability of the Up Cabin.

After the Initial Transaction, i.e., once the option has been granted (and/or sold) to a customer, there may be one or more potential events related to the associated UTO option. For example, as shown by the Box 56.230, there are two related events for the CF (UTO) option, namely, 1) the flight has availability in the first cabin (Up Cabin) for at least one seat (shown in Box 56.250) and 2) the flight has no seat availability in the first cabin (Up Cabin), as shown in Box 56.240.

There may be Level 2 or higher level events associated with the UTO option. If one or more Up Cabins are not given to the customers due to unavailability of Up Cabins in Level 1 events, the customer may be given one or more Up Cabins if said Up Cabins are available in Level 2 or higher events related to the UTO option, later on. It may also be possible that even when one or more Up Cabins are available in Level 1 event which may or may not be given to the customer in Level 1 event, still later on, in Level 2 or higher events, if one or more Up Cabins are available, said one or more Up Cabins may be offered (given) to the customers. Said one or more Up Cabins may be given by the airline, another entity and/or by both. The Up Cabins given in Level 2 or higher events may be given in exchange of one or more previously given Up Cabins or in addition to the earlier given Up Cabin(s).

If the event in the Box 56.250 happens, then as many customers as had selected the CF (UTO) option are automatically upgraded to the Up Cabin, within the terms and conditions of the CF option contract. There may, of course, have been more customers who had purchased upgrade options than the number of Up Cabin seats available to be used as upgrades. In this situation, the airline may use any algorithm it desires in order to allocate the Up Cabin seats. For example, the customers may have been given the ability, while buying the option, to specify the maximum amount the customer is willing to pay to exercise the option. Then the airline would probably choose to allocate all the available Up Cabin seats so as to maximize its revenue. If there are more sold options of equal value than Up Cabin seats that are available, the airline may use any method it chooses to allocate the upgrades, such as assigning priority based on time of purchase, Ticket Price paid by the customer, random selection or any other customer priority factors like frequent flyer miles etc. The airline may also award cabin upgrade to a customer in the same flight in which he/she is traveling or may give an option to get an option to get an upgrade in more than one flight or the airline may upgrade the customer to some other flight as well. An airline may choose to bump one or more customers from one or more flights in order to create availability to award one or more upgrades to UTO customers.

The airline may inform the customer of the decision related to the upgrade award via any communication channel including, but not limited to, a re-issued ticket sent over email, an email, phone, in-person at an airline counter, or may ask the customer to contact the airline to know the decision.

Using UTO, an airline gets to know the relative preferences and utilities for travel in the first cabin (higher ranked cabin) over the coach cabin (lower ranked cabin) as some customers purchase this option and others don't. This may lead to an enhanced revenue benefit for the airline as well as higher travel utility to the customer. There may be some increase in costs for the airline (for example, to carry the customer in the first cabin versus the coach cabin), but generally, the additional revenue generated would be more than sufficient to account for the additional upgrade costs (if any). The airline may better optimize its seat availability in the first cabin and may possibly be able to intake additional customers in coach cabin due to the additional seats created in coach (after a coach customer is upgraded to the first cabin). An airline may estimate the total number of expected upgrades and using the same, may estimate the number of vacated seats (due to potential upgrades) in the coach cabin (or other lower ranked cabins). Using this estimate, an airline may be able to add back these seats to the airline inventory to be used for potential sales and/or other purposes.

The airline and/or another entity may define customer preferences regarding one or more Cabin upgrades and may use said preferences to upgrade one or more customers and may optimize value for at least one of customers, airline and an entity other than the airline. Said preferences may be used to assign ranking between two or more cabins. The ranking may be explicit and/or implicit and may be expressed/determined by the customer, the airline or an entity other than the airline or any combination thereof. The ranking may already be established or well known. The airline and/or an entity other than the airline, may establish, in advance of making the upgrade award, a ranking of attributes applicable to the cabin and may define upgrade possibilities. In another implementation of the UTO VOF, the airline may establish, in advance of delivering the option, a list of attributes applicable to the cabin and associate therewith rankings expressed by the customer.

FIG. 57 provides details on four typical instances of UTO, namely, CB, CF, BF and CBF, that an airline may create in the event there are three cabins (coach (C), business (B) and first (F)) in a flight. A sold UTO may be defined by four parameters such as in the notation MN (I, F), where, M is the Base-Cabin (the current cabin of the customer when the option is purchased), N is the Up Cabin to which the owner of the option may be upgraded, I is the initial price paid by the owner to buy the option, and F is the exercise price which will be paid by the owner if and when upgraded.

A customer booked in the coach cabin may purchase a CF or "coach to first" option to get an upgrade to the first cabin if one becomes available. Similarly, a CB or "coach to business" option may be purchased by a customer with a coach ticket to get a potential upgrade to the business cabin if one becomes available. Likewise, a CBF or a "coach to business or first" option may be made available to a customer who purchased a coach ticket, for a potential upgrade to either the business or the first cabin, depending on availability. A BF or "business to first" UTO may be made available to a customer with a ticket for the business cabin, for potential upgrade to the first cabin seat if one becomes available.

When a flight has only two cabins, (coach and first), there may be only one instance of UTO, namely, CF. Obviously, the number of cabins within a flight affects the total number of UTO instances. The number of UTO instances typically increases with an increase in the number of cabins within a flight. The number of instances does not have to be equal to the number of cabins, of course. An airline may create additional factors that could increase or decrease the number of product levels and, thus, option instances. Some examples are given below such as to divide a cabin into sections with different legroom or meal service. Other amenities/services might be the basis for another arrangement of UTOs. An airline may choose to create one or more instances of a UTO VOF based on factors including, but not limited to, number of cabins, customer needs, customer ranking across various cabins and/or products, in-flight amenities, other amenities or products offered or any other factors.

An airline may choose any set of criteria to create different levels of its product offerings. An airline may choose to subdivide a physically distinct cabin into two or more sections, where each section may act as a separate product level or referred to as an individual 'cabin' with a different level of service and utility to customers. For example, some airlines divide coach cabins into two sections that offer different legroom to customers. The coach section with greater legroom (C1) may be priced higher than the section with the smaller legroom (C2). This creates a difference in the utility provided by the two sections to customers. Another example is to subdivide an Up Cabin (for example the business cabin) into two sections, B1 and B2 that provides different meal services, (e.g., B1 has a meal service, whereas B2 does not). Such divisions may enhance the number of product levels. For example, using the above two examples, a flight with three physically distinct cabins (e.g., coach (C), business (B) and first (F)) will have 5 levels of cabins/products to sell (C1, C2, B1, B2 and F).

The costs, revenues, benefits and conditions shown here are for illustration purposes only and actual values could be different depending on specific values selected by the users for value options, customer behavior, airline schedule, pricing, any other factor or any combination of the above.

UTO Types Creator Algorithm (to Create UTO Types or Instances)

The UTO Types creator algorithm has been explained in detail in the UPO VOF. The implementation of UTO Types Creator Algorithm in the context of the airline industry has been explained through an example given below.

Figure 58:
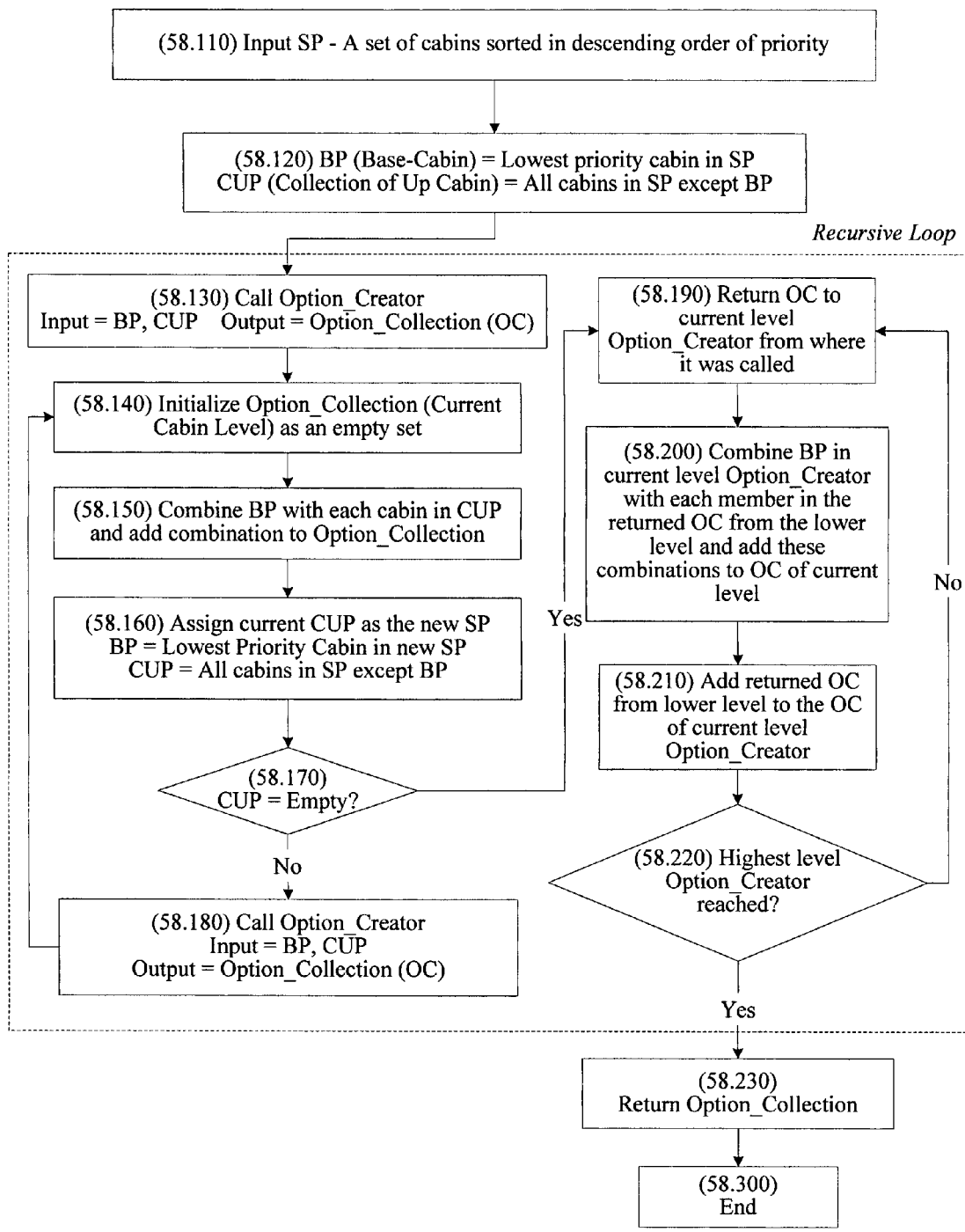
FIG. 58 is a flowchart of an algorithm to create UTO options for a given number of entities.

The algorithm of FIG. 58 may be used to create UTO instances in the airline industry, as follows. Consider an airline flight with 4 cabins, namely, A, B, C and D. The priority order among the cabins is A>B>C>D, where the cabin A has the highest rank and the cabin D has the lowest rank.

As in Act 58.110, a Set of Cabins is input to form the SP, with cabins sorted according to the descending order of priority, A>B>C>D. Per Act 58.120, the BP is set to D and the CUP is set to comprise cabins C, B and A. Per Act 58.130, Option_Creator (D, [C, B, A]) is called, the notation (D, [C, B, A]) indicating D is input as the BP and the CUP is input as the set [C, B, A].

Next, per Act 58.140, the OC of the current level is initialized as an empty set. Then, a combination is formed of each Up Cabin in the CUP set [C, B, A] with Base-Cabin D and these combinations are added to the Option_Collection to form OC [DC, DB, DA], per Act 58.150. The current CUP set [C, B, A] is assigned as the new SP and the lowest cabin in the new SP, i.e., C, is the new BP, per Act 58.160.

Per Act 58.170, a test is performed to determine if the CUP set is empty. It is not, so the process continues for a new (lower) level where Option_Creator (C, [B,A]) is called and executed. This is followed by another (lower) level where the Option_Creator (B, [A]) is called and executed. The Acts 58.140 to 58.180 are repeated in a loop until the CUP set is empty. In this case, that happens with A as the BP. Then the Option_Collection [BA] is returned at that point, per Act 58.190.

At this point, control is at Act 58.200, where C, the BP of the current level Option_Creator (C, [B, A]) is combined with each member of the returned OC[BA] from the lower level and the result [CBA] is added to the OC[CB, CA] of the current level.

OC=[CB, CA]+[CAB]=[CB, CA, CBA]

Control goes to Act 58.210, where the returned OC[BA] is added to the OC of the current level.

OC=[CB, CA, CBA]+[BA]=[BA, CB, CA, CBA]

Next, per Act 58.220, a test is performed to determine if the current level is the highest level for Option_Creator. It is not at this point, so control now goes back to Act 58.190, where the current OC is returned to the next higher level of Option_Creator (D, (C, B, A]). Next, the Acts 58.200 and 58.210 are repeated again for Option_Creator (D, (C, B, A]). Per Act 58.200, D (the current BP) is combined with each member of the returned OC[BA, CB, CA, CBA] from the lower level and these combinations [DCB, DCA, DBA, DCBA] are added to the OC of current level.

OC=[DC, DB, DA]+[DCB, DCA, DBA, DCBA]=
[DC, DB, DA, DCB, DCA, DBA, DCBA].

Per Act_58.210, the returned OC[BA, CB, CA, CBA] from lower level is added to the OC of current level.

OC=[DC, DB, DA, DCB, DCA, DBA, DCBA]+[BA, CB, CA, CBA]=[DC, DB, DA, BA, CB, CA, CBA, DCB, DCA, DBA, DCBA]

Next, per Act 58.220, a test is performed to determine if the current level is the highest level for Option_Creator. The current level is the highest level at this point, so at this point, control goes to Act 58.230, where the current OC is returned as the final output, and then the algorithm ends in Box 58.300.

(5) Optimization of UTO VOF

As mentioned earlier (shown in FIG. 7), in the form of an optional last step in the first stage, a financial analysis may be performed on the UTO VOF using the existing airline and customer data to determine the optimal terms and conditions of the UTO VOF. 'What-if' scenarios may be executed to determine the optimal pricing strategy. The airline may want to divide its customers into one or more customer segments, and design UTO VOFs separately for each customer segments.

Second Stage: Using the UTO Value Option Framework

Figure 59:
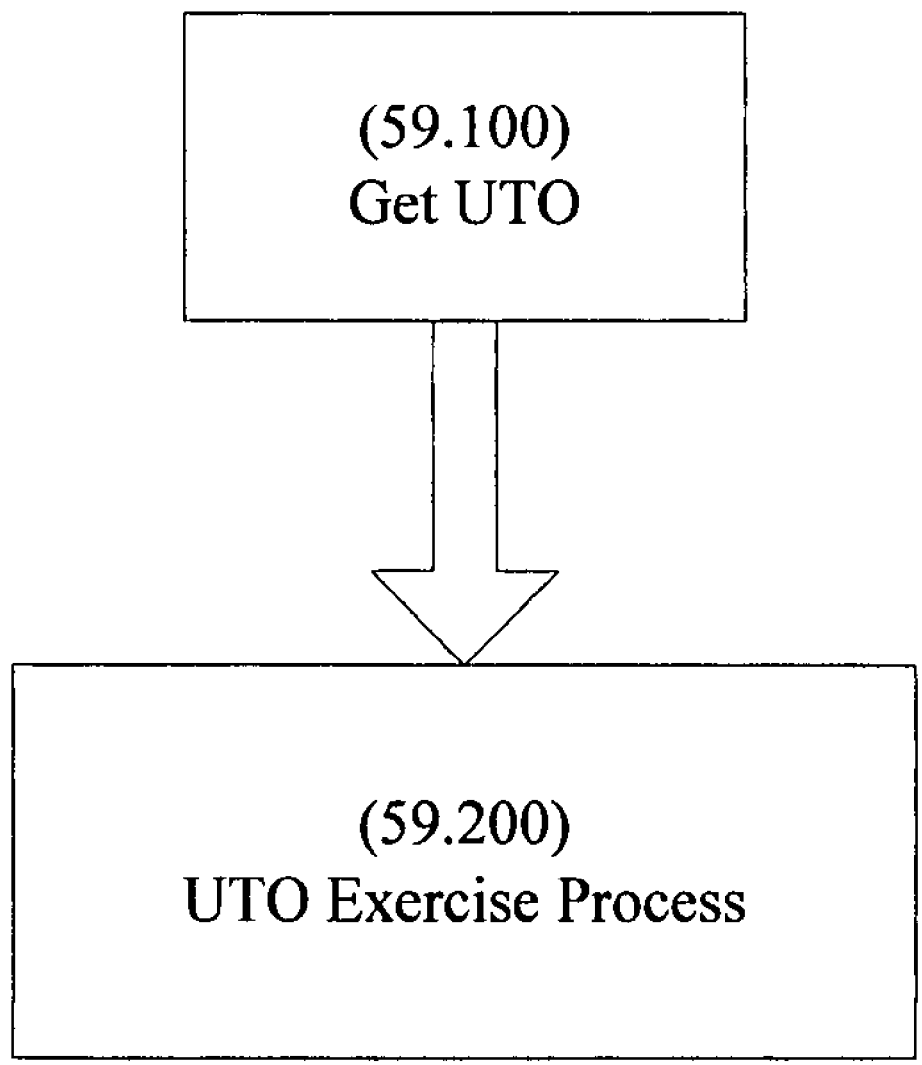
FIG. 59 is a diagrammatic illustration, in a high level flowchart, of a process for UTO VOF implementation in an airline industry.

After completing the first stage of the method, the airline has created a UTO framework and specific value options within that framework. The airline has also segmented customers. The airline is fully prepared now to use a structured format comprising UTO value options to interact with its customers in real time to generate benefits for both customer and airline. The second stage of UTO VOF is now presented. The implementation of the UTO VOF between the customer and the airline takes place through two high level acts, as shown in FIG. 59. In Act 59.100, the 'Get UTO' process, an interactive event between the customer and the airline web server, runs to carry out the Initial Transaction of the UTO VOF. In this Act, a number of algorithms, the details of which are presented later, are executed on the airline's server to optimally calculate the terms and conditions of the UTO VOF (e.g., availability, UTO Price(s) and other conditions) to concurrently benefit both the airline and the customer. In Act 59.200, an event optimizer process called the UTO Exercise Process (explained later) is executed. In this process, the airline may awards the upgrade to the customer based on the terms and conditions of the option contract and the Chosen Cabin is notified to the customer. The process may also comprise one or more event optimizer algorithms that may help to optimally select the Chosen Cabin and/or to optimally use (or reuse) the Released Cabin.

Figure 65:
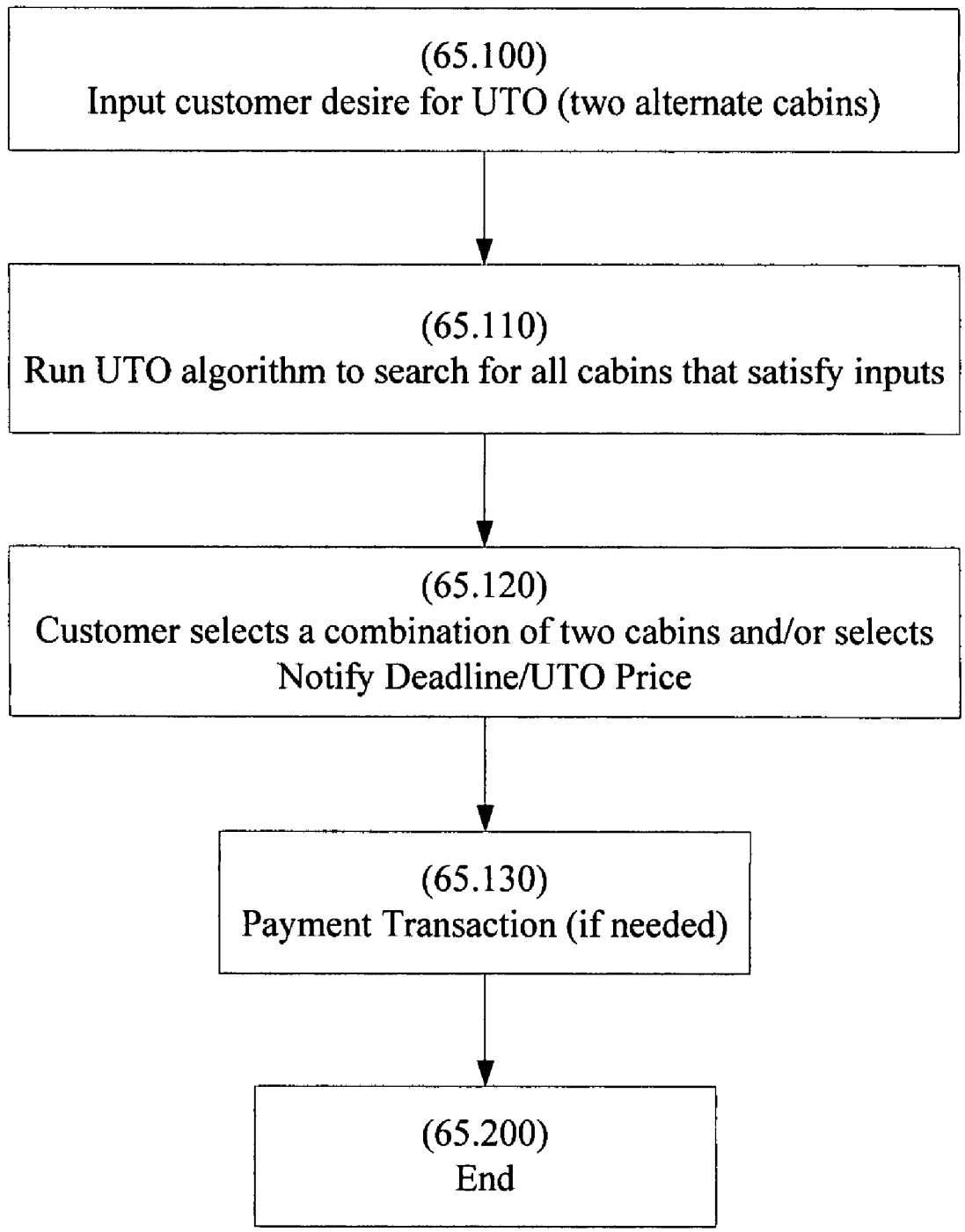
FIG. 65 is a flowchart of an algorithm for the "Concurrent Get UTO" process, an alternative process to FIG. 63.

As explained above, the Get UTO process may be implemented via the Sequential (shown in FIG. 63) or the Concurrent (shown in FIG. 65) process. There are many ways to do the Sequential process. In the airline industry, the terms, Leg, Segment and Itinerary correspond to the terms, Product, Set and Order, respectively. As an example of the Sequential process, a customer may select (or purchase) a Leg/Segment/Itinerary before the Initial Transaction begins. In such situations, said Leg/Segment/Itinerary may be referred to as Initial Leg (Cabin)/Initial Segment/Initial Itinerary or IL/IS/II, in short, respectively. The Initial Segment is also referred to as Initial Flight Segment (or IFS, in short). A customer may get a UTO, i.e., get one or more UTO Legs (Cabins)/Segments/Itineraries on an IL/IS/II, respectively. A UTO Leg (Cabin)/Segment/Itinerary is also referred to as Option Leg/Option Segment/Option Itinerary, or OL/OS/OI, in short, respectively. An Option Segment is also referred to as Option Flight Segment (or OFS, in short). The two events (one for the Initial Flight i.e., cabin, and the other for the Initial Transaction) may be executed with a minimal (one just after another) or a significant time gap (e.g., few minutes, hours, days and so forth) in between them.

The UTO VOF may be implemented at different levels including, but not limited to, Itinerary, Segment and Leg. An airline may choose to implement the UTO at any level(s). In a specific UTO interaction between a customer and the airline, the implementation level should be the same for all the UTO Cabins, Chosen Cabins and Released Cabins. For example, if UTO is implemented at the Itinerary level, then all the UTO Cabins and Chosen Cabins would refer to UTO Itineraries and Chosen Itineraries, respectively.

1. 'Get UTO'—Dynamic Interaction to Capture Customer Demand

In the Get UTO process, a customer interacts with the airline's server to receive a UTO. The interaction may take place (for example) via phone, in-person or on a website. The Sequential Get UTO Process is presented first along with its detailed algorithms, followed by a short summary of the Concurrent Get UTO Process.

FIGS. 60, 61 and 62 show a series of web pages that could be displayed in a customer's browser by an airline's web server, providing a practical example of the Get UTO process, comprising how the interaction may take place, between a customer and an airline, when the customer comes to purchase UTO (during or after the ticket is purchased). FIG. 60 shows an Itinerary selected and/or purchased by a customer. The customer may click on the marketing banner for Get UTO to be linked to the web page displaying the Get UTO screen (shown in FIG. 61). There, the customer may select to purchase UTO on any flight in his/her Itinerary by clicking the "Get UTO" link in front of that flight (shown in FIG. 61). This starts the "Get UTO" process. After the click, the Get UTO algorithm (details are presented later) running "behind the scenes" on a server of the airline qualifies the availability, applicability and price conditions on all kinds of UTOs available on the selected flight and display the available UTOs along with the price and other conditions in the screen, as shown in FIG. 62. In FIG. 62, three UTOs are displayed. For each UTO, an instant price and an exercise price, which the customer would have to pay if upgraded, are also displayed. The customer may select any UTO by selecting the corresponding radio button and then clicking the 'Save and Go to Summary' button, which would hyperlink the user to a summary page.

Sequential Get UTO Process

There are several ways to implement the Sequential process. The following presents an example of the Sequential Get UTO Process when a UTO is implemented at the Segment level. It is also assumed here that the customer first purchases an Initial Flight Itinerary with one or more IFS, and then opts to receive a UTO on any of the included IFS.

The following presents an example of the algorithmic illustration of the Get UTO process. Consider FIG. 63. In Act 63.100, a customer selects an Itinerary (with one or more Flight Legs). It is assumed here that the customer interacts with the airline to Get UTO during the ticket purchase process. However, the Get UTO process may take place at any time including before, during, after the ticket purchase process, or any combination thereof. When implementing the Get UTO process before the ticket purchase, the customer may need to also select the Base-Cabin and/or flight leg on which he or she wants to get the UTO.

Next, in Act 63.110, the customer reaches an interactive interface of airline's web server to Get UTO, where the customer selects a Flight Leg (referred to as Target_Leg) on which UTO is desired (web illustration shown in FIG. 61). Next, the customer inputs the UTO search criteria (such as desired price range, conditions, Up Cabins and so forth) for the current Target_Leg in Act 63.115.

Next, control goes to Act 63.120, where the UTO search algorithm is executed to search for Available UTO on the Target_Leg. The UTO search algorithm returns a list of valid UTOs along with the associated UTO Price and/or other conditions. The details of the UTO search algorithm are presented later. Next, the search results are displayed for the customer, who then selects the desired UTO (and the associated price and other conditions) in Act 63.130.

Next, in Act 63.140, a test is performed to determine whether the customer wants to purchase more UTOs on the current Target_Leg or on another Flight Leg in the Itinerary. If the customer wants to purchase UTOs on another Leg, control loops back to the Act 63.110, where the customer selects the desired Target_Leg from the Itinerary, and then the process is repeated again for a new Target_Leg. If the customer wants to Get more UTOs on the current Target_Leg, control loops back to Act 63.115, where the customer enters the UTO search criteria and then the process is repeated for the new UTO search criteria. If the customer does not want to Get any more UTO, control goes to Act 63.150, where a payment transaction (if any) is executed between the customer and the airline. If the UTO has a positive initial price, the customer may pay that price for UTO using a credit card, direct bank account debit or any other payment transaction mechanism. Next, the algorithm ends in Box 63.200.

UTO Search

Figure 63:
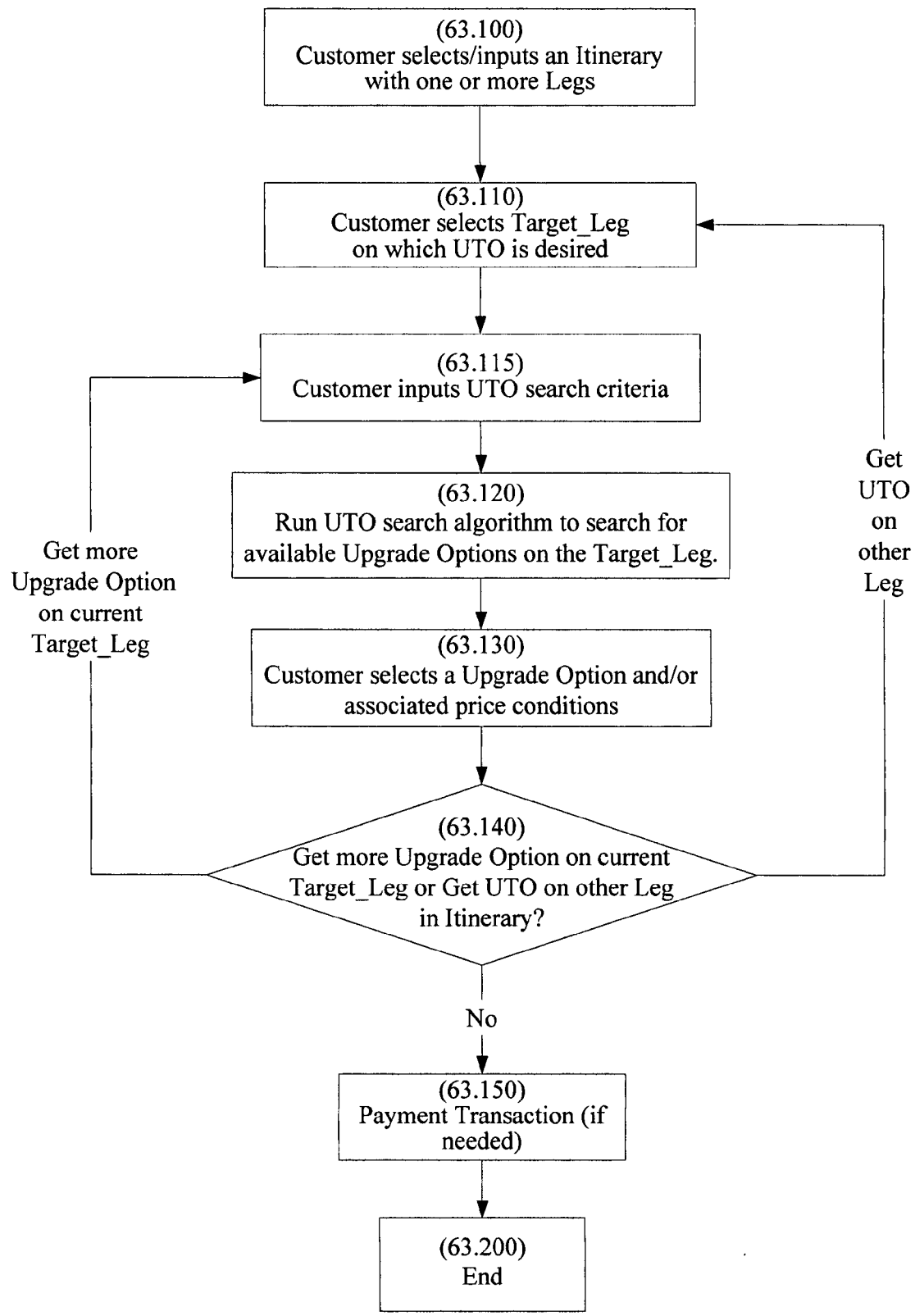
FIG. 63 is a flowchart that expands Act 100 of FIG. 59, illustrating a high level algorithm for the "Sequential Get UTO" process.
Figure 64:
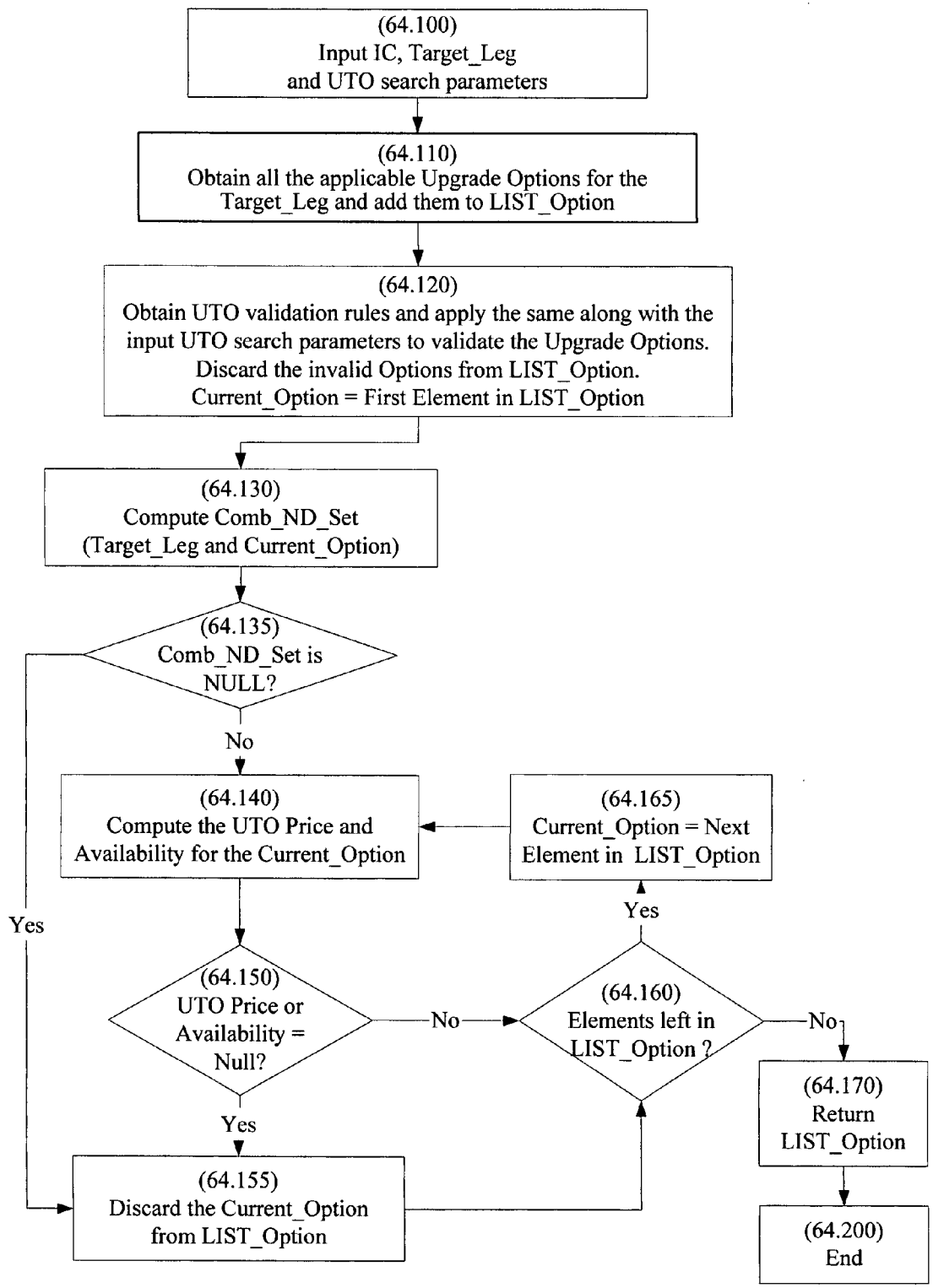
FIG. 64 is a flowchart that expands Act 120 of FIG. 63, illustrating an algorithm to search for UTO value options at Leg level.

The UTO Search algorithm as shown in FIG. 64 expands the Act 120 of FIG. 63. Here the UTO Search algorithm for searching UTO at the Leg level has been described. One of the ways of its implementation of said algorithm has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D. UTO Search algorithm for the Segment level has been discussed above in UFO under OFS Search Algorithm.

In Act 64.100, a set of parameters including the number of customers (IC), the Target_Leg and the UTO Search parameters are input to the system. The number of customers refers to those customers for whom this process is being executed. The UTO search parameters include, but are not limited to, Up Cabin, fare class of the Up Cabin, class of service, UTO Price and so forth. Next, control goes to Act 64.110, where a list of UTO Types (or upgrade options) for the given Target_Leg is read from the airline's database. All the upgrade options, thus obtained, are added to a list termed LIST_Option.

Next, in Act 64.120, a list of UTO validation rules is obtained from the airline's UTO VOF database and applied to validate all the upgrade options in the LIST_Option list. The ones that do not satisfy the rules are discarded. Validation rules may include, but are not limited to, a Maximum Ticket Price Rule, an Availability Rule, a Fare Class Rule, a Day to Departure (DTD) rule and so forth. For example, a Maximum Ticket Price Rule may discard those upgrade options for which the ticket price of the Up cabin related to the upgrade option is more than a specified value. A Day to Departure rule may discard the upgrade options which may not be available until X days to departure of a flight Leg. An airline may implement any of the validation rules to further qualify the options in the LIST_Option list. As a last step in Act 64.120, the first element in the updated LIST_Option list is set as the Current_Option.

Next, control goes to Act 64.130, where a group of Comb_NDs is computed for the combination of the Target_Leg, all the existing options of the Target_Leg and the Current_Option, and added to a set called Comb_ND_Set. Next, in Act 64.135, a test is performed to determine whether the Comb_ND_Set obtained in the previous Act is Null. If so, control goes to Act 64.155. If not, control goes to Act 64.140, where the UTO availability and UTO Price for the Comb_ND_Set are determined. Next, in Act 64.150, another test is performed to determine whether the UTO Availability or the UTO Price is Null. If so, control goes to Act 64.155. If not, control goes to Act 64.160.

In Act 64.155, the Current_Option is discarded from the LIST_Option list, and control goes to Act 64.160, where a test is performed to determine if more elements are left in the LIST_Option list. If so, control goes to Act 64.165. If not, control goes to Act 64.170.

In Act 64.165, the next element in the LIST_Option list is set as the Current_Option and control loops back to Act 64.130 for further processing of the new Current_Option. In Act 64.170, the updated LIST_Option list along with UTO Prices and associated conditions for each option is returned as the search result, and then the algorithm ends (Box 64.200). The computation may be performed using a processor that may calculate results in optimal time.

Computation of Notify Deadlines

An airline may set one or more Notify Deadlines of its choosing for its cabins. It may be noted, however, that a UTO VOF may be run with determining the Notify Deadlines at the Leg level only. Once the Notify Deadlines have been set for each cabins, the next Act is to create a framework to compute the Notify Deadlines for a group of cabins (such as for Segment, an Itinerary or any other group). The following sections present an example of a framework that may be used to obtain a set of Notify Deadlines applicable to a group of cabins. An airline may use any framework and algorithm of its choosing to obtain the same.

A set of Notify Deadlines associated with a cabin for a flight, cabins for a Segment and a combination of two or more Segments is called Leg_ND_Set, Segment_ND_Set and Comb_ND_Set, respectively. Each element in the Leg_ND_Set, Segment_ND_Set and Comb_ND_Set is termed Leg_ND, Seg_ND and Comb_ND, respectively. The Comb_ND_Set may be computed by combining the Seg_ND_Sets of all the given Segments. A Seg_ND_Set may be computed by combining the Leg_ND_Sets of all the cabins under that Segment. The Notify Deadlines may be computed based on various parameters including, but not limited to factors of airline's choosing. One example to compute a Comb_ND_Set is as follows. First compute Seg_ND_Set for all Segments. A Seg_ND_Set is computed by first selecting earliest of the Notify Deadlines of each cabins within the concerned Segment, and then picking the latest of those Deadlines, and noting that as the Target_Deadline. Next step is to pick all those Notify Deadlines that fall after the Target_Deadline. Notify Deadlines thus obtained may be validated using various validation rules based on airline factors such as customer utility, cabin (flight) parameters and so forth. Similarly, the Comb_ND_Set may thus be computed by repeating the above process for Seg_ND_Sets, thus obtained for each Segment.

Available Capacity Check

The UTO capacity for an OFS may depend on one or more factors including, but not limited to, Notify Deadline, UTO Prices, expected seat value and so forth. An airline may use any method of its choosing to determine UTO capacity of a cabin. For example, an airline may choose to have a fixed UTO capacity for one or more of its cabins.

An instance to compute UTO capacity is discussed below. Consider the case, when UTO Capacity is dependent on Notify Deadline. In such situation, the objective is to determine those Comb_NDs within the Comb_ND_Set on which UTO is available for the given OFS. The UTO Capacity and the Used UTO Capacity (the total number of seats in the cabin on which UTO has been sold but not exercised) may be calculated for each Comb_ND within the Comb_ND_Set. Available Capacity (AC) would then be the difference of UTO Capacity and Used UTO Capacity for the given cabin. If the AC is greater than or equal to the number of incoming customers desiring a UTO, then the UTO capacity is available at a given Comb_ND for the given OFS. The process may be repeated for all Notify Deadlines within Comb_ND_Sets. UTO may be made available on a given OFS for a given Comb_ND at the individual Leg level, even if UTO is not available on all the cabins (Legs) of OFS for the given Comb_ND.

UTO Price Calculation

An airline may set UTO Prices for a cabin using any method of its choosing. Once the UTO Prices have been set for each cabin, the next Act may be to create a framework to compute UTO Price for a group of cabins (such as a Segment, an Itinerary or any other group) by using UTO Prices for each cabin in the group. The airline may determine UTO Price for a group of cabins in the case when the airline may want to implement the UTO at Segment or higher level.

The parameter Leg_OP refer to UTO Price (and may or may not be corresponding to a Notify Deadline) associated with a cabin (Flight Leg). Similarly, Seg_OP and Comb_OP refer to UTO Price (may or may not be corresponding to a Notify Deadline) associated with a Segment and a combination of two or more Segments, respectively. A set of Leg_OPs, Seg_OPs and Comb_OPs is termed Leg_OP_Set, Seg_OP_Set and Comb_OP_Set, respectively. The Comb_OP_Set is computed by combining the Seg_OP_Sets of the IFS and all the OFSs (existing and new). A Seg_OP_Set is computed by combining the Leg_OP_Sets of all the Legs under that Segment. One or more Seg_OP_Rules may be read from the airline's database and applied to calculate Seg_OP_Set for each input Set (IFS and all OFSs) using the Leg_OP_Sets of all the cabins (Legs) of said Set. An airline may use any Seg_OP_Set Rule of its choosing. Seg_OP_Rules may be defined to calculate Seg_OP as the sum, average, highest, lowest or any other function of Leg_OPs of all the cabins at a given Comb_ND. Similarly, a Comb_OP_Set comprises one or more Comb_OPs, and is calculated using one of the pre-determined rules, termed Comb_OP_Rules, to combine Seg_OPs of all the Segments in the combination. An airline may use a Comb_OP_Rule of its choosing. Comb_OP_Rules may be defined similar to the Seg_OP_Rules.

Concurrent Get UTO Process

As explained above, in the Concurrent Get UTO process, a customer receives all UTO Cabins concurrently in one transaction. An algorithmic illustration of the Concurrent Get UTO process is displayed in FIG. 65. The UTO (2, 1) instance is assumed here as an example. Consider a customer who desires an upgrade in lieu of a price for the desired upgrade. In Act 65.100, the customer desires for UTO are input, including, but not limited to, search criteria for two cabins according to customer's utility (may be similar to the search criteria defined above for the Sequential Get UTO process).

Next, in Act 65.110, the UTO algorithm is run to determine the combinations of two cabins that satisfy inputs. A list of such search results is displayed for the customer along with the associated terms and conditions including, but not limited to, Notify Deadlines, Initial UTO Price, UTO Exercise Price and Ticket Price for each such combination. The UTO algorithm for the Sequential Get UTO process (defined above) may also be used for the Concurrent Get UTO process.

Next, in Act 65.120, the customer selects a desired combination of two cabins and the associated conditions such as UTO Exercise Price/Notify Deadline. Next, in Act 65.130, a payment transaction is executed, if needed. For example, the customer may pay the Ticket Price after taking into consideration the Initial UTO Price using a credit card, direct bank account debit or any other payment transaction mechanism. Next, the algorithm ends in Box 65.200. The computation may be performed using a processor that may calculate results in optimal time.

(2) Event Optimizer

Once the customer selects a UTO value option, the processing goes to the Event Optimizer phase where different acts are executed depending on the trigger event that may occur to make an option become exercisable. In this stage, the UTO Exercise Process (and Customer Notification (or CN, in short) process) as shown in Act 59.200 is executed. In this process, one or more decisions on the selection of Chosen Cabin(s) is notified to the customer. The event(s) is (are) related to the value option selected in the first act. In the UTO VOF, the airline may use a software application built on the method defined above to optimally award the upgrades to customers who have bought a UTO. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E. One of the methods have been described above in the UFO VOF (Buy_N and Upgrade_U algorithm). Another method is described below in detail for the UTO Exercise process.

UTO Exercise Process

The airline may use UTO Exercise Process as one of the method to create a system and computer-implemented process to optimally award the available seats as upgrades. This method may help to find an optimal upgrade solution to create a win-win situation between the customers and the airline. The method may have two or more Acts. In the current discussion, it has been assumed that the UTO Exercise Process has two Acts, the Upgrade List and the Upgrade Award. The Upgrade List process may use a set of rules to generate a list of upgrade enabled customers. The Upgrade Award process may award upgrades to one or more upgrade enabled customers based on the defined conditions. It may be noted, however, that technically, the UTO Exercise process may be performed using any rule/method as desired. The following process may help to optimize (increase) the benefits generated.

Figure 66:
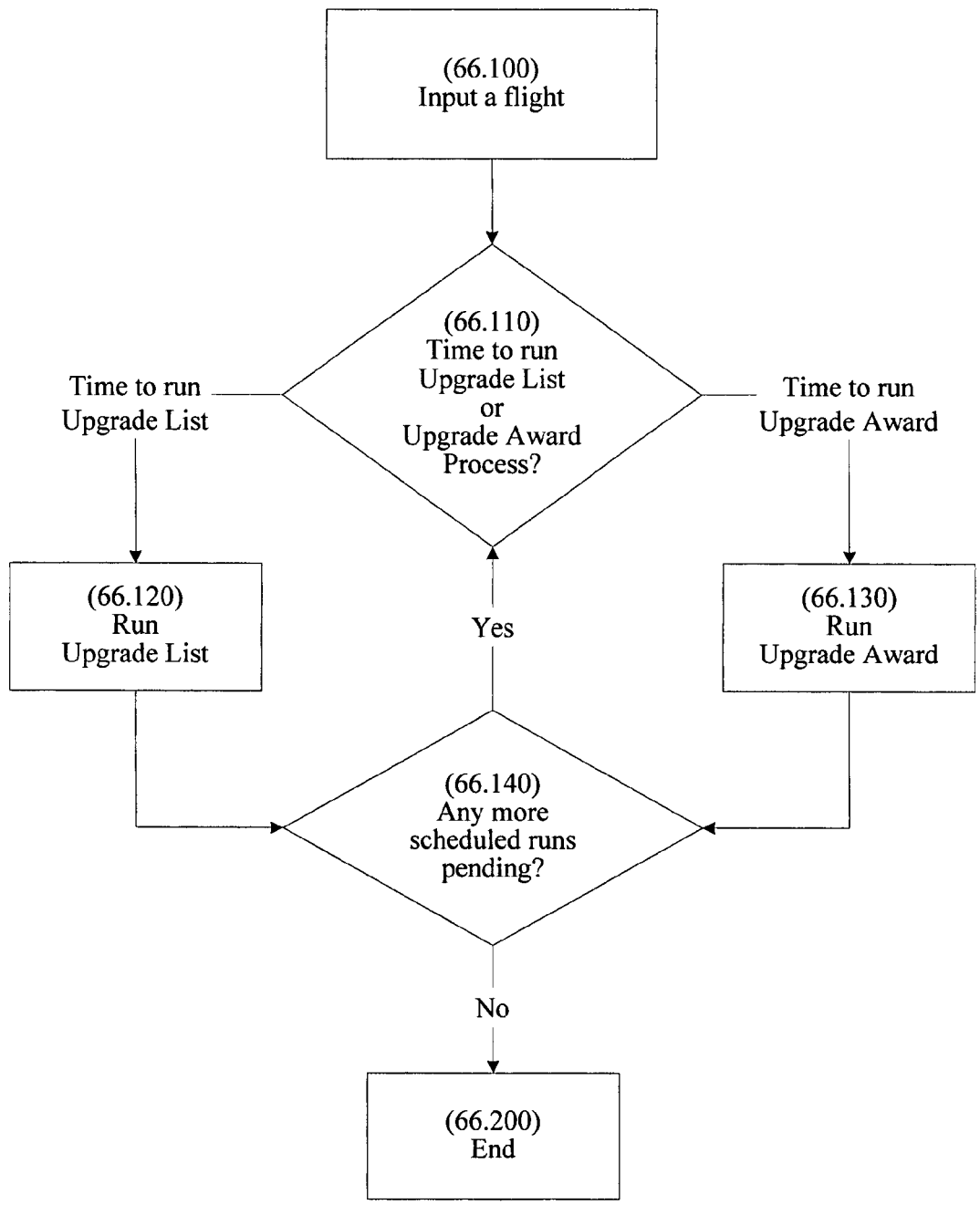
FIG. 66 is a diagrammatic illustration, in a high level flowchart, of an algorithm for the UTO Exercise process in UTO VOF implementation.

A system built on the method is described in FIG. 66. The UTO Exercise process has been discussed and explained in the UPO VOF above. In the context of the airline industry, UTO Exercise process is explained by an example later on. As explained earlier, both Upgrade List and Upgrade Award processes may be run multiple times both before and after the flight departure (anytime starting from the first interaction between the airline and customer to the time the flight arrives). It may be beneficial for the airline to run the UTO Exercise process as close to (or even after) the departure of the flight as possible. This would help in three ways. First, it could help the airline to prevent any form of potential revenue dilution from the last minute walk-in customers who could potentially pay high ticket fares for first/business cabins. Second, it could help to use all the unused seats that become available at the last minute because of a no-show or a last minute cancellation. Third, if the airline schedules (at least a few runs of) the UTO Exercise process after the flight departure, it may help to sell UTO upgrades for a portion of the flight duration. A customer could get upgrade for a portion of a flight duration, thus, allowing multiple customer upgrades using the same seat. For example, one customer could be upgraded to a seat for the first half of the flight duration, and another customer could be upgraded to the same seat for the second half of the flight duration. By doing so, the airline could also charge a lower price for a UTO, thus, attracting more customers. This may allow an airline to increase the total number of upgrade awards, total airline revenue (or profitability), customer satisfaction and utility, any other factor or combination thereof. An airline may choose to implement the partial flight UTOs on some or all flights. Such a partial upgrade may be provided for a duration/leg/segment of a leg/segment/itinerary, respectively. Here, the customer may not be upgraded for his/her entire leg/segment/itinerary but may be upgraded only for a part of his/her leg/segment/itinerary, respectively, and for the remaining part(s), any other customer(s) may be upgraded. This may allow the airline to upgrade 'i' customer on availability of only T Up Cabins or Up Flights (where 'i' is greater than or equal to 'j'). The flights with longer duration may be more suitable for such (partial flight) UTO implementation. The computation may be performed using a processor that may calculate results in optimal time Upgrade List The following terms and definitions are needed to understand the algorithm to create an upgrade list: UTO Type, upgrade value and upgrade combination. These terms are presented first followed by the Upgrade List algorithm.

UTO Type

For each customer to be considered in the upgrade list, the airline needs to determine his/her UTO Type and the upgrade value. It is straightforward to determine the type of UTO for each UTO customer. UTO Type is simply the UTO bought by the customer. However, for customers who are in 'regular' (non-option) upgrade programs, there is a need to determine their UTO Types. To determine the UTO Type, one needs to determine all the Up Cabins to which a customer may be awarded an upgrade. The list of such Up Cabins need to be compared with the list of Up Cabins associated with all UTOs. The UTO whose Up Cabins match is the UTO Type for said customer. For example, if an elite customer in coach (C) may be upgraded to first (F) or business (B), then his/her list of Up Cabins matches exactly with that of the UTO Type, CBF. Thus, CBF is the UTO Type for said customer. The UTO Types for other customers may be determined in a similar fashion.

The airline may define UTO Type for standby customers. The following describes one of the methods to treat standby customers just like confirmed customers to maintain the uniformity in processing the UTO Exercise algorithm. A standby customer, here, may be defined as a customer who currently does not have a confirmed flight, but is waiting to get confirmation for seat on that flight, whereas the confirmed customers have confirmed seats in said flight.

In one or more upgrades, the customer may be re-assigned a different cabin from the original cabin. A standby customer may be assigned to a standby cabin as a Base-Cabin from which an upgrade is possible to a cabin having availability.

A new dummy cabin, Standby (or S, in short), may be assumed in the flight and all the standby customers may be treated to exist in the confirmed dummy cabin (S), which may then be added to the list of cabins for a flight. A flight with C, B and F cabins, would have a new list of cabins in descending priority, F>B>C>S. A customer may be on a standby list for one or more cabins for a flight. Here, the customers in the S cabin may be assigned the UTO Types, as follows; SC refers to the UTO Type for a standby for coach (C) only, SB refers to the UTO Type for a standby for business (B) only, SF refers to the UTO Type for a standby for first (F) only, SBF refers to the UTO Type for a standby for business (B) and first (F), SCF refers to the UTO Type for a standby for coach (C) and first (F), SCB refers to the UTO Type for a standby for coach (C) and business (B) and SCBF refers to the UTO Type for a standby for coach (C), business (B) and first (F).

If an airline wants to employ the above mechanism to create a dummy cabin for standby customers, it may be beneficial to include the virtual standby cabin in the list of cabins when calculating all types of upgrade options.

Upgrade Value

Upgrade Value may be defined as the total value an airline may realize by upgrading a customer from a given Base-Cabin to a given Up Cabin. Upgrade Value may be expressed, as follows, $$\text{Upgrade Value} = \text{Payment} + \text{Soft Value} - \text{Upgrade Cost},$$

In the above formula, the term 'payment' refers to the price paid by the customer to the airline when he/she is awarded an upgrade from the Base-Cabin to the Up Cabin. 'Soft Value' refers to a combination of any indirect and/or intangible value an airline may generate when a customer is awarded an upgrade from the Base-Cabin to the Up Cabin. 'Upgrade Cost' refers to the marginal upgrade cost (if any) to an airline to upgrade the customer from Base-Cabin to an Up Cabin.

The above said "Soft value" may be based on various factors and parameters including, but not limited to, airline's past experiences with the customer, the number of times said customer has or has not received an upgrade in last 'n' number of attempts, customers who require special attention or care, customers belonging to a certain category, other privileged customers for one or more reasons and so forth.

For UTO customers, an airline may use the final exercise price as the "payment" portion of the upgrade value. The soft value for the UTO customers may be calculated using a function of the long term value of the customer to the airline, trip parameters and upgrade path and so forth. An airline may use any mechanism or methodology to calculate the upgrade value of the UTO customer.

Similarly, the upgrade value may be calculated for the customers in the 'regular' (non-option) upgrade programs and the standby customers. For the customers in the regular upgrade programs, the 'payment' portion of the upgrade value may be zero, however, their 'soft value' may be high. For the standby customers, the payment portion may be calculated as follows, $$\text{Payment (standby)} = \text{Ticket Price} \times (1 - \text{Recapture probability})$$

In the above formula, the Ticket Price refers to the total Ticket Price the standby customer is expected to pay to the airline if he/she is awarded the seat in the desired cabin. The term "Recapture Probability" refers to a probability that a standby customer may be assigned another seat in another flight of the same (or different) airline so that the airline, in concern, does not lose the potential revenue from the standby customer if the customer is not awarded a seat in the concerned flight. An airline may calculate recapture probability by any method of its choosing.

An airline may choose to use any other mechanism to determine the upgrade value for one or more customers in the input list. The computerized system (built using the method defined here) may also allow manual overrides by the airline user (e.g., an analyst or an agent) to allow the user to allocate special upgrade values to satisfy the customer relations objectives (for e.g. enhance chances for some elite customers to get upgrades over other customers) or for any other reasons, that includes enhancing or reducing the soft values of customers to modify their chances to get upgrades, however, while maintaining the conditions of the options contract executed with the UTO customers.

Upgrade Combination

An upgrade combination comprises one or more members sorted in an order, and needs only one available seat for its topmost member to generate an upgrade for all its members. The topmost member has the highest Up Cabin associated among all the members in the combination. The award of upgrades for an upgrade combination works in a cascading style, where a new available seat allotted to the combination is awarded to its topmost member, the seat vacated by the topmost member (after his/her upgrade) is awarded to the second (next) topmost member and the chain goes on until the seat vacated by the second lowest member is awarded to the lowest member. Consider the following examples.

Consider an upgrade combination, C-CB-BF, where, C refers to a standby customer for the coach (C) cabin, CB refers to a coach customer enabled to be upgraded to business (B) and BF refers to a business customer enabled to be upgraded to first (F). Here, BF is the topmost member with the highest associated Up Cabin, F. For this upgrade combination, if one seat is made available in the first cabin, then the BF customer may be upgraded to first, leaving one empty seat in business, the CB customer may be upgraded to the seat emptied in business by the upgraded BF customer, and the C (standby) customer may be awarded the seat emptied by the upgraded customer CB.

Consider another upgrade combination, B-BF, where, B refers to a standby customer for the business (B) cabin and BF refers to a business customer enabled to be upgraded to first (F). For this upgrade combination, if one seat is made available in the first cabin, then the BF customer may be upgraded to first, leaving one empty seat in business, and the B (standby) customer may be awarded the business seat emptied by the upgraded customer BF.

Consider another upgrade combination, C-CBF, where, C refers to a standby customer for the coach (C) cabin and CBF refers to a coach customer enabled to be upgraded to either business (B) or first (F). For this upgrade combination, if one seat is made available in the business cabin, then the CBF customer may be upgraded to business, leaving one empty seat in business, and the C(Standby) customer may be awarded the coach seat emptied by the upgraded customer CBF. If one seat is made available in the first cabin, then the CBF customer may be upgraded to first, leaving one empty seat in coach, and the C (standby) customer may be awarded the coach seat emptied by the upgraded customer CBF.

Upgrade List Algorithm

Figure 67:
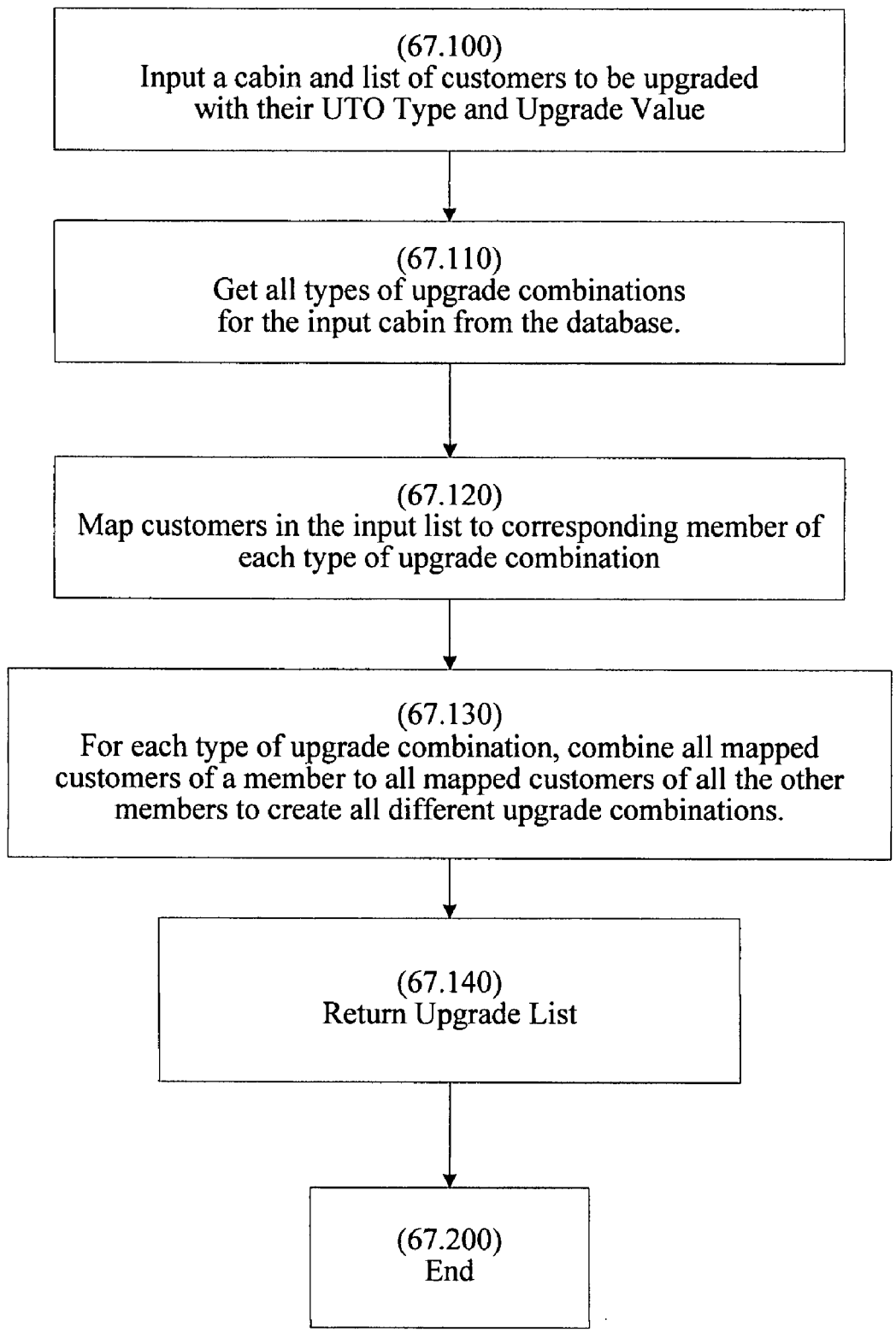
FIG. 67 is a flowchart that expands Act 120 of FIG. 66, illustrating an algorithm to create "Upgrade List" for a given set of entities and a list of upgrade-enabled customers.

The Upgrade List Algorithm as shown in FIG. 67 has been explained in the UPO VOF at length. In the context of the airline industry, it is explained using an example below. Consider a type of upgrade combination, DC-CB-CBA. Assume the input list of customers contains 2 customers, DC1 and DC2, with the UTO Type DC. Similarly, assume there are 2 customers, CB1 and CB2, with the UTO Type CB and 2 customers, CBA1 and CBA2, with the UTO Type CBA in the given list of customers. DC1 (belonging to DC) is combined with CB1 (belonging to CB) and CBA1 (belonging to CBA) to form one upgrade combination, DC1-CB1-CBA1. Similarly, DC1 is combined with CB1 and CBA2 to form another upgrade combination, DC1-CB1-CBA2. In this fashion, all such upgrade combinations are created, as follows: DC1-CB1-CBA1, DC1-CB1-CBA2, DC1-CB2-CBA1, DC1-CB2-CBA2, DC2-CB1-CBA1, DC2-CB1-CBA2, DC2-CB2-CBA1 and DC2-CB2-CBA2. Similarly, all the upgrade combinations are created for all the Up Cabins using all the input customers and all the types of upgrade combinations.

Algorithm to Create Types of Upgrade Combinations

Figure 68:
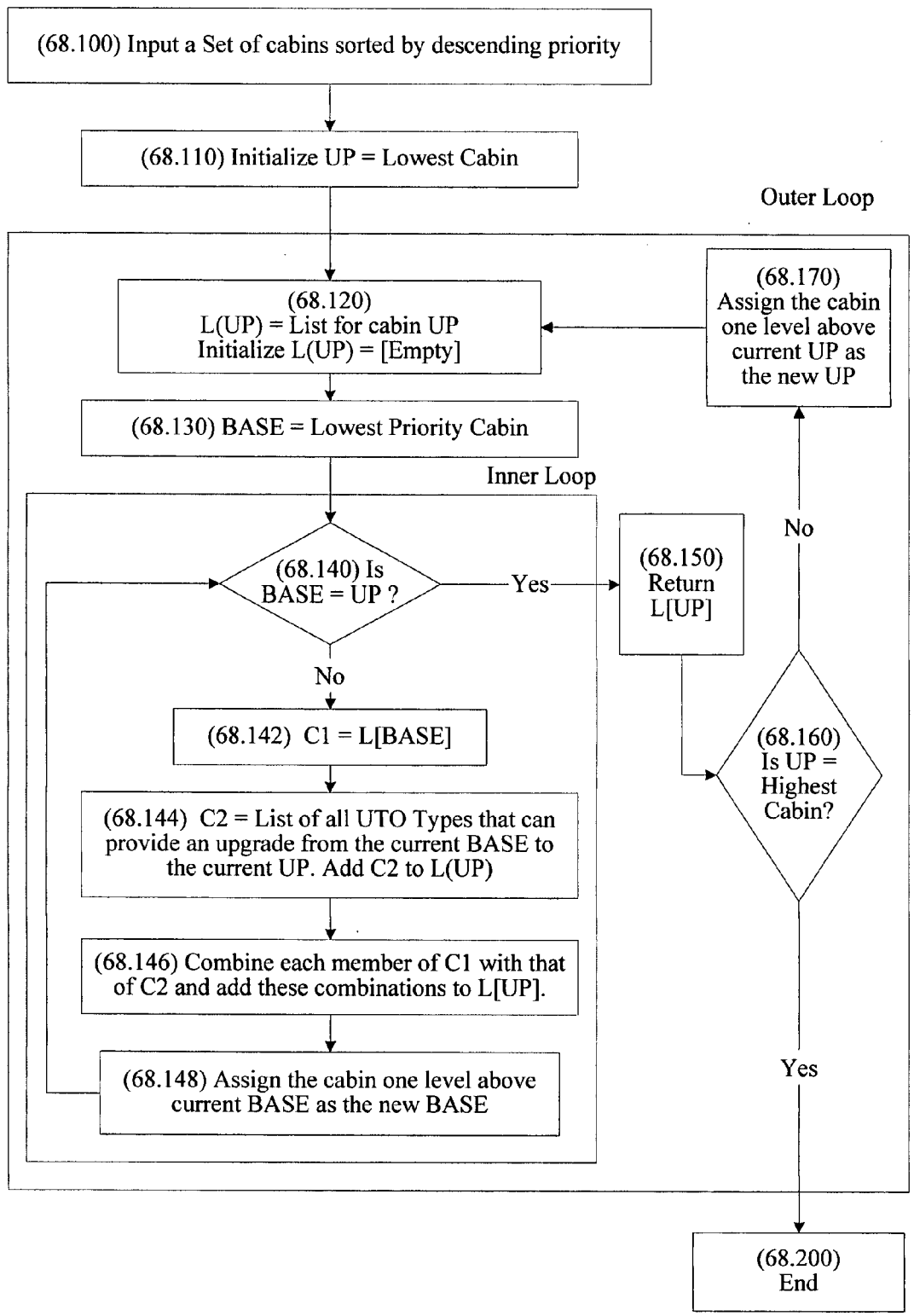
FIG. 68 is a flowchart that expands Act 110 of FIG. 66, illustrating an algorithm to create types of upgrade combinations for a given set of flight cabins.

The algorithm, as shown in FIG. 68, to create types of upgrade combinations has been explained in the UPO VOF at length. In the context of the airline industry, it may be explained below with the help of an example. Consider an airline flight with 3 cabins, namely, A, B and C. The priority order among the cabins is A>B>C. Per Act 68.100, a Set of cabins is input to form the SP, with cabins sorted according to the descending order of priority, A>B>C. Per Act 68.110, UP is set to C, the lowest priority cabin in input SP. Next, control enters the outer loop, where L(C), a list of types of upgrade combinations for the current UP, is initialized as an empty set.

Next, per Act 68.130, the BASE is set to C, and then control enters the inner loop. Per Act 68.140, a test is performed to determine whether the current BASE (i.e., C) is same as the current UP (i.e., C). It is same, so control branches to Act 68.150, where the current L(C):[ ] is returned, and control goes to Act 68.160, where the test is performed to determine whether the current UP (i.e., C) is the highest priority cabin within SP. It is not, so the process continues to Act 68.170, where B, the cabin one level higher than C, in terms of priority, is assigned as the new UP. At this point, the process loops back to Act 68.120, where L(B) is initialized as an empty set.

BASE is again set to C, per Act 68.130, and the test is performed to determine whether C (the current BASE) is same as B (the current UP), per Act 68.140. They are not the same, so, the process continues to Act 68.142, where L(C):[ ] is assigned to the collection C1.

Next, per Act 68.144, a list of UTO Types that may provide an upgrade from C to B (i.e., [CB, CBA]) is read from the airline's database and is assigned to C2, and then C2 is added to L(B) to form L(B):[CB, CBA].

Next, per Act 68.146, since C1 is empty, no combinations are created or added to L(B):[CB, CBA]. Then, the process continues to Act 68.148, where B, the cabin one level higher than C, in terms of priority, is assigned as the new BASE. At this point, the process loops back to Act 68.140, where a test is performed to determine whether the current BASE (B) is same as the current UP (B). They are same, so, the L(B):[CB, CBA] is returned at this point, per Act 68.150, and control goes to Act 68.160, where a test is performed to determine whether B is the highest cabin. It is not, so, the process loops back to Act 68.170, where A, the cabin one level higher than B, in terms of priority, is assigned as the new UP.

Per Act 68.120, L(A) is initialized as an empty set. Base is set to C again, per Act 68.130. The test is performed again to determine whether the current Base (i.e., C) is same as the current UP (i.e., A), per Act 68.140. They are not, so, the process continues within the inner loop and L(C):[ ] is assigned to C1, per Act 68.142.

Next, a list of upgrade options [CA, CBA] that may provide an upgrade from C to A is read from the airline's database, and is assigned to C2 which is then added to L(A) to form L(A): [CA, CBA], per Act 68.144. Since C1 is empty, no combinations are created or added to L(A):[CA, CBA], per Act 68.146.

Next, per Act 68.148, B, the cabin one level higher than C, is assigned as the new BASE, and the process loops back to Act 68.140, where the test is again performed to determine whether B is same as A. They are not, so the Act 68.142 to Act 68.148 are repeated again. Per Act 68.142, L(B):[CB, CBA] is assigned to C1. Per Act 68.144, [BA], i.e., the collection of all upgrade options that may provide an upgrade from B to A, is assigned to C2, and is added to L(A) to form L(A):[CA, CBA, BA]. Per Act 68.146, each member of C1 [CB, CBA] is combined with each member of C2 [BA], and all these combinations [CB-BA, CBA-BA] are added to the L(A) to form L(A):[CA, CBA, BA, CB-BA, CBA-BA].

Next, per Act 68.148, the BASE is set to A, one level higher than B. Next, the process loops back again to Act 68.140, where the test finds that the current BASE and the current UP are same (A). Therefore, the L(A) is returned, per Act 68.150, and the process control moves to Act 68.160, where the test is performed to determine whether A is the highest cabin. It is, so, control moves to Act 68.200, where the algorithm ends.

An airline may create a data structure (or a computer-readable medium) that may include an ability to store therein an indication of each customer of an airline who may be eligible to receive an upgrade award and, for each said customer, an indication of each award for which the customer is eligible and one or more values associated with the award. Such said values may include, without limitation, a total upgrade value, a payment value, a soft value and an upgrade cost related to said upgrade; a Base-Cabin value, and an Up Cabin value; and one or more values specifying traits or characteristics of the customer and so forth.

Upgrade Award

Figure 69:
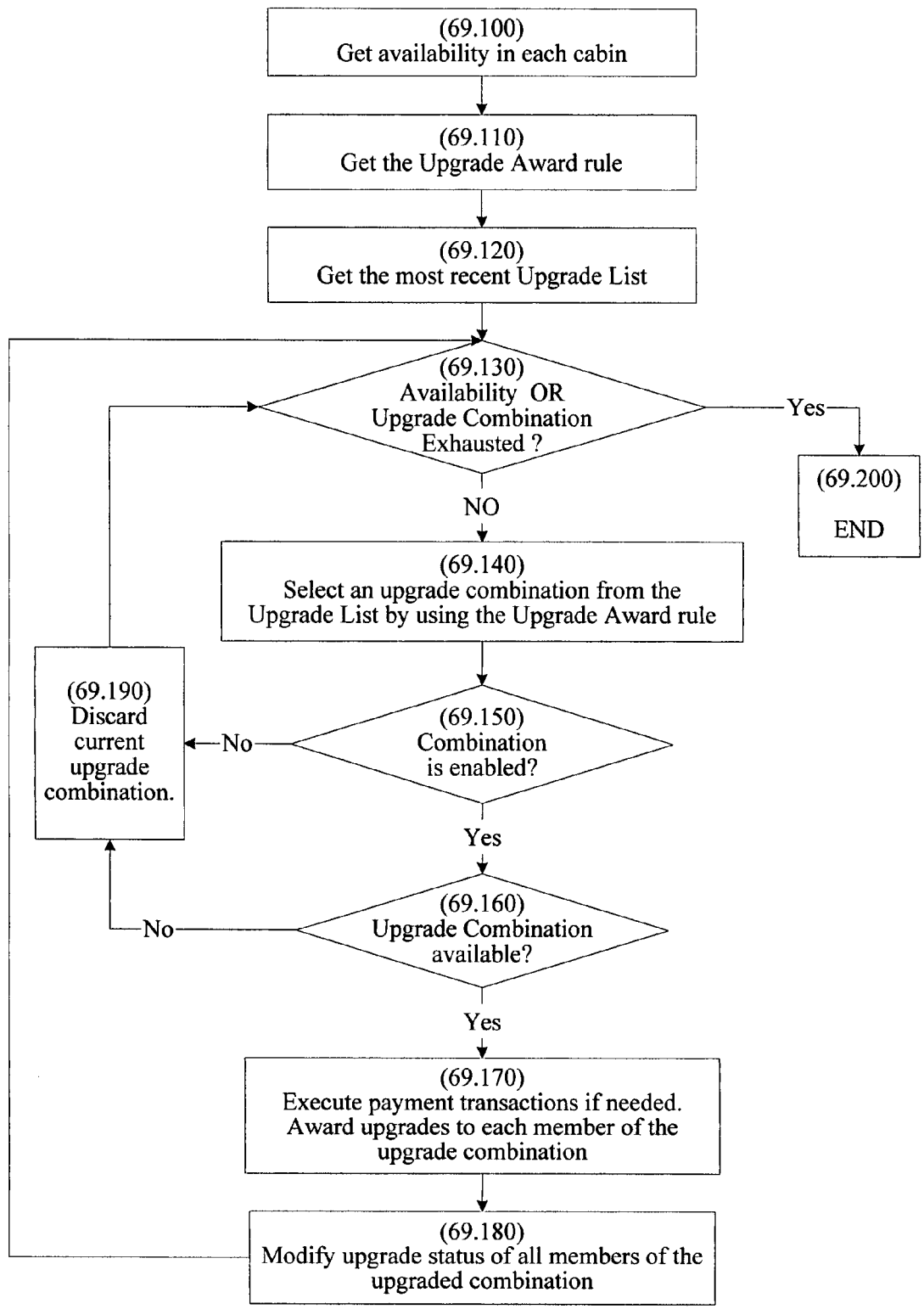
FIG. 69 is a flowchart that expands Act 130 of FIG. 66, illustrating an algorithm for the "Upgrade Award" process in UTO VOF implementation.

FIG. 69 presents an illustrative Upgrade Award process. The algorithm of Upgrade Award has been explained in the UPO VOF above. An airline may use any Upgrade Award rule of its choosing including, but not limited to, to maximize the total upgrade value (monetary or soft value or a combination of both), the number of upgrades or the number of customers in the flight, to balance load across multiple flights, to optimize customer service for all or a selected group of customers, to optimize flight operations and to accomplish any other objectives or combination thereof.

When the Upgrade Award rule is set to maximize the total upgrade value, the upgrade value of each combination member preferably is added together to get the total upgrade value of the entire upgrade combination. Then, all the upgrade combinations from all the upgrade lists (one for each Up Cabin) are combined together to form one list sorted by descending value, and the topmost upgrade combination is selected as the target to be considered first for an upgrade award.

When the Upgrade Award rule is set to maximize the number of customers in the flight, the number of upgrade awards given to standby customers has to be optimized. Hence, an upgrade combination that includes a standby customer should be given preference over the one that does not include it. Consider a flight with only two seats available in the first cabin. Assume there are two CF (UTO) customers and two SF standby customers (for first cabin). In this case, the Upgrade Award algorithm will allocate seats to the two standby customers since this would increase the customer count in the flight by two as compared to a no increase in the total customer count if the two CFs are upgraded (assuming no SC standby customers are available). For the same example, if the Upgrade Award rule is set to maximize the total number of upgrades, the algorithm would choose those customers (out of 2 standby and 2 CF) that belong to the upgrade combinations with more number of members. An airline may also choose to select the target upgrade combination randomly: to add all the upgrade combinations from all the upgrade lists of a flight to one list and then to randomly select an upgrade combination as the target combination.

An upgrade award may be given at any time before the flight arrives at its final destination or before the flight departure. It may also be given at a pre-determined time. For one or more Upgrade Award rules, an airline may need to iterate over possible solutions. Especially in the Act 69.140, the process to choose the target upgrade combination may involve one or more sub-acts (one or more of which may be iterative) that enable the airline to accomplish the overall objective.

The airline may use the Upgrade Award rules mentioned above to optimize the desired objective(s) within one flight or across multiple flights. For example, a CF UTO customer in flight F1, may be offered an upgrade to the first cabin in flight F2, when doing so would optimize the total upgrade revenue generated or distribute the load more uniformly across the two flights (e.g., the flight F1 may not have a seat available in the first cabin).

In situations, when there are more than one upgrade combination with the same optimal value, the airline may use next level (one or more levels as needed) of Upgrade Award rule(s) to further prioritize the upgrade combinations. The next level of upgrade combination could include one or more of the rules defined above.

Both the airline and the customer may have the right to enforce the upgrade award on each other as per the terms and conditions of the option contract. The airline may have the right to charge the customer for the upgrade amount if the customer is upgraded. The airline may inform/notify the customer and/or take approval from customer to charge the customer's account before awarding upgrade. The customer may also have the right to enforce upgrade on the airline within the bounds of the terms and conditions of the options contract.

The terms and conditions of the option contract may also specify fulfillment of one or more conditions before the airline may award upgrade to the customers. Some of the conditions may be such as payment for upgrade, availability of seat in the highest cabin prior to airline starting the upgrades and so forth.

Example of UTO Exercise Process for an Airline Flight

Consider an airline flight with 3 cabins, first, business and coach. A list of all the upgrade-enabled customers (along with their UTO Types and upgrade values) for this flight is presented in FIG. 70. The list contains a few UTO customers, referred to as UTO, a few customers who belong to other 'regular' (i.e., non-option) upgrade programs, referred to as Freebie or FRB, in short, and a few standby customers, referred to as SBY. There is one run scheduled for the Upgrade List at 30 minutes prior to the flight departure, and one for Upgrade Award, at 25 minutes prior to departure. The following demonstrates an execution of the algorithms for the UTO Exercise process for the flight mentioned above.

Per Act 66.100, the above flight is taken in as an input. Next, control goes to Act 66.110, where a test is performed to determine whether it is time to run Upgrade List or Upgrade Award. When it is 30 minutes prior to departure, the scheduler triggers the Upgrade List process, per Act 66.120. The Upgrade List process creates a list of upgrade combinations for the given input. Next, control goes to Act 66.140, where a test is made to determine whether any more scheduled runs (for the Upgrade List or the Upgrade Award) are pending. There is one scheduled run pending for the Upgrade Award. So, control loops back to Act 66.120. The scheduler waits until it is 25 minutes to departure. At that point, the scheduler triggers the Upgrade Award process, per Act 66.130, which awards the customers based on the given availability in the cabins. Next, control goes to Act 66.140, where the test is run to determine whether any more scheduled runs are pending. There are none, so, the algorithm ends at this point (Box 66.200).

Details of the Upgrade List Process

Figure 70:
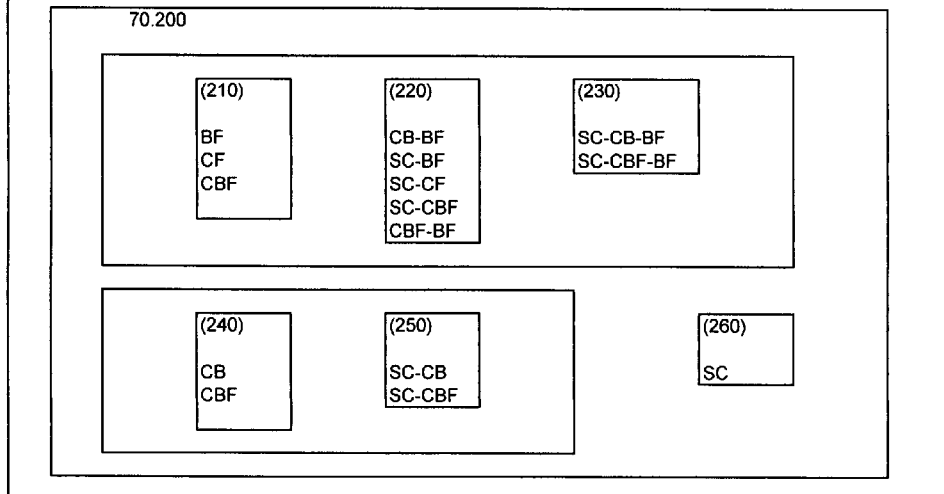

Per Act 67.100, the list of customers as shown in FIG. 70 (along with their UTO Types and upgrade values) for the flight is taken as an input. The standby customers are assumed to exist in a dummy cabin, Standby (S), that has the lowest priority among all the flight cabins (i.e., S<C<B<F). There are a total of 5 customers in the list. The first column in Box 70.100 displays the UTO Type of each customer. The second column in the Box 70.100 displays the type of customer (UTO or FRB or SBY). All customers are assigned a unique name, as per the third column in the Box 70.100, based on their UTO Type and a numeric value. For example, the customers with UTO Type CF are referred to as CF. 'Up cabin', the fourth column in Box 70.100, defines the Up cabin to which each customer may be upgraded. The Upgrade Value for all customers has been calculated using the method defined earlier and shown in the Box 70.100. For each row, the fifth, sixth, seventh and eighth columns display the payment value, soft value, upgrade cost and total upgrade value, respectively, for the corresponding customer.

Next, control goes to Act 67.110, where a list of the types of Upgrade combinations for the input flight are obtained (e.g., from the airline's UTO database), as presented in the Box 70.200. The Boxes 70.210, 70.220 and 70.230 display all the types of upgrade combinations with one, two and three members, respectively for the first cabin. The Boxes 70.240 and 70.250 display all the types of upgrade combinations with one and two members, respectively for the business cabin. Box 70.260 displays all the types of upgrade combinations with one member for the coach cabin.

Next, per Acts 67.120 and 67.130, all the upgrade combinations are created as shown in FIG. 71. There are seven columns and 15 rows shown in FIG. 71. Each row corresponds to one upgrade combination leading to a total of 15 upgrade combinations. For each row, the entries in the first three columns display the members of that upgrade combination. The first column displays the member (if any) for which the Up cabin is first. The second column displays the member (if any) for which the Up cabin is business. The third column displays the member (if any) for which the Up cabin is coach. If there is no entry in either one or more columns (first, second or third) for a row, this implies that there is no member in that combination with an Up cabin associated with that column. For example, the upgrade combination in the $5^{th}$ row, CBF1-SC1, does not have an entry in the first column, since it does not have a member who is entitled to an upgrade to the first cabin. The upgrade combinations for the first cabin are listed using the regular font, those for the business cabin are listed using the italics font and those for the coach cabin are listed using the bold font.

For each row, the fourth, fifth and sixth columns display the total upgrade value of the member of the upgrade combination listed in the first, second and third column, respectively. For each row, the entry in the seventh column displays the total upgrade value of the entire combination, which is the sum of the upgrade values of each of the combination member. Once all the upgrade combinations are created, control goes to Act 67.130, where the upgrade list is returned, and then the algorithm ends per Box 67.200.

Details of the Upgrade Award Process

In the Upgrade Award process, per Act 69.100, the availability in each cabin is taken as input. In this case, the first cabin and the business cabin each has one seat available, and there is no availability in the coach cabin, as shown in Box 72.100.

Per Act 69.110, the Upgrade Award Rule is obtained, that specifies the objective to "maximize upgrade value". In Act 69.120, the most recent Upgrade List is obtained (e.g., from the airline's UTO system database), as shown in FIG. 71. Next, control goes to Act 69.130, where the test comes out to be negative, as neither availability nor UTO customer have been exhausted. So, control goes to Act 69.140, where the Upgrade Award rule is used to select the target upgrade combination with the maximum upgrade value, which is the combination in the $1^{st}$ row, BF1-CBF1-SC1, as shown in the first row in FIG. 71.

Next, per Act 69.150, a test is performed to determine whether the combination is enabled. The above combination is enabled. So, control goes to Act 69.160, where a test is performed to determine whether there is availability for the current selected upgrade combination. The current upgrade combination (BF1-CBF1-SC1) needs only one seat in the first cabin. There is one seat available in the first cabin, and hence, the test result is affirmative. So, control goes to Act 69.170, where all the members of the current upgrade combination are upgraded to their respective Up Cabins.

The customer BF1 is upgraded from business to first, CBF1 is upgraded from coach to business (using the seat emptied after BF1 is upgraded) and the standby customer SC1 is awarded a seat in coach (using the seat emptied after CBF1 is upgraded). This Act consumes only 1 available seat from the first cabin, and still 1 seat in business cabin is available. The total value generated from this upgrade is $280, as shown in the seventh column in the first row in FIG. 71. In this Act, before awarding the upgrades, the airline may have a requirement to execute payment transactions for some or all of the members of this combination. Since the standby customer SC1 may have already deposited the payment when he or she had bought the standby ticket; and the airline may need to execute a payment transaction for the UTO customers BF1 and CBF1 (i.e., to charge the exercise price of $70 and $90 to BF1 and CBF1, respectively). The airline may use any payment transaction mechanism to do so (e.g., a pre-stored credit card, debit card, direct bank account debit, third party service like paypal and so forth). Next, the upgrade status for all the combination members is modified to reflect their awarded status, per Act 69.180.

Next, control loops back to the Act 69.130, where the test result again comes out to be negative, as both availability (one seat is available in business cabin) and Upgrade Combinations (14 more) are not yet exhausted. So, control goes to Act 69.140, where the highest value upgrade combination is selected, which is the one in the second row, BF1-CB1-SC1, as shown in FIG. 71. Next, per Act 69.150, the test is performed to determine whether the combination is enabled. It is not, since both BF1 and SC1 have already been "awarded" and are currently in the disabled state. So, control goes to Act 69.190, where the current upgrade combination is discarded.

Next, control loops back again, and the Acts 69.130, 69.140, 69.150 and 69.190 are repeated 9 times. This is because of two reasons. First, the test in the Act 69.130 is negative each time, since both availability (one seat is available in business cabin) and the upgrade combinations are left. Second, the upgrade combinations from the third row to the eleventh row are disabled, and thus, discarded, per Act 69.190.

Next, control loops back to the Act 69.130, where the test result again comes out to be negative, as both availability (one seat is available in business cabin) and the Upgrade Combinations (4 more) are not yet exhausted. Next, control goes to the Act 69.140, where the upgrade combination BF1 in the $12^{th}$ row in FIG. 71 is selected. The combination is enabled and thus passes the test, per Act 69.150. Next, per Act 69.160, availability is tested for the current selected upgrade combination. The current upgrade combination CF1 needs only one available seat in the first cabin. Since, there is no seat available in the first cabin, and hence, the test result is negative.

Next, control loops back to the Act 69.130, where the test result again comes out to be negative, as both availability (one seat is available in business cabin) and the upgrade combinations (3 more) are not yet exhausted. The upgrade combination in the thirteenth and fourteenth row are disabled. Hence, no upgrade is possible.

Again, control loops back to the Act 69.130, where the test result again comes out to be negative, as both availability (one seat available in business cabin) and the Upgrade Combinations (1 more) are not yet exhausted. Next, control goes to the Act 69.140, where the upgrade combination CB1 in the fifteenth row in FIG. 71 is selected. The combination is enabled and thus passes the test, per Act 69.150. Next, per Act 69.160, the availability is tested for the current selected upgrade combination. The current upgrade combination CB1 needs only one seat in the first cabin. There is 1 seat available in the first cabin, and hence, the test result is affirmative.

Thus, control goes to Act 69.170, where all the members of the current upgrade combination are upgraded to their respective Up cabin. The customer CB1 is upgraded from coach to business cabin. If there is a payment condition required, that may be checked in this Act just before awarding the upgrades. Here, since CB1 is a FRB customer, there may be no payment transaction required for CB1. So, there may be no need to execute any payment transaction at this point.

The total value generated by this upgrade is $70, as shown in the seventh column in the fifteenth row in FIG. 71. Next, the upgrade status of all the members in the current upgrade combination is modified to reflect their awarded status, per Act 69.180. Next, control loops back to the Act 69.130, where the test result is affirmative, since there are no more seats and enabled upgrade combinations available. Therefore, the algorithm ends at this point (Box 69.200).

In the above example, as shown in Box 72.200, a total of four customers are awarded upgrades, out of which, 2 are UTO, 1 is Freebie and the rest 1 is standby customer. As evident, the algorithm does satisfy the objective of the upgrade award rule (i.e., to optimize the total value to the airline), and generates a total value of $390 for the airline.

It may also be possible that a freebie customer with a zero or some payment value gets the upgrade over the UTO customer with a higher payment value than the freebie customer. This may be because the soft value of the freebie customer may be higher than that of the UTO customer, which may lead to a higher total value for the upgrade combination containing the freebie customer when compared to that of the UTO.

Another observation which may be made is that some customers (for example, in the current instance, customer BF1) receive upgrade awards even though their individual upgrade values may be lower than the upgrade value of some other customers (for example, in the current instance, customer CF1). The upgrade value for BF1 is $90, and that of CF1 is $110. CF1 was not awarded upgrade ahead of BF1 because the total value of the upgrade combination takes precedence over the upgrade values of any individual member. The customer BF1 option has different UTO Type than CF1, and hence, he/she belong to different types of upgrade combinations. The total values of all the upgrade combinations that included CF1 were lower than those of the awarded upgrade combinations that included BF1.

An airline may use the UTO VOF for any other purpose of its choosing. In all such uses, the airline may use a system defined above in UFO VOF that may help to optimally allocate cabin capacity among customers. An example of another system (along with its methods and algorithms) that may be used to upgrade UTO customers within their selected UTO Cabins has already been discussed in detail in UFO VOF (i.e., the Buy_N process and Upgrade_U algorithm).

Customer Notification Process

In the Customer Notification (CN) process, a decision for the Chosen Cabin is notified to the customer. As mentioned earlier, the Chosen Cabin may be defined by the airline, the customer, another entity or any combination thereof. However, the airline may want to keep the right to select (or define) the Chosen Cabin in the UTO VOF. An airline may use any method of its choosing to define the Chosen Cabin. An airline may use a software application built on the method defined above to optimally define the Chosen Cabin to UTO customer.

Figure 73:
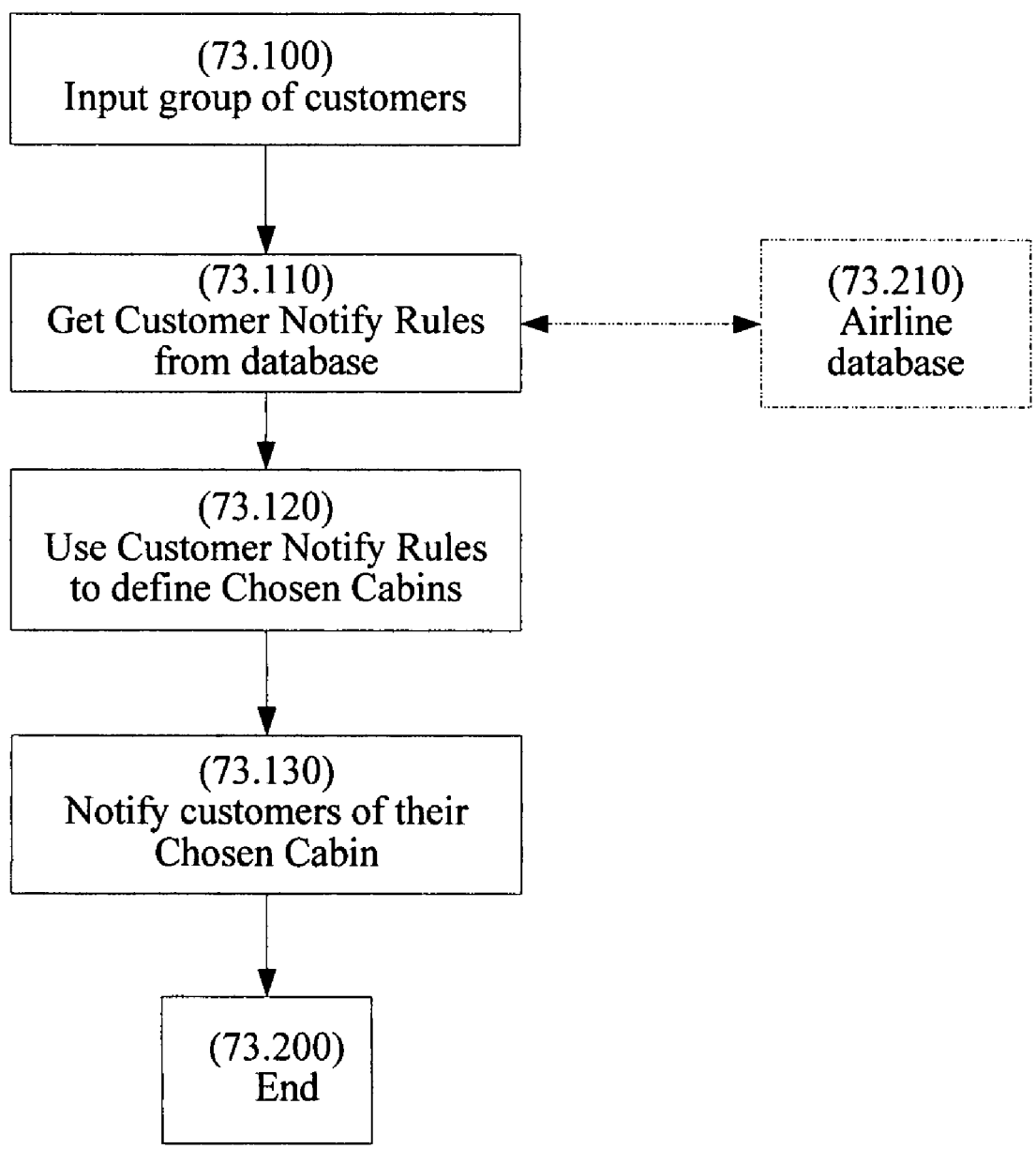
FIG. 73 is a flow chart illustrating an example of an algorithm of Customer Notification process in an airline industry.

FIG. 73 displays an example of an algorithm that may be used to execute the Customer Notification process. In Act 73.100, a group of (one or more) customers is taken as input. Next, in Act 73.110, a set of one or more Customer Notify Rules may be used to define the Chosen Cabin. An airline may choose any Customer Notify Rule of its choosing. The Customer Notify Rules may depend upon expected value of the cabin, expected sales volume and so forth. For example, an airline may choose a Customer Notify Rule which selects the cabin with the higher value as the Chosen Cabin. Alternatively, a rule may be chosen, which selects the cabin with the lower value as the Chosen Cabin. While defining the Chosen Cabin, an airline may also want to use the Upgrade_U algorithm (as used in the Buy_N process discussed in UFO) to determine the optimal Chosen Cabin that satisfies a pre-determined goal. Thus, during the CN process, one or more Ua may be upgraded in the process of selecting the optimal Chosen Cabin. A Customer Notify Rule may also select the cabin with the higher sales volume as the Chosen Cabin. A Customer Notify Rule may specify that if UTO VOF is used in conjunction with any other VOF (such as UTO VOF and so on), then the Grouping Rules may govern the selection of the Chosen Cabin.

Next, in Act 73.120, the Customer Notify Rules, thus obtained from the airline's database, are used to define Chosen Cabin(s). Next, in Act 73.130, the customers are notified about their Chosen Cabin(s), and the algorithm then ends in Box 73.200.

Implementation of UFO VOF (and/or UTO VOF) in Conjunction with Other VOFs

UFO (and/or UTO) VOF may be used in conjunction with one or more other VOFs, for example, the AFO (the Alternate Flight Option) VOF. A customer who receives an AFO is termed "A" type of customer. An airline and/or another entity may form a group of one or more AFO customers and one or more UFO customers, where the options (AFO and UFO) obtained by the group members are complimentary in nature. As an example, consider two customers A(F1, F2) and U[up (F2), base(F1)]. The notation A(F1, F2) implies a customer A who has received an AFO and has the flexibility to choose either of F1 or F2 as the Chosen Flight. The notation U[up (F2), base(F1)] implies a customer U who received a UFO and wishes to get an upgrade from F1 (i.e., the Base-Flight) to F2 (i.e., the Up Flight). Thus, if A decides to choose F1 as the Chosen Flight, the airline may upgrade U to F2. If A decides to choose F2 as the Chosen Flight, the airline may not upgrade U and hence U gets F1. The customers A and U have taken complimentary options and may form a group. The airline may need to hold only one unit of inventory in F1 and F2 to satisfy the needs of both A and U (assuming each A and U only need one flight). Such a combination of complimentary options or VOFs may improve efficiency and concurrently enhance value for all the parties involved (in the context of the current example, enhance value for U, A and the airline).

The implementation of the grouping of U type and A type of customers may be done in one or more ways. One way to implement such grouping is to first offer and secure one or more U type of customers and based on such customer(s), the airline may offer complimentary AFOs to customers to make groups. In another implementation, the airline may first offer and secure AFO customers and based on such AFO customer(s), airline offers complimentary UFOs to customers to make groups. In yet another implementation, the airline may offer UFO and AFO separately and then define a process to make complimentary groups of A and U customers (such groups termed "AU_Groups").

An airline and/or another entity may choose to create AU_Groups at various group levels such as implementation of grouping at Level 1, Level 2 and so on. In Level 1 grouping, an AU_Group involves one each of A and U type of customers. An example of Level 1 grouping has already been given above (the two customer, A and U, example).

In Level 2 grouping, the grouping involves making complimentary groups for more than 2 customers. As an example, consider three customers A(F1, F2, F3), U1[up(F2, F3), base (F1)] and U2[up(F1, F3), base(F2)]. The notation A(F1, F2, F3) implies a customer A who received an AFO on F1, F2 and F3 (flexibility to choose any one of F1, F2 or F3 as the Chosen Flight). The notation U1[up(F2, F3), base(F1)] implies a customer U1 who received a UFO and wishes to get an upgrade from F1 (Base-Flight) to either F2 or F3 (any of the two Up Flights), and U2[up(F1, F3), base(F2)] implies a customer U2 who received a UFO and wishes to get an upgrade from F2 (Base Flight) to either F1 or F3 (any of the two Up Flights). An airline may group these three customers together. If A decides to choose F1 as the Chosen Flight, the airline may upgrade U1 to F2 and U2 to F3. Alternatively, if A decides to choose F2 as the Chosen Flight, the airline may upgrade U1 to F3 and U2 to F1. In the third case, if A decides to choose F3 as the Chosen Flight, the airline may upgrade U1 to F2 and U2 to F1. Thus by grouping them together, the airline needed to hold only one unit of inventory in each of the three flights F1, F2 and F3 to satisfy needs for all three customers in all different situations.

It is assumed that a "unit" represents one unit of flight (or flight capacity) and each customer needs only one unit of a flight. Continuing with the above example, if the airline were to not consider the complimentary nature of options obtained by A, U1 and U2 customers, the airline may need to hold (or block) a total of 5 units (flights) of capacity to ensure complete satisfaction of needs of A, U1 and U2, i.e., 3 units (flights) for A (1 unit each of F1, F2 and F3 as A could choose any flight), 1 unit for U1 in F1 (Base-Flight) and 1 unit for U2 in F2. Even by blocking (or holding) 5 units (flights), there may be no guarantee that the airline would be able to satisfy upgrade needs for U1 or U2 (in the event they are not grouped together). This implies, to satisfy a total need of 3 units (flights), the airline may need to hold (or block) 5 units (flights), creating a redundant capacity of 2 units (flights) that the airline may not be able to use otherwise. By creating a complimentary group of A-U1-U2, the airline needs to only hold (or block) 3 units (flights) (F1, F2 and F3), thus, freeing up 2 units (flights) of redundant capacity. Thus, an AU_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A-U1-U2-U3.

An airline and/or another entity may choose to implement grouping at various levels such as Itinerary, Segment and Leg. An airline may also change terms and conditions of one or more option contracts of one or more UFO and/or AFO customers (for e.g., price, notify deadline and so on) to solicit customer participation in UFO/AFO to create more AU_Groups. The airline may also offer incentives to customers to choose complimentary UFO/AFO offerings to enable the airline to create more AU_Groups. The implementation methods mentioned above for grouping are for illustration purposes only and an airline may choose to implement grouping in one or more other ways or by combining above said methods or by combining one or more other ways along with one or more above said methods.

Figure 52:
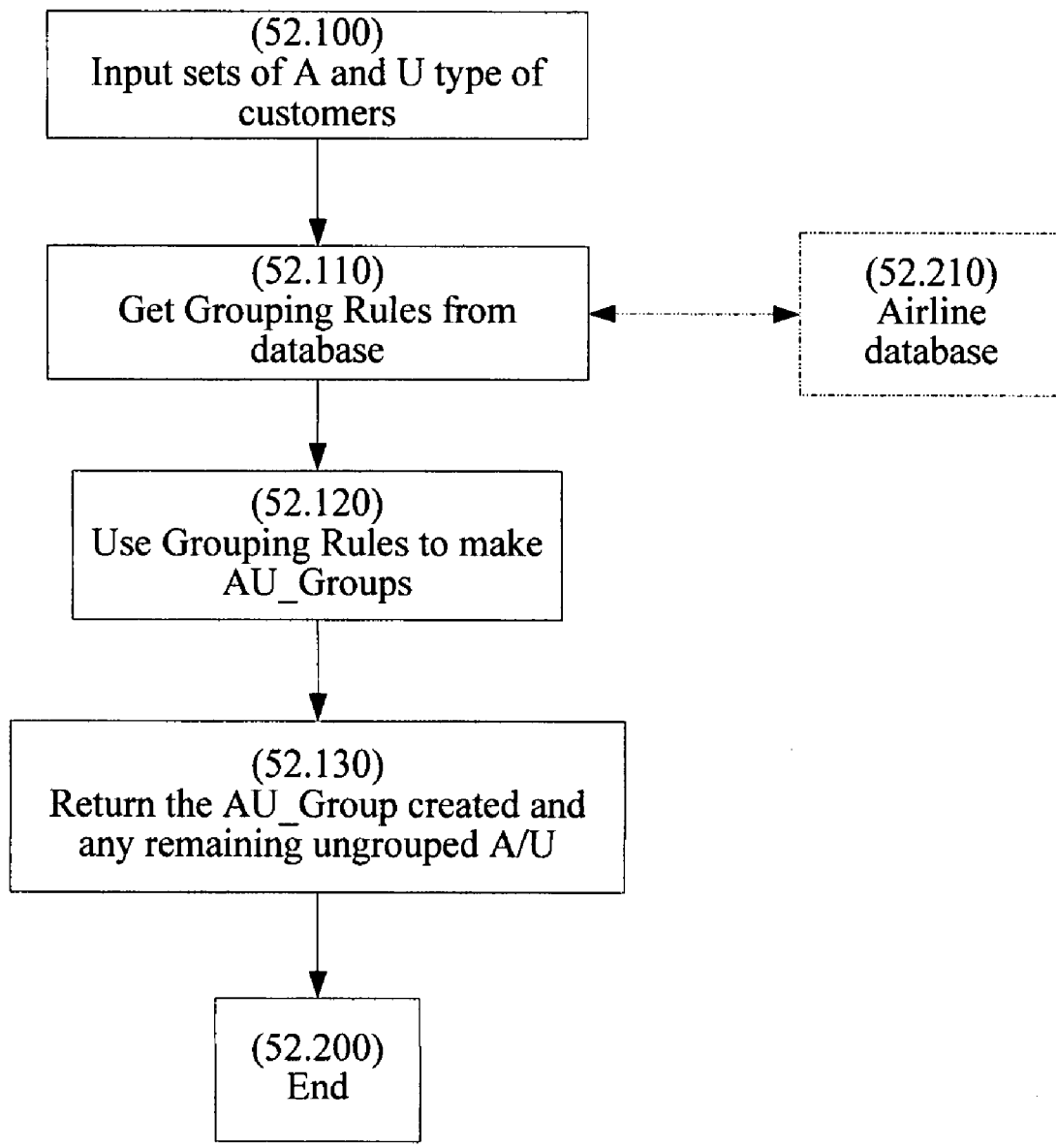
FIG. 52 is a flowchart illustrating an example of an algorithm to implement grouping of A and U type of customers in an airline industry.

FIG. 52 displays a flow chart that illustrates one way of implementing grouping of A and U type of customers. In Act 52.100, sets of A and U customers are taken as input. Next, in Act 52.110, a set of one or more Grouping Rules is read from the airline's database (52.210). A grouping rule may depend upon the number of A and/or U type of customers, desired capacity redundancy in the system, the permissible time factor to create AU_Groups, any other rule of airline choosing, any combination thereof and so on. For example, an airline may choose a Grouping Rule whereby new groups are created by first ungrouping one or more of the AU_Groups (created earlier but unexercised, for example, groups for which the customer has not been notified, or if notified, the customer has not utilized the Flight and the terms of option contract allows for a change in the Chosen Flight). In another example, a Grouping Rule may create groups of only those A and U type of customers who are yet to be grouped and discarding all A/U customers, which have already been grouped. An airline may implement any Grouping Rule to formulate AU_Groups. The choice to Grouping rules may enhance the overall value for the airline (for example, reduce the total capacity required to satisfy flight needs for all A and U customers). Theoretically, the number of the flight required (or blocked) should be equal to the number of the customers shall be eventually utilizing. Thus, by implementing the grouping and with the help of appropriate Grouping Rules, the airline may attempt to achieve such theoretical minima.

Next, in Act 52.120, the Grouping Rules, so obtained from the airline's database, are used to make AU_Groups. Next, in Act 52.130, the AU_Groups so created are returned along with ungrouped A/U, if any, and the process then ends in Box 52.200.

The grouping may enhance customers' experience, and may comprise operating a system that delivers a UFO to at least a "first customer" to utilize up to n of m selected flights for said first customer, where n is less than or equal to m; operating a system that delivers an AFO to at least a "second customer" to utilize up to k of p selected flights, where k is less than or equal to p; operating a system to define each of the k Chosen Flights, whereby after each of the k Chosen Flights is defined, said "second customer" can utilize said Chosen Flight; operating a system wherein an airline defines t Chosen Flight(s) for said "first customer" after each of said k Chosen Flights is defined, wherein after each of said t flights is defined, said first customer can utilize said defined flight, where t is less than or equal to n. Said t flights may be a subset of n flights, m flights or both. Said t flights or n flights or both may also include one or more flights not included in said m selected flights. Similarly, k flights may be a subset of p flights, or may include one or more flights other than said p flights. The grouping may be performed for a multiplicity of at least one of said first or second customers and may combine together at least one of each of said first and second customers to formulate at least one group with at least one complementary set of options. The grouping may enable an airline, an entity other than the airline or any combination thereof, to utilize at least one of said m or p flights at least after delivery of any of said first or second options. The airline and/or an entity other than said airline may implement UFO (and/or UTO) VOF where in the first and/or second customer in said grouping may be same. The notification conditions may be different, same or any combination thereof for the first and second option.

Said first and/or second option may or may not include any notification deadline condition. The airline, the second customer, an entity other than said airline and/or any combination thereof may define, at one or more times, at least one of said k Chosen Flights. The airline, the first customer, an entity other than said airline and/or any combination thereof may define, at one or more times, at least one of said p Chosen Flights. The first customer may select, at one or more times, at least one of said m flights. The second customer may select, at one or more times, at least one of said p flights. The airline and/or an entity other than the airline may receive from at least one of said first or second customer, at one or more times, an indication of one or more terms and conditions associated with said first or second options, respectively. Similarly, at least one of said airline and/or an entity other than said airline may deliver to at least one of said first or second customers, at one or more times, one or more terms and conditions associated with said first or second option, respectively. There may or may not be any payment transaction between the airline, an entity other than the airline, and at least one of said first and/or second customer.

UFO VOF may be used in conjunction with one or more other VOFs, for example, the FRO (Flexibility Reward Option) VOF. A customer who receives a FRO is termed "Y" type of customer. An airline may form a group of one or more FRO customers and one or more UFO customers, where the options (UFO and FRO) obtained by the group members are complimentary in nature.

The implementation of the grouping of U type and Y type of customers may be done in one or more ways. One way to implement such grouping is to first offer and secure one or more Y type of customers and based on such customer(s), the airline and/or another entity may offer complimentary UFOs to other customers to make groups. In another implementation, the airline may first offer and secure UFO and based on such UFO customer(s), airline offers complimentary FROs to other customers to make groups. In yet another implementation, the airline may offer UFO and FRO separately and then define a process to make complimentary groups of U and Y customers (such groups termed "UY_Groups").

An airline and/or another entity may choose to create UY_Groups at various group levels such as implementation of grouping at Level 1, Level 2 and so on. In Level 1 grouping, a UY_Group involves one each of U and Y type of customers. As an example, Level 2 grouping is given below.

In Level 2 grouping, the grouping involves making complimentary groups for more than 2 customers. As an example, consider three customers Y(F1, F3), U1[up(F2), base(F3)] and U2[up(F1), base(F2)]. The notation Y(F1, F3) implies a customer Y who has received a FRO and is flexible to have either F1 or F2 as the Chosen Flight. The notation U1[up(F2), base(F3)] implies a customer U1 who received a UFO and wishes to get an upgrade from F3 (i.e., the Base-Flight) to F2 (i.e., the Up Flight), and U2[up(F1), base(F2)] implies a customer U2 who received a UFO and wishes to get an upgrade from F2 (i.e., the Base-Flight) to F1 (i.e., the Up Flight). A notation Y-U1-U2 represents this example. Thus, there are three flights F1, F2, and F3 and they are occupied by Y, U2, and U1 respectively. The three customers have different value needs. The customer Y is flexible on either F1 or F3 if he/she receives a desired reward for trading-in his/her flexibility. The customer U1 has a Base-Flight F3 and wishes to get F2 as the Up Flight. If an airline is able to upgrade U1 to F2 from F3, it may generate incremental value for both the customer and the airline. But in the existing framework (i.e., without using conjunction of more than one VOFs), the airline may not be able to achieve this without an available capacity on flight F2. Similarly, U2 has a Base-Flight F2 and wishes to get F1 as the Up Flight. An airline may customize the desired values for the three customers by leveraging on Y's flexibility and upgrading U1 and U2. The airline may assign F3 as Chosen Flight to Y, upgrade U2 from F2 to F1, and upgrade U1 from F3 to F2. The airline may be able to generate customer surpluses in the process of U1 and U2 upgrades, which would not have been possible normally. Thus, an airline may be able to generate incremental value for all the parties involved and satisfy the desired needs to a level of customization. Such a combination of complimentary options or VOFs may improve efficiency and concurrently enhance value for all the parties involved (in the context of the current example, enhance value for Y, U1, U2 and the airline).

It is assumed that a "unit" represents one flight (or flight capacity) and each customer needs only one flight. Continuing with the above example, if the airline were to not consider the complimentary nature of options obtained by Y, U1 and U2 customers, the airline may need to hold (or block) more than 3 units (flights) of capacity to ensure complete satisfaction of needs of Y, U1 and U2. This implies, to satisfy a total need of 3 flights, the airline may need to hold (or block) more than 3 flights, creating a redundant capacity of at least one flight that the airline may not be able to use otherwise. By creating a complimentary group of Y-U1-U2, the airline does not need to hold any capacity, thus, freeing up the redundant capacity. Thus, a UY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be Y-U1-U2-U3.

An airline and/or another entity may choose to implement grouping at various levels. An airline may also change terms and conditions of one or more option contracts of one or more UFO and/or FRO customers to create more UY_Groups. The airline may also offer incentives to customers to choose complimentary UFO/FRO offerings to enable the airline to create more UY_Groups. The implementation methods mentioned above for grouping are for illustration purposes only and an airline may choose to implement grouping in one or more other ways or by combining above said methods or by combining one or more other ways along with one or more above said methods.

Figure 53:
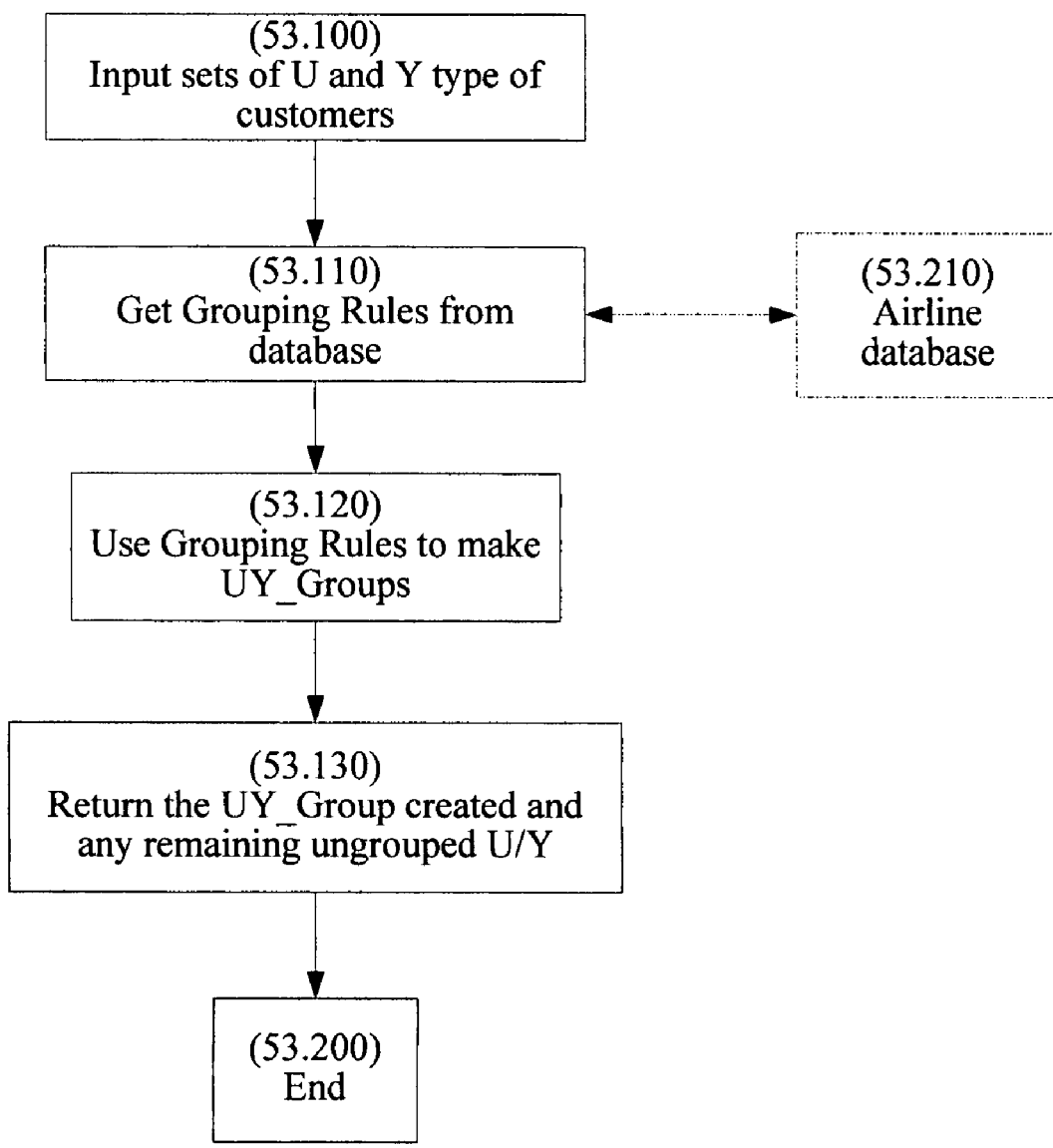
FIG. 53 is a flowchart illustrating an example of an algorithm to implement grouping of U and Y type of customers in an airline industry.

FIG. 53 displays a flow chart that illustrates one way of implementing grouping of U and Y type of customers. In Act 53.100, sets of U and Y customers are taken as input. Next, in Act 53.110, a set of one or more Grouping Rules is read from the airline's database (53.210). A grouping rule may depend upon the number of U and/or Y type of customers, desired capacity redundancy in the system, the permissible time factor to create UY_Groups, any other rule of airline choosing, any combination thereof and so on. For example, an airline may choose a Grouping Rule whereby new groups are created by first ungrouping one or more of the UY_Groups (created earlier but unexercised, for example, groups for which the customer has not been notified, or if notified, the customer has not utilized the Flight and the terms of option contract allows for a change in the Chosen Flight). In another example, a Grouping Rule may create groups of only those U and Y type of customers who have yet to be grouped and discarding all U/Y customers which have already been grouped. An airline may implement any Grouping Rule to formulate UY_Groups. The choice to Grouping rules may enhance the overall value for the airline (for example, reduce the total capacity required to satisfy flight needs for all U and Y customers). Theoretically, the number of the Flight required (or blocked) should be equal to the number of customers shall be eventually utilizing. Thus, by implementing the grouping and with the help of appropriate Grouping Rules, the airline may attempt to achieve such theoretical minima.

Next, in Act 53.120, the Grouping Rules, so obtained from the airline's database, are used to make UY_Groups. Next, in Act 53.130, the UY_Groups so created are returned along with ungrouped U/Y, if any, and the process then ends in Box 53.200.

The grouping may enhance customers' experience, and may comprise operating a system that delivers a UFO to at least a "first customer" to utilize up to n of m selected flights for said first customer, where n is less than or equal to m; operating a system that delivers a FRO to at least a "second customer" to utilize up to k of p selected flights, where k is less than or equal to p; operating a system to define each of the k Chosen Flights, whereby after each of the k Chosen Flights is defined, said second customer can utilize said Chosen Flight; operating a system wherein an airline defines t Chosen Flight(s) for said first customer after each of said k Chosen Flights is defined, wherein after each of said t flights is defined, said first customer can utilize said defined flight, where t is less than or equal to n. Said t flights may be a subset of n flights, m flights or both. Said t flights or n flights or both may also include one or more flights not included in said m selected flights. Similarly, k flights may be a subset of p flights, or may include one or more flights other than said p flights. The grouping may be performed for a multiplicity of at least one of said first or second customers and may combine together at least one of each of said first and second customers to formulate at least one group with at least one complementary set of options. The grouping may enable an airline, an entity other than the airline or any combination thereof, to utilize at least one of said m or p flights at least after delivery of any of said first or second options. The airline and/or an entity other than said airline may implement UFO (and/or UTO) VOF where in the first and/or second customer in said grouping may be same. The notification conditions may be different, same or any combination thereof for the first and second option.

Said first and/or second option may or may not include any notification deadline condition. The airline, the second customer, an entity other than said airline and/or any combination thereof may define, at one or more times, at least one of said k Chosen Flights. The airline, the first customer, an entity other than said airline and/or any combination thereof may define, at one or more times, at least one of said p Chosen Flights. The first customer may select, at one or more times, at least one of said m flights. The second customer may select, at one or more times, at least one of said p flights. The airline and/or an entity other than the airline may receive from at least one of said first or second customer, at one or more times, an indication of one or more terms and conditions associated with said first or second options, respectively. Similarly, at least one of said airline and/or an entity other than said airline may deliver to at least one of said first or second customers, at one or more times, one or more terms and conditions associated with said first or second option, respectively. There may or may not be any payment transaction between the airline, an entity other than the airline, and at least one of said first and/or second customer.

Business Model to Implement UFO and/or UTO in the Airline Industry

As discussed above, different business models may be used to implement a UFO (and/or UTO) VOF. The business models mentioned below may be used to implement UFO (and/or UTO) VOF in the airline industry. An airline may choose to implement a UFO (and/or UTO) VOF individually or in conjunction with one or more partners and/or other companies.

An airline may allocate some seat inventory to another entity. The term "allocation of seat(s)" or "allocation of seat inventory" "allocation of flight(s)" implies, without limitation, assigning one or more seats of one or more flights to an entity for any purpose or use by the entity either exclusively or non-exclusively. As explained in the sections above, for example, an entity may use the allocated seats to offer UFO and/or UTO) to customers and/or to sell the seats as regular seats. The allocation of seat may be conditional. For example, one of the conditions may require a return of at least one allocated seat within a specified time period and/or other consideration(s).

The customer may select or purchase one or more flights from the airline and/or said entity and then interact with said entity to receive (or purchase) one or more UFOs (and/or UTOs) in relation to said (already purchased) flights. Said entity may also receive seat allocation from more than one airline, and thus, offer flights from multiple airlines to a single customer during the Initial Transaction for UFO (and/or UTO).

The OA may use those seats and operate a service to offer UFOs (and/or UTOs) to the customers. As explained above in FIG. 13A, a customer may select (or receive) one or more flights from the OA, and then receive a UFO (and/or UTO) on one or more of those selected flights from the OA. Another approach would be for a customer to select (or receive) one or more flights from the airline and then receive the UFO (and/or UTO) option from the OA on one or more of those selected flights. In another example, a customer may select (or receive) one or more flights from both the airline and the OA, and then receive the UFO (and/or UTO) option on one or more of those selected flights from the OA. It is also possible that the customer receives a UFO (and/or UTO) from the airline or both from the airline and the OA on a given set of selected flights.

The OA and the airline may simultaneously offer UFOs (and/or UTOs) to the customers, i.e., a customer may either approach the airline or the OA to receive a UFO (and/or UTO) on desired flights. In another model, the OA may operate as the sole provider of UFO (and/or UTO) to all the customers of an airline. In a yet another model, the OA and the airline may choose to work together and jointly offer UFOs (and/or UTOs) to the customers. The OA or the airline may offer UFO (and/or UTO) to customers using either or both of the Sequential or the Concurrent Get UFO (and/or UTO) processes.

As explained in FIG. 13A above, an OA may be able to offer UFO (and/or UTO) on flights from one or multiple airlines. An OA may receive allocation of one or more seats in one or more cabins within one or more flights from two or more airlines. A customer may purchase one or more flights from one or more airlines and/or from the OA, and then receive a UFO (and/or UTO) option on one or more of those selected flights from the OA. Even if the OA may not be entitled to or does not receive seat allocation from an airline, it may still be able to formulate an agreement with one or more airlines to offer UFOs (and/or UTOs) on the flights of said airlines. Thus, a customer may be able to receive a UFO (and/or UTO) on flights from multiple airlines, giving the customer higher chances to get upgrade and a more variety to choose from. For example, a customer may receive a UFO (and/or UTO) on two flights from two different airlines and may get upgrades to either of those flights and the OA and/or any one or all of the airlines will then notify the customer about the Chosen Flight within the terms and conditions of the option contract. This may provide a lot of value for the customers.

An OA may be able to thus create a multi-airline UFO (and/or UTO) VOF Framework, which may tremendously enhance the value for the customers. All the participating airlines that allocate seats to and/or partner with the OA to offer UFO (and/or UTO) may also gain from an overall increase in the total spending by the consumers, enhanced overall customer satisfaction and/or other operational benefits. Either or both of the OA and the airline may process the tickets for the Chosen Flights associated with a UFO (and/or UTO) purchased (or received) by the customer. A customer may receive tickets from the OA or the airline for the flights related to the UFO (and/or UTO) grant. Any entity (e.g., the OA and the airline) may process tickets for the flights offered only by that entity or by either of the two entities.

The OA and the airline may engage in a business agreement to implement the UFO (and/or UTO) program. The business agreement may divide the total benefit generated by the UFO (and/or UTO) program between the two parties using any mechanism or criteria as desired. The total UFO (and/or UTO) Revenue Benefit may be shared between the two parties. The airline may allocate seats to the OA. One or more airlines may allocate only part or their entire seat inventory to the OA to offer those seats to the customers by way of regular sales and/or UFO (and/or UTO). The airline may allocate one or more Flights (and/or cabins) to at one or more entities other than said airline, and said one or more entities may deliver the option on one or more of the allocated Flights (and/or Cabins). In return, the OA may offer a revenue or fee to the airline for all or a portion of the seats allocated. This fee may be given only for the seats that the OA is able to utilize or for all the allocated seats. The lending fee may be a lump sum amount, may depend upon the number of seats allocated or may depend on one or more factors as desired. The agreement may include a provision where the OA may return the allocated seats back to the airline at a certain time and date. There may be one or more conditions associated with the return of unused seats and/or seats released from upgrades of customers from their Base-Flights (and/or Base-Cabins), including, but not limited to, returning the same seat, returning a higher value seat and so on. The airline may allot OA at least one flight and said OA may deliver UFO (and/or UTO) on at least one of said allocated flights. The OA may or may not enter into an agreement with the airline to provide such option on its flights. The OA may sell back at least one allocated flight to said airline or to at least one entity other than the airline or both. An OA may offer an airline flexible customer inventory (generated from UFO and/or UTO) at one or more terms and conditions. The airline may be able to use this flexibility to generate benefit from one or more ways, such as the Buy_N process, reducing operational costs and so forth. Some of these examples have been explained earlier. An OA may formulate an agreement with one or more airlines on one or more VOFs, such as on both AFO and UFO VOFs, to offer a combination of VOFs to customers.

The UFO (and/or UTO) VOF may include different conditions imposed on the customer regarding the payment of prices related to the UFO (and/or UTO). For example, a customer may be asked to make (or receive) payments only to the airline even if he/she may be receiving flights and/or options from the OA. Similarly, the customer may be required only to pay to (or receive from) the OA even if he or she may have received the flights and/or options from the airlines. The condition may also be set for a customer to make one or more payments to the airline for the flights and/or options received from that airline, and to make one or more payments to the OA for the flights and/or options received from that OA. The condition may allow the customer to make partial payments to the airline and the rest to the OA or vice versa, the basis of which distribution may depend upon various factors, including, but are not limited to, the factors of airline's choosing, the arrangement between the OA and the airline and so on. In another example, the customer may be required to pay to a third party or may be required to pay to any of the combination of the entities mentioned above.

Information Technology System for UFO and/or UTO

A client-server architecture may be used to implement the UFO and/or UTO VOF. However, an airline may use a computer hardware and software infrastructure of its choosing to implement a UFO and/or UTO VOF.

The UFO and/or UTO VOF may be best implemented using one or more computer-implemented methods to operate a computer-implemented service (and/or system) to offer UFOs (and/or UTOs, respectively) to the customers, that includes, but not limited to, recording the information pertaining to the offered and/or used (or sold) UFOs (and/or UTOs) in a database. It may also include operating a computer-implemented service (and/or system) or other service (and/or system) to execute the UFO (and/or UTO) Exercise process and award upgrades to one or more customers, to define the Chosen Flights, and recording the information pertaining to said upgrade awards, Chosen Flights (or defined Flights) and/or other related information and for all the flights related to a UFO (and/or UTO) in a database.

For the stage one (i.e., to formulate the UFO and/or UTO VOF), an application server may be used along with a database (e.g., a relational database) that stores all the information relevant to the airline and the customer. The database may include all the relevant information sufficient to identify flights the airline chooses to make eligible for UFO (and/or UTO). One or more users (e.g., a business analyst or manager) may have full access to this server through Intranet or highly secured VPN environment to design an optimal value option framework. The database shall also store all the information pertaining to all the acts (in stage one) used by an airline while formulating the UFO (and/or UTO) VOF.

A similar or a different application server and/or a cluster of application servers (functioning concurrently) along with one or more web servers and a set of one or more database servers may be used for the Get UFO (and/or Get UTO) as explained in FIG. 13D above and UTO Exercise processes (including, but not limited to, Customer Notification processes) in the stage two of the UFO (and/or UTO) VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get UFO (and/or Get UTO) process and the Event Optimizer processes (including, but not limited to, the UTO Exercise process) may be computer-implemented as explained and discussed above in FIGS. 13D and 13E. All the customer interactions and the related information such as customer needs, inputs, payment transactions etc. are stored in this database, including information pertaining to the interactions even with those customers who may not purchase and/or receive UFO (and/or UTO). The systems for stage two and stage one should be maintained in a synchronized environment so that each system has access to the most current information and can communicate with each other.

As discussed above, there may be other ways for implementing the UFO (and/or UTO) VOF which may depend upon including, but not limited to, the scale of the implementation, business requirements and number of entities involved. The entities may interact through a series of hardware products and services with the OA/airline server(s). The OA may or may not be different than the airline and the OA server may be the same as that of the airline server. The customer may also interact with another entity operating the system other than the airline. The information technology and network system to implement UFO (and/or UTO) VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, an airline may have one or more separate temporary database structure wherein the entries are updated and stored until the final update is made in one or more main databases. One the final update is done, the entries in these temporary databases may be removed.

The entire system may run at the premises of OA, airline and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of airline's choice, ease of accessibility, infrastructure facilities. The structure or the interaction architecture of the system may vary depending on factors including, but not limited to, the set up of the airline, changes in the technology and with the introduction of new and better technology enhancing the interaction process.

A customer may interact with either one or more of the Get UFO (and/or Get UTO), Buy_N, the UFO (and/or UTO) Exercise process, the CN processes either directly or indirectly using a local or a remote terminal (e.g., a computer with a browser and an access to the Internet) that is able to access the web server(s) that host the Get UFO (and/or Get UTO) and UFO (and/or UTO) Exercise and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one and/or stage two may be hosted and run by the airline, an OA, a third party service provider or any combination of the above. In the model, where the OA receives seat allocation from the airline and offers UFO (and/or UTO) to the customers directly, the web server, application server and database for both stage one and stage two shall be managed by the OA. The OA may also have partial (or complete) access to the airline database and systems through a highly secured environment (for example, a virtual private network). In the model, when an OA and an airline tie-up together to provide UFO (and/or UTO), all the computer hardware and software infrastructure for both stage one and stage two may be hosted by either or both (mutually) of the sides depending upon the business agreement between them.

Upgrade Room Option (URO) Value Option Framework in the Hotel Industry

As explained above, UPO VOF can be implemented in any industry. The implementation of UPO in the hotel industry is discussed here in. Within the hotel industry, the customer preference for higher ranked rooms is used as the targeted value element. With respect to the selected value element (i.e., the customer preference for higher ranked room) in the hotel industry, the UPO VOF may be appropriately termed Upgrade Room Option (URO) VOF. A detailed demonstration of the URO VOF is presented below.

The first stage in the URO VOF involves steps (or acts) of: capturing customer dynamics, assessing hotel operations and economic factors, integrating customer dynamics with hotel economic factors, formulating the VOF and optimizing the VOF. The second stage involves carrying out a dynamic interaction with the customer and then executing an Event Optimizer process. The specific detailed steps with respect to the URO VOF will now be discussed The terms "Up Room" or "Up Rooms" refer to one or more rooms that rank higher than the other rooms of the hotel. The ranking here is assumed to be based on past customer preference. In the same context, the lower ranked room is referred to as the "Base-Room". The term "Base-Room" also refers to the room, which a customer has currently booked (or selected or purchased). And in that context, an "Up Room" refers to any higher ranked room to which the customer can theoretically be upgraded to. For example, in a hotel a VIP Suite may be considered as an Up Room to Guest Room.

First Stage: Formulation of "URO" Value Option Framework (1) Capturing Customer Dynamics In the hotel industry, the room offering comprises a complex framework of value elements. For some room features, rankings may be presumed (or are implicit). For example, ranking for rooms (e.g., VIP or business suites are ranked higher than the guest room), Room Price (e.g., lower price are ranked higher than higher price) and the days of room booking (weekend room price are high as compared to weekdays room price) may be presumed. There are other room features for which the ranking is subjective and may not be easy to presume such as window facing (window faces a good view i.e., lake or a sea), room selection (one room versus another) and so forth. A hotel may need to determine such rankings explicitly through interaction with various customers segments. As explained earlier, customers assign ranking to different room offerings. A customer may classify the room offerings into different groups (that may or may not be mutually exclusive) and assign a relative rank to each of them. For some room offerings, rankings may be implicit or well established or well known; for which a hotel may be able to assume/determine customer ranking that would satisfy the majority, based on an analysis of past customer behavior or other forms of market analysis. For some room offerings, the ranking may be very subjective; and may differ from one customer to another, and even for the same customer, may differ from time to time. For such rooms, a hotel may need to perform detailed interaction with customers to determine their ranking. In a customer's frame of mind, rooms with higher perceived utility (satisfaction) values are generally ranked higher than those with lower perceived utilities. Most customers would prefer to get a higher ranked room over a lower ranked room. When customers cannot get their desired room(s) due to unavailability, price or any other reasons or any combination of the above, they have to settle down with something below their desired value.

Figure 74:
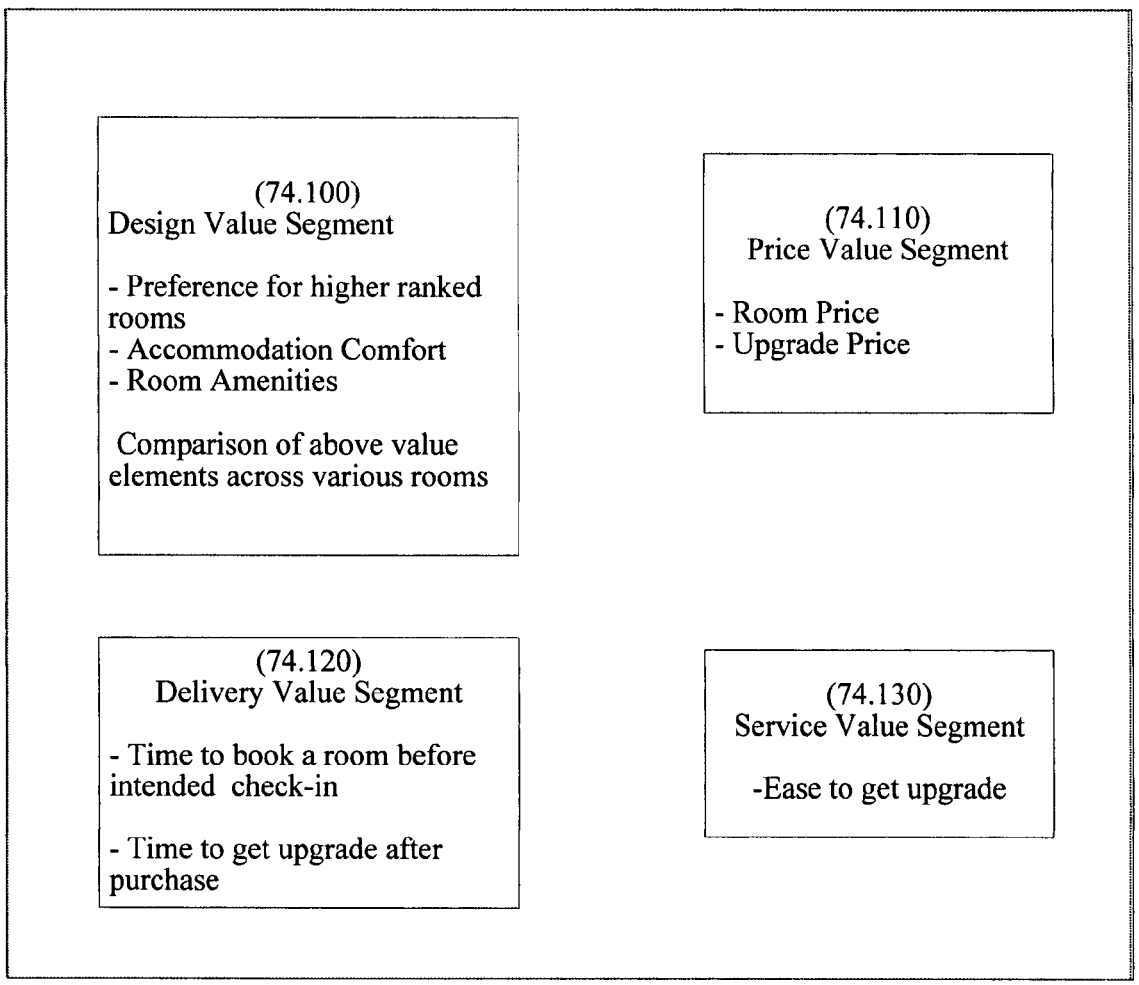
FIG. 74 is a diagrammatic illustration of an exemplary set of value segments and their value elements related to the URO VOF in context of the hotel industry.

FIG. 74 shows an analysis of the value elements that are believed to matter the most to customers in relation to a room upgrade. In the design value segment (shown in Box 74.100), important value elements may include, but are not limited to, customers' preference for higher ranked rooms, accommodation comfort, room location, amenities and special characteristics and/or features, if any, associated with the rooms. In the price value segment (shown in Box 74.110), important value elements may include, but are not limited to, Room Price and upgrade price. In the delivery value segment (shown in Box 74.120), important value elements may include, but are not limited to, time to request and get upgrade award, and how long before check-in the room must be purchased for the customer to be entitled to an upgrade. In the service value segment (shown in Box 74.130) important value elements may include, but are not limited to, the ease of getting the upgrade. It may be important to estimate the relative preferences and utilities of these value elements to customers for various rooms.

(2) Assessment of Hotel Economics

An assessment of the crucial economic factors of a hotel, as indicated in Box 75.100, may reveal these factors to include, but not be limited to, the fixed and variable costs, non-uniform distribution of demand across different Rooms under the same category (or rooms from various categories), higher price for higher ranked rooms, varying capacities of higher ranked rooms much more than the capacities in lower ranked rooms, possibility of revenue dilution, lost opportunity costs in offering free upgrades to customers through existing upgrade programs (if any), increasing competition from other hotels and so forth.

An assessment of the crucial economic factors, such as costs, constraints and capacities, may be performed, to determine the factors that affect the profitability, growth and goals of the hotel. It might be beneficial if the hotel utilizing the inventive system and method were able to express cost elements in a real-time or quasi-real-time (i.e., up to date) dynamic fashion so that such information may then be used to assess the profitability or contribution of each room sale opportunity, and to facilitate the operation of the Event Optimizer (so that offers and actions can be based on real-time or near-real-time information). Certainly that is not always required and would not be required in an industry where there is little change in cost elements over a significant time interval.

(3) Integration of Customer Dynamics with Hotel Economic Factors

Figure 75:
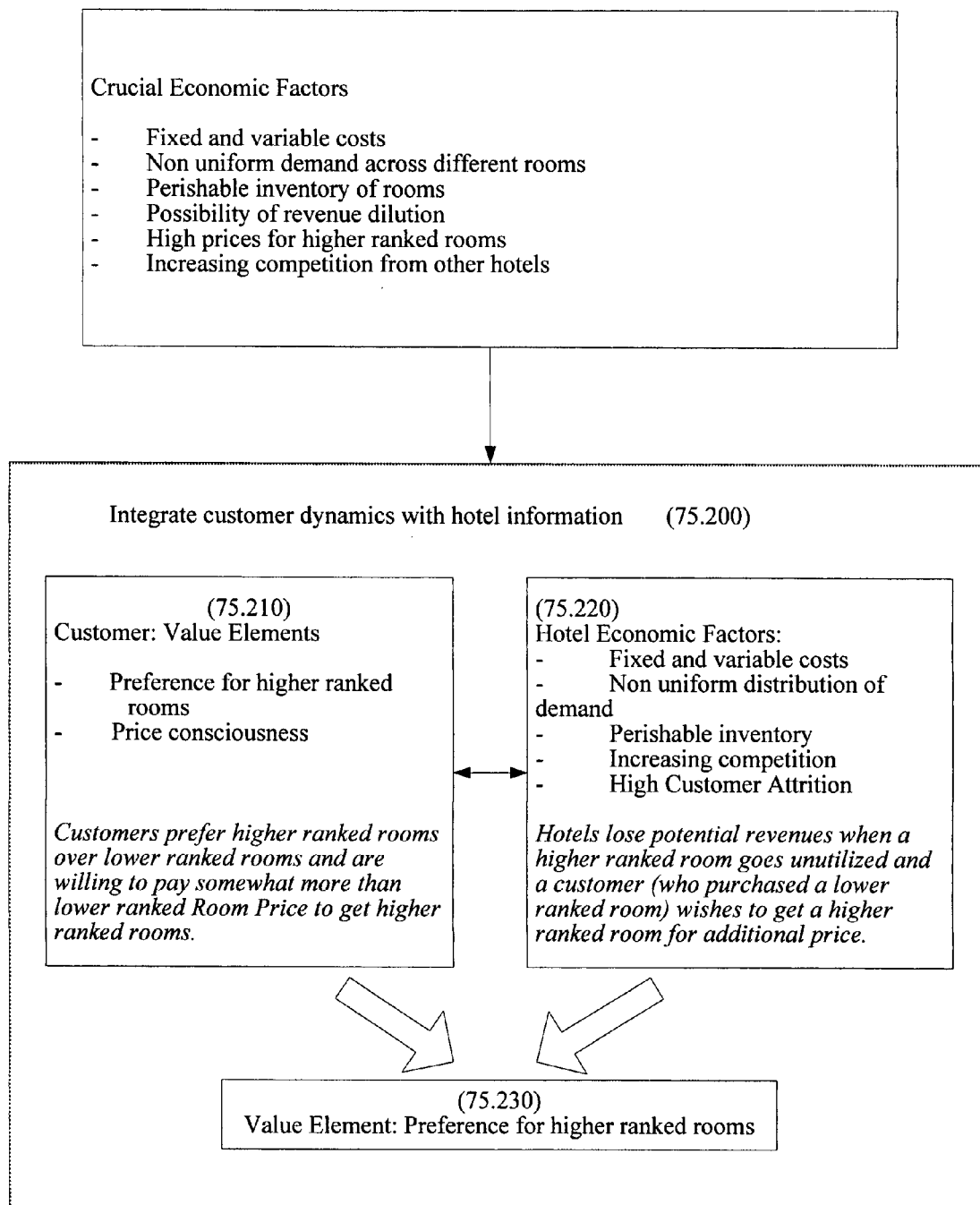
FIG. 75 is a diagrammatic illustration of hotel economic factors and mapping between customer dynamics and hotel economic factors in relation to URO VOF.

FIG. 75 also illustrates an example of how a mapping may be done, between customer value elements and hotel profiles, for the URO VOF in the hotel industry. On one side, there are customers who prefer higher ranked rooms to lower ranked rooms. However, customers are also concerned about the price differences between the higher ranked and the lower ranked rooms. All customers cannot afford to buy confirmed higher ranked rooms at regular prices. However, many customers would be willing to pay more than their Base Room Price to get higher ranked rooms. On the other side of the screen, if a hotel has surplus inventory or capacity or there is delay in selling of a higher ranked room, that condition probably represents the loss of potential revenue (and/or opportunity cost) for that hotel. This is true even if no other potential customers have been turned away, simply because there may be one or more customers, who may have purchased other lower ranked rooms (Base-Rooms) of the same (or different) hotel, willing to switch to the unused higher ranked surplus rooms or capacity (i.e., Up Rooms) at appropriate price/terms, but they are not given an opportunity to do so. It would be certainly very helpful for a hotel to know the relative preferences of customers with respect to higher ranked rooms. However, today there is no framework that allows hotels to do so in an optimal fashion such that both hotel and the customer benefit at the same time. An opportunity, thus, exists to concurrently generate an incremental revenue benefit for the hotel from consumer surplus, and to maximize the purchase utilities for the customers as a group (includes those who have a preference for higher ranked rooms at appropriate prices). More specifically, as shown in the interaction between the Box 75.210 and Box 75.220, a mapping is performed between important customer value elements and the hotel economic factors. The value element "preference for higher ranked rooms" is extracted, as shown in Box 75.230, and a URO framework is created.

(4) Formulation of "URO" Value Option Framework in the Hotel Industry

Structure of URO Value Option Framework in the Hotel Industry

Figure 76:
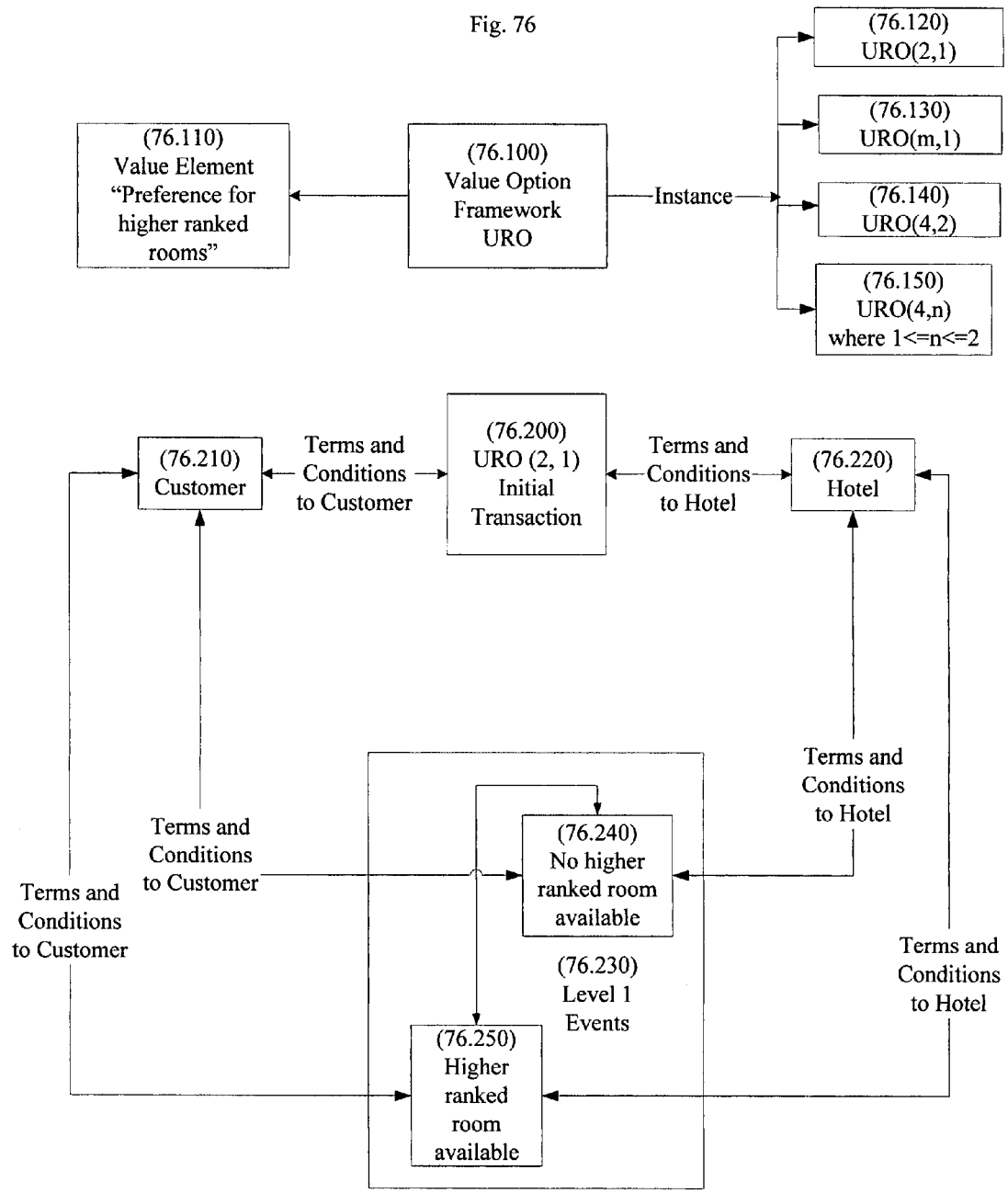
FIG. 76 is a partially-diagrammatic, partially-flow diagram representing the structure for creating a URO Value Option Framework in context of the hotel industry.

FIG. 76 displays the structure of a URO value option framework (shown in Box 76.100) in the hotel industry. The URO VOF is related to the value element "preference for higher ranked rooms", as shown in Box 76.110.

In the "Initial Transaction" for URO, shown by Box 76.200, a customer (shown by Box 76.210) and a hotel (shown by Box 76.220) transact on the URO value option. The first event in the URO VOF is referred to as Initial Transaction, shown by Box 76.200, in which a customer (shown by Box 76.210) and a hotel (shown by Box 76.220) transact on a URO value option. There may be one or more Events (shown by Box 76.230) that follow Initial Transaction.

In the successful Initial Transaction for a URO VOF between the hotel and the customer, the customer may receive a conditional option for an upgrade and the hotel may award the upgrade to the customer provided at least one condition on the option is satisfied and the hotel receives the payment for said upgrade. The customer's acceptance of said option may confer upon the hotel a right to enforce a payment obligation or relinquishment of one or more rights or both, as the case may be, on the customer, if said customer receives upgrade. A customer may select (purchase) one or more Base-Rooms and then select URO option on one or more Up Rooms. A hotel may award one or more Up Rooms from the selected URO rooms or from other rooms or any combination thereof. The hotel may or may not be the seller of said room and/or said option.

In another implementation of the URO VOF, during a successful Initial Transaction, a customer may receive an option to utilize up to 'n' out of 'm' selected rooms, where 'n' is less than or equal to 'm' (said 'm' rooms termed "URO Rooms"). The 'n' rooms that are finally selected are termed "Chosen Rooms". After each of the n Rooms is defined (or selected or chosen or received), the customer may have the right to utilize (or can utilize) said Chosen Room. Apart from the Chosen Rooms, the remaining rooms are termed "Released Rooms". The Released Rooms (if any, that were held or blocked for said customer) may be sold to other customers as normal rooms or URO Rooms or used for other purposes. The Released Rooms in relation to said option may be reused by the hotel before, after, at or any combination thereof, the time the Released Rooms and/or Chosen Rooms are defined (or received or selected). The m URO Rooms would contain all the selected Base-Rooms and Up Rooms, and the n Chosen Rooms would contain all the defined Base-Rooms and Up Rooms that the customer may utilize. Ideally, the customer may prefer to receive only Up Rooms in the defined n Chosen Rooms, since the customer would have higher utility for the Up Rooms, however, the Chosen Rooms may contain Up Rooms or Base-Rooms or both. Released Rooms may be utilized to generate revenue with or without reusing said Released Room.

Numerically, the value of 'm' is greater than or equal to 2 and the value of 'n' may vary from '0' to 'm' depending upon the specific implementation of the URO framework. The value of 'm' and/or 'n' may be known (or defined and/or re-defined) before, during, after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'm' and/or 'n' may be defined by the hotel, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The delivery of an option may include, but not limited to, electronic delivery of the option, physical delivery of the option, any other mode of delivery or any combination thereof. Once said option is delivered, one or more of m rooms may be available for use by the hotel, an entity other than the hotel and/or any combination thereof. The value of 'n' may be defined before, after or any time, the option being delivered to the customer. The delivery of option may occur in relation to the customer booking one or more rooms. The delivery of option may also occur in relation to the customer booking a room other than the room on which the option may be delivered. The customer may book a room other than the room on which the option is delivered to the customer. Said n rooms may be defined in one or more transactions. The hotel or an entity other than said hotel or any combination thereof may upgrade the customer without any subsequent interaction after delivering the option. However, in different implementations, the hotel (or an entity other than said hotel or any combination thereof) may upgrade the customer after one or more subsequent interactions.

The hotel and/or an entity other than the hotel may provide a data store which may contain data representing, with respect to one or more rooms, one or more options offered by the hotel and/or an entity other than the hotel and may use a server to receive inputs for at least said option and may search the data store for eligibility of rooms for at least said option. The server may display the search results and may receive one or more decisions of the customer about the acceptance of one or more of said search results. The hotel and/or another entity may operate an event optimizer system to receive data at least pertaining to said acceptance, and in response to the occurrence of one or more selected events from a set of one or more potential events, may execute one or more corresponding event response algorithms, wherein one or more of the servers or the event optimizer system may concurrently optimize a value for at least two of the hotel, the customer and an entity other than the hotel. Said search may include searching for one or more rooms or options based on said inputs. Said search may also identify results at least after taking into account business economics of at least the hotel offering said room or option. The search results may or may not include one or more options or rooms. The search results may include a room which may include an option and for which a price for the inclusion of said option is not separately identifiable within the total Room Price. The room eligibility may be decided by the hotel and/or an entity other than said hotel. Data pertaining to at least one of demand, preferences and associated relative utilities of the customer may be defined, implicitly or explicitly, at least during the interaction, before the interaction or at any other time.

The URO Rooms may be selected by the hotel, the customer, another entity or any combination thereof. The URO VOF may enable a hotel to obtain preferences for Up Rooms from URO customers (i.e., those who select URO) and use said preferences to satisfy the room needs of other customers and/or to optimize the value for hotel, customers, another entity and/or any combination thereof. Therefore, the hotel and/or another entity would usually have the right to select (or define) the Chosen Rooms. However, in different implementations of URO VOF, the hotel, the customer, another entity or any combination thereof may select one or more of the Chosen Rooms related to a URO. The URO Rooms and the Chosen Rooms may be selected by the same entity, different entities or any combination thereof. For example, the customer may select the URO Rooms and the hotel may select the Chosen Rooms out of the URO Rooms. The hotel may incorporate the customer information and the data related to the URO into the sales, production, inventory, other database or information system or any combination of the above.

The option granted to the customer may be conditional. One such condition (to upgrade) may be availability of the Up Room associated with the option. It may be possible that the Up Room availability associated with the option is the only condition included in the URO VOF. In one of the implementations of the URO VOF, the condition for upgrade may include at least one condition in addition to the availability of an upgrade. If so, after receiving the URO, a customer may receive a right to be upgraded if the Up Room is available at a certain time and under certain conditions established as the terms and conditions of the option contract. The time when an Initial Transaction is completed (i.e., the customer receives a URO) is referred to as the Initial Transaction Time (or ITT, in short). One or more Base-Rooms and Up Rooms may be selected, at one or more times, before, after, during, or any combination thereof, the Initial Transaction and/or the time said option is delivered to the customer (or the customer receives said option) or any combination thereof. All the URO Rooms may be selected concurrently (i.e., all together in one transaction) or sequentially (i.e., in multiple transactions).

In the sequential case, a customer may select one or more Rooms in one or more transactions before the Initial Transaction. Said selected Room(s) (let's say X number of them), thus, may be considered as part of m URO Rooms of the URO (m, n) transaction, and the customer may select only the remaining (m−X) number of URO Rooms during the Initial Transaction. All the transactions used to select (or receive) all the Base-Rooms of a URO transaction may be related to each other, and hence, may be considered as "related transactions" (as defined earlier).

In a URO VOF, the sequential process may comprise a number of "related transactions" when all the URO Rooms are received one after another by paying/receiving a price in one or more transactions or acts. The price may include, but is not limited to, a monetary value, coupons, discount vouchers, other benefits such as loyalty program benefits, or any combination of the above. The transactions may be related due to a relationship during the Initial Transaction, one or more of the previously executed transactions, any other transaction or combination thereof. In another implementation, the hotel and/or an entity other than said hotel may not exercise its right of enforcing the payment obligation upon the customer.

The URO VOF may also impose other conditions on the hotel and/or the customer. For instance, the option may impose a payment obligation on the customer if the hotel upgrades said customer. In another implementation, the option may impose a payment obligation on the customer to make a payment to the hotel and/or an entity other than said hotel at a time the hotel delivers said option. The option may confer a right upon the hotel and/or an entity other than said hotel to enforce payment obligation on the customer. The hotel may take a pre-authorization from the customer to charge the customer using any payment mechanism including, but not limited to, credit card, debit card, debit bank account, third party payment service provider, advance payment by the customer, any other means, or combination thereof. The hotel may award the upgrade to the customer only if the hotel receives a payment from the customer in relation to said upgrade. The customer may be required to pay one or more prices at one or more times to receive the option for the upgrade. The hotel may award the upgrade to a selected group of customers based on any criteria of hotel's choosing. For example, a hotel may choose to give preference to its loyalty program customers or high value customers over others. However, the hotel and/or an entity other than said hotel may or may not exercise its right of enforcing the payment obligation upon the customer. The customer may become entitled to the option to get an upgrade by making a payment, at least in part, when booking said room.

The URO VOF may also confer a right on the customer to enforce said upgrade provided at least one condition on said option is satisfied. For instance, a hotel may offer UROs with preference orders attached to it, i.e., if a customer purchases (or receives) a URO with a preference order of 1, said customer shall have the right to be the first customer among others to be awarded the upgrade. In this fashion, a right is conferred upon the customer to enforce the hotel to award the upgrade to the customer if Up Room is available at a certain time as per the terms and conditions of the option contract. The URO VOF may also impose a condition on the hotel to offer the Up Room to the customer and the customer may have the right to choose between the Base-Room and Up Room and subsequently notify the hotel about the Chosen Room. A customer may or may not be under a mandatory condition to accept the Chosen Room as selected by the hotel. The hotel or the customer may have the right to enforce the Chosen Room on the other party as per the terms and conditions of the option contract.

In another implementation of URO VOF, the option may require the customer to accept the upgrade offer. The upgrade may be an upgrade of at least one room. The customer may be upgraded to one or more than one Up Rooms. The customer may be upgraded, upon availability, to any of more than one Up Rooms. One available Up Room may lead to more than one upgrades. The customer may be presented a choice of conditional options to choose, prior to the hotel and/or an entity other than the hotel or any combination thereof, delivering at least one conditional option to the customer. The hotel may present to a customer said option requiring the customer to indicate the price the customer will pay for the upgrade if offered.

An instance of the URO VOF is illustrated in FIG. 76. The Box 76.200 illustrates an example of the Initial Transaction between the customer and a hotel, where the hotel offers the URO value option to the customer. In a successful Initial Transaction for the URO option, a customer may be required to pay a price ($X) to receive said option for an upgrade from the Guest Room (Base-Room) to the VIP Room (Up Room), and to agree to pay another amount ($Y) to the hotel if the hotel (then or later) upgrades the customer to the VIP Room. A hotel may choose to create one or more instances of the URO VOF based on factors including, but not limited to, number of URO Rooms, Up Rooms or Released Rooms, pre-determination of a number of Up Rooms or Released Rooms, other factors or any combination thereof. For example, a URO based on a combination of the number of URO Rooms (or m) and Chosen Rooms (or n) would be URO (m, n). Some URO instances are shown in Boxes 76.120, 76.130, 76.140 and 76.150. In the URO (2,1) instance, the customer selects two URO Rooms and the hotel may select any 'one' of those two Rooms as the Chosen Room depending on whether upgrade is available or not. If the number of Chosen Room is pre-determined, the URO (4, 2) instance may imply that the customer receives 4 URO Rooms, on the condition that the hotel may select any 2 out of 4 Rooms as Chosen Rooms. When the number of Chosen Rooms is not pre-determined, the URO (4, 2) instance may imply that the customer receives 4 URO Rooms, on the condition that the hotel may select none, one or 2 Chosen Rooms out of URO Rooms. There may also be a minimum limit on n. For example, the URO (4, n) (where 1<=n<=2) instance limits the hotel to select either 1 or 2 Chosen Rooms out of the 4 URO Rooms. As mentioned below in detail, such URO VOF implementations may also have price conditions to the customer. For example, in a URO (4, 2) implementation, a customer receives a URO to receive two out of any four selected URO Rooms, comprising two Base-Rooms, B1 and B2, and two Up Rooms, U1 and U2. The customer has made an Initial Payment of $1000. The hotel may define any two rooms as Chosen Rooms out of the 4 rooms as per the terms and conditions of the option contract. In the event, U1 or U2 or both is (are) defined as the Chosen Room(s), the customer is required pay $50 or $100 or $200 as the URO Exercise Price, respectively. If neither U1 or U2 (i.e. none of the Up Rooms) is defined as Chosen Room, i.e., both the Base-Rooms (B1 and B2) are defined as the Chosen Rooms, then the customer is not required to make any payment to the hotel. Under the terms and conditions of the option contract, if U1/U2 are available, then the hotel may define U1 and/or U2 as the Chosen Room and thus, the customer is able to utilize the Up Room once the corresponding payment is made.

The Initial Transaction may have terms and conditions applicable to the customer or the hotel or both. These terms and conditions may be set, preferably, to concurrently benefit both parties. The connections between Box 76.200 and 76.220, and Box 76.200 and 76.210 refer to the terms and conditions to the hotel and the customer, respectively.

The URO VOF may or may not include any constraints on the URO Rooms. For example, a hotel may restrict URO applicability and availability on Rooms that satisfy specific criteria. The two URO Rooms may or may not include practically constrained Rooms. Practical constraints may include one or more constraints that will prevent a customer to utilize a given Room or prevent the customer from utilizing all the URO Rooms. Such constraints may include, but are not limited to, time constraints, location constraints and so forth. In other words, it may or may not be practically possible for a customer to utilize one or more of the selected Rooms due to at least one practical constraint.

A customer may select (or receive) URO Rooms in several ways; through mutual agreement (e.g., during a direct interaction such as a Room purchase), or the hotel may grant the URO Rooms to the customer without soliciting their interest or permission. For example, to enhance customer satisfaction or for any other purpose, a hotel may grant URO Rooms to customers based on the past customer behavior, interaction and so on.

The Initial Transaction may impose one or more conditions on the hotel. A hotel may be required to explicitly notify the customer prior to or no later than a given date and time (referred to as the Notify Deadline) regarding the Chosen Room. If there is no such explicit notification condition, the Chosen Room may be decided as per the terms and conditions of the option contract. In either case, (explicit or implicit notification), the date and time when the selection of the Chosen Room is notified to the customer is referred to as the Customer Notification Time (or CNT, in short). In the current discussion, the explicit notification condition is assumed unless specifically mentioned otherwise. The Notify Deadline may be pre-determined or may be determined later (i.e., after the Initial Transaction) by the hotel, the customer, any other entity, or any combination thereof.

A hotel may determine one or more Notify Deadlines for a room at one or more times (e.g., before, during, after the Initial Transaction or any combination thereof) using factors including, but not limited to, customer needs, expected value of the room, hotel profitability goals, any other factors or any combination of the above. Customer factors should also be considered in determining the Notify Deadlines, such as the upgrade periods desired by customers, or any other factor that may affect the behavior of a customer.

The Notify Deadline may be pre-determined or may be determined later (i.e., after URO grant) by the hotel, the customer or mutually by both. There may be one or more Notify Deadlines, where each Notify Deadline may have a different price associated to it. There are several ways to implement this condition. One way is given, as follows. The price associated to the first Notify Deadline (i.e., the earliest among the Notify Deadlines) may be offered if the customer is notified anytime before the first Notify Deadline. The price associated to the second Notify Deadline (i.e., the second earliest among the Notify Deadlines) may be offered if the customer is notified after the first Notify Deadline and before the second Notify Deadline.

The terms and conditions of the URO VOF may not allow the hotel to notify the customer after the last Notify Deadline (i.e., the latest among the Notify Deadlines). In another implementation of the URO VOF, flexibility may also be provided to the customer to notify the hotel about the Chosen Room up to a stipulated Notify Deadline, once the hotel has offered the Up Room to the customer. As an operational measure, a rule may be set that if the hotel fails to notify the customer before the last Notify Deadline, the Base-Room becomes the Chosen Room and no upgrade is provided to the customer. Another approach may be set that if the customer fails to notify the hotel about the Chosen Room once the upgrade has been offered to him/her by the hotel, one or more of the Base-Rooms, Up Room and/or any combination thereof may be considered as the Chosen Room. The hotel may select Up Room as the Chosen Room and may charge Exercise Price and/or any other price to the customer. In another implementation, the hotel may select the Base-Room as the Chosen Room and a price may or may not be charged. Any entity (e.g., the hotel or the customer) may (or may not) be allowed to change the Default Room once it is selected. The URO Exercise Price (if any) in the default case may or may not be equal to the URO Exercise Price for the Default Room for the last Notify Deadline. In the current discussion, a single Notify Deadline is assumed.

The customer may be required to pay one or more prices during the Initial Transaction (and/or to receive a URO, referred to as an Initial Price), at the CNT (and/or the time the customer is upgraded, referred to as an Exercise Price) and/or at any other time, which may or may not be pre-determined between the customer and the hotel. The URO Price may be a pre-agreed fixed amount or it may be variable with or without bounds and set later or any combination of the above. There may or may not be any payment transaction related to the Initial Transaction. There may be one or more additional price conditions included in the URO VOF. The initial price and/or the exercise price may or may not be uniform for all UROs designed and/or offered to the customers; a hotel may choose any combination of uniform and/or non uniform prices for the initial and/or exercise price. The hotel may offer the customer a set of prices to choose from. Since price conditions may depend upon various factors, which may or may not be variable, the same may be decided at anytime. The price conditions may be determined by the customer, the hotel, another entity, or any combination thereof at one or more times. One or more prices (URO Initial or URO Exercise or any other price) may be a negative value, which reflects that instead of the customer paying the hotel, the hotel shall pay a price to the customer to get the desired Room as the Chosen Room.

One or more of the URO prices may be embedded with the Room Price. A customer may be presumed to accept the URO offer while displaying the embedded Room Price. These presumptions may (or may not) include soliciting prior interest of the customer regarding the URO offer. In the case that the URO price is merged with the Room Price, and where such price may or may not be separately identifiable, the customer may or may not receive a separate price for URO. The URO Price(s) may or may not be embedded within the Room Price. The customer may make the payment directly or indirectly (e.g., through a third party) to the hotel in relation to said upgrade. The Room Price may include a price for an upgrade, which may not be separately identified within the total Room Price.

The price may comprise a monetary value or a soft/non-monetary value (e.g., coupons, discount vouchers, other benefits such as loyalty program benefits, exchange of another service) or other consideration or any combination of the above. A price may include, but is not limited to, a set of one or more Room Prices, a set of one or more URO Prices (initial and/or exercise) or any combination of the above. A hotel may choose to implement URO Prices in many ways. A hotel may use the method of its choosing to decide on all the Room Prices. The URO Price (Initial, Exercise, and/or any other price, or any combination thereof) may be a function of number of URO Rooms and/or Chosen Rooms, specific rooms to be granted for URO Rooms, Up Rooms and/or Chosen Rooms, Notify Deadline, one or more Room Prices, any other factors of hotel's choosing or any combination of the above. Various option pricing strategies may be employed. For example, in a fixed price strategy, a user may be shown only one fixed price for the option. If the user purchases the option at a price much lower than his/her maximum price, the potential benefit for the hotel is less than what could have been achieved.

The above said pricing strategy limitation may be removed when a bidding process is used. Bidding may help to determine the highest price a user is willing to spend for the upgrade. In bidding, while buying the URO Option, the user may provide his/her highest offer for the final price. At the time of upgrade, if available, the hotel may charge the lowest price (less than the highest offer price selected by the user) that delivers the upgrade to the user. If even the highest offer price chosen by the user is lower than the minimum price needed to get the upgrade, then the user is not awarded the upgrade. The highest offer may be input free form or the hotel may provide a few choices from which the user may select one. The hotel may also ask, or determine empirically, how much customers will pay for the option. The assumption here is that customers make a logical decision to choose the Up Room and can afford to pay the sum of the initial and the exercise prices (if any).

The customer may or may not have to pay during the Initial Transaction. Initial Price may be subsequently returned to the customer, if the upgrade to the Up Room is not awarded to the customer. At the time of upgrade, Exercise Price may also be adjusted with the Initial Price paid by the customer. The hotel and/or another entity may issue a URO Pass for the customers in order to facilitate another payment mechanism. The payment for the room and/or the option may be made using the URO Pass. It may be possible while purchasing a set of one or more UROs or a URO Pass, there may be one or more conditions (e.g., such as time based or value based URO Pass) that limit the applicability of the UROs. A time based URO Pass may allow a customer to only be upgraded on the rooms that may be reserved (booked) or utilized within a specified time period. A value based URO Pass may allow a customer to get upgrades until the sum of the total payment needed for all the upgrades is less than or equal to the value of the URO Pass. The hotel and/or another entity may create various types of URO Pass. Hence, a customer may purchase a set of conditional options which may be intended to be utilized for future needs.

The payment transaction may include, but not limited to, direct payment received by the hotel from the customer, in lieu of relinquishment of one or more rights by the customer, indirect revenue generation (e.g., the customer relinquishes his/her right for an associated room or service, thereby allowing the hotel to use said associated room or service for revenues or use for other purposes), costs savings obtained (e.g., the customer relinquishes his/her right to services which saves costs for the hotel), enhanced customer service and loyalty and so forth. The rooms may or may not be related to the rooms of the hotel. One or more rights which the customer may relinquish may or may not be related to the rights conferred by the room. Apart from relinquishment of one or more rights by the customer, the URO VOF may have a condition to make additional payment to the hotel and/or an entity other than the hotel. The hotel may present various rights and may require the customers to pick a specified number of rights, thereby relinquishing other rights and in lieu of the relinquished rights, the customer may receive a conditional option for an upgrade.

Once the Initial Transaction is successful, there may be at least one related event. Each said event may be associated with various terms and conditions on the customer and/or the hotel. The hotel and/or the customers may have the right to enforce the Chosen Room(s) on the other party as per the terms and conditions of the option contract.

The terms and conditions of the option contract may be binding on the hotel and the customer only if the customer successfully accepts the hotel's offer of the option for the upgrade. The customer may be given a choice of options to choose from and take a decision.

In one of implementations of the URO VOF, the hotel may implement negative URO, i.e., instead of upgrading the customer to an Up Room, the hotel may downgrade the customer to a lower ranked room. The hotel may implement such negative upgrade in one or more situations. In one of its implementations, the hotel may implement negative upgrade (downgrade) when there may be huge demand for Up Rooms at very high prices so that the hotel may downgrade the customer who may have already bought the Up Room at relatively lower prices and may be willing to accept the lower ranked room in lieu of some or more rewards. In yet another instance of implementation of the negative upgrade, the hotel may implement it in the event when there may be huge demand for lower ranked room. The hotel may offer the Up Room to the customer and may give an option to downgrade to lower ranked room in future in case one becomes available. The hotel may offer discounts on higher ranked rooms, may offer to return the difference between the lower ranked room and higher ranked room, may offer additional reward to the customer and so forth. Hence, the hotel may be able to retain the customer (and not to lose him/her to the competitor) even in the event that the customer desiring a lower ranked room and the capacity of which may be exhausted with the hotel. The hotel may also be successful in this case in creating a flexible pool of customer inventory.

In one of the implementations of the URO VOF, the terms and conditions of the URO VOF may require the customer to purchase (or pay price for reserving) both the lower ranked and higher ranked rooms with a condition to cancel/return either of the two rooms as per the terms and conditions of the option contract. For example, a customer reserves a higher ranked room for $200 (when its actual price is $450) and a lower ranked room for $140 (when the actual price is $142) with a condition to return at least one of the rooms. Hence, the customer has paid $340 for reserving both the rooms with a condition to cancel the reservation for at least one of them. The terms and conditions of the option contract may provide different cancellation charges in different situations. Now, if the higher ranked room is not available, the terms and conditions of the option contract provides cancellation charges for higher ranked room as $5 where as the same for lower ranked room are $500 So, logically the customer will cancel the higher ranked room and in this case he/she would be refunded $195 and hence the net amount paid by the customer for getting the lower room would be $145 ($340 minus $195) which may be equal to the Room Price ($142) plus Initial URO Price ($3). In this case, the customer has not received the upgrade. Now, consider another case when the higher ranked room is available. The terms and conditions of the option contract provide cancellation charges in this case for higher ranked room as $400 where as there are no cancellation charges for cancelling the lower ranked room. So, logically the customer will cancel the lower ranked room and hence he/she would be refunded $140. So, the net amount paid by the customer for getting the upgrade (i.e., the higher ranked room) is $200 ($340 minus $140) instead of paying the full price (of $450) for getting the higher ranked room. The assumption here is that customers make a logical decision to choose which room to cancel.

In one of the implementation of the URO VOF, a hotel may upgrade the customer to a different hotel (may be of same or different category of hotel) in the same or different category of room or any combination thereof. The hotel may award an upgrade to the customer on availability of the one or more Up Rooms in one or more different hotels. In another implementation of the URO VOF, the hotel may upgrade the customer by awarding one or more rooms in one or more different hotels with or without better facilities. For example, a hotel ABC may have two hotels in New York namely XYZ and UVW. The hotel XYZ is a higher rated hotel than hotel UVW. A customer has booked a room in hotel UVW. The hotel may upgrade the customer an upgrade from hotel UVW to hotel XYZ and may award a room of same or different category.

The costs, revenues, benefits and conditions shown here are for illustration purposes only and actual values could be different depending on specific values selected by the users for value options, customer behavior, any factors of hotel schedule, pricing, any other factor or any combination of the above.

A URO VOF may include a right for a hotel to upgrade the customer to an Up Room before a stated Notify Deadline. The right may include the condition that the hotel may notify the customer before, at or after the stated Notify Deadline or any combination thereof. To provide flexibility to the customers, the hotel may offer (or allow) the customer to finally choose the Chosen Room once the hotel notifies the customer about the availability of the Up Room.

After the Initial Transaction, i.e., once the option has been granted (and/or sold) to a customer, there may be one or more potential events related to the associated URO option. For example, as shown by the Box 76.230, there are two related events (named Level 1 Events) for the URO option, namely, 1) Up Room is available at a certain time (shown in Box 76.250) and 2) Up Room is not available at a certain time as per the terms and conditions of the option contract, as shown in Box 76.240.

There may be Level 2 or higher level events associated with the URO option. If one or more Up Rooms are not given to the customers due to unavailability of Up Rooms in Level 1 events, the customer may be given one or more Up Rooms if said Up Rooms are available in Level 2 or higher events related to the URO option, later on. It may also be possible that even when one or more Up Rooms are available in Level 1 event which may or may not be given to the customer in Level 1 event, still later on, in Level 2 or higher events, if one or more Up Rooms are available, said one or more Up Rooms may be offered (given) to the customers. Said one or more Up Rooms may be given by the hotel, another entity and/or by both. The Up Rooms given in Level 2 or higher events may be given in exchange of one or more previously given Up Rooms or in addition to the earlier given Up Room(s).

If the event in the Box 76.250 happens, then as many customers as had selected the URO option may automatically be upgraded to the Up Room, within the terms and conditions of the URO option contract. There may, of course, have been more customers who had purchased upgrade options than the number of Up Rooms available to be used as upgrades. In this situation, the hotel may use any algorithm it desires in order to allocate the Up Rooms. For example, the customers may have been given the ability, while buying the option, to specify the maximum amount the customer is willing to pay to exercise the option. Then the hotel would probably choose to allocate all the available Up Rooms so as to maximize its revenue. If there are more sold options of equal value than Up Rooms that are available, the hotel may use any method it chooses to allocate the upgrades, such as assigning priority based on time of purchase, Room Price paid by the customer, random selection or any other customer priority factors like high buying customer and so forth.

A hotel may inform the customer of the decision related to the upgrade award via any communication channel including, but not limited to, an email, phone, in-person at hotel's office or sales counter, or may ask the customer to contact the hotel to know the decision and so forth.

Using URO, a hotel gets to know the relative preferences and utilities of the higher ranked rooms over the lower ranked rooms as some customers purchase this option and others don't. This may lead to an enhanced revenue benefit for the hotel as well as higher accommodation utility to the customer. There may be some increase in costs for the hotel, but generally, the additional revenue generated would be more than sufficient to account for the additional upgrade costs (if any). The hotel may better optimize its room capacity and may possibly be able to sell the lower ranked rooms to additional customers due to additional capacity generated for the lower ranked rooms (after a customer is upgraded to the Up Room from his/her Base-Room). A hotel may estimate the total number of expected upgrades and using the same, may estimate the capacity generated in the lower ranked rooms (due to potential upgrades). Using this estimate, a hotel may be able to add back these lower ranked rooms to the hotel inventory to be used for potential sales and/or other purposes.

The hotel and/or another entity may define customer preferences regarding one or more room upgrades and may use said preferences to upgrade one or more customers and may optimize value for at least one of customers, hotel and an entity other than the hotel. Said preferences may be used to assign ranking between two or more rooms. The ranking may be explicit and/or implicit and may be expressed/determined by the customer, the hotel or an entity other than the hotel or any combination thereof. The ranking may already be established or well known. The hotel and/or an entity other than the hotel, may establish, in advance of making the upgrade award, a ranking of attributes applicable to the room and may define upgrade possibilities. In another implementation of the URO VOF, the hotel may establish, in advance of delivering the option, a list of attributes applicable to the Room and associate therewith rankings expressed by the customer.

A customer who receives a URO is termed "U". In one implementation of URO, a hotel may want to hold capacity for the customer in only one of the URO Rooms, in which the status of said U customer is termed "Ua" (i.e., Accounted, which are one or more Base-Rooms or lower ranked rooms for the customer) and in the other URO Room(s), the status is termed "Uw" (i.e., Awaiting, which are one or more Up Rooms or higher ranked rooms for the customer). A "U" customer converts to an N customer after the CNT. Thus, at any given time, a hotel may have N, Ua and Uw type of customers for its rooms.

The URO VOF may help a hotel in one or more ways. For example, it may help to accommodate room requests from potential customers. Any new potential customer who requests to obtain a room is assumed to be an N customer. If the available quantity for the desired room (desired by N customer) is insufficient to satisfy the request, then the hotel may use the quantity (if any, of desired room) that has been assigned to Ua customers, and reassign the same to said N customer. Consequently, the hotel may then upgrade (assign the Awaiting rooms, i.e., the rooms where said Ua customers have Awaiting status to) said Ua customers. By implementing such upgrading of Ua customers from their Accounted rooms to Awaiting rooms, a hotel may better serve incoming demand for rooms. An event where such request comes to the hotel for a room is termed "Buy_N". The act to upgrade a Ua customer from its Accounted room (Base-Room) to its Awaiting room (Up Room) is termed "Upgrade_U". Detailed algorithms are presented below that may be used to manage a system comprising N, Ua and Uw type of customers. An Upgrade_U algorithm may be run independently of the Buy_N Process and may be used only to upgrade the customers from one or more lower ranked rooms to one or more higher ranked rooms.

FIG. 77 provides details on four typical instances of URO, namely, GB, GV, BV and GBV, that a hotel may create in the event there are three rooms in a hotel—guest room (G), business room (B) and VIP room (V). A sold URO may be defined by four parameters such as in the notation MN (I, F), where, M is the Base-Room (the current room of the customer when the option is purchased), N is the Up Room to which the customer who has selected/purchased/received the option can be upgraded, I is the initial price paid by the customer to buy the option, and F is the exercise price which will be paid by the customer if and when upgraded.

A customer booked in the guest room may purchase a GV or "guest to VIP" option to get an upgrade to the VIP room if one becomes available. Similarly, a GB or "guest to business" option may be purchased by a customer with a guest room to get a potential upgrade to the business room if one becomes available. Likewise, a GBV or a "guest to business or VIP" option may be made available to a customer who purchased a guest room, for a potential upgrade to either the business or the VIP room, depending on availability. A BV or "business to VIP" URO may be made available to a customer who has purchased the business room for potential upgrade to the VIP room if one becomes available.

When a hotel has only two rooms, (guest and VIP), there may be only one instance of URO, namely, GV. Obviously, the number of rooms within a hotel affects the total number of URO instances. The number of URO instances typically increases with an increase in the number of rooms within a hotel. The number of instances does not have to be equal to the number of rooms, of course. A hotel may create additional factors that could increase or decrease the number of product levels and, thus, option instances. Other amenities/services might be the basis for another arrangement of UROs. A hotel may choose to create one or more instances of a URO VOF based on factors including, but not limited to, number of rooms, customer needs, customer ranking across various rooms and/or products, room amenities, other services or products offered or any other factors.

A hotel may choose any set of criteria to create different levels of its room offerings. A hotel may choose to subdivide a physically distinct room into two or more sub rooms, where each sub room may act as a separate room level.

The costs, revenues, benefits and conditions shown here are for illustration purposes only and actual values could be different depending on specific values selected by the users for value options, customer behavior, hotel schedule, pricing, any other factor or any combination of the above.

URO Types Creator Algorithm (to Create URO Types or Instances)

Figure 78:
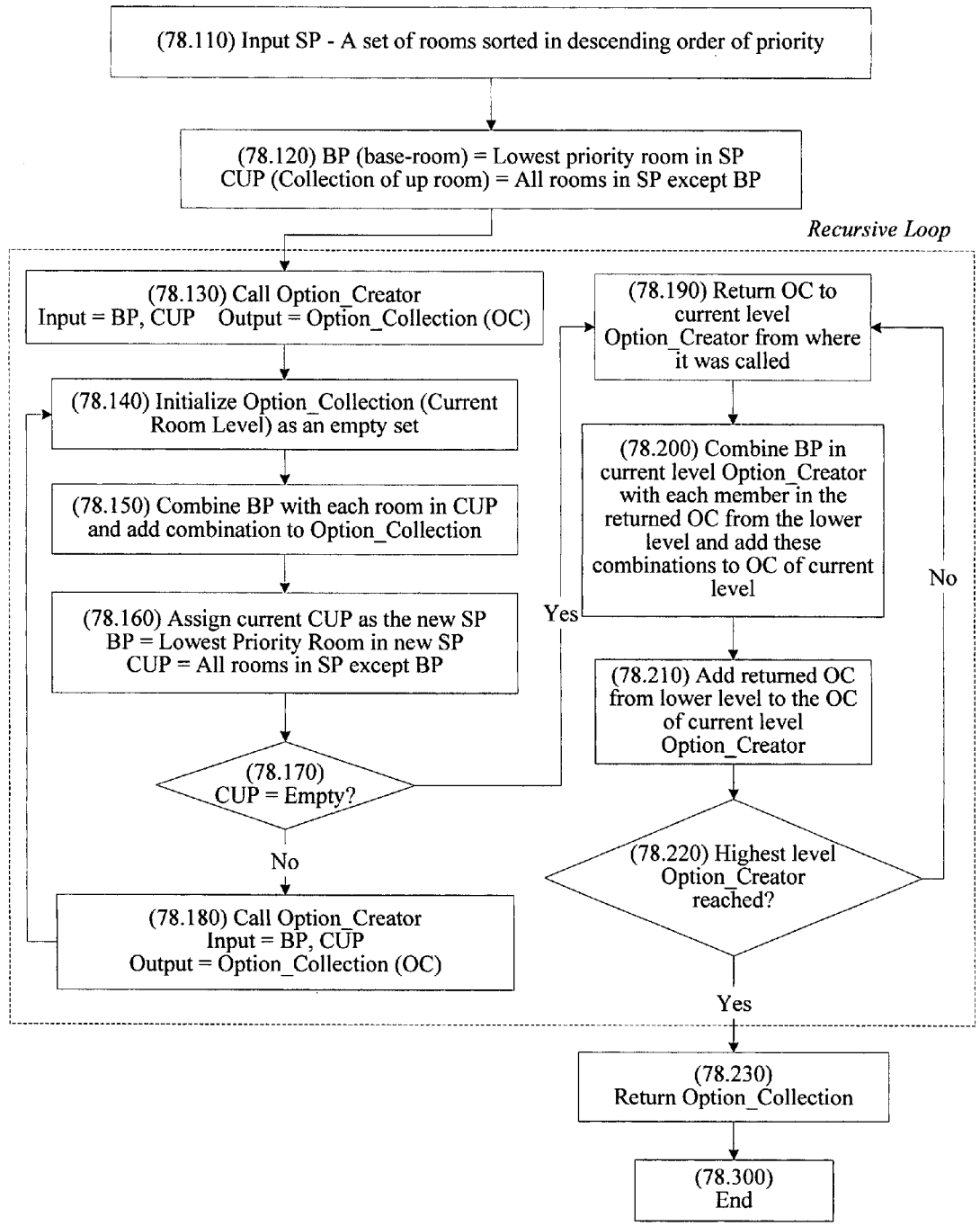
FIG. 78 is a flowchart of an algorithm to create URO options for a given number of entities.

The URO Types creator algorithm has been explained in detail in the UPO VOF. The implementation of URO Types Creator Algorithm in the context of the hotel industry has been explained through an example given below. The algorithm of FIG. 78 may be used to create URO instances in the hotel industry, as follows. Consider a hotel with 4 rooms, namely, A, B, C and D. The priority order among the rooms is A>B>C>D, where the room A has the highest rank and the room D has the lowest rank.

As in Act 78.110, a Set of Room Products is input to form the SP, with rooms sorted according to the descending order of priority, A>B>C>D. Per Act 78.120, the BP is set to D and the CUP is set to comprise Room Products C, B and A. Per Act 78.130, Option_Creator (D, [C, B, A]) is called, the notation (D, [C, B, A]) indicating D is input as the BP and the CUP is input as the set [C, B, A].

Next, per Act 78.140, the OC of the current level is initialized as an empty set. Then, a combination is formed of each Up Room in the CUP set [C, B, A] with Base-Room D and these combinations are added to the Option_Collection to form OC [DC, DB, DA], per Act 78.150. The current CUP set [C, B, A] is assigned as the new SP and the lowest ranked room in the new SP, i.e., C, is the new BP, per Act 78.160.

Per Act 78.170, a test is performed to determine if the CUP set is empty. It is not, so the process continues for a new (lower) level where Option_Creator (C, [B,A]) is called and executed. This is followed by another (lower) level where the Option_Creator (B, [A]) is called and executed. The Acts 78.140 to 78.180 are repeated in a loop until the CUP set is empty. In this case, that happens with A as the BP. Then the Option_Collection [BA] is returned at that point, per Act 78.190.

At this point, control is at Act 78.200, where C, the BP of the current level Option_Creator (C, [B, A]) is combined with each member of the returned OC[BA] from the lower level and the result [CBA] is added to the OC[CB, CA] of the current level.

OC=[CB, CA]+[CAB]=[CB, CA, CBA]

Control goes to Act 78.210, where the returned OC[BA] is added to the OC of the current level.

OC=[CB, CA, CBA]+[BA]=[BA, CB, CA, CBA]

Next, per Act 78.220, a test is performed to determine if the current level is the highest level for Option_Creator. It is not at this point, so control now goes back to Act 78.190, where the current OC is returned to the next higher level of Option_Creator (D, (C, B, A]). Next, the Acts 78.200 and 78.210 are repeated again for Option_Creator (D, (C, B, A]). Per Act 78.200, D (the current BP) is combined with each member of the returned OC[BA, CB, CA, CBA] from the lower level and these combinations [DCB, DCA, DBA, DCBA] are added to the OC of current level.

OC=[DC, DB, DA]+[DCB, DCA, DBA, DCBA]=
[DC, DB, DA, DCB, DCA, DBA, DCBA].

Per Act 78.210, the returned OC[BA, CB, CA, CBA] from lower level is added to the OC of current level.

OC=[DC, DB, DA, DCB, DCA, DBA, DCBA]+[BA, CB, CA, CBA]=[DC, DB, DA, BA, CB, CA, CBA, DCB, DCA, DBA, DCBA]

Next, per Act 78.220, a test is performed to determine if the current level is the highest level for Option_Creator. The current level is the highest level at this point, so at this point, control goes to Act 78.230, where the current OC is returned as the final output, and then the algorithm ends in Box 78.300.

(5) Optimization of URO VOF

As mentioned earlier (shown in FIG. 7), in the form of an optional last step in the first stage, a financial analysis may be performed URO using the existing hotel and customer data to determine the optimal terms and conditions of the URO VOF. 'What-if' scenarios may be executed to determine an optimal pricing strategy. The hotel may want to divide its customers using one or more criteria and design separate URO VOFs for each customer segment.

Second Stage: Using the URO Value Option Framework

After completing the first stage of the method, the hotel has created a URO VOF and specific value options within that framework. The hotel has also segmented customers and designed options accordingly. The hotel is fully prepared to use a structured format comprising one or more URO value options to interact with its customers in real time to generate benefits for both the hotel and its customers. The second stage of the URO VOF is now presented.

Figure 79:
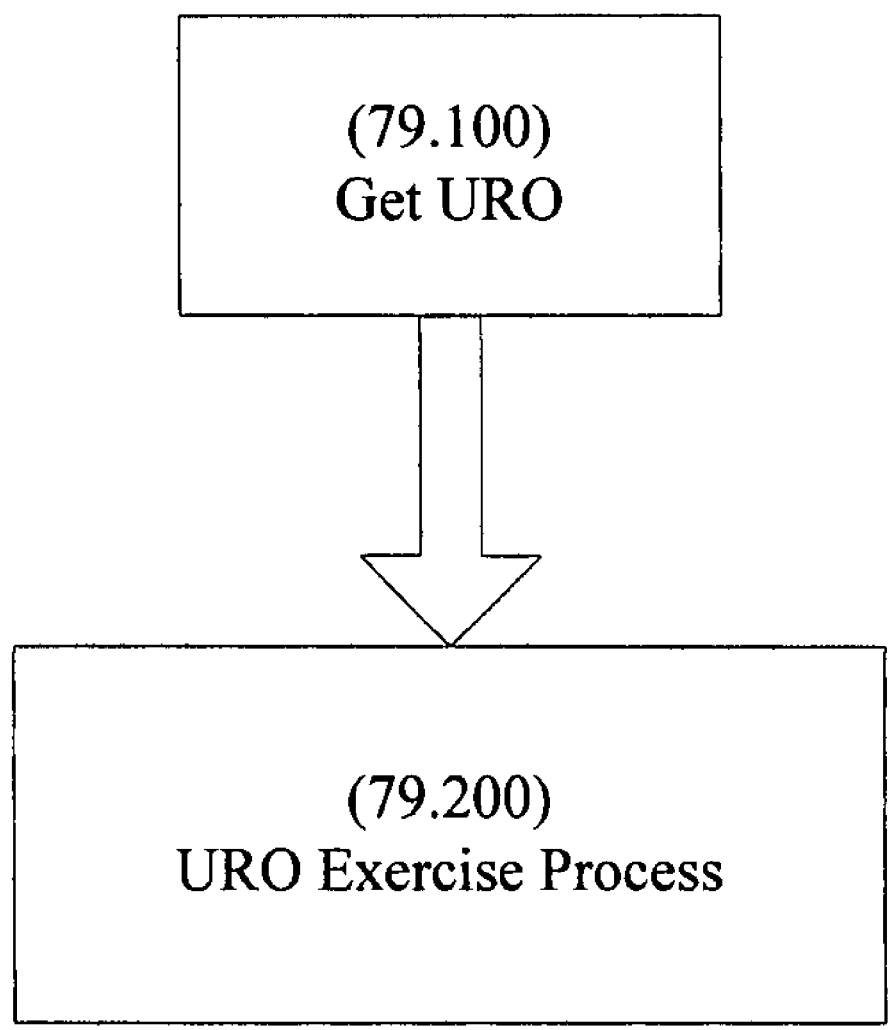
FIG. 79 is a diagrammatic illustration, in a high level flowchart, of a process for URO VOF implementation in the hotel industry.

The implementation of the URO VOF between the hotel and its customer takes place through two high level acts, as shown in FIG. 79. In Act 79.100, the 'Get URO' process, an interactive event between the customer and the hotel's web server, runs to carry out the Initial Transaction of the URO VOF. In this Act, a number of algorithms may be executed (e.g. availability, URO Price, Notify Deadline, Upgrade List and so on) on the hotel's server to optimally calculate the terms and conditions of the URO VOF (e.g., availability, URO Price(s) and other conditions) to concurrently benefit both the hotel and the customer. In Act 79.200, an event optimizer process called the URO Exercise Process is executed. In this process, the hotel may award the upgrade to the customer based on the terms and conditions of the option contract and the Chosen Room is notified to the customer. The process may also comprise one or more event optimizer algorithms that may help to optimally select the Chosen Room and/or to optimally use (or reuse) the Released Room.

Figure 83:
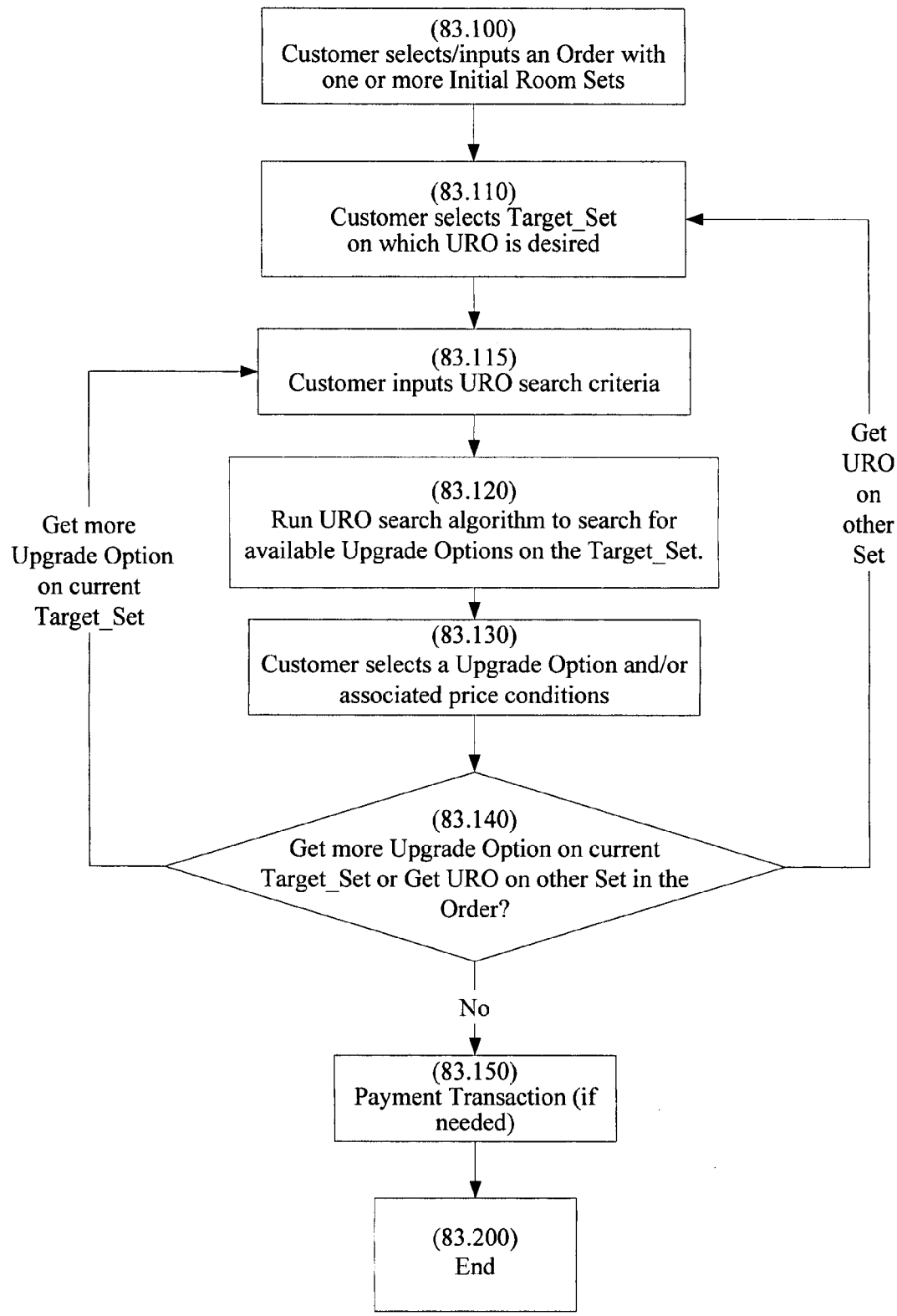
FIG. 83 is a flowchart that expands Act 100 of FIG. 79, illustrating a high level algorithm for the "Sequential Get URO" process.
Figure 85:
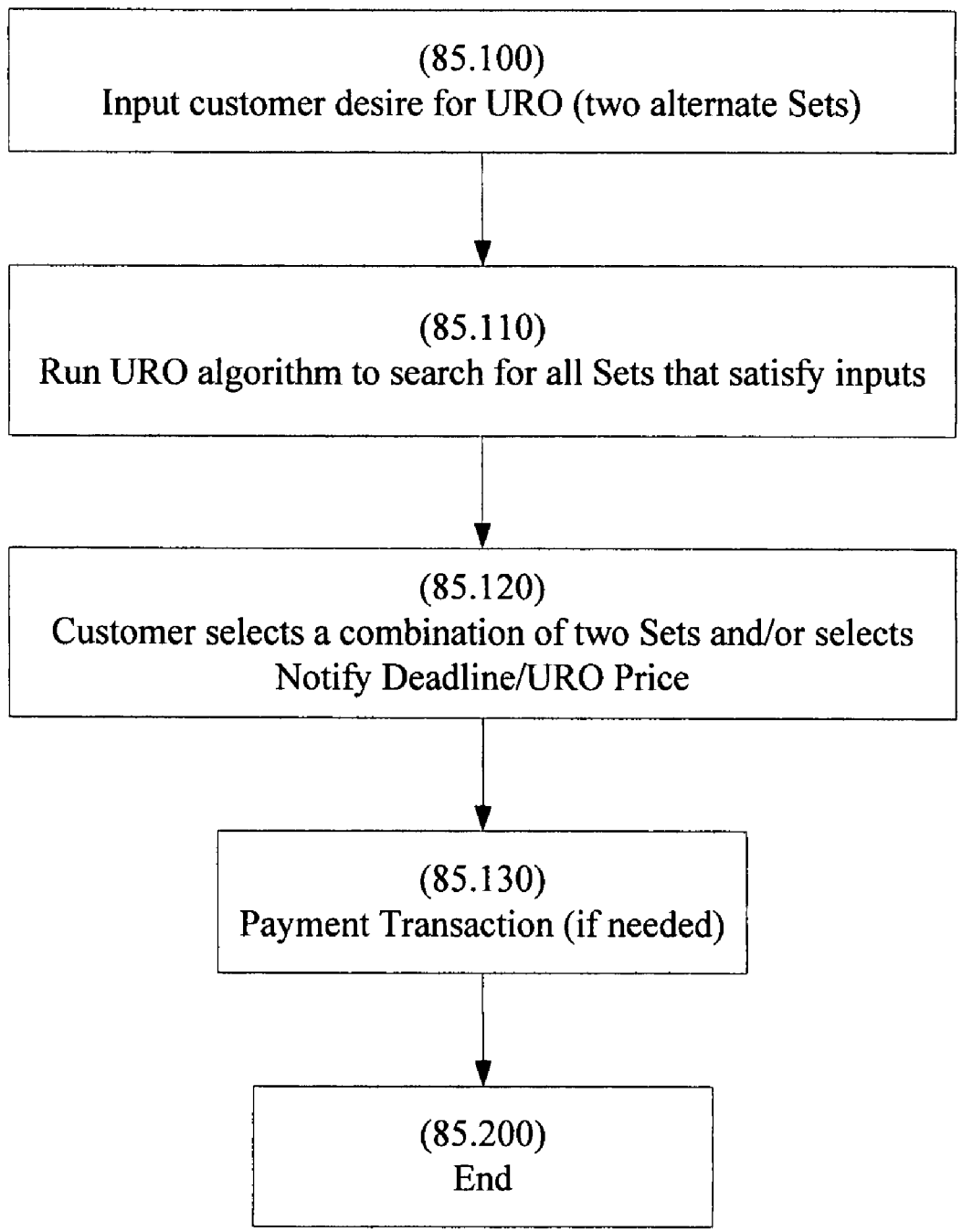
FIG. 85 is a flowchart of an algorithm for the "Concurrent Get URO" process, an alternative process to FIG. 83.

As explained above, the Get URO process may be implemented via the Sequential (shown in FIG. 83) or the Concurrent (shown in FIG. 85) process. As an example of the Sequential process, a customer may select (or purchase) a Room Product/Room Set/Room Order before the Initial Transaction begins. In such situations, said Room Product/Room Set/Room Order may be referred to as Initial Room/Initial Set/Initial Order or IR/IS/IO, in short, respectively. The Initial Set is also referred to as Initial Room Set (or IRS, in short). Similarly, Initial Room is also referred to as Initial Room Product (or IRP, in short) and Initial Order is also referred to as Initial Room Order (or IRO, in short) in the context of the hotel industry. A customer may get a URO, i.e., get one or more URO Rooms/Sets/Orders on an IR/IS/IO, respectively. A URO Room/Set/Order is also referred to as Option Room/Option Set/Option Order, or OR/OS/OO, in short, respectively. An Option Set is also referred to as Option Room Set (or ORS, in short). Similarly an Option Room is also referred to as Option Room Product (or ORP, in short) and an Option Order is also referred to as Option Room Order (or ORO, in short). The two events (one for the Initial Room and the other for the Initial Transaction) may be executed with a minimal (one just after another) or a significant time gap (e.g., few minutes, hours, days and so forth) in between them.

The URO VOF may be implemented at different levels including, but not limited to, Room, Set and Order. A hotel may choose to implement the URO at any level(s). In a specific URO interaction between a customer and the hotel, the implementation level should be the same for all the URO Rooms, Chosen Rooms and Released Rooms. For example, if URO is implemented at the Order level, then all the URO Rooms and Chosen Rooms would refer to URO Orders and Chosen Orders, respectively.

1. 'Get URO'—Dynamic Interaction to Capture Customer Demand

In the Get URO process, a customer interacts with the hotel's server to receive a URO. The interaction may take place (for example) via phone, in-person or on a website. The Sequential Get URO Process is presented first along with its detailed algorithms, followed by a short summary of the Concurrent Get URO Process.

FIGS. 80, 81 and 82 show a series of web pages that could be displayed in a customer's browser by a hotel's web server, providing a practical example of the Get URO process, comprising how the interaction may take place, between a customer and a hotel, when the customer comes to Get URO (during or after the room is booked). FIG. 80 shows an Order selected and/or purchased by a customer. The customer may click on the marketing banner for Get URO to be linked to the web page displaying the Get URO screen (shown in FIG. 81). There, the customer may select to get URO on any Room (or Room Product) in his/her Order by clicking the "Get URO" link in front of that room (shown in FIG. 81). This starts the "Get URO" process. After the click, the Get URO algorithm (details are presented later) running "behind the scenes" on a server of the hotel qualifies the availability, applicability and price conditions on all kinds of UROs available on the selected room and display the available UROs along with the price and other conditions in the screen, as shown in FIG. 82. In FIG. 82, three UROs are displayed. For each URO, an instant price and an exercise price, which the customer would have to pay if upgraded, are also displayed. The customer may select any URO by selecting the corresponding radio button and then clicking the 'Save and Go to Summary' button, which would hyperlink the user to a summary page.

Sequential Get URO Process

There are several ways to implement the Sequential process. The following presents an example of the Sequential Get URO Process when a URO is implemented at the Set level. It is also assumed here that the customer first purchases an Initial Room Order with one or more IRS, and then opts to receive a URO on any of the included IRS.

The following presents an example of the algorithmic illustration of the Sequential Get URO process. Consider FIG. 83. In Act 83.100, a customer selects (and/or purchases) a Room Order (with one or more IRS). Next, in Act 83.110, the customer reaches an interactive interface of the hotel's web server to Get URO, where the customer selects the IRS (referred to as Target_Set) on which URO is desired. Next, the customer inputs the URO search criteria for the current Target_Set in Act 83.115.

Next, on clicking the "Search URO Rooms" button, control goes to Act 83.120, where the URO search algorithm is executed to search for an ORS. The ORS search algorithm returns a list of valid UROs along with a list of Comb_NDs and associated URO Prices and/or other conditions. Next, the search results are displayed for the customer, who then selects the desired ORS and one or more associated Comb_ND(s)/URO Price(s) and other conditions, as shown in Act 83.130.

Next, in Act 83.140, a test is performed to determine whether the customer wants to get more ORSs on the current Target_Set or on another ORS. If the customer wants to get an ORS on another IRS, control loops back to the Act 83.110, where the customer selects another IRS as the Target_Set, and then the process is repeated again for the new Target_Set. If the customer wants to get more ORSs on the current Target_Set, control loops back to Act 83.115, where the customer enters the ORS search criteria and then the process is repeated for the new ORS search criteria. If the customer does not want to get any more ORSs, control goes to Act 83.150, where a payment transaction (if needed) may be executed. For example, a customer may need to pay a price for the Room after taking into consideration the Initial URO Price using a credit card, direct bank account debit or any other payment transaction mechanism. Next, the algorithm ends in Box 83.200. The computation may be performed using a processor that may calculate results in optimal time.

ORS Search

Figure 84:
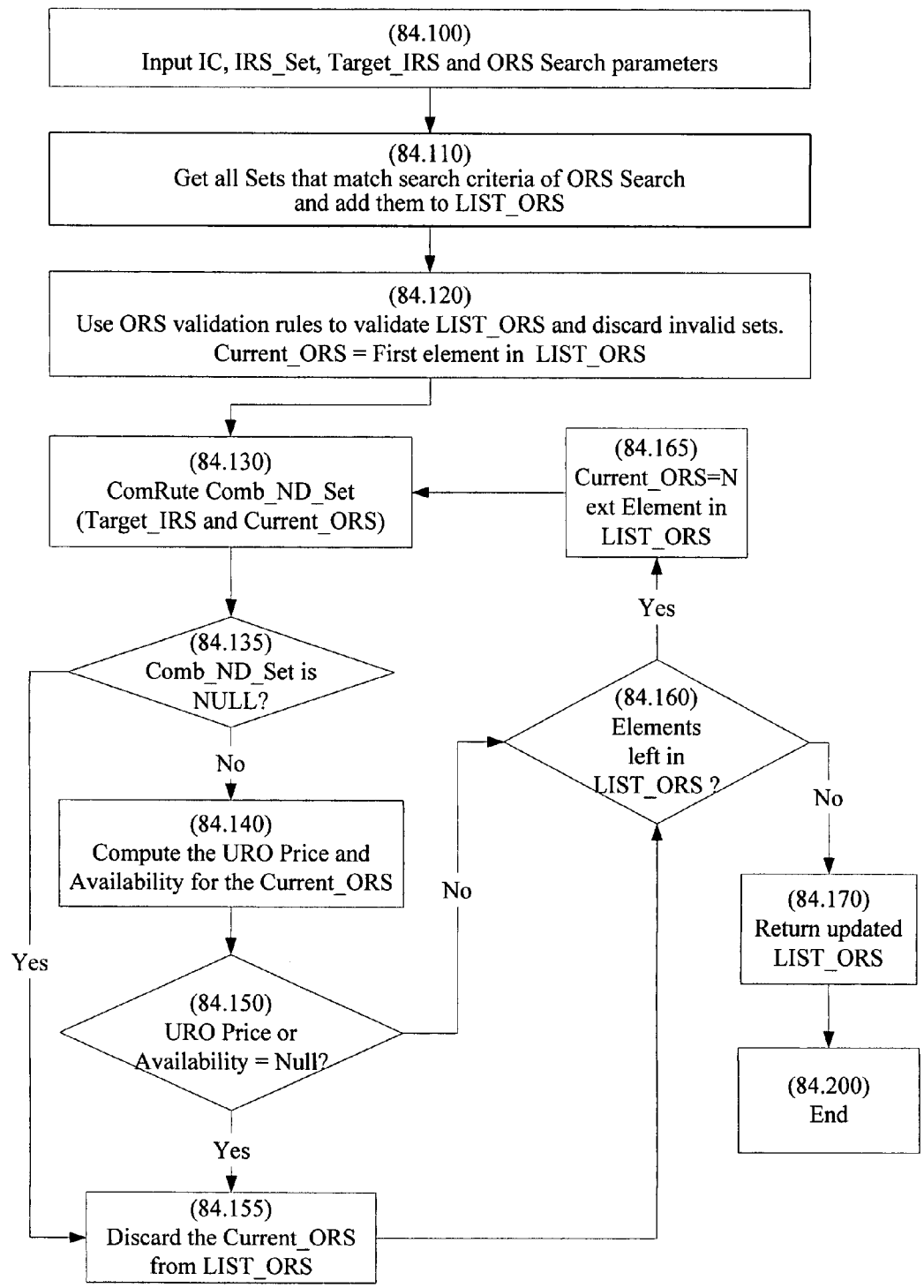
FIG. 84 is a flowchart that expands Act 120 of FIG. 83, illustrating an algorithm to search for URO Room Sets.

The following algorithm (shown in FIG. 84) determines and validates an ORS for a given set of conditions including, but not limited to, availability, Notify Deadline and URO Price. One of the ways to implement the ORS Search algorithm at the Set level is discussed here. The following algorithm (shown in FIG. 84) determines and validates an ORS for a given set of conditions including, but not limited to, availability, Notify Deadline and URO Price. One of the ways of its implementation of said algorithm has already been discussed above along with various information technology and networking tools including, but not limited to, one or more servers, database, load balancers, firewall, routers, Internet, highly secured VPN, Intranet, RAM, hard disk drives, CPUs, monitors as shown by FIG. 13D.

In Act 84.100, the number of customers (IC), IRS_Set (containing all IRS in the Initial Order, and all the ORSs, (if any) already selected/received along with Comb_ND_Set(s)

and Comb_OP_Set(s), for each IRS), Target_IRS and the ORS Search parameters are input to the system. The ORS search parameters include, but are not limited to, check-in date, time and location, number of Rooms per Set, Notify Deadline, URO Price (Initial and Exercise) and so forth. A customer may be allowed to input Notify Deadline and/or URO Price on the basis of which valid ORSs (that satisfy the given criteria of Notify Deadline and/or URO Price) may be searched for and displayed for the customer. For example, a customer may be asked to input the room related parameters, and then a set of Notify Deadlines and URO Prices may be computed for the rooms that match the given criteria. In another example, a customer may input both room related parameters and Notify Deadline and/or URO Price as inputs and then a search may be performed for valid ORSs. In yet another example, a customer may input to the system, one or more rooms, and/or inputs to search for one or more additional rooms (e.g., room amenities, price etc.) to search for ORS that may be combined with one or more input rooms (by the customer) to constitute the total set of rooms for a URO. In such situations, a hotel may also validate the rooms input by the customer to determine if said rooms are eligible to be the URO Rooms.

Next, control goes to Act 84.110, where an ORS Search is performed for the given criteria. The search may be best performed using a processor that may calculate results in optimal time. The order in which search parameters are executed may be optimized to reduce the search time, however, it may or may not affect the final outcome. A hotel may select any order of its choosing.

In Act 84.110, Room Sets are determined that match the search criteria and the resulting Sets are added to a list termed LIST_ORS. Next, in Act 84.120, a list of ORS validation rules is obtained from the hotel's URO VOF database and the rules are used to validate all the Sets in the LIST_ORS list. Sets that do not satisfy the rules are discarded. Validation rules may include, but are not limited to, a Maximum Number of Rooms per Set Rule, a Maximum Room Price Rule, an Availability Rule, and so forth. For example, a Maximum Room Price Rule may discard those upgrade options for which the Room Price of the option room related to the upgrade option is more than a specified value. A hotel may implement any validation rule of its choosing to further qualify the Sets in the LIST_ORS list. As a last Act in Act 84.120, the first element in the updated LIST_ORS list is designated as the Current_ORS.

Next, control goes to Act 84.130, where a group of Comb_NDs is computed for the combination of the Target_IRS, all the existing ORS of the Target_IRS and the Current_ORS, and added to a set called Comb_ND_Set. Next, in Act 84.135, a test is performed to determine whether the Comb_ND_Set obtained in the previous Act is Null. If so, control goes to Act 84.155. If not, control goes to Act 84.140, where the URO availability and URO Price for the Comb_ND_Set are determined. Next, in Act 84.150, another test is performed to determine whether the URO Availability or the URO Price is Null. If so, control goes to Act 84.155. If not, control goes to Act 84.160.

In Act 84.155, the Current_ORS is discarded from the LIST_ORS list, and control goes to Act 84.160, where a test is performed to determine if more elements are left in the LIST_ORS list. If so, control goes to Act 84.165. If not, control goes to Act 84.170.

In Act 84.165, the next element in the LIST_ORS list is designated as the Current_ORS and control loops back to Act 84.130 to repeat the process for the new Current_ORS. In Act 84.170, the updated LIST_ORS list along with URO Prices and associated conditions is returned as the search result, and the algorithm ends (Box 84.200). The computation may be performed using a processor that may calculate results in optimal time.

Computation of Notify Deadlines

A hotel may set one or more Notify Deadlines of its choosing for its Rooms. Once the Notify Deadlines have been set for each Room, the next Act is to create a framework to compute the Notify Deadlines for a group of Rooms (such as a Set, an Order or any other group). The following sections present an example of a framework that may be used to obtain a set of Notify Deadlines applicable to a group of Rooms. A hotel may use any framework and algorithm of its choosing to obtain the same.

A set of Notify Deadlines associated with a Room Product, a Room Set and a combination of two or more Sets is called Product_ND_Set, Set_ND_Set and Comb_ND_Set, respectively. Each element in the Product_ND_Set, Set_ND_Set and Comb_ND_Set is termed Product_ND, Set_ND and Comb_ND, respectively. The Comb_ND_Set may be computed by combining the Set_ND_Sets of all the given Sets. A Set_ND_Set may be computed by combining the Product_ND_Sets of all the Rooms under that Set. The Notify Deadlines can be computed based on various parameters and factors of the hotel's choosing. One example to compute a Comb_ND_Set is as follows. First compute Set_ND_Set for all Sets. A Set_ND_Set is computed by first selecting earliest of the Notify Deadlines of each Room within the concerned Set, and then picking the latest of those Deadlines, and noting that as the Target_Deadline. Next step is to pick all those Notify Deadlines that fall after the Target_Deadline. Notify Deadlines thus obtained may be validated using various validation rules based on hotel factors such as customer utility, room parameters and so forth. Similarly, the Comb_ND_Set may thus be computed by repeating the above process for Set_ND_Sets, thus obtained for each Set.

Available Capacity Check

The URO capacity for an ORS may depend on one or more factors including, but not limited to, Notify Deadline, URO Prices, expected Room value and so forth. A hotel may use any method of its choosing to determine URO capacity of a room. For example, a hotel may choose to have a fixed URO capacity for one or more of its rooms.

An instance to compute URO capacity is discussed below. Consider the case, when URO Capacity is dependent on Notify Deadline. In such situation, the objective is to determine those Comb_NDs within the Comb_ND_Set on which URO is available for the given ORS. The URO Capacity and the Used URO Capacity (the total number of Rooms on which URO has been sold but not exercised) may be calculated for each Comb_ND within the Comb_ND_Set. Available Capacity (AC) would then be the difference of URO Capacity and Used URO Capacity for the given Room. If the AC is greater than or equal to the number of incoming customers desiring a URO, then the URO capacity is available at a given Comb_ND for the given ORS. The process may be repeated for all Notify Deadlines within Comb_ND_Sets. URO may be made available on a given ORS for a given Comb_ND, if URO is available on all the Rooms of ORS for the given Comb_ND.

URO Price Calculation

A hotel may set URO Prices for a Room using any method of its choosing. Once the URO Prices have been set for each Room, the next Act is to create a framework to compute URO Price for a group of Rooms (such as a Set, an Order or any other group) by using URO Prices for each Room in the group.

The parameter Product_OP refer to URO Price (and may or may not be corresponding to a Notify Deadline) associated with a Room. Similarly, Set_OP and Comb_OP refer to URO Price (may or may not be corresponding to a Notify Deadline) associated with a Set and a combination of two or more Sets, respectively. A set of Product_OPs, Set_OPs and Comb_OPs is termed Product_OP_Set, Set_OP_Set and Comb_OP_Set, respectively. The Comb_OP_Set is computed by combining the Set_OP_Sets of the IPS and all the OPSs (existing and new). A Set_OP_Set is computed by combining the Product_OP_Sets of all the Rooms under that Set. One or more Set_OP_Rules may be read from the hotel's database and applied to calculate Set_OP_Set for each input Set (IRS and all ORSs) using the Product_OP_Sets of all the Rooms of said Set. A hotel may use any Set_OP_Set Rule of its choosing. Set_OP_Rules may be defined to calculate Set_OP as the sum, average, highest, lowest or any other function of Product_OPs of all the Rooms at a given Comb_ND. Similarly, a Comb_OP_Set comprises one or more Comb_OPs, and is calculated using one of the pre-determined rules, termed Comb_OP_Rules, to combine the Set_OPs of all the Sets in the combination. A hotel may use a Comb_OP_Rule of its choosing. Comb_OP_Rules may be defined similar to the Set_OP_Rules.

Concurrent Buy URO Process

As explained above, in the Concurrent Get URO process, a customer receives all URO Rooms concurrently in one transaction. An algorithmic illustration of the Concurrent Get URO process is displayed in FIG. 85. The URO (2, 1) instance is assumed here as an example. Consider a customer who desires an upgrade in lieu of a price for the desired upgrade. In Act 85.100, the customer desires for URO are input, including, but not limited to, a search criteria for two Sets according to customer's utility (may be similar to the search criteria defined above for the Sequential Get URO process).

Next, in Act 85.110, the URO algorithm is run to determine the combinations of two Sets that satisfy inputs. A list of such search results is displayed for the customer along with the associated terms and conditions including, but not limited to, Notify Deadlines, Initial URO Price, URO Exercise Price and Room Price for each such combination. The URO algorithm for the Sequential Get URO process (defined above) may also be used for the Concurrent Get URO process.

Next, in Act 85.120, the customer selects a desired combination of two Sets and the associated conditions such as URO Exercise Price/Notify Deadline. Next, in Act 85.130, a payment transaction is executed, if needed. For example, the customer may pay the Room Price after taking into consideration the Initial URO Price using a credit card, direct bank account debit or any other payment transaction mechanism. Next, the algorithm ends in Box 85.200. The computation may be performed using a processor that may calculate results in optimal time.

(2) Event Optimizer

Once the customer selects a URO value option, the processing goes to the Event Optimizer phase where different acts are executed depending on the trigger event that may occur to make an option become exercisable. In this stage, the URO Exercise process (and Customer Notification (or CN, in short) process) as shown in Act 79.200 is executed. In this process, one or more decisions on the selection of Chosen Room(s) is (are) notified to the customer. The event(s) is (are) related to the value option selected in the first act. In the URO VOF, the hotel may use a software application built on the method defined above to optimally award the upgrades to customers who have bought a URO. One of the ways of implementation of Event Optimizer stage with the help of information technology tools has already been discussed above wherein said tools include, but are not limited to, one or more servers, database, load balancers, firewall, routers, Internet, highly secured VPN, Intranet, RAM, hard disk drives, CPUs, monitors as shown by FIG. 13E. Few methods have been described below in detail for the URO Exercise process.

The URO VOF helps to create a flexible customer inventory. In other words, by using the URO VOF, a hotel may obtain rights to allocate any of the selected URO Rooms to a URO customer (i.e., award the upgrade to the customer), and thus, said URO customer acts like a flexible customer inventory that the hotel may manage to generate revenues. A hotel may design one or more uses of such flexible customer inventory, where each such use may include one or more events that follow the Initial Transaction. An example (the Buy_N process) was explained earlier. In the Buy_N process, a hotel may use the URO VOF to accommodate requests from potential customers for rooms. As an example, the Buy_N process may especially be used to satisfy requests for rooms that have already been sold or have low (or no) availability. The details for the Buy_N process are presented below.

Another example to use the URO VOF would be to use the URO VOF in conjunction with one or more other VOFs, for example, the ARO (the Alternate Room Option) VOF. A hotel may form a group of one or more ARO customers and one or more URO customers, where the options (ARO and URO) obtained by the group members are complementary in nature. As an example, consider a customer (A) who bought an ARO to choose either of R1 and R2 as Chosen Room, and consider a customer (B) who received a URO and wants an upgrade from Initial Room (i.e., Base-Room) R1 to Option Room (i.e., Up Room) R2. Thus, if A decides to choose R1 as the Chosen Room, the hotel may upgrade B and assign R2 as the Chosen Room for B, and vice versa. The customers A and B have taken complementary options and may form a group. The hotel may need to hold only one unit of inventory in R1 and R2 to satisfy the needs of both A and B (assuming each A and B only need one unit of room). Such a combination of complementary options or VOFs may improve efficiency and concurrently enhance value for all the parties involved (in the given example, for A, B and the hotel). More details on combining VOFs are provided later.

In one of the implementations of the URO VOF, the hotel may award complementary upgrades to two or more customers. Different customers may have different ranking for different rooms (of same or different hotels) and thus, a higher ranked room for one customer may be a lower ranked room for some other customers. The hotel may optimize customer needs and award upgrade to such a complementary set of customers. For example, a customer U1 ranks room R2 higher than room R1, but may not be able to purchase room R2 because room R2 may have a higher cost than R1 (hence purchases room R1). Another customer, who ranks room R1 higher than R2, could not get R1 due to non-availability of R1. The hotel may provide a URO VOF to both U1 and U2 and may provide upgrades to both of them, i.e., awarding room R2 to U1 and awarding room R1 to U2. Such an implementation of the URO VOF may enable a hotel to generate direct and indirect benefits using differential customer dynamics and by implementing grouping within the same type of customers.

The URO VOF may also be used to reduce operational costs, constraints or other goals that are impacted by the allocation of rooms among different customers. For example, the URO VOF may be used to shave off operational costs for one or more rooms that are low in demand. For example, if a hotel experiences a room with very low sales, it could offer URO to customers on that room and thus, be able to economically and efficiently upgrade them to different rooms and thereby be able to save its operational costs (such as staffing costs, maintenance costs and so forth). If a hotel wants to do the same on a low demand room today (after few customers have booked/confirmed/reserved said room) without using URO, it may be more difficult, tedious and costly affair to contact all the customers who confirmed/booked/reserved that room and/or to convince them to upgrade to other rooms. The cost in the Buy_N process and Upgrade_U algorithm may also refer to the price that the customer may pay to the hotel to receive an upgrade.

URO Exercise Process

The hotel may use URO Exercise Process as one of the methods to create a system and computer-implemented process to optimally award the available rooms as upgrades. This method may help to find an optimal upgrade solution to create a win-win situation between the customers and the hotel. The method may have two or more Acts. In the current discussion, it has been assumed that the URO Exercise Process has two Acts, the Upgrade List and the Upgrade Award. The Upgrade List process may use a set of rules to generate a list of upgrade enabled customers. The Upgrade Award process may award upgrades to one or more upgrade enabled customers based on the defined conditions. It may be noted, however, that technically, the URO Exercise process may be performed using any rule/method as desired. The following process may help to optimize (increase) the benefits generated.

Figure 86:
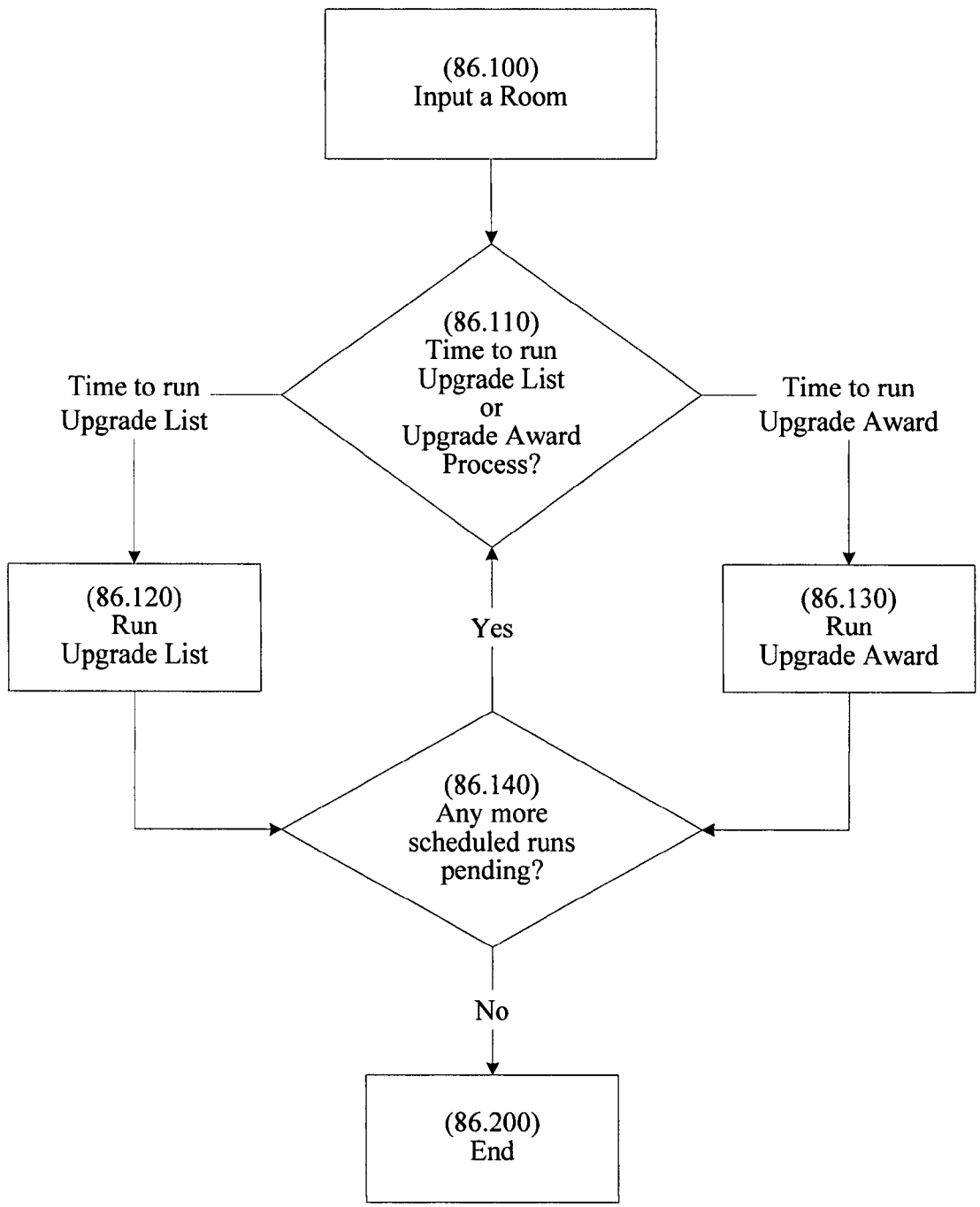
FIG. 86 is a diagrammatic illustration, in a high level flowchart, of an algorithm for the URO Exercise process in URO VOF implementation.

A system built on the method is described in FIG. 86. The UPO Exercise process has been discussed and explained in the UPO VOF above. In the context of the hotel industry, URO Exercise process is explained by an example later on.

As explained earlier, both Upgrade List and Upgrade Award processes may be run multiple times before and after the customer utilizes the Room Product (anytime starting from the first interaction between the hotel and customer to the time the customer has fully utilized the Room Product). It may be beneficial for the hotel to run the URO Exercise process as close to the utilization and/or check-in time of the Room as possible. This may help in three ways. First, it may help the hotel to prevent any form of potential revenue dilution from last minute walk-in customers who may potentially pay higher Room Price for the Option Rooms (to which the customer may have been upgraded). Second, it may help to use all the unused rooms that may become available at the last minute because of a no-show or cancellation. Third, if the hotel schedules (at least a few runs of) the URO Exercise process after the check-in, it may help to sell URO upgrades for a portion of the rental duration. A customer could get upgrade for a portion of stay duration, thus, allowing multiple customer upgrades using the same room. For example, one customer could be upgraded to a room for some part of his/her stay duration, and another customer could be upgraded to the same room for some part of his/her stay duration. By doing so, the hotel could also charge a lower price for a URO, thus, attracting more customers. This may allow a hotel to increase the total number of upgrade awards, total hotel revenue (or profitability), customer satisfaction and utility, any other factor or combination thereof. A hotel may choose to implement the partial room UROs on some or all rooms. The computation may be performed using a processor that may calculate results in optimal time.

Upgrade List

The following terms and definitions are needed to understand the algorithm to create an upgrade list: URO Type, upgrade value and upgrade combination. These terms are presented first followed by the Upgrade List algorithm.

URO Type

For each customer to be considered in the upgrade list, the hotel needs to determine his/her URO Type and the upgrade value. It may be straightforward to determine the type of URO for each URO customer. URO Type is simply the URO bought by the customer. However, for customers who are in 'regular' (non-option) upgrade programs, there is a need to determine their URO Types. To determine the URO Type, one may need to determine all the Up Rooms to which a customer can be awarded an upgrade. The list of such Up Rooms may be compared with the list of Up Rooms associated with all UROs. A URO whose Up Rooms match with the Up Rooms of the customer is the URO Type for said customer. For example, if an elite customer in Guest Room (G) may be upgraded to Business Room (B) or VIP Room (V), then his/her list of Up Rooms match exactly with that of the URO Type, GBV. Thus, GBV is the URO Type for said customer. The URO Types for other customers may be determined in a similar fashion.

The hotel may define URO Type for standby customers. The following describes one of the methods to treat standby customers just like confirmed customers to maintain the uniformity in processing the URO Exercise algorithm. A standby customer, here, may be defined as a customer who currently does not have a confirmed room, but is waiting to get confirmation for that or other rooms, whereas the confirmed customers have confirmed reservation for said room.

In one or more upgrades, the customer may be re-assigned a different room from the original room assignment. A standby customer may be assigned to a standby room as a Base-Room from which an upgrade is possible to a room having availability. A non-paying customer may be assigned to a non-revenue room as a Base-Room from which an upgrade is possible to another room having availability.

A new dummy room, Standby (or S, in short), may be assumed and all the standby customers may be treated to have the confirmed dummy room (S), which may then be added to the list of rooms. A Set with G, B and V rooms, would have a new list of rooms in descending priority, V>B>G>S. A customer may be on a standby list for one or more rooms of a Set or on one or more rooms of different Sets and/or any combination thereof. Here, the customers in the S room may be assigned the URO Types, as follows; SG refers to the URO Type for a standby for guestroom (G) only, SB refers to the URO Type for a standby for business room (B) only, SV refers to the URO Type for a standby for VIP room (V) only, SBV refers to the URO Type for a standby for business room (B) and VIP room (V), SGV refers to the URO Type for a standby for guest room (G) and VIP room (V), SGB refers to the URO Type for a standby for guest room (G) and business room (B) and SGBV refers to the URO Type for a standby for guest room (G), business room (B) and VIP room (V). If hotel wants to employ the above mechanism to create a dummy room for standby customers, it may be beneficial to include the virtual standby room in the list of rooms when calculating all types of upgrade options.

Upgrade Value

Upgrade Value may be defined as the total value a hotel may realize by upgrading a customer from a given Base-Room to a given Up Room. Upgrade Value may be expressed, as follows, $$\text{Upgrade Value} = \text{Payment} + \text{Soft Value} - \text{Upgrade Cost},$$

In the above formula, the term 'payment' refers to the price paid by the customer to the hotel when he/she is awarded an upgrade from the Base-Room to the Up Room. 'Soft Value' refers to a combination of any indirect and/or intangible value a hotel may generate when a customer is awarded an upgrade from the Base-Room to the Up Room. 'Upgrade Cost' refers to the marginal upgrade cost (if any) to a hotel to upgrade the customer from Base-Room to an Up Room. Said "Soft value" may be based on various factors and parameters including, but not limited to, hotel's past experiences with the customer, the number of times said customer may or may not have received an upgrade in last 'n' number of attempts, customers who require special attention or care, customers belonging to a certain category, other privileged customers for one or more reasons and so forth.

For URO customers, a hotel may use the final exercise price as the "payment" portion of the upgrade value. The soft value for the URO customers may be calculated using one or more functions of the long term value of the customer to the hotel, trip parameters, upgrade path and so forth. A hotel may use any mechanism or methodology to calculate the upgrade value of the URO customer.

Similarly, the upgrade value may be calculated for the customers in the 'regular' (non-option) upgrade programs and the standby customers. For the customers in the regular upgrade programs, the 'payment' portion of the upgrade value may be zero, however, their 'soft value' may be high. For the standby customers, the payment portion may be calculated as follows, Payment (standby)=Room Price*(1-Recapture probability)

In the above formula, the Room Price refers to the total Room Price the standby customer is expected to pay to the hotel if he/she is awarded the desired room. The term "Recapture Probability" refers to a probability that a standby customer may be assigned another room in same (or different) hotel so that the hotel, in concern, does not lose the potential revenue from the standby customer if the customer is not awarded the desired room. A hotel may calculate recapture probability by any method of its choosing.

A hotel may choose to use any other mechanism to determine the upgrade value for one or more customers in the input list. The computerized system (built using the method defined here) may also allow manual overrides by the hotel user (e.g., an analyst or an agent) to allow the user to allocate special upgrade values to satisfy the customer relations objectives (for e.g. enhance chances for some elite customers to get upgrades over other customers) or for any other reasons, that may include enhancing or reducing the soft values of customers to modify their chances to get upgrades, however, while maintaining the conditions of the options contract executed with the URO customers.

Upgrade Combination

An upgrade combination may comprise one or more members sorted in an order, and may need one or more available rooms for its topmost member to generate an upgrade for all its members. The topmost member has the highest Up Room associated among all the members in the combination. The award of upgrades for an upgrade combination may work in a cascading style, where a new available room allotted to the combination may be awarded to its topmost member, the room vacated by the topmost member (after his/her upgrade) may be awarded to the second (next) topmost member and the chain goes on until the room vacated by the second lowest member is awarded to the lowest member. Such a cascading process may continue until the last customer which may have to be upgraded in the set is upgraded and it may lead to upgrade of more customers than the creation of number of units of room availability. This process may involve two or more customers. This process has also been explained in detail below in the Upgrade_U process. Consider the following examples.

Consider an upgrade combination, G-GB-BV, where, G refers to a standby customer for the guest (G) room, GB refers to a customer with guest room enabled to be upgraded to the business room (B) and BV refers to a customer with a business room enabled to be upgraded to VIP room (V). Here, BV is the topmost member with the highest associated Up Room, V. For this upgrade combination, if one VIP room is made available, then the BV customer may be upgraded to VIP, leaving one empty business room, the GB customer may be upgraded to the business room emptied by the upgraded BV customer, and the G (standby) customer may be awarded the room emptied by the upgraded customer GB.

Consider another upgrade combination, B-BV, where, B refers to a standby customer for the business room (B) and BV refers to a customer with business room enabled to be upgraded to VIP room (V). For this upgrade combination, if one VIP room is made available, then the customer with BV option may be upgraded to VIP room, leaving one empty business room, and the B (standby) customer may be awarded the business room emptied by the upgraded customer with BV option.

Consider another upgrade combination, G-GBV, where, G refers to a standby customer for the guest room and GBV refers to a customer with guest room enabled to be upgraded to either business room (B) or VIP room (V). For this upgrade combination, if one business room is made available, then the customer with GBV option may be upgraded to business, leaving one empty business room, and the G (Standby) customer may be awarded the guest room emptied by the upgraded customer with GBV option. If one VIP room is made available, then the customer with GBV option may be upgraded to VIP room, leaving one empty guest room, and the G (standby) customer may be awarded the guest room emptied by the upgraded customer with GBV option.

Upgrade List Algorithm

Figure 87:
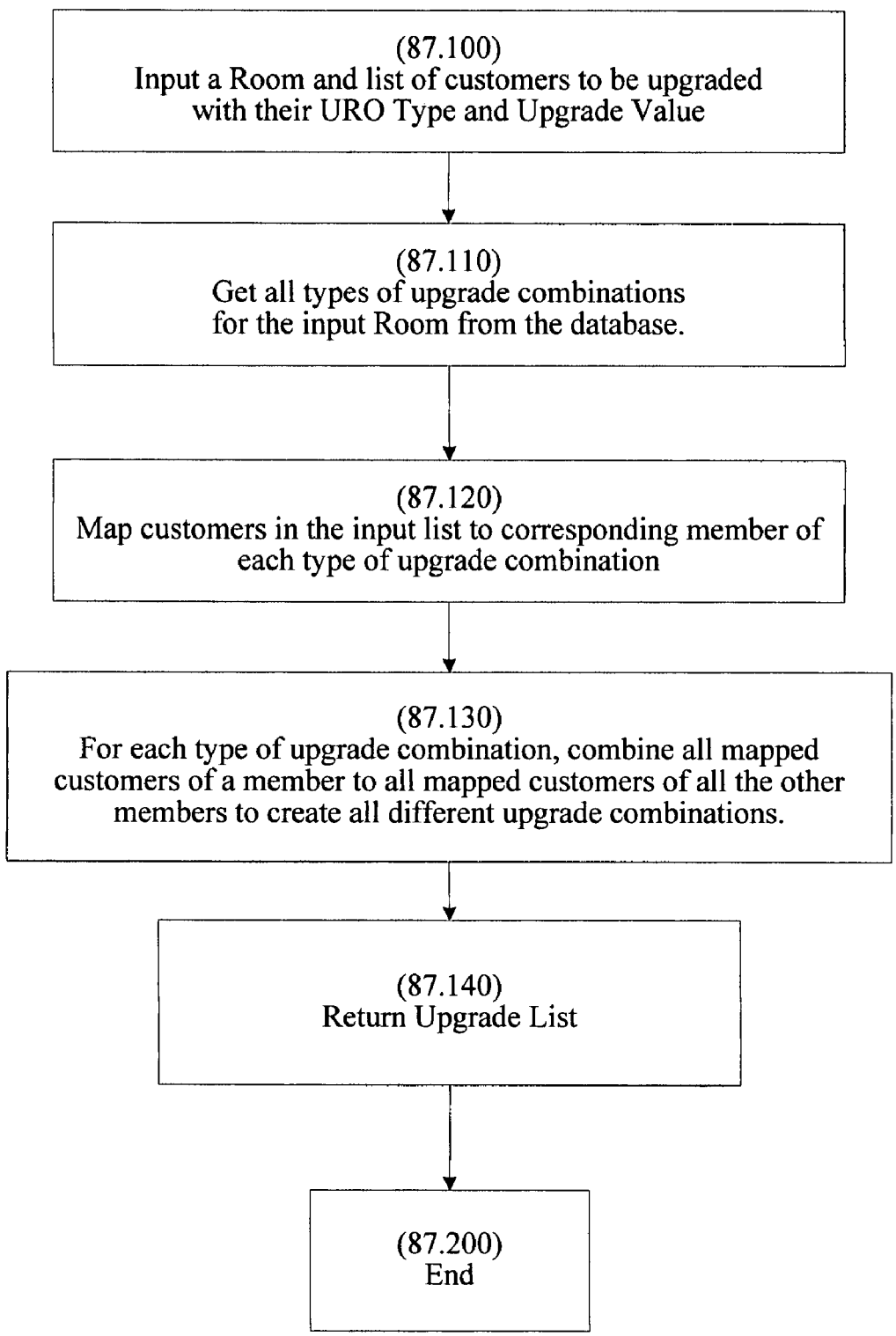
FIG. 87 is a flowchart that expands Act 120 of FIG. 86, illustrating an algorithm to create "Upgrade List" for a given set of entities and a list of upgrade-enabled customers.

The Upgrade List Algorithm as shown in FIG. 87 has been explained in the UPO VOF at length. In the context of the hotel industry, it is explained using an example. Consider a type of upgrade combination, DC-CB-CBA. Assume the input list of customers contains 2 customers, DC1 and DC2, with the URO Type DC. Similarly, assume there are 2 customers, CB1 and CB2, with the URO Type CB and 2 customers, CBA1 and CBA2, with the URO Type CBA in the given list of customers. DC1 (belonging to DC) is combined with CB1 (belonging to CB) and CBA1 (belonging to CBA) to form one upgrade combination, DC1-CB1-CBA1. Similarly, DC1 is combined with CB1 and CBA2 to form another upgrade combination, DC1-CB1-CBA2. In this fashion, all such upgrade combinations are created, as follows: DC1-CB1-CBA1, DC1-CB1-CBA2, DC1-CB2-CBA1, DC1-CB2-CBA2, DC2-CB1-CBA1, DC2-CB1-CBA2, DC2-CB2-CBA1 and DC2-CB2-CBA2. Similarly, all the upgrade combinations are created for all the Up Rooms using all the input customers and all the types of upgrade combinations.

Algorithm to Create Types of Upgrade Combinations

Figure 88:
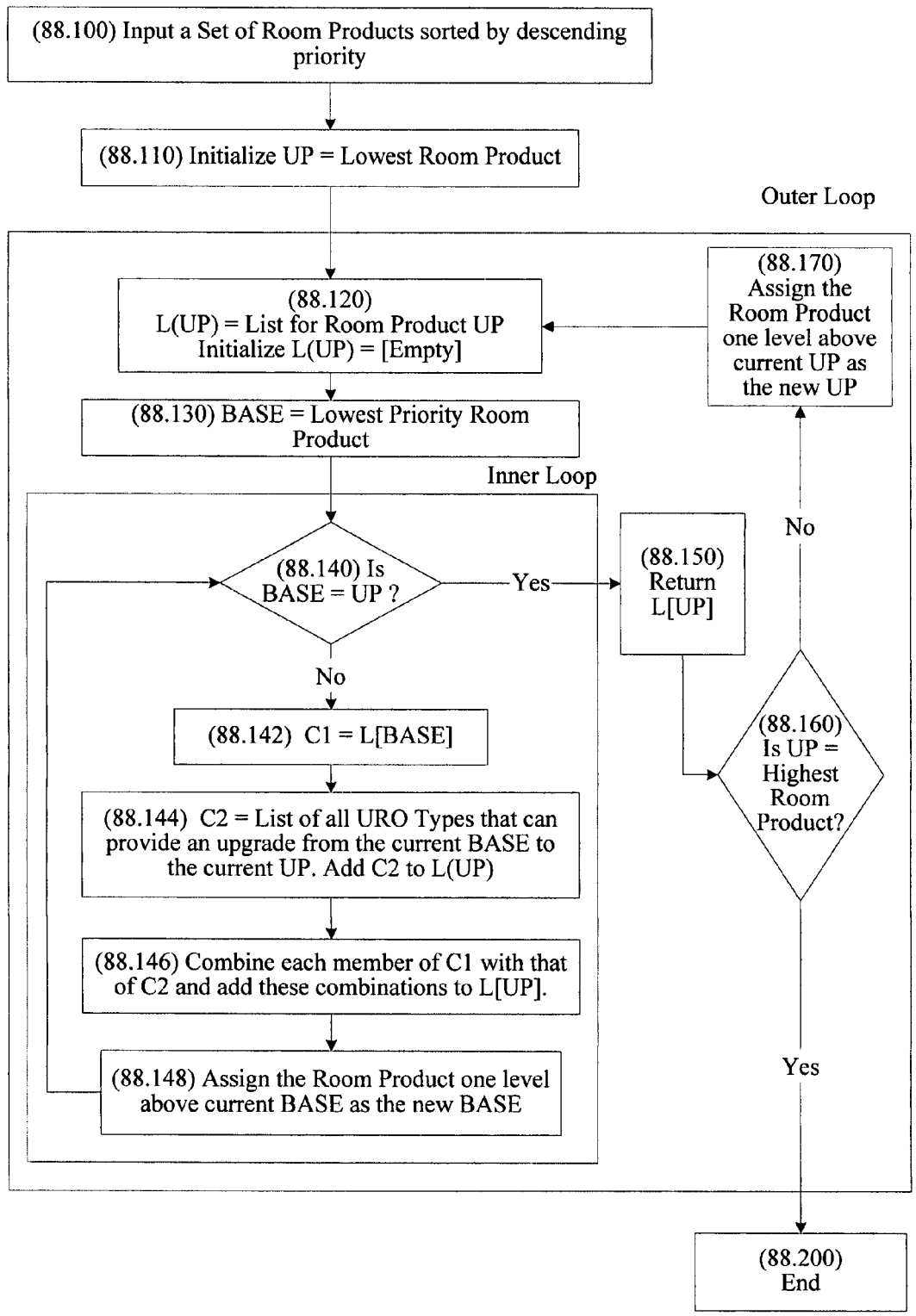
FIG. 88 is a flowchart that expands Act 110 of FIG. 86, illustrating an algorithm to create types of upgrade combinations for a given set of rooms.

The algorithm, as shown in FIG. 88, to create types of upgrade combinations has been explained in the UPO VOF at length. In the context of the hotel industry, it may be explained below using an example. Consider a hotel with 3 room types, namely, A, B and C. The priority order among the rooms is A>B>C. Per Act 88.100, a Set of Rooms is input to form the SP, with rooms sorted according to the descending order of priority, A>B>C. Per Act 88.110, UP is set to C, the lowest priority room in input SP. Next, control enters the outer loop, where L(C), a list of types of upgrade combinations for the current UP, is initialized as an empty set.

Next, per Act 88.130, the BASE is set to C, and then control enters the inner loop. Per Act 88.140, a test is performed to determine whether the current BASE (i.e., C) is same as the current UP (i.e., C). It is same, so control branches to Act 88.150, where the current L(C):[ ] is returned, and control goes to Act 88.160, where the test is performed to determine whether the current UP (i.e., C) is the highest priority room within SP. It is not, so the process continues to Act 88.170, where B, the room one level higher than C, in terms of priority, is assigned as the new UP. At this point, the process loops back to Act 88.120, where L(B) is initialized as an empty set.

BASE is again set to C, per Act 88.130, and the test is performed to determine whether C (the current BASE) is same as B (the current UP), per Act 88.140. They are not the same, so, the process continues to Act 88.142, where L(C):[ ] is assigned to the collection C1.

Next, per Act 88.144, a list of URO Types that can provide an upgrade from C to B (i.e., [CB, CBA]) is read from the hotel's database and is assigned to C2, and then C2 is added to L(B) to form L(B):[CB, CBA].

Next, per Act 88.146, since C1 is empty, no combinations are created or added to L(B):[CB, CBA]. Then, the process continues to Act 88.148, where B, the room one level higher than C, in terms of priority, is assigned as the new BASE. At this point, the process loops back to Act 88.140, where a test is performed to determine whether the current BASE (B) is same as the current UP (B). They are same, so, the L(B):[CB, CBA] is returned at this point, per Act 88.150, and control goes to Act 88.160, where a test is performed to determine whether B is the highest room. It is not, so, the process loops back to Act 88.170, where A, the room one level higher than B, in terms of priority, is assigned as the new UP.

Per Act 88.120, L(A) is initialized as an empty set. Base is set to C again, per Act 88.130. The test is performed again to determine whether the current Base (i.e., C) is same as the current UP (i.e., A), per Act 88.140. They are not, so, the process continues within the inner loop and L(C):[ ] is assigned to C1, per Act 88.142.

Next, a list of upgrade options [CA, CBA] that can provide an upgrade from C to A is read from the hotel's database, and is assigned to C2 which is then added to L(A) to form L(A):[CA, CBA], per Act 88.144. Since C1 is empty, no combinations are created or added to L(A):[CA, CBA], per Act 88.146.

Next, per Act 88.148, B, the room one level higher than C, is assigned as the new BASE, and the process loops back to Act 88.140, where the test is again performed to determine whether B is same as A. They are not, so the Act 88.142 to Act 88.148 are repeated again. Per Act 88.142, L(B):[CB, CBA] is assigned to C1. Per Act 88.144, [BA], i.e., the collection of all upgrade options that can provide an upgrade from B to A, is assigned to C2, and is added to L(A) to form L(A):[CA, CBA, BA]. Per Act 88.146, each member of C1 [CB, CBA] is combined with each member of C2 [BA], and all these combinations [CB-BA, CBA-BA] are added to the L(A) to form L(A):[CA, CBA, BA, CB-BA, CBA-BA].

Next, per Act 88.148, the BASE is set to A, one level higher than B. Next, the process loops back again to Act 88.140, where the test finds that the current BASE and the current UP are same (A). Therefore, the L(A) is returned, per Act 88.150, and the process control moves to Act 88.160, where the test is performed to determine whether A is the highest room. It is, so, control moves to Act 88.200, where the algorithm ends.

A hotel may create a data structure (or a computer-readable medium) that may include an ability to store therein an indication of each customer of a hotel who may be eligible to receive an upgrade award and, for each said customer, an indication of each award for which the customer may be eligible and one or more values associated with the award. Such said values may include, without limitation, a total upgrade value, a payment value, a soft value and an upgrade cost related to said upgrade; a Base-Room value, and an Up Room value; and one or more values specifying traits or characteristics of the customer and so forth.

Upgrade Award

Figure 89:
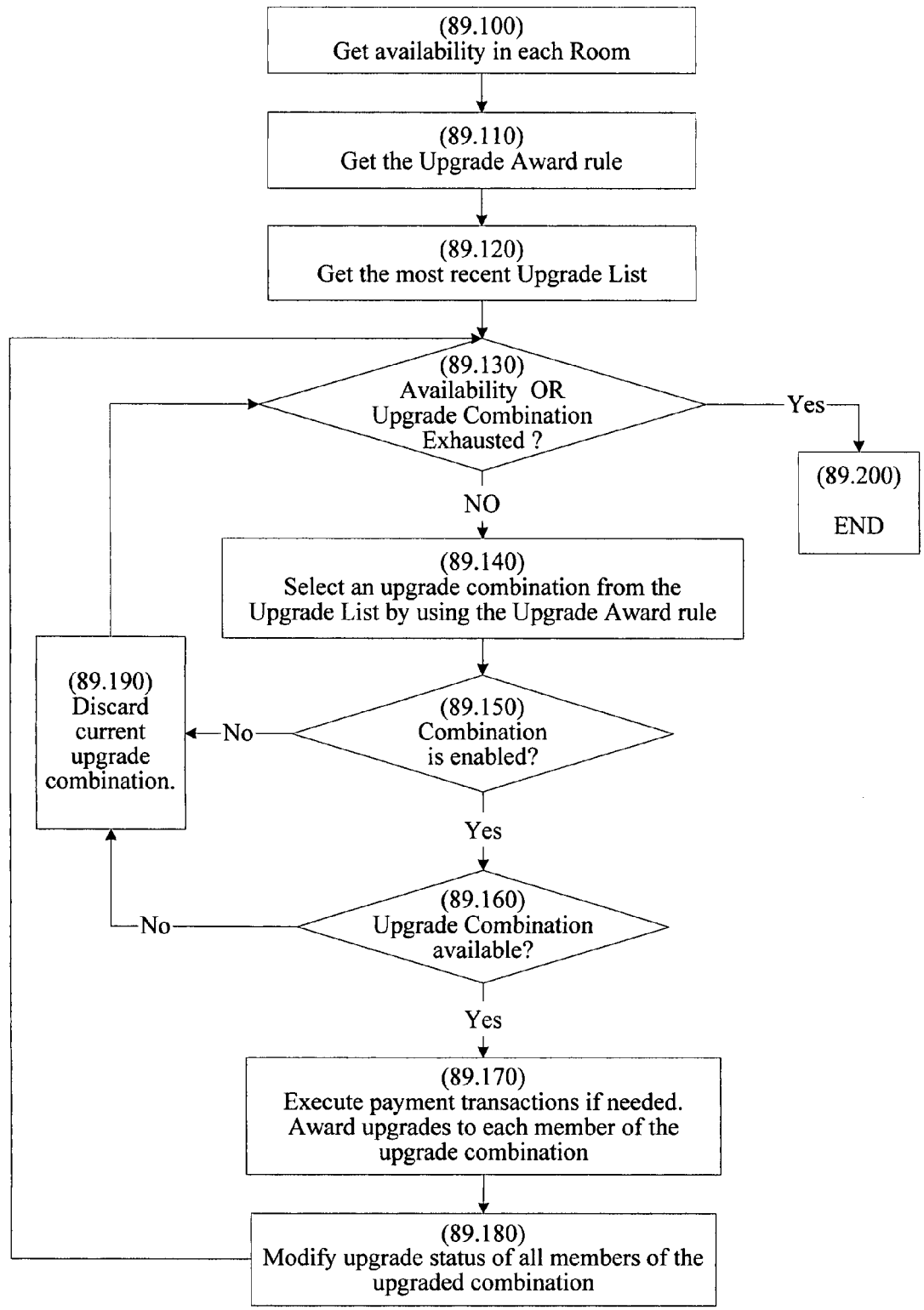
FIG. 89 is a flowchart that expands Act 130 of FIG. 86, illustrating an algorithm for the "Upgrade Award" process in URO VOF implementation.

FIG. 89 presents an illustrative Upgrade Award process. The algorithm of Upgrade Award has been explained in the UPO VOF above. A hotel may use any Upgrade Award rule of its choosing including, but not limited to, to maximize the total upgrade value (monetary or soft value or a combination of both), the number of upgrades or the number of customers buying the room, to balance demand across multiple rooms, to optimize customer service for all or a selected group of customers, to optimize operations and to accomplish any other objectives and/or any combination thereof.

When the Upgrade Award rule is set to maximize the total upgrade value, the upgrade value of each combination member preferably is added together to get the total upgrade value of the entire upgrade combination. Then, all the upgrade combinations from all the upgrade lists (one for each Up Room) are combined together to form one list sorted by descending value, and the topmost upgrade combination is selected as the target to be considered first for an upgrade award.

When the Upgrade Award rule is set to maximize the number of customers in the hotel, the number of upgrade awards given to standby customers may have to be optimized. Hence, an upgrade combination that includes a standby customer may be given preference over the one that does not include it. Consider a hotel with only two VIP rooms available. Assume there are two URO customers with GV option and two standby customers with SV option (for VIP Room). In this case, the Upgrade Award algorithm will allocate rooms to the two standby customers since this would increase the customer count in the hotel by two as compared to a no increase in the total customer count if the two customers with GV option are upgraded (assuming no standby customers with SV option are available). For the same example, if the Upgrade Award rule is set to maximize the total number of upgrades, the algorithm would choose those customers (out of 2 standby and 2 GV) that belong to the upgrade combinations with more number of members.

A hotel may also choose to select the target upgrade combination randomly: to add all the upgrade combinations from all the upgrade lists of a room to one list and then to randomly select an upgrade combination as the target combination.

An upgrade award may be given at any time before, after, and/or during the utilization of/checking in the room. It may also be given at a pre-determined time. For one or more Upgrade Award rules, a hotel may need to iterate over possible solutions. As explained above in the UPO VOF, in the Act 89.140, the process to choose the target upgrade combination may involve one or more sub-acts (one or more of which may be iterative) that enable the hotel to accomplish the overall objective.

The hotel may use the Upgrade Award rules mentioned above to optimize the desired objective(s) within one hotel or across multiple hotels. For example, a GV URO customer in hotel H1, may be offered an upgrade to the VIP room in hotel H2, when doing so would optimize the total upgrade revenue generated or distribute the load more uniformly across the two hotels (e.g., the hotel H1 may not have a VIP room available).

In situations, when there are more than one upgrade combination with the same optimal value, the hotel may use next level (one or more levels as needed) of Upgrade Award rule(s) to further prioritize the upgrade combinations. The next level of upgrade combination may include one or more of the rules defined above.

Both the hotel and the customer may have the right to enforce the upgrade award on each other as per the terms and conditions of the option contract. The hotel may have the right to charge the customer for the upgrade amount if the customer is upgraded. The hotel may inform/notify the customer and/or take approval from customer to charge the customer's account before awarding upgrade. The customer may also have the right to enforce upgrade on the hotel within the terms and conditions of the options contract.

The terms and conditions of the option contract may also specify fulfillment of one or more conditions before the hotel may award upgrade to the customers. Some of the conditions may be such as payment for upgrade, availability of the highest Up Room prior to the hotel starting with the process of upgrades and so forth.

Example of URO Exercise Process for a Hotel Room

Consider a hotel with 3 room types, guest room, business room and VIP room. A list of all the upgrade-enabled customers (along with their URO Types and upgrade values) for this hotel is presented in FIG. 90. The list contains a few URO customers, referred to as URO, a few customers who belong to other 'regular' (i.e., non-option) upgrade programs, referred to as Freebie or FRB, in short, and a few standby customers, referred to as SBY. There is one run scheduled for the Upgrade List at 30 minutes prior to the check-in/utilization, and one for Upgrade Award, at 25 minutes prior to check-in/utilization. The following demonstrates an execution of the algorithms for the URO Exercise process for the hotel room mentioned above.

Per Act 86.100, the above Room is taken in as an input. Next, control goes to Act 86.110, where a test is performed to determine whether it is time to run Upgrade List or Upgrade Award. When it is 30 minutes prior to check-in/utilization, the scheduler triggers the Upgrade List process, per Act 86.120. The Upgrade List process creates a list of upgrade combinations for the given input. Next, control goes to Act 86.140, where a test is made to determine whether any more scheduled runs (for the Upgrade List or the Upgrade Award) are pending. There is one scheduled run pending for the Upgrade Award. So, control loops back to Act 86.120. The scheduler waits until it is 25 minutes to check-in/utilization. At that point, the scheduler triggers the Upgrade Award process, per Act 86.130, which awards the customers based on the given availability in the rooms. Next, control goes to Act 86.140, where the test is run to determine whether any more scheduled runs are pending. There are none, so, the algorithm ends at this point (Box 86.200).

Details of the Upgrade List Process

Per Act 87.100, the list of customers, as shown in FIG. 90, (along with their URO Types and upgrade values) for the room is taken as an input. The standby customers are assumed to exist in a dummy room, Standby (S), that has the lowest priority among all the rooms (i.e., S<G<B<V). There are a total of 5 customers in the list. The first column in Box 90.100 displays the URO Type of each customer. The second column in the Box 90.100 displays the type of customer (URO or FRB or SBY). All customers are assigned a unique name, as per the third column in the Box 90.100, based on their URO Type and a numeric value. For example, a customer with URO Type GV is referred to as GV1. 'Up room', the fourth column in Box 90.100, defines the Up Room to which each customer can be upgraded. The Upgrade Value for all customers has been calculated using the method defined earlier and shown in the Box 90.100. For each row, the fifth, sixth, seventh and eighth columns display the payment value, soft value, upgrade cost and total upgrade value, respectively, for the corresponding customer.

Next, control goes to Act 87.110, where a list of the types of Upgrade combinations for the input room are obtained (e.g., from the hotel's URO database), as presented in the Box 90.200. The Boxes 90.210, 90.220 and 90.230 display all the types of upgrade combinations with one, two and three members, respectively for the VIP room. The Boxes 90.240 and 90.250 display all the types of upgrade combinations with one and two members, respectively for the business room. Box 90.260 displays all the types of upgrade combinations with one member for the guest room.

Next, per Acts 87.120 and 87.130, all the upgrade combinations are created as shown in FIG. 91. There are seven columns and 15 rows shown in FIG. 91. Each row corresponds to one upgrade combination leading to a total of 15 upgrade combinations. For each row, the entries in the first three columns display the members of that upgrade combination. The first column displays the member (if any) for which the Up Room is VIP room. The second column displays the member (if any) for which the Up Room is business room. The third column displays the member (if any) for which the Up Room is guest room. If there is no entry in either one or more columns (first, second or third) for a row, this implies that there is no member in that combination with an Up Room associated with that column. For example, the upgrade combination in the $5^{th}$ row, GBV1-SG1, does not have an entry in the first column, since it does not have a member who is entitled to an upgrade to the VIP room. The upgrade combinations for the VIP room are listed using the regular font, those for the business room are listed using the italics font and those for the guest room are listed using the bold font.

For each row, the fourth, fifth and sixth columns display the total upgrade value of the member of the upgrade combination listed in the first, second and third column, respectively. For each row, the entry in the seventh column displays the total upgrade value of the entire combination, which is the sum of the upgrade values of each of the combination member.

Once all the upgrade combinations are created, control goes to Act 87.140, where the upgrade list is returned, and then the algorithm ends per Box 87.200.

Details of the Upgrade Award Process

In the Upgrade Award process, per Act 89.100, the availability of each room is taken as input. In this case, there is one VIP room and one business room available, and there is no availability in the guest room, as shown in Box 92.100. Per Act 89.110, the Upgrade Award Rule is obtained, that specifies the objective to "maximize upgrade value". In Act 89.120, the most recent Upgrade List is obtained (e.g., from the hotel's URO system database), as shown in FIG. 91. Next, control goes to Act 89.130, where the test comes out to be negative, as neither availability nor URO customers have been exhausted. So, control goes to Act 89.140, where the Upgrade Award rule is used to select the target upgrade combination with the maximum upgrade value, which is the combination in the $1^{st}$ row, BV1-GBV1-SG1, as shown in the first row in FIG. 91.

Next, per Act 89.150, a test is performed to determine whether the combination is enabled. The above combination is enabled. So, control goes to Act 89.160, where a test is performed to determine whether there is availability for the current selected upgrade combination. The current upgrade combination (BV1-GBV1-SG1) needs only one VIP room. There is one VIP room available, and hence, the test result is affirmative. So, control goes to Act 89.170, where all the members of the current upgrade combination are upgraded to their respective Up Rooms.

The customer BV1 is upgraded from business to VIP, GBV1 is upgraded from guest to business (using the emptied room after BV1 is upgraded) and the standby customer SG1 is awarded guest room (using the emptied room after GBV1 is upgraded). This Act consumes only 1 available VIP room, and still 1 business room is available. The total value generated from this upgrade is $335, as shown in the seventh column in the first row in FIG. 91. In this Act, before awarding the upgrades, the hotel may have a requirement to execute payment transactions for some or all of the members of this combination. Since the standby customer SG1 may have already deposited the payment when he or she had bought the standby room; and the hotel may need to execute a payment transaction for the URO customers BV1 and GBV1 (i.e., to charge the exercise price of $95 and $115 to BV1 and GBV1, respectively). The hotel may use any payment transaction mechanism to do so (e.g., a pre-stored credit card, debit card, direct bank account debit, third party service like paypal and so forth). Next, the upgrade status for all the combination members is modified to reflect their awarded status, per Act 89.180.

Next, control loops back to the Act 89.130, where the test result again comes out to be negative, as both availability (one business room) and Upgrade Combinations (14 more) are not yet exhausted. So, control goes to Act 89.140, where the highest value upgrade combination is selected, which is the one in the second row, BV1-GB1-SG1, as shown in FIG. 91. Next, per Act 89.150, the test is performed to determine whether the combination is enabled. It is not, since both BV1 and SG1 have already been "awarded" and are currently in the disabled state. So, control goes to Act 89.190, where the current upgrade combination is discarded.

Next, control loops back again, and the Acts 89.130, 89.140, 89.150 and 89.190 are repeated 9 times. This is because of two reasons. First, the test in the Act 89.130 is negative each time, since both availability (one business room available) and the upgrade combinations are left. Second, the upgrade combinations from the third row to the eleventh row are disabled, and thus, discarded, per Act 89.190.

Next, control loops back to the Act 89.130, where the test result again comes out to be negative, as both availability (one business room available) and the Upgrade Combinations (4 more) are not yet exhausted. Next, control goes to the Act 89.140, where the upgrade combination GV1 in the 12$^{th}$ row in FIG. 91 is selected. The combination is enabled and thus passes the test, per Act 89.150. Next, per Act 89.160, availability is tested for the current selected upgrade combination. The current upgrade combination GV1 needs only one available VIP room. Since, there is no VIP room available, and hence, the test result is negative.

Next, control loops back to the Act 89.130, where the test result again comes out to be negative, as both availability (1 business room available) and the Upgrade Combinations (3 more) are not yet exhausted. The upgrade combinations in thirteenth and fourteenth row are disabled. Hence, no upgrade is possible.

Again, control loops back to the Act 89.130, where the test result again comes out to be negative, as both availability (1 business room available) and the Upgrade Combinations (1 more) are not yet exhausted. Next, control goes to the Act 89.140, where the upgrade combination GB1 in the fifteenth row in FIG. 91 is selected. The combination is enabled and thus passes the test, per Act 89.150. Next, per Act 89.160, availability is tested for the current selected upgrade combination. The current upgrade combination GB1 needs only one business room. There is 1 business room available, and hence, the test result is affirmative.

Thus, control goes to Act 89.170, where all the members of the current upgrade combination are upgraded to their respective Up Rooms. The customer GB1 is upgraded from guest to business room. If there is a payment condition required, that may be checked in this Act just before awarding the upgrades. Here, since GB1 is a FRB customer, there is no payment transaction required for GB1. So, there may be no need to execute any payment transaction at this point.

The total value generated by this upgrade is $80, as shown in the seventh column in the fifteenth row in FIG. 91. Next, the upgrade status of all the members in the current upgrade combination is modified to reflect their awarded status, per Act 89.180. Next, control loops back to the Act 89.130, where the test result is affirmative, since there are no more rooms and enabled upgrade combinations available. Therefore, the algorithm ends at this point (Box 89.200).

In the above example, as shown in Box 92.200, a total of four customers are awarded upgrades, out of which, 2 are URO, 1 is Freebie and the rest 1 is standby customer. As evident, the algorithm does satisfy the objective of the upgrade award rule (i.e., to optimize the total value to the hotel), and generates a total value of $415 for the hotel.

It may also be possible that a freebie customer with a zero or some payment value gets the upgrade over the URO customer with a higher payment value than the freebie customer. This may be because the soft value of the freebie customer may be higher than that of the URO customer, which may lead to a higher total value for the upgrade combination containing the freebie customer when compared to that of the URO customer.

Another observation which may be made is that some customers (for example, in the current instance, customer BV1) receive upgrade awards even though their individual upgrade values may be lower than the upgrade values of some other customers (for example, in the current instance, customer GV1). The upgrade value for BV1 is $95 and that of GV1 is $120. GV1 was not awarded upgrade ahead of BV1 because the total value of the upgrade combination takes precedence over the upgrade values of any individual member. The customer BV1 has different URO Type than GV1, and hence, he/she belong to different types of upgrade combinations. The total values of all the upgrade combinations that included GV1 were lower than those of the awarded upgrade combinations that included BV1.

A hotel may use the URO VOF for any other purpose of its choosing. In all such uses, the hotel may use a system defined below that can help to optimally allocate room capacity among customers. The following system presents another example of a system (along with its methods and algorithms) that may be used to upgrade URO customers within their selected URO Rooms. However, a hotel may use any other process of its choosing to upgrade URO customers within their selected URO Rooms. The Buy_N process is used as an example to demonstrate the system and its set of methods and algorithms.

The process of upgrading U customers (i.e., URO customers) within their selected URO Rooms is termed "Upgrade_U" process. The Upgrade_U process may allow the hotel to optimally upgrade URO customers from their Accounted Rooms (Base-Rooms) to one of their Awaiting Rooms (Up Rooms) to satisfy a pre-defined goal.

The hotel, an entity other than the hotel and/or any combination thereof may store the data in a data store which may include, but is not limited to, the value that may be realized if the customer receives an upgrade. The hotel, an entity other than the hotel and/or any combination thereof may receive and process data to determine from among all or substantially all possible combinations of customers, a set of customers which may be awarded upgrades. The hotel, an entity other than the hotel and/or any combination thereof may upgrade one or more set of customers that may be determined by processing the data. The hotel may also upgrade one or more set of customers other than the combination of customers that may be determined by processing said data. Set of customers which may be upgraded or the decision to initiate upgrade award process may depend upon number of factors including, but not limited to, the need to upgrade customers, factors of hotel's choosing, creation of number of units of room availability, availability of Up Rooms, optimizing revenues which may for at least one of the customer, hotel and/or an entity other than said hotel, cost savings and so forth.

The hotel may, on detection of occurrence of one or more events, execute one or more event response algorithms which may determine one or more set of customers possessing options making them eligible to be upgraded to one or more rooms and may upgrade one or more of said set of customers to create room availability. Said event may be an increase in the demand of one or more Base-Rooms, increase in forecasted demand of one or more Base-Rooms, availability of one or more Up Rooms, any combination thereof or any other event. The upgrade award process may be done at the instance of the hotel, an entity other than said hotel or any combination thereof. The set of customers, here, may include one or more customers. The upgrade process may involve upgrading one or more customers. Upgrade of one or more customers, as explained below in Upgrade_U, may involve one or more interactions between the hotel, an entity other than the hotel, the customers and/or any combination thereof. The hotel and/or an entity other than the hotel may upgrade one or more customers to one or more rooms belonging to said hotel, to one or more rooms belonging to an entity other than said hotel and/or any combination thereof.

Buy_N Process

Figure 93:
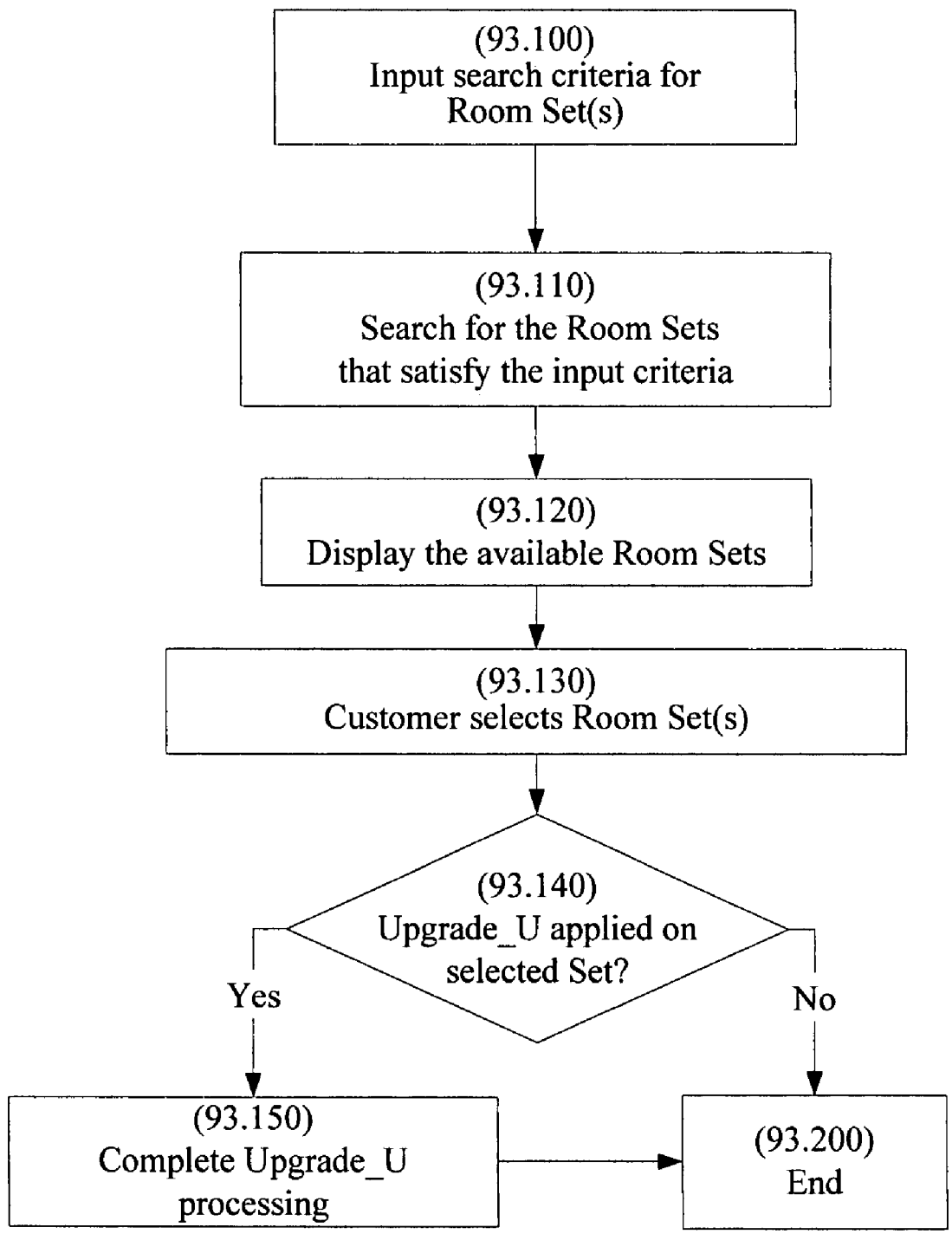
FIG. 93 is a flowchart illustrating the Buy_N process for a Room Set of a hotel that has implemented the URO VOF.

FIG. 93 displays a flow chart of an example of a Buy_N algorithm, which is executed during a dynamic interaction between the customer and the hotel. As an example, an interaction may include a situation when a customer interacts with a hotel to obtain (or purchase) rooms, or when a hotel presents offerings to a customer (with or without a solicitation by the customer). A few parameters have been assumed to add context and enhance understanding. It is assumed that a customer is interacting with a hotel to purchase rooms, and that URO VOF is implemented at the Set level. In Act 93.100, the search criteria are input. Various search parameters for a desired Room Set (as desired by the customer) are taken as the input to the system.

Next, in Act 93.110, a search process is executed to search for all Room Sets that satisfy inputs. The details of the search process are described later. Next, in Act 93.120, all the search results are displayed before the customer in an interface (such as in a web browser, a telephone operator stating the search results over the phone etc.). Control then goes to Act 93.130, where the customer selects a Set (or Room Set). The selection of the Set may be followed by a payment and/or purchase of the selected Set.

In Act 93.140, a test is performed to determine whether Upgrade_U process has been applied on the selected Set. If so, control goes to Act 93.150, where the Upgrade_U process is completed for the selected Set, and control then goes to Box 93.200. If not, control goes to Box 93.200, where the algorithm exits. The completion of the Upgrade_U process may include one or more Acts that may be executed to incorporate the fact that said Set was selected by the customer. For example, one of such acts may be to record the selection of said Set to a database and/or to change the Accounted Status for one or more URO customers (who were affected in the Upgrade_U process).

Figure 94:
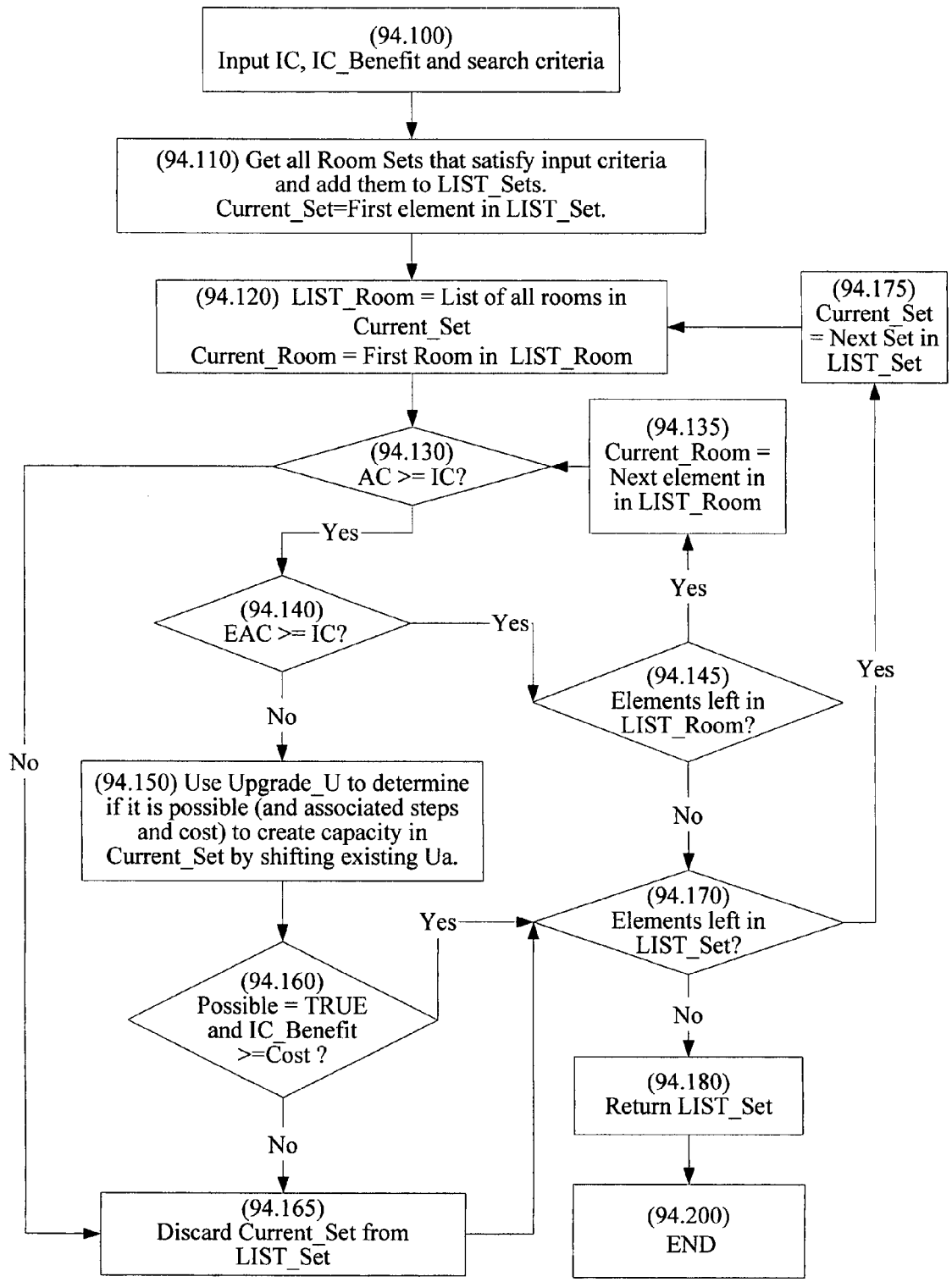
FIG. 94 is a flowchart that expands Act 110 of FIG. 93, illustrating an algorithm for the Buy_N search process.

FIG. 94 expands Act 110 of FIG. 93 and demonstrates an example of a search algorithm that may be used to determine Room Sets that satisfy the inputs. In Act 94.100, IC (number of incoming customers), IC_Benefit (i.e., the benefit that a hotel may receive if the incoming customers select and/or purchase one or more Sets) and the input search criteria are taken as the input parameters to the system. The term "Incoming Customers" refers to the customers who interact with the hotel in the current transaction (Buy_N). It is assumed that each customer desire one unit of capacity (room capacity) and thus, total units of capacity desired is equal to the total number of incoming customers. In some situations, IC_Benefit and/or IC may not be available as an input, and may be calculated during the search process. Next, in Act 94.110, all the Sets that satisfy the 'search criteria' are searched from the hotel database. The Sets, thus obtained, are added to a list termed LIST_Set. The first element in the LIST_Set list is designated as Current_Set.

Next, in Act 94.120, all the Rooms in the Current_Set are added to a list termed LIST_Room. The first element in the LIST_Room list is designated as Current_Room. Next, in Act 94.130, a test is performed to determine whether the Available Capacity (AC) of the Current_Room is greater than or equal to IC. If so, control goes to Act 94.140. If not, control goes to Act 94.165.

In Act 94.140, another test is performed to determine whether EAC (Effective Available capacity) of the Current_Room is greater than or equal to IC. If so, control goes to Act 94.145. If not, control goes to Act 94.150, where the Upgrade_U algorithm is executed to determine the possibility (and associated process steps and costs) to create capacity in the Current_Set.

Next, in Act 94.160, a test is performed to determine whether it is possible (by using Upgrade_U) to create capacity in the Current_Set and the IC_Benefit is greater than or equal to the cost to create that capacity as determined in the Act 94.150. If both conditions are true, control goes to Act 94.170. If either condition is false, control goes to Act 94.165. In Act 94.165, the Current_Set is discarded from the LIST_Set list, and control then goes to Act 94.170.

In Act 94.145, a test is performed to determine whether more elements are left in the LIST_Room list. If so, control goes to Act 94.135, where the next element in the LIST_Room list is designated as the Current_Room and control loops back to Act 94.130, to repeat the process for the new Current_Room. If not, control goes to Act 94.170.

In Act 94.170, another test is performed to determine whether more elements are left in the LIST_Set list. If so, control goes to Act 94.175, where the next element in the LIST_Set list is designated as the Current_Set and control loops back to Act 94.120, where the process for the new Current_Set is performed. If not, control goes to Act 94.180, where the LIST_Set list (the most recently updated version after discarding the invalid Sets, if any) is returned. Next, the algorithm ends at Box 94.200.

Figure 95:
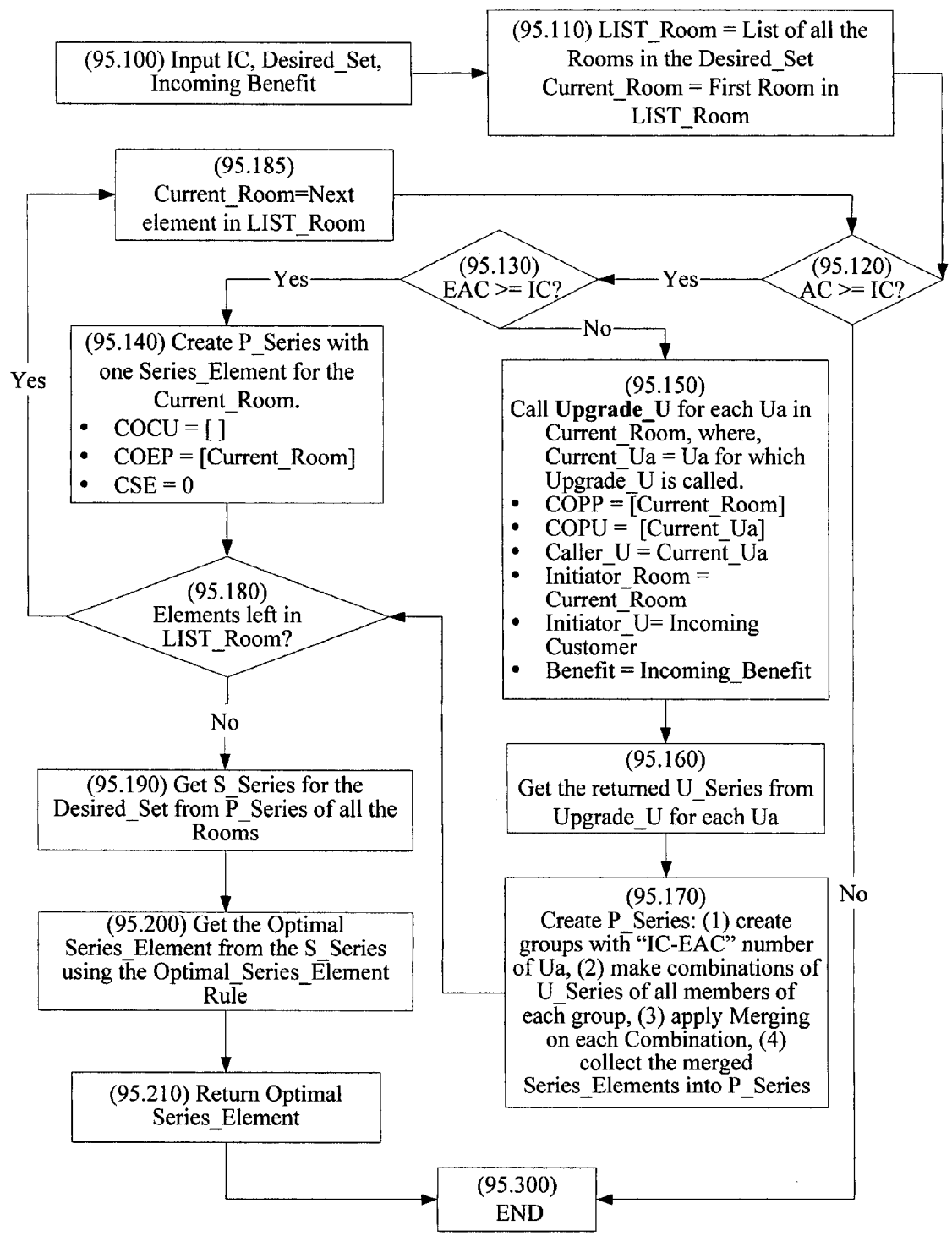
FIG. 95 is a flowchart that expands Act 150 of FIG. 94, illustrating an algorithm to create capacity using the Upgrade_U algorithm.

FIG. 95 expands Act 150 of FIG. 94 and demonstrates an example of an algorithm to apply the Upgrade_U algorithm to create one or more units of capacity in one or more Room(s) within a Desired_Set (the Set in which capacity needs to be created). In Act 95.100, various input parameters are taken in the system. Input parameters include IC, Desired_Set and Incoming_Benefit (i.e., benefit a hotel may realize if capacity is created in the Desired_Set)

Next, control goes to Act 95.110, in which all the Rooms in the Desired_Set are listed in the LIST_Room list. The first Room in the LIST_Room list is designated as Current_Room. Next, in Act 95.120, a test is performed to determine whether the Available Capacity (AC) of the Current_Room is greater than or equal to IC. If so, control goes to Act 95.130. If not, control goes to Box 95.300, where the algorithm ends. In Act 95.130, another test is performed to determine whether EAC (Effective Available capacity) of the Current_Room is greater than or equal to IC. If so, then control goes to Act 95.140. If not, control goes to Act 95.150.

In Act 95.140, a P_Series is created for the Current_Room. Since the Current_Room is an End_Room, there will be only one Series_Element in the P_Series collection. The Series_Element will comprise COEP with the Current_Room as the only element, COCU with no elements and CSE with zero value (since no Ua needs to be upgraded from Current_Room, and hence, no cost to create capacity). Next, control goes to Act 95.180.

In Act 95.150, the Upgrade_U algorithm is called for each Ua in the Current_Room and the algorithm follows a recursive loop. Each of the Ua becomes Current_Ua for the corresponding Upgrade_U call. The necessary input parameters for each of the Upgrade_U includes the Current_Room as 'COPP', Current_Ua as 'COPD', Current_Ua as 'Caller_U', Current_Room as 'Initiator_Room', one of the incoming customers as 'Initiator_U' and Incoming_Benefit as 'Benefit'. The Upgrade_U call returns a U_Series collection for each Ua in the Current_Room. The details of the Upgrade_U algorithm are discussed in the next section.

Next, control goes to Act 95.160, where all the U_Series collections are obtained as returned from the Act 95.150. Next, in Act 95.170, a P_Series collection for the Current_Room is calculated through the following operations: (1) create groups of Ua from all Ua of the Current_Room for which Upgrade_U was called, where the number of Ua in each group is equal to "IC-EAC" (EAC of the Current_Room), (2) make combinations of the U_Series collection of all members of each group (combine each Series_Element of each U_Series of each member with that of each of the rest of the members of that group), (3) merge all members within each combination to formulate a merged Series_Element, (4) collect all such merged Series_Elements, thus obtained, into P_Series collection of the Current_Room. Details on making combinations and merging are provided later.

Next, in Act 95.180, a test is performed to determine whether more elements are left in the LIST_Room list. If so, control goes to Act 95.185, where the next element in the LIST_Room list is designated as the Current_Room and control loops back to Act 95.120 to repeat the process for the new Current_Room. If not, control goes to Act 95.190.

In Act 95.190, a S_Series collection for the Desired_Set is calculated from the P_Series collections of all the Rooms using the combination and merging process. Next, in Act 95.200, an optimal Series_Element from the S_Series collection is determined using Optimal_Series_Element Rule (which is read from a hotel database). A hotel may select any rule of its choosing. Next, control goes to Act 95.210, where the optimal Series_Element is returned and the algorithm exits at Box 95.300.

'Upgrade_U' Algorithm

Figure 96:
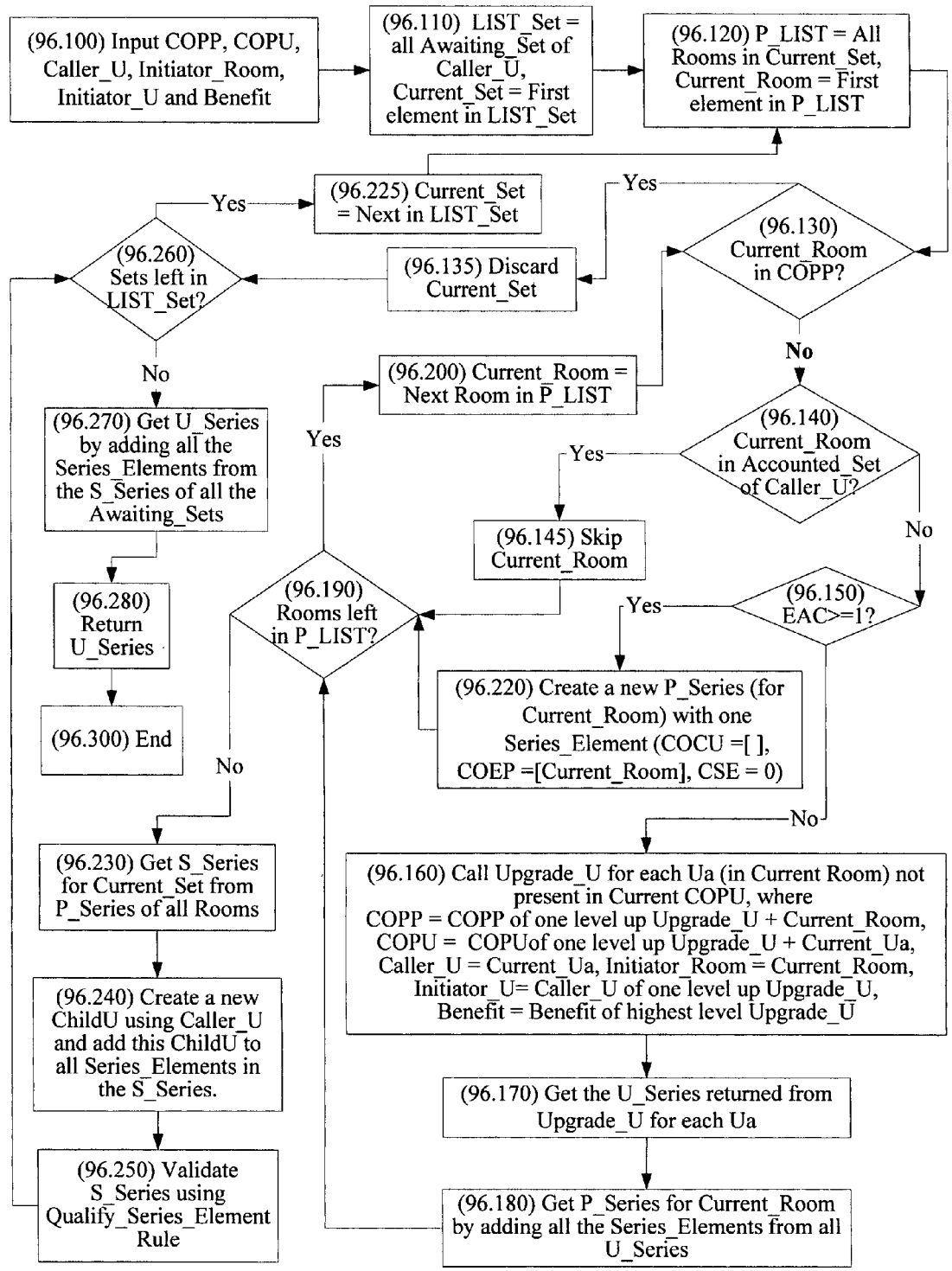
FIG. 96 is a flowchart that expands Act 150 of FIG. 95, provides an algorithmic illustration for the Upgrade_U algorithm.

The following algorithm presents an example of an algorithm that may be used to create one unit of capacity of a Room by upgrading a Ua Accounted in a Room to its Awaiting_Set. FIG. 96 represents an algorithmic illustration for Upgrade_U. The Upgrade_U is a recursive algorithm, which returns a collection of Series_Element termed "U_Series" collection for the Ua for which the algorithm has been called.

In Act 96.100, a set of parameters including COPU, COPP, Caller_U, Initiator_Room, Initiator_U and Benefit are input to the system. Next, in Act 96.110, all the Awaiting_Sets of the Caller_U are added to a list termed LIST_Set. The first element in the LIST_Set list is designated as Current_Set. Next, in Act 96.120, all the Rooms that belong to the Current_Set are added to another list termed P_LIST. The first element in the P_LIST list is designated as Current_Room.

Next, in Act 96.130, a test is performed to determine whether the Current_Room is present in the COPP. If so, the Current_Set is discarded in Act 96.135, and control goes to Act 96.260. If not, control goes to Act 96.140.

In Act 96.140, another test is performed to determine whether the Current_Room is present in the Accounted_Set of the Caller_U. If so, the Current_Room is skipped in Act 96.145, and control then goes to Act 96.190. If not, control goes to Act 96.150, where another test is performed to determine if the EAC of the Current_Room is greater than or equal to 1. If so, control goes to Act 96.220. If not, control goes to Act 96.160.

In Act 96.220, a new P_Series collection is created with only one Series_Element, since the Current_Room is an End_Room. The Series_Element will comprise COEP with the Current_Room as the only element, COCU with no elements and CSE with zero value. Next, control goes to Act 96.190.

In Act 96.160, the algorithm enters into a recursive loop where the Upgrade_U algorithm is called for each of the Ua in the Current_Room that is not present in the COPU. Each of the Ua becomes Current_Ua for the corresponding Upgrade_U call. The necessary input parameters for each of the Upgrade_U includes 'COPP' (includes the COPP of one level up Upgrade_U and the Current_Room), 'COPU' (includes the COPU of one level up Upgrade_U and the Current_Ua), the Current_Ua as 'Caller_U', the Current_Room as 'Initiator_Room', Caller_U of one level up Upgrade_U as 'Initiator_U' and benefit of the highest level Upgrade_U as 'Benefit'. Each of the Upgrade_U call returns a U_Series collection for every Ua for which Upgrade_U was called.

Next, in Act 96.170, the algorithm receives the returned U_Series collection from all the Upgrade_U algorithm calls in Act 96.160. Control then goes to Act 96.180, where a P_Series collection for the Current_Room is calculated by adding all the Series_Elements from all the returned U_Series collection obtained in Act 96.170. Control then goes to Act 96.190.

In Act 96.190, a test is performed to determine whether more Rooms are left in the P_LIST list. If so, control branches out to Act 96.200, where the next Room in the P_LIST list is designated as the Current_Room, and control then goes to Act 96.130 where the process is repeated for the new Current_Room. If not, control goes to Act 96.230.

In Act 96.230, the S_Series collection is calculated for the Current_Set by combining and merging all the P_Series collection of all the Rooms (not taking the skipped Room(s) into consideration, if any). Next, in Act 96.240, a new ChildU is created using the Caller_U. The ChildU comprises COI (where the current Initiator_Room is designated as Initiator_Room and the current Initiator_U is designated as Initiator_U), Accounted_Set of the Caller_U designated as the Initial_Accounted_Set, current Awaiting_Set designated as the Final_Accounted_Set, and the cost to upgrade current Caller_U from the Initial_Accounted_Set to the Final_Accounted_Set designated as the CCU. The ChildU, thus created, is added to every Series_Element in the S_Series collection and the CCU of the same ChildU is added to the CSE (Cost of Series_Element) of every Series_Element. Control then goes to Act 96.250.

In Act 96.250, a Qualify_Series_Element rule is read from the hotel's database and is applied to validate all the Series_Elements in the S_Series collection. The invalid Series_Elements are discarded from the S_Series collection. A hotel may select any rule of its choosing. For example, a Qualify_Series_Element rule may only qualify those Series_Elements for which the CSE is greater than or equal to the 'Benefit'. Next, control goes to Act 96.260.

In Act 96.260, a test is performed to determine whether more Sets are left in the LIST_Set list. If so, control branches out to Act 96.295, where the next element in the LIST_Set list is designated as the Current_Set, and then control loops back to Act 96.120, where the process is repeated for the new Current_Set. If not, control goes to Act 96.270, where the U_Series collection is obtained by adding all the Series_Elements of all the S_Series collections for all the Awaiting_Sets of the Caller_U. Next, the U_Series collection is returned in Act 96.280, and the algorithm ends in Box 96.300.

Combinations of P_Series in order to formulate S_Series are calculated by cross multiplication of Series_Elements (of each P_Series). A hotel may choose to implement any method of its choosing to make combinations. One method is as follows. Consider n number of Series; say $S_1, S_2, S_3 \ldots S_n$, with k1, k2, k3 ... kn number of Series_Element respectively. Each Combination is a collection of the Series_Elements. For instance, $C1=\{S_1[1], S_2[1], S_3[1], \ldots S_n[1]\}$, where, $S_p[1]$ denotes the first Series_Element of $p^{th}$ Series; $C2=\{S_1[2], S_2[1], S_3[1], \ldots S_n[1]\}$, and so on. Here is an example of the above method. Consider 2 Series, A and B, where A=[A1, A2], i.e., with A1 and A2 as two Series_Elements; and where B=[B1, B2, B3], i.e., with B1, B2, B3 as three Series_Elements. If cross multiplication method is applied, then the total number of Combinations generated is 6 (=2*3) as follows, C1={A1, B1}, C2={A1, B2}, C3={A1, B3}, C4={A2, B1}, C5={A2, B2} and C6={A2, B3}. The above method of making combinations may also be used when making combinations of U_Series to formulate a P_Series.

Merging of a given number of Series_Elements is done in a sequential process, where two given Series_Elements are merged together in one Act to obtain a single merged Series_Element (let's say M), and then the merged element, M, is merged with the third given Series_Element to obtain a new merged element, and so on. The main objective of merging is to ensure that the Series_Elements created are valid and synchronized with each other with respect to capacity utilization of various rooms involved. A given unit of room capacity at any given point must only be accounted for one customer, otherwise, it may lead to a shortage situation, where one room is allocated to more than one customer leading to dissatisfaction for customers. A hotel may choose any method of its choosing to perform merging of Series_Elements, and specifically to perform merging of two Series_Elements. The method of merging chosen may affect the total value realized. One example of such a method is given. In one approach, a hotel may choose to discard all merged Series_Elements that have either one or more common ChildU or common End_Room. A common ChildU in two Series_Elements suggest that in both Series_Elements upgrading of one specific Ua is needed. If each Series_Element requires upgrading of Ua to two different Sets, it may present a contradictory situation. Similarly, a common End_Room in two or more Series_Elements (that are to be merged together) may require to upgrade more than one Ua customer to a specific Room, which may or may not be feasible depending on the AC (and EAC) of that room. Thus, a common End_Room may also represent one or more contradictory or invalid situations.

A hotel may use any set of rules to validate or invalidate one or more constituents of any of the merged components. For example, a merged Series_Element, M, obtained from merging of two Series_Elements S1 and S2, may comprise the COEP (addition of COEP of S1 and S2), COCU (addition of COCU of S1 and S2) and CSE (addition of CSE of S1 and S2).

Upgrade_U and Buy_N processes may generate value for the hotel, an entity other than the hotel, customers and/or any combination thereof. The value may include, but is not limited to cost savings for the hotel, an entity other than said hotel, any combination thereof. The value generated may also include, but is not limited to, soft value, value attributable to customer goodwill, satisfaction and loyalty. The value so generated may optimize revenue of at least one entity other than said hotel.

Customer Notification Process

In the Customer Notification (CN) process, a decision for the Chosen Room is notified to the customer. As mentioned earlier, the Chosen Room may be defined by the hotel, the customer, another entity or any combination thereof. However, the hotel may want to keep the right to select (or define) the Chosen Room in the URO VOF. A hotel may use any method of its choosing to define the Chosen Room. A hotel may use a software application built on the method defined above to optimally define the Chosen Room to URO customer.

Figure 97:
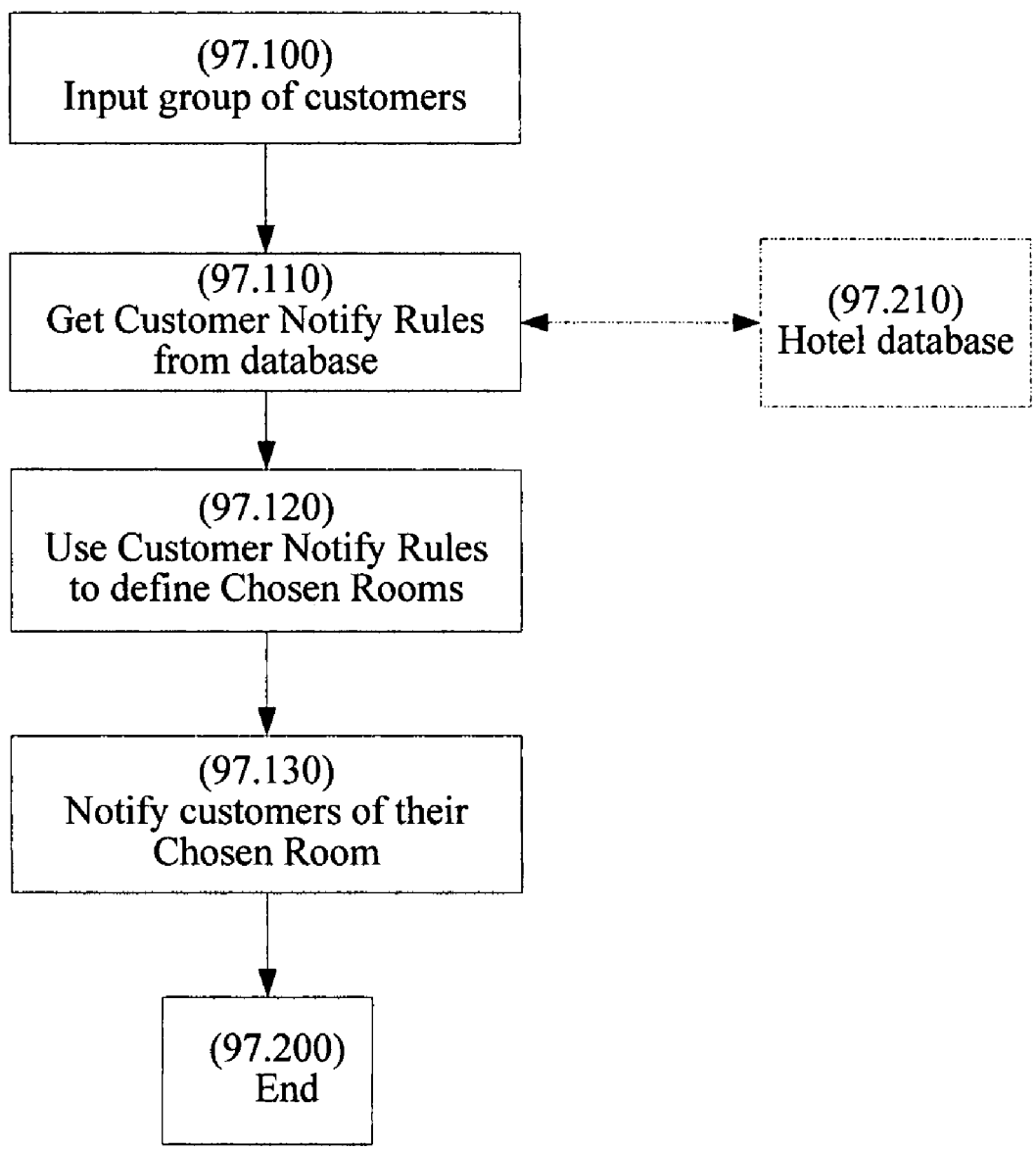
FIG. 97 is a flow chart illustrating an example of an algorithm of Customer Notification process in the hotel industry.

FIG. 97 displays an example of an algorithm that may be used to execute the Customer Notification process. In Act 97.100, a group of (one or more) customers is taken as input. Next, in Act 97.110, a set of one or more Customer Notify Rules may be used to define the Chosen Room. A hotel may choose any Customer Notify Rule of its choosing. The Customer Notify Rules may depend upon expected value of the Room, expected sales volume and so forth. For example, a hotel may choose a Customer Notify Rule which selects the Room with the higher value as the Chosen Room. Alternatively, a rule may be chosen, which selects the Room with the lower value as the Chosen Room. While defining the Chosen Room, a hotel may also want to use the Upgrade_U algorithm (as used in the Buy_N process given above) to determine the optimal Chosen Room that satisfies a pre-determined goal. Thus, during the CN process, one or more Ua may be upgraded in the process of selecting the optimal Chosen Room. A Customer Notify Rule may also select the Room with the higher sales volume as the Chosen Room. A Customer Notify Rule may specify that if URO VOF is used in conjunction with any other VOF (such as FRO VOF and so on), then the Grouping Rules (defined later) may govern the selection of the Chosen Room.

Next, in Act 97.120, the Customer Notify Rules, thus obtained from the hotel's database, are used to define Chosen Room(s). Next, in Act 97.130, the customers are notified about their Chosen Room(s), and the algorithm then ends in Box 97.200.

Implementation of URO VOF in Conjunction with Other VOFs

URO VOF may be used in conjunction with one or more other VOFs, for example, the ARO (the Alternate Room Option) VOF. A customer who receives an ARO is termed "A" type of customer. A hotel and/or another entity may form a group of one or more ARO customers and one or more URO customers, where the options (ARO and URO) obtained by the group members are complimentary in nature. As an example, consider two customers A(R1, R2) and U[up(R2), base(R1)]. The notation A(R1, R2) implies a customer A who has received an ARO and has the flexibility to choose either of R1 or R2 as the Chosen Room. The notation U[up(R2), base (R1)] implies a customer U who received a URO and wishes to get an upgrade from R1 (i.e., the Base-Room) to R2 (i.e., the Up Room). Thus, if A decides to choose R1 as the Chosen Room, the hotel may upgrade U to R2. If A decides to choose R2 as the Chosen Room, the hotel may not upgrade U and hence U gets R1. The customers A and U have taken complimentary options and may form a group. The hotel may need to hold only one unit of inventory in R1 and R2 to satisfy the needs of both A and U (assuming each A and U only need one unit of room). Such a combination of complimentary options or VOFs may improve efficiency and concurrently enhance value for all the parties involved (in the context of the current example, enhance value for U, A and the hotel).

The implementation of the grouping of U type and A type of customers may be done in one or more ways. One way to implement such grouping is to first offer and secure one or more U type of customers and based on such customer(s), the hotel may offer complimentary AROs to customers to make groups. In another implementation, the hotel may first offer and secure ARO customers and based on such ARO customer(s), hotel offers complimentary UROs to customers to make groups. In yet another implementation, the hotel may offer URO and ARO separately and then define a process to make complimentary groups of A and U customers (such groups termed "AU_Groups").

A hotel and/or another entity may choose to create AU_Groups at various group levels such as implementation of grouping at Level 1, Level 2 and so on. In Level 1 grouping, an AU_Group involves one each of A and U type of customers. An example of Level 1 grouping has already been given above (the two customer, A and U, example).

In Level 2 grouping, the grouping involves making complimentary groups for more than 2 customers. As an example, consider three customers A(R1, R2, R3), U1[up(R2, R3), base(R1)] and U2[up(R1, R3), base(R2)]. The notation A(R1, R2, R3) implies a customer A who received an ARO on R1, R2 and R3 (flexibility to choose any one of R1, R2 or R3 as the Chosen Room). The notation U1[up(R2, R3), base(R1)] implies a customer U1 who received a URO and wishes to get an upgrade from R1 (Base-Room) to either R2 or R3 (any of the two Up Rooms), and U2[up(R1, R3), base(R2)] implies a customer U2 who received a URO and wishes to get an upgrade from R2 (Base-Room) to either R1 or R3 (any of the two Up Rooms). A hotel may group these three customers together. If A decides to choose R1 as the Chosen Room, the hotel may upgrade U1 to R2 and U2 to R3. Alternatively, if A decides to choose R2 as the Chosen Room, the hotel may upgrade U1 to R3 and U2 to R1. In the third case, if A decides to choose R3 as the Chosen Room, the hotel may upgrade U1 to R2 and U2 to R1. Thus by grouping them together, the hotel needed to hold only one unit of inventory in each of the three rooms R1, R2 and R3 to satisfy needs for all three customers in all different situations.

It is assumed that a "unit" represents one unit of room (or room capacity) and each customer needs only one unit of a room. Continuing with the above example, if the hotel were to not consider the complimentary nature of options obtained by A, U1 and U2 customers, the hotel may need to hold (or block) a total of 5 units of capacity to ensure complete satisfaction of needs of A, U1 and U2, i.e., 3 units for A (1 unit each of R1, R2 and R3 as A could choose any room), 1 unit for U1 in R1 (Base-Room) and 1 unit for U2 in R2. Even by blocking (or holding) 5 units of space, there may be no guarantee that the hotel would be able to satisfy upgrade needs for U1 or U2 (in the event they are not grouped together). This implies, to satisfy a total need of 3 units of rooms, the hotel may need to hold (or block) 5 units of room capacity, creating a redundant capacity of 2 units that the hotel may not be able to use otherwise. By creating a complimentary group of A-U1-U2, the hotel needs to only hold (or block) 3 units of capacity (1 unit each in R1, R2 and R3), thus, freeing up 2 units of redundant capacity. Thus, an AU_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be A-U1-U2-U3.

A hotel and/or another entity may choose to implement grouping at various levels such as Room, Set and Order. A hotel may also change terms and conditions of one or more option contracts of one or more URO and/or ARO customers (for e.g., price, notify deadline and so on) to solicit customer participation in URO/ARO to create more AU_Groups. The hotel may also offer incentives to customers to choose complimentary URO/ARO offerings to enable the hotel to create more AU_Groups. The implementation methods mentioned above for grouping are for illustration purposes only and a hotel may choose to implement grouping in one or more other ways or by combining above said methods or by combining one or more other ways along with one or more above said methods.

Figure 98:
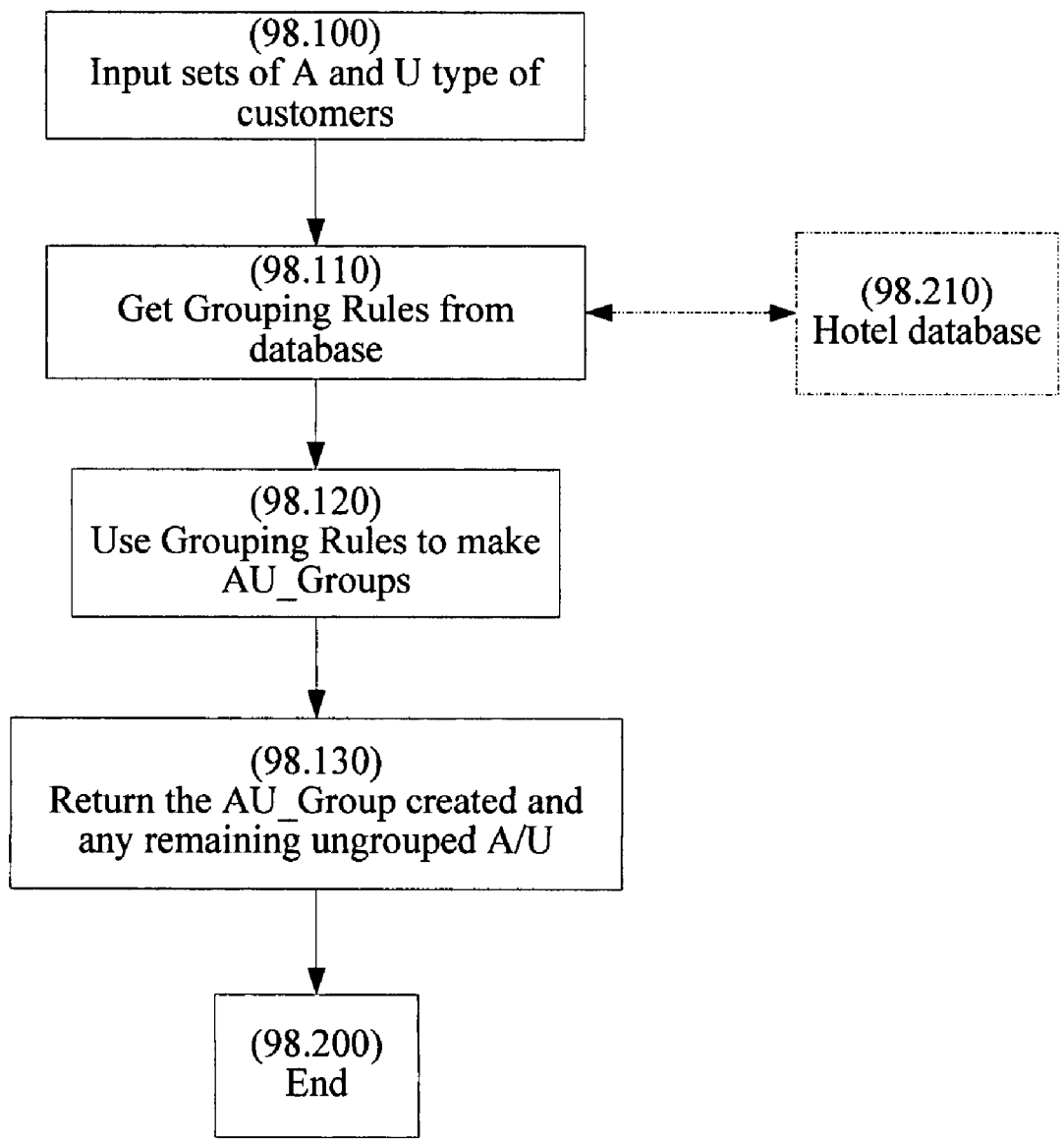
FIG. 98 is a flowchart illustrating an example of an algorithm to implement grouping of A and U type of customers in the hotel industry.

FIG. 98 displays a flow chart that illustrates one way of implementing grouping of A and U type of customers. In Act 98.100, sets of A and U customers are taken as input. Next, in Act 98.110, a set of one or more Grouping Rules is read from the hotel's database (98.210). A grouping rule may depend upon the number of A and/or U type of customers, desired capacity redundancy in the system, the permissible time factor to create AU_Groups, any other rule of hotel choosing, any combination thereof and so on. For example, a hotel may choose a Grouping Rule whereby new groups are created by first ungrouping one or more of the AU_Groups (created earlier but unexercised, for example, groups for which the customer has not been notified, or if notified, the customer has not utilized the Room and the terms of option contract allows for a change in the Chosen Room). In another example, a Grouping Rule may create groups of only those A and U type of customers who are yet to be grouped and discarding all A/U customers, which have already been grouped. A hotel may implement any Grouping Rule to formulate AU_Groups. The choice to Grouping rules may enhance the overall value for the hotel (for example, reduce the total capacity required to satisfy room needs for all A and U customers). Theoretically, the number of units of the Room required (or blocked) should be equal to the number of units the customers shall be eventually utilizing. Thus, by implementing the grouping and with the help of appropriate Grouping Rules, the hotel may attempt to achieve such theoretical minima.

Next, in Act 98.120, the Grouping Rules, so obtained from the hotel's database, are used to make AU_Groups. Next, in Act 98.130, the AU_Groups so created are returned along with ungrouped A/U, if any, and the process then ends in Box 98.200.

The grouping may enhance customers' experience, and may comprise operating a system that delivers a URO to at least a "first customer" to utilize up to n of m selected rooms for said first customer, where n is less than or equal to m; operating a system that delivers an ARO to at least a "second customer" to utilize up to k of p selected rooms, where k is less than or equal to p; operating a system to define each of the k Chosen Rooms, whereby after each of the k Chosen Rooms is defined, said "second customer" can utilize said Chosen Room; operating a system wherein a hotel defines t Chosen Room(s) for said "first customer" after each of said k Chosen Rooms is defined, wherein after each of said t rooms is defined, said first customer can utilize said defined room, where t is less than or equal to n. Said t rooms may be a subset of n rooms, m rooms or both. Said t rooms or n rooms or both may also include one or more rooms not included in said m selected rooms. Similarly, k rooms may be a subset of p rooms, or may include one or more rooms other than said p rooms. The grouping may be performed for a multiplicity of at least one of said first or second customers and may combine together at least one of each of said first and second customers to formulate at least one group with at least one complementary set of options. The grouping may enable a hotel, an entity other than said hotel or any combination thereof, to utilize at least one of said m or p rooms at least after delivery of any of said first or second options. The hotel and/or an entity other than said hotel may implement URO VOF where in the first and/or second customer in said grouping may be same. The notification conditions may be different, same or any combination thereof for the first and second option.

Said first and/or second option may or may not include any notification deadline condition. The hotel, the second customer, an entity other than said hotel and/or any combination thereof may define, at one or more times, at least one of said k Chosen Rooms. The hotel, the first customer, an entity other than said hotel and/or any combination thereof may define, at one or more times, at least one of said p Chosen Rooms. The first customer may select, at one or more times, at least one of said m rooms. The second customer may select, at one or more times, at least one of said p rooms. The hotel and/or an entity other than the hotel may receive from at least one of said first or second customer, at one or more times, an indication of one or more terms and conditions associated with said first or second options, respectively. Similarly, at least one of said hotel and/or an entity other than said hotel may deliver to at least one of said first or second customers, at one or more times, one or more terms and conditions associated with said first or second option, respectively. There may or may not be any payment transaction between the hotel, an entity other than the hotel, and at least one of said first and/or second customer.

URO VOF may be used in conjunction with one or more other VOFs, for example, the FRO (Flexibility Reward Option) VOF. A hotel may form a group of one or more FRO customers and one or more URO customers, where the options (URO and FRO) obtained by the group members are complimentary in nature.

The implementation of the grouping of U type and Y type of customers may be done in one or more ways. One way to implement such grouping is to first offer and secure one or more Y type of customers and based on such customer(s), the hotel and/or another entity may offer complimentary UROs to other customers to make groups. In another implementation, the hotel may first offer and secure URO and based on such URO customer(s), hotel offers complimentary FROs to other customers to make groups. In yet another implementation, the hotel may offer URO and FRO separately and then define a process to make complimentary groups of U and Y customers (such groups termed "UY_Groups").

A hotel and/or another entity may choose to create UY_Groups at various group levels such as implementation of grouping at Level 1, Level 2 and so on. In Level 1 grouping, a UY_Group involves one each of U and Y type of customers. As an example, Level 2 grouping is given below.

In Level 2 grouping, the grouping involves making complimentary groups for more than 2 customers. As an example, consider three customers Y(R1, R3), U1[up(R2), base(R3)] and U2[up(R1), base(R2)]. The notation Y(R1, R3) implies a customer Y who has received a FRO and is flexible to have either R1 or R2 as the Chosen Room. The notation U1[up (R2), base(R3)] implies a customer U1 who received a URO and wishes to get an upgrade from R3 (i.e., the Base-Room) to R2 (i.e., the Up Room), and U2[up(R1), base(R2)] implies a customer U2 who received a URO and wishes to get an upgrade from R2 (i.e., the Base-Room) to R1 (i.e., the Up Room). A notation Y-U1-U2 represents this example. Thus, there are three rooms R1, R2, and R3 and they are occupied by Y, U2, and U1 respectively. The three customers have different value needs. The customer Y is flexible on either R1 or R3 if he/she receives a desired reward for trading-in his/her flexibility. The customer U1 has a Base-Room R3 and wishes to get R2 as the Up Room. If a hotel is able to upgrade U1 to R2 from R3, it may generate incremental value for both the customer and the hotel. But in the existing framework (i.e., without using conjunction of more than one VOFs), the hotel may not be able to achieve this without an available capacity on room R2. Similarly, U2 has a Base-Room R2 and wishes to get R1 as the Up Room. A hotel may customize the desired values for the three customers by leveraging on Y's flexibility and upgrading U1 and U2. The hotel may assign R3 as Chosen Room to Y, upgrade U2 from R2 to R1, and upgrade U1 from R3 to R2. The hotel may be able to generate customer surpluses in the process of U1 and U2 upgrades, which would not have been possible normally. Thus, a hotel may be able to generate incremental value for all the parties involved and satisfy the desired needs to a level of customization. Such a combination of complimentary options or VOFs may improve efficiency and concurrently enhance value for all the parties involved (in the context of the current example, enhance value for Y, U1, U2 and the hotel).

It is assumed that a "unit" represents one unit of room (or room capacity) and each customer needs only one room. Continuing with the above example, if the hotel were to not consider the complimentary nature of options obtained by Y, U1 and U2 customers, the hotel may need to hold (or block) more than 3 units of capacity to ensure complete satisfaction of needs of Y, U1 and U2. This implies, to satisfy a total need of 3 rooms, the hotel may need to hold (or block) more than 3 rooms, creating a redundant capacity of at least one room that the hotel may not be able to use otherwise. By creating a complimentary group of Y-U1-U2, the hotel does not need to hold any capacity, thus, freeing up the redundant capacity. Thus, a UY_Group mechanism may create an efficient structure with minimal holding (and/or blocking) of capacity to satisfy the needs of all the concerned customers.

The grouping may also be implemented at higher levels such as Level 3 grouping, Level 4 grouping, Level 5 grouping and so on. An example of the Level 3 grouping may be Y-U1-U2-U3.

A hotel and/or another entity may choose to implement grouping at various levels. A hotel may also change terms and conditions of one or more option contracts of one or more URO and/or FRO customers to create more UY_Groups. The hotel may also offer incentives to customers to choose complimentary URO/FRO offerings to enable the hotel to create more UY_Groups. The implementation methods mentioned above for grouping are for illustration purposes only and a hotel may choose to implement grouping in one or more other ways or by combining above said methods or by combining one or more other ways along with one or more above said methods.

Figure 99:
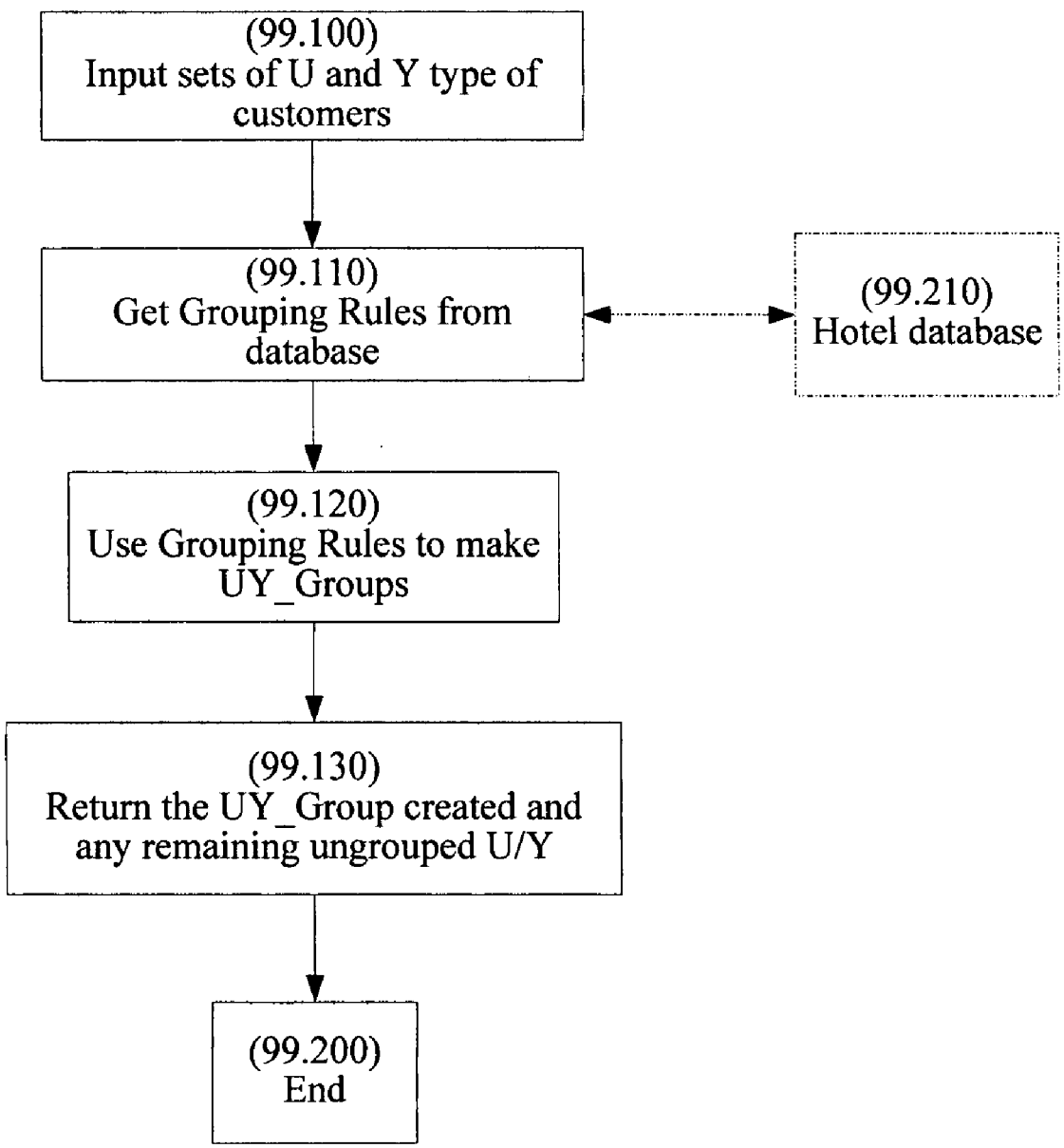
FIG. 99 is a flowchart illustrating an example of an algorithm to implement grouping of U and Y type of customers in the hotel industry.

FIG. 99 displays a flow chart that illustrates one way of implementing grouping of U and Y type of customers. In Act 99.100, sets of U and Y customers are taken as input. Next, in Act 99.110, a set of one or more Grouping Rules is read from the hotel's database (99.210). A grouping rule may depend upon the number of U and/or Y type of customers, desired capacity redundancy in the system, the permissible time factor to create UY_Groups, any other rule of hotel choosing, any Combination thereof and so on. For example, a hotel may choose a Grouping Rule whereby new groups are created by first ungrouping one or more of the UY_Groups (created earlier but unexercised, for example, groups for which the customer has not been notified, or if notified, the customer has not utilized the Room and the terms of option contract allows for a change in the Chosen Room). In another example, a Grouping Rule may create groups of only those U and Y type of customers who have yet to be grouped and discarding all U/Y customers which have already been grouped. A hotel may implement any Grouping Rule to formulate UY groups. The choice to Grouping rules may enhance the overall value for the hotel (for example, reduce the total capacity required to satisfy room needs for all U and Y customers). Theoretically, the number of units of the Room required (or blocked) should be equal to the number of customers shall be eventually utilizing. Thus, by implementing the grouping and with the help of appropriate Grouping Rules, the hotel may attempt to achieve such theoretical minima.

Next, in Act 99.120, the Grouping Rules, so obtained from the hotel's database, are used to make UY_Groups. Next, in Act 99.130, the UY_Groups so created are returned along with ungrouped U/Y, if any, and the process then ends in Box 99.200.

The grouping may enhance customers' experience, and may comprise operating a system that delivers a URO to at least a "first customer" to utilize up to n of m selected rooms for said first customer, where n is less than or equal to m; operating a system that delivers a FRO to at least a "second customer" to utilize up to k of p selected rooms, where k is less than or equal to p; operating a system to define each of the k Chosen Rooms, whereby after each of the k Chosen Rooms is defined, said second customer can utilize said Chosen Room; operating a system wherein a hotel defines t Chosen Room(s) for said first customer after each of said k Chosen Rooms is defined, wherein after each of said t rooms is defined, said first customer can utilize said defined room, where t is less than or equal to n. Said t rooms may be a subset of n rooms, m rooms or both. Said t rooms or n rooms or both may also include one or more rooms not included in said m selected rooms. Similarly, k rooms may be a subset of p rooms, or may include one or more rooms other than said p rooms. The grouping may be performed for a multiplicity of at least one of said first or second customers and may combine together at least one of each of said first and second customers to formulate at least one group with at least one complementary set of options. The grouping may enable a hotel, an entity other than said hotel or any combination thereof, to utilize at least one of said m or p rooms at least after delivery of any of said first or second options. The hotel and/or an entity other than said hotel may implement URO VOF where in the first and/or second customer in said grouping may be same. The notification conditions may be different, same or any combination thereof for the first and second option.

Said first and/or second option may or may not include any notification deadline condition. The hotel, the second customer, an entity other than said hotel and/or any combination thereof may define, at one or more times, at least one of said k Chosen Rooms. The hotel, the first customer, an entity other than said hotel and/or any combination thereof may define, at one or more times, at least one of said p Chosen Rooms. The first customer may select, at one or more times, at least one of said m rooms. The second customer may select, at one or more times, at least one of said p rooms. The hotel and/or an entity other than the hotel may receive from at least one of said first or second customer, at one or more times, an indication of one or more terms and conditions associated with said first or second options, respectively. Similarly, at least one of said hotel and/or an entity other than said hotel may deliver to at least one of said first or second customers, at one or more times, one or more terms and conditions associated with said first or second option, respectively. There may or may not be any payment transaction between the hotel, an entity other than the hotel, and at least one of said first and/or second customer.

Business Model to Implement URO

As discussed above, different business models may be used to implement a URO VOF. The business models mentioned below may be used to implement URO VOF in the hotel industry. A hotel may choose to implement a URO VOF individually or in conjunction with one or more partners and/or other hotels and/or companies.

In an implementation of URO VOF, a hotel may allocate a room inventory of one or more rooms within one or more hotels to another entity. The customer may select (or purchase) one or more rooms from the hotel or/and said entity and then interact with said entity to receive URO in relation to said (already purchased) rooms. Said entity may also receive room allocation from more than one hotel, and thus, offer UROs on rooms from multiple hotels to a single customer during the Initial Transaction for URO. As explained in the sections above, for example, an entity may use the allocated rooms to offer URO to customers and/or to sell the rooms as regular rooms. The allocation of room may be conditional. For example, one of the conditions may require a return of at least one allocated room within a specified time period and/or other consideration(s).

The OA may use those rooms and operate a service to offer UROs to the customers. As explained above in FIG. 13A, a customer may select (or receive) one or more rooms from the OA, and then receive a URO on one or more of those selected rooms from the OA. Another approach would be for a customer to receive one or more rooms from the hotel and then receive the URO option from the OA on one or more of those selected rooms. In another example, a customer may receive one or more rooms from both the hotel and the OA, and then receive the URO option on one or more of those selected rooms from the OA. It is also possible that the customer receives a URO from the hotel or both from the hotel and the OA on a given set of selected rooms.

The OA and the hotel may simultaneously offer UROs to the customers, i.e., a customer may either approach the hotel or the OA to receive a URO on desired rooms. In another model, the OA may operate as the sole provider of the URO to all the customers of a hotel. In a yet another model, the OA and the hotel may choose to work together and jointly offer UROs to the hotel customers. The OA or the hotel may offer URO to customers using either or both of the Sequential or the Concurrent Get URO processes.

As explained in FIG. 13A above, an OA may be able to offer URO on rooms from one or multiple hotels. An OA may receive allocation of one or more rooms from two or more hotels. A customer may purchase one or more rooms from one or more hotels and/or from the OA, and then receive a URO option on one or more of those selected rooms from the OA. Even if the OA may not be entitled to or does not receive room allocation from a hotel, it may still be able to formulate an agreement with one or more hotels to offer UROs on the rooms of said hotels. Thus, a customer may be able to receive a URO on rooms from multiple hotels, giving the customer higher chances to get upgrade and a more variety to choose from. For example, a customer may receive a URO on two rooms from two different hotels and may get upgrades to either of those rooms and the OA and/or any one or all the hotels will then notify the customer about the Chosen Room within the terms and conditions of the option contract. This may provide a lot of value for the customers.

An OA may be able to thus create a multi-hotel URO VOF Framework, which may tremendously enhance the value for the customers. All the participating hotels that allocate rooms to and/or partner with the OA to offer URO may also gain from an overall increase in the total spending by the consumers, enhanced overall customer satisfaction and/or other operational benefits. Either or both of the OA and the hotel may process the purchase of the selected rooms associated with a URO purchased by the customer. A customer may receive reservation from the OA or the hotel for the rooms related to the URO grant. Any entity (e.g., the OA and the hotel) may process purchase of the rooms offered only by that entity or by either of the two entities.

The OA and the hotel may engage in a business agreement to implement the URO program. The business agreement may divide the total benefit generated by the URO program between the two parties using any mechanism or criteria as desired. The total URO Revenue Benefit may be shared between the two parties. The hotel may allocate rooms to the OA. One or more hotels may allocate only part or their entire room inventory to the OA to offer those rooms to the customers by way of regular sales and/or URO. The hotel may allocate one or more Rooms to at one or more entities other than said hotel, and said one or more entities may deliver the option on one or more of the allocated Rooms. In return, the OA may offer a revenue or fee to the hotel for all or a portion of the rooms allocated. This fee may be given only for the rooms that the OA is able to utilize or for all the allocated rooms. The lending fee may be a lump sum amount, may depend upon the number of rooms allocated or may depend on one or more factors as desired. The agreement may include a provision where the OA may return the allocated rooms back to the hotel at a certain time and date or the agreement may provide the OA to sell back one or more allocated rooms to one or more hotels who may have allocated said rooms or to one or more entities other than said hotel or both. There may be one or more conditions associated with the return of unused rooms and/or rooms released from upgrades of customers from their Base-Rooms, including, but not limited to, returning the same room, returning a higher value room and so on. The hotel may allot OA at least one room and said OA may deliver URO on at least one of said allocated rooms. The OA may or may not enter into an agreement with the hotel to provide such option on its rooms. The OA may sell back at least one allocated room to said hotel or to at least one entity other than the hotel or both. An OA may offer a hotel flexible customer inventory (generated from URO) at one or more terms and conditions. The hotel may be able to use this flexibility to generate benefit from one or more ways, such as the Buy_N process, reducing operational costs and so forth. Some of these examples have been explained earlier. An OA may formulate an agreement with one or more hotels on one or more VOFs, such as on both ARO and URO VOFs, to offer a combination of VOFs to customers.

The URO VOF may include different conditions imposed on the customer regarding the payment of prices related to the URO. For example, a customer may be asked to make (or receive) payments only to the hotel even if he/she is receiving rooms and/or options from the OA. Similarly, the customer may be required only to pay to (or receive from) the OA even if he or she may have received the rooms and/or options from the hotels. The condition may also be set to ask a customer to make one or more payments to the hotel for the rooms and/or options received from that hotel, and to make one or more payments to the OA for the rooms and/or options received from that OA. The condition may allow the customer to make partial payments to the hotel and the rest to the OA or vice versa, the basis of which distribution may depend upon various factors, including, but are not limited to, the factors of hotel's choosing, the arrangement between the OA and the hotel and so on. In another example, the customer may be required to pay to a third party or may be required to pay to any of the combination of the entities mentioned above.

Information Technology System for URO

A client-server architecture may be used to implement the URO VOF. However, a hotel may use a computer hardware and software infrastructure of its choosing to implement a URO VOF.

The URO VOF may be best implemented using one or more computer-implemented methods to operate a computer-implemented service (and/or system) to offer UROs to the customers that includes, but not limited to, recording the information pertaining to the offered and/or sold UROs in a database. It may also include operating a computer-implemented service (and/or system) or other service (and/or system) to execute the URO Exercise process and award upgrades to one or more customers, to define the Chosen Rooms, and recording the information pertaining to said upgrade awards, Chosen Rooms and/or other related information and for all the rooms related to a URO in a database.

For the stage one (i.e., to formulate the URO VOF), an application server may be used along with a database (e.g., a relational database) that stores all the information relevant to the hotel and the customer. The database may include all the relevant information sufficient to identify rooms the hotel chooses to make eligible for URO. One or more users (e.g., a business analyst or manager) may have full access to this server through Intranet or highly secured VPN environment to design an optimal value option framework. The database shall also store all the information pertaining to all the acts (in stage one) used by a hotel while formulating the URO VOF.

A similar or a different application server and/or a cluster of application servers (functioning concurrently) along with one or more web servers and a set of one or more database servers may be used for the Get URO as explained in FIG. 13D above and URO Exercise processes (including, but not limited to, Customer Notification processes) in the stage two of the URO VOF. The application server communicates with a web server and the database (e.g., a relational database either the same database used for stage one or a different one). This database (for stage two) stores all the relevant information pertaining to all the acts executed during and in relation to the processes and algorithms run for stage two. All the algorithms mentioned earlier for both the Get URO process and the Event Optimizer processes (including, but not limited to, URO Exercise process) may be computer-implemented as explained and discussed above in FIGS. 13D and 13E. All the customer interactions and the related information such as customer needs, inputs, payment transactions etc. are stored in this database, including information pertaining to the interactions even with those customers who may not purchase and/or receive URO. The systems for stage two and stage one should be maintained in a synchronized environment so that each system has access to the most current information and can communicate with each other.

As discussed above, there may be other ways for implementing the URO VOF which may depend upon including, but not limited to, the scale of the implementation, business requirements and number of entities involved. The entities may interact through a series of hardware products and services with the OA/hotel server(s). The OA may or may not be different than the hotel and the OA server may be the same as that of the hotel server. The customer may also interact with another entity operating the system other than the hotel. The information technology and network system to implement URO VOF may include tools, without limitation, such as one or more CPUs, Hard Disk Drives, RAM, one or more series of Routers, Internet, Firewall, highly secured VPN, Intranet, load balancers, servers, primary databases, secondary databases and so forth.

As discussed and explained above, there may be one or more secondary databases that may only be in the "Read Only" form and may be updated through one or more replication servers. Alternatively, a hotel may have one or more separate temporary database structure wherein the entries are updated and stored until the final update is made in one or more main databases. One the final update is done, the entries in these temporary databases may be removed.

The entire system may run at the premises of OA, hotel and/or any third entity or any combination thereof. It may also be possible to run a part of the system at one place and rest at one or more other places. The system may also be implemented even if one or more servers may be kept off-shore locations and may be accessed remotely. The geographical locations of one or more hardware product and/or services may be different depending upon including, but not limited to, the factors of hotel's choice, ease of accessibility, infrastructure facilities. The structure or the interaction architecture of the system may vary depending on factors including, but not limited to, the set up of the hotel, changes in the technology and with the introduction of new and better technology enhancing the interaction process.

A customer may interact with either one or more of the Get URO, Buy_N, the CN processes and/or the URO Exercise process either directly or indirectly using a local or a remote terminal (e.g., a computer with a browser and an access to the Internet) that is able to access the web server(s) that host the Get URO and URO Exercise and CN processes. A customer may also interact with an operator (or a computer operator) using any communication mechanism (e.g., in-person, phone, using email, Internet chat, text messaging system) who then communicates with the web server through the Intranet and/or Internet.

The system for the stage one and/or stage two may be hosted and run by a hotel, an OA, a third party service provider or any combination of the above. In the model, where the OA receives room allocation from the hotel and offers URO to the customers directly, the web server, application server and database for both stage one and stage two shall be managed by the OA. The OA may also have partial (or complete) access to the hotel database and systems through a highly secured environment (for example, a virtual private network). In the model, when an OA and a hotel tie-up together to provide URO, all the computer hardware and software infrastructure for both stage one and stage two may be hosted by either or both (mutually) of the sides depending upon the business agreement between them.

Application of UPO VOF in Other Industries

The UPO VOF may be applied to almost any industry where customers have different preferences and ranking to the different product offerings and are willing to pay for higher product utility. One may point to examples in many other industries, such as cruise, entertainment, media, special events, real estate and so forth, where UPO VOF may be applied to generate benefit for both companies and their customers.

Brief Description of UPO VOF in the Car Rental Industry

In the successful Initial Transaction for a UPO VOF between the car rental company and the customer, the customer receives a conditional option for an upgrade and the car rental company awards the upgrade to the customer provided at least one condition on the option is satisfied. A UPO VOF in the car rental industry may be appropriately termed Upgrade Car option (UCO) VOF. A customer may select (purchase) one or more Base-Car and then select UCO option on one or more Up Cars. A car rental company may award one or more Up Cars from the selected UCO Cars or from other Cars or any combination thereof.

In another implementation of UPO VOF, during a successful Initial Transaction, a customer receives an option to utilize up to 'n' out of 'm' selected Cars (said 'm' Cars termed "UCO Cars"). The 'n' Cars that are finally selected are termed "Chosen Cars". After each of the Up Cars is defined (or selected or chosen or received), the customer has the right to utilize (or can utilize) said Chosen Car. Apart from the Chosen Cars, the remaining Cars are termed "Released Cars". The Released Cars (if any, that were held or blocked for said customer) may be sold to other customers as normal Cars or UCO Cars or used for other purposes. The Released Cars in relation to said option may be reused by the car rental company before, after, at or any combination thereof, the time the Released Cars and/or Chosen Cars are defined (or received or selected). The m UCO Cars would contain all the selected Base-Cars and Up Cars, and the n Chosen Cars would contain all the defined Base-Cars and Up Cars that the customer may utilize. Ideally, the customer may prefer to receive only Up Cars in the defined n Chosen Cars, since the customer would have higher utility for the Up Cars, however, the Chosen Cars may contain Up Cars or Base-Cars or both.

Numerically, the value of 'm' is greater than or equal to 2 and the value of 'n' may vary from '0' to 'm' depending upon the specific implementation of the UCO framework. The value of 'm' and/or 'n' may be known (or defined and/or re-defined) before, during, after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'm' and/or 'n' may be defined by the car rental company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The UCO Cars may be selected by the car rental company, the customer, another entity or any combination thereof. The UCO VOF may enable a car rental company to obtain preferences for Up Cars from UCO customers (i.e., those who select UCO) and use said preferences to satisfy the travel needs of other customers and/or to optimize the value for car rental company, customers, another entity and/or any combination thereof. Therefore, the car rental company would usually have the right to select (or define) the Chosen Cars. However, in different implementations of UCO VOF, the car rental company, the customer, another entity or any combination thereof may select one or more of the Chosen Cars related to a UCO. The UCO Cars and the Chosen Cars may be selected by the same entity, different entities or any combination thereof. For example, the customer may select the UCO Cars and the car rental company may select the Chosen Cars out of the UCO Cars. The car rental company may incorporate the customer information and the data related to the UCO into the sales, production, inventory, other database or information system or any combination of the above.

Various algorithms, processes discussed earlier including, but not limited to, Buy_N, Upgrade_U, Customer Notification, UCO Exercise Process, algorithms for UCO Creator Type, Award List and so forth in the UCO VOF may be implemented in the car rental industry.

As an example in the car rental industry, highly rated Cars (or Premium Cars) often don't get booked as frequently as other Cars (for e.g., Economy or Compact Cars), because of inadequate demand at existing high prices. Thus, the UCO VOF may be implemented and UCO value options may be made available to customers reserving the Cars. For example, a customer who may have booked (or may be in the process of reserving) a lower-rated Car (or Economy Car), may purchase UCO option, to get the right to be upgraded to a higher-rated Car (or Premium Car) at a given exercise price if one becomes available at a certain time and under certain conditions established as terms of the option contract. The rating among the Cars may depend upon the factors including, but not limited to, features (or services) attached to them, brand names, amenities or personal preferences of the customers or a combination of one or more of the above said factors.

Brief Description of UPO VOF in the Travel Industry

In the successful Initial Transaction for a UPO VOF between the travel company and the customer, the customer receives a conditional option for an upgrade and the travel company awards the upgrade to the customer provided at least one condition on the option is satisfied. A UPO VOF in the travel industry may be appropriately termed Upgrade Travel Package Option (UTPO) VOF. A customer may select (purchase) one or more Base-Travel Package and then select UTPO option on one or more Up Travel Packages. A travel company may award one or more Up Travel Packages from the selected UTPO Travel Packages or from other Travel Packages or any combination thereof.

In another implementation of UTPO VOF, during a successful Initial Transaction, a customer receives an option to utilize up to 'n' out of 'm' selected Travel Packages (said 'm' Travel Packages termed "UTPO Travel Packages"). The 'n' Travel Packages that are finally selected are termed "Chosen Travel Packages". After each of the Up Travel Packages is defined (or selected or chosen or received), the customer has the right to utilize (or can utilize) said Chosen Travel Packages. Apart from the Chosen Travel Packages, the remaining Travel Packages are termed "Travel Packages". The Released Travel Packages (if any, that were held or blocked for said customer) may be sold to other customers as normal Travel Package or UTPO Travel Packages or used for other purposes. The Released Travel Packages in relation to said option may be reused by the travel company before, after, at or any combination thereof, the time the Released Travel Packages and/or Chosen Travel Packages are defined (or received or selected). The m UTPO Travel Packages would contain all the selected Base-Travel Packages and Up Travel Packages, and the n Chosen Travel Packages would contain all the defined Base-Travel Packages and Up Travel Packages that the customer may utilize. Ideally, the customer may prefer to receive only Up Travel Packages in the defined n Chosen Travel Packages, since the customer would have higher utility for the Up Travel Packages, however, the Chosen Travel Packages may contain Up Travel Packages or Base-Travel Packages or both.

Numerically, the value of 'm' is greater than or equal to 2 and the value of 'n' may vary from '0' to 'm' depending upon the specific implementation of the UTPO framework. The value of 'm' and/or 'n' may be known (or defined and/or re-defined) before, during, after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'm' and/or 'n' may be defined by the travel company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The UTPO Travel Packages may be selected by the travel company, the customer, another entity or any combination thereof. The UTPO VOF may enable a travel company to obtain preferences for Up Travel Packages from UTPO customers (i.e., those who select UTPO) and use said preferences to satisfy the travel needs of other customers and/or to optimize the value for travel company, customers, another entity and/or any combination thereof. Therefore, the travel company would usually have the right to select (or define) the Chosen Travel Packages. However, in different implementations of UTPO VOF, the travel company, the customer, another entity or any combination thereof may select one or more of the Chosen Travel Packages related to a UTPO. The UTPO Travel Packages and the Chosen Travel Packages may be selected by the same entity, different entities or any combination thereof. For example, the customer may select the UTPO Travel Packages and the travel company may select the Chosen Travel Packages out of the UTPO Travel Packages. The travel company may incorporate the customer information and the data related to the UTPO into the sales, production, inventory, other database or information system or any combination of the above.

Various algorithms, processes discussed earlier including, but not limited to, Buy_N, Upgrade_U, Customer Notification, UTPO Exercise Process, algorithms for UTPO Creator Type, Award List and so forth in the UTPO VOF may be implemented in the travel industry.

As an example in the travel industry, highly rated Travel Packages often don't get booked as frequently as other Travel Packages, because of inadequate demand at existing high prices. There, the UTPO VOF may be implemented and UTPO value options may be made available to customers booking the Travel Packages. For example, a customer who may have purchased (or may be in the process of purchasing) a lower-rated Travel Package, may purchase UTPO option, to get the right to be upgraded to a higher-rated Travel Package at a given exercise price if one becomes available at a certain time and under certain conditions established as terms of the option contract. The ranking among the Travel Packages may depend upon the factors including, but not limited to, type of destinations, duration of the Travel Package, features (or services) attached to them, various amenities or personal preferences of the customers or a combination of one or more of the above said factors.

Brief Description of UPO VOF in the Cruise Industry

In the successful Initial Transaction for a UPO VOF between the cruise company and the customer, the customer may receive a conditional option for an upgrade and the cruise company may award the upgrade provided at least one condition on the option is satisfied and the cruise company receives the payment for said upgrade. The customer's acceptance of said option may confer upon the cruise company a right to enforce a payment obligation or relinquishment of one or more rights or both, as the case may be, on the customer, if said customer receives upgrade. A customer may select (purchase) one or more Base-Cruise Package and then select UPO option on one or more Up Cruise Packages. A cruise company may award one or more Up Cruise Packages from the selected UPO Cruise Packages or from other Cruise Packages or any combination thereof. The cruise company may or may not be the seller of said Cruise Package and/or said option.

In another implementation of UPO VOF, during a successful Initial Transaction, a customer receives an option to utilize up to 'n' out of 'm' selected Cruise Packages, where 'n' is less than equal to 'm' (said 'm' Cruise Packages termed "UPO Cruise Packages"). The 'n' Cruise Packages that are finally selected are termed "Chosen Cruise Packages". After each of the Up Cruise Packages is defined (or selected or chosen or received), the customer has the right to utilize (or can utilize) said Chosen Cruise Package. Apart from the Chosen Cruise Packages, the remaining Cruise Packages are termed "Released Cruise Packages". The Released Cruise Packages (if any, that were held or blocked for said customer) may be sold to other customers as normal Cruise Packages or UPO Cruise Packages or used for other purposes. The Released Cruise Packages in relation to said option may be reused by the cruise company before, after, at or any combination thereof, the time the Released Cruise Packages and/or Chosen Cruise Packages are defined (or received or selected). The m UPO Cruise Packages would contain all the selected Base-Cruise Packages and Up Cruise Packages, and the n Chosen Cruise Packages would contain all the defined Base-Cruise Packages and Up Cruise Packages that the customer may utilize. Ideally, the customer may prefer to receive only Up Cruise Packages in the defined n Chosen Cruise Packages, since the customer would have higher utility for the Up Cruise Packages, however, the Chosen Cruise Packages may contain Up Cruise Packages or Base-Cruise Packages or both.

Numerically, the value of 'm' is greater than or equal to 2 and the value of 'n' may vary from '0' to 'm' depending upon the specific implementation of the UPO framework. The value of 'm' and/or 'n' may be known (or defined and/or re-defined) before, during, after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'm' and/or 'n' may be defined by the cruise company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The UPO Cruise Packages may be selected by the cruise company, the customer, another entity or any combination thereof. The UPO VOF may enable an cruise company to obtain preferences for Up Cruise Packages from UPO customers (i.e., those who select UPO) and use said preferences to satisfy the travel and entertainment needs of other customers and/or to optimize the value for cruise company, customers, another entity and/or any combination thereof. Therefore, the cruise company would usually have the right to select (or define) the Chosen Cruise Packages. However, in different implementations of UPO VOF, the cruise company, the customer, another entity or any combination thereof may select one or more of the Chosen Cruise Packages related to a UPO. The UPO Cruise Packages and the Chosen Cruise Packages may be selected by the same entity, different entities or any combination thereof. For example, the customer may select the UPO Cruise Packages and the cruise company may select the Chosen Cruise Packages out of the UPO Cruise Packages. The cruise company may incorporate the customer information and the data related to the UPO into the sales, production, inventory, other database or information system or any combination of the above.

Various algorithms, processes discussed earlier including, but not limited to, Buy_N, Upgrade_U, Customer Notification, UPO Exercise Process, algorithms for UPO Creator Type, Award List and so forth in the UPO VOF may be implemented in the cruise industry.

As an example in the cruise industry, premium or luxury cruises (i.e., usually the higher-rated and more expensive cruises) often don't get booked as frequently as other cruises, because of inadequate demand at existing high prices. There, the UPO VOF may be implemented and UPO value options may be made available to customers booking the cruise. For example, a customer who may have purchased (or may be in the process of purchasing) a lower-rated cruise package (for e.g., Contemporary Cruise Package), may purchase UPO option, to get the right to be upgraded to a higher-rated cruise (for e.g., Luxury or Premium Cruise Package) at a given exercise price if one becomes available at a certain time and under certain conditions established as terms of the option contract. The two cruises considered here may belong to same or different cruise companies. The rating among the cruises may be because of the features (or services) attached to the cruise or personal preferences of the customers or a combination of both. Such features may include, but are not limited to, length of cruise, on board entertainment facilities, quality of furnishings, type of ship, destination and so forth. Even in a cruise package (i.e., even on one ship itself), generally the rooms with balcony (B) are costlier than the rooms without balcony but with window (W) and rooms without any balcony or window (N). So, the following preference order for the rooms in a cruise may be presumed: B>W>N. Thus, for UPO type NB, a customer with N room may receive a UPO to be upgraded to B room if one becomes available as per the terms and conditions of the option contract.

Brief Description of UPO VOF in the Entertainment Industry

In the successful Initial Transaction for a UPO VOF between the entertainment company and the customer, the customer may receive a conditional option for an upgrade and the entertainment company may award the upgrade to the customer provided at least one condition on the option is satisfied and the entertainment company receives the payment for said upgrade. The customer's acceptance of said option may confer upon the entertainment company a right to enforce a payment obligation or relinquishment of one or more rights or both, as the case may be, on the customer, if said customer receives upgrade. A customer may select (purchase) one or more Base-Entertainment Package and then select UPO option on one or more Up Entertainment Packages. An entertainment company may award one or more Up Entertainment Packages from the selected UPO Entertainment Packages or from other Entertainment Packages or any combination thereof. The entertainment company may or may not be the seller of said Entertainment Package and/or said option.

In another implementation of UPO VOF, during a successful Initial Transaction, a customer receives an option to utilize up to 'n' out of 'm' selected Entertainment Packages, where 'n' is less than equal to 'm' (said 'm' Entertainment Packages termed "UPO Entertainment Packages"). The 'n' Entertainment Packages that are finally selected are termed "Chosen Entertainment Packages". After each of the Up Entertainment Packages is defined (or selected or chosen or received), the customer has the right to utilize (or can utilize) said Chosen Entertainment Package. Apart from the Chosen Entertainment Packages, the remaining Entertainment Packages are termed "Released Entertainment Packages". The Released Entertainment Packages (if any, that were held or blocked for said customer) may be sold to other customers as normal Entertainment Packages or UPO Entertainment Packages or used for other purposes. The Released Entertainment Packages in relation to said option may be reused by the entertainment company before, after, at or any combination thereof, the time the Released Entertainment Packages and/or Chosen Entertainment Packages are defined (or received or selected). The m UPO Entertainment Packages would contain all the selected Base-Entertainment Packages and Up Entertainment Packages, and the n Chosen Entertainment Packages would contain all the defined Base-Entertainment Packages and Up Entertainment Packages that the customer may utilize. Ideally, the customer may prefer to receive only Up Entertainment Packages in the defined n Chosen Entertainment Packages, since the customer would have higher utility for the Up Entertainment Packages, however, the Chosen Entertainment Packages may contain Up Entertainment Packages or Base-Entertainment Packages or both.

Numerically, the value of 'm' is greater than or equal to 2 and the value of 'n' may vary from '0' to 'm' depending upon the specific implementation of the UPO framework. The value of 'm' and/or 'n' may be known (or defined and/or re-defined) before, during, after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'm' and/or 'n' may be defined by the entertainment company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The UPO Entertainment Packages may be selected by the entertainment company, the customer, another entity or any combination thereof. The UPO VOF may enable an entertainment company to obtain preferences for Up Entertainment Packages from UPO customers (i.e., those who select UPO) and use said preferences to satisfy the entertainment needs of other customers and/or to optimize the value for entertainment company, customers, another entity and/or any combination thereof. Therefore, the entertainment company would usually have the right to select (or define) the Chosen Entertainment Packages. However, in different implementations of UPO VOF, the entertainment company, the customer, another entity or any combination thereof may select one or more of the Chosen Entertainment Packages related to a UPO. The UPO Entertainment Packages and the Chosen Entertainment Packages may be selected by the same entity, different entities or any combination thereof. For example, the customer may select the UPO Entertainment Packages and the entertainment company may select the Chosen Entertainment Packages out of the UPO Entertainment Packages. The entertainment company may incorporate the customer information and the data related to the UPO into the sales, production, inventory, other database or information system or any combination of the above.

The entertainment industry comprises of several industries including, without limitation, performing arts entertainment (including, without limitation, music theatre, vaudeville, comedy, film, music, dance, drama, opera, magic, concerts), exhibition entertainment (including, but not limited to, museum, wax museums, amusement park, trade and other shows, fairs, themed retails, busking), mass media entertainment (including, but not limited to, film, film studios, movie theatres, cinemas, television broadcasting, radio broadcasting, recording companies, discotheques, news media), electronic entertainment (including, but not limited to, computer games, video games, sms, internet), sporting entertainment events (including, but not limited to, tickets for baseball games, boxing matches, hockey matches, football games), advertisement slots in any of the above mentioned industries and/or companies and so forth. The UPO VOF may be implemented in one or all of the industries mentioned above. Companies and/or customers in each of the industries mentioned above, and others not specifically mentioned above, may generate benefit from the UPO VOF.

Various algorithms, processes discussed earlier including, but not limited to, Buy_N, Upgrade_U, Customer Notification, UPO Exercise Process, algorithms for UPO Creator Type, Award List and so forth in the UPO VOF may be implemented in the entertainment industry.

As an example in the entertainment industry, balcony seats in the movie halls (i.e., usually the higher-rated and more expensive seats) often don't get booked as frequently as other seats, because of inadequate demand at existing high prices. There, the UPO VOF may be implemented and UPO value options may be made available to customers booking the movie seats. For example, a customer who may have purchased (or may be in the process of purchasing) a lower-rated seat in the movie hall, may purchase UPO option, to get the right to be upgraded to a higher-rated balcony seat at a given exercise price if one becomes available at a certain time and under certain conditions established as terms of the option contract. The rating among the seats may depend on the factors including, but not limited to, the view, features (or services) attached to them or personal preferences of the customers or a combination of both.

Brief Description of UPO VOF in the Event Management Industry

In the successful Initial Transaction for a UPO VOF between the event management company and the customer, the customer may receive an option for an upgrade and the event management company may award the upgrade to the customer provided at least one condition on the option is satisfied and the event management company receives the payment for said upgrade. The customer's acceptance of said option may confer upon the event management company a right to enforce a payment obligation or relinquishment of one or more rights or both, as the case may be, on the customer, if said customer receives upgrade. A customer may select (purchase) one or more Base-Package and then select UPO option on one or more Up Packages. An event management company may award one or more Up Packages from the selected UPO Packages or from other Packages or any combination thereof. The event management company may or may not be the seller of said Package and/or said option.

In another implementation of UPO VOF, during a successful Initial Transaction, a customer receives an option to utilize up to 'n' out of 'm' selected Packages, where 'n' is less than equal to 'm' (said 'm' Packages termed "UPO Packages"). The 'n' Packages that are finally selected are termed "Chosen Packages". After each of the Up Packages is defined (or selected or chosen or received), the customer has the right to utilize (or can utilize) said Chosen Package. Apart from the Chosen Packages, the remaining Packages are termed "Released Packages". The Released Packages (if any, that were held or blocked for said customer) may be sold to other customers as normal Packages or UPO Packages or used for other purposes. The Released Packages in relation to said option may be reused by the event management company before, after, at or any combination thereof, the time the Released Packages and/or Chosen Packages are defined (or received or selected). The m UPO Packages would contain all the selected Base-Packages and Up Packages, and the n Chosen Packages would contain all the defined Base-Packages and Up Packages that the customer may utilize. Ideally, the customer may prefer to receive only Up Packages in the defined n Chosen Packages, since the customer would have higher utility for the Up Packages, however, the Chosen Packages may contain Up Packages or Base-Packages or both.

Numerically, the value of 'm' is greater than or equal to 2 and the value of 'n' may vary from '0' to 'm' depending upon the specific implementation of the UPO framework. The value of 'm' and/or 'n' may be known (or defined and/or re-defined) before, during, after the Initial Transaction and/or any combination thereof. The value of n may be limited to less than the value of m, or n<m (i.e., n<=m−1); however, in some situations, n may be equal to m. The value of 'n' may or may not be known (or defined and/or re-defined) at the time of the Initial Transaction. The value of 'm' and/or 'n' may be defined by the event management company, the customer, another entity or any combination thereof. For example, the value of n may not be defined at the time of Initial Transaction. In case the value of m is redefined after being defined at least once before, the new value of 'm' may be greater than or less than the older value of 'm'. Similarly, if the value of 'n' is redefined after being defined at least once before, the new value of 'n' may also be greater than or less than the older value of 'n'. In some of the cases, the value of new 'n' may be even greater than the older value of 'm'.

The UPO Packages may be selected by the event management company, the customer, another entity or any combination thereof. The UPO VOF may enable an event management company to obtain preferences for Up Packages from UPO customers (i.e., those who select UPO) and use said preferences to satisfy the entertainment needs of other customers and/or to optimize the value for event management company, customers, another entity and/or any combination thereof. Therefore, the event management company would usually have the right to select (or define) the Chosen Packages. However, in different implementations of UPO VOF, the event management company, the customer, another entity or any combination thereof may select one or more of the Chosen Packages related to a UPO. The UPO Packages and the Chosen Packages may be selected by the same entity, different entities or any combination thereof. For example, the customer may select the UPO Packages and the event management company may select the Chosen Packages out of the UPO Packages. The event management company may incorporate the customer information and the data related to the UPO into the sales, production, inventory, other database or information system or any combination of the above.

Event management comprises of several industries including, without limitation, social and cultural events, festivals, sporting events (for example, including, but not limited to, baseball, hockey, football, cricket, basketball), corporate events (including, but not limited to, product launches, press conferences, corporate meetings, conferences), marketing programs (including, but not limited to, road shows, grand opening events), special events (including, but not limited to, concerts, award ceremonies, film premieres, launch/release parties, fashion shows, private (personal) events such as weddings and bar parties, so forth). The UPO VOF may be implemented in one or all of the industries mentioned above. Companies and/or customers in each of the industries mentioned above, and others not specifically mentioned above, may generate benefit from the UPO VOF.

Various algorithms, processes discussed earlier including, but not limited to, Buy_N, Upgrade_U, Customer Notification, UPO Exercise Process, algorithms for UPO Creator Type, Award List and so forth in the UPO VOF may be implemented in the event management industry.

As an example in the event management industry, balcony seats or pavilion seats in the stadiums (i.e., usually the higher-rated and more expensive seats) often don't get booked as frequently as other seats, because of inadequate demand at existing high prices. There, the UPO VOF may be implemented and UPO value options may be made available to customers booking the seats in the stadium. For example, a customer who may have purchased (or may be in the process of purchasing) a lower-rated seat for one or more events in the stadium, may purchase UPO option, to get the right to be upgraded to a higher-rated balcony seat (or pavilion seat) at a given exercise price if one becomes available at a certain time and under certain conditions established as terms of the option contract. The rating among the seats may depend on the factors including, but not limited to, the view, features (or services) attached to them or personal preferences of the customers or a combination of both.

STS (Smooth Travel Service Option) Value Option Framework

The creation and utilization (in two stages or acts) of another value option framework will now be discussed. This is the Smooth Travel Service Option (STS) VOF. A company may implement a STS VOF in many industries, for example, the travel industry. The airline industry is assumed herein to demonstrate the system and methodology of the STS VOF. Selection of an industry provides a context and makes the understanding smoother and easier. The customer need for travel certainty (defined elsewhere) is used as the targeted value element.

The first stage in the STS VOF involves steps (or acts) of: capturing customer dynamics, assessing airline operations and economic factors, integrating customer dynamics with airline economic factors, formulating the VOF and optimizing the VOF. The second stage involves carrying out a dynamic interaction with the customer and then executing an Event Optimizer process. The specific detailed steps with respect to the STS VOF will now be discussed. The term "disruption" refers to an obstacle, hindrance, difficulty, interruption, barrier or impediment in delivering and/or utilization of a product due to any reason. As an example, in the context of airline industry, disruption may include, without limitation, flight cancellation, flight delay and flight diversion.

Figure 100:
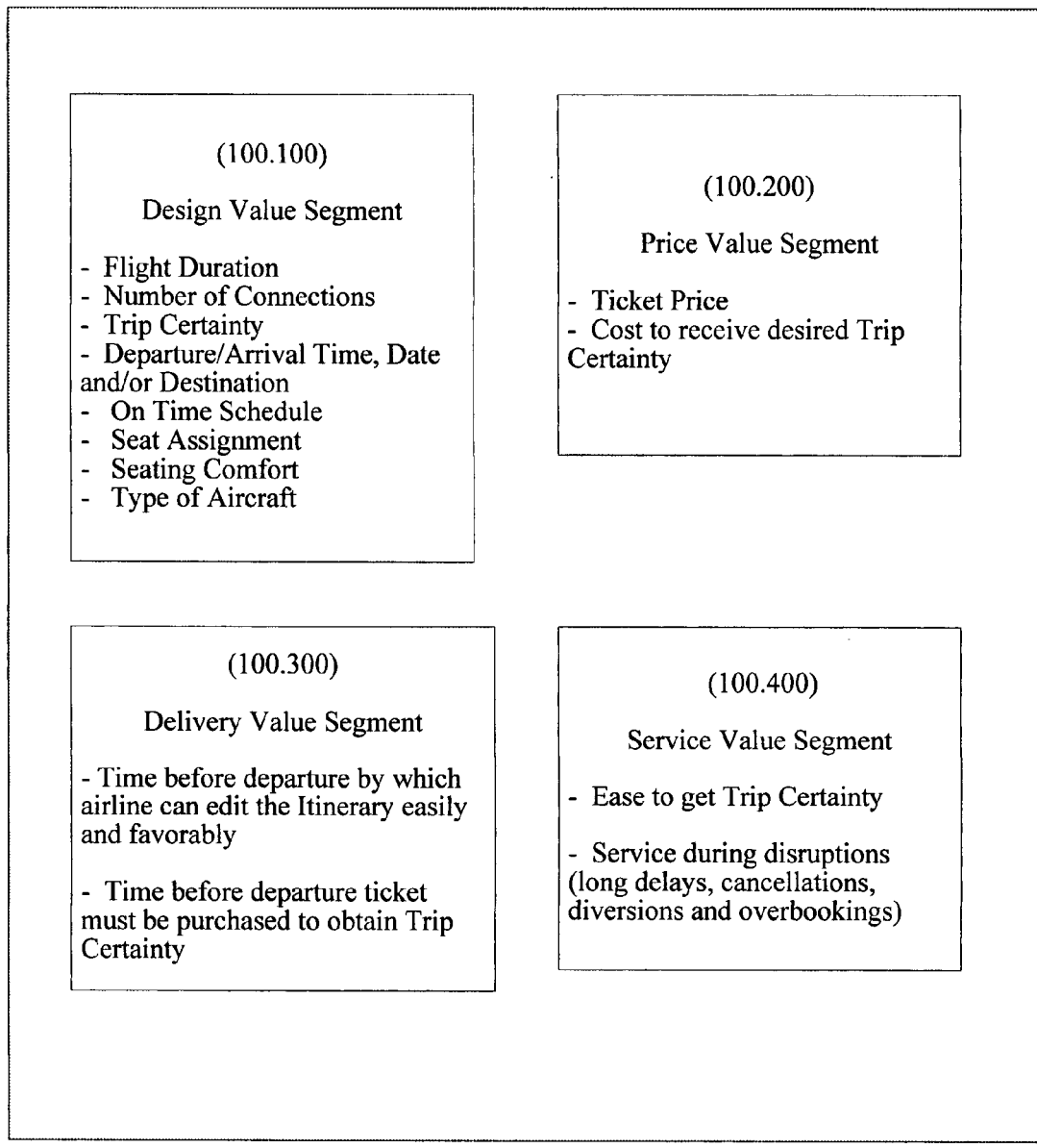
FIG. 100 is a diagrammatic illustration of an exemplary set of value segments and their value elements related to the STS VOF.

First Stage: Formulation of Value Option Framework (1) Capturing Customer Dynamics FIG. 100 shows an analysis of the value elements that are believed to matter to customers in relation to a STS. In the design value segment, shown in Box 100.100, important value elements may include, but are not limited to, total flight duration, number of intermediate connections, certainty and surety of arriving at a specified destinations within a permissible time range, departure and arrival time, date and/or destination, on-time schedule, seat assignment, seating comfort, type of aircraft and route. Each customer places his or her own values on these different design value elements. For example, one customer, a vacationer, may value the particular departure date more and may not be too concerned about the departure time. Another customer, a businessperson, may value arrival time more than departure time, in order to get to a meeting. In the price value segment, shown in Box 100.200, important value elements may include, but are not limited to, Ticket Price and cost to receive the desired trip certainty. In the delivery value segment, shown in Box 100.300, important value elements may include, but are not limited to, how close to scheduled departure the airline may edit the customers' Itinerary easily and favorably, and how long before departure the ticket must be purchased to obtain trip certainty. In the service value segment, the important value elements may include, but are not limited to, the ease to get desired trip certainty and service during disruptions (disruption may include, but is not limited to, flight cancellation, long delays, overbooking, diversions, interruptions in the continuity of flights and so forth), as shown in Box 100.400. It may be important to estimate the relative preferences and utilities of these value elements to different types of customers.

The customer preference for trip certainty is subjective in terms of the length of the "arrival (and/or departure) date and time (and/or place variation)". The term "arrival (and/or departure) date and time (and/or place variation)" refers to the permissible time and/or place variation acceptable to the customer. It may be expressed in terms of potential time delay in departure, arrival and stay, range of depart and/or arrival cities, flight services/amenities needed during travel and so forth. Customers are concerned about certainty of arriving at the desired time and/or city (or state). The trip certainty and arrival (and/or departure) date and time (and/or place variation) are subjective and may differ from customer to customer, or even for the same customer, may differ from one situation to another.

(2) Assessment of Airline Economics:

An assessment of the crucial economic factors of an airline, as indicated in Box 101.100, may reveal the factors to include, but not be limited to, high fixed and variable costs (which may include, but not be limited to, human resources costs, fuel costs, disruption costs, high costs of planes, facilities and maintenance), depleting revenues, increased competition from low cost carriers, high customer attrition rate, re-booking costs and customer the pressure to process customers in an organized manner under time-constrained conditions at the airport, the need to develop sustainable competitive advantages, and commoditization of the airline industry.

An assessment of the crucial economic factors of an airline may be performed, to determine the factors that affect the profitability, growth and goals of the airline. It might be beneficial if an airline utilizing the inventive system and method were able to express cost elements in a real-time or quasi-real-time (i.e., up to date) dynamic fashion so that such information may then be used to assess the profitability or contribution of each product sale opportunity, and to facilitate the operation of the Event Optimizer (so that offers and actions can be based on real-time or near-real-time information).

Figure 101:
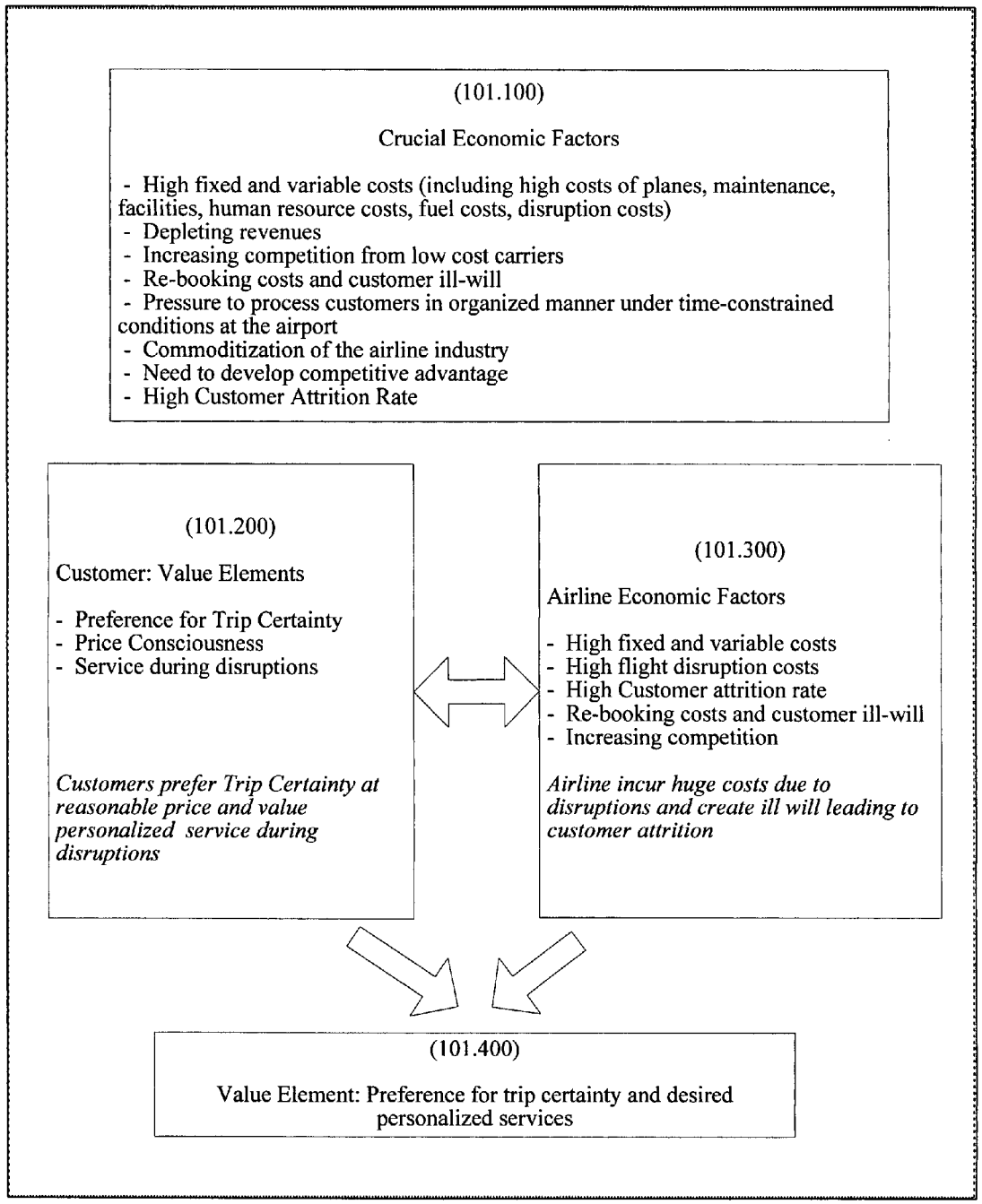
FIG. 101 is diagrammatic illustration of company economic factors and mapping between customer dynamics and company economic factors in relation to STS VOF.

(3) Integration of Customer Dynamics with Airline Economic Factors:

FIG. 101 also illustrates an example of how a mapping may be done, between the customer and airline profiles, for the STS VOF in the airline industry. On one side, there are customers who prefer trip certainty and are concerned about the hassles, delays, frustration that one may go through during the rebooking process. On the other side, an airline incurs huge costs during flight disruptions for rebooking and/or providing personalized services to the customers including, but not limited to, various resources (for e.g., on staff, hotel, food, alternate flights on other airlines, overhead, transportation), loses revenue (to other airlines) and may try to match as much expectations of customers but may still face customer due to one or more factors including, but not limited to, lack of personalized service, un met customer needs, desires and preferences and so forth. It would certainly be very helpful for an airline to know the relative trip needs of the customers, customer preferences for various flights, acceptable time and/or place variation and so forth. For example, an airline may benefit from knowing the acceptable arrival time delay of a customer.

Airlines sometimes face flight disruptions. These disruptions may be due to factors controllable, partially controllable and uncontrollable by the airlines including, but not limited to, weather, technical and/or mechanical problem in the aircraft, crew, security reasons, aircraft arriving late and aviation delays. The airline may incur huge costs in rebooking, giving vouchers and so forth to the customers but may still face huge customer dissatisfaction, loss of goodwill and high customer attrition rate. This may be due to one or more reasons including, but not limited to, lack of personalized service, very little or no knowledge of customer preferences and trip needs and so forth. However, today there is no framework that allows airlines to control above mentioned customer and/or dissatisfaction reasons in an optimal fashion such that both airline and the customer benefit at the same time. An opportunity, thus, exists to concurrently generate an incremental revenue benefit for the airline from flight disruptions, and to maximize the purchase utilities for the customers (includes those who want trip certainty and desire personalized services during disruptions).

The STS VOF is created based on the value element "Preference for trip certainty and desired personalized services". More specifically, as shown in the interaction between the Box 101.200 and Box 101.300, a mapping is performed between important customer value elements and the airline economic factors. The value element "Preference for trip certainty and desired personalized services" is extracted, as shown in Box 101.400 and a STS value option framework is created.

Figure 102:
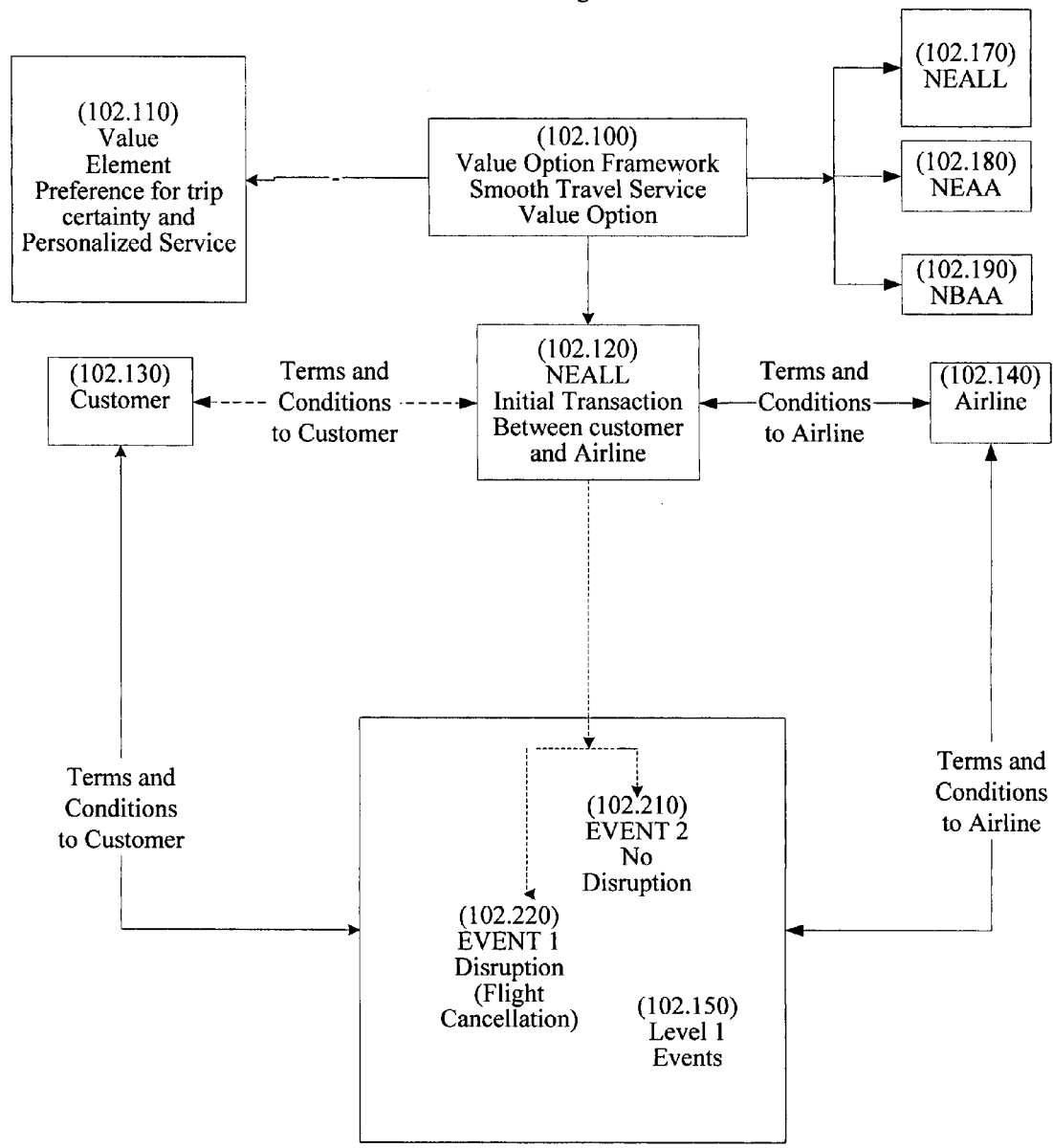
FIG. 102 is a partially-diagrammatic, partially-flow diagram representing the structure for creating a STS Value Option Framework.

(4) Formation of STS Value Options Framework:

The formation of the STS value options framework involves certain steps illustrated in FIG. 102. The STS value options framework is formed around important mapped value elements, allowing capture of detailed individual, customer-level data expressing needs, preferences, flexibilities and relative utilities so as to positively impact the airline operations, while simultaneously enhancing the overall product utility for the customer. Since a correspondence may have been drawn between those value elements and the corresponding economic factors, there may be a significance for both the customer and the airline. The STS value option framework (VOF) may allow the airline to capture a customer's demand, preferences, flexibilities and relative utilities at an individual level in a format that may allow that information to be used to produce a cost savings and/or revenue enhancement for airline operations while concurrently enhancing customer utility. The structure of the STS value option framework is defined below.

As discussed above, the STS VOF may be implemented in any industry. The airline industry is assumed herein since selection of an industry provides a context and makes the understanding smoother and easier. The process to create the STS value option framework is shown in greater detail in FIG. 102. In FIG. 102, there are three STS VOFs, namely NEALL, NEAA and NBAA have been shown as per Boxes 102.170, 102.180 and 102.190, respectively. The STS number of value option frameworks shown is for illustration purposes only and could be fewer or more, depending on factors including, but not limited to, the factors of airline's choosing, user discretion and so forth. Each STS value option framework may be related to a corresponding value element and one or more related event(s). For illustration purpose, in the Box 102.120, STS value option framework NEALL is related to a value element and two related events, Event 1 and Event 2. After the initial interaction between the customer and the airline related to a particular value element, one or more related events (or a series of events) may take place.

In the "Initial Transaction" for STS VOF, shown by Box 102.120, a customer (shown by Box 102.130) and an airline (shown by Box 102.140) transact on the STS value option. There may be one or more Events (shown by Box 102.150) that follow the Initial Transaction. Every STS option may have an initial costs/savings and other benefits and conditions to the customer; and revenue/costs and other benefits and conditions to the airline, another entity and/or any combination thereof.

In a successful Initial Transaction for a STS, the customer selects (or receives) a STS option where by the customer may utilize any of the pre-defined services and/or rebooking option as per the terms and conditions of the option contract, in the event of any disruption. All the pre defined services and/or rebooking options that may be available to a customer as part of the STS option may be termed "STS Services" for that customer. The pre-defined services may include, but is not limited to, personalized or tailor made services as required by customers, services as per airline choosing, services based on other parameters and so forth. The pre-defined services finally utilized and/or flights on which the customer is finally rebooked are termed "Chosen Service". After each of the Chosen Services is defined (or selected or chosen or received), the customer has the right to utilize (or may utilize) said Chosen Service. Apart from the Chosen Services, the remaining STS Services (i.e., total STS Services minus Chosen Services) are termed "Released Services". The Released Services (if any, that were probably held or blocked for said customer) may be provided (and/or sold) to other customers as normal services (or flights and/or products) or STS Services or used for other purposes. The Released Services in relation to said option may be reused by the airline before, after, at or any combination thereof, the time the Released Services and/or Chosen Services are defined (or received or selected). "STS Option" or "STS Options" or "STS Service" or "STS Services" have been used interchangeably as and when the context requires.

In event of any disruption, the customer may utilize (or rendered with) any of the selected STS Services as per the terms and conditions of the option contract. Said services may be provided (or rendered) to the customer upon satisfaction of at least one condition as per the terms and conditions of the option contract which may include, but is not limited to, availability of the selected STS Services, length of disruption, factors of airline choosing or any other factor. The airline, another entity other than said airline or both may create other examples of STS Options which may be offered to the customers. Few other examples of such options have been given in a Table provide later below.

Every successful transaction may be succeeded by one or more related events or a series of events as shown by the Boxes 102.150 (Level 1 events) and Level 2 events. Just like the Initial Transaction, each event may also have costs/savings and benefits and conditions to the customer, and revenue/costs and benefits, terms and conditions to both the airline and the customer, as shown by the Boxes 102.130 and 102.140. If a particular event takes place after a successful transaction, the corresponding costs/savings and benefits and conditions may be applied to both the airline and the customer and/or to any other entity as involved in the transaction.

In FIG. 102, the STS framework, as an example, provides three smooth travel service options to customers when they buy their original tickets, to enable customers to tailor the service provided to them in the event of a flight cancellation. FIG. 102 at box 150 shows the related events to the STS framework. One related event is "no disruption," and the other is "disruption". To provide context and easier understanding, the flight cancellation is assumed to be the disruption for the following sections of the text.

Each of the three STS value options is geared to provide a different level of STS Services in the event a customer faces a flight cancellation. If a customer selects the NEALL option (Next Earliest Available Flight on All Airlines), he/she is rebooked on the next earliest available flight from all different carriers operating out of the customer's original departure airport. If a customer selects the NEAA option (Next Earliest Available Flight on Original Airline), he/she is rebooked on the next earliest available flight from the customer's original carrier operating out of the customer's original departure airport. If a customer selects the NBAA option (Next Best Available Flight on Original Airline), he/she is rebooked on the next best available flight from the customer's original carrier operating out of the customer's original departure airport. An airline may create more, edit or modify STS options depending upon various factors including, but not limited to, customer preferences, customer behavior, factors of airline choosing, market demand for a particular type of service, past experiences, nature and type of disruption and so on. In the above examples, it is assumed that the flight selected for rebooking suits the customer's intended itinerary.

FIG. 102 displays the structure of an illustrative STS value option framework for the airline industry and, in particular, the NEALL option indicated at Box 102.120. In a successful Initial Transaction for NEALL, a customer may pay $X to the airline to select the NEALL option, and in return may receive the airline's service commitment to rebook said customer on the next earliest available flight on all carriers, if the original flight gets disrupted or cancelled. The airline, on the other hand, gets to know the relative flexibilities in customer's travel needs and needs for trip certainty as some customers purchase this option and others don't. The assumption here is that customers make a logical decision to choose the NEALL option if their travel is very time sensitive (i.e., they desire highest level of trip certainty within an acceptable time range and/or destination range). Once the Initial Transaction is successful, there may be two possible related events as shown by the Box 102.150, namely, 1) the flight goes smoothly without disruption (shown by Event 2) and 2) the flight gets cancelled (shown by Event 1). If Event 1 happens, then the customers who may have selected the NEALL option may be automatically rebooked as per the conditions of the NEALL option. This may lead to savings and benefits to the airline as well as benefits to the customer. As shown, there may be no additional costs for the customer as a result of this event; in fact, he or she may save search time and effort on looking for alternate flights. The customer may get rebooked quickly and in accordance with the preferences generating those benefits. The airline may better optimize its re-bookings and may possibly reduce its overall costs generating a cost benefit. The customer may or may not have to pay an additional exercise price at the CNT depending on the terms and conditions of the option contract. Once the Chosen Service is selected, the airline, an entity other than said airline and/or the customer may not change the Chosen Service except within the bounds of the terms and conditions in the option contract. The airline or the customer may (or may not) have the right to enforce the Chosen Service on the other party as per the terms and conditions of the option contract.

The costs, revenues, benefits, terms and conditions shown here are for illustration purposes only and actual values could be different depending upon specific values selected by the airline for value options, customer behavior, airline characteristics and other relevant factors.

As shown in FIG. 8, the customers of the airline may be classified into one or more segments based on or more factors of airline choosing or any other factors. For example, based on the ticket class (as shown in FIG. 103). The terms "ticket class" and "fare class" are used interchangeably as the context requires. It is assumed here that the airline has three ticket classes in operation, namely, first class, business class and coach class (clearly, fewer or more classes may be accommodated). Then the three value options are created for each of the three customer segments, leading to total of 9 value options. For the sake of simplicity, Box 103.100 shows only the three value options for the NEAA value option for each customer segment. The next Act is to assign different parameter values of each value option related to pricing, benefits and conditions to customer and airline for the Initial Transaction and for each of the two related events. For simplicity, the Box 103.110 shows this Act only for the NEAA-Coach value option. The Box 103.120, shows the different costs, revenue, service and utility function for the airline and the customer.

The STS VOF structure may be implemented in several ways depending upon the terms and conditions associated with the STS contract. The STS VOF structure presented above for the three STS options with an airline having three ticket classes may be extended to implement any other STS instance.

The example illustrated in the below mentioned table may be used in understanding the STS process and how STS may improve airline efficiency and may help in effectively rebooking the customers as per the options they my have chosen. An airline may achieve substantial benefits by using STS VOF.

The STS Service may be selected by the airline, the customer, another entity or any combination thereof which includes, but not limited to, selecting the flight on which the customer may be rebooked. The STS VOF may enable an airline to obtain preferences and trip needs of the customers and use said preferences and trip needs to rebook and/or provide other services to the customers in the event of any disruption. Therefore, the airline would usually have the right to select (or define) the Chosen Services (i.e. the services which have to be rendered to the customer in the event of disruption). However, in different implementations of STS VOF, the airline, the customer, another entity or any combination thereof may select one or more of the Chosen Services related to a STS. The airline may incorporate the customer information and the data related to the STS into the sales, production, inventory, other database or information system or any combination of the above.

The time when an Initial Transaction is completed (i.e., the customer receives the STS option) is referred to as the Initial Transaction Time (or ITT, in short). One or more flights (on which the STS option may be utilized) may be selected, at one or more times, before, after, during, or any combination thereof, the Initial Transaction and/or the time said option is delivered to the customer (or the customer receives said option) or any combination thereof.

In a STS VOF, the customer may select one or more STS options by paying/receiving a price in one or more transactions or acts. The price may include, but is not limited to, a monetary value, coupons, discount vouchers, other benefits such as loyalty program benefits, frequent flyer miles or any combination of the above. The transactions may be related due to a relationship during the Initial Transaction, one or more of the previously executed transactions, any other transaction or combination thereof.

The Initial Transaction may have terms and conditions applicable to the customer or the airline or both. These terms and conditions may be set, preferably, to concurrently benefit both parties. The connections between the airline and the customer and the STS option, refer to the terms and conditions to the airline and the customer, respectively.

The STS VOF may or may not include any constraints on the STS Services which may be provided to the customers, in the event of any disruption. For example, an airline may restrict STS applicability and availability on flights that satisfy specific criteria (i.e. flights on which STS option may be sold and/or the flights on which the customers may be rebooked in the event of any disruption). In another example, the airline may provide STS Service to the customers only in the event if there is disruption (for example, cancellation or more than 8 hours delay) and so forth. The two flights (i.e., one on which STS option is availed and other on which the customer is rebooked in the event of any disruption) may or may not include practically constrained Flights. Practical constraints may include one or more constraints that will prevent a customer to fly on a given flight or all flights. Such constraints may include, but are not limited to, time constraints, location constraints and so forth. In other words, it may or may not be practically possible for a customer to fly on both flights due to at least one practical constraint. For example, one flight may be scheduled to be airborne when the other flight is scheduled to depart, thus not allowing any customer on the former flight to take the latter flight, or the distance between the departure airports of the two flights may prevent customers from flying on both flights (that depart within hours of each other).

A customer may select (or receive) flights and/or STS Services in several ways; through mutual agreement (e.g., during a direct interaction such as a flight purchase), or the airline may provide STS Services to the customer including, but not limited to, rebooking the customer without soliciting their interest or permission. For example, to enhance customer satisfaction or for any other purpose, an airline may provide a STS Service to the customer in the event of any disruption based on the past customer behavior, interaction and so on.

The Initial Transaction may impose one or more conditions on the airline. An airline may be required to explicitly notify the customer prior to or no later than a given date and time (referred to as the Notify Deadline) regarding the Chosen Service. If there is no such explicit notification condition, the Chosen Service may be decided as per the terms and conditions of the option contract. In case, (explicit or implicit notification), the date and time when the selection of the Chosen Service is notified to the customer is referred to as the Customer Notification Time (or CNT, in short). In the current discussion, the explicit notification condition is assumed unless specifically mentioned otherwise. The Notify Deadline may be pre-determined or may be determined later (i.e., after the Initial Transaction) by the airline, the customer, any other entity, or any combination thereof.

An airline may determine one or more Notify Deadlines for a STS at one or more times (e.g., before, during, after the Initial Transaction or any combination thereof) using factors including, but not limited to, customer needs, expected value of the flights, airline profitability goals, any other factors or any combination of the above. Customer factors may also be considered in determining the Notify Deadlines.

The STS VOF may impose additional terms and conditions on the customer. A customer may pay one or more prices in relation to the STS. There may or may not be any payment transaction related to the Initial Transaction and/or other event related to the STS. There may be one or more prices related to the STS. A price may include, but is not limited to, a set of one or more Ticket Prices, a set of one or more STS Prices or any combination of the above. An airline may choose to implement STS Prices in many ways. For example, a customer may pay a Ticket Price for an Itinerary, and then, may choose to get STS on only one of the Legs of one of the Segments of said Itinerary and thus, may pay STS Price only for said Leg. An airline may use the method of its choosing to decide on all the Ticket Prices and/or STS Prices.

The customer may pay one or more prices during the Initial Transaction (which is referred to as an Initial Price), at the CNT (which is referred to as an Exercise Price) and/or at any other time, which may or may not be pre-determined. The price may be a function of number of STS Services and/or Chosen Services, type of STS option utilized, specific flights on which rebooking is desired, nature and/or type of personalized service desired, Notify Deadline, one or more Ticket Prices, any other factors of airline's choosing or any combination of the above.

The price may consist of a monetary value or a soft/non-monetary value (e.g., benefits, coupons or exchange of another service) or other consideration. The STS Price may be fixed or variable, with or without bounds. The airline may set permissible range(s) or boundary limit(s) within which the STS Price may vary, or it may offer the customer a set of prices to choose from. Since price conditions may depend upon various factors, which may or may not be variable, the same may be decided at anytime. The price conditions may be determined by the customer, the airline, another entity, or any combination thereof at one or more times. One or more prices (STS Initial or STS Exercise or any other price) may be a negative value, which reflects that instead of the airline paying the customer, the customer shall receive a payment from the airline for receiving a STS Service.

Different price strategies may be implemented in the STS VOF. One or more of the STS prices (rewards) may be embedded with the Ticket Price by using a special Ticket Price. A customer may be presumed to accept a particular STS offer while displaying the Ticket Price (that has said STS Price embedded in it). These presumptions may or may not include soliciting prior interest of the customer regarding the STS offer. In case, the STS price is merged with the Ticket Price, and where such price may or may not be separately identifiable, the customer may or may not pay a separate price for STS.

The Notify Deadline may be pre-determined or may be determined later (i.e., after STS grant) by the airline, the customer or mutually by both. There may be one or more Notify Deadlines, where each Notify Deadline may have a different price associated to it. The STS VOF may also include conditions imposed on the customer. A customer may be under a mandatory condition to accept the Chosen Service once it is selected (for e.g., by the airline).

An airline may determine customer preferences, either explicitly or implicitly, regarding STS Services. An airline may obtain some Optional Preferences and/or Must Have Preferences from the customers which may be taken care in the event of any disruption. Must Have Preferences may be defined as those preferences which are must to be fulfilled before the STS Service (including rebooking and/or personalized services) is provided to the customer in the event of any disruption. Optional Preferences may be referred to those preferences which the customer may desire to get fulfilled but may also be willing to do away with those preferences in order to receive one or more STS Services. For example, a customer may have an Optional Preference to have a meal in the flight but may have a Must Have Preference to be rebooked on a non-stop flight. A preference may be an Optional Preference for one customer and may be a Must Have Preference for other at the same time. Few instances of Optional Preferences and Must Have Preferences may include, but not limited to, arrival airport, departure airport, connecting airport, number of connections or stops and/or connecting flights, any airline, type of aircraft, meal type, seat position (e.g., window seat, aisle seat, seat without bulkheads and so forth). The airline, one or more entities other than the airline or any combination thereof may seek one or more customer preferences.

An airline may also offer STS options to one or more customers on the basis of customer preferences, so obtained or collected. The airline may offer said STS options based on the dynamics of the airline including, but not limited to, inventory, operational data, revenue management data, cost data, financial data, accounting data, any other internal data, any combination thereof and so on.

An airline may seek such preferences from the customers prior, during or after the customer has purchased the flights and/or STS option or any combination thereof. These customer preferences may help the airline to perform concurrent optimization of value for the airline, the customers, and one or more entities other than the airline or any combination of two or more of the above. The customers may also include the customers whose preferences have not been determined or collected. The data pertaining to the airline, customers, one or more entities other than the airline, any combination thereof, may be integrated to concurrently optimize the value for at least any two of said entities. There may or may not be any payment transaction between the airline, one or more other entities and/or the customers regarding seeking such customer preferences, delivering STS options, customer participation in STS and so on.

The airline may operate one or more systems and/or services to monitor the airline dynamics. The airline may have one or more systems and/or services to analyze such data on a real-time or quasi real-time basis and draw conclusions on the basis of such analysis. Any of the systems and/or services may be operated by the airline, one or more entities other than the airline or any combination thereof. An airline may operate a system that defines customer preferences regarding personalized services desired, acceptable time delay, an acceptable change in destination. The airline may use such preferences to offer STS. An airline may concurrently optimize value for at least two of customers, said airline and at least one entity other than said airline. The airline may utilize such preferences in the event of disruption. These customer preferences may enable the airline to utilize these preferences to deal with the disruption situation more effectively, efficiently and in timely manner in providing STS Services (including rebooking and/or providing the desired personalized services) to the customers which may lead to increase in customer satisfaction. Such preferences may help the airline to allay fears of customer and dissatisfaction related to or in case of disruption.

An airline may offer STS to all customers or any selected customers, such selection may be based on any criterion including, but not limited to, such as those who have expressed their relative preferences, those who have not expressed any preferences. By integrating the airline dynamics and collected customer preferences, an airline may offer appropriate incentives and terms and conditions for STS to generate desired participation. An airline may choose to rebook the customers and/or provide the personalized services to the customers in any method of its choosing.

A cancelled flight may reduce an airline's capacity, while the demand builds up; this may lead to a natural supply and demand problem. In most situations, after a flight is cancelled, all the cancelled customers may not be able to travel at the same time because there may not be seat availability to permit this solution. Currently, an airline may spend a lot of resources and time in sorting through the list of customers and rebooking all of them. This may lead to one or more problems for the customers including, but not limited to, long waiting times, uncertainty, stress, frustration and so forth. One or more of the above mentioned problems may be solved if an airline uses the new method and system taught above to determine in advance the customers' relative flexibilities and then rebook them and/or provide personalized services accordingly, while minimizing airline costs. The value options listed in FIG. 14 may help an airline to determine relative flexibility at an individual customer level. A software application based on the architecture, as explained in FIG. 2, may be used to capture this additional customer information and then an Event Optimizer module may rebook customers and/or provide personalized services according to their needs and while minimizing the costs for the airline. Handling customers in such an efficient and effective fashion may create goodwill for the airline, and they may charge a premium for certain value options while offering other options at no cost or very minimal cost to the customers.

The above terms and conditions of the STS VOF may be set in a way to concurrently benefit at least two of the customer, the airline, any other entity apart from said airline involved and/or any combination thereof. The airline gets to seek a way to know preferences and relative need for trip certainty of the customers. The customer benefits from receiving personalized and preferred services at the time of disruption. The airline benefits from enhanced customer satisfaction (loyalty and repeat business), incremental revenue from consumer surplus, savings in costs in rebooking and offering personalized services and other operational benefits.

Second Stage: Using the STS Value Option Framework

As discussed above, the STS VOF may be implemented in any industry. The airline industry is assumed herein since selection of an industry provides a context and makes the understanding smoother and easier. After completing the first stage of the method, the airline has created a STS VOF and specific options within that framework. The airline may have segmented customers and designed options accordingly. The airline is fully prepared to use a structured format consisting of one or more STS value options to interact with its customers in real time to generate benefits for at least two of the airline, its customers and any entity apart from said airline. The second stage of the STS VOF is now presented.

The system architecture described above (in FIG. 13.A to 13.E) or another one may be used to implement the STS VOF. The following presents details of the second stage as it related to the STS VOF.

1. Dynamic Interaction to Determine Customer Demand in Detail (Act 11.1120):

On a browser, which accesses the seller's (i.e., company's) web site, a series of questions are presented to the customer and the customer supplies answers. These questions may also present value options and ask the customer to answer and select the options that suit them the best, enabling the company to determine detailed preferences and flexibilities in customer needs. The questions/value options are supplied from the database 2.210 based on the value options framework created in the first stage to deal with different customer segments.

Continuing with the airline example of STS VOF implementation, FIGS. 60 and 104 display web pages that provide a real world example of how the interaction may take place between the customers and the airline when using the new system and method. FIG. 60 shows the summary of an Itinerary purchased or selected by a customer on an airline's website. After selecting the Itinerary, the customer may click the "Buy STS" link that takes the customer to a web page (shown in FIG. 104), where a list of STS options are presented to the customer, who can then select the desired STS option.

These value options allow the passenger to tailor the services in event of a flight cancellation. Each of the presented value options provides some benefit and costs to the passenger. There may be a default option that provides the standard service at no cost to the passenger. If the passenger does not select any option, the system may select default. The prices and conditions listed for each value option displayed on the web page may be a function of the profile of the customer who is accessing the page and the ticket he has selected so far. If a customer does not select any particular value option, the software automatically may select and assign the default option (the default option is Silver as shown in FIG. 19) to the passenger's Itinerary. If the user selects any of the other two premium options, then he pays the option price listed in front of those options at the time of booking of the ticket. In this fashion, the value options enable the airline to determine relative flexibility in individual passengers' travel needs.

(2) Event Optimizer:

Once the customer selects a value option, the system goes to the Event Optimizer phase where different steps are executed depending on the event that may occur. In the STS example, if the customer flight is cancelled or about to get cancelled, the Event Optimizer is invoked. The Event Optimizer analyzes the cancelled flight event, and invokes the rebook algorithm. The rebook algorithm collects all the related cancelled passengers and their information and assesses the airline operations (flight status, availability, costs etc.) in real time. Passengers are sorted in a preference order based on pre-defined criteria. The rebook algorithm then integrates the individual passenger preferences with the airline operations information and optimizes across the data to produce one or more optimized itineraries that satisfy individual passenger needs as well as concurrently maximizing gains for the airline. In this fashion, both the airline and passenger benefit at the same time by using the new system and method.

Figure 105:
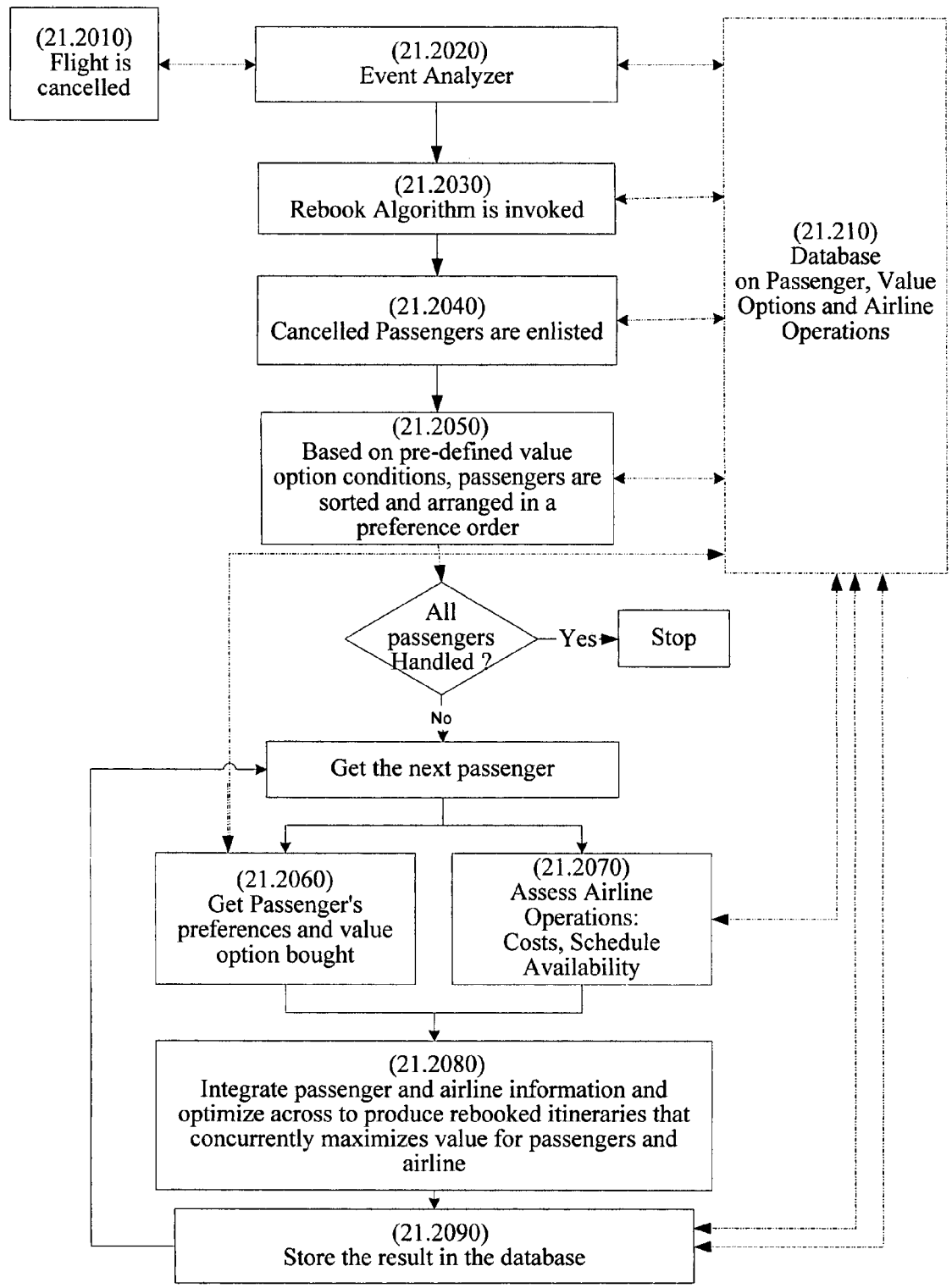
FIG. 105 is a counter part to FIG. 12 dealing specifically with the STS VOF implementation in the airline industry for flight cancellation and rebooking.

Turning to FIG. 105, there is shown a detailed view of how an Event Optimizer would work in case of the STS framework example in the airline industry. The boxes or Acts mentioned in this subsection (or paragraph) refer to the FIG. 105. There are two events associated with the STS framework, a flight executes smoothly or gets cancelled. If the cancellation event happens (Act 21.2010), the Event Analyzer 21.2020 analyzes the event and searches for the associated optimization algorithm, which in this case is the Rebook Optimizer (called simply "rebook" from here on) 21.2030. Once invoked, the Rebook Optimizer searches for all the passengers on the cancelled flight (21.2040) and sorts them (21.2050) using pre-defined criteria. The Rebook Optimizer determines the personal preferences and value option selections for the first passenger in the list (21.2060) and assesses the airline operations in real time or quasi-real-time (21.2070), including flight status, seats booked, available seats on different flights, costs per passenger mile, marginal costs per passenger mile, costs of flight cancellation and other pre-assigned parameters. In the next Act 21.2080, the Rebook Optimizer operation integrates the real time airline information with the passenger preferences and value option selection and optimizes across both to produce one or more optimized rebooked itineraries. On one hand, the rebooked itineraries meet or exceed the benefits provided to the passenger through the selected value option. Concurrently, on the other hand, the Rebook Optimizer optimizes the costs and schedule for the airline. In this fashion, both the passenger and the airline benefit at the same time. After rebooking one passenger, the rebooking procedure moves on to the next passenger in the list and performs the same above steps until all the passengers are rebooked optimally. Finally, the results are communicated to the passengers through the Customer Engine, and to database 21.210 (Act 21.2090).

In the above STS example, there could be several ways to implement the rebooking algorithm. For example, in some cases, the rebooking procedure may generate more than one Itinerary for the passenger. The Customer Engine may then present all those itineraries to the passenger, for selecting one that best fits his/her needs. In another case, the Rebook Optimizer may only generate one optimized Itinerary; hence, the passenger does not get a choice. In this case, if the passenger does not like the rebooked Itinerary, he/she can always approach the airline via other means (customer service desk/ check-in counter at the airport or reservation call center) to get his rebooked Itinerary modified manually.

The implementation of the STS VOF between the airline and its customer takes place through two high level acts. In the first act, an interactive event between the customer and the airline's web server, runs to carry out the Initial Transaction of the STS VOF. In this Act, a number of algorithms may be executed (e.g., availability, STS Price, Ticket Price and Notify Deadline) on the airline's server to optimally calculate the terms and conditions of the STS VOF to concurrently benefit at least two of the airline, its customers and any entity other than said airline. In the second act, the Customer Notification process (explained later) is executed. In this process, the Chosen Service is notified to the customer. The process may also consist of one or more event optimizer algorithms that may help to optimally select the Chosen Service and/or to optimally use (or reuse) the Released Service. In the Get STS process, a customer interacts with the airline's server to receive STS. The interaction may take place (for example) via phone, in-person or on a website. The Sequential Get STS Process is presented first, followed by a short summary of the Concurrent Get STS Process.

While the invention has been described with respect to a limited number of embodiments, those skilled in the art, having benefit of this disclosure, will appreciate that other embodiments can be devised within the spirit and scope of the invention as disclosed herein. Accordingly, the scope of the invention should be limited only by the attached claims.

What is claimed is:

1. A computer-implemented system to provide options on products, comprising:
   a. a data processor being adapted to receive at least one input from a customer for an option to upgrade and in response to receiving that input, to deliver to a customer a conditional option for an upgrade of a product from a company wherein the customer is required to relinquish at least one right in order to receive the upgrade;
   b. a data processor being adapted to record said option and its relinquishment in a computer readable data store;
   c. a data processor being adapted to receive at least one other input and in response to said other input automatically upgrading the customer if conditions on said option are satisfied, wherein the customer's acceptance of said option includes acceptance of conditions and confers upon the company a right to enforce said relinquishment on the customer and to provide the upgrade; and
   d. a data processor being adapted to record said upgrade in a computer readable data store.

2. The system of claim 1 wherein at least two of said data processors are a same processor.

3. A computer-implemented method to provide options on products, comprising:
   a. operating a computer system to receive at least on input from a customer defining a request for an option for an upgrade for a product;
   b. operating a computer system to provide to a customer an option for a product upgrade upon occurrence of specified conditions accepted by the customer and further on condition that the customer relinquish at least one right and a company has the right to enforce said relinquishment upon occurrence of the specified conditions and to provide the upgrade;
   c. recording in a computer readable data store the option, the specified conditions and relinquishment terms;

d. operating a computer system to process the information in the computer readable data store and automatically provide the upgrade to the customer when conditions on the upgrade opportunity are satisfied; and e. recording the provision of the upgrade in a computer readable data store.

4. The method of claim 3 wherein at least two of said data processors are a same processor.

5. The method of claim 3 wherein the upgrade is conditioned on a payment condition apart from relinquishment of said right.

6. The method of claim 3 further including the company requiring the customer to choose a specified number of presented rights in connection with product purchase and then to relinquish said rights to receive(s) the upgrade.

7. The method of claim 3 wherein said company is not the seller of said product.

8. The method of claim 3 wherein said company is not the seller of said option.

9. The method of claim 3 wherein the relinquishment increases value for at least one of the customer, the provider of said option and at least an entity other than the provider of said option.

10. The method of claim 3 wherein said products are related to the products of the company.

11. The method of claim 3 wherein said products are not related to the products of the company.

12. The method of claim 3 wherein said specified conditions include at least one condition in addition to the availability of a higher ranked product.

13. The method of claim 3 wherein the upgrade is an upgrade to more than one product.

14. The method of claim 3 wherein the upgrade is an upgrade to at least one constrained product.

15. The method of claim 14 wherein said constrained product cannot be utilized fully upon utilization of the option.

16. The method of claim 3 wherein said company allocates at least one product to at least one entity other than said company, and said entity delivers said option on at least one of said allocated products.

17. The method of claim 3 wherein said relinquishment includes relinquishment of one or more rights.

18. The method of claim 3 wherein said company is an airline.

19. The method of claim 18 wherein said product is the ticket of an airline and said relinquishment includes relinquishment of at least one facility associated with said ticket.

20. The method of claim 18 wherein said upgrade includes an upgrade to a higher ranked cabin on a different flight.

21. The method of claim 3 wherein the specified conditions accepted by the customer include an indication of price the customer will pay for said options.

22. The method of claim 21 wherein the price is modifiable before an indicated notification date.

* * * * *